US012772339B2

(12) United States Patent
Forde et al.

(10) Patent No.: US 12,772,339 B2
(45) Date of Patent: Oct. 20, 2026

(54) SYSTEMS AND METHODS FOR REDUCING NETWORK SWITCHING CONGESTION USING DISTRIBUTED ORBITAL TIME-SLOT ASSIGNMENT

(71) Applicant: Attobahn, Inc., Ashburn, VA (US)

(72) Inventors: Richard A. Forde, Ashburn, VA (US); Darryl L. Gray, Irvine, CA (US)

(73) Assignee: Attobahn, Inc., Ashburn, VA (US)

( * ) Notice: Subject to any disclaimer, the term of this patent is extended or adjusted under 35 U.S.C. 154(b) by 0 days.

(21) Appl. No.: 19/458,289

(22) Filed: Jan. 23, 2026

(65) Prior Publication Data

US 2026/0156715 A1 Jun. 4, 2026

Related U.S. Application Data

(63) Continuation of application No. 19/261,474, filed on Jul. 7, 2025, which is a continuation of application No. 18/541,306, filed on Dec. 15, 2023, now Pat. No. 12,471,185, which is a continuation of application No. 17/329,431, filed on May 25, 2021, now Pat. No.

(Continued)

(51) Int. Cl.

| | |
|---|---|
| ***H04L 12/40*** | (2006.01) |
| ***H04B 1/3888*** | (2015.01) |
| ***H04J 3/06*** | (2006.01) |
| ***H04L 9/40*** | (2022.01) |
| ***H04L 12/46*** | (2006.01) |
| ***H04W 12/03*** | (2021.01) |
| ***H04W 84/00*** | (2009.01) |

(52) U.S. Cl.
CPC ........ *H04W 84/005* (2013.01); *H04B 1/3888* (2013.01); *H04J 3/06* (2013.01); *H04L 12/4633* (2013.01); *H04L 63/0428* (2013.01); *H04W 12/03* (2021.01); *H04L 12/40* (2013.01)

(58) Field of Classification Search
CPC .. H04W 85/004; H04W 12/03; H04B 1/3888; H04J 3/06; H04L 12/40; H04L 12/4633; H04L 63/0428
USPC .......................................................... 370/329
See application file for complete search history.

(56) References Cited

U.S. PATENT DOCUMENTS

| | | | |
|---|---|---|---|
| 5,917,815 | A | 6/1999 | Byers et al. |
| 6,005,865 | A | 12/1999 | Lewis et al. |

(Continued)

*Primary Examiner* — Robert J Lopata

(57) ABSTRACT

A communication system and method improve network efficiency through distributed cell switching using orbital time-slot multiplexing. Data flows are segmented into fixed-length cell frames by access nodes comprising an Instinctively Wise Integrated Circuit (IWIC) and an Atto-Second Multiplexer (ASM). The ASM assigns the cell frames to orbital time slots within an orbital time-division frame to deterministically space cell-frame transmissions. The time-slotted cell frames are routed through a hierarchical switching fabric including one or more nucleus switches. Switching and scheduling operations are distributed among the access nodes to reduce buffering, limit contention, and decrease switching load at higher-level switching nodes. Routing may be performed using a cell frame fast packet protocol based on hierarchical address fields contained in the cell frames, thereby reducing latency and congestion while maintaining deterministic transmission behavior across the network.

20 Claims, 109 Drawing Sheets

Related U.S. Application Data 11,889,590, which is a continuation of application No. 15/936,369, filed on Mar. 26, 2018, now Pat. No. 11,050,717, which is a continuation-in-part of application No. 14/895,652, filed as application No. PCT/US14/40933 on Jun. 4, 2014, now Pat. No. 10,021,735.

(60) Provisional application No. 61/830,701, filed on Jun. 4, 2013.

(56) References Cited

U.S. PATENT DOCUMENTS 6,353,618 B1 * 3/2002 Hung .................. H04L 12/5602 370/461
6,389,014 B1 * 5/2002 Song ........................ H04L 49/20 370/465
6,621,830 B1 9/2003 Semple et al.
6,778,503 B1 8/2004 Sproat et al.
6,778,529 B1 * 8/2004 Field ..................... H04L 49/602 370/395.5
6,954,461 B1 10/2005 Tomlins et al.
7,012,922 B1 * 3/2006 Unitt ................... H04L 12/2856 370/537
7,075,952 B1 7/2006 Torma et al.
7,242,686 B1 7/2007 Dougherty et al.
7,583,599 B1 9/2009 Ling et al.
2002/0049047 A1 4/2002 Elder et al.
2002/0075854 A1 6/2002 Kumar et al.
2002/0138646 A1 9/2002 Tsuboi et al.
2003/0016624 A1 * 1/2003 Bare ..................... H04L 47/125 370/252
2003/0147379 A1 8/2003 Elias
2003/0174714 A1 9/2003 Manik et al.
2004/0157550 A1 * 8/2004 Nakagawa ......... H04B 7/15564 455/10
2004/0229621 A1 11/2004 Misra
2004/0235491 A1 11/2004 Lundstrom et al.
2005/0030982 A1 2/2005 Eshraghian
2005/0068992 A1 3/2005 Kaku et al.
2005/0084208 A1 4/2005 Kim et al.
2006/0233551 A1 * 10/2006 Wood .................. H04J 14/0298 398/85
2006/0262888 A1 11/2006 Mathew et al.
2006/0264210 A1 11/2006 Lovberg et al.
2006/0268832 A1 11/2006 Mekala et al.
2006/0268888 A1 11/2006 Liu et al.
2007/0002889 A1 1/2007 Sekhar
2007/0241200 A1 10/2007 Sawachi
2008/0030404 A1 2/2008 Irwin
2008/0037581 A1 2/2008 Asano
2008/0253491 A1 10/2008 Keezer et al.
2008/0298806 A1 12/2008 Effenberger
2009/0196277 A1 8/2009 Horn et al.
2009/0276542 A1 11/2009 Aweya et al.
2010/0290783 A1 11/2010 Kazawa et al.
2011/0044176 A1 2/2011 Li
2011/0066297 A1 3/2011 Saberi et al.
2011/0105159 A1 5/2011 Hirayama
2012/0315031 A1 12/2012 Zhong et al.
2013/0028264 A1 1/2013 Munoz et al.
2013/0182716 A1 * 7/2013 Gemelli .................. H04L 49/30 370/419
2013/0266029 A1 10/2013 Yi et al.
2013/0287017 A1 10/2013 Chen et al.
2014/0119080 A1 5/2014 Sakamoto et al.
2014/0121795 A1 5/2014 Snow
2014/0166868 A1 * 6/2014 Tekin ................... H03B 5/1852 250/252.1
2014/0203963 A1 7/2014 Shimada et al.
2014/0219132 A1 8/2014 Delveaux et al.
2015/0146730 A1 5/2015 Desai et al.
2016/0149635 A1 * 5/2016 Hinman ............. H04B 7/15507 370/315
2016/0262144 A1 9/2016 Kitazoe et al.
2016/0294462 A1 * 10/2016 Jeong .................. H04W 72/046
2016/0352344 A1 12/2016 Maki et al.
2017/0164368 A1 6/2017 Nishikawa et al.
2017/0187384 A1 6/2017 Shimada
2018/0115343 A1 * 4/2018 Shen ................... H04L 25/0224
2018/0246216 A1 8/2018 Shiina et al.
2018/0309183 A1 * 10/2018 Paolella ........... H04B 10/25891
2019/0363448 A1 * 11/2019 Yemelong .............. H04B 7/145
2020/0314760 A1 10/2020 Ye et al.
2020/0374205 A1 11/2020 Sharma et al.

* cited by examiner

ATTOBAHN ATTOVIEW SERVICES DASHBOARD

109 ATTOBAHN DEVICES ADDRESSES

ADDRESS = 32F310E2A608FF

102

103

110

| GLOBAL CODE NA | AREA CODE 01-16 | | AREA CODE 17-32 | | AREA CODE 33-48 | | AREA CODE 49-64 | |
|---|---|---|---|---|---|---|---|---|
| 00 | 000000 | 1 | 010000 | 17 | 100000 | 33 | 110000 | 49 |
| | 000001 | 2 | 010001 | 18 | 100001 | 34 | 110001 | 50 |
| | 000010 | 3 | 010010 | 19 | 100010 | 35 | 110010 | 51 |
| | 000011 | 4 | 010011 | 20 | 100011 | 36 | 110011 | 52 |
| | 000100 | 5 | 010100 | 21 | 100100 | 37 | 110100 | 53 |
| | 000101 | 6 | 010101 | 22 | 100101 | 38 | 110101 | 54 |
| | 000110 | 7 | 010110 | 23 | 100110 | 39 | 110110 | 55 |
| | 000111 | 8 | 010111 | 24 | 100111 | 40 | 110111 | 56 |
| | 001000 | 9 | 011000 | 25 | 101000 | 41 | 111000 | 57 |
| | 001001 | 10 | 011001 | 26 | 101001 | 42 | 111001 | 58 |
| | 001010 | 11 | 011010 | 27 | 101010 | 43 | 111010 | 59 |
| | 001011 | 12 | 011011 | 28 | 101011 | 44 | 111011 | 60 |
| | 001100 | 13 | 011100 | 29 | 101100 | 45 | 111100 | 61 |
| | 001101 | 14 | 011101 | 30 | 101101 | 46 | 111101 | 62 |
| | 001110 | 15 | 011110 | 31 | 101110 | 47 | 111110 | 63 |
| | 001111 | 16 | 011111 | 32 | 101111 | 48 | 111111 | 64 |

| GLOBAL CODE EMEA | AREA CODE 01-16 | | AREA CODE 17-32 | | AREA CODE 33-48 | | AREA CODE 49-64 | |
|---|---|---|---|---|---|---|---|---|
| 01 | 000000 | 1 | 010000 | 17 | 100000 | 33 | 110000 | 49 |
| | 000001 | 2 | 010001 | 18 | 100001 | 34 | 110001 | 50 |
| | 000010 | 3 | 010010 | 19 | 100010 | 35 | 110010 | 51 |
| | 000011 | 4 | 010011 | 20 | 100011 | 36 | 110011 | 52 |
| | 000100 | 5 | 010100 | 21 | 100100 | 37 | 110100 | 53 |
| | 000101 | 6 | 010101 | 22 | 100101 | 38 | 110101 | 54 |
| | 000110 | 7 | 010110 | 23 | 100110 | 39 | 110110 | 55 |
| | 000111 | 8 | 010111 | 24 | 100111 | 40 | 110111 | 56 |
| | 001000 | 9 | 011000 | 25 | 101000 | 41 | 111000 | 57 |
| | 001001 | 10 | 011001 | 26 | 101001 | 42 | 111001 | 58 |
| | 001010 | 11 | 011010 | 27 | 101010 | 43 | 111010 | 59 |
| | 001011 | 12 | 011011 | 28 | 101011 | 44 | 111011 | 60 |
| | 001100 | 13 | 011100 | 29 | 101100 | 45 | 111100 | 61 |
| | 001101 | 14 | 011101 | 30 | 101101 | 46 | 111101 | 62 |
| | 001110 | 15 | 011110 | 31 | 101110 | 47 | 111110 | 63 |
| | 001111 | 16 | 011111 | 32 | 101111 | 48 | 111111 | 64 |

110

| GLOBAL CODE ASPAC | AREA CODE 01-16 | | AREA CODE 17-32 | | AREA CODE 33-48 | | AREA CODE 49-64 | |
|---|---|---|---|---|---|---|---|---|
| 10 | 000000 | 1 | 010000 | 17 | 100000 | 33 | 110000 | 49 |
| | 000001 | 2 | 010001 | 18 | 100001 | 34 | 110001 | 50 |
| | 000010 | 3 | 010010 | 19 | 100010 | 35 | 110010 | 51 |
| | 000011 | 4 | 010011 | 20 | 100011 | 36 | 110011 | 52 |
| | 000100 | 5 | 010100 | 21 | 100100 | 37 | 110100 | 53 |
| | 000101 | 6 | 010101 | 22 | 100101 | 38 | 110101 | 54 |
| | 000110 | 7 | 010110 | 23 | 100110 | 39 | 110110 | 55 |
| | 000111 | 8 | 010111 | 24 | 100111 | 40 | 110111 | 56 |
| | 001000 | 9 | 011000 | 25 | 101000 | 41 | 111000 | 57 |
| | 001001 | 10 | 011001 | 26 | 101001 | 42 | 111001 | 58 |
| | 001010 | 11 | 011010 | 27 | 101010 | 43 | 111010 | 59 |
| | 001011 | 12 | 011011 | 28 | 101011 | 44 | 111011 | 60 |
| | 001100 | 13 | 011100 | 29 | 101100 | 45 | 111100 | 61 |
| | 001101 | 14 | 011101 | 30 | 101101 | 46 | 111101 | 62 |
| | 001110 | 15 | 011110 | 31 | 101110 | 47 | 111110 | 63 |
| | 001111 | 16 | 011111 | 32 | 101111 | 48 | 111111 | 64 |

| GLOBAL CODE CCSA | AREA CODE 01-16 | | AREA CODE 17-32 | | AREA CODE 33-48 | | AREA CODE 49-64 | |
|---|---|---|---|---|---|---|---|---|
| 11 | 000000 | 1 | 010000 | 17 | 100000 | 33 | 110000 | 49 |
| | 000001 | 2 | 010001 | 18 | 100001 | 34 | 110001 | 50 |
| | 000010 | 3 | 010010 | 19 | 100010 | 35 | 110010 | 51 |
| | 000011 | 4 | 010011 | 20 | 100011 | 36 | 110011 | 52 |
| | 000100 | 5 | 010100 | 21 | 100100 | 37 | 110100 | 53 |
| | 000101 | 6 | 010101 | 22 | 100101 | 38 | 110101 | 54 |
| | 000110 | 7 | 010110 | 23 | 100110 | 39 | 110110 | 55 |
| | 000111 | 8 | 010111 | 24 | 100111 | 40 | 110111 | 56 |
| | 001000 | 9 | 011000 | 25 | 101000 | 41 | 111000 | 57 |
| | 001001 | 10 | 011001 | 26 | 101001 | 42 | 111001 | 58 |
| | 001010 | 11 | 011010 | 27 | 101010 | 43 | 111010 | 59 |
| | 001011 | 12 | 011011 | 28 | 101011 | 44 | 111011 | 60 |
| | 001100 | 13 | 011100 | 29 | 101100 | 45 | 111100 | 61 |
| | 001101 | 14 | 011101 | 30 | 101101 | 46 | 111101 | 62 |
| | 001110 | 15 | 011110 | 31 | 101110 | 47 | 111110 | 63 |
| | 001111 | 16 | 011111 | 32 | 101111 | 48 | 111111 | 64 |

ATTOBAHN USER UNIQUE ADDRESS & APP EXTENSION

ATTOBAHN APP EXTENSIONS
512 EXTENSIONS

| APPS | EXTENSION | PORT | | | | | | | | | | |
|---|---|---|---|---|---|---|---|---|---|---|---|---|
| ADMIN | 000000000 | 0 | 000010000 | 16 | 000100000 | 32 | 000110000 | 51 | | | 111110000 | 497 |
| ANMP | 000000001 | 1 | 000010001 | 17 | 000100001 | 33 | 000110001 | 52 | | | 111110001 | 498 |
| INFO-MAIL | 000000010 | 2 | 000010010 | 18 | 000100010 | 34 | 000110010 | 53 | | 100C | 111110010 | 499 |
| INFOTAINMENT | 000000011 | 3 | 000010011 | 19 | 000100011 | 35 | 000110011 | 54 | | | 111110011 | 500 |
| CLOUD | 000000100 | 4 | 000010100 | 20 | 000100100 | 36 | 000110100 | 55 | | | 111110100 | 501 |
| SOCIAL MEDIA | 000000101 | 5 | 000010101 | 21 | 000100101 | 37 | 000110101 | 56 | | | 111110101 | 502 |
| VOFP | 000000110 | 6 | 000010110 | 22 | 000100110 | 40 | 000110110 | 56 | | | 111110110 | 503 |
| 4K/5K/8K VIFP | 000000111 | 7 | 000010111 | 23 | 000100111 | 41 | 000110111 | 57 | | ● ● ● ● ● ● ● | 111110111 | 504 |
| HTTP | 000001000 | 8 | 000011000 | 24 | 000101000 | 42 | 000111000 | 58 | | | 111111000 | 505 |
| MOBILE PHONE | 000001001 | 9 | 000011001 | 25 | 000101001 | 43 | 000111001 | 59 | | | 111111001 | 506 |
| BROADCAST TV | 000001010 | 10 | 000011010 | 26 | 000101010 | 44 | 000111010 | 60 | | | 111111010 | 507 |
| 3D VIDEO 3DVIFP | 000001011 | 11 | 000011011 | 27 | 000101011 | 45 | 000111011 | 61 | | | 111111011 | 508 |
| MOVIE DIST MVIFP | 000001100 | 12 | 000011100 | 28 | 000101100 | 46 | 000111100 | 62 | | | 111111100 | 509 |
| ATTOBAHN ADS | 000001101 | 13 | 000011101 | 29 | 000101101 | 47 | 000111101 | 63 | | | 111111101 | 510 |
| OWL | 000001110 | 14 | 000011110 | 30 | 000101110 | 48 | 000111110 | 64 | | | 111111110 | 511 |
| XML | 000001111 | 15 | 000011111 | 31 | 000101111 | 50 | 000111111 | 65 | | | 111111111 | 512 |

Viral Orbital Vehicle Access Node
PHYSICAL LAYOUT

Attobahn Atto Second Multiplexer (ASM)
Orbital Time Slots & Time Division Frame

V-ROVER, Nano-ROVER, Atto-ROVER, PROTONIC SWITCH & NUCLEUS SWITCH

Nano-ROVER
Device PHYSICAL LAYOUT

Nano-ROVER mmW Device

PHYSICAL CONNECTION

ATTOBAHN AERIAL DRONE PROTONIC SWITCH

PROTONIC SWITCH PHYSICAL LAYOUT

PROTONIC SWITCH PHYSICAL CONNECTIVITY

ATTOBAHN NUCLEUS SWITCH CONNECTIONS TO PROVIDERS AND CORPORATE NETWORKS

END USERS APPLICATIONS 10-20 Gbps connections to each user

INTERNET ACCESS
VEHICLE ONBOARD DIAGNOSTICS
AUTONOMOUS VEHICLE COMMUNICATIONS NETWORK
VIDEO & MOVIS DOWNLOAD
ON-NET CELL PHONE CALLS
LIVE VIDEO & TV NEWS BROADCAST
HIGH RESOLUTION GRAPHICS
MOBILE VIDEO CONFERENCING
HOS-TO-HOST HIGH SPEED DATA
PRIVATE CORPORATE NETWORK SERVICES

ATTO-SERVICES
NETWORK MANAGEMENT SYSTEM

ROVERS
NETWORK MANAGEMENT SYSTEM

PROTONIC SWITCHES
NETWORK MANAGEMENT SYSTEM

NUCLEUS SWITCHES
NETWORK MANAGEMENT SYSTEM

RF SYSTEMS
NETWORK MANAGEMENT SYSTEM

TRANSMISSION SYSTEMS
NETWORK MANAGEMENT SYSTEM

CLOCKING SYSTEMS
NETWORK MANAGEMENT SYSTEM

ATTOBAHN MILLIMETER WAVE RADIO FREQUENCY NETWORK ARCHITECTURE

ATTOBahn Millimeter wave RF NETWORK CONFIGURATION
LAYER I - IV

ATTOBAHN Nano-ROVER RF DESIGN

ATTOBAHN Atto-ROVER RF DESIGN

ATTOBHAN ULTRA-HIGH POWER mmW AMPLIFIER SYSTEM

OMNI-DIRECTIONAL/MULTI-POINT BOOM BOX mmW AMPLIFIER CIRCULAR FEED HORN

ATTOBAHN BOOM BOX
GYRO TWA SYSTEM DESIGN

ATTOBHAN ULTRA-HIGH POWER mmW AMPLIFIER SYSTEM

POINT-TO-POINT BACKBONE BOOM BOX mmW AMPLIFIER RECTANGULAR FEED HORN

ATTOBAHN BOOM BOX
GYRO TWA SYSTEM DESIGN
BACKBONE NETWORK

ATTOBHAN HIGH POWER mmW AMPLIFIER SYSTEM

MINI BOOM BOX mmW AMPLIFIER

ATTOBAHN MINI BOOM BOX
GYRO TWA SYSTEM DESIGN

NOTES:
1. ANMS: Attobahn Network Management System
2. mmW: millimeter wave

ATTOBAHN HOUSE/BUILDING WINDOW-MOUNT 360-DEGREE HORN ANTENNA mmW AMPLIFIER REPEATER DESIGN

EXTERNAL WINDOW MOUNT 360-DEGREE HORN ANTENNA

NOTES:
1. ANMS: Attobahn Network Management System
2. mmW: millimeter wave

ATTOBAHN HOUSE/BUILDING
WINDOW-MOUNT 360-DEGREE HORN ANTENNA
mmW AMPLIFIER REPEATER DESIGN

NOTES:
1. ANMS: Attobahn Network Management System
2. mmW: millimeter wave

ATTOBAHN HOUSE/BUILDING
WINDOW-MOUNT 180-DEGREE HORN ANTENNA
mmW AMPLIFIER REPEATER DESIGN

NOTES:
1. ANMS: Attobahn Network Management System
2. mmW: millimeter wave

ATTOBAHN HOUSE/BUILDING
WINDOW-MOUNT 180-DEGREE HORN ANTENNA
mmW AMPLIFIER REPEATER DESIGN mmW 360-DEGREE CIRCULAR HORN ANTENNA HOUSE/BUILDING ARCHITECTURE

ATTOBAHN WALL
mmW AMPLIFIER REPEATER DESIGN

ATTOBAHN DOOR WAY 180-DEGREE FEED HORN mmW AMPLIFIER REPEATER

ATTOBAHN WALL FEED HORN
mmW AMPLIFIER REPEATER DESIGN

ATTOBANH INTRA-BUILDING mmW ANTENNA DESIGN

ATTOBAHN WALL FEED HORN
mmW AMPLIFIER REPEATER DESIGN

ATTOBAHN WALL 180-DEGREE FEED HORN mmW AMPLIFIER REPEATER

NOTES:
1. ANMS: Attobahn Network Management System
2. mmW: millimeter wave

ATTOBAHN HOUSE/BUILDING
WINDOW-MOUNT 360-DEGREE HORN ANTENNA
mmW AMPLIFIER REPEATER DESIGN

NOTES:
1. ANMS: Attobahn Network Management System
2. mmW: millimeter wave

ATTOBAHN HOUSE/BUILDING
WINDOW-MOUNT 180-DEGREE HORN ANTENNA
mmW AMPLIFIER REPEATER DESIGN

ATTOBAHN DOOR WAY/WALL
60-DEGREE FEED HORN mmW AMPLIFIER REPEATER

ATTOBAHN DOOR WAY/WALL
180-DEGREE FEED HORN mmW AMPLIFIER REPEATER

ATTOBAHN BUILDING/HOUSE
mmW ANTENNAE

ATTOBAHN
CLOCKING & TIMING STANDARD
SYNCHRONIZATION ARCHITECTURE

IWIC CHIP

INSTINCTIVELY WISE INTEGRATED CIRCUIT (IWIC)

ATTOBAHN IWIC CHIP DESIGN

ATTOBAHN IWIC CHIP DIMENSIONS

SYSTEMS AND METHODS FOR REDUCING NETWORK SWITCHING CONGESTION USING DISTRIBUTED ORBITAL TIME-SLOT ASSIGNMENT

RELATED APPLICATIONS

This application is a continuation of U.S. patent application Ser. No. 19/261,474, filed Jul. 7, 2025, which is a continuation of U.S. patent application Ser. No. 18/541,306, filed Dec. 15, 2023, now U.S. Pat. No. 12,471,185. U.S. patent application Ser. No. 18/541,306 is a continuation of U.S. patent application Ser. No. 17/329,431, filed May 25, 2021, now U.S. Pat. No. 11,889,590. U.S. patent application Ser. No. 17/329,431 is a continuation of U.S. patent application Ser. No. 15/936,369, filed Mar. 26, 2018, now U.S. Pat. No. 11,050,717. U.S. patent application Ser. No. 15/936,369 is a continuation-in-part of U.S. patent application Ser. No. 14/895,652, filed Dec. 3, 2015, now U.S. Pat. No. 10,021,735, which claims the benefit of U.S. Provisional Patent Application No. 61/830,701, filed Jun. 4, 2013.

The entire contents of each of the foregoing applications are hereby incorporated by reference herein in their entirety for all purposes.

BACKGROUND

Field of the Invention

The current Internet worldwide network is based on technologies developed more than a quarter century ago. The primary part of these technologies is the Internet Protocol-Transmission Control Protocol/Internet Protocol (TCP/IP) transport router systems that functions as the integration level for data, voice, and video. The problem that has plagued the Internet is its inability to properly accommodate voice and video with the high-quality performance that the two applications require in order for human interaction. The varying length packet sizes, long router nodal delays, end dynamic unpredictable transport routes of IP router result in extended and varying latency.

This unpredictability, prolonged and unsteady latency has a negative effect on voice end video applications, such as poor quality voice conversations and the famous "buffer" wheel as the end user wait on the video clip or movie to download. In addition to the irritating choppy voice calls, interruption of videos and movies as they play, and the jerking movement of pictures during video conferencing, these problems are compounded with the narrowband architecture of IP to move the new 4K/5K/8K ultra high definition television signals, studio quality real-time news reporting and real-time 3D Ultra High Definition video/interactive stadium sporting (NFL, NBA, MLB, NHL, soccer, cricket, athletics events, tennis, etc.) environments.

Also, high resolution graphics and corporate mission critical applications suffer the same fate as the services and applications when traversing the Internet TCP/IP network. The deficiencies of IP routing on these very popular applications have resulted in a worldwide Internet that delivers inconsistent service qualities for both consumers and businesses. The existing Internet network can be categorized as a low-quality consumer network that was originally designed for narrow band data and not to carry high capacity voice, video, interactive video conferencing, real-time TV news reporting and streaming video, high capacity mission critical corporate operational data, or high resolution graphics in a dynamic environment. The Internet infrastructure worldwide has evolved from the major industrial nations to small developing countries with a litany of network performance inconsistency and a multiplicity of quality issues.

The hardware and software manufacturers of IP based networks has cobbled together a series of mismatch hardware and technologies over the years as the miniaturizing computing world of devices rapidly migrated to the billions of human masses, resulting in an expeditious immigration of wireless devices to accommodate the great mobility of mankind and their way of interacting with their newly technological experience.

All of the aforementioned dynamics of the technological world, plus the economics of scale and scope that computing processing and memory have afforded; the layering and simplicity of software coding have created the new world of apps that used to be controlled and constricted under Microsoft, whereby literally tens of thousands of these apps are developed every year; and the vast array of consumer computing devices and uses have resulted in the worldwide hunger for bandwidth and speed beyond light range. While this category five (5) tornado-like, consumer technological revolution decimates the worldwide Internet, the Local Exchange Carriers (LECs), Inter-Exchange Carriers (IXCs), International Carriers (ICs), Internet Services Providers (ISPs), Cable Providers, and network hardware manufacturers are scrambling to implement and develop band aid solutions such as Long Term Evolution (LTE) and 5G cell telephone based networks and IP networking hardware, to squelch the 250 miles per hour masses technological tornado.

The current Internet communications networks transport voice, data, and video in TCP/IP packets which are encapsulated in Local Area Network layer two MAC frames and then placed into frame relay or Asynchronous Transfer Mode (ATM) protocol to traverse the wide area network. These series of standard protocols add a tremendous amount of overhead to the original data information. This type of network architecture creates inefficiencies which result in poor network performance of wide bandwidth video and multimedia applications. It is these highly inefficient protocols that dominate the Internet, Inter-Exchange Carriers (IXC), Local Exchange Carriers (LEC), Internet Service Providers (ISP), and Cloud based service provider network architectures and infrastructures. The net effect is an Internet that cannot meet the demands of the voice, video and the new high capacity applications and advancement in 4K/5K/8K ultra high definition TV with high quality performance.

Another problem that affects the distribution of high capacity, wide-bandwidth service is the high cost of running fiber optics cables to the homes. Many technology visionaries have recognized that wide-bandwidth wireless services are the correct solution to replace local access fiber services to the homes. The issue with wireless solutions is that the existing microwave spectrum is congested. Therefore, telecommunications companies and Internet Services Providers (ISPs) have turned they attention to Millimeter Wave (mmW) transmission technologies.

The problem with mmW transmission is the RF signal deterioration over very short distances due to atmospheric conditions. The Wireless LAN IEEE 802.11ad WiGi technology is one attempt to address the bandwidth crunch problem but this technology is limited to the local area of a room or the confines of building and cannot provide communications services over long distances. Therefore, there is a need for a wide-bandwidth mmW transmission solution that extends the RF transmission distances of these frequencies between 30 to 300 GHz and higher frequencies to meet the demands of the voice; video; new high capacity applications; and advancement in 4K/5K/8K ultra high definition TV with high quality performance. Attobahn Millimeter (mmW) Radio Frequency (RF) Architecture provides the mmW transmission technology solution to support the aforementioned services and extend the RF transmission distances of these frequencies between 30 to 3300 GHz.

In the past, others have attempted to address the Internet performance problems by enhancing the TCP/IP, IEEE 802 LAN, ATM and TCP/IP heavily-layered standards and utilizing additional protocols with the adoption of Voice Over IP, video transport, and streaming video using a patch work of protocols such Real Time Protocol (RTP), Real Time Streaming Protocol (RTSP), and Real Time Control Protocol (RTCP) running over IP. Some developers and network architects designed various approaches to address more narrow solutions such as U.S. Pat. No. 5,440,551 discloses a multimedia packet communication system for use with an ATM network wherein connections could be selectively used automatically and dynamically in accordance with qualities required by an application, in which a plurality of communications of different required qualities are involved to set quality classes. However, the use of the ATM standard cell frame format and connection-oriented protocol does not alleviate the issues of the heavily, —layered standard.

Additionally, U.S. Pat. No. 7,376,713 discloses a system, apparatus and method for transmitting data on a private network in blocks of data without using TCP/IP as a protocol by dividing the data into a plurality of packets and use of a MAC header. The data is stored in contiguous sectors of a storage device to ensure that almost every packet will either contain data from a block of sectors or is a receipt acknowledgment of such packet. Again, the use of the variable length data blocks, a MAC header and an acknowledgment receipt through a connection-oriented protocol, even in a dedicated or private network does not fully alleviate the buffering and queuing delays of the IEEE 802 LAN, ATM, and TCP/IP standards and protocols because of the higher layering.

More recently, US Patent Publication No. 2013/0051398 A1 discloses a low-load and high-speed control switching node which does not incorporate a central processing unit (CPU) and is for use with an external control server. The described framing format is limited to two layers to accommodate varying size data packets. However, the use of variable length framing format and the partial use of TCP/IP stack to move the data and matching the MAC addressing schema does not alleviate use of these conventional and heavily-layered protocols in the switching node.

Thus, there remains a need for a high-speed, high capacity network system for wireless transmission of 4K/5K/8K ultra high definition video, studio quality TV, fast movies download, 3D live video streaming virtual reality broadband data, real-time kinetic video games multimedia, real-time 3D Ultra High Definition video/interactive stadium sporting (NFL, NBA, MLB, NHL, soccer, cricket, athletics events, tennis, etc.) environments, high resolution graphics, and corporate mission critical applications.

BRIEF SUMMARY OF THE DISCLOSURE

Disclosed is a Viral Orbital Vehicle access device configured to provide connectivity to a Viral Molecular Network. The Viral Orbital Vehicle access device may include at least one Viral Orbital Vehicle Port configured to receive at least one digital data stream from at least one user device. Further, the Viral Orbital Vehicle access device may include an Instinctive Wise Integrated Circuit (IWIC) communicatively coupled to the at least one Viral Orbital Vehicle Port. Further, the IWIC may be configured to place the at least one digital data stream into a plurality of cell frames. Further, each cell frame of the plurality of cell frames may be characterized by a fixed size. Additionally, the IWIC may be configured to place the plurality of cell frames in a plurality of Orbital Time-Slots (OTS). Further, the IWIC may be configured to form a plurality of Atto-Second Multiplexing (ASM) frames based on the plurality of OTS. Further, the IWIC may be configured to place the plurality of ASM frames in a plurality of Time Division Multiple Access (TDMA) orbital time slots. Further, the Viral Orbital Vehicle access device may include a Radio Frequency (RF) section communicatively coupled to the IWIC. Further, the RF section may be configured to perform wireless transmission and reception using electromagnetic radiation characterized by at least one frequency band in the ultra-high end of the microwave band.

An Instinctive Wise Integrated Circuit (IWIC) to facilitate connectivity to a Viral Molecular Network is disclosed according to some aspects. The IWIC may be configured to receive at least one digital data stream. Further, the IWIC may be configured to place the at least one digital data stream into a plurality of cell frames. Further, each cell frame of the plurality of cell frames may be characterized by a fixed size. Further, the IWIC may be configured to place the plurality of cell frames in a plurality of Orbital Time-Slots (OTS). Further, the IWIC may be configured to form a plurality of Atto-Second Multiplexing (ASM) frames based on the plurality of OTS. Further, the IWIC may be configured to place the plurality of ASM frames in a plurality of Time Division Multiple Access (TDMA) orbital time slots.

A user device configured to establish connectivity to a Viral Molecular Network is also disclosed according to some aspects. Accordingly, the user device includes an Instinctive Wise Integrated Circuit (IWIC) configured to place the at least one digital data stream into a plurality of cell frames. Further, each cell frame of the plurality of cell frames may be characterized by a fixed size. Further, the IWIC may be configured to place the plurality of cell frames in a plurality of Orbital Time-Slots (OTS). Further, the IWIC may be configured to form a plurality of Atto-Second Multiplexing (ASM) frames based on the plurality of OTS. Additionally, the IWIC may be configured to place the plurality of ASM frames in a plurality of Time Division Multiple Access (TDMA) orbital time slots; and a Radio Frequency (RF) section communicatively coupled to the IWIC. Further, the RF section may be configured to perform wireless transmission and reception using electromagnetic radiation characterized by at least one frequency band in the ultra-high end of the microwave band.

The present disclosure is directed to a Viral Molecular Network that is a high speed, high capacity terabits per second (TBps) LONG-RANGE Millimeter Wave (mmW) wireless network that has an adoptive mobile backbone and access levels. The network comprises of a three-tier infrastructure using three types of communications devices, a United States country wide network and an international network utilizing the three communications devices in molecular system connectivity architecture to transport voice, data, video, studio quality and 4K/5K/8K ultra high definition Television (TV) and multimedia information. The network is designed around a molecular architecture that uses the Protonic Switches as nodal systems acting as protonic bodies that attract a minimum of 400 Viral Orbital Vehicle (consists of three devices, V-ROVERs, Nano-ROV- ERs, and Atto-ROVERs) access nodes (inside vehicles, on persons, homes, corporate offices, etc.) to each one of them and then concentrate their high capacity traffic to the third of the three communications devices, the Nucleus Switch which acts as communications hubs in a city. The Nucleus Switches communications devices are connected to each other in an intra and intercity core telecommunication backbone fashion. The underlying network protocol to transport information between the three communications devices [Viral Orbital Vehicle (V-ROVER, Nano-ROVER, and Atto-ROVER) access device, Protonic Switch, and Nucleus Switch) is a cell framing protocol that these devices switch voice, data, and video packetized traffic at ultra-high-speeds in the atto-second Time Division Multiple Access (TDMA) frame. The key to the fast cell-based and atto-second switching and TDMA Orbital Time Slots multiplexing respectively is a specially designed integrated circuit chip called the IWIC (Instinctive Wise Integrated Circuit) that is the primary electronic circuitry in these three devices. The Viral Molecular Network architecture consists of three network tiers that correlates with the three aforementioned communications devices:

The Access Network Layer (ANL) correlates with the Viral Orbital Vehicle access node communications devices, called V-ROVERs, Nano-ROVERs, and Atto-ROVERs.

The Protonic Switching Layer (PSL) that correlates with the Protonic Switch communications device.

The Nucleus Switching Layer (NSL) that correlates with the Nucleus Switch communications device.

The Viral Molecular Network is truly a mobile network, whereby the network infrastructure is actually moving as it transports the data between systems, networks, and end users. The Access Network Layer (ANL) and Protonic Switching Layer (PSL) of the network are being transported (mobile) by vehicles and persons as the network operates. This network differs from cellular telephone networks operated by the carriers, in the sense that the cellular networks are operated from stationary locations (the towers and switching systems are at fixed locations) and it is the end users who are mobile (cell phones, tablets, laptops, etc.) and not the networks. In the case of the Viral Molecular Network, the entire ANL and PSL are mobile because their network devices are in cars, trucks, trains, and on people who are moving, a true mobile network infrastructure. This is clear distinction of the Viral Molecular network.

In one embodiment of the invention, this disclosure relates to the Viral Orbital Vehicle access node that operates at the ANL of the Viral Molecular network.

Access Network Layer

The Viral Orbital Vehicle Architecture (V-ROVERs, Nano-ROVERS, and Atto-ROVERs)

The Access Network Layer (ANL) consists of the Viral Orbital Vehicle (V-ROVERS, Nano-ROVERS, and Atto-ROVERs) that is the touch point of the network for the customer. The V-ROVERs, Nano-ROVERS, and Atto-ROVERs collect the customer information streams in the form of voice; data; and video directly from WiFi and WiGi and WiGi digital streams; HDMI; USB; RJ45; RJ45; and other types of high-speed data and digital interfaces. The received customers' information streams are placed into fix size cell frames (60 bytes payload and 10-byte header) which are then placed in Time Division Multiple Access (TDMA) orbital time-slots (OTS) functioning in the atto-second range. These OTS are interleaved into an ultra-high-speed digital stream operating in the terabits per second (TBps) range. The WiFi and WiGi interface of the Viral Orbital Vehicle (V-ROVERS, Nano-ROVERS, and Atto-ROVERs) is via an 802.11b/g/n antenna.

Viral Orbital Vehicle (V-ROVERs, Nano-ROVERS, and Atto-ROVERs) Atto-Second Multiplexer (ASM)

The Viral Orbital Vehicle (V-ROVERs, Nano-ROVERS, and Atto-ROVERs) is architected with the IWIC chip that basically provides the cell-based framing of all information signal that enters the ports of the device. The cell frames from each port is placed into the orbital time-slots at a very rapid rate and then interleaved in an ultra-high-speed digital stream. The cell frames use a very low overhead frame length and is assigned its designated distant port at the Protonic Switching Node (PSL). The entire process of framing the ports' data digital streams and multiplexing them into TDMA atto-second time-slots is termed Atto-Second Multiplexing (ASM). Viral Orbital Vehicle Ports Interfaces The Viral Orbital Vehicle (V-ROVER, Nano-ROVER, and Atto-ROVER) ports can accept high-speed data streams, ranging from 64 Kbps to 10 GBps from Local Area Network (LAN) interfaces which is not limited to a USB port; and can be a high-definition multimedia interface (HDMI) port; an Ethernet port, a RJ45 modular connector; an IEEE 1394 interface (also known as Fire Wire) and/or a short-range communication ports such as a WiFi and WiGi; Bluetooth; Zigbee; near field communication; or infrared interface that carries TCP/IP packets or data streams from the Viral Molecular Network Application Programmable Interface (AAPI); Voice Over IP (VOIP); or video IP packets.

The Viral Orbital Vehicle (V-ROVERS, Nano-ROVERS, and Atto-ROVERs) is equipped (always port 1) with a WiFi and WiGi capability to accept WiFi and WiGi devices data streams and move their data across the network. The WiFi and WiGi port acts as a hotspot access point for all WiFi and WiGi devices within its range. The WiFi and WiGi input data is converted into cell frames and are passed into the OTS process and subsequently the ASM multiplying scheme.

The Viral Orbital Vehicle (V-ROVERs, Nano-ROVERS, and Atto-ROVERs) does not read any of its port input data stream packet headers (such as IP or MAC addresses), it simply takes the data streams and chop them into the 70-byte cell frames and transports the raw data from its input to the terminating Viral Orbital Vehicle end port that delivers it to the designated terminating network or system. The fact that the Viral Orbital Vehicle does not spent time reading information stream packet header bits or trying to route these data streams based on IP or some other packet framing methodology, means that there is an infinitesimal delay time through the access Viral Orbital Vehicle ASM.

Viral Orbital Vehicle (V-ROVERs, Nano-ROVERS, and Atto-ROVERs) ASM Switching Function The Viral Orbital Vehicle also acts as transit switching device for information (voice, video, and data) that is not designated for one of its ports. The device constantly reads the cell frame header for its port designation addresses. If it does not see any of its Designation address in the ROVER Designation frame headers, then it simply passes on all cells to one of its wide area ports which transit the digital streams to its neighboring Viral Orbital Vehicle. This quick look up arrangement of the ROVER networking technique once again reduces the transit delay times through the devices and subsequently throughout the entire Viral network. These reduced overhead frames and lengths of the overhead frames, combined with the small fixed size cell process and the fixed hard-wired channel/time-slot TDMA ASM multiplexing technique reduces' latency through the devices and increased data speed throughput in the network.

The Viral Orbital Vehicle is always adopted by a primary Protonic Switch at the Protonic Switching Layer in the network molecule that it is located. The Viral Orbital Vehicle selects the closest Protonic Switch as its primary adopter within the minimum five-mile radius. At the same time the VIRAL ORBITAL VEHICLE (V-ROVERs, Nano-ROVERS, and Atto-ROVERs) selects the next nearest Protonic Switch as its secondary adopter, so that if its primary adopter fails it automatically pumps all of its upstream data to its secondary adopter. This process is carried out transparently to all user traffic originating, terminating, or transiting the VIRAL ORBITAL VEHICLE. Thus, there is no disruption to the end user traffic during failures in the network at this layer. Hence this viral adoption and resiliency of the Viral Orbital Vehicle (V-ROVERs, Nano-ROVERS, and Atto-ROVERs) and their Protonic Switch adopters provides a high-performance networking environment.

These design and networking strategies built into the network, starting from its access layer is what makes the Viral Molecular Network the fastest data switching and transport network and separates it from other networks, such as 5G and numerous types common carriers' and corporate networks.

Viral Orbital Vehicle (V-ROVERs, Nano-ROVERS, and Atto-ROVERs) Radio Frequency System The Viral Orbital Vehicle (V-ROVERs, Nano-ROVERS, and Atto-ROVERs) transmission schema is based on high frequency electromagnetic radio signals, operating at the ultra-high end of the microwave band. The frequency band is in the order of 30 to 3300 gigahertz range, at the upper end of the microwave spectrum and into the infrared spectrum. This band allocation is outside of the FCC restricted operating bands, thus allowing the Viral Molecular Network to utilize a wide bandwidth for its terabits digital stream. The RF section of the Viral Orbital Vehicle uses a broadband 64-4096-bit Quadrature Amplitude Modulation (QAM) modulator/demodulator for its Intermediate Frequency (IF) into the RF transmitter/receiver. The power transmission wattage output is high enough for the signal to be receive with a decibel (dB) level that allows the recovered digital stream from the demodulator to be within a Bit Error Rate (BER) range of 1 part that is one bit error in every trillion bits. This ensures that the data throughput is very high over a long-term basis.

The V-ROVER RF section will modulate four (4) digital streams running at 40 giga bits per second (GBbs) each, with a full throughput of 160 GBps. Each of these four digital streams will be modulated with the 64-4096-bit QAM modulator and converted into IF signal which is placed on a RF carrier.

The Nano-ROVER and the Atto-ROVER RF section will modulate two (2) digital streams running at 40 Giga bits per second (GBps) each, with a full throughput of 80 GBps. Each of these two digital streams will be modulated with the 64-4096-bit QAM modulator and converted into IF signal which is placed on a RF carrier Viral Orbital Vehicle (V-ROVERS, Nano-ROVERS, and Atto-ROVERs) Clocking & Synchronization The Viral Orbital Vehicle (V-ROVERs, Nano-ROVERS, and Atto-ROVERS) synchronizes its receive and transmit data digital streams to the national viral molecular network reference atomic oscillator. The reference oscillator is tied to the Global Positioning System as its standard. All of the Viral Orbital Vehicle are configured in a recovered clock formation so that the entire access network is synchronized to the Protonic Switching and Nucleus layers of the network. This will ensure that the bit error rate (BER) of the network at the access level will be in the order of 1 part of 1,000, 000,000,000.

The access device uses the intermediate frequency (IF) signal in the 64-4096-bit QAM modem to recover the digital clocking signal by using its internal Phase Lock Loop (PLL) to control the local oscillator. The phased locked local oscillator then produces several clocking signals which are distributed to the IWIC chip that drives the cell framing formatting and switching; orbital time-slot assignment; and atto-second multiplexing. Also, the network synchronized derived clock signal times in the end users and access systems digital data stream, VOIP voice packets, IP data packets/MAC frames, native AAPI voice and video signals into the Viral Orbital Vehicle's access ports.

End User Application

The end users connected to the Viral Orbital Vehicle (V-ROVERs, Nano-ROVERS, and Atto-ROVERs) will be able to run the following applications:

- INTERNET ACCESS
- VEHICLE ONBOARD DIAGNOSTICS
- VIDEO & MOVIE DOWNLOAD
- NEW MOVIES RELEASE DISTRIBUTION
- ON-NET CELL PHONE CALLS
- LIVE VIDEO/TV DISTRIBUTION
- LIVE VIDEO/TV BROADCAST
- HIGH RESOLUTION GRAPHICS
- MOBILE VIDEO CONFERENCING
- HOST TO HOST
- PRIVATE CORPORATE NETWORK SERVICES
- PERSONAL CLOUD
- PERSONAL SOCIAL MEDIA
- PERSONAL INFO-MAIL
- PERSONAL INFOTAINMENT
- VIRTUAL REALTY DISPLAY INTERFACE AND NETWORK SERVICE
- INTELLIGENT TRANSPORTATION NETWORK SERVICE (ITS)
- AUTONOMOUS VEHICLE NETWORK SERVICES
- LOCATION BASED SERVICES

The Viral Orbital Vehicle-V-ROVERs Access Node comprises of a housing that has:

One (1) to eight (8) physical USB; (HDMI) port; an Ethernet port, a RJ45 modular connector; an IEEE 1394 interface (also known as FireWire) and/or a short-range communication ports such as a Bluetooth; Zigbee; near field communication; WiFi and WiGi; and infrared interface.

These physical ports receive the end user information. The customer information from a computer which can be a laptop, desktop, server, mainframe, or super computer; a tablet via a WiFi or direct cable connection; a cell phone; voice audio system; distribution and broadcast video from a video server; broadcast TV; broadcast radio station stereo audio; Attobahn mobile cell phone calls; news TV studio quality TV systems video signals; 3D sporting events TV cameras signals, 4K/5K/8K ultra high definition TV signals; movies download information signal; in the field real-time TV news reporting video stream; broadcast movie cinema theaters network video signals; a Local Area Network digital stream; game console; virtual reality data; kinetic system data; Internet TCP/IP data; nonstandard data; residential and commercial building security system data; remote control telemetry systems information for remote robotics manufacturing machines devices signals and commands; building management and operations systems data; Internet of Things data streams that includes but not limited to home electronic systems and devices; home appliances management and control signals; factory floor machinery systems performance monitoring, management; and control signals data; personal electronic devices data signals; etc.

After the aforementioned multiplicity of customers' data digital streams traverse the V-ROVERs access node ports interfaces, they are clocked into its Instinctively Wise Integrated Circuit (IWIC) gates by the internal oscillator digital pluses that are synchronized to the phase lock loop (PLL) recovered clock signals which are distributed throughout the device circuitry to time and synchronize all digital data signals. The customer digital streams are then encapsulated into the viral molecular network's formatted 70-byte cell frames. These cell frames are equipped with cell sequencing numbers, source and destination addresses, and switching management control headers consisting of 10 bytes with a cell payload of 60 bytes.

The V-ROVER CPU Cloud Storage & Display Capabilities

The V-ROVER is equipped with a multi-core central processing unit (CPU) for managing the Attobahn distributed viral cloud technology; unit display and touch screen functions; network management (SNMP); and system performance monitoring.

The Viral Orbital Vehicle—Nano-ROVERs Access Node comprises of a housing that has:

One (1) to four (4) physical USB; (HDMI) port; an Ethernet port, a RJ45 modular connector; an IEEE 1394 interface (also known as FireWire) and/or a short-range communication ports such as a Bluetooth; Zigbee; near field communication; WiFi and WiGi; and infrared interface. These physical ports receive the end user information.

The customer information from a computer which can be a laptop, desktop, server, mainframe, or super computer; a tablet via a WiFi or direct cable connection; a cell phone; voice audio system; distribution and broadcast video from a video server; broadcast TV; broadcast radio station stereo audio; Attobahn mobile cell phone calls; news TV studio quality TV systems video signals; 3D sporting events TV cameras signals, 4K/5K/8K ultra high definition TV signals; movies download information signal; in the field real-time TV news reporting video stream; broadcast movie cinema theaters network video signals; a Local Area Network digital stream; game console; virtual reality data; kinetic system data; Internet TCP/IP data; nonstandard data; residential and commercial building security system data; remote control telemetry systems information for remote robotics manufacturing machines devices signals and commands; building management and operations systems data; Internet of Things data streams that includes but not limited to home electronic systems and devices; home appliances management and control signals; factory floor machinery systems performance monitoring, management; and control signals data; personal electronic devices data signals; etc.

After the aforementioned multiplicity of customers' data digital streams traverse the Nano-ROVERs access node ports interfaces, they are clocked into its Instinctively Wise Integrated Circuit (IWIC) gates by the internal oscillator digital pluses that are synchronized to the phase lock loop (PLL) recovered clock signals which are distributed throughout the device circuitry to time and synchronize all digital data signals. The customer digital streams are then encapsulated into the viral molecular network's formatted 70-byte cell frames. These cell frames are equipped with cell sequencing numbers, source and destination addresses, and switching management control headers consisting of 10-byte with a cell payload of 60 bytes.

The Nano-ROVER CPU Cloud Storage & Display Capabilities

The Nano-ROVER is equipped with a multi-core central processing unit (CPU) for managing the Attobahn distributed viral cloud technology; unit display and touch screen functions; network management (SNMP); and system performance monitoring.

The Viral Orbital Vehicle—Atto-ROVERs Access Node comprises of a housing that has:

Atto-ROVER: Has one (1) to four (4) physical USB; (HDMI) port; an Ethernet port, a RJ45 modular connector; an IEEE 1394 interface (also known as FireWire) and/or a short-range communication ports such as a Bluetooth; Zigbee; near field communication; WiFi and WiGi; and infrared interface. These physical ports receive the end user information.

The customer information from a computer which can be a laptop, desktop, server, mainframe, or super computer; a tablet via a WiFi or direct cable connection; a cell phone; voice audio system; distributive video from a video server; broadcast TV; broadcast radio station stereo audio; Attobahn mobile cell phone calls; news TV studio quality TV systems video signals; 3D sporting events TV cameras signals, 4K/5K/8K ultra high definition TV signals; movies download information signal; in the field real-time TV news reporting video stream; broadcast movie cinema theaters network video signals; a Local Area Network digital stream; game console; virtual reality data; kinetic system data; Internet TCP/IP data; nonstandard data; residential and commercial building security system data; remote control telemetry systems information for remote robotics manufacturing machines devices signals and commands; building management and operations systems data; Internet of Things data streams that includes but not limited to home electronic systems and devices; home appliances management and control signals; factory floor machinery systems performance monitoring, management; and control signals data; personal electronic devices data signals; etc.

After the aforementioned multiplicity of customers' data digital streams traverse the Nano-ROVERs access node ports interfaces, they are clocked into its Instinctively Wise Integrated Circuit (IWIC) gates by the internal oscillator digital pluses that are synchronized to the phase lock loop (PLL) recovered clock signals which are distributed throughout the device circuitry to time and synchronize all digital data signals. The customer digital streams are then encapsulated into the viral molecular network's formatted 70-byte cell frames. These cell frames are equipped with cell sequencing numbers, source and destination addresses, and switching management control headers consisting of 10 bytes with a cell payload of 60 bytes. The Atto-ROVER CPU Cloud Storage & Display Capabilities The Atto-ROVER is equipped with a multi-core central processing unit (CPU) for managing the P2 Technology (P2=Personal & Private) that consists of:

PERSONAL CLOUD storage
PERSONAL CLOUD APP
PERSONAL SOCIAL MEDIA storage
PERSONAL SOCIAL MEDIA APP
PERSONAL INFO-MAIL storage
PERSONAL INFO-MAIL APP
PERSONAL INFOTAINMENT storage
PERSONAL INFOTAINMENT APP
VIRTUAL REALTY INTERFACE
GAMES APP The Atto-ROVER CPU is also responsible for processing users' requests and information to the cloud technology; unit display and touch screen functions; stereo audio control, camera functions; network management (SNMP); and system performance monitoring.

Instinctively Wise Integrated Circuit (IWIC)—V-ROVER

The V-ROVERs access node device housing embodiment includes the function of placing the 70-byte cell frames into the Viral molecular network into the IWIC. The IWIC is the cell switching fabric of the Viral Orbital Vehicle (V-ROVERs, Nano-ROVERS, and Atto-ROVERs). This chip operates in the terahertz frequency rates and it takes the cell frames that encapsulates the customer's digital stream information and place them onto the high-speed switching buss. The V-ROVERs access node has four parallel high-speed switching busses. Each bus runs at 2 terabits per second (TBps) and the four parallel busses move the customer digital stream encapsulated in the cell frames at combined digital speed of 8 Terabits per second (TBps). The cell switch provides 8 TBps switching throughput between its customers connected ports and the data streams that transit the Viral Orbital Vehicle.

Instinctively Wise Integrated Circuit (IWIC)—Nano-ROVER & Atto-ROVER

The Nano-ROVERs and Atto-ROVERs access node devices housing embodiment include the function of placing the 70-byte cell frames into the Viral molecular network into the IWIC. The IWIC is the cell switching fabric of the Viral Orbital Vehicle (V-ROVERs, Nano-ROVERS, and Atto-ROVERs). This chip operates in the terahertz frequency rates and it takes the cell frames that encapsulates the customer's digital stream information and place them onto the high-speed switching buss. The Nano-ROVERs and Atto-ROVERs access node have two (2) parallel high-speed switching busses. Each bus runs at 2 terabits per second (TBps) and the two (2) parallel busses move the customer digital stream encapsulated in the cell frames at combined digital speed of 4 Terabits per second (TBps). The cell switch provides 4 TBps switching throughput between its customers connected ports and the data streams that transit the Nano-ROVERs and Atto-ROVERs. TDMA Atto Second Multiplexing (ASM)—V-ROVER The V-ROVERs housing has an Atto Second Multiplexing (ASM) circuitry that uses the IWIC chip to place the switched cell frames into orbital time slots (OTS) across four (4) digital stream running at 40 Gigabits per second (GBps) each, providing an aggregate data rate of 160 GBps. The ASM takes cell frames from the high-speed busses of the cell switch and places them into orbital time slots of 0.25 micro second period, accommodating 10,000 bits per orbital time slot (OTS). Ten of these orbital time slots makes one of the Atto Second Multiplexing (ASM) frames, therefore each ASM frame has 100,000 bits every 2.5 micro second. There are 400,000 ASM frames every second in each 40 GBps digital stream. Each of the four 400,000 ASM frames digital stream are placed into Time Division Multiple Access (TDMA) orbital time slots. The TDMA ASM moves 160 GBps via 4 digital streams to the intermediate frequency (IF) 64-4096-bit QAM modems of the radio frequency section of the V-ROVER.

In this embodiment, the Viral Orbital Vehicle has a radio frequency (RF) section that consist of a quad intermediate frequency (IF) modem and RF transmitter/receiver with four (4) RF signals. The IF modem is a 64-4096-bit QAM that takes the four individual 40 GBps digital streams from the TDMA ASM and modulate them into an IF gigahertz frequency which is then mixed with one of the four (4) RF carriers. The RF carriers is in the 30 to 3300 Gigahertz (GHz) range. TDMA Atto Second Multiplexing (ASM)—Nano-ROVER & Atto-ROVER The Nano-ROVER and Atto-ROVER housing have an Atto Second Multiplexing (ASM) circuitry that uses the IWIC chip to place the switched cell frames into orbital time slots (OTS) across two (2) digital stream running at 40 Gigabits per second (GBps) each, providing an aggregate data rate of 80 GBps. The TDMA ASM takes cell frames from the high-speed busses of the cell switch and places them into orbital time slots of 0.25 micro second period, accommodating 10,000 bits per orbital time slot (OTS). Ten of these orbital time slots makes one of the Atto Second Multiplexing (ASM) frames, therefore each ASM frame has 100,000 bits every 2.5 micro second. There are 400,000 ASM frames every second in each 40 GBps digital stream. Each of the two 400,000 ASM frames digital stream are placed into Time Division Multiple Access (TDMA) orbital time slots. The TDMA ASM moves 80 GBps via 2 digital streams to the intermediate frequency (IF) 64-4096-bit QAM modems of the radio frequency section of the Nano-ROVER and Atto-ROVER.

In this embodiment, the Viral Orbital Vehicle has a radio frequency (RF) section that consist of a dual intermediate frequency (IF) modem and RF transmitter/receiver with two (2) RF signals. The IF modem is a 64-4096-bit QAM that takes the two (2) individual 40 GBps digital streams from the ASM and modulate them into an IF gigahertz frequency which is then mixed with one of the two (2) RF carriers. The RF carriers is in the 30 to 3300 Gigahertz (GHz) range.

The Viral Orbital Vehicle (V-ROVERs, Nano-ROVERS, and Atto-ROVERs) housing has an oscillator circuitry that generates the digital clocking signals for all of the circuitry that needs digital clocking signals to time their operation. These circuitries are the port interface drivers, high-speed busses, ASM, IF modem and RF equipment. The oscillator is synchronized to the Global Positioning System (GPS) by recovering the clocking signal from the received digital streams of the Protonic Switches which are reference to Attobahn central clocks atomic oscillators that will be located in North America (NA—USA), Asia Pacific (ASPAC Australia), Europe Middle East & Africa (EMEA—London), and Caribbean Central & South America (CCSA—Brazil).

3). Each of Attobahn's atomic clock has a stability of 1 part in 100 trillion bits. These atomic clocks are reference to the GPS to ensure global clock synchronization and stability of Attobahn network worldwide. The viral orbital vehicle's oscillator has a phase lock loop circuitry that uses the recovered clock signal from the received digital stream and control the stability of the oscillator output digital signal.

The second embodiment of the invention in this disclosure is the Protonic Switch communications device that comprises of the Protonic Switching Layer of the Viral Molecular Network.

Protonic Switching Layer

PSL Configuration

The Protonic Switching Layer (PSL) of the viral molecular network is the first stage of the network that congregate the virally acquired viral orbital vehicle high-speed cell frames and expeditiously switch them to destination port on a viral orbital vehicle or the Internet via the Nucleus Switch. This switching layer is dedicated to only switching the cell frames between viral orbital vehicles and Nucleus Switches. The switching fabric of the PSL is the work-horse of the viral molecular network. These switches do not examine any underlying protocol such as TCP/IP, MAC frames, or any standard or protocol or even any native digital stream that have been converted into the viral cell frames.

The Protonic Switch is positioned, installed, and placed in: homes; cafes such as Starbucks, Panera Bread, etc.; vehicles (cars, trucks, RVs, etc.); school classrooms and communications closets; a person's pocket or pocket books; corporate offices communications rooms, workers' desktops; aerial drones or balloons; data centers, cloud computing locations, Common Carriers, ISPs, news TV broadcast stations; etc.

PSL Switching Fabric

The PSL switching fabric consists of a core cell switching node surrounded by 16 TDMA ASM multiplexers running four individual 64-4096-bit Quadrature Amplitude Modulator/Demodulator (64-4096-bit QAM) modems and associated RF system. The Four ASM/QAM Modems/RF systems drives a total bandwidth of 16×40 GBps to 16×1 TBps digital steams, adding up to a high capacity digital switching system with an enormous bandwidth of 0.64 Terabits per second (0.64 TBps) or 640,000,000,000 bits per second to 16 TBps.

PSL Switching Performance

The core of the cell switching fabric consists of several high-speed busses that accommodate the passage of the data from the ASM orbital time-slots and place them in the queue to read the cell frames destination identifiers by the cell processor. The cells that came in from the viral orbital vehicles are automatically switched to the time-slots that are connected to the Nucleus Switching hubs at the central switching nodes in the core backbone network. This arrangement of not looking up routing tables for the viral orbital vehicle cells that transit the Protonic Switches radically reduces latency through the protonic nodes. This helps to improve the overall network performance and increases data throughput across the infrastructure.

PSL Switching Hierarchy

The hierarchical design of the network whereby the viral orbital vehicles do communicate only with each other and the Protonic nodes simplifies the network switching processes and allows a simply algorithm to accommodate the switching between Viral Orbital Vehicles (V-ROVERs, Nano-ROVERS, and Atto-ROVERs) and between the Protonic nodes and their acquired orbiting Viral Orbital Vehicles (V-ROVERs, Nano-ROVERS, and Atto-ROVERs). The Hierarchical design also allows the Protonic nodes to switch cells only between the viral orbital vehicles and the Nucleus Switching nodes. Protonic nodes do not switch cells between each other. The switching tables in the Protonic nodes memory only carries their acquired viral orbital vehicles designation ports that keeps tracks of these viral orbital vehicles orbital status, when they are on and acquired by the node. The Protonic node reads the incoming cells from the Nucleus nodes, looks up the atomic cells routing tables, and then insert them into the Time Division Multiple Access (TDMA) orbital time-slots in the ASM that is connected to that designation Viral Orbital Vehicle (V-ROVERS, Nano-ROVERS, and Atto-ROVERs) where the cell terminates.

Protonic Switching Layer Resiliency

The network is architected at the PSL to allow viral behavior of the viral orbital vehicles not just when they are being adopted by a Protonic Switch but also when they lose that adoption due to a failure of a protonic switch. When a protonic switch is turned off or its battery dies, or a component fails in the device, all of the viral orbital vehicles that were orbiting that switch as they primary adopter are automatically adopted to their secondary Protonic Switch. The orbital viral vehicles traffic is switched to their new adopter instantaneously and the service continues to function normally. Any loss of data during the ultra-fast adoption transition of the viral orbital vehicles between the failed primary Protonic Switch and the secondary Protonic Switch is compensated at the end user terminating host or digital buffers in the case of native voice or video signals.

The Viral Orbital Vehicles (V-ROVERs, Nano-ROVERS, and Atto-ROVERs) play a critical role along with the Protonic Switches is network recover due failures. The Viral Orbital Vehicles (V-ROVERS, Nano-ROVERS, and Atto-ROVERs) immediately recognize when its primary adopter fails or go offline and instantaneously switches all upstream and transitory data that using its primary adopter route to its secondary adopter other links. The viral orbital vehicles that lost their primary adopter now makes their secondary adopter their primary adopter. These newly adopted viral orbital vehicles then seek out a new secondary adopting Protonic Switch within their operating network molecule. This arrangement stays in place until another failure occurs to their primary adopter, then the same viral adoption process is initiated again.

Protonic Node Local Viral Orbital Vehicles (V-ROVER Only)

Each Protonic Switching node is equipped with a Viral Orbital Vehicle (V-ROVER Only) 200 for collecting local end user traffic so that the vehicle housing these switches are also given network access at this point. The locally attached Viral Orbital Vehicle (V-ROVER Only) is hard wired to one of the Protonic Switch's ASMs via a USB port. This is the only originating and terminating port that the PSL layer accommodates. All other PSL ports are purely transition port, that is, ports that transit traffic between the Access Network Layer [Viral Orbital Vehicles (V-ROVERs, Nano-ROVERS, and Atto-ROVERs)] and the Nucleus Switching Layer (Core Energetic Layer).

The local Viral Orbital Vehicles (V-ROVER Only) has a secondary radio frequency (RF) port that also connects it to the network molecule that it is located. This viral orbital vehicle uses the local hard wired connected Protonic Switch (its closest) as its primary adopter and the secondary adopter connected to its RF port as its secondary adopter. If the local Protonic Switch fails, then the local Viral Orbital Vehicle (V-ROVER Only) goes into the resilient adoption and network recovery process.

Protonic Switch Port Interfaces

The Protonic Switches are equipped with a minimum of eight (8) external port interface for the local viral orbital vehicles (V-ROVER only) device end users' connection. This internal V-ROVER runs at 40 GBps and transfers its data from the viral orbital vehicles to the molecular network. The other interfaces of the switch are at the RF level running at 16×40 GBps to 16×1 TBps across four 30-3300 GHz signals. This switch is basically self-contained and has digital signal movement across its ultra-high terabits per second bus that connects its switching fabric, TDMA ASMs, and 64-4096-bit QAM modulators.

Protonic Switch Clocking & Synchronization

The PSL is synchronized to the NSL and ANL systems using recovery-looped back clocking schema to the higher level standard oscillator. The standard oscillator is referenced to the GPS service worldwide, allowing clock stability. This high level of clocking stability when distributed to the PSL level via the NSL system and radio links gives a clocking and synchronization stability.

The PSL nodes are all set for recovered clock from the Intermediate Frequency at the demodulator. The recovered clock signal controls the internal oscillator and reference its output digital signal which then drives the high-speed buss, ASM gates and IWIC chip. This makes sure that all digital signals that are being switched and interleaved in the orbital time-slots of the ASM are precisely synchronized and thus reducing bit errors rate.

The Protonic switch is the second communications device of the Viral Molecular network and it has a housing that is equipped with a cell framing high-speed switch. The Protonic Switch includes the function of placing the 70-byte cell frames into the Viral molecular network application specific integrated circuit (ASIC) called the IWIC which stands for Instinctively Wise Integrated Circuit. The IWIC is the cell switching fabric of the Viral Orbital Vehicle, Protonic Switch, and Nucleus Switch.

This chip operates in the terahertz frequency rates and it takes the cell frames that encapsulates the customers digital stream information and place them onto the high-speed switching buss. The Protonic Switch has sixteen (16) parallel high-speed switching busses. Each bus runs at 2 terabits per second (TBps) and the sixteen parallel busses move the customer digital stream encapsulated in the cell frames at combined digital speed of 32 Terabits per second (TBps). The cell switch provides a 32 TBps switching throughput between its Viral Orbital Vehicle (ROVERs) connected to it and the Nucleus Switches.

The Protonic Switch housing has an Atto Second Multiplexing (ASM) circuitry that uses the IWIC chip to place the switched cell frames into Time Division Multiple Access (TDMA) orbital time slots (OTS) across sixteen digital streams running at 40 Gigabits per second (GBps) to 1 Tera Bits per second each, providing an aggregate data rate of 640 GBps to 16 TBps. The ASM takes cell frames from the high-speed busses of the cell switch and places them into orbital time slots of 0.25 micro second period, accommodating 10,000 bits per time slot (OTS).

Ten of these orbital time slots makes one of the Atto Second Multiplexing (ASM) frames, therefore each ASM frame has 100,000 bits every 2.5 micro second. There are 400,000 ASM frames every second in each 40 GBps digital stream. Each of the sixteen 400,000 ASM frames digital stream are placed into Time Division Multiple Access (TDMA) orbital time slots. The TDMA ASM moves 640 GBps to 16 TBps via 16 digital streams to the intermediate frequency (IF) 64-4096-bit QAM modems of the radio frequency section of the Protonic Switch.

In this embodiment, the Protonic Switch has a radio frequency (RF) section that consist of four (4) quad intermediate frequency (IF) modems and RF transmitter/receiver with 16 RF signals. The IF modem is a 64-4096-bit QAM modulator that takes the 16 individual 40 GBps to 16 TBps digital streams from the TDMA ASM, modulate them into an IF gigahertz frequency which is then mixed with one of the 16 RF carriers. The RF carriers is in the 30 to 3300 Gigahertz (GHz) range.

The Protonic Switch housing has an oscillator circuitry that generates the digital clocking signals for all of the circuitry that needs digital clocking signals to time their operation. These circuitries are the port interface drivers, high-speed busses, ASM, IF modem and RF equipment. The oscillator is synchronized to the Global Positioning System by recovering the clocking signal from the received digital streams of the Protonic Switches. The oscillator has a phase lock loop circuitry that uses the recovered clock signal from the received digital stream and control the stability of the oscillator output digital signal.

The Third embodiment of the invention in this disclosure is the Nucleus Switch communications device that comprises of the Nucleus Switching Layer of the Viral Molecular Network.

Nucleus Switching Layer

Core Energetic Backbone Network

The high capacity backbone of viral molecular network is the Nucleus Switching Layer that consists of the terabits per second TDMA ASMs, cell-based ultra, high-speed switching fabrics, and broadband fiber optics SONET based intra and inter city facilities. This section of the network is the primary interface into the Internet, public local exchange and inter exchange common carriers, international carriers, corporate networks, ISPs, Over The Top (OTT), content providers (TV, news, movies, etc.), and government agencies (nonmilitary).

The Nucleus Switches RE front end by TDMA ASMs which are connected to the Protonic Switches via RF signals. The hub TDMA ASMs acts as intermediary switches between the PSL and the core backbone switches. These TDMA ASMs are equipped with a switching fabric that functions as a shield for the Nucleus Switches in keeping local intra city traffic from accessing them in order to eliminate inefficiencies, of using the Nucleus Switches to switch non-core backbone network traffic.

This arrangement keeps local transitory traffic between the viral orbital vehicle nodes, the Protonic Switches, and the hub TDMA ASMs within the local ANL and PSL levels. The hub ASMs selects all traffic that are designated for the Internet, other cities outside the local area, host to host high-speed data traffic, private corporate network information, native voice and video signals that are destined to specific end users' systems, video and movie download request to content providers, on-net cell phone calls, 10 gigabit Ethernet LAN services, etc. FIG. 43 shows the ASM switching controls that keeps local traffic within the local Molecule Networks domains.

The Nucleus Switch device housing embodiment includes the function of placing the 70-byte cell frames into the viral molecular network application specific integrated circuit (ASIC), called the IWIC which stands for Instinctively Wise Integrated Circuit. The IWIC is the cell switching fabric of the Viral Orbital Vehicle (V-ROVER, Nano-ROVER, and Atto-ROVER), Protonic Switch, and Nucleus Switch. This chip operates in the terahertz frequency rates and it takes the cell frames that encapsulates the customers digital stream information and place them onto the high-speed switching buss. The Nucleus Switch has from 100 to 1000 parallel high-speed switching busses depending on the amount of Nucleus Switches that are implemented at the Nucleus hub location.

The Nucleus Switches are designed to be stacked together by inter connecting up to a maximum of 10 of them via their fiber optics ports to form a contiguous matrix of Nucleus Switches providing a maximum 1000 parallel busses×2 terabits per second (TBps) per buss. Each bus runs at 2 TBps and the 1000 stacked parallel busses move the customer digital stream encapsulated in the cell frames at combined digital speed of 2000 Terabits per second (TBps). The 10 stacked cell switch provides a 2000 TBps switching throughput between its connected Proton Switches; other viral molecular network intra city, intercity, and international Nucleus hub location; high capacity corporate customers systems; Internet Service Providers; Inter-Exchange Carriers, Local Exchange Carriers; cloud computing systems; TV studio broadcast customers; 3D TV sporting event stadiums; movies streaming companies; real time movie distribution to cinemas; large content providers, etc.

The Nucleus Switch housing has an TDMA Atto Second Multiplexing (ASM) circuitry that uses the IWIC chip to place the switched cell frames into orbital time slots (OTS) across 100 digital streams running at 40 Gigabits per second (GBps) to 1 TBps each, providing an aggregate data rate of 4 TBps to 200 TBps. The ASM takes cell frames from the high-speed busses of the cell switch and places them into orbital time slots of 0.25 micro second period, accommodating 10,000 bits per time slot (OTS). Ten of these orbital time slots makes one of the Atto Second Multiplexing (ASM) frames, therefore each ASM frame has 100,000 bits every 2.5 micro second. There are 400,000 ASM frames every second in each 40 GBps digital stream. The TDMA ASM moves 4 TBps to 200 TBps via 100 digital streams to the intermediate frequency (IF) modem of the radio frequency section of the Nucleus Switch.

The Nucleus housing includes fiber optic ports running at 39.8 to 768 GBps to connect to other Viral molecular network intra city, intercity, and international Nucleus hub locations; high capacity corporate customers' systems; Internet Service Providers (ISP); Inter-Exchange Carriers, Local Exchange Carriers; cloud computing systems; TV studio broadcast customers; 3D TV sporting event stadiums; movies streaming companies; real time movie distribution to cinemas; large content providers, etc.

Core Backbone Network Switching Hierarchy

Attobahn backbone network consists of Nucleus Switches connecting the major NFL cities (Table 1.0) at the high capacity bandwidth tertiary level and the integrate the secondary layer of the core backbone network in smaller cities. The International backbone layer connects the major international cities listed under Table 2.0.

TABLE-US-00001 TABLE 1.0 PHASE I NUCLEUS City STATE ASMs SWITCH FIBER/RF 1. Atlanta Georgia 28 14 OC-768/YES 2. Baltimore Maryland 6 3 OC-768/YES 3. Boston Massachusetts 6 3 OC-768/YES 4. Buffalo New York 3 2 OC-768/YES 5. Charlotte North Carolina 10 5 OC-768/YES 6. Chicago Illinois 40 20 OC-768/YES 7. Cincinnati Ohio 6 3 OC-768/YES 8. Cleveland Ohio 7 4 OC-768/YES 9. Dallas Texas 30 15 OC-768/YES 10. Denver Colorado 22 11 OC-768/YES 11. Detroit Michigan 24 12 OC-768/YES 12. Green Bay Wisconsin 10 5 OC-768/YES 13. Houston Texas 30 15 OC-768/YES 14. Indianapolis Indiana 8 4 OC-768/YES 15. Jacksonville Florida 8 4 OC-768/YES 16. Los Angeles California 55 28 OC-768/YES 17. Miami Florida 25 12 OC-768/YES 18. Minneapolis Minnesota 14 7 OC-768/YES 19. Nashville Tennessee 14 7 OC-768/YES 20. New Orleans Louisiana 15 8 OC-768/YES 21. New York New York 70 35 OC-768/YES 22. Oakland California 14 7 OC-768/YES 23. Philadelphia Pennsylvania 34 17 OC-768/YES 24. Phoenix Arizona 22 11 OC-768/YES 25. Pittsburgh Pennsylvania 24 12 OC-768/YES 26. St Louis Missouri 22 11 OC-768/YES 27. San Diego California 25 13 OC-768/YES 28. San Francisco California 27 14 29. Seattle Washington 22 11 OC-768/YES 30. Tampa Florida 20 10 OC-768/YES 31. Washington DC 29 14 OC-768/YES TABLE-US-00002 TABLE 2.0 INTERNATIONAL HUBS PHASE I NUCLEUS CITY COUNTRY ASM SWITCH FIBER/RF New York United States 26 13 OC-192/YES Washington "18 9 OC-192/YES Atlanta" 18 9 OC-192/YES Miami "18 9 OC-192/YES San Francisco" 14 7 OC-192/YE5 Los Angeles "20 10 OC-192/YES Hawaii" 20 10 OC-192/YES PHASE II 8. London United Kingdom 26 13 OC-192/YES 9. Paris France 18 9 OC-192/YES 10. Tokyo Japan 14 7 OC-192/YES 11. Melbourne Australia 20 10 OC-192/YES 12. Sydney "20 10 OC-192/YES PHASE III 13. Beijing China 20 10 OC-192/YES 14. Hong Kong China 20 10 OC-192/YES 15. Mumbai India 14 7 OC-48/YES 16. Tel Aviv Israel 14 7 OC-48/YES 17. Lagos Nigeria 10 5 OC-12/YES 18. Cape Town South Africa 10 5 OC-12/YES 19. Johannesburg" 8 4 OC-12/YES 20. Addis Ababa Ethiopia 6 3 OC-3/YES 21. Djibouti City Djibouti 10 5 OC-12/YES PHASE IV 22. San Paulo, Brazil 14 7 OC-48/YES 23. Rio De Janeiro, Brazil 14 7 OC-48/YES 24. Buenos Aires, Argentina 14 7 OC-48/YES 25. Caracas, Venezuela 14 7 OC-48/YES The Viral Molecular North America backbone network as illustrated in FIG. 44.0, initially consists of the following major cities network hubs that are equipped with core Nucleus Switches are Boston, New York, Philadelphia, Washington DC, Atlanta, Miami, Chicago, St. Louis, Dallas, Phoenix, Los Angeles, San Francisco, Seattle, Montreal, and Toronto. The facilities between these hubs are multiple fiber optic SONET OC-768 circuits terminating on the Nucleus switches. These locations are based on their metropolitan concentration of people; with New York city metro totaling some 19,000,000; Los Angeles having over 13,000,000; Chicago with 9,555,000; Dallas and Houston each with over 6,700,000; Washington DC, Miami, and Atlanta metros each boasting more than 5,500,000; etc.

North America Backbone Network Self-Healing Ring

The network is designed with self-healing rings between the key hubs cities as displayed in FIG. 45. The rings allow the Nucleus Switches to automatically reroute traffic when a fiber optic facility fails. The switches recognize the loss of the facility digital signal after a few micro-seconds and immediately goes into service recovery process and switch all of the traffic that was being sent to the failed facility to the other routes and distribute the traffic across those routes depending on their original destination.

For example, if multiple OC-768 SONET fiber facilities between San Francisco and Seattle fails, the Nucleus Switches between these two locations immediately recognizes this failed condition and take corrective action. The Seattle switches start rerouting the traffic destined for San Francisco location and transitory traffic through the Chicago and St. Louis switches and back to San Francisco.

The same series of actions and network self-healing processes are initiated when failures occur between Chicago and Montreal, with the switches pumping the recovered traffic destined for Chicago through Toronto and New York and back to Chicago. A similar set of actions will be taken by the switches between Washington DC and Atlanta to recover the traffic lost between these two locations by switching them through Chicago and St. Louis. All of these actions are executed instantaneously without the knowledge of end users and without any impact on their services. The speed at which this rerouting takes place at is faster than the end systems can respond to the failure of the fiber facilities.

The natural respond by most end systems such as TCP/IP devices is to retransmit any small amount of loss data and most digital voice and video systems' line buffering will compensate for the momentary loss of data stream.

This self-healing capability of the network keeps its operational performance in the 99.9 percentile. All of these performance and self-correcting activities of the network is captured by the network management system and the Global Network Control Centers (GNCCs) personnel.

Global Backbone Network
Global Core Backbone Network

The six selected major switching hub cities (New York, Washington DC, Atlanta, Miami, San Francisco, and Los Angeles) provide the high capacity data transport across North America and transit traffic to the core hubs in London, U K and Paris, France (hubs for EMEA region—Europe, Middle-East, and Africa): Tokyo, Japan; Beijing and Hong Kong China; Melbourne and Sydney, Australia, Mumbai, India; and Tel Aviv, Israel (hubs for ASPAC region-Asia Pacific); and Caracas, Venezuela; Rio De Janeiro and San Paulo, Brazil; and Buenos Aires, Argentina (hubs for CCSA region—Caribbean, Central & South America). FIG. 19 shows the global core backbone network.

The other international network locations include Lagos, Nigeria; Cape Town and Johannesburg, South Africa; Addis Ababa, Ethiopia; Djibouti City, Djibouti. All of the international switching hubs use the Nucleus switches front end by the ASM high capacity multiplexers. Theses switches are multiplexers are integrated with the local in-country switches and multiplexers. The global and national backbone networks work as a harmonious homogeneous infrastructure. This means that all of the neighboring switches know the operational status of each other and react to the environment in terms of efficient switching and instantaneous recovery when a network failure occurs.

Global Traffic Switching Management

The switches routing and mapping systems are configured to manage the network traffic on a national and international level based on cost factors and bandwidth distribution efficiency. The global core backbone network is divided into molecular domains on a national level which feeds into the tertiary global layer of the network as depicted in FIG. 41.

The entire traffic management process on a global scale is self-manage by the switches at the Access Network Layer (ANL), Protonic Switching Layer (PSL), Nucleus Switching Layer (NSL), and the International Switching Layer (ISL).

Access Network Layer Traffic Management

At the ANL level the viral orbital vehicles determine which traffic is transiting its node and switch it to one of its four neighboring viral orbital vehicles (V-ROVER, Nano-ROVER depending on the cell frame destination node. At the ANL level, all of the traffic traversing between the viral orbital vehicles are being terminated on one of the viral orbital vehicles in that atomic domain. The Protonic Switch that acts as a gate keeper for the atomic domain that its presides over. Therefore, once traffic is moving within the ANL, it is either on its way from its source Viral Orbital Vehicle to its presiding Protonic Switch, that had already adopted it as its primary adopter; or it is being transit toward its destination viral orbital vehicle. Hence, all of the traffic in an atomic domain is for that domain in the form of leaving its viral orbital vehicle on its way to the Protonic Switch to go toward the Nucleus Switch and then sent to the Internet, a corporate host, native video or on-net voice/calls, movie download, etc. or being transit to be terminated on one of the viral orbital vehicles in the domain. This traffic management makes sure that traffic for other atomic domains are not using bandwidth and switching resources in another domain, thus achieving bandwidth efficiency within the ANL.

Protonic Switching Layer Traffic Management

The Protonic Switches has the presiding responsibility of managing the traffic in its atomic molecular domain and blocking all traffic destined to another atomic molecular domain from entering its locally attached domain. Also, the Protonic Switch has the responsibility of switching all traffic to the hub TDMA ASMs. The Protonic Switches read the cell frames header and directs the cells to the ASMs for inter atomic molecular domains traffic; intra city or inter city traffic; national or international traffic. The Protonic Switches do not have to separate the traffic groups, instead it simply looks for its atomic domain traffic on the outbound and inbound traffic. If the inbound traffic cell frame header does not have its atomic domain header, it blocks it from entering its atomic domain and switch it back to its hub ASM switch. All outbound traffic from the viral orbital vehicles are switched by the Protonic Switch directly to its presiding hub ASM switch. This switching and traffic management design of the Protonic Switches minimizes the amount of switching management that they do, thus speeding up switching and reducing traffic latency through the switches.

Nucleus & Hub ASMs Switching/Traffic Management

The hub TDMA ASMs directs all traffic from the PSL level to other atomic domains within the molecular domain that it oversees. In addition, the hub ASMs switch the traffic that is destined for other ASMs' molecular domains or send the traffic to the Nucleus Switches. Therefore, the hub ASMs manage all intra city traffic between molecular domains.

These TDMA ASMs block all local traffic from entering the Nucleus Switch and the national network. The ASMs read the cell frames headers to determine the destination of the traffic and switch all traffic destined for another city or internationally to the Nucleus Switch. This arrangement keeps all local traffic from entering the national or international core backbone.

The Nucleus Switches are strategically located at the major cities around the world. These switches are responsible for managing traffic between the cities within a national network. The switches read the cell frames headers and route the traffic to their peers within the national networks and between the International Switches. These switches insure that domestic traffic are kept out of the international core backbone which eliminate national traffic from using expensive international facilities, reduces network latency, increase bandwidth utilization efficiency.

International Traffic Management

The International Switches preside over the traffic passed to it from the national networks destined to our countries as shown in FIG. 18. These switches only focus on cells that the national switches pass to them and do not get involved with national traffic distribution. International Switches examines the cell frames headers and determines which country the cells are destined and switch them to correct international node and associated Sonet facility.

Several International Switches function as global gateway switches that interface each of the four global regions: The global gateway switches in the US in San Francisco and Los Angeles function as the North America (NA) regional hubs connecting the ASPAC region at Sydney, Australia and Tokyo, Japan. The four gateway switches on the East Coast of the United States of America in New York and Washington DC connect the Europe Middle East & Africa (EMEA) Europe gateways in London, United Kingdom and Paris, France. The two gateway nodes in Atlanta and Miami connects the gateway nodes in Caribbean, Central & South America (CCSA) region at the cities of Rio De Janeiro, Brazil and Caracas, Venezuela.

The gateway nodes in Paris connects to the gateway nodes in Lagos, Nigeria and Djibouti City, Djibouti in Africa. The London City will node connects the western part of Asia in Tel Aviv, Israel. This design provides a hierarchical configuration that isolates traffic to various regions. For example, the gateway node in Djibouti City and Lagos reads the cell frames of all the traffic coming into and leaving Africa and only allow traffic terminating on the continent to pass through. Also, these switches only allow traffic that are destined for another region to leave the continent. These switches block all intra continental traffic from passing to the other regions' gateway switches. This capability of these switches manages the continental traffic and transiting traffic for other regions.

Global Network Self-Healing Design

The global core network as depicted in FIG. 46 is designed with self-healing rings connecting the global gateway switches. The first ring is formed between New York, Washington DC, London and Paris. The second ring is between Atlanta, Miami, Caracas, and Rio De Janeiro. The third ring is between London, Paris, Johannesburg, and Cape Town. The fourth ring is between London, Beijing, Paris, and Hong Kong. The fifth ring is between Beijing, San Francisco, Los Angeles, and Sydney. These rings are design in such a manner that if one of the fiber optics Sonet facilities fails, then the gateway switches in that ring will immediately go into action of rerouting the traffic around the failure as shown in FIG. 48.

The gateway switches are so configured that if the Sonet facility fails in ring number two between Atlanta and Rio De Janeiro, the switches immediately recognize the problem and start to reroute the traffic that was using this path through the switches and facilities in Atlanta, Caracas, San Paulo and then to its original destination in Rio De Janeiro. The same scenario is show on ring number four after a failure between Israel and Beijing. The switches between the two facilities reroute the traffic around the failed facility from Tel Aviv to London then through Paris, Djibouti City, India, Hong Kong, and to Beijing. All of this is carried out between the switches in micro seconds. The speed of healing these failed rings result in minimal loss of data and in most cases, will not even be notice by the end users and their systems. All of the rings between the gateway nodes are self-healing, thus making the network very robust in term of recovery and performance.

Global Network Control Centers

The viral molecular network is controlled by three Global Network Control Centers (GNCCs) as shown in FIG. 48. The GNCCs manage the network on an end-to-end basis by monitoring all of the International, Nucleus, ASMs, and Protonic switches. Also, the GNCCs monitor the viral orbital vehicles. The monitoring process consists of receiving the system status of all network devices and systems across the global. All of the monitoring and performance reporting is carried out in real time. At any moment, the GNCCs can instantaneously determine the status of any one of the network switches and system.

The three GNCCs are strategically located in Sydney, London, and New York. These GNCCs will operate 24 hours per day 7 days per week (24/7) with the controlling GNCC following the sun, the controlling GNCC starts with the first GNCC in the East, being Sydney and as the Earth turns with the Sun covering the Earth from Sydney to London to New York. This means that while the UK and United States are sleeping at nights (minimal staff), Sydney GNCC will be in charge with its full complement of day-shift staff. When Australia business day comes to end and their go on minimal staff, then following the Sun, London will now be up and running at full staff and take over the primary control of the network. This process is later followed by New York taking control as London staff winds down the business day. This network management process is called follow the sun and is very effective in management of large scale global network.

The GNCC will be co-located with the Global Gateway hubs and will be equipped with various network management tools such as the viral orbital vehicle, Protonic, ASMs, Nucleus, and International switching NMSs (Network Management Systems). The GNCCs will each have a Manager of Manager network management tool called a MOM. The MOM consolidates and integrates all of the alarms and performance information that are received from the various networking systems in the network and present them in a logical and orderly manner. The MOM will present all alarms and performance issues as root cause analysis so that technical operations staff can quickly isolate the problem and restore any failed service. Also with the MOM comprehensive real-time reporting system, the viral molecular network operations staff will be proactive in managing the network.

BRIEF DESCRIPTION OF DRAWINGS

FIG. 17 is further an illustration of the Viral Orbital Vehicle V-ROVER access node communications device housing rear, connector ports side, and the DC power connector bottom views which is an embodiment of the invention.

FIG. 22 is further an illustration of the Viral Orbital Vehicle Nano-ROVER access node communications device housing rear, connector ports side, and the DC power connector bottom views which is an embodiment of the invention.

FIG. 26 is further an illustration of the Viral Orbital Vehicle Atto-ROVER access node communications device housing rear, connector ports side, and the DC power connector bottom views which is an embodiment of the invention.

FIG. 34 shows the V-ROVER cell frame switching fabric, ASM, QAM modems, RF amplifier and receiver, management system, and CPU which is an embodiment of this invention.

FIG. 38 further shows the rear view of the Nucleus Switch communications device housing with coaxial, USB, RJ45 and fiber optics connectors, connector ports side view for its local V-ROVER; the display for local system configuration and operational status; AC power connector, and the 30-3300 GHz 360-degree RF antennae which is an embodiment of this invention.

FIG. 106 is an embodiment of this invention.

FIG. 107 is an embodiment of this invention.

DETAILED DESCRIPTION OF THE DISCLOSURE

The present disclosure is directed to Attobahn Viral Molecular Network that is a high speed, high capacity terabits per second (TBps) millimeter wave 30-3300 GHz wireless network, that has an adoptive mobile backbone and access levels. The network comprises of a three-tier infrastructure using three types of communications devices, a United States country wide network and an international network utilizing the three communications devices in a molecular system connectivity architecture to transport voice, data, video, studio quality and 4K/5K/8K ultra high definition Television (TV) and multimedia information.

Figure 1:
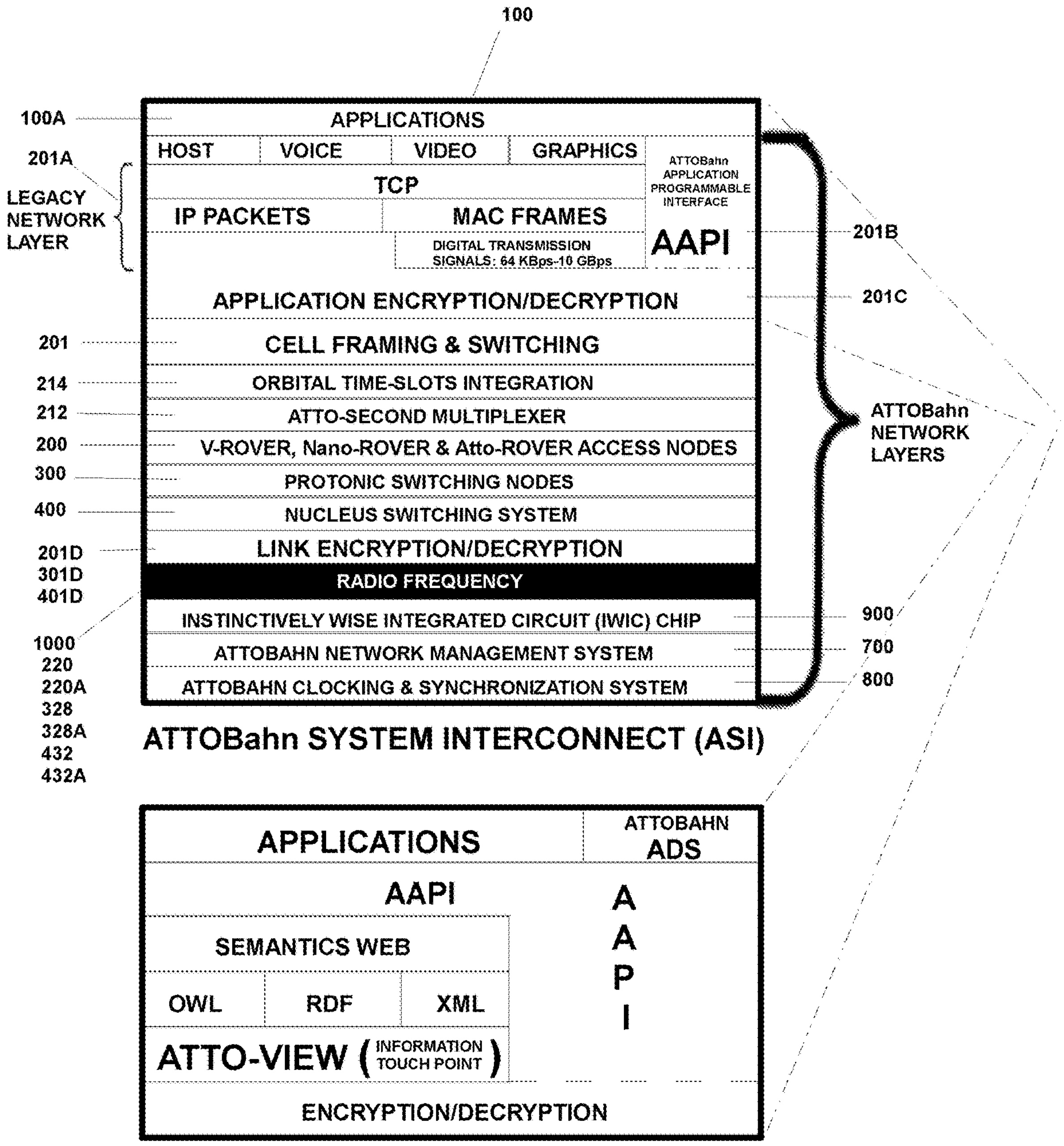
FIG. 1 is a block diagram of viral molecular network architecture that displays the hierarchical layout of this high-speed, high capacity terabits per second (TBps), millimeter wave wireless network that has an adoptive mobile backbone and access levels, shown in an embodiment of the invention.

The network is designed around a molecular architecture that uses the Protonic Switches as nodal systems acting as protonic bodies that attracts a minimum of 400 Viral Orbital Vehicle (V-ROVER, Nano-ROVER, and Atto-ROVER) access nodes (inside vehicles, on persons, homes, corporate offices, etc.) to each one of them and then concentrate their high capacity traffic to the third of the three communications devices, the Nucleus Switch which acts as communications hubs in a city. The Nucleus Switches communications devices are connected to each other in a intra and intercity core telecommunication backbone fashion. The underlying network protocol to transport information between the three communications devices (Viral Orbital Vehicle access device [V-ROVER, Nano-ROVER, and Atto-ROVER], Protonic Switch, and Nucleus Switch) is a cell framing protocol that these devices switch voice, data, and video packetized traffic at ultra-high-speeds in the atto-second time frame. The key to the fast cell-based and atto-second switching and Orbital Time Slots multiplexing respectively is a specially designed integrated circuit chip called the IWIC (Instinctive Wise Integrated Circuit) that is the primary electronic circuitry in these three devices. Viral Molecular Network Architecture As an embodiment of this invention FIG. 1 shows the viral molecular network architecture 100 from the application to the millimeter wave radio frequency transmission layers. The architecture is designed with three interfaces to the end users' applications: 1. Legacy applications 201A that uses TCP/IP and MAC data link protocols which are then encapsulated into the viral molecular network cell frames by its cell framing and switching system 201. The architecture also accommodates a second type of application called digital streaming bits (64 Kbps to 10 GBps) 201B with or without any known protocol and chop them up into the viral molecular network cell frame format by its cell framing and switching system 201. This type of application could be a high-speed digital signal from a transmission equipment such as a digital TDM multiplexer or some remote robotic machinery with a specialized protocol or the transmission signal for a wide area network that uses the viral molecular network as a pure transmission connection between two fixed points. The third interface to the end user application is what is called Native applications, whereby the end users' application uses Attobahn Application Programmable Interface (AAPI) 201B which is socket directly into the viral molecular network cell frame formation by its cell framing and switching system 201. These three types of application can only enter the viral molecular network through Viral Orbital Vehicles (V-ROVER, Nano-ROVER, and Atto-ROVER) 200 ports.

The next layer of the Attobahn viral molecular network architecture is the cell framing and switching 200 which encapsulates the end user application information into cell formatted frames and assign each frame a source and destination header for effective cell switching throughout the network, the cell frames are then placed into orbital time slots 214 by the Atto Second Multiplexers (ASM) 212. The packaging of the end user application information into cell frames are all carried out in the Viral Orbital Vehicle (V-ROVER, Nano-ROVER, and Atto-ROVER).

The next level of the viral molecular network architecture is the Protonic Switch 300 which connects to 400 Viral Orbital Vehicles in an atomic molecular domain design, whereby each Viral Orbital Vehicle is adopted by a parent Protonic Switch once that Viral Orbital Vehicle (V-ROVER, Nano-ROVER, and Atto-ROVER) is turned on and enters the Viral Molecular network theater. The Protonic Switches are connected to Nucleus Switches 400 which act as the hubs for the network in a city, between cities and countries. The Viral Orbital Vehicle (V-ROVER, Nano-ROVER, and Atto-ROVER), Protonic Switch, and Nucleus Switch are connected by wireless millimeter wave radio frequency (RF) transmission system 220A,328A, and 432A.

Figure 2:
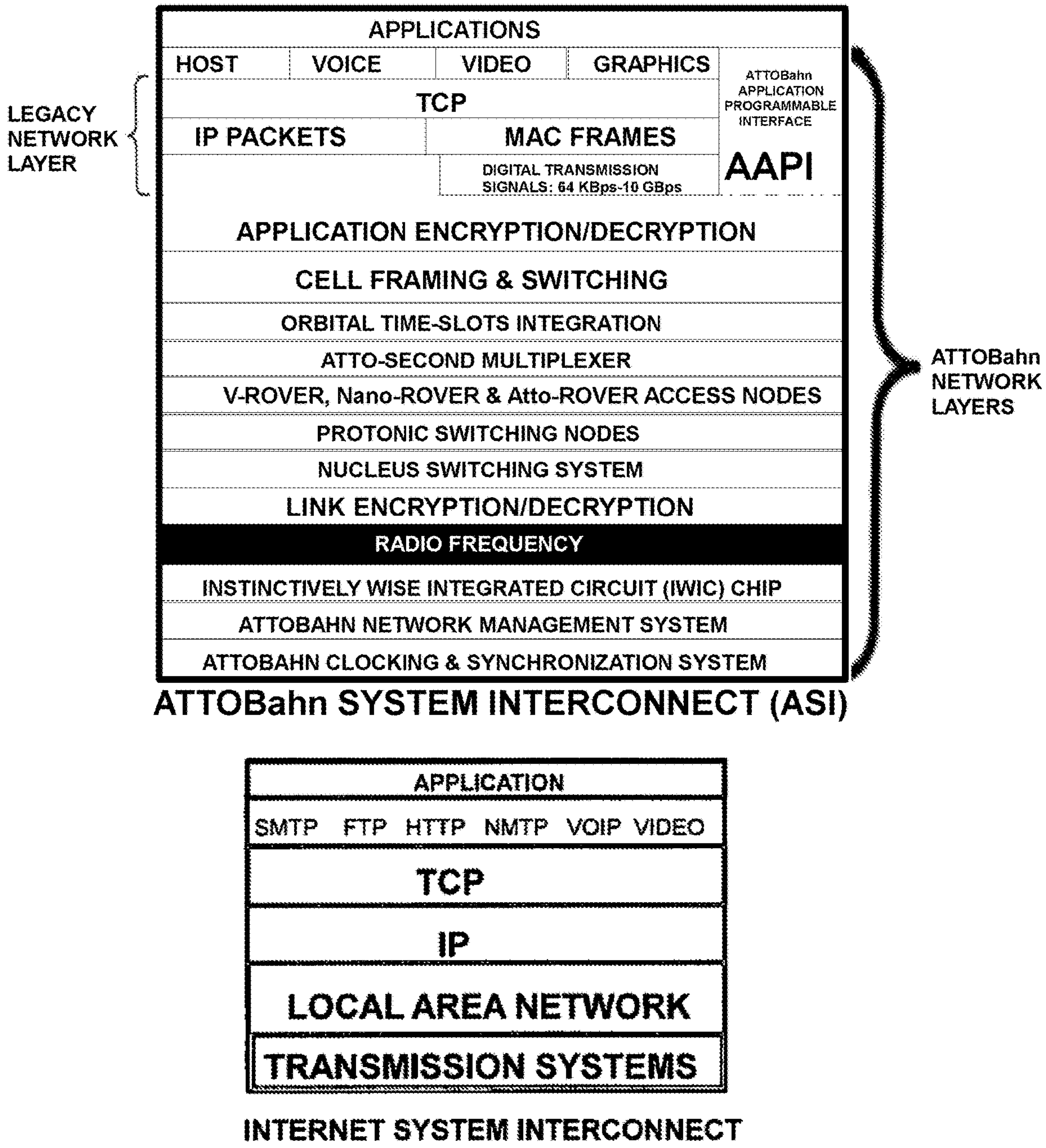
FIG. 2 is a block diagram of that shows the standard Internet Transmission Control (TCP)/Internet Protocol (IP) suite compared to Attobahn's architecture.

As an embodiment of this invention FIG. 2 shows the comparison between the standard TCP/IP protocol suite that is currently used in the Internet compared to the Viral Molecular network communications suite 100. As shown, the suite is different from the Internet TCP/IP suite in the following manner: NOTE—The Attobahn viral molecular network does not use TCP, IP, or MAC protocols.

1. The Attobahn viral molecular network uses the AAPI 201B to interface native applications information 2. The Attobahn viral molecular network uses a proprietary cell framing format and switching 201.

3. The Attobahn viral molecular network utilizes Orbital Time Slots (OTS) 214 and ultra-high-speed Atto Second Multiplexing 212 technique to multiplex the cell frames into a very high-speed aggregated digital stream for transmission over the RF transmission system 220A,328A, and 432A.

Figure 3:
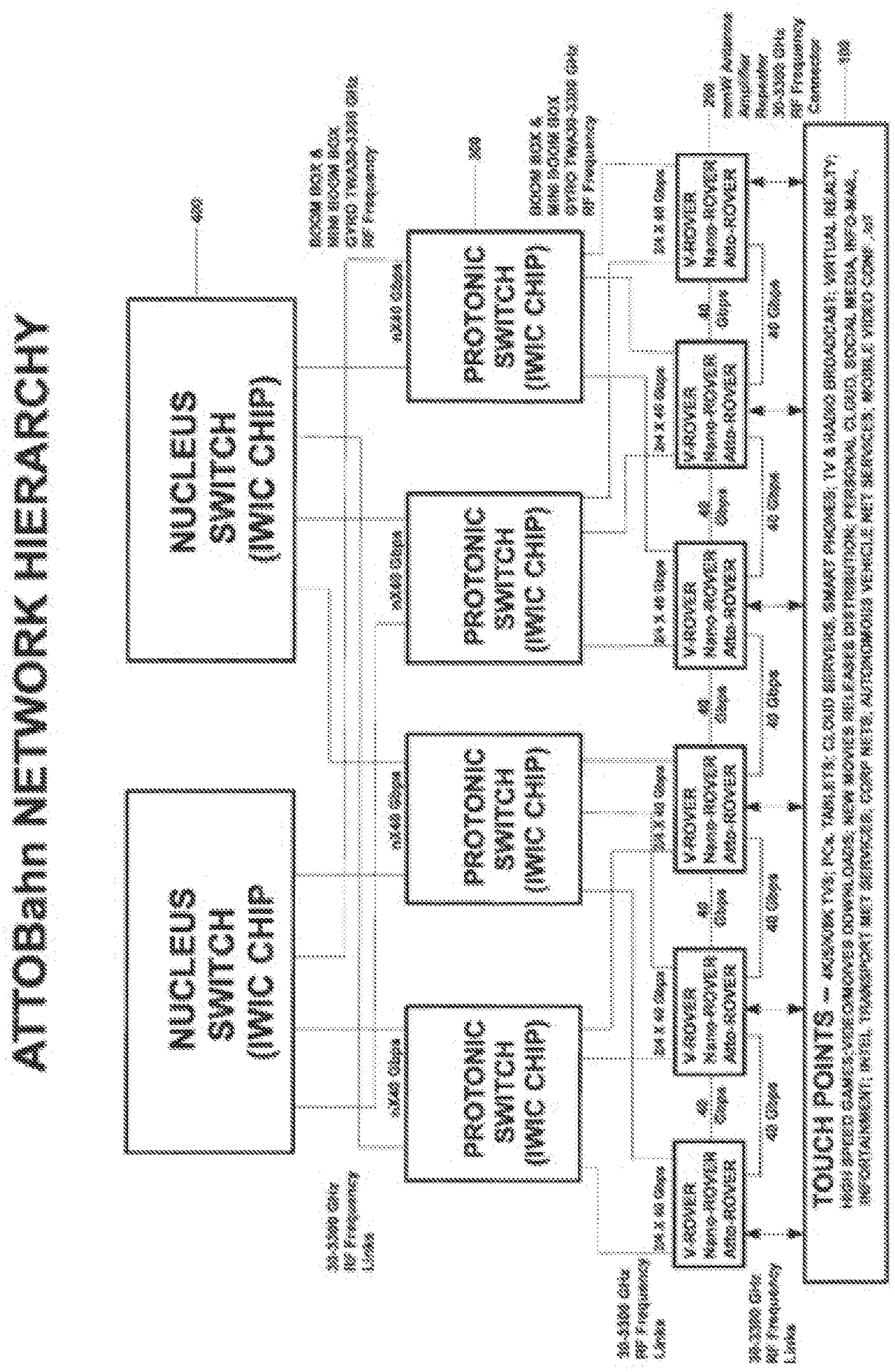
FIG. 3 is an illustration of the hierarchical layers of Attobahn network that shows the ultra-high speed switching layer of the Nucleus switches, that is supported by the Protonic switches intermediate switching layer; and the V-ROVERs, Nano-ROVERs, and Atto-ROVERs access switching layer that are connected to the end-user Touch Points. This network hierarchy of switches is an embodiment of the invention.

4. The Attobahn viral molecular network uses a Viral Orbital Vehicle 200 which houses its AAPI 201B; cell framing and switching functionality 201; Orbital Time Slots (OTS) 214, ASM 212, and RF transmission system 220A, 328A, and 432A as its access node to interface customers' devices (Touch Points 220A) and systems; In contrast the Internet uses Local Area Network switches based on MAC frames layer encapsulation of the customer data. 5. The Attobahn viral molecular network does cell switching and the Internet does IP routing. 6. The Internet uses IP routers as the connectivity nodal device and in contrast the Attobahn viral molecular network uses a Protonic Switch 300 using cell framing and switching and atomic molecular domain adoption of all Viral Orbital Vehicles in its operational domain. 7. The Attobahn viral molecular network uses a Nucleus Switch 400 using a cell framing and switching methodology. In contrast, the Internet uses core backbone routers. Attobahn Network Hierarchy As an embodiment of this invention FIG. 3 shows Attobahn Network Hierarchy that consists of its tertiary level which is an embodiment of this invention, makes up the core backbone network high speed, high capacity tera bits per second cell frame systems called the Nucleus Switch 400. These switches are designed with an Atto Second Multiplexing (ASM) circuitry that uses the IWIC chip to place the switched cell frames into orbital time slots (OTS) across sixteen digital streams running at 40 Gigabits per second (GBps) each, providing an aggregate data rate of 640 GBps. The Nucleus Switch is connected to ISPs, common carriers, cable companies, content providers, WEB servers, Cloud servers, corporate and private network infrastructures via high capacity fiber optics systems or Attobahn Backbone Point-to-Point Boom Box Gyro TWA millimeter wave RF transmission links. The traffic that the Nucleus Switch receives from these external providers are sent to and from the Protonic Switches via Attobahn the Boom Box and Mini Boom Box Gyro TWAs millimeter wave 30-3300 GHz RF signals.

The secondary level of the network as an embodiment of this invention consists of the Protonic Switches 300 that that congregate the virally acquired viral orbital vehicle high-speed cell frames and expeditiously switch them to destination port on a viral orbital vehicle or the Internet via the Nucleus Switch. This switching layer is dedicated to only switching the cell frames between viral orbital vehicles and Nucleus Switches. The switching fabric of the PSL is the work-horse of the viral molecular network.

The primary level of the network hierarchy as an embodiment of this invention is the viral orbital vehicle (V-ROVER, Nano-ROVER, and Atto-ROVER) 200 that is the touch point of the network for the customer. The V-ROVERs, Nano-ROVERS, and Atto-ROVERs collect the customer information streams in the form of voice; data; and video directly from WiFi and WiGi and WiGi digital streams. It is at this digital level where the Touch Points devices' applications 100 access the Attobahn API (AAPI) and subsequently the cell frames circuitry of the viral orbital vehicle.

Figure 4:
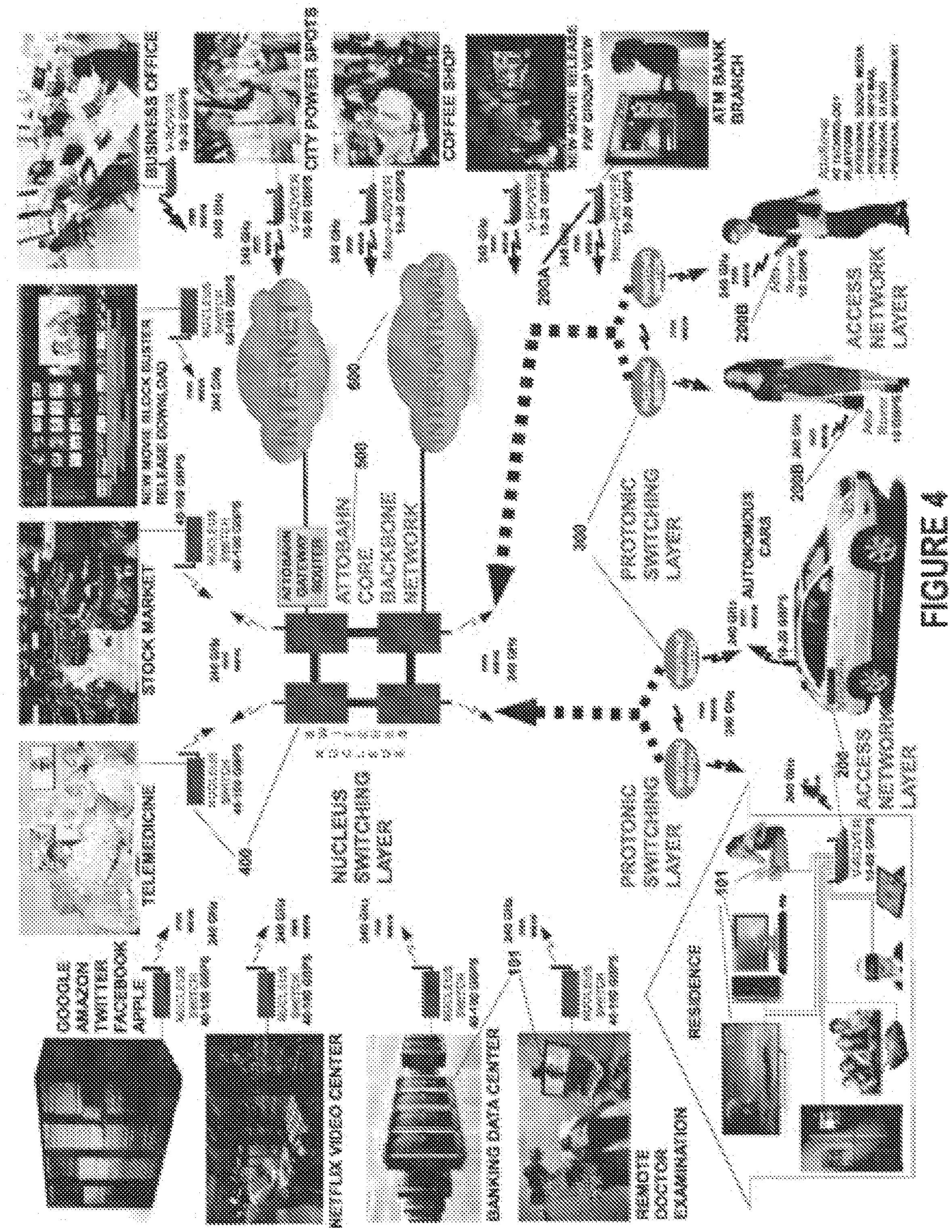
FIG. 4 shows the inter-connectivity to the variety of systems and communications services that Attobahn network connects to and manages, which is an embodiment of the invention.

The RF transmission section of the network hierarchy which is an embodiment of this invention consists of the ultra-high power Boom Box Gyro TWA millimeter wave amplifiers 432A that acts as a powerful terrestrial satellite that receives the RF millimeter waves signals from the Mini Boom Box Gyro TWA millimeter wave amplifiers 328A, the viral orbital vehicle (V-ROVER, Nano-ROVER, and Atto-ROVER} millimeter wave transmitter RF amplifier 220A, and Touch Point devices 101 that are equipped with the IWIC chip 900. Attobahn Network Services Connectivity FIG. 4 shows the functional capabilities of Attobahn Viral Molecular Network which is an embodiment of this invention, that includes 10 GBps to 80 GBps end user access from the V-ROVER 200; 10 GBps to 40 GBps end user access from the Nano-ROVER 200A; and 10 GBps to 20 GBps from the Atto-ROVER 200B which is an embodiment of this invention.

The V-ROVER is shown in a home providing connections for laptops 101, tablets 101, desktop PC 101, virtual reality 101, video games 101, Internet of Things (IoT) 101, 4K/5K/8K TVs 101, etc. The V-ROVERs and Nano ROVERs are used as the access devices for banking ATMs 101; city power spots 101; small and medium size business offices 101; and access to new movies release 100 from the convenience of home.

The Nucleus Switch 400 as an embodiment of this invention provides the access points for telemedicine facilities 100; corporate data centers 100; content providers such as Google 100, Facebook 100, Netflix 100, etc.; financial stock markets 100; and multiplicity of consumers' and business applications 100.

The Atto-ROVER is an APP convergence computing system which is an embodiment of this invention, provides voice calls 100; video calls 100; video conferencing 100; movies downloads 100; multi-media applications 100; virtual reality visor interface 101; private cloud 100; private info-mail 100 (video mail, FTP large file mail; movies attachment mail, multi-media mail; live interactive video messaging, etc.); personal social media 100; and personal infotainment 100.

The aforementioned applications 100 and Touch Points devices 101 are integrated through the network's AAPI 201B, cell frames 201, ASM 212, of the V-ROVERs, Nano-ROVERs, and Atto-ROVERs and transmitted to the Protonic Switches 300 and Nucleus Switches 400 via millimeter wave RF signals 220.

The Nucleus Switches form the core backbone 500 in North America and the gateway nodes for the Global network (international) 600 which is an embodiment of this invention.

APPI (Attobahn Application Programmable Interface)

Figure 5:
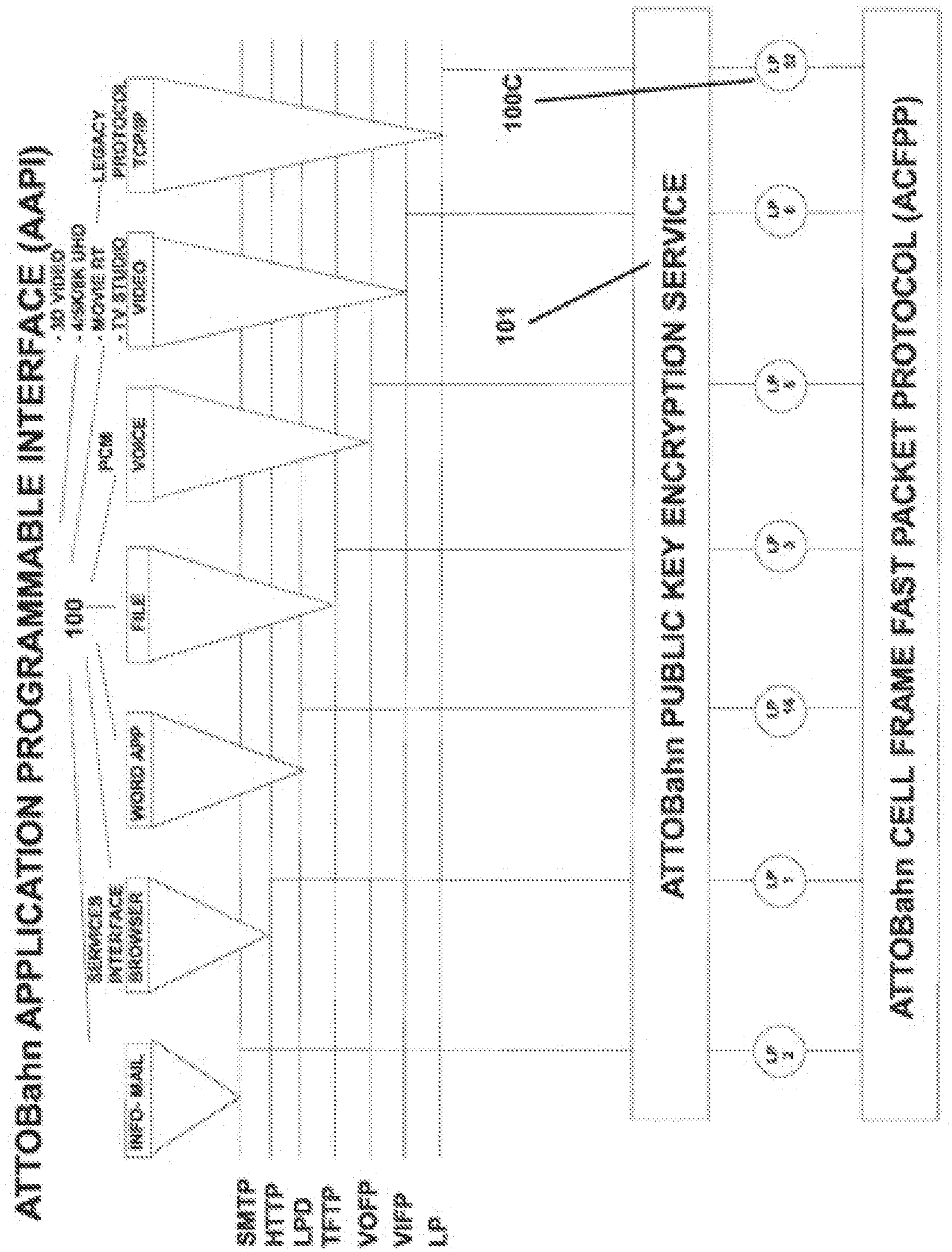
FIG. 5 is an illustration of Attobahn Application Programmable Interface (AAPI) that interfaces to the end users' applications, the network encryption services, and the logical network ports which is an embodiment of this invention.

FIG. 5 shows Attobahn AAPI 201B interface which is an embodiment of this invention, to the end users' applications 100, logical port assignment 100C, encryption 201C, and cell frame switching functions which is an embodiment of this invention. The operations of the AAPI is series of proprietary subroutines and definitions that allows various applications for the Web, Semantics Web, IoT, and non-standard, private applications to interface to the Attobahn network. The AAPI has a library data set for developers to use to tie their proprietary applications (APPS) into the network infrastructure.

The AAPI software resides as an APP in the customers touch point devices or in the V-ROVER, Nano-ROVER, and Atto-ROVER devices which is an embodiment of this invention. In the case of touch point AAPI APP, the software is loaded onto the customers' laptops, tablets, desktop PC, WEB servers, cloud servers, video servers, smart phones, electronic gaming system, virtual reality devices, 4K/5K/8K TVs, Internet of Things (IoT), ATMs, Autonomous Vehicles, Infotainment systems, Autonomous Auto Network, various APPs, etc.; but is not limited to the aforementioned applications.

When the AAPI 201B is on the V-ROVER 200 Nano-ROVER 200, and the Atto-ROVER 200, the customers' application 100 data is transformed to AAPI format, encrypted and send to the cell frame switching system and placed into the Attobahn Cell Frame Fast Packet Protocol (ACFPP) for transport across the network.

Figure 6:
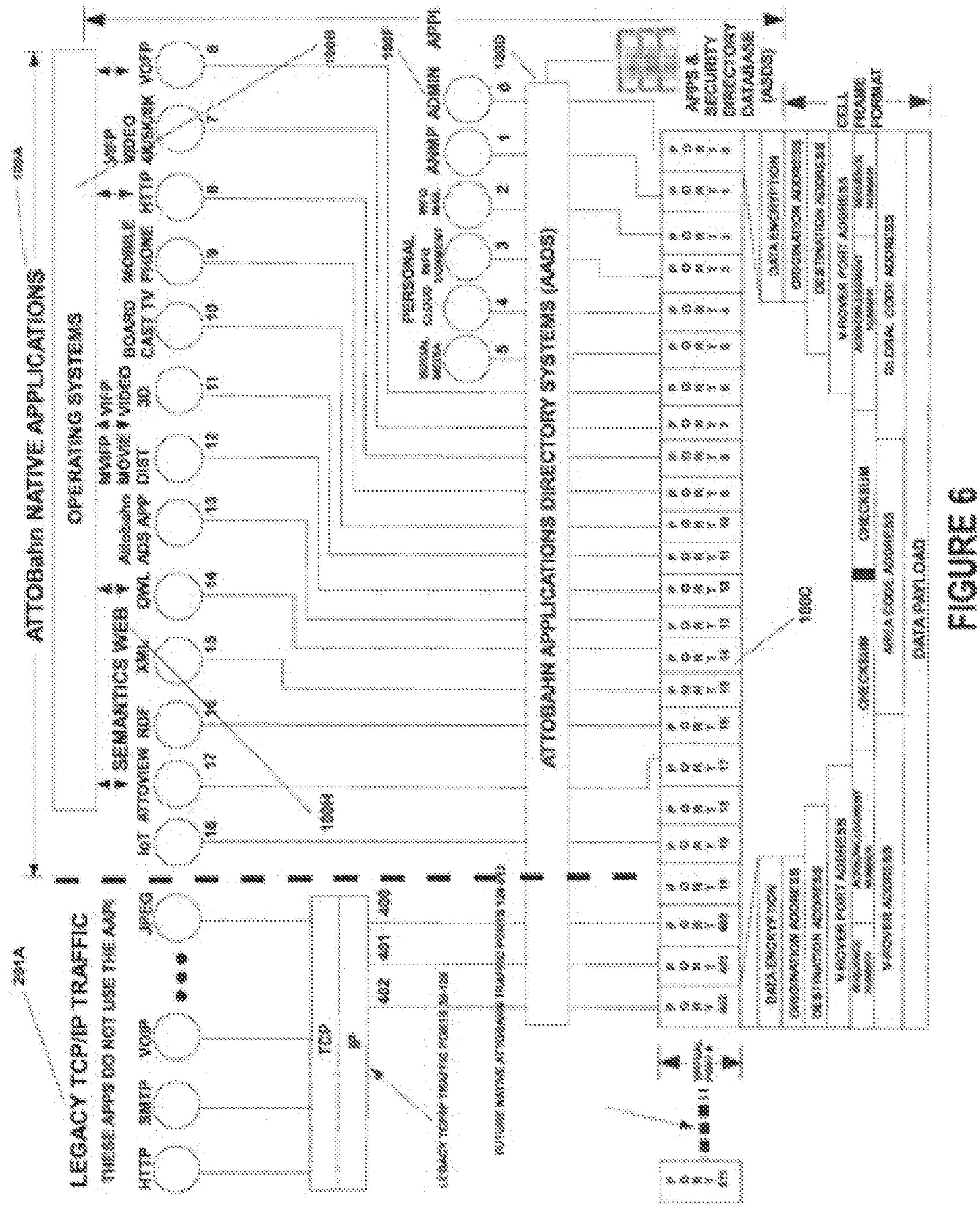
FIG. 6 is an illustration of the Attobahn native applications and associated layers that confirms to Attobahn API (AAPI) and high speed 10 and above giga bits per second which is an embodiment of this invention.

FIG. 6 provide a more detailed display of the APPI 201C, logical ports, data encryption/decryption 201B, Attobahn Cell Frame Fast Packet Protocol (ACFPP) 201, the various (typical) applications 100 that can traverse the Attobahn viral molecular network which is an embodiment of this invention.

The AAPI interfaces two groups of APPs: 1. Native Attobahn APPs 100A2. Legacy TCP/IP APPs 201A Native Attobahn Apps The Native Attobahn APPs are APPs that uses the APPI to gain access to the network. These APPs are as follows but not limited to this list.

Logical Application TypePort

0. Attobahn Administration Data that is always in the first cell frame between any two ROVERs devices that help set up the connection-oriented protocol between application. This application also controls the management messages for paid services such as Group Pay Per View for New Movies Release; purchased videos; automatic removal of videos after being viewed by users; etc.
1. Attoban Network Management Protocol. This port os dedicated to transport all of Attoban's network management information from V-ROVERs; Nanp-ROVERs, Atto-ROVERs, Protonoic Switches, Gyro TWA Boom Boxes Ultra-High Power Amplifications, Gyro TWA Mini Boom Box High Power Amplifiers, Fiber Optics Terminals, Window-Mounted mmW RF Antenna Amplifier Repeaters, and Door/Wall mmW RF Antenna Amplifier Repeaters.
2. Personal Info-Mail
3. Personal Infotainment
4. Personal Cloud
5. Personal Social Media
6. Voice Over fast Packet (VC) FP)
7. 4K/5K/8K Video Fast Packet (VIFP)
8. Musical Instrument Digital Interface (MIDI)
9. Mobile Phone
10. Moving Picture Expert Group (MPEG)
11. 3D Video-Video Fast Packet (3DVIFP)
12. Movie Distribution (New Movie Releases and 4/5K/8K Movie Download—Video Fast Packet (MVIFP)
13. Broadcast TV Digital Signal (TVSTD)
14. Semantics WEB—OWL (Web Ontology Language)
15. Semantics WED—XML (Extensible Markup Language)
16. Semantics WEB—RDF (Resource Descriptive Framework)
17. ATTO-View (Attobahn's user interface to the network services)
18. Internet of Things APPS
19. 19-399 New Applications such as Native Attobahn Applications data.

Attobahn native APPS 100A are applications 100 that are written to interface its APPI routines and proprietary cell frame protocol. These native APPs use the AAPI and cell frames as their communications stack to gain access to the network. The AAPI provides a proprietary application protocol that handles host-to-host communications; host naming; authentication; and data encryption and decryption using private keys. The AAPI application protocol directly sockets into the cell frames without any intermediate session and transport protocols.

The APPI manages the network request-response transactions for the sessions between client/server applications and assigns the logical ports of the associated V-ROVERs, Nano-ROVERs, and Atto-ROVERs cell frame addresses where the sessions are established. Attobahn APPI can accommodate all of the popular operating systems 100B but not limited to this list:

Windows OS
Mac OS
Linux (various)
Unix (various)
Android
Apple IOS
IBM OS
Legacy Applications The Legacy Applications 201A are applications that use the TCP/IP protocol. The AAPI is not involved when this application interfaces Attobahn network. This protocol is sent directly to the cell frame switch via the encryption system.

The logical ports assigned for Legacy Applications are:

Logical Application Type
Port
400 to 512 Legacy Applications

The Legacy Applications access the network via Attobahn WiFi connection which is connected to the encryption circuitry and then into the cell frame switching fabric. The cell framing switch does not read the TCP/IP packets but instead chop the TCP/IP packets data stream into discrete 70-bytes data cell frames and transport them across the network to the closest IP Nodal location. The V-ROVERs, Nano-ROVERs, and Atto-ROVERs are designed to take all TCP/IP traffic from the WiFi and WiGi data streams and automatically place these IP packets into cell frames, without affecting the data packets from their original state. The cell frames are switched and transported across Attobahn network at a very high data rate.

Each IP packet stream is automatically assigned the physical port at the nearest Nucleus Switch that is collocated with an ISP, cable company, content provider, local exchange carrier (LEC) or an interexchange carrier (IXC). The Nucleus Switch hands off the IP traffic to the Attobahn Gateway Router (AGR). The AGR reads the IP address, stores a copy of the address in its AGR IP-to-Cell Frame Address system, and then hands off the IP packets to the designated ISP, cable company, content provider, LEC, or IXC network interface (collectively "the Providers"). The AGR IP-to-Cell Frame Address system (IPCFA) keeps track of all IP originating addresses (from the originating TCP/IP devices connected to the ROVERs) that were hand off to the Providers and their correlating ROVERs port addresses (WiFi and WiGi).

As the Providers hands off the returned IP packets back to the AGR, that are communicating with the end user TCP/IP devices connected to the ROVERs, the AGR looks up the originating IP addresses and correlates them to the ROVERs' port and assign that IP data stream to the correct ROVER cell frame port address. This arrangement allows the TCP/IP applications to traverse the network at extremely high data rates which takes the WiFi average channel 6.0 MBps data stream up to 10 GBps which is more than 1,000 faster. The design of accommodating older data applications like TCP/IP over Attobahn greatly reduces the latency between the client APP and the web servers. In addition to the reduced latency benefit, the Attobahn network secures the data via its separate Application Encryption and RF Link Encryption circuitry.

Attoview Services Dashboard

Figure 7:
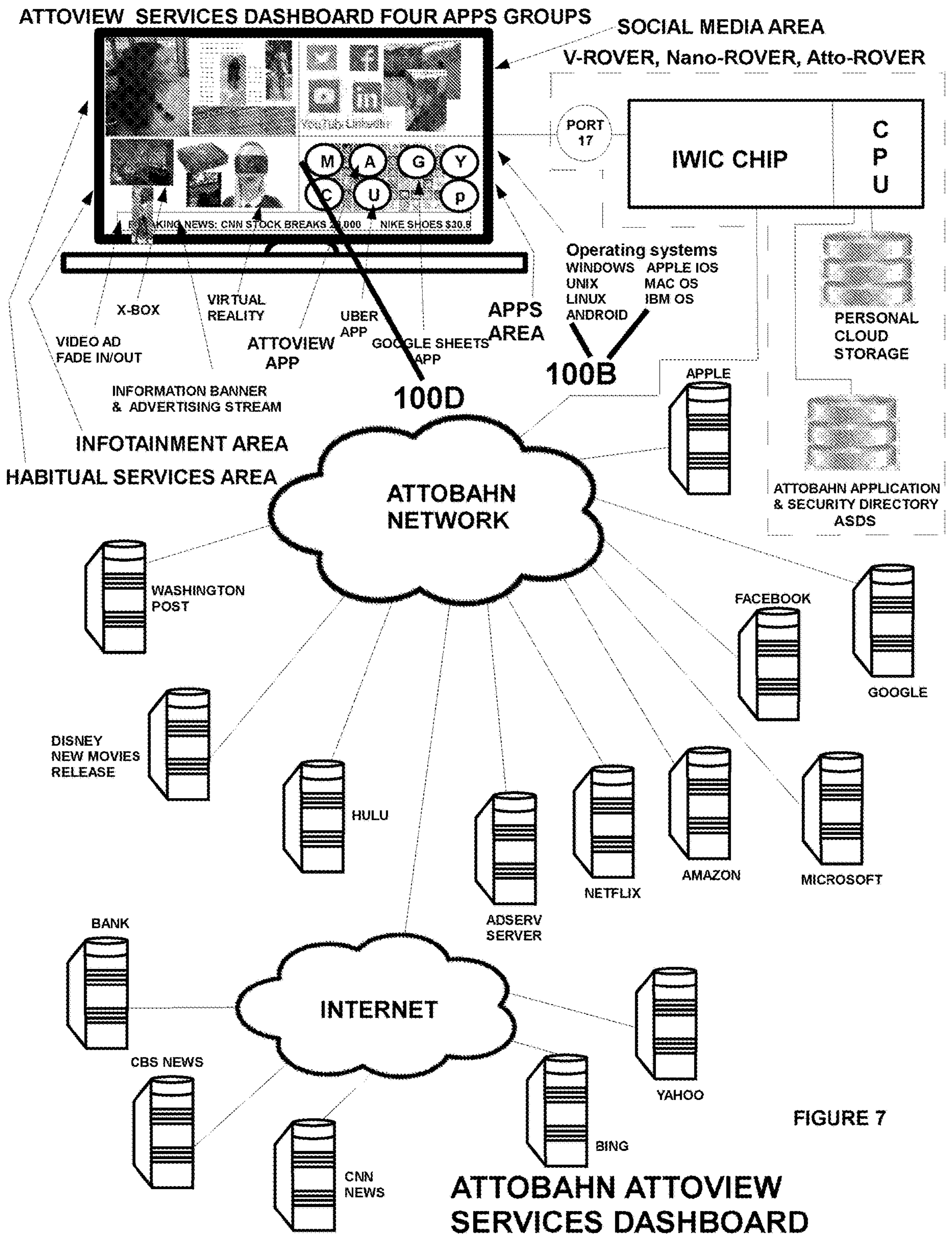
FIG. 7 is an illustration of Atto View Services Dashboard which is an embodiment of this invention.

FIG. 7 shows the Attobahn Atto View 100A is a multimedia, multi-functional user interface APP (named the Atto View Service Dashboard), that is more than a simple browser which is an embodiment of this invention. The Atto View Services Dashboard 100B utilizes OWL/XML Semantics Web functionality as illustrated in FIG. 6.0. Atto View is the end user's virtual Touch Point to access the network services. The Attobahn network services range from the high-speed bandwidth services to using the P2 Technologies (Personal & Private) such as Personal Cloud, Personal Social Media, Personal InfoMail, and Personal Infotainment. Atto View also provides access to all free and payment services as listed below:

INTERNET ACCESS
VEHICLE ONBOARD DIAGNOSTICS
VIDEO & MOVIE DOWNLOAD
NEW MOVIES RELEASE DISTRIBUTION
ON-NET CELL PHONE CALLS
LIVE VIDEO/TV DISTRIBUTION
LIVE VIDEO/TV BROADCAST
HIGH RESOLUTION GRAPHICS
MOBILE VIDEO CONFERENCING
HOST TO HOST
PRIVATE CORPORATE NETWORK SERVICES
PERSONAL CLOUD
PERSONAL SOCIAL MEDIA
PERSONAL INFO-MAIL [
PERSONAL INFOTAINMENT
ADS MONITORING USAGE DISPLAY
VIRTUAL REALTY DISPLAY INTERFACE AND NETWORK SERVICE
INTELLIGENT TRANSPORTATION NETWORK SERVICE (ITS)
AUTONOMOUS VEHICLE NETWORK SERVICES
LOCATION BASED SERVICES

The Atto View APP is downloaded on the end users' computing devices which manifests itself as an icon on the device display. The user clicks on the Atto View to access Attobahn network services. The icon opens as a browser frame which allows the user to log into Attobahn network through Atto View.

The Atto View Service Dashboard prompts the user to authenticate themselves for security purposes to gain access to Attobahn network services. Once they are log into the network, they have uninterrupted access to all of Attobahn network services 24 hours/days 7 days per week at no cost (free network service) for the high-speed bandwidth, P2, and Internet access. All existing free services such as Google, Facebook, Twitter, Bing, etc., the user will able to access at their leisure. Subscription services, such as Netflix, Hulu, etc., that the user accesses via Attobahn will depend on their service agreements with those service providers.

Figure 8:
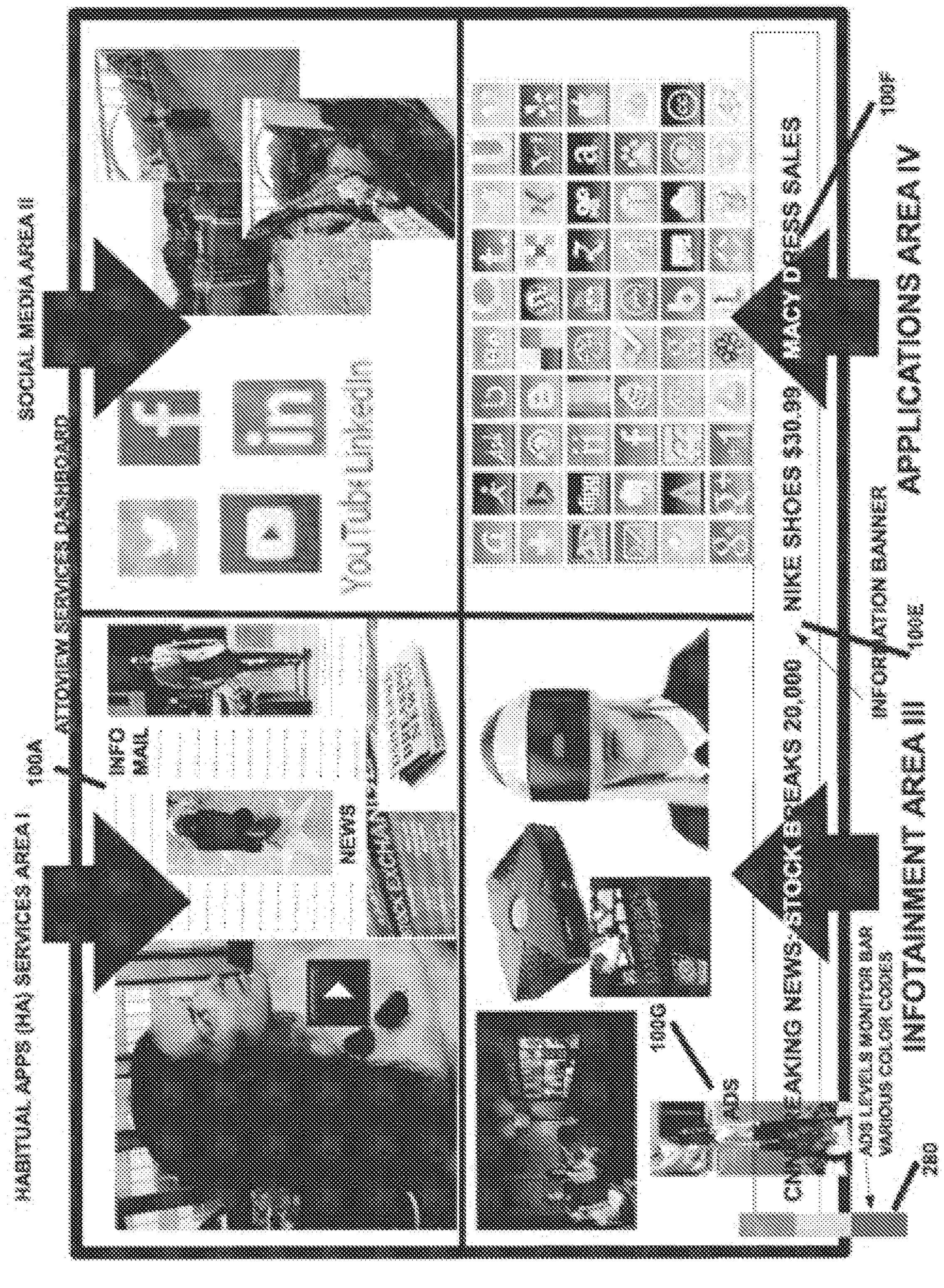
FIG. 8 is an illustration of Atto View Services Dashboard that shows the detail layout of the Dashboard four areas of Habitual APPS; Social Media; Infotainment; and Applications which is an embodiment of this invention.

As shown in FIG. 8 Atto View allows the user to log into Attobahn and access all services by using voice commands, clicking on the services icons, or typing, which is an embodiment of this invention. Atto View keeps a profile of the user's Habitual APPS (HA) services 100A and activities and automatically present the most recent informational updates on their HA services. When the user opens the Service Dashboard 100B, he or she is presented with HA updated services information. This feature provides the user with the convenience of having all of their services current information available for perusal without having to do anything. This saves time and gives the user what they want without the extra work of opening web browsers, typing URLs, waiting on these web sites and associated services to response.

The Atto View user interface as shown in FIG. 8, which is an embodiment of this invention, is called Atto View Service Dashboard because of its multiplicity of services and rich functional capabilities compared to legacy browser such as Chrome, Internet Explorer (IE), Microsoft Edge, Firefox or Safari. AttoView appears on the user's computing device (Desktop PC, laptop, tablet, phone, TV, etc.) screen once that device access the network. Atto View Service Dashboard provides an information banner 100E at the bottom of the user's device display. This banner is used to bring breaking news, emergency alerts, weather information, and streaming advertising information 100F. When the user clicks on the banner, Atto View connects them to that source of information. AttoView allows small superimposed advertising videos 100G to intermittently fade in and out on the lower part of the computing device display for a few seconds. The user has the option to remove the Atto View information banner and the intermittent fade in/out videos from their device display, and accept the nominal Attobahn service charges to access the network bandwidth.

Atto View Service Dashboard utilizes the Semantics Web 100H functionality as shown in FIG. 6, whereby it can analyze the user's data received through emails, documents, images, videos, etc. The Service Dashboard uses the data to makes decisions on how to handle the information even before it passed to the user. Atto View can open the email, decide what to do with it, analyze the data content and even set up alerts and responses. Depending on if the data contains some document (example a spread sheet) that the user was waiting on to place it into another document or file, then Atto View will add the data to that document or file without the user invention. Atto View will alert the user that it was done. The user can set certain conditions in advance on how the document should be handle prior to it being receive. Atto View will carry out the instructions based on those preset conditions and response to emails, certain requests, and carry out work based on various criterion before the user gets involved.

Atto View uses the same Semantic Web functionality to dynamically prepare the user information and set up its service (browser) dashboard based on the user's behavioral habits. When the user clicks on Attobahn icon to start their day, or use Attobahn services, all of their customary data and services are presented to them with current updated information.

In today's legacy browser environment, this function is completely independent of the computing systems' other interfaces. Therefore, when using a Microsoft Windows operating system, access to Microsoft applications and other APPs on the system is via several separate interfaces than the browser interface. Hence, the user must hop between interfaces and windows to access various applications.

In contrast Atto View Services Dashboard is one common interface and view to access all APPs on the computing device. The layout of the Services Dashboard which is an embodiment of this invention, consolidates the following functions into one view:

Attobahn Network Services
Google, Facebook, Amazon, Apple, Twitter, Microsoft
Netflix, Hulu, HBO, other OTT Services
CNN, CBS, ABC, other TV News
Financial Services (Banks and stock market)
Social Media Services
Other Internet Services
Infotainment Services
Information Mail
Video Games Network
Virtual Reality Network Services
Windows, IOS, & Android Entertainment APPs The Services Dashboard interface layout is shown in FIG. 8 which is an embodiment of this invention. The Dashboard has four APPs group areas and one general services area that displays the information banner 100E and advertising data 100F and 100G. Interface Area I Atto View Services Dashboard Interface Area I is an embodiment of this invention, consists of the user's Habitual Behavioral services consists of:

Personal Information Mail
Personal Social Media
Personal Infotainment
Personal Cloud
Google
Twitter
Business Email
Legacy Mail
TV News OTT
Financial Services (banks and stock markets)
Online News Paper (Washington Post, Wall Street, Chicago Tribune, etc.)
Word Processing, Spread Sheet, Presentation, Database, Drawing APPs Interface Area II
Atto View Services Dashboard Interface Area II is an embodiment of this invention, consists of the user's Social Media services consists of:
Facebook
Twitter
LinkedIn
Instagram
Google+
Interface Area III
Atto View Services Dashboard Interface Area III is an embodiment of this invention, consists of the user's Infotainment services consists of:
Netflix
Amazon Prime
Apple Music & Video downloads
Hulu
HBO
Disney
New Movies Releases (Universal, MGM, Disney, Sony, Times Warner, Disney, etc.)
Online Video Rental
Video Games Network
Virtual Reality Network Services
Live Music Concerts
Interface Area IV
Atto View Services Dashboard Interface Area IV which is an embodiment of this invention, consists of the user's Habitual Behavioral services consists of:
Adobe
Maps
Weather Channel
APPLE APP Store
Play Store
JW Library
Recorder
Messenger
Phone
Contacts
Camera
Parkmobile
Skype
Uber
Yelp
Earth
Google Sheets Atto View Services Dashboard design focuses on services and convenience for the user.

Attoview Advertisement Level Monitoring System

Figure 9:
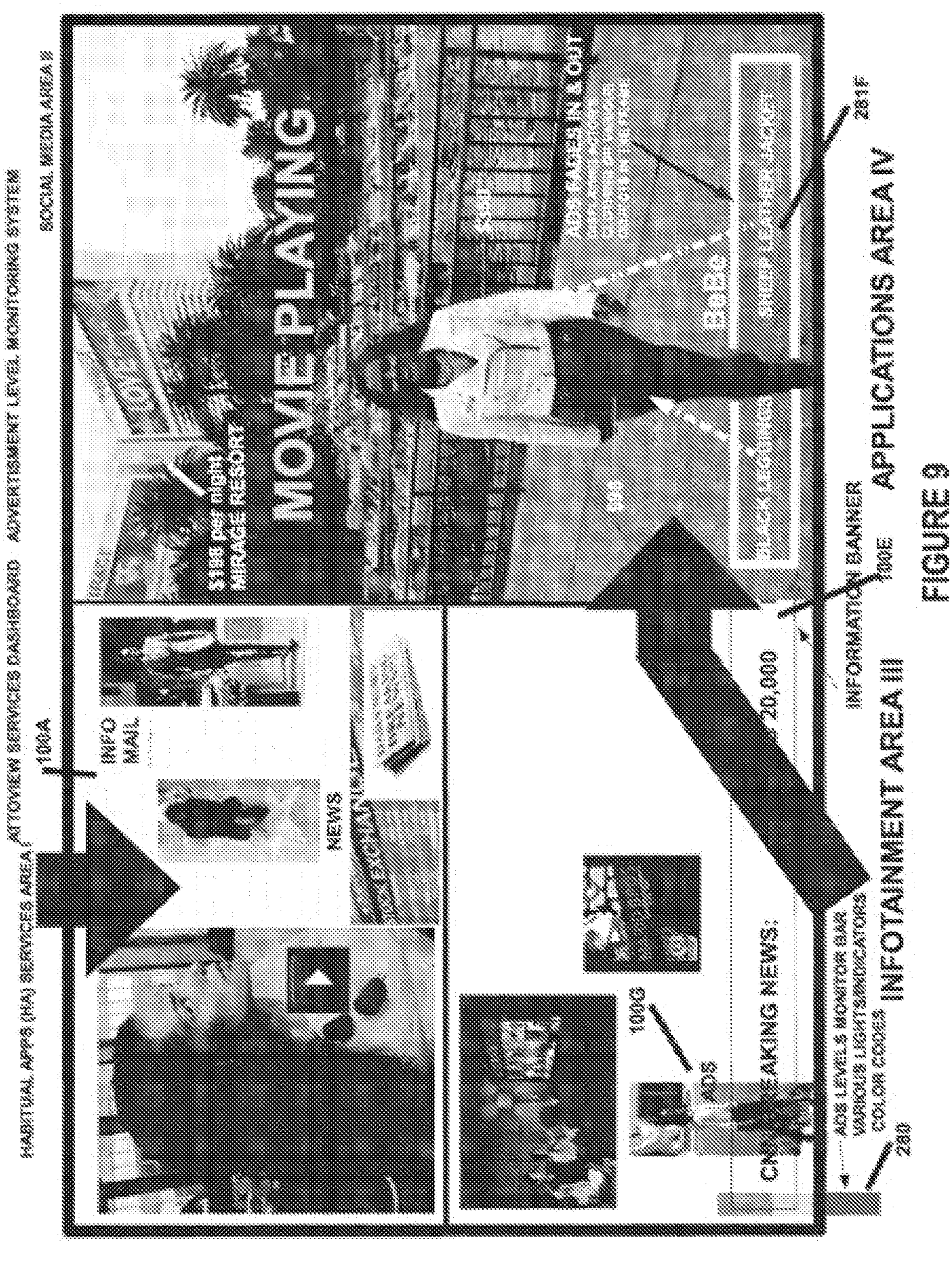
FIG. 9 is an illustration of the Attobahn AttoView ADS Level Monitoring System (AAA) that has a secured APP and method to allow broadband viewers an alternative way to pay for digital content by simultaneously viewing ads with an advertisement overlay services technology that is embedded in Attobahn APPI

As illustrated in FIG. 9 which is an embodiment of this invention, the Attobahn Atto View ADS Level Monitoring System (AAA) 280F has a secured APP and method to allow broadband viewers an alternative way to pay for digital content by simultaneously viewing ads with an advertisement overlay services technology 281F that is embedded in the APPI. The APPI has an ADS VIEW APP that runs over Logical Port 13

Attobahn Ads APP address EXT=0.00D Uniqueaddress.EXT=32F310E2A608FF.00D and allows ads to superimposes themselves 281F over the videos that are in following Logical Ports:

1. Logical Port 74K/5K/8K VIFP/VIDEO address EXT=0.007
Uniqueaddress.EXT=32F310E2A608FF.007
2. Logical Port 10 BROADCAST TV address EXT=0.00A
Uniqueaddress.EXT=32F310E2A608FF.00A
3. Logical Port 113D VIDEO 3DVIFP address EXT=0.00B
Uniqueaddress.EXT=32F310E2A608FF.00B
4. Logical Port 12 MOVIE DISTRIBUTION MVIFP address EXT=0.00C
Uniqueaddress.EXT=32F310E2A608FF.00C The AAA APP method and system allows broadband viewers to purchase licensed content by simultaneously viewing advertisement that overlay the video content. Customers who access video content that would normally require a license, subscription or other fees in order to view them. The customer can now view these contents without having to pay the fees. Instead, the content is available to the customer because the system has embedded advertisement overlays with pre-negotiated advertisement arrangement that credit the customer based on viewing periods. The number of ADS the customer views is captured and display by the ADS Level Monitor lights/indicators The AAA APP system is accompanied by an advertisement viewing level meter that provides an empty to full gauge (identified by lights/indicators) that correspond with traditional monthly billing periods. The system also allows the customer to turn off and optionally pay for the service based on the negotiated content arrangement with credit provisions for over viewing of advertisements.

The AAA APP is one of the means by which the Attobahn free infotainment services platform will pay for itself so users can enjoy free infotainment by viewing a certain number of ADS on a monthly basis. In effect Attobahn AAA APP allows Attobahn to pay customers for viewing ADS. The payments from Attobahn is in the form of credit that allows the customers to view paid content for free by using their AAA APP ADS viewing to pay for the content on a monthly or annual basis.

Figure 10:
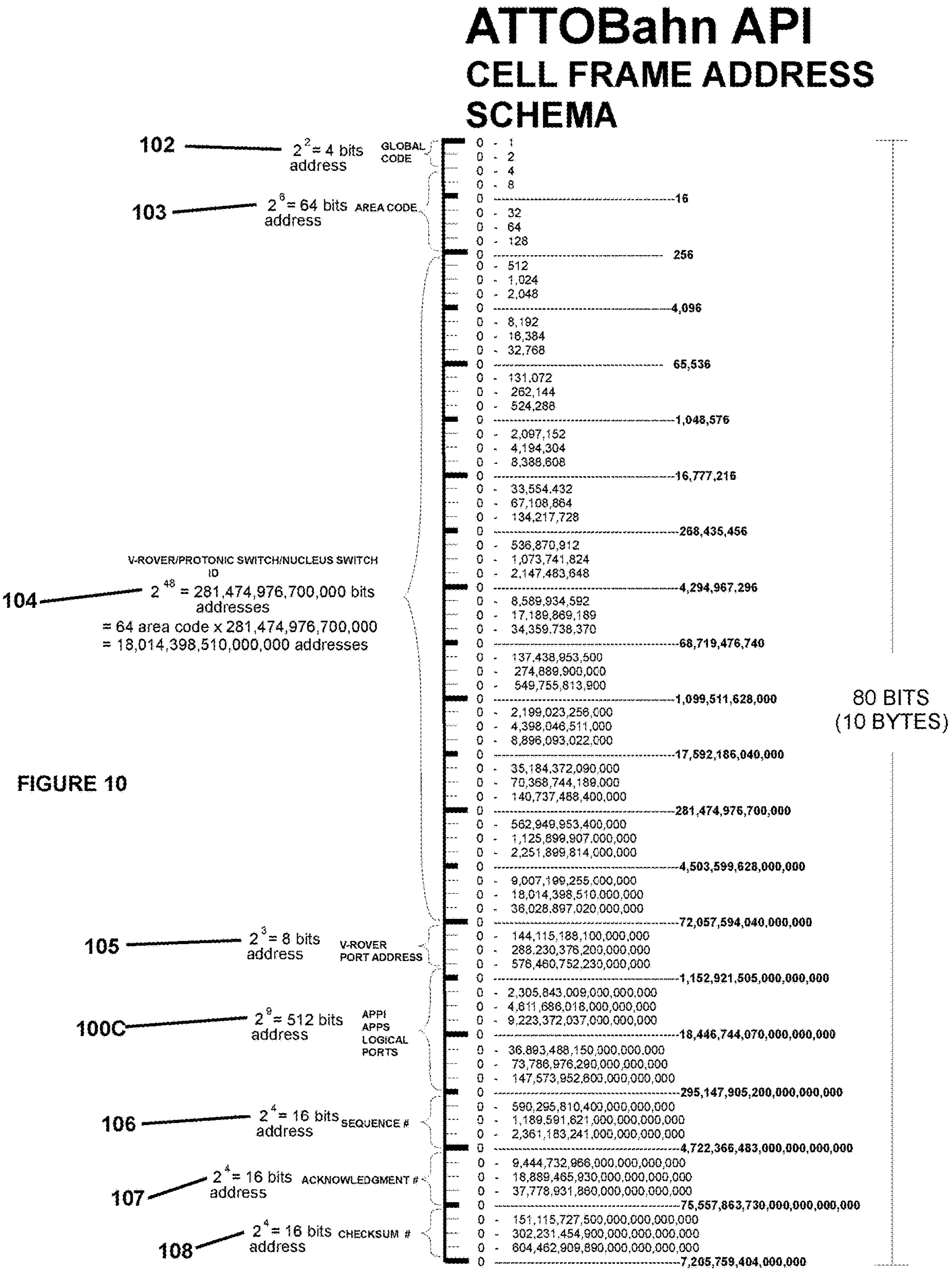
FIG. 10 is an illustration of Attobahn's cell frame address schema that provides 7,200 trillion addresses across the network infrastructure which is an embodiment of this invention.

The AAA APP design is accessible from smart phones, tablets, TVs and computers. Attobahn uses video as the new HTML for this technology, a very smart text-overlay that is superimposed over video and is used for service setup, administration, video mail (info-mail), social media voice and video communications including data storage management. Attobahn Cell Frame Addressing Schema FIG. 10 shows Attobahn Cell Frame Address schema which is an embodiment of this invention. The cell frame consists of 70 bytes of which the address header is 10 bytes and the payload consists of 60 bytes.

The cell frame address is broken down into the follow sections that represent various resources in the network:

1. Four World Regions (2 bits) 102
2. 64 Geographic Area Codes (6 bits) 103
3. 281,474,976,700,000 unique identification (ID) addresses 104 for Attobahn devices (48 bits): V-ROVERs, Nano-ROVERs, Atto-ROVERs, Protonic Switches, and Nucleus Switches in each Geographic Area Code. That means each World Region (Global Code) will have 64×281,474,976,700,000=18,014,398,510,000,000 Attobahn cell frame addresses. Hence, globally a total of 72,057,594,040,000,000 (more than 72,000 trillion) Attobahn cell frame addresses. This address schema will certainly accommodate numerous devices and applications currently on the Internet and the rapidly growing Internet of Things (IoT).
4. The address scheme uses 3 bits for the 8 ports 105 on each V-ROVER, Nano-ROVER, and Atto-ROVER.
5. The address scheme uses 9 bits for the 512 logical ports 100C of the APPI that connects the applications to the cell frames.
6. The cell frame header uses a 4-bit framing sequence number 108 to keep track of the frame sent and acknowledged between the logical ports and their associated applications.
7. The cell frame header uses 4 bits for acknowledgement 107 and retransmission processes for reliable communications between computing devices connected to the network.
8. The cell frame header has a 4-bit checksum 106 for error detection in the cell frames.

The four world regions are equipped with Global Gateway Nucleus Switches that carry the global codes. The global code assignments are:

Code Region
00 North America
01 EMEA—Europe Middle East & Africa
10 ASPAC—Asia Pacific
11 CCSA—Caribbean Central & South America Each world region has 64 area codes that comprises of 281 trillion devices addresses has 64 area codes Nucleus Switches connected to it. More than 281 trillion Attobahn device addresses are distributed between each area code. Therefore, each area code has an addressing capacity of over 18,000 trillion addresses, that are assigned to Attobahn devices. Hence, globally Attobahn has a global network addressing capacity of more than 72,000 trillion addresses.

Attobahn Networking Address Operation

Figures 11A, 11B:
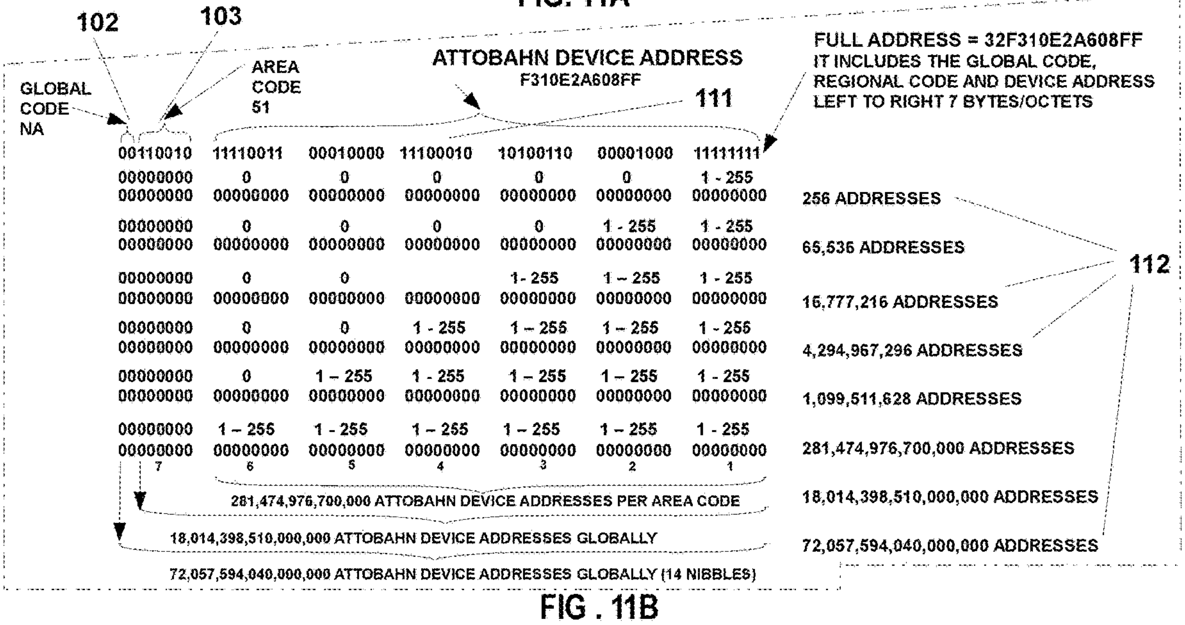
FIGS. 11A and 11B are illustrations of Attobahn Devices Addresses which is an embodiment of this invention.

Each Attobahn device address consists of the Global Code 102, Area Code 103, and device ID address 104, as shown in FIG. 11 which is an embodiment of this invention.

The 14-character 32F310E2A608FF address 109 is an example of an Attobahn network address. The 14-character addresses are derived from hexadecimal formatted digits. The hexadecimal bits that consist of 14 nibbles, which are from the 7 bytes of the cell frame address header 102, 103, and 104 as illustrated in FIG. 10.

The first byte is broken into two sections. The first section consists of two digits (from the left to right) 102 that represent the Global Codes for North America (NA)=00; Europe, Middle East & Africa (EMEA)=01; Asia Pacific (ASPAC)=10; and Caribbean Central & South America (CCSA)=11.

As shown in FIG. 11, each Global Code is accompanied by 64 Area Codes 111 that forms the second section of the first byte of the 7-byte Attobahn address. Each Area Code consists of 6 bits ranging from 000000=Area Code 1 to 111111=Area Code 64 which is an embodiment of this invention. For example, the North America Global Code and its first Area Code will be 00000000; where the first two zeros, 00 from left to right are be NA Global Code and the next six zeros, 000000 from left to right is Area Code 1. Another example, ASPAC Global Code and its Area Code 55 is represented by 10110110; whereby the 10 is the Global Code and 110110 is Area Code 55.

The first byte of the Attobahn address makes up the first two nibbles of the address. The first two nibbles of the model address in FIG. 11 is 32. This nibble comes from Global Code 00 that is NA code and Area Code 110010 that is Area Code 51. Global Code and Area Code 00 110010

Are combined into the byte:

00110010.

These eight digits 00110010 are broken into two nibbles:

0011-3, and

0010=2.

Therefore, 0011 0010=32 are the first two characters or nibbles of the Attobahn address

32F310E2A608FF. The address is broken down into three sections:

Section 1; Global Code NA=00=2 bits that accommodates 4 Global Codes

Section 2; Area Code 51=110010-6 bits that accommodate 64 Area Codes. Sections 1 and 2 are combined to produce the first byte:

00110010.

Section 3: Attobahn device ID/address=6 bytes=48 bits 104 that accommodate 281,474,976,700,000 device ID/address. The 6 bytes of the model address in FIG. 10 are:

11110011 00010000 11100010 10100110 00001000 11111111.

When these bytes are added to the Global Code and Area Code byte, the full Attobahn address is:

00110010 11110011 00010000 11100010 10100110 00001000 11111111

Arranging the 7 bytes into 14 nibbles, 0011 0010 1111 0011 0001 0000 1110 0010 1010 0110 0000 1000 1111 1111

3 2 F 3 1 0 E 2 A 6 0 8 FF

The Attobahn address 32F310E2A608FF is derived in the format above as illustrated in FIG. 11 which is an embodiment of this invention.

In the structure Attobahn address as shown in FIG. 11, each byte or octet 111 from right to left; 2 {circumflex over ( )} 8 provides 256 address from the utmost right octet. Each subsequent octet from right to left increases the addresses by a multiple of 256. Therefore, the design of the address schema yields the 72,057,594,040,000,000 addresses across the four Global Codes and their 64 Area Codes in the following manner:

Octet 1 Right to Left=256 addresses 112

Octet 1 and 2 Right to Left=65,536 addresses 112

Octet 1, 2, and 3 Right to Left=16,777,216 addresses 112

Octet 1, 2, 3, and 4 Right to Left=4,294,967,296 addresses 112

Octet 1, 2, 3, 4, and 5 Right to Left=1,099,511,628, addresses 112

Octet 1, 2, 3, 4, 5, and 6 Right to Left=281,474,976,700,000 addresses 112

Octet 1, 2, 3, 4, 5, 6, and 7 Right to Left=72,057,594,040,000,000 addresses 112

Attobahn address schema allows a user to have a unique address for all of his/her services. Each user is assigned a 14-character address and all of his/her services such as personal info-mail, personal social media, personal cloud, personal infotainment, network virtual reality, games services, and mobile phone. The user's assigned address is tied to his/her V-ROVER, Nano-ROVER, or Atto-ROVER. The assigned address has an APP extension which is based on the logical port number. For example, the user's info-mail address is based on his/her 14-character address and the info-mail logical port number (extension). This address scheme arrangement simplifies the user communications ID to one address for all services. Today, a user has a separate email address, social media ID, mobile phone number, cloud service ID, FTP service, virtual reality services, etc. Attobahn network services native APPs allows the user to have one address for multiple services.

User Unique Address & Apps Extension

Figure 12:
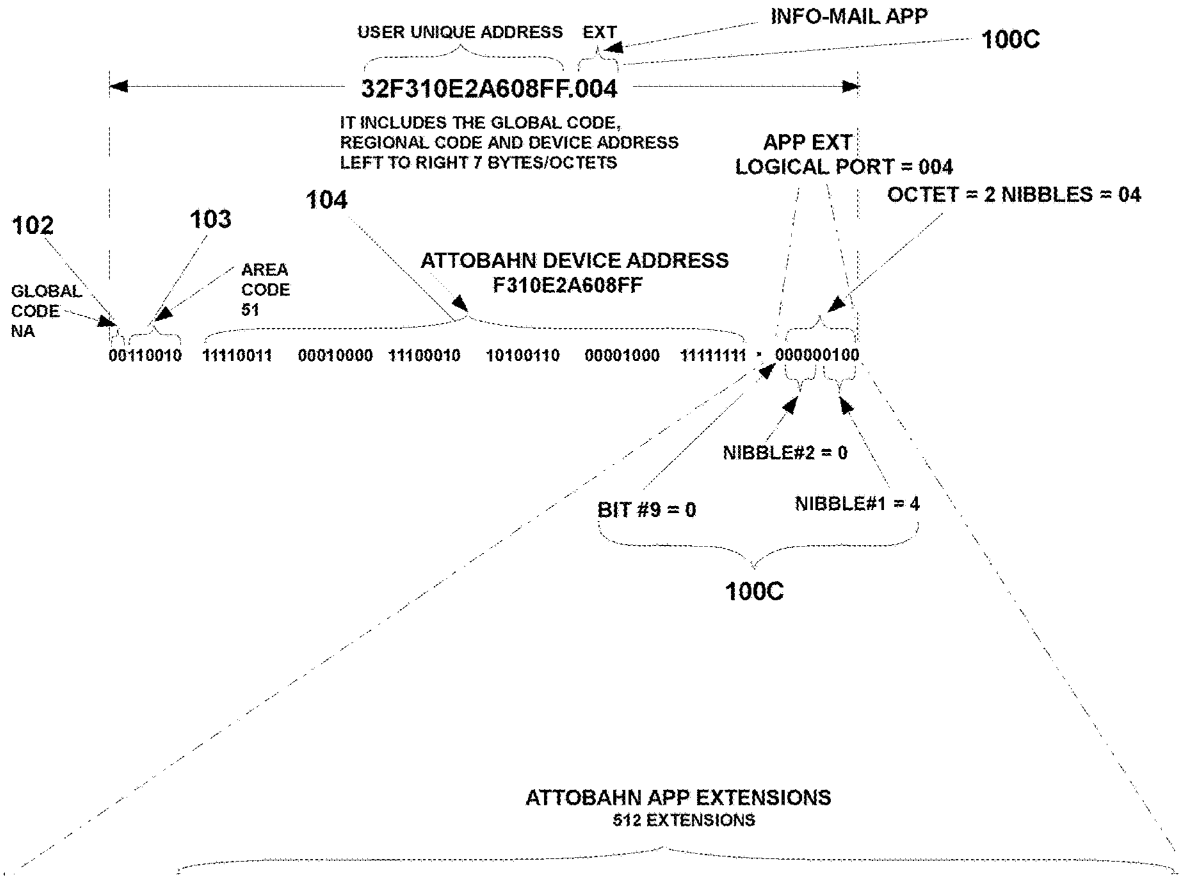
FIG. 12 is an illustration of Attobahn User Unique Address & APP Extension which is an embodiment of this invention.

FIG. 12 shows the Attobahn user unique address 109 and APPs extension 100C which is an embodiment of this invention, advances the user identification process from a series of applications IDs such as a separate phone number, email address, FTP service, social media, cloud service, etc. The user and the people and systems that he or she wants to communicate with have to remember all of these fragmented services/applications IDs. This is burdensome on all parties involved in the communications process. In contrast, Attobahn eliminates these burdens and provides a single solution communications ID, the actual user and not the services/applications that the user consumes.

Attobahn accomplishes the single user ID communications process by assigning the user a unique Attobahn address that is associated with their Attobahn V-ROVER, Nano-ROVER, and Atto-ROVER. Any Attobahn user that wants to communicate with another Attobahn user via Attobahn's native applications, only need to know the user's Attobahn address. The user initiating the service request does need to know the other user's phone number in order to call him/her. All the calling user does is select the called user unique Attobahn address and click the phone icon. The user does not need to call a phone number. Attobahn network does not use phone numbers, email addresses, social media names, FTP, etc. The service initiating user simply select the user's unique address and click on the icon of the service he/she desires in the Atto View Service Dashboard.

This design changes the way people communicates from the traditional communications services of The user can travel with their V-ROVER, Nano-ROVER, or Atto-ROVER which makes the unique address mobile allowing anyone to communicate with them.

FIG. 12 shows the construct of the User Unique Address 109 and its APP extension 100C which is an embodiment of this invention. The first 14 characters 32F310E2A608FF are the user's Attobahn V-ROVER, Nano-ROVER and Atto-ROVER device address. The APP extension=.EXT is represented by the 9 bits. These 9 bits=2 {circumflex over ( )} 9=512 APP logical ports. The APP EXT is represented by two nibbles from left to right and the ninth bit by itself.

The user unique Attobahn address and APPs extension 100C will appear as follows:

User unique address: 32F310E2A608FF $$1.\ \text{Logical}\ Port0ADMIN\ \text{address}\ EXT = 0.000$$

$$\text{Unique address}.EXT = 32F310E2A608FF.000$$

-continued

2. Logical *Port1ANMP* address *EXT* = 0.001

Unique address.*EXT* = 32*F*310*E*2*A*608*FF*.001

3. Logical *Port2Info*−Mail address *EXT* = 0.002

Unique address.*EXT* = 32*F*310*E*2*A*608*FF*.002

4. Logical *Port3INFORTAINMENT* address *EXT* = 0.003

Unique address.*EXT* = 32*F*310*E*2*A*608*FF*.003

5. Logical *Port4CLOUD* address *EXT* = 0.004

Unique address.*EXT* = 32*F*310*E*2*A*608*FF*.004

6. Logical *Port5SOCIAL* MEDIA address *EXT* = 0.005

Unique address.*EXT* = 32*F*310*E*2*A*608*FF*.005

7. Logical *Port6VOFP* address *EXT* = 0.006

Unique address.*EXT* = 32*F*310*E*2*A*608*FF*.006

8. Logical *Port*74*K*/5*K*/8*K VIFP*/VIDEO address *EXT* = 0.007

Unique address.*EXT* = 32*F*310*E*2*A*608*FF*.007

9. Logical *Port8HTTP* address *EXT* = 0.008

Unique address.*EXT* − 32*F*310*E*2*A*608*FF*.008

10. Logical *Port9MOBILE* PHONE address *EXT* = 0.009

Unique address.*EXT* = 32*F*310*E*2*A*608*FF*.009

11. Logical *Port*10*BROADCAST* TV address *EXT* = 0.00*A*

Unique address.*EXT* = 32*F*310*E*2*A*608*FF*.00*A*

12. Logical *Port*113*D* VIDEO 3*DVIFP* address *EXT* = 0.00*B*

Unique address.*EXT* = 32*F*310*E*2*A*608*FF*.00*B*

13. Logical *Port*12*MOVIE* DISTRIBUTION *MVIFP* address *EXT* = 0.00*C*

Unique address.*EXT* = 32*F*310*E*2*A*608*FF*.00*C*

14. Logical *Port*13*Attobahn* Ads *APP* address *EXT* = 0.00*D*

Unique address.*EXT* = 32*F*310*E*2*A*608*FF*.00*D*

15. Logical *Port*14*OWL* address *EXT* = 0.00*E*

Unique address.*EXT* = 32*F*310*E*2*A*608*FF*.00*E*

16. Logical *Port*15*XML* address *EXT* = 0.00*F*

Unique address.*EXT* = 32*F*310*E*2*A*608*FF*.00*F*

17. Logical *Port*16*RDF* address *EXT* = 0.010

Unique address.*EXT* = 32*F*310*E*2*A*608*FF*.010

18. Logical *Port*17*ATTOVIEW* address *EXT* = 0.011

Unique address.*EXT* = 32*F*310*E*2*A*608*FF*.011

19. Logical *Port*18*IoT* address *EXT* = 0.012

Unique address.*EXT* = 32*F*310*E*2*A*608*FF*.012

20. Logical Ports 19 to 399 Native Applications

21. Logical Ports 400 to 512 Legacy Applications

Attobahn Cell Frame Fast Packet Protocol (ACF2P2)

Figure 13:
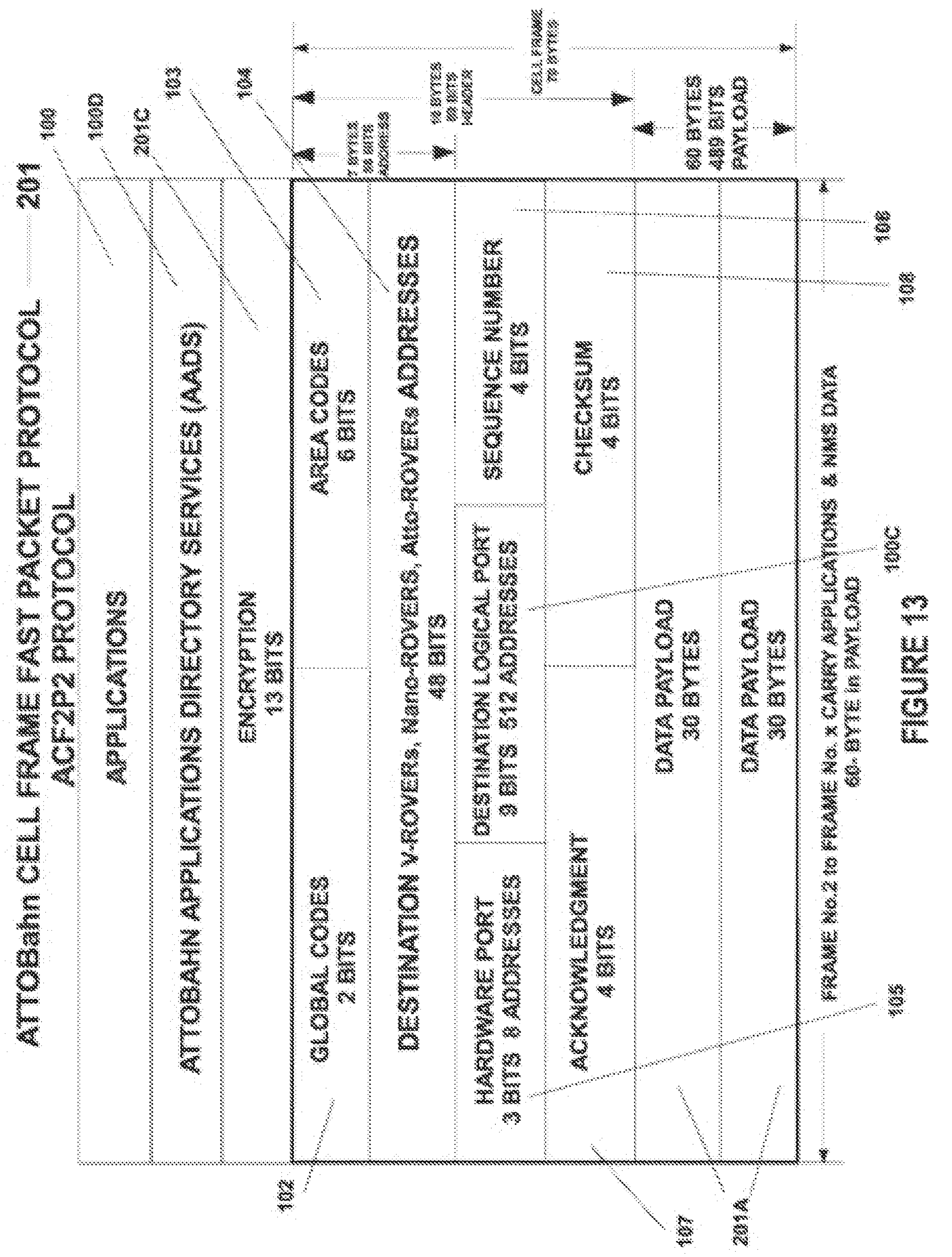
FIG. 13 is an illustration of Attobahn's cell frame fast packet protocol (ACFP) consisting of a 10-byte header and a 60-byte payload which is an embodiment of this invention.

FIG. 13 shows the Attobahn Cell Frame Fast Packet Protocol (ACF2P2) 201 which is an embodiment of this invention.

The ACF2P2 cell frame has a 10-byte header and a 60-byte payload. The header consists of:

1. Global Codes Addressing & Global Gateway Nucleus Switches

The Global Code 102 which are used to identify the geographical region in the world where the cell frame device is located. There is four Global Codes that divides the world in the geographical and economics regions. The four Attobahn regions mimic the four world business regions:

North America (NA)

Europe, Middle East & Africa (EMEA)

Asia Pacific (ASPAC)

Caribbean Central & South America (CCSA)

Figure 14:
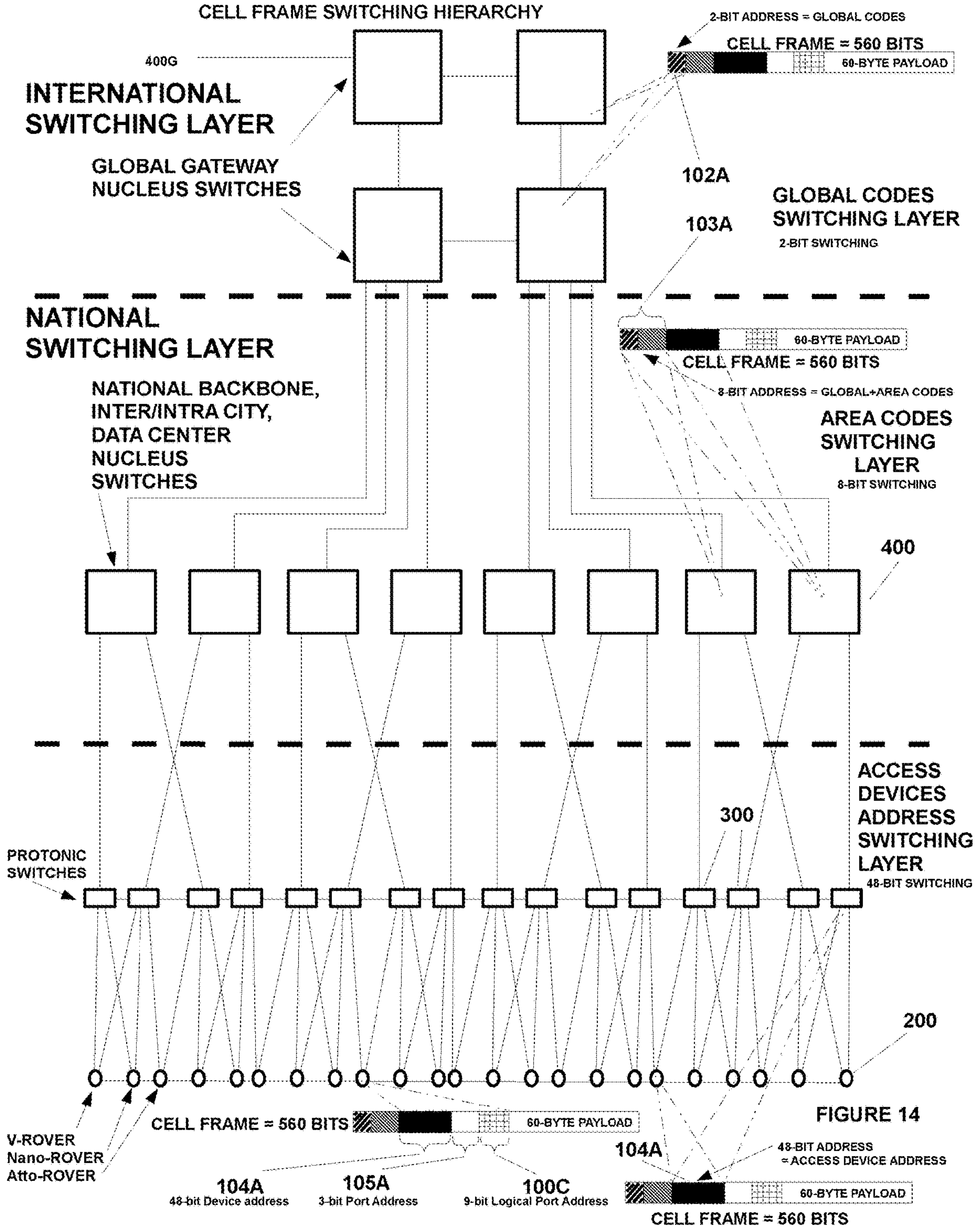
FIG. 14 is an illustration of Attobahn Cell Frame Switching Hierarchy which is an embodiment of this invention.

As illustrated in FIG. 14 which is an embodiment of this invention, each Global Code in the ACF2P2 cell frame utilizes the first two bits (bit-1 and bit-2) 102A of the 560-bit frame. The Attobahn Global Gateway and National Backbone Nucleus Switches 300 are the only devices in the network that read these two bits and use their values to make switching decisions. This network switching design strategy reduces the latency that each cell frame endures through the Global Gateway and National Backbone Nucleus Switches, thus increasing the switching speed of these switches. Therefore, these switches make their switches decisions on only two bit and completely ignores the other 558 bits in the cell frame. The switching tables of these switches are very small and greatly reduce the cell processing time in each switch. Hence these switches have a very high capacity of switching cells frames at high speeds.

The Global Gateway Nucleus Switches send the cell frame to its output port that connects to the National Backbone Nucleus Switch with the Global Code where the frame is designated to terminate. The Backbone switch reads only the Area Code 6-bit address 103 of the 650-bit frame that came in from the Global Gateway Switch and routes it into the domestic network associated with the designated Area Code. 2. Arca Codes Address & National, City & Data Centers Nucleus Switches The ACF2P2 uses 6 bits to represent the 64 Area Codes of the network and the countries that specific Inter/Intra City and Data Center Nucleus Switches 300 are distributed across. As shown in FIG. 13, each Global Code has 64 Area Codes 103 beneath them and encompasses bit-3 to bit-8 of the 560-bit frame which is an embodiment of this invention.

The National, inter/intra city, and data center Nucleus Switches are the only devices that read and make switching decisions based on the Area Codes six (6) bits and the Global Codes two (2) bits 103A. These switches do not read the access devices' addresses but focus only on the first 8 bits of the cell frame as shown in FIG. 14.

These switches accept the cell frames from the Protonic Switches 300 as shown in FIG. 13 which is an embodiment of this invention, and analyze the first two bits to determine if the cell frame is designated for a system within its Global Code or for a foreign Global Code. If the cell frame is designated for its local Global Code, the Nucleus switch examines the next six bits to establish which Area Code to send the frame. If the Global Code is not local, then the Nucleus Switch only reads the first two bits in the frame and does not bother to look at the next six Area Code bits because it is not necessary since the frame will leave the neighborhood. The switch hands off the cell frame to the nearest Global Gateway switch associated with its geographical area.

This effective switching methodology of only reading and analyzing the two Global Code bits, in the case of dealing with a foreign Global Code, that simplifies the network switching processing and subsequently radically reducing the switching time or latency. This switching design also reduces the size of the switching tables in the Nucleus Switches because they only have to deal with first two or eight bits 103A of each cell frame. 3. Access Devices Addresses & Switching The ACF2P2 uses 48 bits to represent the access network devices addresses 104 such as the V-ROVER 200, Nano-ROVER 200, and Atto-ROVER 200. Also, the Protonic Switches read these addresses to make switching decision to connect access devices within their molecular domain. As shown in FIG. 13, each access device address encompasses bit-9 to bit-64 of the 560-bit frame which is an embodiment of this invention.

As illustrated in FIG. 13V-ROVER 200, Nano-ROVER 200, Atto-ROVER 200, the Protonic Switches are the only devices that read and make switching decisions based on the 48 bits from bit positions 9 to 64 bits 104. These devices switching functions as shown in FIG. 14 do not read the Global and Area Codes but focus only on the bits 9-64 addresses 104A of the cell frame.

As illustrated in FIG. 14 which is an embodiment of this invention, the V-ROVERS, Nano-ROVERs, and Atto-ROVERs read each cell frame's bit 9 to bit 64, i.e., 48 bits 104A, to determine if the frame is designated to terminate in its device. If is designated for that V-ROVERS, Nano-ROVERs, and Atto-ROVERs device, then it reads the next three bits, bit 65 to bit 67 i.e., the 3 bits 105A which is the port address 105 (FIG. 12) and identify which of its eight (8) ports to terminate the cell frame. The device at this point reads the next 9 bits from bit 68 to bit 76, the logical port address 100C. The Rover selects the correct logical port address from those nine (9) bits, where the payload data is sent to the decryption process to restore the original application data.

The V-ROVERS, Nano-ROVERs, and Atto-ROVERs access devices primary focus when they examine a cell frame is to first analyze the 48-bit access device destination address. After analysis of this address, once the cell frame is not designated for that access device, it immediately looks up its switching tables, to see if the address matches one of its two neighboring access devices. If the frame is designated for one of them, then the device switch that frame to its designated neighbor. If the frame is not designated for one of it neighbor, the frame is sent to its primary adopted Protonic Switch. This design arrangement allows the device to rapidly switch cell frames by only reading the 48-bit address for the access devices and completely ignoring the Global Code, Area Code, Port, and Logical port addresses. This reduces latency through the access devices and improving the switching times in the overall network infrastructure which is an embodiment of this invention. 4. Protonic Address Switching As illustrated in FIGS. 13 and 14.0 which is an embodiment of this invention, the Protonic Switches act as the switching glue between the Area Codes and Global Codes Nucleus Switches and the access devices (V-ROVERS, Nano-ROVERs, and Atto-ROVERs). These switches only focus on the 48-bit access devices 104 in FIGS. 13.0 and 104A in FIG. 14, and ignore all Global Codes, Area Codes, access devices hardware and logical ports addresses in the cell frame. This switching approach at the intermediate level of Attobahn network switching architecture layers the switching responsibility across the network which reduces the processing time within the switches and access devices. This improves the efficiency and switching latency across the infrastructure.

The Protonic Switch receives cell frames from access devices and examines the 48-bit access device address from bit 9 to bit 56 in the frame 104A. The Switch looks up its switching tables to determines if the designated address is within its molecular domain and if it is then the frame is switched to access device of interest. If the address is not within the Protonic Switch domain, the cell frame is switch to the one its two connected Intra City Nucleus Switch as illustrated in FIG. 13 which is an embodiment of this invention.

Figure 15:
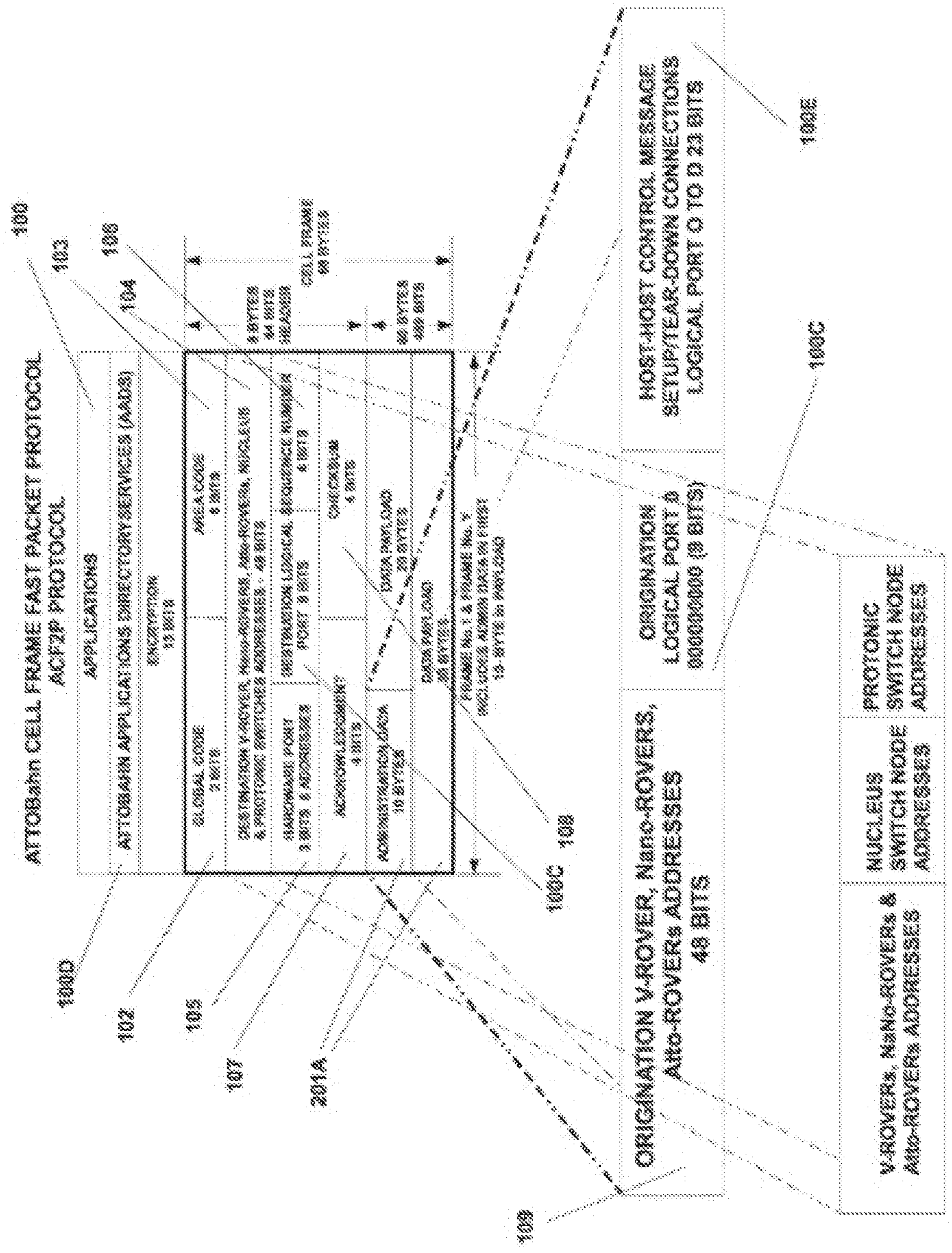
FIG. 15 is an illustration of Attobahn's cell frame fast packet protocol (ACFP) with a breakdown of the Admin logical port description which is an embodiment of this invention.
Figure 16:
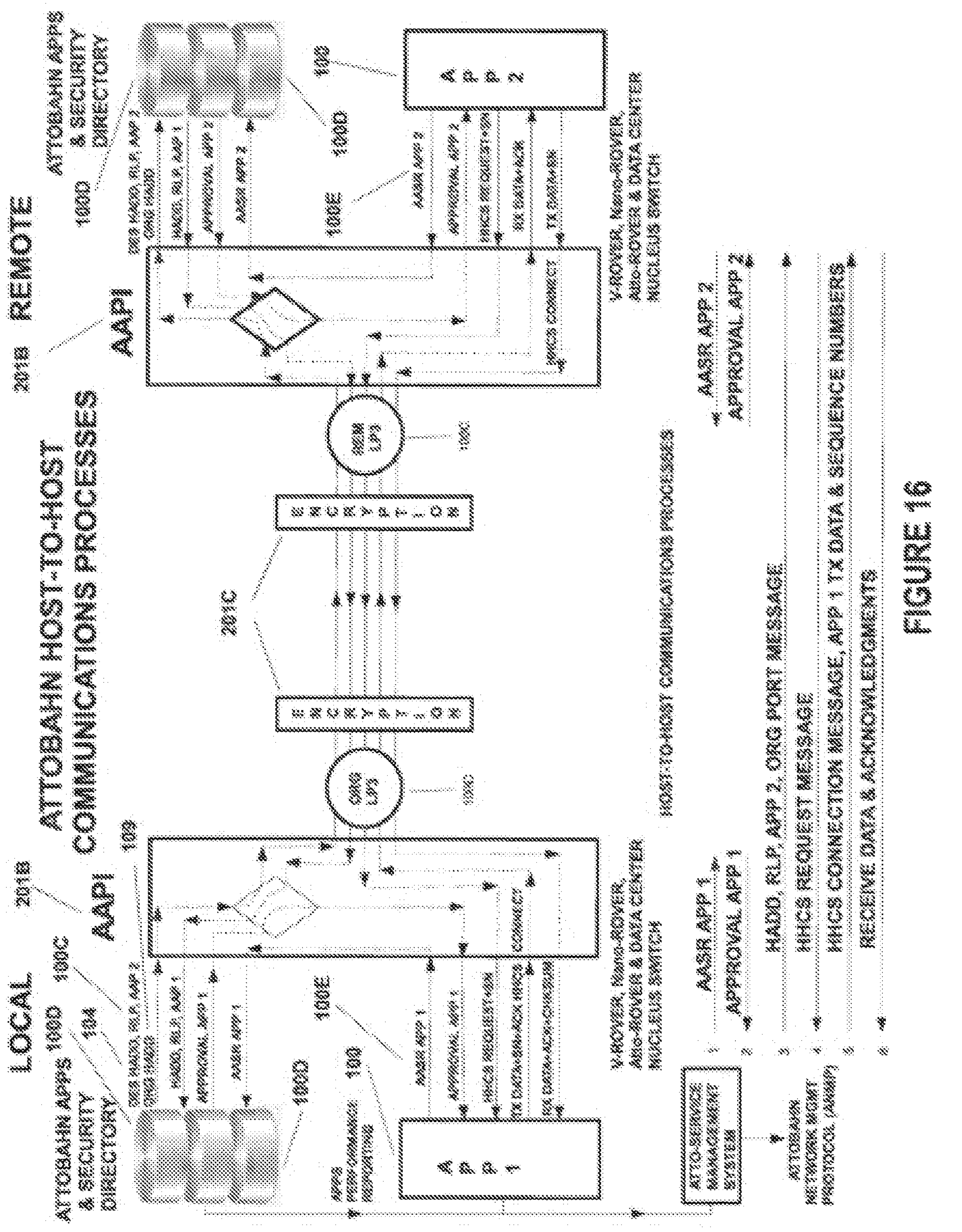
FIG. 16 is an illustration of Attobahn's host-to-host communications processes which is an embodiment of this invention.

If the cell frame is within the Protonic Switch molecular domain, the switch sends the cell frame to the designated access device. 5. Host-to-Host Communications FIGS. 15 and 16.0 show the cell frame protocol which is an embodiment of this invention. When a native Attobahn application, APP 1 needs to communicate with a corresponding APP 2 service across the network, the following processes are activated:

1. The APP 1100 requesting service sends out a Attobahn APP Service Request (AASR) 100E message to communicate with APP 2, as illustrated in FIGS. 15 and 16.0 which is an embodiment of this invention, to the local Attobahn Applications & Security Directory Service (ASDS) 100D.
2. After the local Attobahn Applications & Security Directory Service (ASDS) 100D, as illustrated in FIGS. 15 and 16.0 which is an embodiment of this invention, receives the AASR message. It checks the database for the remote APP 2; its associated logical port address 100C; the Attobahn remote network Destination hardware resource (V-ROVER, Nano-ROVER, Atto-ROVER, or Data Center Nucleus Switch) address 104, where the application's computing system is connected; and the Originating hardware resource address 109 associated with APP 1.
3. The local ASDS Security carries out an authentication check to determine if the end user has rights to request the desire service at APP 2. If the rights are given, then the local ASDS sends the approval message to the APP 1. If the rights are not given, then the request is denied. Simultaneously, the APPI uses the approval information obtained from the local ASDS to activate the Encryption 201C process to the assigned local Logical Port (LP 3100C) to protect all data that traverses the port.
4. Next, the AAPI 201B sends out the message from the local ASDS with the remote APP 2; its associated Logical Port LP 3100C address; the Attobahn remote network hardware resource (V-ROVER, Nano-ROVER, Atto-ROVER, or Data Center Nucleus Switch) address, where the application's computing system is connected; and the Originating hardware resource address associated with APP 1 to the remote network device ASDS.

The remote ASDS receives the message for access to APP 2 and carries out security authentication checks to see if the requesting APP 1 has the rights to access APP 2. If the requesting APP 1 is approved, then access is given to the requested APP 2 via its assigned logical port. If APP 1 request is not approved by the remote ASDS, then access to APP 2 is denied.

5. After the APP Authentication process, the remote AAPI opens connection to that logical port and APP 2.
6. The encryption process for the selected logical port is activated for all out going APP 2 data designated for the requesting APP 1.
7. Once the encryption is turned on, the remote AAPI sends back a Host-to-Host Communication Service (HHCS) control message to set up a connection between APP 1 and APP 2.

8. The HHCS connection setup immediately invokes the 4-bit sequence number (SN) 106 that labels each cell frame from 0-15 numbering sequence. This process allows up to 16 outstanding cell frames between two logical ports and their associated applications' communications across the Attobahn network.
9. Each cell frame is acknowledged when it is received by the distant end logical port. The acknowledgment (ACK) 4-bit word 107 is sent to the sending end that the cell frame originated. The ACK word is an exact replica of the sent cell frame sequence number. When a cell frame is sent out with its sequence number, that same sequence number value is sent back in ACK value to the originating end.

If sixteen frames ranging from 0-15 4-bit sequence numbers are sent out and the acknowledgment of 0-15 4-bit ACK numbers within that range is not return and a new sequence of 0-15 4-bit words are received, then a frame was not received and that missing frame ACK number correlating to the missing frame sequence number is retransmitted by the APPI.

As an example, if frames sequence numbers (SN) 0-15, i.e. 0000 to 1111 is send over the network from one logical port to a distant access device logical port. The sequence number 0000 to 1110 is received but not SN 1111, then the AAPI at the distant access device will send back ACK numbers 0000 to 1110 but not 1111, since it was not received.

While the originating access device continues to send a new group of SN 0000 to 1111 and the distant end starts to send back ACK number 0000 before the first group ACK 1111 was received, the AAPI at the originating end will immediately recognized that cell frame 1111 associated with the first group of sixteen frames was not received. Once the originating access device AAPI recognizes that frame 1111 was not acknowledged, it immediately retransmits the lost frame. This cell frame sequence numbering and acknowledgment processes as illustrated in FIGS. 14 and 15.0 is an embodiment of this invention.

The AAPI allows a maximum of sixteen outstanding frames as illustrated in FIG. 16 which is an embodiment of this invention. A copy of the sixteen frames that were sent is kept in memory until they are all acknowledged from the distant access device AAPI, and that ACK is received by the originating access device AAPI. Once these frames are acknowledged, then the originating device remove them from memory.

11.0 As illustrated in FIGS. 15 AND 16.0 which is an embodiment of this invention, each cell frame is accompanied with a checksum of 4 bits to ensure integrity of the data bits received at both ends of the host-to-host communication across Attobahn network.

12.0 When an APP on the remote device needs to communicate with another APP across the network the processes described from step 1.0 to 9.0 is repeated as illustrated in FIGS. 11 and 16.0 which is an embodiment of this invention. 6. Connection Oriented Protocol The Attobahn Cell Frame Fast Packet Protocol is a connection oriented protocol as shown in FIGS. 15.0 and 16.0 which is an embodiment of this invention. The cell frame consists of a 10-byte overhead that includes the Global Codes 102, Area Codes 103, Destination Devices Addresses 104, Destination Logical port 100C, hardware port number 105, frame sequence number bits 106, acknowledgment bits 107, the check sum bits 108, and the 480-bit payload 201A.

The protocol is designed to have only the Destination Device Address 104 in the overhead bits of each cell frame and does not carry the origination device address in the overhead bits. This design arrangement reduces the amount of information that the V-ROVER, Nano-ROVERs, Atto-ROVERs, Protonic Switches, and Nucleus Switches have to process. The Origination Device Address is sent once to the destination device throughout the entire host-to-host communications.

The origination address 109 is contained in the cell frame payload first 48 bits as shown in FIG. 15 which is an embodiment of this invention. The first cell frame that carries the Local APP 1 message from the ASDS to the Remote ASDS to request access to communicate with AAP 2 contains the Origination Device Address 109, the Logical Port 0 that is associated with the Attobahn ADMIN APP 100F (FIG. 6), the Remote Logical Port 100C associated with APP 2 ID information.

The Origination address is placed into the initial cell frame payload's first 48 bits via the Attobahn ADMIN APP that is connected to Logical Port 0 100C as illustrated in FIG. 6, which is an embodiment of this invention. The Logical Port 0 address 100C is also assigned into bit 49 to 57 of the first cell frame sent to the remote access device. Once the Origination address is received at the remote end and the host-to-host communications is established, the two logical ports 100C are connected for the duration of the communications between the APP 1 and APP 2. This connection allows both Attobahn device to only use the destination address of each device to send data (cell frames) between them. The Origination Address from APP 1 is not needed anymore since the connection between the APPs remains up until their purpose is accomplished and the connection is tear down.

The ADMIN APP is only used to send network administration data such as Origination Hardware Address, network public messages, and members announcements network operational status updates, etc.

V-Rover Design 1. Physical Interfaces

Figure 17:
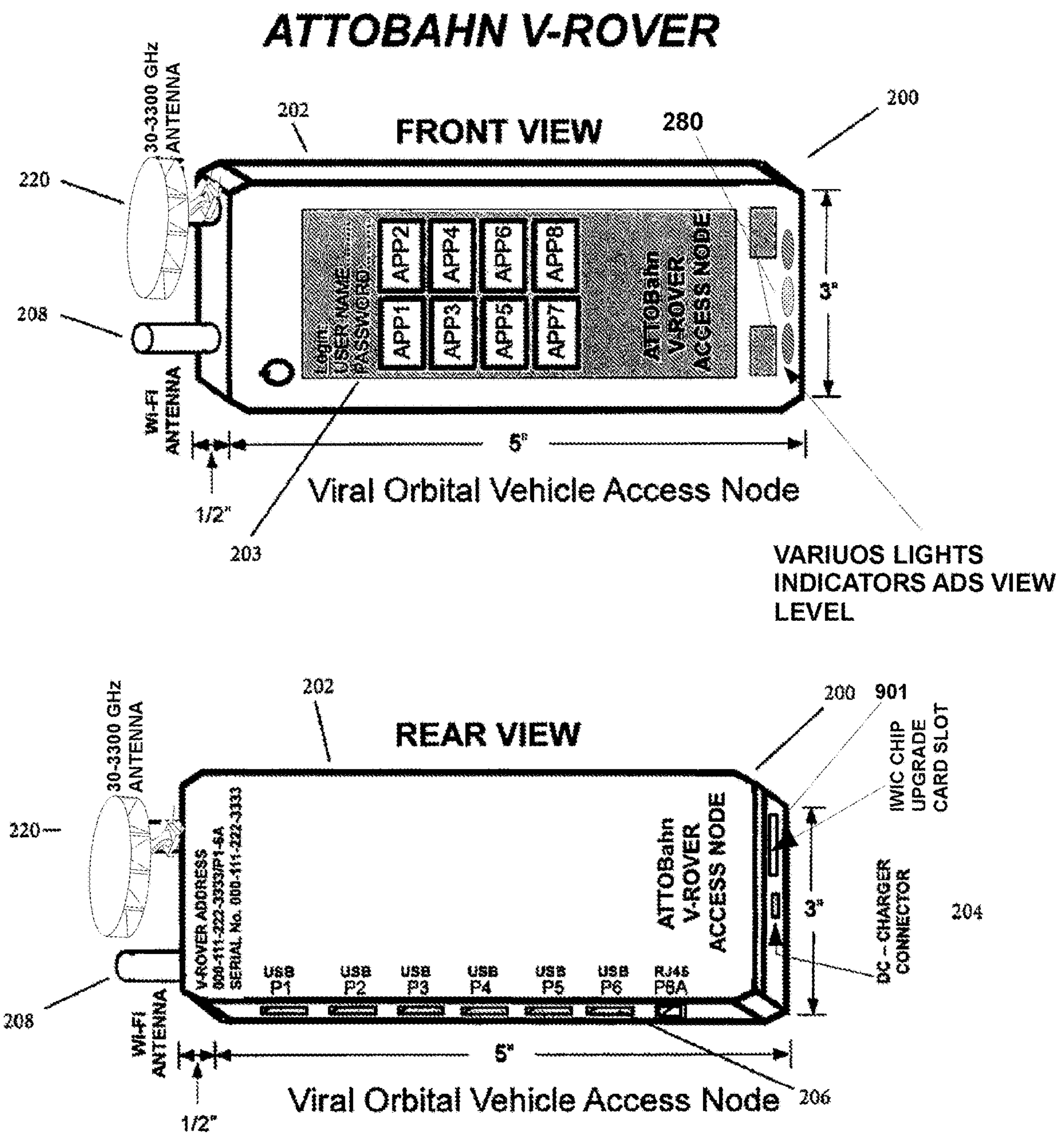
FIG. 17 is an illustration of the Viral Orbital Vehicle V-ROVER access communications device housing front and non-connector ports side views which is an embodiment of the invention.

As an embodiment of this invention FIG. 17(A,B) shows the Viral Orbital Vehicle, V-ROVER communications device 200 that has a physical dimension of 5 inches long, 3 inches wide, and ½ inch high. The device has a hard, durable plastic cover chasing 202 with a glass display screen 203 on the front of the device. The device is equipped with a minimum of 8 physical ports 206 that can accept high-speed data streams, ranging from 64 Kbps to 10 GBps from Local Area Network (LAN) interfaces which is not limited to a USB port, and can be a high-definition multimedia interface (HDMI) port, an Ethernet port, a RJ45 modular connector, an IEEE 1394 interface (also known as FireWire) and/or a short-range communication ports such as a Bluetooth, Zigbee, near field communication, or infrared interface that carries TCP/IP packets or data streams from the Attobahn Application Programmable Interface (AAPI); PCM Voice or Voice Over IP (VOIP), or video IP packets.

The V-ROVER device has a DC power port 204 for a charger cable to allow charging of the battery in the device. The device is designed with high frequency RF antenna 220 that allows the reception and transmission of frequencies in the range of 30 to 3300 GHz. In order to allow communications with WiFi and WiGi, Bluetooth, and other lower frequencies system, the device has a second antenna 208 for the reception and transmission of those signals.

ADS Monitoring & Viewing Level Indicators

As shown in FIG. 17(A) which is an embodiment of this invention, the V-ROVER has three bevel indent holes 280 equipped with three LED lights/Indicators, on the front face of the glass display. These lights are used as indicators for the level of Advertisements (ADS) viewed by the household, business office, or vehicle recipients/users within them.

The LED light/Indicator ADS indicators operates in the following manner:

1. Light/Indicator A LED lights up when the user of the Attobahn broadband network services was exposed to a specific high number of ADS per month.
2. Light/Indicator B LED lights up when the user of the Attobahn broadband network services was exposed to a specific medium number of ADS per month.
3. Light/Indicator C LED lights up when the user of the Attobahn broadband services was exposed to a specific low number of ADS per month.

These LEDs are controlled by the ADS APP of the APPI located on Logical Port 13 Attobahn Ads APP address EXT=0.00D, Unique address.EXT=32F310E2A608FF.00D. The ADS APP drives the ADS views—text, image, and video to the viewer display screens (cellphones, smartphones, tablets, laptops, PCs, TVs, VRs, gaming systems, etc.) and is designed with a ADS counter that keeps track of every AD that is shown on these displays. The counter feds the three LEDs to turn them on and off when the displayed ADS amounts meet certain thresholds. These displays let the user know how many ADS they were exposed at any given instant in time. This AD monitoring and indications levels are an embodiment of this invention on the V-ROVER device.

Figure 18:
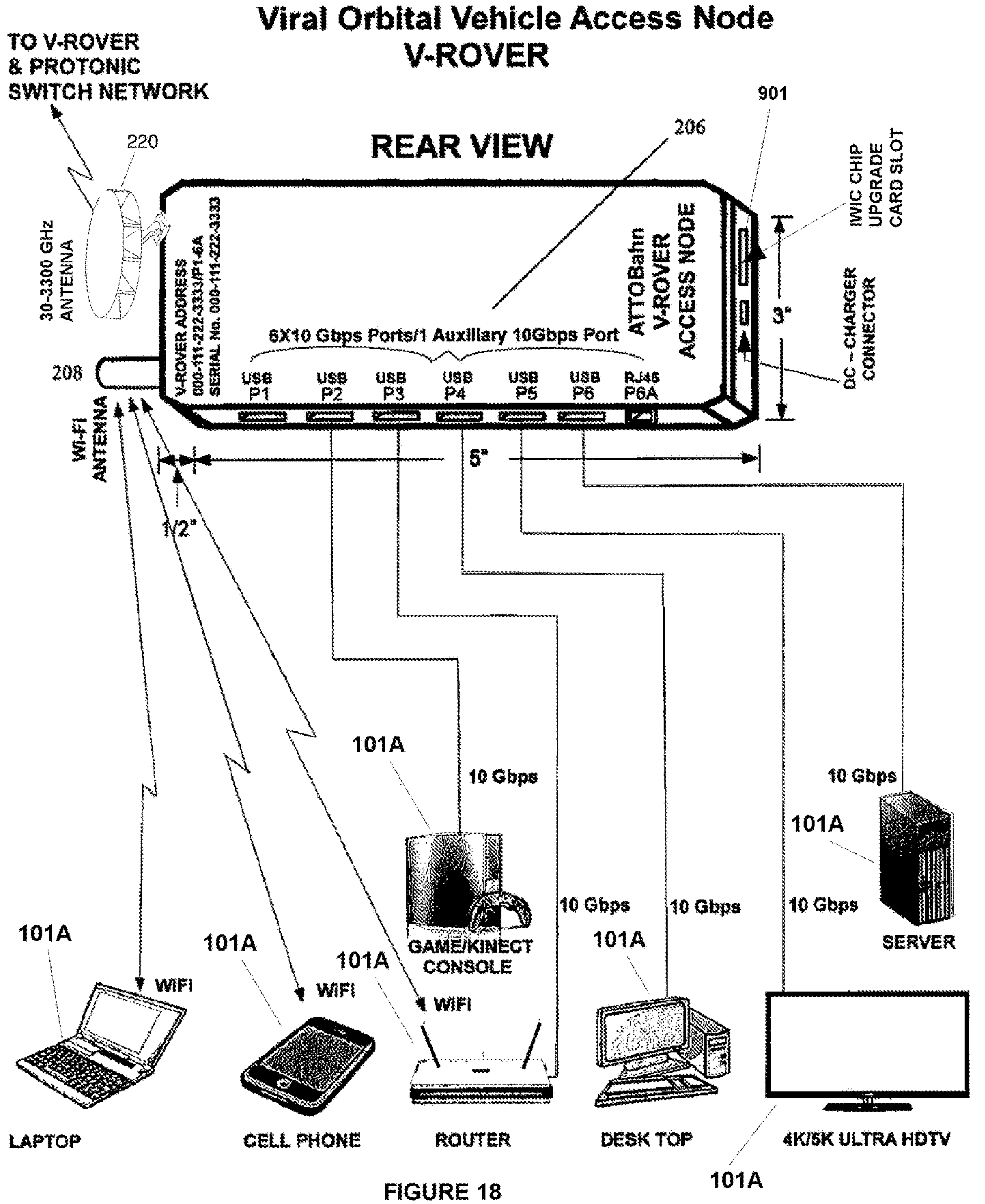
FIG. 18 shows the Viral Orbital Vehicle V-ROVER access node communications device housing rear, connector ports side, and the DC power connector bottom views with the device connected to a series of typical end user systems which is an embodiment of the invention.
Figure 19:
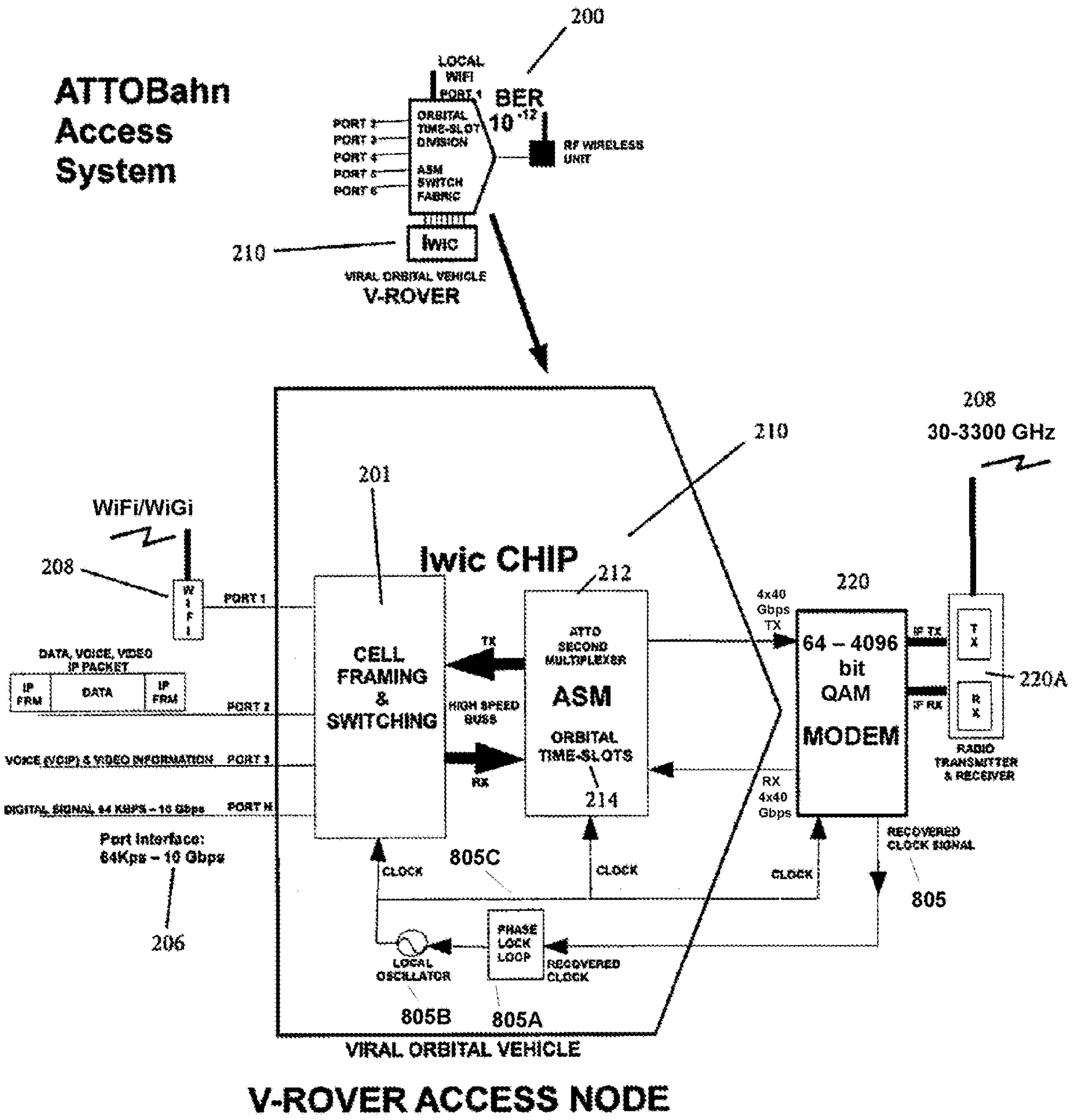
FIG. 19 is a series of block diagrams that illustrates the internal operations of the Viral Orbital Vehicle V-ROVER access node communications device on end user information and digital streams which is an embodiment of this invention.

As display in FIG. 8 which is an embodiment of this invention, the ADS APP also provides the ADS Monitor & Viewing Level Indicator to be displayed on the display screens (cellphones, smartphones, tablets, laptops, PCs, TVs, VRs, gaming systems, etc.) of the end user. The ADS Monitor & Viewing Level Indicator (AMVI) displays on the user screen in the form of a vertical bar that superimposes itself over whatever is being shown on the screen. The AMVI vertical bar follows the same color indications as the ones displayed on the front face glass bevels of the V-ROVERs, Nano-ROVERs, and Atto-ROVERs. The vertical bar AMVI are designed to display on the user screen as follows:

1. The light/indicator A on the vertical bar becomes bright (while light/indicator B and C remain faint) when the user of the Attobahn broadband network services was exposed to a specific high number of ADS per month.
2. The light/indicator B on the vertical bar becomes bright (while light/indicator A and C remain faint) when the user of the Attobahn broadband network services was exposed to a specific medium number of ADS per month.
3. The light/indicator C on the vertical bar becomes bright (while light/indicator A and B remain faint) when the user of the Attobahn broadband services was exposed to a specific low number of ADS per month. 2. Physical Connectivity As an embodiment of this invention FIG. 18 shows the physical connectivity between the V-ROVER device ports 206; WiFi and WiGi, Bluetooth, and other lower frequencies antenna 208; and the high frequency RF antenna 220 and 1) end user devices and systems but not limited to laptops, cell phones, routers, kinetic system, game consoles, desktop PCs, LAN switches, servers, 4K/5K/8K ultra high definition TVs, etc.; 2) and to the Protonic Switch. 3. Internal Systems As an embodiment of the invention FIG. 19 shows the internal operations of the V-ROVER communications devices 200 with. The end user data, voice, and video signals enters the device ports 206 and low frequency antenna (WiFi and WiGi, Bluetooth, etc.) 208 and are clock into the cell framing and switching system using the highly-stabilized clocking system 805C with its internal oscillator 805B and phase lock loop 805A that is referenced to the recovered clocking signal obtained from the demodulator section of the modem 220 received digital stream. Once the end user information is clock into the cell framing system, it is encapsulated into the viral molecular network cell framing format, where an Origination address, located in frame 1 of host-host communications between the local and remote Attobahn network device (see FIGS. 15.0 and 16.0 for more detail information the Originating Address) and destination ports 48-digit number (6-byte) schema address headers, using a nibble of 4 bytes per digit are inserted in the cell frame 10-byte header. The end user information stream is broken into 60-byte payloads cells which are accompanied with their 10-byte headers.

Figure 20:
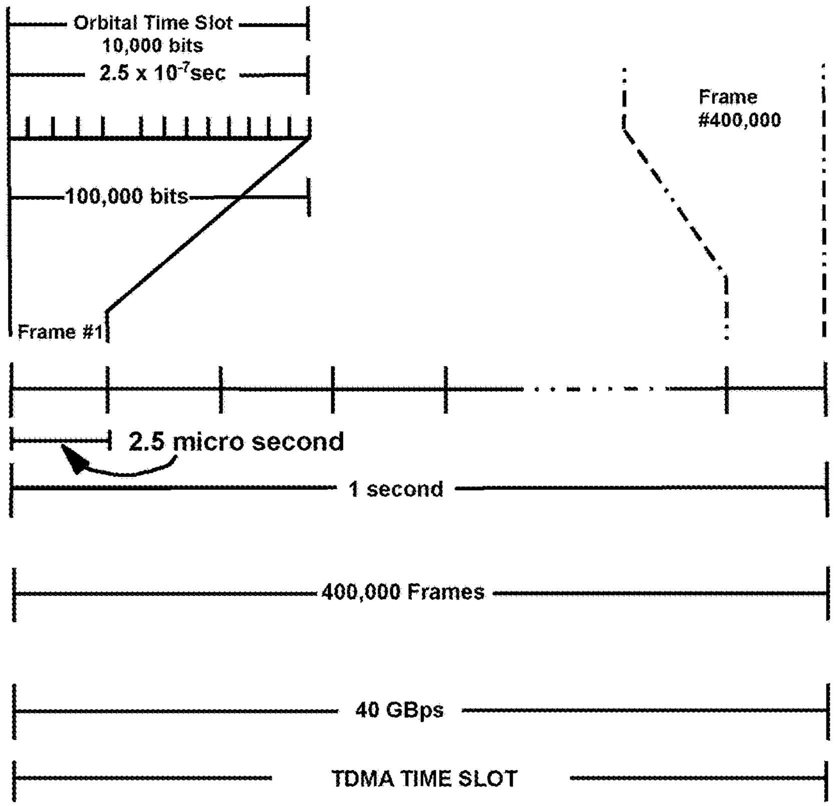
FIG. 20 illustrates the Atto Second Multiplexer (ASM) time division frame format of the digital cell frame stream which is an embodiment of this invention.
Figure 21:
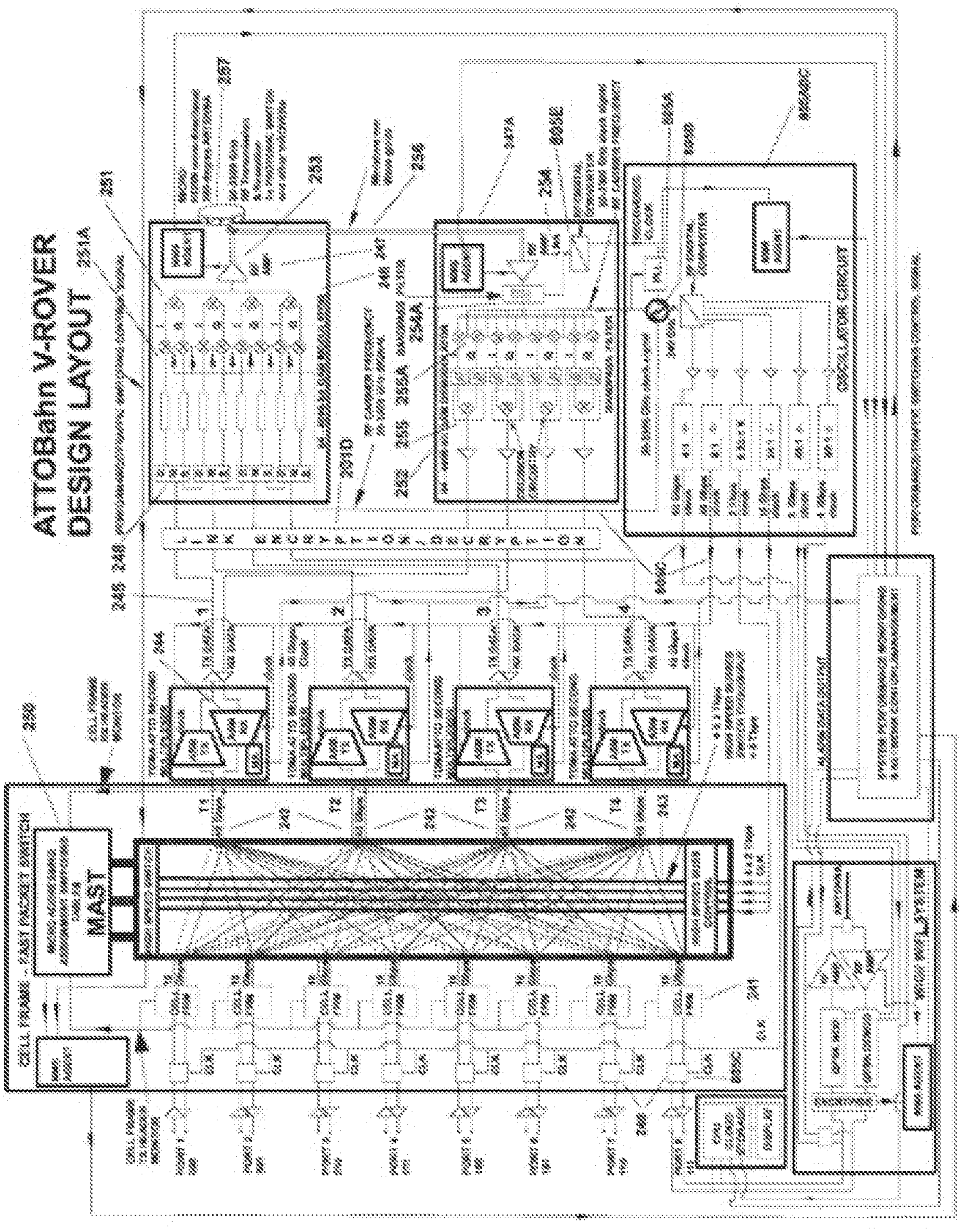
FIG. 21 illustrates the V-ROVER technical schematic layout of its cell frame switching fabric, ASM, QAM modems, RF amplifier and receiver, management system, and CPU which is an embodiment of this invention.

As illustrated in FIG. 19 which is an embodiment of this invention, the cell frames are placed onto the Viral Orbital Vehicle (V-ROVER, Nano-ROVER, and Atto-ROVER) high-speed bus and delivered to the cell switching section of the IWIC Chip 210. The IWIC Chip switches the cell and sent it via the high-speed bus to the ASM 212 and placed into a specific Orbital Time Slot (OTS) 214 for transport the signal to the Protonic Switch or one of its neighboring Viral Orbital Vehicle if the traffic is staying local within the atomic molecular domain. After the cell frames passes through the ASM, they are submitted to the 4096-bit QAM modulator of the modem 220. The ASM develops four high-speed digital streams that are sent to the modem and after individually modulating each digital stream into four intermediate frequency (IF) signals. The four IFs are sent to the RF system 220A mixer stage where the IF frequencies are mixed with their RF carriers (four RF carriers per Viral Orbital Vehicle device) and transmitted over the antenna 208.4. TDMA ASM Framing & Time Slots As an embodiment of the invention FIG. 20 illustrates the ASM 212 framing format that consists of Orbital Time Slots (OTS) 214 of 0.25 micro second that moves 10,000 bits within that time period. Ten (10) OTS 214A frames of 0.25 micro-second makes up one ASM frame with an orbital period of 2.5 micro second. The ASM circuitry moves 400,000 ASM frames 212A per second. The OTS 10,000 bits every 0.25 micro-second results in 40 GBps. This framing format is developed in the Viral Orbital Vehicle, Protonic Switch, and the Nucleus Switch across the Viral Molecular network. Each of these frames are placed into a time slot of the Time Division Multiple Access (TDMA) frame that communicates with both the Protonic Switch and neighboring ROVERs. 5. V-Rover System Schematics FIG. 21 is an illustration of the V-ROVER design circuitry schematics which is an embodiment of this invention, gives a detailed layout of the internal components of the device. The eight (8) data ports 206 are equipped with input clocking speed of 10 GBps that is synchronized to derived/recovered clock signal from the network Cesium Beam oscillator with a stability of one part in 10 trillion. Each port interface provides a highly stable clocking signal 805C to time in and out the data signals from the end user systems. End User Port Interface The ports 206 of the V-ROVER consists of one (1) to eight (8) physical USB; (HDMI); an Ethernet port, a RJ45 modular connector; an IEEE 1394 interface (also known as FireWire) and/or a short-range communication ports such as a Bluetooth; Zigbee; near field communication; WiFi and WiGi; and infrared interface. These physical ports receive the end user information. The customer information from a computer which can be a laptop, desktop, server, mainframe, or super computer; a tablet via a WiFi or direct cable connection; a cell phone; voice audio system; distribution and broadcast video from a video server; broadcast TV; broadcast radio station stereo, audio announcer video, and radio social media data; Attobahn mobile cell phone calls; news TV studio quality TV systems video signals; 3D sporting events TV cameras signals, 4K/5K/8K ultra high definition TV signals; movies download information signal; in the field real-time TV news reporting video stream; broadcast movie cinema theaters network video signals; a Local Area Network digital stream; game console; virtual reality data; kinetic system data; Internet TCP/IP data; nonstandard data; residential and commercial building security system data; remote control telemetry systems information for remote robotics manufacturing machines devices signals and commands; building management and operations systems data; Internet of Things data streams that includes but not limited to home electronic systems and devices; home appliances management and control signals; factory floor machinery systems performance monitoring, management; and control signals data; personal electronic devices data signals; etc.

Micro Address Assignment Switching Tables (Mast)

The V-ROVER port clocks in each data type via a small buffer 240 that takes care of the incoming data signal and the clocking signal phase difference. Once the data signal is synchronized with the V-ROVER clocking signal, the Cell Frame System (CFS) 241 scrips off a copy of the cell frame Destination Address and sends it to Micro Address Assignment Switching Tables (MAST) system 250. The MAST then determines if the Destination Address device ROVER is within the same molecular domain (400 V-ROVERs, Nano-ROVERs, and Atto-ROVERs) as the Originating Address ROVER device.

If the Origination and Destination addresses are in the same domain, then the cell frame is switch via anyone of the four 40 GBps trunk ports 242 where the frames is transmitted either to the Protonic Switches or the neighboring ROVERs. If the cell frames Destination Address is not in the same molecular domain as the Origination Address ROVER device, then the cell switch switches the frame to trunk port 1 and 2 which are connected to the two Protonic Switches that control the molecular domain.

The design to have a frame whose Destination Address ROVER device is not within the local molecular domain, be automatically sent to the Protonic Switching Layer (PSL) of the network, is to reduce the switching latency through the network. If this frame is switched to one of the neighboring ROVERs, instead of going directly to a Protonic Switch, the frame will have to transit many ROVER devices, before it leaves the molecular domain to its final destination in another domain.

Switching Throughput

The V-ROVER cell frame switching fabric which is an embodiment of this invention, uses a four (4) individual busses 243 running at 2 TBps. This arrangement gives each V-ROVER cell switch a combined switching throughput of 8 GBps. The switch can move any cell frame in and out of the switch within an average of 280 picoseconds. The switch can empty any of the 40 GBps trunks 242 of data within less than 5 milliseconds. The four (4) 40 GBps data trunks' 242 digital streams are clock in and out of the cell switch by 4×40 GHz highly stable Cesium Beam 800 (FIG. 107) reference source clock signal which is an embodiment of this invention.

Atto Second Multiplexing (ASM)

The V-ROVER ASM four trunks signals are fed into the Atto Second Multiplexer (ASM) 244 via the Encryption System 201C. The ASM places the 4×40 GBps data stream into the Orbital Time Slot (OTS) frame as displayed in FIG. 19. The ASM ports 245 one (1) and two (2) output digital streams are inserted into the TDMA time slots then send to the QAM modulators 246 for transmission across the millimeter wave radio frequency (RF) links. The ASMs receive TDMA digital frames from the QAM demodulators, demultiplex the TDMA time slot signal designated for its V-ROVER and OTS back into the 40 GBps data streams. The cell switch trunk ports 242 monitor the incoming cell frames from the two Protonic Switches (always on ASM Port 1 and 2 and cell switch T1 and T2) and the two neighboring ROVERs (always on ASM Port 3 and 4 and cell switch T3 and T4).

The cell switch trunks monitor the four incoming 40 GBps data streams 48-bit Destination Address in the cell frames and sent them to the MAST 250. The MAST examines the addresses and when the address for the local ROVER is identified, the MAST reads the 3-bit physical port address and instructs the switch to switch those cell frames to their designated ports.

When the MAST determines that a 48-bit Destination Address is not for its local ROVER or one of its neighbors, then it instructs the switch to switch that cell frame to T1 or T2 toward the one of the two Protonic Switches. If the address is one of the neighboring ROVERs, the MAST instructs the switch to switch the cell frame to the designated neighboring ROVER.

Link Encryption

The V-ROVER ASM two trunks terminate into the Link Encryption System 201D. The link Encryption System is an additional layer of security beneath the Application Encryption System that sits under the AAPI as shown in FIG. 6.

The Link Encryption System as shown in FIG. 21 which is an embodiment of this invention, encrypts all four of the V-ROVER's 40 GBps data streams that comes out from the ASMs. This process ensures that cyber adversaries cannot see Attobahn data as it traverses the millimeter wave spectrum. The Link Encryption System uses a private key cypher between the ROVERs, Protonic Switches, and Nucleus Switches. This encryption system at a minimum meets the AES encryption level but exceeds it in the way the encryption methodology is implemented between the Access Network Layer, Protonic Switching Layer, and Nucleus Switching Layer of the network.

QAM Modem

The V-ROVER Quadrature Amplitude Modem (QAM) 246 as shown in FIG. 21 which is an embodiment of this invention, is a four-section modulator and demodulator. Each section accepts a digital baseband signal of 40 GBps that modulates the 30 GHz to 3300 GHz carrier signal that is generated by local Cesium Beam referenced oscillator circuit 805ABC. QAM Modem Maximum Digital Bandwidth Capacity The V-ROVER QAM modulator uses a 64-4096-bit quadrature adaptive modulation scheme. The modulator uses an adaptive scheme that allows the transmission bit rate to vary according to the condition of the millimeter wave RF transmission link signal-to-noise ratio (S/N). The modulator monitors the receive S/N ratio and when this level meets its lowest predetermined threshold, the QAM modulator increases the bit modulation to its maximum of 4096-bit format, resulting in a 12:1 symbol rate. Therefore, for every one hertz of bandwidth, the system can transmit 12 bits. This arrangement allows the V-ROVER to have a maximum digital bandwidth capacity of 12×24 GHz (when using a bandwidth 240 GHz carrier)=288 GBps. Taking all four of the V-ROVER240 GHz carriers, the full capacity of the ROVER at a carrier frequency of 240 GHz is 4×288 GBps=1.152 TBps.

Across the full spectrum of Attobahn millimeter wave RF signal operation of 30-3300 GHz, the range of V-ROVER at maximum 4096-bit QAM will be:

$$30\text{ GHz carrier, 3 GHZ bandwidth: } 12\times 3\text{ GHz}\times 4\text{ Carrier Signals} = 144\ GBps\text{ (Giga Bits per second)}$$

$$3300\text{ GHZ, 330 GHz bandwidth: } 12\times 330\text{ GHz}\times 4\text{ Carrier Signals} = 15.84\ TBps\text{ (Tera Bits per second)}$$

Therefore, the V-ROVER has a maximum digital bandwidth capacity of 15.84 TBps.

QAM Modem Minimum Digital Bandwidth Capacity

The V-ROVER QAM modulator monitors the receive S/N ratio and when this level meets its highest predetermined threshold, the QAM modulator decreases the bit modulation to its minimum of 64-bit format, resulting in a 6:1 symbol rate. Therefore, for every one hertz of bandwidth, the system can transmit 6 bits. This arrangement allows the V-ROVER to have a maximum digital bandwidth capacity of 6×24 GHZ (when using a bandwidth 240 GHZ carrier)=1.44 GBps. Taking all four of the V-ROVER240 GHz carriers, the full capacity of the ROVER at a carrier frequency of 240 GHz is 4×1.44 GBps=5.76 GBps.

Across the full spectrum of Attobahn millimeter wave RF signal operation of 30-3300 GHz, the range of V-ROVER at minimum 64-bit QAM will be:

$$30\text{ GHz carrier, 3 GHZ bandwidth: } 6\times 3\text{ GHz}\times 4\text{ Carrier Signals} = 72\ GBps\text{ (Giga Bits per second)}$$

$$3300\text{ GHz, 330 GHz bandwidth: } 6\times 330\text{ GHz}\times 4\text{ Carrier Signals} = 7.962\ TBps\text{ (Tera Bits per second)}$$

Therefore, the V-ROVER has a minimum digital bandwidth capacity of 7.92 TBps.

Hence, the digital bandwidth range of the V-ROVER across the millimeter and ultra-high frequency range of 30 GHz to 3300 GHz is 72 GBps to 15.84 TBps. The V-ROVER QAM Modem automatically adjusts its constellation points of the modulator between 64-bit to 4096-bit. When the S/N decreases the bit error rate of the received digital bits increases if the constellation points remain the same. Therefore, the modulator is designed to harmoniously reduce its constellation point, symbol rate with the S/N ratio level, thus maintaining the bit error rate for quality service delivery over wider bandwidth. This dynamic performance design allows the data service of Attobahn to gracefully operate at a high quality without the end user realizing a degradation of service performance.

Modem Data Performance Management

The V-ROVER QAM modulator Data Management Splitter (DMS) 248 circuitry which is an embodiment of this invention, monitors the modulator links' performances and correlates each of the four (4) RF links S/N ratio with the symbol rate it applies to the modulation scheme. The modulator simultaneously takes the degradation of a link and the subsequent symbol rate reduction, immediately throttle back data that is designated for the degraded link, and divert its data traffic to a better performing modulator.

Hence, if modulator No. 1 detects a degradation of its RF link, then the modem system with take traffic from that degraded modulator and direct it to modulator No. 2 for transmission across the network. This design arrangement allows the V-ROVER system to management its data traffic very efficiently and maintain system performance even during transmission link degradation. The DMS carries out these data management functions before it splits the data signal into two streams to the in phase (I) and 90-degree out of phase, quadrature (Q) circuitry 251 for the QAM modulation process.

Demodulator

The V-ROVER QAM demodulator 252 functions in the reverse of its modulator. It accepts the RF I-Q signals from the RF Low Noise Amplifier (LNA) 254 and feeds it to the I-Q circuitry 255 where the original combined digital together after demodulation. The demodulator tracks the incoming I-Q signals symbol rate and automatically adjust itself to the incoming rate and harmoniously demodulate the signal at the correct digital rate. Therefore, if the RF transmission link degrades and the modulator decreased the symbol rate from its maximum 4096-bit rate to 64-bit rate, the demodulator automatically tracks the lower symbol rate and demodulates the digital bits at the lower rate. This arrangement makes sure that the quality of the end to end data connection is maintained by temporarily lowering the digital bit rate until the link performance increases.

V-Rover RF Circuitry

The V-ROVER millimeter wave (mmW) radio frequency (RF) circuitry 247A is design to operate in the 30 GHz to 3300 GHz range and deliver broadband digital data with a bit error rate (BER) of 1 part in 1 billion to 1 trillion under various climatic conditions.

mmW RF Transmitter

The V-ROVER mmW RF Transmitter (TX) stage 247 consists of a high frequency upconverter mixer 251A that allows the local oscillator frequency (LO) which has a frequency range from 30 GHz to 3300 GHz to mix the 3 GHz to 330 GHz bandwidth baseband I-Q modem signals with the RF 30 GHZ to 330 GHz carrier signal. The mixer RF modulated carrier signal is fed to the super high frequency (30-3300 GHZ) transmitter amplifier 253. The mmW RF TX has a power gain of 1.5 dB to 20 dB. The TX amplifier output signal is fed to the rectangular mmW waveguide 256. The waveguide is connected to the mmW 360-degree circular antenna 257 which is an embodiment of this invention.

mmW RF Receiver

FIG. 21 which is an embodiment of this invention, shows the V-ROVER mmW Receiver (RX) stage 247A that consists of the mmW 360-degree antenna 257 connected to the receiving rectangular mmW waveguide 256. The incoming mmW RF signal is received by the 360-degree antenna, where the received mmW 30 GHz-3300 GHz signal is sent via the rectangular waveguide to the Low Noise Amplifier (LNA) 254 which has up to a 30-dB gain.

After the signal leaves, the LNA, it passes through the receiver bandpass filter 254A and fed to the high frequency mixer. The high frequency down converter mixer 252A allows the local oscillator frequency (LO) which has a frequency range from 30 GHz to 3300 GHz to demodulate the I and Q phase amplitude 30 GHz to 3300 GHz carrier signals back to the baseband bandwidth of 3 GHz to 330 GHz. The bandwidth baseband I-Q signals 255 are fed to the 64-4096 QAM demodulator 252 where the separated I-Q digital data signals are combined back into the original single 40 GBps data stream. The QAM demodulator 252 four (4) 40 GBps data streams are fed to the decryption circuitry and to the cell switch via the ASM. V-Rover Clocking & Synchronization Circuitry FIG. 21 show the V-ROVER internal oscillator 805ABC which is controlled by a Phase Lock Loop (PLL) circuit 805A that receives it reference control voltage from the recovered clock signal 805. The recovered clock signal is derived from the received mmW RF signal from the LNA output. The received mmW RF signal is sample and converted into digital pulses by the RF to digital converter 805E as illustrated in FIG. 21 which is an embodiment of this invention.

Figure 107:
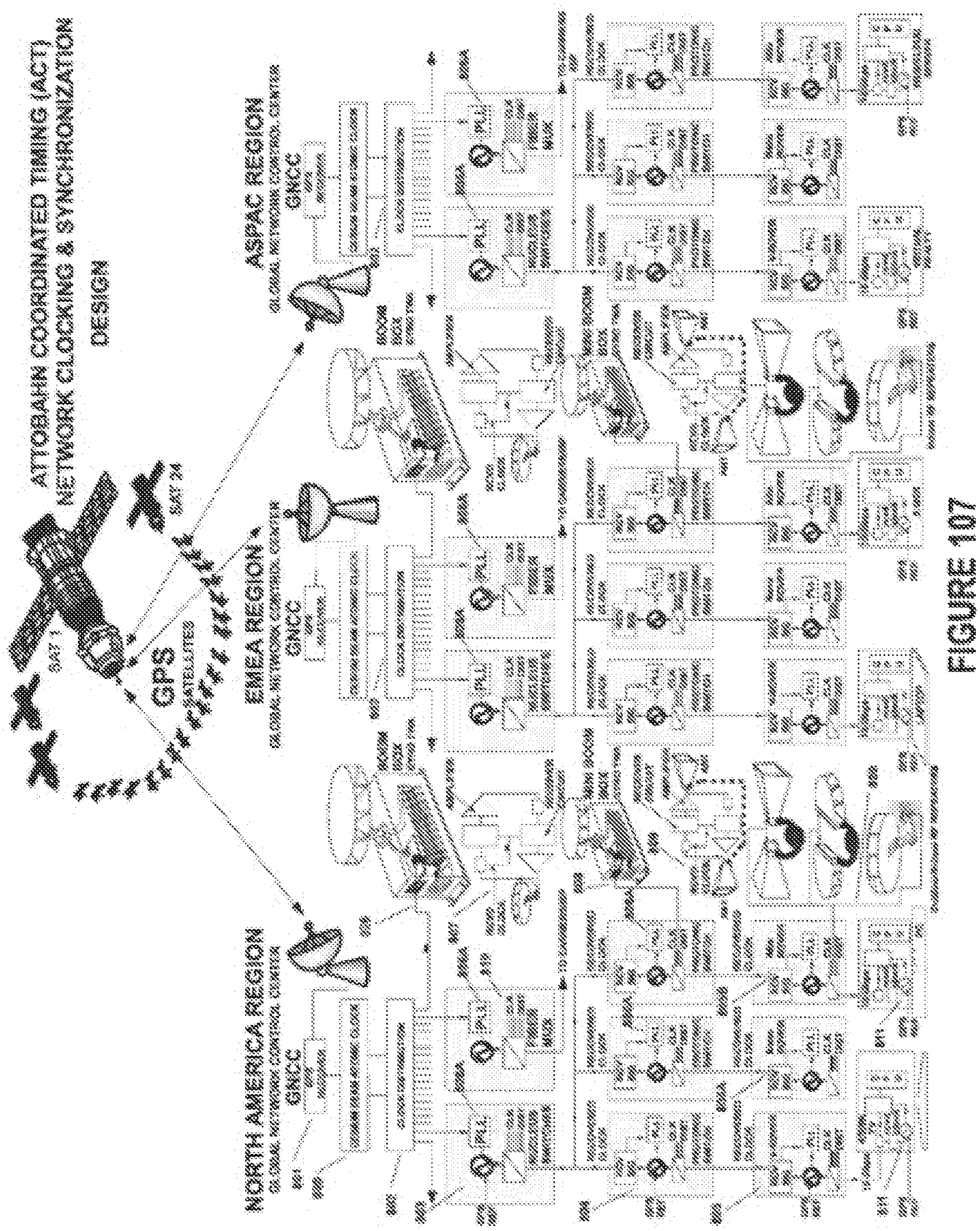
FIG. 107 is an illustration of Attobahn three global clocking, synchronization and distribution centers in the North America (NA), Europe Middle East & Africa (EMEA), and Asia Pacific (ASPAC) regions Cesium Atomic Clocks that is reference to the GPS and distributes the clocking signals to the global Attobahn network digital and RF systems clocking infrastructure.

The mmW RF signal that is received by the V-ROVER came from the Protonic Switch or the neighboring ROVER which are in the same domain. Since each domain devices (Protonic Switch and ROVERs) RF and digital signals are reference to the uplink Nucleus Switches, and the Nucleus Switches are referenced to the National Backbone and Global Gateway Nucleus Switches as illustrated in FIG. 107 which is an embodiment of this invention, then each Protonic Switch and ROVER are in effect referenced to the Atomic Cesium Beam high stability oscillatory system. Since Atomic Cesium Beam oscillatory system is referenced to the Global Position Satellite (GPS) it means that all of Attobahn systems globally are referenced to the GPS.

This clocking and synchronization design makes all of the digital clocking oscillator in every Nucleus Switch, Protonic Switch, V-ROVER, Nano-ROVER, Atto-ROVER and Attobahn ancillary communications systems such as fiber optics terminals and Gateway Routers referenced to the GPS worldwide.

The referenced GPS clocking signal derived from the V-ROVER mmW RF signal varies the PLL output voltage in harmony with the received GPS reference signal phases between 0-360 degrees of its sinusoid at the GNCCs (Global Network Control Center) Atomic Cesium Oscillators. The PLL output voltage controls the output frequency of the V-ROVER local oscillator which in effect is synchronized to the Atomic Cesium Clock at the GNCCs, that is referenced to the GPS.

The V-ROVER clocking system is equipped with frequency multiplier and divider circuitry to supply the varying clock frequencies to following sections of the system:

1. *RF* mixer/*Upconverter*/Down Converter 1×30−3300 GHz
2. *QAM* Modem 1×30−3300 GHz signal
3. Cell Switch 2×2 *THz* signals
4. *ASM* 2×40 GHz signals
5. End User Ports 8×10 GHz−20 GHz signal
6. CPU & Cloud Storage 1×2 GHz signal
7. WiFi & *WiGi* Systems 1×5 GHz and 1×60 GHz signals The V-ROVER clocking system design ensures that Attobahn data information is completely synchronized with the Atomic Cesium Clock source and the GPS, so that all applications across the network is digitally synchronized to the network infrastructure which radically minimizes bit errors and significantly improved service performance.

V-Rover Multi-Processor & Services

The V-ROVER is equipped with dual quad-core 4 GHZ, 8 GB ROM, 500 GB storage CPU that manages the Cloud Storage service, network management data, and various administrative functions such as system configuration, alarms message display, and user services display in device.

The CPU monitors the system performance information and communicates the information to the ROVERs Network Management System (RNMS) via the logical port 1 (FIG. 6) Attobahn Network Management Port (ANMP) EXT.001. The end use has a touch screen interface to interact with the V-ROVER to set passwords, access services, purchase shows, communicate with customer service, etc.

The Attobahn end user services APPs manager runs on the V-ROVER CPU. The end user services APPs manager interfaces and communicates with the Attobahn APPs that reside on the end user desktop PC, Laptop, Tablet, smart phones, servers, video games stations, etc. The following end user Personal Services and administrative functions run on the CPU:

1. Personal InfoMail
2. Personal Social Media
3. Personal Infotainment
4. Personal Cloud
5. Phone Call Services
6. New Movie Releases Services Download Storage/Deletion Management
7. Broadcast Music Services
8. Broadcast TV Services
9. Online WORD, SPREAD SHEET, DRAW, & DATABASE
10. Habitual APP Services
11. GROUP Pay Per View Services
12. Concert Pay Per View
12. Online Virtual Reality
13. Online Video Games Services
14. Attobahn Advertisement Display Services Management (banners and video fade in/out)
15. Atto View Dashboard Management
16. Partner Services Management
17. Pay Per View Management
18. VIDEO Download Storage/Deletion Management
19. General APPs (Google, Facebook, Twitter, Amazon, What's Up, etc.) Each one of these services, Cloud service access, and storage management is controlled by the Cloud APP in the V-ROVER CPU.

Nano-Rover Design 1. Physical Interfaces

Figure 22:
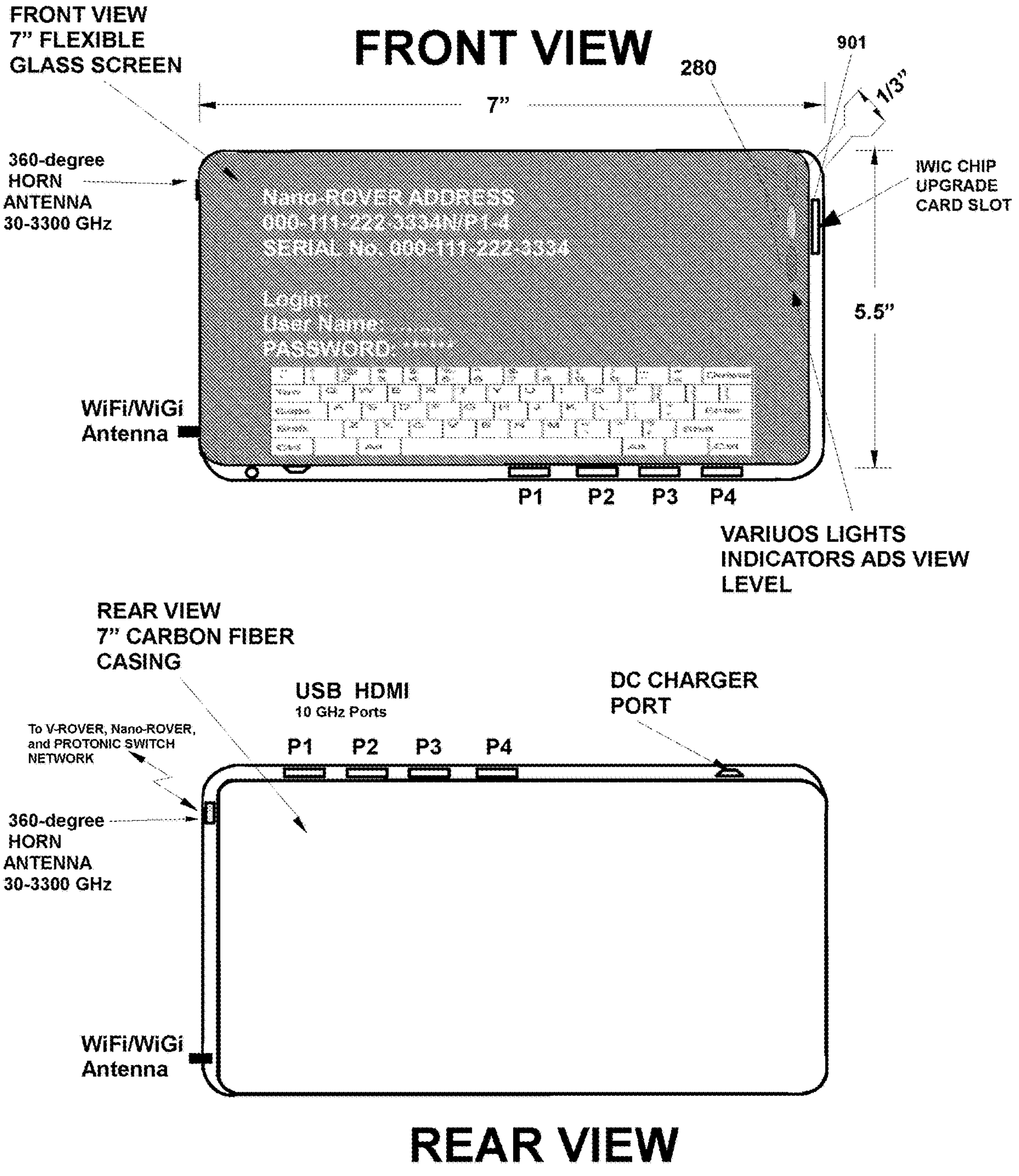
FIG. 22 is an illustration of the Viral Orbital Vehicle Nano-ROVER access communications device housing front and non-connector ports side views which is an embodiment of the invention.

As an embodiment of this invention FIG. 22(A,B) shows the Viral Orbital Vehicle, Nano-ROVER communications device 200 that has a physical dimension of 5 inches long, 3 inches wide, and ½ inch high. The device has a hard, durable plastic cover chasing 202 with a glass display screen 203 on the front of the device. The device is equipped with a minimum of 4 physical ports 206 that can accept high-speed data streams, ranging from 64 Kbps to 10 GBps from Local Area Network (LAN) interfaces which is not limited to a USB port, and can be a high-definition multimedia interface (HDMI) port, an Ethernet port, a RJ45 modular connector, an IEEE 1394 interface (also known as Fire Wire) and/or a short-range communication ports such as a Bluetooth, Zigbee, near field communication, or infrared interface that carries TCP/IP packets or data streams from the Application Programmable Interface (AAPI); PCM Voice or Voice Over IP (VOIP), or video IP packets.

The Nano-ROVER device has a DC power port 204 for a charger cable to allow charging of the battery in the device. The device is designed with high frequency RF antenna 220 that allows the reception and transmission of frequencies in the range of 30 to 3300 GHz. In order to allow communications with WiFi and WiGi, Bluetooth, and other lower frequencies system, the device has a second antenna 208 for the reception and transmission of those signals.

ADS Monitoring & Viewing Level Indicators

As shown in FIG. 22(A) which is an embodiment of this invention, the Nano-ROVER has three bevel indent holes 280 equipped with three LED lights/Indicators, on the front face of the glass display. These lights are used as indicators for the level of Advertisements (ADS) viewed by the household, business office, or vehicle recipients/users within them.

The LED light/Indicator ADS indicators operates in the following manner:

1. Light/Indicator A LED lights up when the user of the Attobahn broadband network services was exposed to a specific high number of ADS per month.
2. Light/Indicator B LED lights up when the user of the Attobahn broadband network services was exposed to a specific medium number of ADS per month.
3. Light/Indicator C LED lights up when the user of the Attobahn broadband services was exposed to a specific low number of ADS per month.

These LEDs are controlled by the ADS APP of the APPI located on Logical Port 13 Attobahn Ads APP address EXT=0.00D, Unique address.EXT=32F310E2A608FF.00D. The ADS APP drives the ADS views-text, image, and video to the viewer display screens (cellphones, smartphones, tablets, laptops, PCs, TVs, VRs, gaming systems, etc.) and is designed with a ADS counter that keeps track of every AD that is shown on these displays. The counter feds the three LEDs to turn them on and off when the displayed ADS amounts meet certain thresholds. These displays let the user know how many ADS they were exposed at any given instant in time. This AD monitoring and indications levels are an embodiment of this invention on the Nano-ROVER device.

Figure 23:
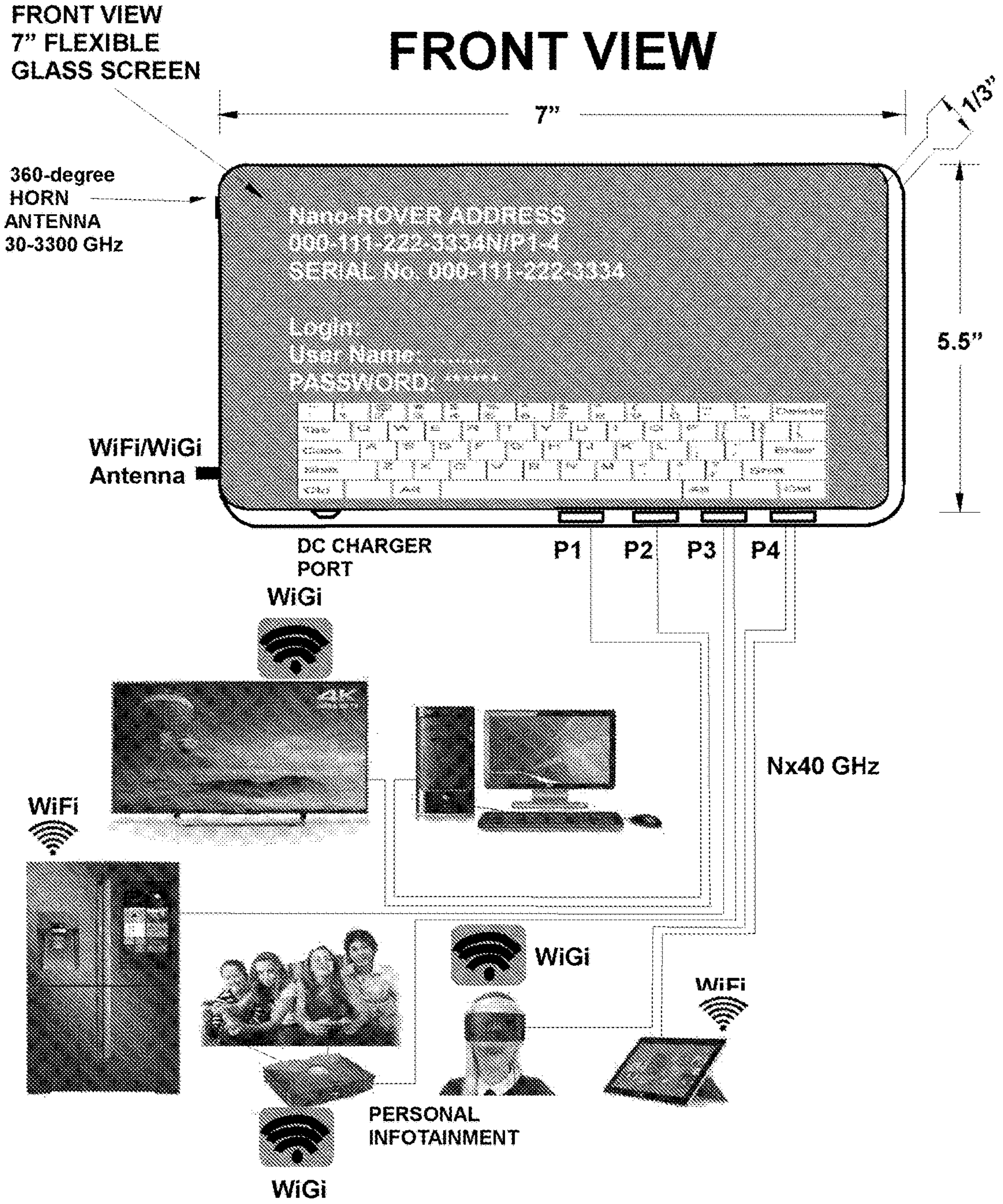
FIG. 23 shows the Viral Orbital Vehicle Nano-ROVER access node communications device housing rear, connector ports side, and the DC power connector bottom views with the device connected to a series of typical end user systems which is an embodiment of the invention.
Figure 24:
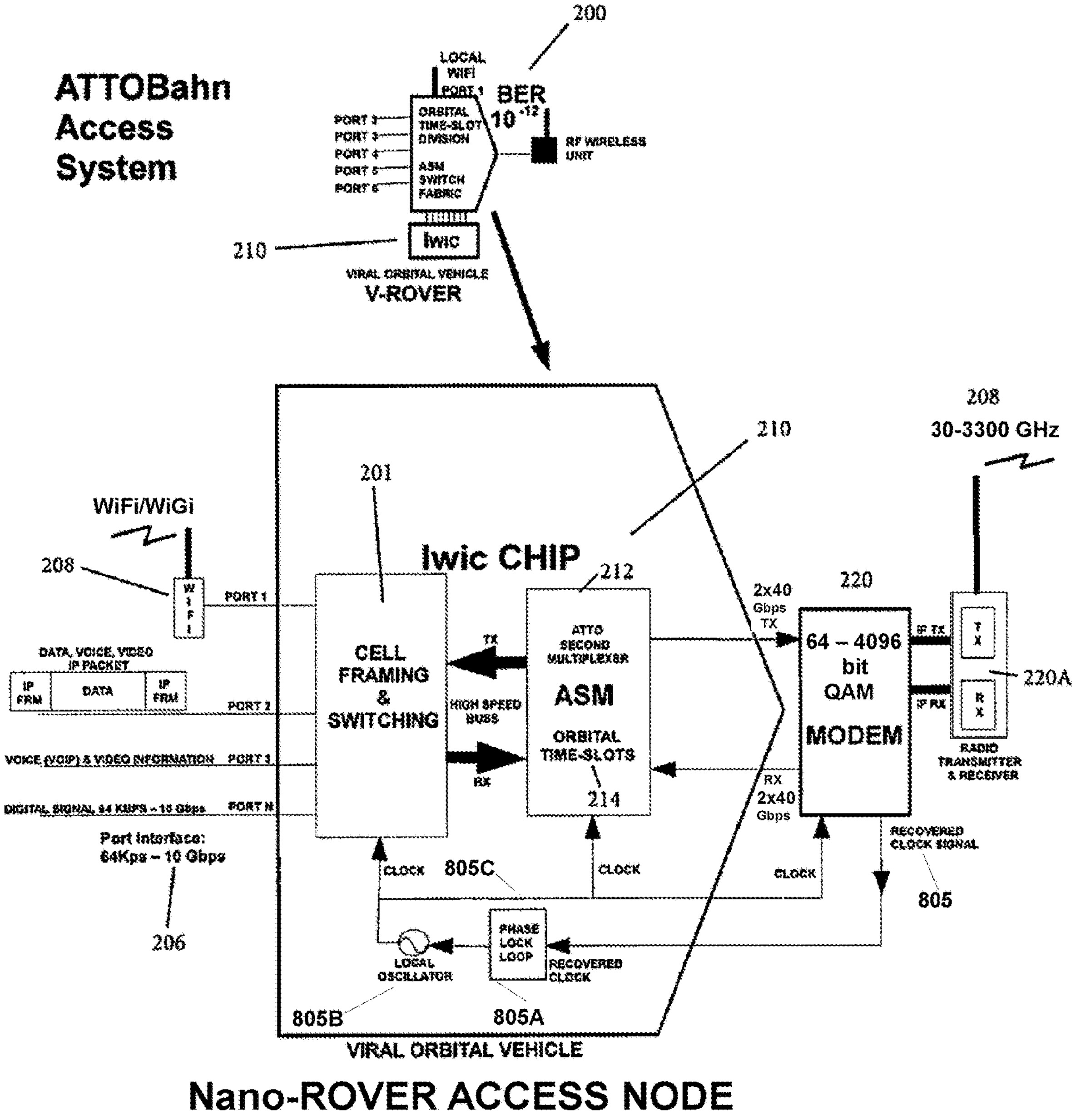
FIG. 24 is a series of block diagrams that illustrates the internal operations of the Viral Orbital Vehicle Nano-ROVER access node communications device on end user information and digital streams which is an embodiment of this invention.

As display in FIG. 8 which is an embodiment of this invention, the ADS APP also provides the ADS Monitor & Viewing Level Indicator to be displayed on the display screens (cellphones, smartphones, tablets, laptops, PCs, TVs, VRs, gaming systems, etc.) of the end user. The ADS Monitor & Viewing Level Indicator (AMVI) displays on the user screen in the form of a vertical bar that superimposes itself over whatever is being shown on the screen. The AMVI vertical bar follows the same color indications as the ones displayed on the front face glass bevels of the V-ROVERs, Nano-ROVERs, and Atto-ROVERs. The vertical bar AMVI are designed to display on the user screen as follows:

1. The light/indicator A on the vertical bar becomes bright (while light/indicator B and C remain faint) when the user of the Attobahn broadband network services was exposed to a specific high number of ADS per month.
2. The light/indicator B on the vertical bar becomes bright (while light/indicator A and C remain faint) when the user of the Attobahn broadband network services was exposed to a specific medium number of ADS per month.
3. The light/indicator C on the vertical bar becomes bright (while light/indicator A and B remain faint) when the user of the Attobahn broadband services was exposed to a specific low number of ADS per month. 2. Physical Connectivity As an embodiment of this invention FIG. 23 shows the physical connectivity between the Nano-ROVER device ports 206; WiFi and WiGi, Bluetooth, and other lower frequencies antenna 208; and the high frequency RF antenna 220 and 1) end user devices and systems but not limited to laptops, cell phones, routers, kinetic system, game consoles, desktop PCs, LAN switches, servers, 4K/5K/8K ultra high definition TVs, etc.; 2) and to the Protonic Switch. 3. Internal Systems As an embodiment of the invention FIG. 24 shows the internal operations of the Nano-ROVER communications devices 200 with. The end user data, voice, and video signals enters the device ports 206 and low frequency antenna (WiFi and WiGi, Bluetooth, etc.) 208 and are clock into the cell framing and switching system using the highly-stabilized clocking system 805C with its internal oscillator 805B and phase lock loop 805A that is referenced to the recovered clocking signal obtained from the demodulator section of the modem 220 received digital stream. Once the end user information is clock into the cell framing system, it is encapsulated into the viral molecular network cell framing format, where an Origination address, located in frame 1 of host-host communications between the local and remote Attobahn network device (see FIGS. 15.0 and 16.0 for more detail information the Originating Address) and destination ports 48-digit number (6-byte) schema address headers, using a nibble of 4 bytes per digit are inserted in the cell frame 10-byte header. The end user information stream is broken into 60-byte payloads cells which are accompanied with their 10-byte headers.

Figure 25:
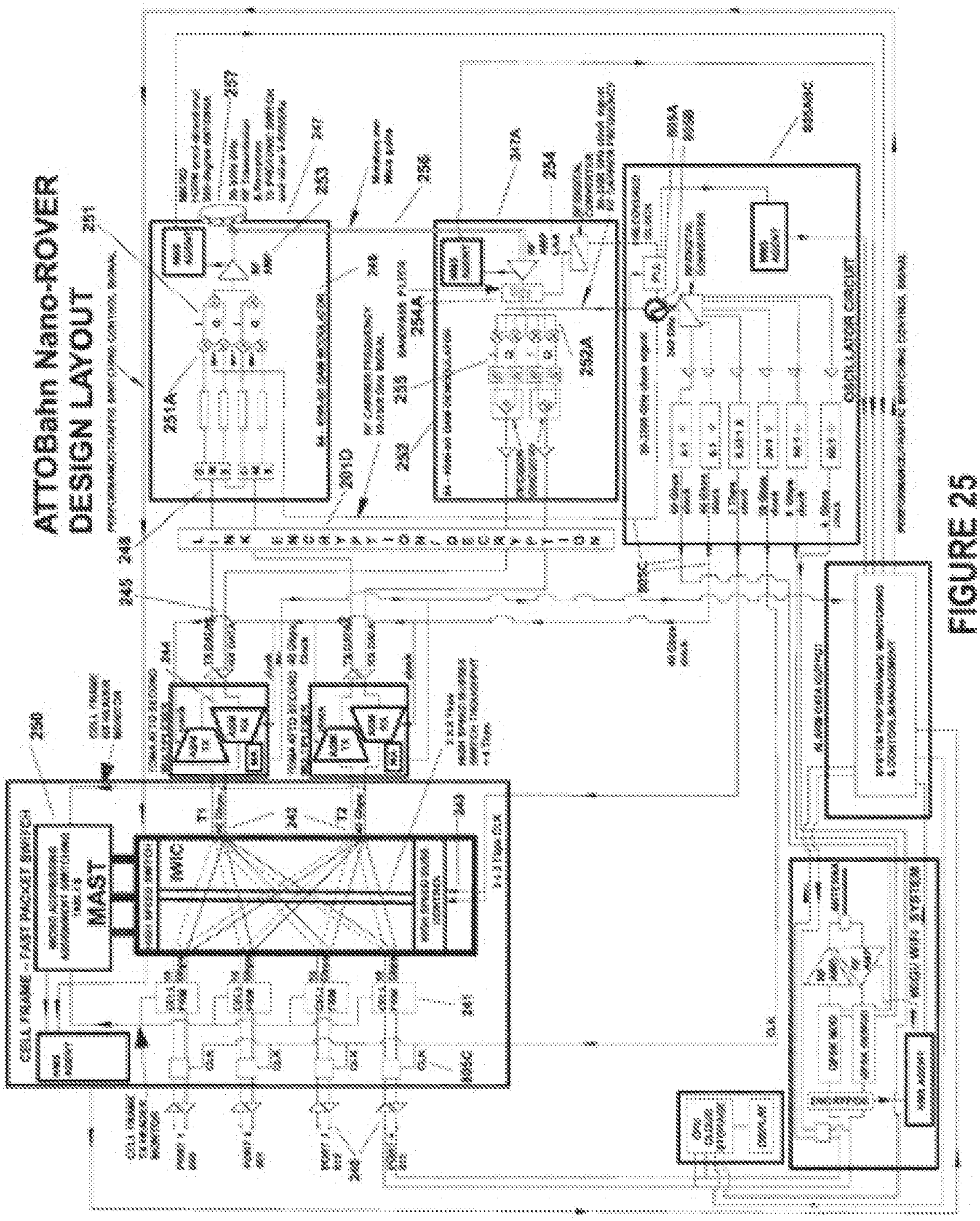
FIG. 25 illustrates the Nano-ROVER technical schematic layout of its cell frame switching fabric, ASM, QAM modems, RF amplifier and receiver, management system, and CPU which is an embodiment of this invention.

As illustrated in FIG. 24 which is an embodiment of this invention, the cell frames are placed onto the Nano-ROVER high-speed bus and delivered to the cell switching section of the IWIC Chip 210. The IWIC Chip switches the cell and sent it via the high-speed bus to the ASM 212 and placed into a specific Orbital Time Slot (OTS) 214 for transport the signal to the Protonic Switch or one of its neighboring Viral Orbital Vehicle if the traffic is staying local within the atomic molecular domain. After the cell frames passes through the ASM, they are submitted to the 4096-bit QAM modulator of the modem 220. The ASM develops two (2) high-speed digital streams that are sent to the modem and after individually modulating each digital stream into two intermediate frequency (IF) signals. The two IFs are sent to the RF system 220A mixer stage where the IF frequencies are mixed with their RF carriers (two RF carriers per Viral Orbital Vehicle device) and transmitted over the antenna 208.4. TDMA ASM Framing & Time Slots As an embodiment of the invention FIG. 20 illustrates the Nano-ROVER ASM 212 framing format that consists of Orbital Time Slots (OTS) 214 of 0.25 micro second that moves 10,000 bits within that time period. Ten (10) OTS 214A frames of 0.25 micro-second makes up one ASM frame with an orbital period of 2.5 micro second. The ASM circuitry moves 400,000 ASM frames 212A per second. The OTS 10,000 bits every 0.25 micro-second results in 40 GBps. This framing format is developed in the Viral Orbital Vehicle, Protonic Switch, and the Nucleus Switch across the Viral Molecular network. Each of these frames are placed into a time slot of the Time Division Multiple Access (TDMA) frame that communicates with both the Protonic Switch and neighboring ROVERs. 5. Nano-Rover System Schematics FIG. 25 is an illustration of the Nano-ROVER design circuitry schematics which is an embodiment of this invention, gives a detailed layout of the internal components of the device. The four (4) data ports 206 are equipped with input clocking speed of 10 GBps that is synchronized to derived/recovered clock signal from the network Cesium Beam oscillator with a stability of one part in 10 trillion.

Each port interface provides a highly stable clocking signal 805C to time in and out the data signals from the end user systems.

End User Port Interface

The ports 206 of the Nano-ROVER consists of one (1) to two (2) physical USB; (HDMI); an Ethernet port, a RJ45 modular connector; an IEEE 1394 interface (also known as Fire Wire) and/or a short-range communication ports such as a Bluetooth; Zigbee; near field communication; WiFi and WiGi; and infrared interface. These physical ports receive the end user information.

The customer information from a computer which can be a laptop, desktop, server, mainframe, or super computer; a tablet via a WiFi or direct cable connection; a cell phone; voice audio system; distribution and broadcast video from a video server; broadcast TV; broadcast radio station stereo, audio announcer video, and radio social media data; Attobahn mobile cell phone calls; news TV studio quality TV systems video signals; 3D sporting events TV cameras signals, 4K/5K/8K ultra high definition TV signals; movies download information signal; in the field real-time TV news reporting video stream; broadcast movie cinema theaters network video signals; a Local Area Network digital stream; game console; virtual reality data; kinetic system data; Internet TCP/IP data; nonstandard data; residential and commercial building security system data; remote control telemetry systems information for remote robotics manufacturing machines devices signals and commands; building management and operations systems data; Internet of Things data streams that includes but not limited to home electronic systems and devices; home appliances management and control signals; factory floor machinery systems performance monitoring, management; and control signals data; personal electronic devices data signals; etc.

Micro Address Assignment Switching Tables (Mast)

The Nano-ROVER port clocks in each data type via a small buffer 240 that takes care of the incoming data signal and the clocking signal phase difference. Once the data signal is synchronized with the Nano-ROVER clocking signal, the Cell Frame System (CFS) 241 scrips off a copy of the cell frame Destination Address and sends it to Micro Address Assignment Switching Tables (MAST) system 250. The MAST then determines if the Destination Address device ROVER is within the same molecular domain (400 V-ROVERs, Nano-ROVERs, and Atto-ROVERs) as the Originating Address ROVER device.

If the Origination and Destination addresses are in the same domain, then the cell frame is switch via anyone of the two 40 GBps trunk ports 242 where the frames is transmitted either to the Protonic Switches or the neighboring ROVERs. If the cell frames Destination Address is not in the same molecular domain as the Origination Address ROVER device, then the cell switch switches the frame to trunk port 1 which is connected to the Protonic Switch that control the molecular domain.

The design to have a frame whose Destination Address ROVER device is not within the local molecular domain, be automatically sent to the Protonic Switching Layer (PSL) of the network, is to reduce the switching latency through the network. If this frame is switched to one of the neighboring ROVERs, instead of going directly to a Protonic Switch, the frame will have to transit many ROVER devices, before it leaves the molecular domain to its final destination in another domain.

Switching Throughput

The cell frame switching fabric which is an embodiment of this invention, uses a two (2) individual busses 243 running at 2 TBps. This arrangement gives each Atto-ROVER cell switch a combined switching throughput of 4 GBps. The switch can move any cell frame in and out of the switch within an average of 280 picoseconds. The switch can empty any of the 40 GBps trunks 242 of data within less than 5 milliseconds. The two (2) 40 GBps data trunks' 242 digital streams are clock in and out of the cell switch by 2×40 GHz highly stable Cesium Beam 800 (FIG. 84) reference source clock signal which is an embodiment of this invention.

Atto Second Multiplexing (ASM)

The two trunks signal are fed into the Atto Second Multiplexer (ASM) 244 via the Encryption System 201C. The ASM places the 2×40 GBps data stream into the Orbital Time Slot (OTS) frame as displayed in FIG. 20. The ASM ports 245 one (1) and two (2) output digital streams are inserted into the TDMA time slots then send to the QAM modulators 246 for transmission across the millimeter wave radio frequency (RF) links. The ASMs receive TDMA digital frames from the QAM demodulators, demultiplex the TDMA time slot signal designated for its Nano-ROVER and OTS back into the 40 GBps data streams. The cell switch trunk ports 242 monitor the incoming cell frames from the Protonic Switch (always on ASM Portland cell switch T1) and the one neighboring ROVER (always on ASM Port 2 and cell switch T2).

The Nano-ROVER cell switch trunks monitor the two incoming 40 GBps data streams 48-bit Destination Address in the cell frames and sent them to the MAST 250. The MAST examines the addresses and when the address for the local ROVER is identified, the MAST reads the 3-bit physical port address and instructs the switch to switch those cell frames to their designated ports.

When the MAST determines that a 48-bit Destination Address is not for its local ROVER or its neighbor, then it instructs the switch to switch that cell frame to T1 toward the Protonic Switch. If the address is for the neighboring ROVER, the MAST instructs the switch to switch the cell frame to the designated neighboring ROVER.

Link Encryption

The Nano-ROVER ASM two trunks terminates into the Link Encryption System 201D. The link Encryption System is an additional layer of security beneath the Application Encryption System that sits under the AAPI as shown in FIG. 6.

The Link Encryption System as shown in FIG. 25 which is an embodiment of this invention, encrypts the two Nano-ROVER's 40 GBps data streams that comes out from the ASMs. This process ensures that cyber adversaries cannot see Attobahn data as it traverses the millimeter wave spectrum. The Link Encryption System uses a private key cypher between the ROVERs, Protonic Switches, and Nucleus Switches. This encryption system at a minimum meets the AES encryption level but exceeds it in the way the encryption methodology is implemented between the Access Network Layer, Protonic Switching Layer, and Nucleus Switching Layer of the network.

QAM Modem

The Nano-ROVER Quadrature Amplitude Modem (QAM) 246 as shown in FIG. 25 which is an embodiment of this invention, is a two-section modulator and demodulator. Each section accepts a digital baseband signal of 40 GBps that modulates the 30 GHz to 3300 GHz carrier signal that is generated by local Cesium Beam referenced oscillator circuit 805ABC. QAM Modem Maximum Digital Bandwidth Capacity The Nano-ROVER QAM modulator uses a 64-4096-bit quadrature adaptive modulation scheme. The modulator uses an adaptive scheme that allows the transmission bit rate to vary according to the condition of the millimeter wave RF transmission link signal-to-noise ratio (S/N). The modulator monitors the receive S/N ratio and when this level meets its lowest predetermined threshold, the QAM modulator increases the bit modulation to its maximum of 4096-bit format, resulting in a 12:1 symbol rate. Therefore, for every one hertz of bandwidth, the system can transmit 12 bits. This arrangement allows the Nano-ROVER to have a maximum digital bandwidth capacity of 12×24 GHZ (when using a bandwidth 240 GHz carrier)=288 GBps. Taking the two Nano-ROVER240 GHz carriers, the full capacity of the Nano-ROVER at a carrier frequency of 240 GHz is 2×288 GBps-576 GBps.

Across the full spectrum of Attobahn millimeter wave RF signal operation of 30-3300 GHz, the range of Nano-ROVER at maximum 4096-bit QAM will be:

$$30\text{ GHz carrier, 3 GHz bandwidth: } 12\times 3\text{ GHz}\times 2\text{ Carrier Signals} = 72\ GBps\text{ (Giga Bits per second)}$$

$$3300\text{ GHz, 330 GHz bandwidth: } 12\times 330\text{ GHz}\times 2\text{ Carrier Signals} = 7.92\ TBps\text{ (Tera Bits per second)}$$

Therefore, the Nano-ROVER has a maximum digital bandwidth capacity of 7.92 TBps.

QAM Modem Minimum Digital Bandwidth Capacity

The Nano-ROVER modulator monitors the receive S/N ratio and when this level meets its highest predetermined threshold, the QAM modulator decreases the bit modulation to its minimum of 64-bit format, resulting in a 6:1 symbol rate. Therefore, for every one hertz of bandwidth, the system can transmit 6 bits. This arrangement allows the Nano-ROVER to have a maximum digital bandwidth capacity of 6×24 GHz (when using a bandwidth 240 GHZ carrier)=1.44 GBps. Taking the two Nano-ROVER240 GHz carriers, the full capacity of the ROVER at a carrier frequency of 240 GHz is 2×1.44 GBps=2.88 GBps.

Across the full spectrum of Attobahn millimeter wave RF signal operation of 30-3300 GHz, the range of V-ROVER at minimum 64-bit QAM will be:

$$30\text{ GHz carrier, 3 GHZ bandwidth: } 6\times 3\text{ GHz}\times 2\text{ Carrier Signals} = 36\ GBps\text{ (Giga Bits per second)}$$

$$3300\text{ GHz, 330 GHz bandwidth: } 6\times 330\text{ GHz}\times 2\text{ Carrier Signals} = 3.96\ TBps\text{ (Tera Bits per second)}$$

Therefore, the Nano-ROVER has a minimum digital bandwidth capacity of 3.96 TBps. Hence, the digital bandwidth range of the Nano-ROVER across the millimeter and ultra-high frequency range of 30 GHz to 3300 GHz is 36 GBps to 7.92 TBps.

The Nano-ROVER QAM Modem automatically adjusts its constellation points of the modulator between 64-bit to 4096-bit. When the S/N decreases the bit error rate of the received digital bits increases if the constellation points remain the same. Therefore, the modulator is designed to harmoniously reduce its constellation point, symbol rate with the S/N ratio level, thus maintaining the bit error rate for quality service delivery over wider bandwidth. This dynamic performance design allows the data service of Attobahn to gracefully operate at a high quality without the end user realizing a degradation of service performance.

Modem Data Performance Management

The Nano-ROVER modulator Data Management Splitter (DMS) 248 circuitry which is an embodiment of this invention, monitors the modulator links' performances and correlates each of the two (2) RF links S/N ratio with the symbol rate it applies to the modulation scheme. The modulator simultaneously takes the degradation of a link and the subsequent symbol rate reduction, immediately throttle back data that is designated for the degraded link, and divert its data traffic to a better performing modulator.

Hence, if modulator No. 1 detects a degradation of its RF link, then the modem system with take traffic from that degraded modulator and direct it to modulator No. 2 for transmission across the network. This design arrangement allows the Nano-ROVER system to management its data traffic very efficiently and maintain system performance even during transmission link degradation. The DMS carries out these data management functions before it splits the data signal into two streams to the in phase (I) and 90-degree out of phase, quadrature (Q) circuitry 251 for the QAM modulation process.

Demodulator

The Nano-ROVER QAM demodulator 252 functions in the reverse of its modulator. It accepts the RF I-Q signals from the RF Low Noise Amplifier (LNA) 254 and feeds it to the I-Q circuitry 255 where the original combined digital together after demodulation. The demodulator tracks the incoming I-Q signals symbol rate and automatically adjust itself to the incoming rate and harmoniously demodulate the signal at the correct digital rate. Therefore, if the RF transmission link degrades and the modulator decreased the symbol rate from its maximum 4096-bit rate to 64-bit rate, the demodulator automatically tracks the lower symbol rate and demodulates the digital bits at the lower rate. This arrangement makes sure that the quality of the end to end data connection is maintained by temporarily lowering the digital bit rate until the link performance increases.

Nano-Rover RF Circuitry

The Nano-ROVER millimeter wave (mmW) radio frequency (RF) circuitry 247A is design to operate in the 30 GHz to 3300 GHz range and deliver broadband digital data with a bit error rate (BER) of 1 part in 1 billion to 1 trillion under various climatic conditions.

mmW RF Transmitter

The Nano-ROVER mmW RF Transmitter (TX) stage 247 consists of a high frequency upconverter mixer 251A that allows the local oscillator frequency (LO) which has a frequency range from 30 GHz to 3300 GHz to mix the 3 GHz to 330 GHz bandwidth baseband I-Q modem signals with the RF 30 GHZ to 330 GHz carrier signal. The mixer RF modulated carrier signal is fed to the super high frequency (30-3300 GHz) transmitter amplifier 253. The mmW RF TX has a power gain of 1.5 dB to 20 dB. The TX amplifier output signal is fed to the rectangular mmW waveguide 256. The waveguide is connected to the mmW 360-degree circular antenna 257 which is an embodiment of this invention.

mmW RF Receiver

FIG. 25 which is an embodiment of this invention, shows the V-ROVER mmW Receiver (RX) stage 247A that consists of the mmW 360-degree antenna 257 connected to the receiving rectangular mmW waveguide 256. The incoming mmW RF signal is received by the 360-degree antenna, where the received mmW 30 GHz-3300 GHz signal is sent via the rectangular waveguide to the Low Noise Amplifier (LNA) 254 which has up to a 30-dB gain.

After the signal leaves, the LNA, it passes through the receiver bandpass filter 254A and fed to the high frequency mixer. The high frequency down converter mixer 252A allows the local oscillator frequency (LO) which has a frequency range from 30 GHz to 3300 GHz to demodulate the I and Q phase amplitude 30 GHz to 3300 GHz carrier signals back to the baseband bandwidth of 3 GHz to 330 GHz. The bandwidth baseband I-Q signals 255 are fed to the 64-4096 QAM demodulator 252 where the separated I-Q digital data signals are combined back into the original single 40 GBps data stream. The QAM demodulator 252 two (2) 40 GBps data streams are fed to the decryption circuitry and to the cell switch via the ASM.

Nano-Rover Clocking & Synchronization Circuitry.

FIG. 25 show the Nano-ROVER internal oscillator 805ABC which is controlled by a Phase Lock Loop (PLL) circuit 805A that receives it reference control voltage from the recovered clock signal 805. The recovered clock signal is derived from the received mmW RF signal from the LNA output. The received mmW RF signal is sample and converted into digital pulses by the RF-to-digital converter 805E as illustrated in FIG. 25 which is an embodiment of this invention.

The mmW RF signal that is received by the Nano-ROVER came from the Protonic Switch or the neighboring ROVER which are in the same domain. Since each domain devices (Protonic Switch and ROVERs) RF and digital signals are reference to the uplink Nucleus Switches, and the Nucleus Switches are referenced to the National Backbone and Global Gateway Nucleus Switches as illustrated in FIG. 107 which is an embodiment of this invention, then each Protonic Switch and ROVER are in effect referenced to the Atomic Cesium Beam high stability oscillatory system. Since Atomic Cesium Beam oscillatory system is referenced to the Global Position Satellite (GPS) it means that all of Attobahn systems globally are referenced to the GPS.

This clocking and synchronization design makes all of the digital clocking oscillator in every Nucleus Switch, Protonic Switch, V-ROVER, Nano-ROVER, Atto-ROVER and Attobahn ancillary communications systems such as fiber optics terminals and Gateway Routers referenced to the GPS worldwide.

The referenced GPS clocking signal derived from the Nano-ROVER mmW RF signal varies the PLL output voltage in harmony with the received GPS reference signal phases between 0-360 degrees of its sinusoid at the GNCCs (Global Network Control Center) Atomic Cesium Oscillators. The PLL output voltage controls the output frequency of the Nano-ROVER local oscillator which in effect is synchronized to the Atomic Cesium Clock at the GNCCs, that is referenced to the GPS.

The Nano-ROVER clocking system is equipped with frequency multiplier and divider circuitry to supply the varying clock frequencies to following sections of the system:

1. *RF* mixer/*Upconverter*/Down Converter $1\times30-3300$ GHz
2. *QAM* Modem $1\times30-3300$ GHz signal
3. Cell Switch $2\times2$ *THz* signals -continued 4. *ASM* $2\times40$ GHz signals
5. End User Ports $8\times10$ GHz $-$ 20 GHz signal
6. CPU & Cloud Storage $1\times2$ GHz signal
7. WiFi & *WiGi* Systems $1\times5$ GHz and $1\times60$ GHz signals The Nano-ROVER clocking system design ensures that Attobahn data information is completely synchronized with the Atomic Cesium Clock source and the GPS, so that all applications across the network is digitally synchronized to the network infrastructure which radically minimizes bit errors and significantly improved service performance.

Nano-Rover Multi-Processor & Services

The Nano-ROVER is equipped with dual quad-core 4 GHZ, 8 GB ROM, 500 GB storage CPU that manages the Cloud Storage service, network management data, and various administrative functions such as system configuration, alarms message display, and user services display in device.

The Nano-ROVER CPU monitors the system performance information and communicates the information to the ROVERs Network Management System (RNMS) via the logical port 1 (FIG. 6) Attobahn Network Management Port (ANMP) EXT.001. The end use has a touch screen interface to interact with the Nano-ROVER to set passwords, access services, purchase shows, communicate with customer service, etc.

The Attobahn end user services APPs manager runs on the Nano-ROVER CPU. The end user services APPs manager interfaces and communicates with the Attobahn APPs that reside on the end user desktop PC, Laptop, Tablet, smart phones, servers, video games stations, etc. The following end user Personal Services and administrative functions run on the CPU:

1. Personal InfoMail
2. Personal Social Media
3. Personal Infotainment
4. Personal Cloud
5. Phone Services
6. New Movie Releases Services Download Storage/Deletion Management
7. Broadcast Music Services
8. Broadcast TV Services
9. Online WORD, SPREAD SHEET, DRAW, & DATABASE
10. Habitual APP Services
11. GROUP Pay Per View Services
12. Concert Pay Per View
12. Online Virtual Reality
13. Online Video Games Services
14. Attobahn Advertisement Display Services Management (banners and video fade in/out)
15. Atto View Dashboard Management
1G. Partner Services Management
17. Pay Per View Management
18. VIDEO Download Storage/Deletion Management
19. General APPs (Google, Facebook, Twitter, Amazon, What's Up, etc.)

Each one of these services, Cloud service access, and storage management is controlled by the Cloud APP in the Nano-ROVER CPU.

Atto-Rover Design

1. Physical Interfaces

Figure 26:
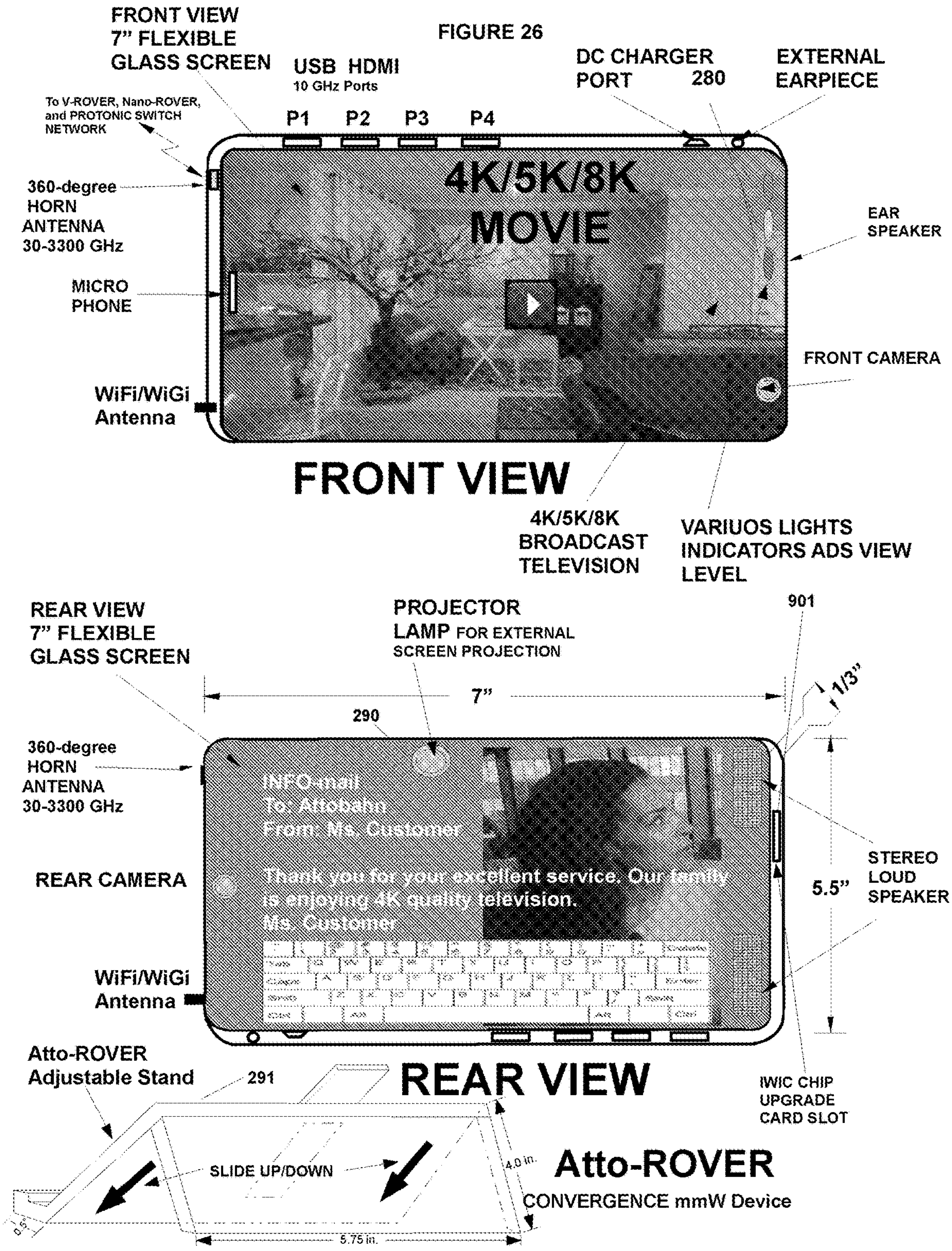
FIG. 26 is an illustration of the Viral Orbital Vehicle Atto-ROVER access communications device housing front and non-connector ports side views which is an embodiment of the invention.

As an embodiment of this invention FIG. 26 (A,B) shows the Viral Orbital Vehicle, Atto-ROVER communications device 200 that has a physical dimension of 5 inches long, 3 inches wide, and ½ inch high. The device has a hard, durable plastic cover chasing 202 with a glass display screen 203 on the front of the device. The device is equipped with a minimum of 4 physical ports 206 that can accept high-speed data streams, ranging from 64 Kbps to 10 GBps from Local Area Network (LAN) interfaces which is not limited to a USB port, and can be a high-definition multimedia interface (HDMI) port, an Ethernet port, a RJ45 modular connector, an IEEE 1394 interface (also known as FireWire) and/or a short-range communication ports such as a Bluetooth, Zigbee, near field communication, or infrared interface that carries TCP/IP packets or data streams from the Application Programmable Interface (AAPI); PCM Voice or Voice Over IP (VOIP), or video IP packets.

The Atto-ROVER device has a DC power port 204 for a charger cable to allow charging of the battery in the device. The device is designed with high frequency RF antenna 220 that allows the reception and transmission of frequencies in the range of 30 to 3300 GHz. In order to allow communications with WiFi and WiGi, Bluetooth, and other lower frequencies system, the device has a second antenna 208 for the reception and transmission of those signals.

ADS Monitoring & Viewing Level Indicators

As shown in FIG. 26(A) which is an embodiment of this invention, the Atto-ROVER has three bevel indent holes 280 equipped with three LED lights/Indicators, on the front face of the glass display. These lights are used as indicators for the level of Advertisements (ADS) viewed by the household, business office, or vehicle recipients/users within them.

The LED light/Indicator ADS indicators operates in the following manner:

1. Light/Indicator A LED lights up when the user of the Attobahn broadband network services was exposed to a specific high number of ADS per month.
2. Light/Indicator B LED lights up when the user of the Attobahn broadband network services was exposed to a specific medium number of ADS per month.
3. Light/Indicator C LED lights up when the user of the Attobahn broadband services was exposed to a specific low number of ADS per month.

These LEDs are controlled by the ADS APP of the APPI located on Logical Port 13 Attobahn Ads APP address EXT=0.00D, Unique address.EXT=32F310E2A608FF.00D. The ADS APP drives the ADS views-text, image, and video to the viewer display screens (cellphones, smartphones, tablets, laptops, PCs, TVs, VRs, gaming systems, etc.) and is designed with a ADS counter that keeps track of every AD that is shown on these displays. The counter feds the three LEDs to turn them on and off when the displayed ADS amounts meet certain thresholds. These displays let the user know how many ADS they were exposed at any given instant in time. This AD monitoring and indications levels are an embodiment of this invention on the Atto-ROVER device.

Figure 27:
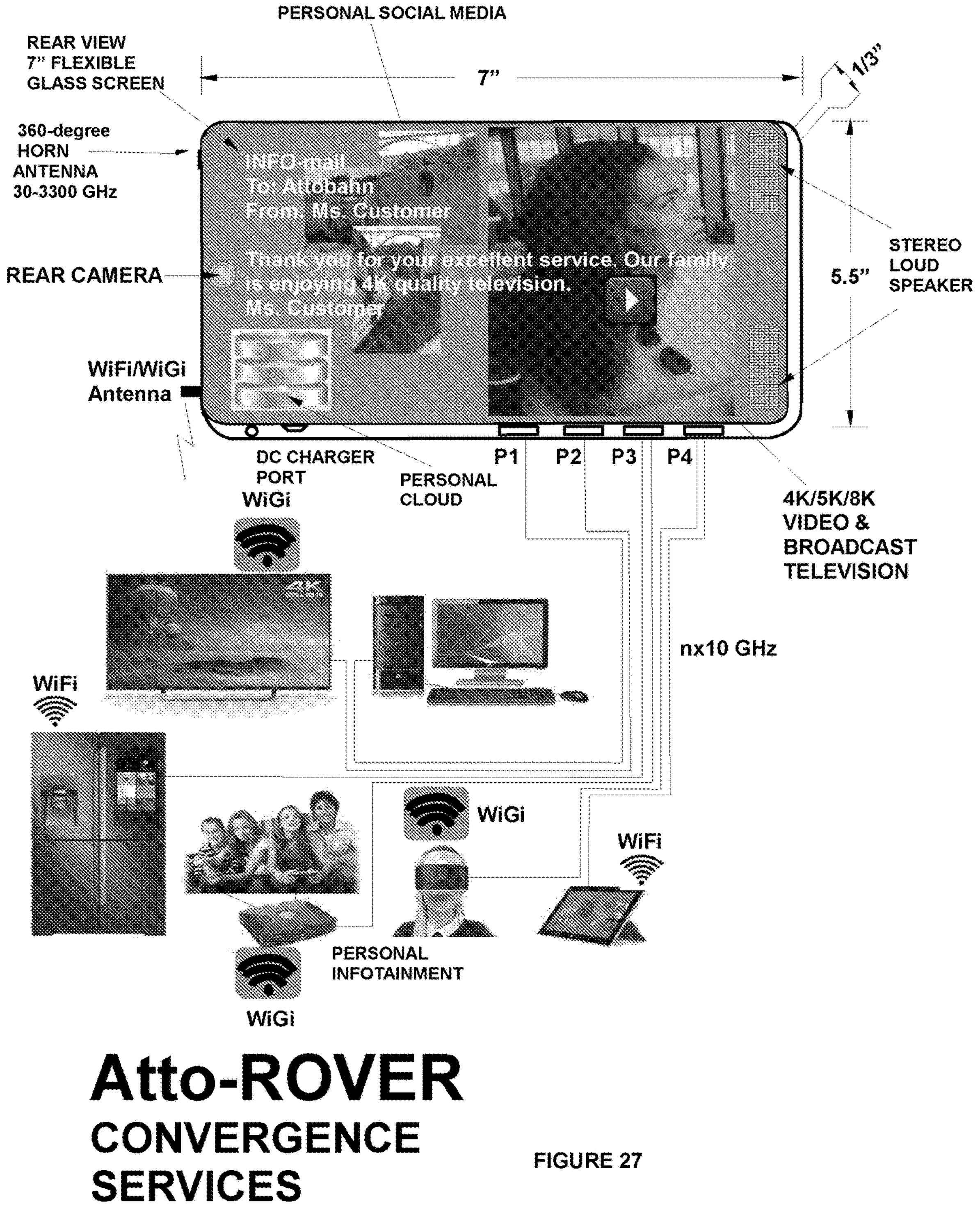
FIG. 27 shows the Viral Orbital Vehicle Atto-ROVER access node communications device housing rear, connector ports side, and the DC power connector bottom views with the device connected to a series of typical end user systems which is an embodiment of the invention.
Figure 28:
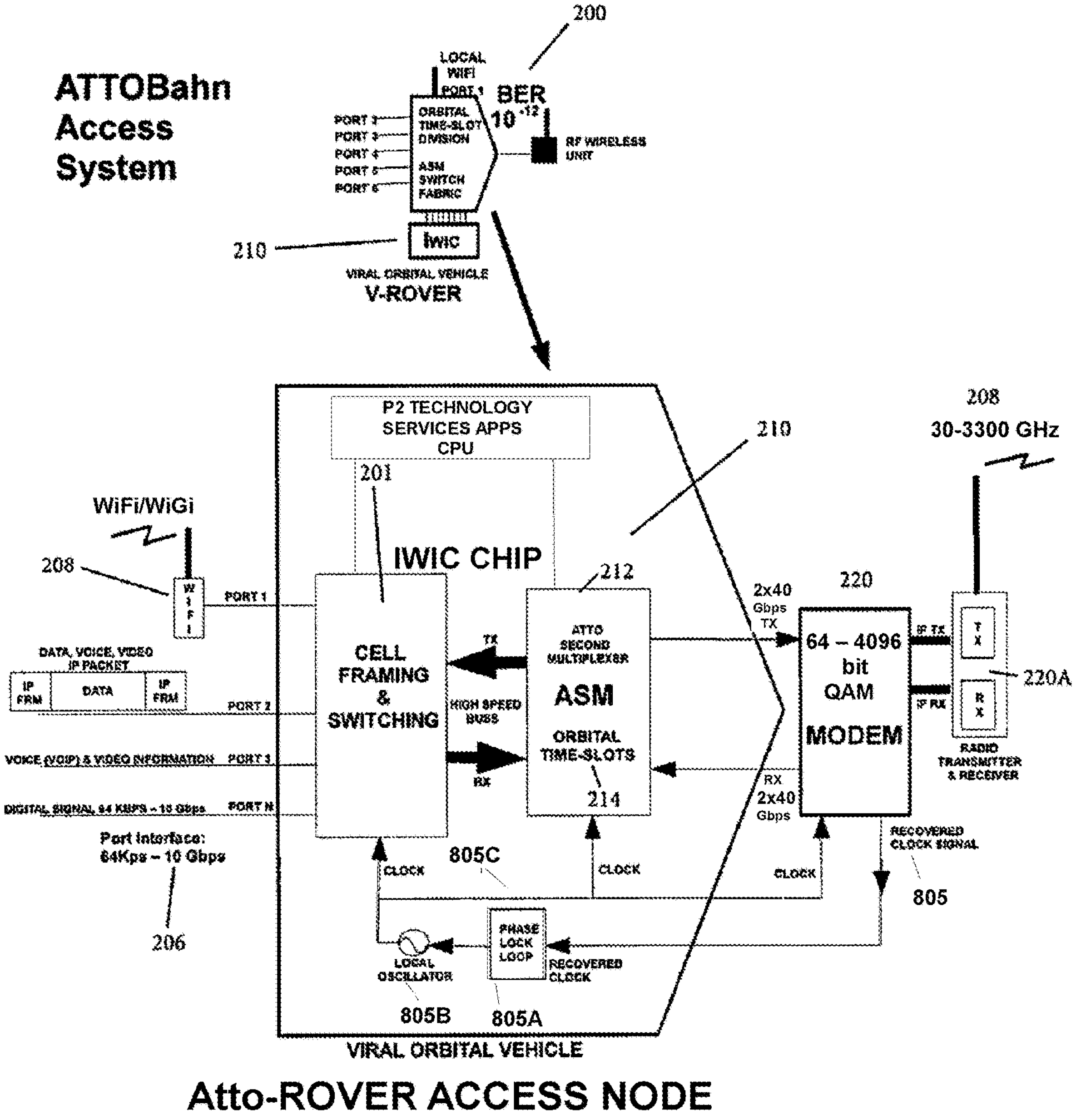
FIG. 28 is a series of block diagrams that illustrates the internal operations of the Viral Orbital Vehicle Atto-ROVER access node communications device on end user information and digital streams which is an embodiment of this invention.

As display in FIG. 8 which is an embodiment of this invention, the ADS APP also provides the ADS Monitor & Viewing Level Indicator to be displayed on the display screens (cellphones, smartphones, tablets, laptops, PCs, TVs, VRs, gaming systems, etc.) of the end user. The ADS Monitor & Viewing Level Indicator (AMVI) displays on the user screen in the form of a vertical bar that superimposes itself over whatever is being shown on the screen. The AMVI vertical bar follows the same color indications as the ones displayed on the front face glass bevels of the V-ROVERs, Nano-ROVERs, and Atto-ROVERs. The vertical bar AMVI are designed to display on the user screen as follows:

1. The light/indicator A on the vertical bar becomes bright (while light/indicator B and C remain faint) when the user of the Attobahn broadband network services was exposed to a specific high number of ADS per month.
2. The light/indicator B on the vertical bar becomes bright (while light/indicator A and C remain faint) when the user of the Attobahn broadband network services was exposed to a specific medium number of ADS per month.
3. The light/indicator C on the vertical bar becomes bright (while light/indicator A and B remain faint) when the user of the Attobahn broadband services was exposed to a specific low number of ADS per month. 2. Physical Connectivity As an embodiment of this invention FIG. 27 shows the physical connectivity between the Atto-ROVER device ports 206; WiFi and WiGi, Bluetooth, and other lower frequencies antenna 208; and the high frequency RF antenna 220 and 1) end user devices and systems but not limited to laptops, cell phones, routers, kinetic system, game consoles, desktop PCs, LAN switches, servers, 4K/5K/8K ultra high definition TVs, etc.; 2) and to the Protonic Switch. 3. Internal Systems As an embodiment of the invention FIG. 28 shows the internal operations of the Atto-ROVER communications devices 200 with. The end user data, voice, and video signals enters the device ports 206 and low frequency antenna (WiFi and WiGi, Bluetooth, etc.) 208 and are clock into the cell framing and switching system using the highly-stabilized clocking system 805C with its internal oscillator 805B and phase lock loop 805A that is referenced to the recovered clocking signal obtained from the demodulator section of the modem 220 received digital stream. Once the end user information is clock into the cell framing system, it is encapsulated into the viral molecular network cell framing format, where an Origination address, located in frame 1 of host-host communications between the local and remote Attobahn network device (see FIGS. 15.0 and 16.0 for more detail information the Originating Address) and destination ports 48-digit number (6-byte) schema address headers, using a nibble of 4 bytes per digit are inserted in the cell frame 10-byte header. The end user information stream is broken into 60-byte payloads cells which are accompanied with their 10-byte headers.

Figure 29:
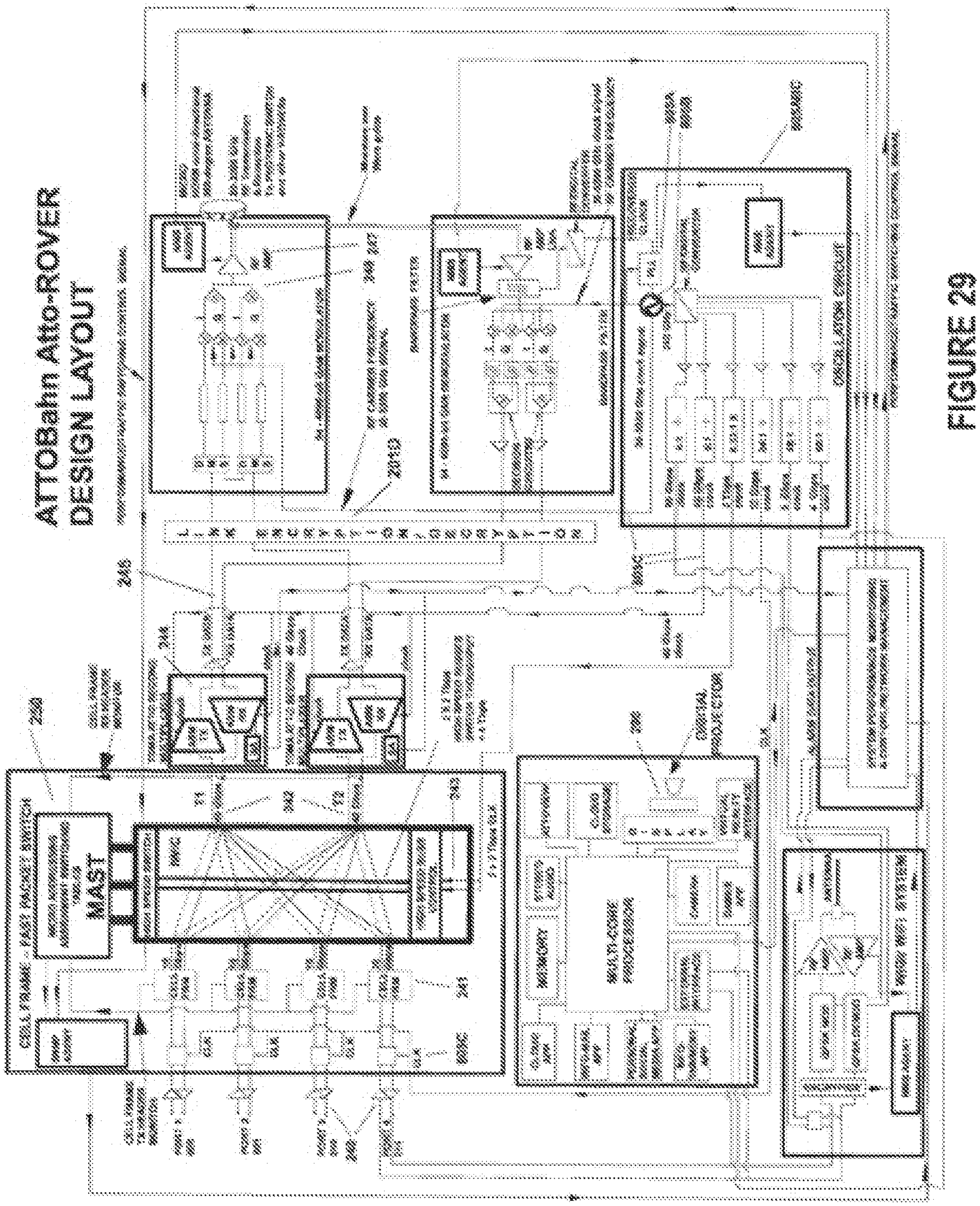
FIG. 29 illustrates the Atto-ROVER technical schematic layout of its cell frame switching fabric, ASM, QAM modems, RF amplifier and receiver, management system, and CPU which is an embodiment of this invention.

As illustrated in FIG. 28 which is an embodiment of this invention, the cell frames are placed onto the Atto-ROVER high-speed bus and delivered to the cell switching section of the IWIC Chip 210. The IWIC Chip switches the cell and sent it via the high-speed bus to the ASM 212 and placed into a specific Orbital Time Slot (OTS) 214 for transport the signal to the Protonic Switch or one of its neighboring Viral Orbital Vehicle if the traffic is staying local within the atomic molecular domain. After the cell frames passes through the ASM, they are submitted to the 4096-bit QAM modulator of the modem 220. The ASM develops two (2) high-speed digital streams that are sent to the modem and after individually modulating each digital stream into two intermediate frequency (IF) signals. The two IFs are sent to the RF system 220A mixer stage where the IF frequencies are mixed with their RF carriers (two RF carriers per Viral Orbital Vehicle device) and transmitted over the antenna 208.4. ASM Framing & Time Slots As an embodiment of the invention FIG. 20 illustrates the Atto-ROVER ASM 212 framing format that consists of Orbital Time Slots (OTS) 214 of 0.25 micro second that moves 10,000 bits within that time period. Ten (10) OTS 214A frames of 0.25 micro-second makes up one ASM frame with an orbital period of 2.5 micro second. The ASM circuitry moves 400,000 ASM frames 212A per second. The OTS 10,000 bits every 0.25 micro-second results in 40 GBps. This framing format is developed in the Viral Orbital Vehicle, Protonic Switch, and the Nucleus Switch across the Viral Molecular network. Each of these frames are placed into a time slot of the Time Division Multiple Access (TDMA) frame that communicates with both the Protonic Switch and neighboring ROVERs. 5. Atto-Rover System Schematics FIG. 29 is an illustration of the Atto-ROVER design circuitry schematics which is an embodiment of this invention, gives a detailed layout of the internal components of the device. The four (4) data ports 206 are equipped with input clocking speed of 10 GBps that is synchronized to derived/recovered clock signal from the network Cesium Beam oscillator with a stability of one part in 10 trillion. Each port interface provides a highly stable clocking signal 805C to time in and out the data signals from the end user systems.

End User Port Interface

The ports 206 of the Atto-ROVER consists of one (1) to two (2) physical USB; (HDMI); an Ethernet port, a RJ45 modular connector; an IEEE 1394 interface (also known as Fire Wire) and/or a short-range communication ports such as a Bluetooth; Zigbee; near field communication; WiFi and WiGi; and infrared interface. These physical ports receive the end user information. The customer information from a computer which can be a laptop, desktop, server, mainframe, or super computer; a tablet via a WiFi or direct cable connection; a cell phone; voice audio system; distribution and broadcast video from a video server; broadcast TV; broadcast radio station stereo, audio announcer video, and radio social media data; Attobahn mobile cell phone calls; news TV studio quality TV systems video signals; 3D sporting events TV cameras signals, 4K/5K/8K ultra high definition TV signals; movies download information signal; in the field real-time TV news reporting video stream; broadcast movie cinema theaters network video signals; a Local Area Network digital stream; game console; virtual reality data; kinetic system data; Internet TCP/IP data; nonstandard data; residential and commercial building security system data; remote control telemetry systems information for remote robotics manufacturing machines devices signals and commands; building management and operations systems data; Internet of Things data streams that includes but not limited to home electronic systems and devices; home appliances management and control signals; factory floor machinery systems performance monitoring, management; and control signals data; personal electronic devices data signals; etc.

Micro Address Assignment Switching Tables (Mast)

The Atto-ROVER port clocks in each data type via a small buffer 240 that takes care of the incoming data signal and the clocking signal phase difference. Once the data signal is synchronized with the Atto-ROVER clocking signal, the Cell Frame System (CFS) 241 scrips off a copy of the cell frame Destination Address and sends it to Micro Address Assignment Switching Tables (MAST) system 250. The MAST then determines if the Destination Address device ROVER is within the same molecular domain (400 V-ROVERs, Nano-ROVERs, and Atto-ROVERs) as the Originating Address ROVER device.

If the Origination and Destination addresses are in the same domain, then the cell frame is switch via anyone of the two 40 GBps trunk ports 242 where the frames is transmitted either to the Protonic Switch or the neighboring ROVER. If the cell frames Destination Address is not in the same molecular domain as the Origination Address ROVER device, then the cell switch switches the frame to trunk port 1 which is connected to the Protonic Switch that controls the molecular domain.

The design to have a frame whose Destination Address ROVER device is not within the local molecular domain, be automatically sent to the Protonic Switching Layer (PSL) of the network, is to reduce the switching latency through the network. If this frame is switched to its neighboring ROVER, instead of going directly to a Protonic Switch, the frame will have to transit many ROVER devices, before it leaves the molecular domain to its final destination in another domain.

Switching Throughput

The Atto-ROVER cell frame switching fabric which is an embodiment of this invention, uses a two (2) individual busses 243 running at 2 TBps. This arrangement gives each Atto-ROVER cell switch a combined switching throughput of 4 GBps. The switch can move any cell frame in and out of the switch within an average of 280 picoseconds. The switch can empty any of the 40 GBps trunks 242 of data within less than 5 milliseconds. The two (2) 40 GBps data trunks' 242 digital streams are clock in and out of the cell switch by 2×40 GHz highly stable Cesium Beam 800 (FIG. 84) reference source clock signal which is an embodiment of this invention.

Atto Second Multiplexing (ASM)

The two trunks signal are fed into the Atto Second Multiplexer (ASM) 244 via the Encryption System 201C. The ASM places the 2×40 GBps data stream into the Orbital Time Slot (OTS) frame as displayed in FIG. 19. The ASM ports 245 one (1) and two (2) output digital streams are inserted into the TDMA time slots then send to the QAM modulators 246 for transmission across the millimeter wave radio frequency (RF) links. The ASMs receive TDMA digital frames from the QAM demodulators, demultiplex the TDMA time slot signal designated for its Atto-ROVER and OTS back into the 40 GBps data streams. The cell switch trunk ports 242 monitor the incoming cell frames from the Protonic Switch (always on ASM Portland cell switch T1) and the one neighboring ROVER (always on ASM Port 2 and cell switch T2).

The Atto-ROVER cell switch trunks monitor the two incoming 40 GBps data streams 48-bit Destination Address in the cell frames and sent them to the MAST 250. The MAST examines the addresses and when the address for the local ROVER is identified, the MAST reads the 3-bit physical port address and instructs the switch to switch those cell frames to their designated ports.

When the MAST determines that a 48-bit Destination Address is not for its local ROVER or its neighbor, then it instructs the switch to switch that cell frame to T1 toward the Protonic Switch. If the address is for the neighboring ROVER, the MAST instructs the switch to switch the cell frame to the designated neighboring ROVER.

Link Encryption

The Atto-ROVER ASM two trunks terminate into the Link Encryption System 201D. The link Encryption System is an additional layer of security beneath the Application Encryption System that sits under the AAPI as shown in FIG. 6.

The Link Encryption System as shown in FIG. 29 which is an embodiment of this invention, encrypts the two Atto-ROVER's 40 GBps data streams that comes out from the ASMs. This process ensures that cyber adversaries cannot see Attobahn data as it traverses the millimeter wave spectrum. The Link Encryption System uses a private key cypher between the ROVERs, Protonic Switches, and Nucleus Switches. This encryption system at a minimum meets the AES encryption level but exceeds it in the way the encryption methodology is implemented between the Access Network Layer, Protonic Switching Layer, and Nucleus Switching Layer of the network.

QAM Modem

The Atto-ROVER Quadrature Amplitude Modem (QAM) 246 as shown in FIG. 29 which is an embodiment of this invention, is a two-section modulator and demodulator. Each section accepts a digital baseband signal of 40 GBps that modulates the 30 GHz to 3300 GHz carrier signal that is generated by local Cesium Beam referenced oscillator circuit 805ABC. QAM Modem Maximum Digital Bandwidth Capacity The Atto-ROVER QAM modulator uses a 64-4096-bit quadrature adaptive modulation scheme. The modulator uses an adaptive scheme that allows the transmission bit rate to vary according to the condition of the millimeter wave RF transmission link signal-to-noise ratio (S/N). The modulator monitors the receive S/N ratio and when this level meets its lowest predetermined threshold, the QAM modulator increases the bit modulation to its maximum of 4096-bit format, resulting in a 12:1 symbol rate. Therefore, for every one hertz of bandwidth, the system can transmit 12 bits. This arrangement allows the Atto-ROVER to have a maximum digital bandwidth capacity of 12×24 GHZ (when using a bandwidth 240 GHz carrier)=288 GBps. Taking the two Atto-ROVER 240 GHz carriers, the full capacity of the Atto-ROVER at a carrier frequency of 240 GHz is 2×288 GBps-576 GBps.

Across the full spectrum of Attobahn millimeter wave RF signal operation of 30-3300 GHz, the range of Atto-ROVER at maximum 4096-bit QAM will be:

$$\text{30 GHz carrier, 3 GHz bandwidth: } 12\times 3\text{ GHz}\times 2\text{ Carrier Signals} = 72\ GBps\text{ (Giga Bits per second)}$$

$$\text{3300 GHz, 330 GHz bandwidth: } 12\times 330\text{ GHz}\times 2\text{ Carrier Signals} = 7.92\ TBps\text{ (Tera Bits per second)}$$

Therefore, the Atto-ROVER has a maximum digital bandwidth capacity of 7.92 TBps.

QAM Modem Minimum Digital Bandwidth Capacity

The Atto-ROVER modulator monitors the receive S/N ratio and when this level meets its highest predetermined threshold, the QAM modulator decreases the bit modulation to its minimum of 64-bit format, resulting in a 6:1 symbol rate. Therefore, for every one hertz of bandwidth, the system can transmit 6 bits. This arrangement allows the Atto-ROVER to have a maximum digital bandwidth capacity of 6×24 GHz (when using a bandwidth 240 GHZ carrier)=1.44 GBps. Taking the two Atto-ROVER 240 GHz carriers, the full capacity of the ROVER at a carrier frequency of 240 GHz is 2×1.44 GBps=2.88 GBps.

Across the full spectrum of Attobahn millimeter wave RF signal operation of 30-3300 GHz, the range of V-ROVER at minimum 64-bit QAM will be:

$$\text{30 GHz carrier, 3 GHz bandwidth: } 6\times 3\text{ GHz}\times 2\text{ Carrier Signals} = 36\ GBps\text{ (Giga Bits per second)}$$

$$\text{3300 GHz, 330 GHz bandwidth: } 6\times 330\text{ GHz}\times 2\text{ Carrier Signals} = 3.96\ TBps\text{ (Tera Bits per second)}$$

Therefore, the Atto-ROVER has a minimum digital bandwidth capacity of 3.96 TBps. Hence, the digital bandwidth range of the Atto-ROVER across the millimeter and ultra-high frequency range of 30 GHz to 3300 GHz is 36 GBps to 7.92 TBps.

The Atto-ROVER QAM Modem automatically adjusts its constellation points of the modulator between 64-bit to 4096-bit. When the S/N decreases the bit error rate of the received digital bits increases if the constellation points remain the same. Therefore, the modulator is designed to harmoniously reduce its constellation point, symbol rate with the S/N ratio level, thus maintaining the bit error rate for quality service delivery over wider bandwidth. This dynamic performance design allows the data service of Attobahn to gracefully operate at a high quality without the end user realizing a degradation of service performance.

Modem Data Performance Management

The Atto-ROVER modulator Data Management Splitter (DMS) 248 circuitry which is an embodiment of this invention, monitors the modulator links' performances and correlates each of the two (2) RF links S/N ratio with the symbol rate it applies to the modulation scheme. The modulator simultaneously takes the degradation of a link and the subsequent symbol rate reduction, immediately throttle back data that is designated for the degraded link, and divert its data traffic to a better performing modulator.

Hence, if modulator No. 1 detects a degradation of its RF link, then the modem system with take traffic from that degraded modulator and direct it to modulator No. 2 for transmission across the network. This design arrangement allows the Atto-ROVER system to management its data traffic very efficiently and maintain system performance even during transmission link degradation. The DMS carries out these data management functions before it splits the data signal into two streams to the in phase (I) and 90-degree out of phase, quadrature (Q) circuitry 251 for the QAM modulation process.

Demodulator

The Atto-ROVER QAM demodulator 252 functions in the reverse of its modulator. It accepts the RF I-Q signals from the RF Low Noise Amplifier (LNA) 254 and feeds it to the I-Q circuitry 255 where the original combined digital together after demodulation. The demodulator tracks the incoming I-Q signals symbol rate and automatically adjust itself to the incoming rate and harmoniously demodulate the signal at the correct digital rate. Therefore, if the RF transmission link degrades and the modulator decreased the symbol rate from its maximum 4096-bit rate to 64-bit rate, the demodulator automatically tracks the lower symbol rate and demodulates the digital bits at the lower rate. This arrangement makes sure that the quality of the end to end data connection is maintained by temporarily lowering the digital bit rate until the link performance increases.

Atto-Rover RF Circuitry

The Atto-ROVER millimeter wave (mmW) radio frequency (RF) circuitry 247A is design to operate in the 30 GHz to 3300 GHz range and deliver broadband digital data with a bit error rate (BER) of 1 part in 1 billion to 1 trillion under various climatic conditions.

mmW RF Transmitter

The Atto-ROVER mmW RF Transmitter (TX) stage 247 consists of a high frequency upconverter mixer 251A that allows the local oscillator frequency (LO) which has a frequency range from 30 GHz to 3300 GHz to mix the 3 GHz to 330 GHz bandwidth baseband I-Q modem signals with the RF 30 GHZ to 330 GHz carrier signal. The mixer RF modulated carrier signal is fed to the super high frequency (30-3300 GHz) transmitter amplifier 253. The mmW RF TX has a power gain of 1.5 dB to 20 dB. The TX amplifier output signal is fed to the rectangular mmW waveguide 256. The waveguide is connected to the mmW 360-degree circular antenna 257 which is an embodiment of this invention.

mmW RF Receiver

FIG. 28 which is an embodiment of this invention, shows the Atto-ROVER mmW Receiver (RX) stage 247A that consists of the mmW 360-degree antenna 257 connected to the receiving rectangular mmW waveguide 256. The incoming mmW RF signal is received by the 360-degree antenna, where the received mmW 30 GHz-3300 GHz signal is sent via the rectangular waveguide to the Low Noise Amplifier (LNA) 254 which has up to a 30-dB gain.

After the signal leaves, the LNA, it passes through the receiver bandpass filter 254A and fed to the high frequency mixer. The high frequency down converter mixer 252A allows the local oscillator frequency (LO) which has a frequency range from 30 GHz to 3300 GHz to demodulate the I and Q phase amplitude 30 GHz to 3300 GHz carrier signals back to the baseband bandwidth of 3 GHz to 330 GHz. The bandwidth baseband Q signals 255 are fed to the 64-4096 QAM demodulator 252 where the separated I-Q digital data signals are combined back into the original single 40 GBps data stream. The QAM demodulator 252 two (2) 40 GBps data streams are fed to the decryption circuitry and to the cell switch via the ASM.

Atto-Rover Clocking & Synchronization Circuitry

FIG. 29 show the Atto-ROVER internal oscillator 805ABC which is controlled by a Phase. Lock Loop (PLL) circuit 805A that receives it reference control voltage from the recovered clock signal 805. The recovered clock signal is derived from the received mmW RF signal from the LNA output. The received mmW RF signal is sample and converted into digital pulses by the RF-to-digital converter 805E as illustrated in FIG. 29 which is an embodiment of this invention.

The mmW RF signal that is received by the Atto-ROVER came from the Protonic Switch or the neighboring ROVER which are in the same domain. Since each domain devices (Protonic Switch and ROVERs) RF and digital signals are reference to the uplink Nucleus Switches, and the Nucleus Switches are referenced to the National Backbone and Global Gateway Nucleus Switches as illustrated in FIG. 107 which is an embodiment of this invention, then each Protonic Switch and ROVER are in effect referenced to the Atomic Cesium Beam high stability oscillatory system. Since Atomic Cesium Beam oscillatory system is referenced to the Global Position Satellite (GPS) it means that all of Attobahn systems globally are referenced to the GPS.

This Atto-ROVER clocking and synchronization design makes all of the digital clocking oscillator in every Nucleus Switch, Protonic Switch, V-ROVER, Nano-ROVER, Atto-ROVER and Attobahn ancillary communications systems such as fiber optics terminals and Gateway Routers referenced to the GPS worldwide.

The referenced GPS clocking signal derived from the Atto-ROVER mmW RF signal varies the PLL output voltage in harmony with the received GPS reference signal phases between 0-360 degrees of its sinusoid at the GNCCs (Global Network Control Center) Atomic Cesium Oscillators. The PLL output voltage controls the output frequency of the Atto-ROVER local oscillator which in effect is synchronized to the Atomic Cesium Clock at the GNCCs, that is referenced to the GPS.

The Atto-ROVER clocking system is equipped with frequency multiplier and divider circuitry to supply the varying clock frequencies to following sections of the system:

1. *RF* mixer/*Upconverter*/Down Converter $1\times30-3300$ GHz
2. *QAM* Modem $1\times30-3300$ GHz signal
3. Cell Switch $2\times2$ *THz* signals
4. *ASM* $2\times40$ GHz signals
5. End User Ports $8\times10$ GHz $-$ 20 GHz signal
6. CPU & Cloud Storage $1\times2$ GHz signal
7. WiFi & *WiGi* Systems $1\times5$ GHz and $1\times60$ GHz signals The Atto-ROVER clocking system design ensures that Attobahn data information is completely synchronized with the Atomic Cesium Clock source and the GPS, so that all applications across the network is digitally synchronized to the network infrastructure which radically minimizes bit errors and significantly improved service performance.

Atto-Rover Screen Projector

As illustrated in FIG. 26A and FIG. 29 which is an embodiment of this invention, the Atto-ROVER is equipped with a projector circuitry 290 and high intensity light that projects images from the Atto-ROVER screen onto any clear surface to display the images on its screen. The projector circuitry is designed to receive images from the Atto-ROVER screen signal, digitally process it, and then feed it to light projector.

The projector technical specifications:

1. BRIGHTNESS: 4-8 LUMENS
2. ASPECT RATIO: 4; 3
3. NATIVE RESOLUTION: 320×240 (720p)
4. FOCUS: AUTOMATIC
5. DISPLAY COVER AREA: 12-48 INCHES

The projector light is on the right side (front view) of the Atto-ROVER. The project light 290 has a circumference of ¼ inch. The light is positioned so that the Atto-ROVER can position at the correct angle using the Atto-ROVER adjustable stand 291. Atto-Rover Multi-Processor & Services The Atto-ROVER is equipped with dual quad-core 4 GHZ, 8 GB ROM, 500 GB storage CPU that manages the Cloud Storage service, network management data, and various administrative functions such as system configuration, alarms message display, and user services display in device.

The Atto-ROVER CPU monitors the system performance information and communicates the information to the ROVERs Network Management System (RNMS) via the logical port 1 (FIG. 6) Attobahn Network Management Port (ANMP) EXT.001. The end use has a touch screen interface to interact with the V-ROVER to set passwords, access services, purchase shows, communicate with customer service, etc.

The Atto-ROVER CPU runs the following end user Personal Services APPs and administrative functions:

1. Personal InfoMail
2. Personal Social Media
3. Personal Infotainment
4. Personal Cloud
5. Phone Services
6. New Movie Releases Services Download Storage/Deletion Management
7. Broadcast Music Services
8. Broadcast TV Services
9. Online WORD, SPREAD SHEET, DRAW, & DATABASE
10. Habitual APP Services
11. GROUP Pay Per View Services
12. Concert Pay Per View
12. Online Virtual Reality
13. Online Video Games Services
14. Attobahn Advertisement Display Services Management (banners and video fade in/out)
15. Atto View Dashboard Management
16. Partner Services Management
17. Pay Per View Management
18. VIDEO Download Storage/Deletion Management
19. General APPs (Google, Facebook, Twitter, Amazon, What's Up, etc.)
20. Camera
21. Display Screen Projection on to a white surface (even disposal paper)

Each one of these services, Cloud service access, and storage management is controlled by the Cloud APP in the Atto-ROVER CPU.

Protonic Switch

Figure 30:
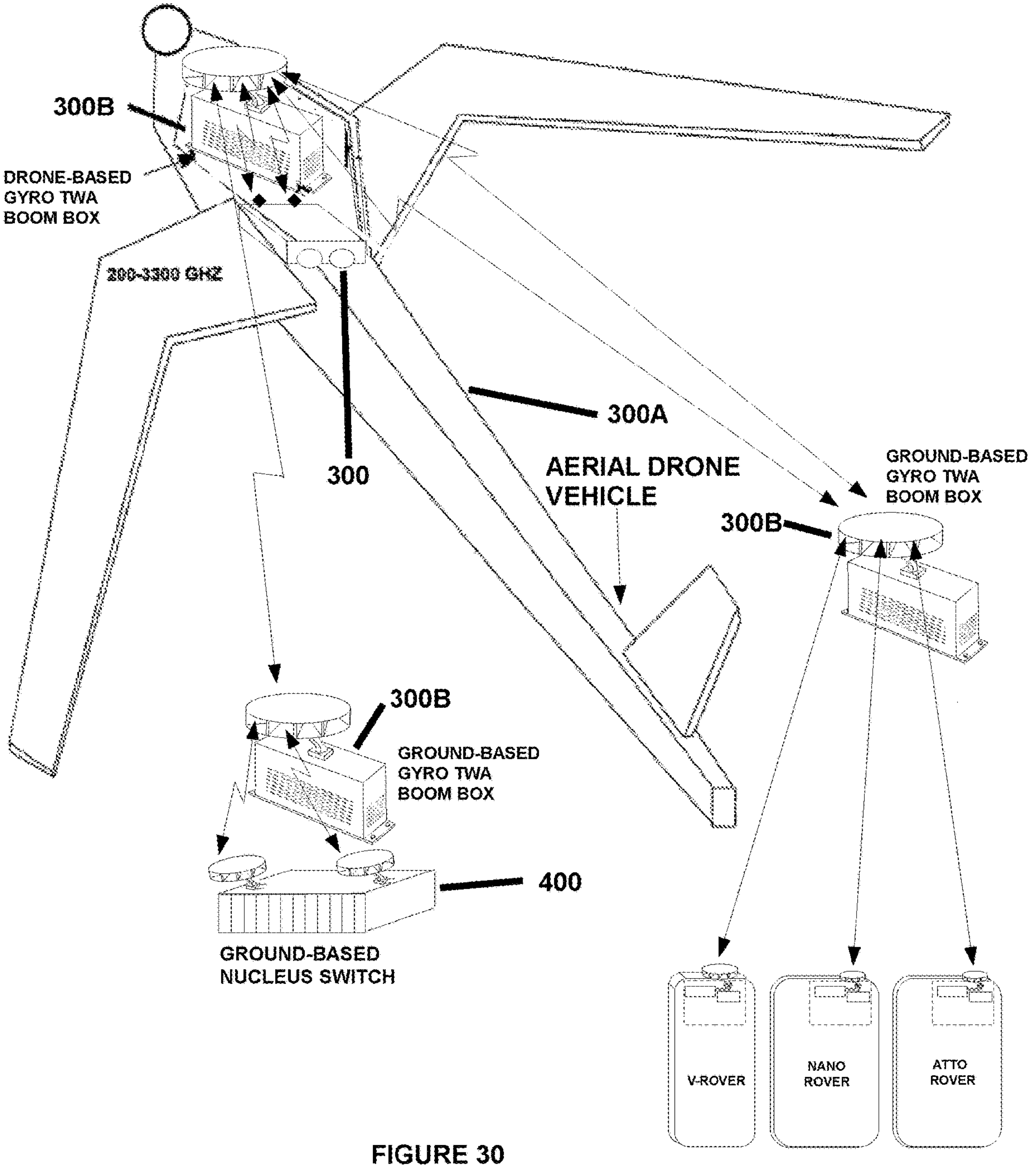
FIG. 30 illustrates the Protonic Switch communications device installed in an aerial drone aircraft providing one of the Protonic Switching Layer mobile extensions which is an embodiment of this invention.

As an embodiment of the invention, FIG. 30 show the layout of the Protonic Switch 300 aerial drone 300A design. The Protonic switch is combined with a Gyro TWA Boom Box 300B are installed in the drone and is designed to operate at altitudes exceeding 70,000 feet and temperatures at −80-degree to −40-degree F. The Protonic Switch uses power from the drone's solar power cells and transmits mmW RF signal ranging from 30 GHz to 3300 GHz to cover over 20 miles to its closest ground based Nucleus Switch 400 or paired ground based Protonic Switches 300B to relay the high-speed switch cell frames. The drone Protonic Switch receives four RF signals from its ground based two paired Protonic Switches and Nucleus Switch. The RF signals are demodulated by the 16 bit DPSK modem and passed on to the ASM OTS where the cell frames sent to the high-speed cell switching circuitry. The switched cells are interleaved into OTS and subsequently sent back to the ground based Protonic and Nucleus Switches.

Figure 31:
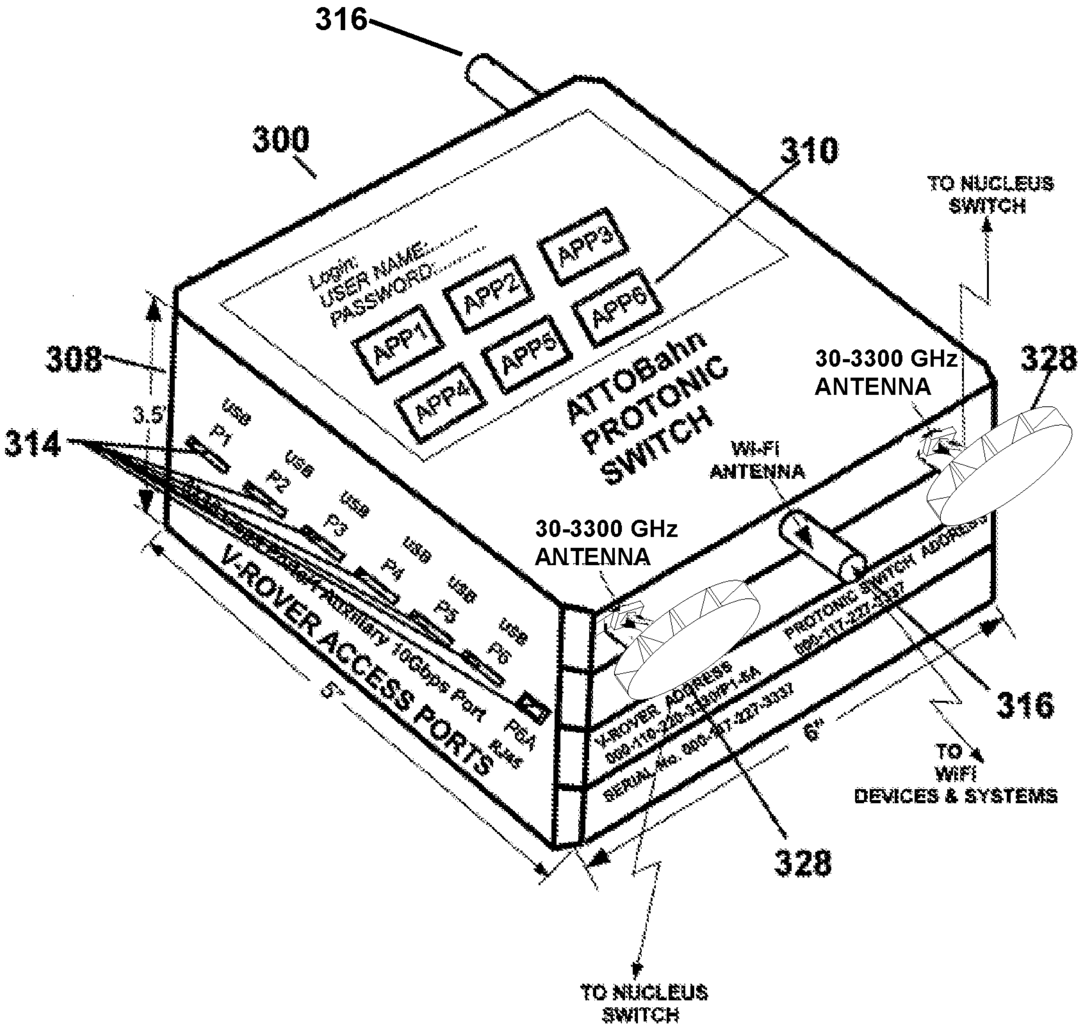
FIG. 31 is a block diagram that illustrates the Protonic Switch communications device housing front view, connector ports side view for its local V-ROVER; the display for local system configuration and operational status; and the 30-3300 GHz 360-degree RF antennae which is an embodiment of this invention.

As an embodiment of the invention FIG. 31 shows the Protonic Switch communications unit 300. The unit has two antennae for the reception and transmission of RF signal in the 30 to 3300 GHz range and two antennae 316 for reception and transmission WiFi and WiGi, Bluetooth and other lower frequencies. The unit has one built in Viral Orbital Vehicle device to allow end users who has the device in their home, vehicle, or within close proximity to have access to the viral molecular network. In order to connect end users to internal Viral Orbital Vehicle, V-ROVER, the unit housing is equipped with a minimum of 8 physical ports 314 that can accept high-speed data streams, ranging from 64 Kbps to 10 GBps from Local Area Network (LAN) interfaces which is not limited to a USB port, and can be a high-definition multimedia interface (HDMI) port, an Ethernet port, a RJ45 modular connector, an IEEE 1394 interface (also known as Fire Wire) and/or a short-range communication ports such as a Bluetooth, Zigbee, near field communication, or infrared interface that carries TCP/IP packets or data streams from the Application Programmable Interface (AAPI); Voice Over IP (VOIP), or video IP packets.

The unit has a front glass panel LCD display 310 that provides configuration and troubleshooting access for the end user. The housing case 308 is 6 inches long, 5 inches wide, and 3.5 inches high. The unit is design to be place in vehicles, homes, aerial drones, cafes, offices, desktops, table tops, etc. The unit has a DC power connector for the DC power plug that charges the internal battery.

Figures 7A, 32:
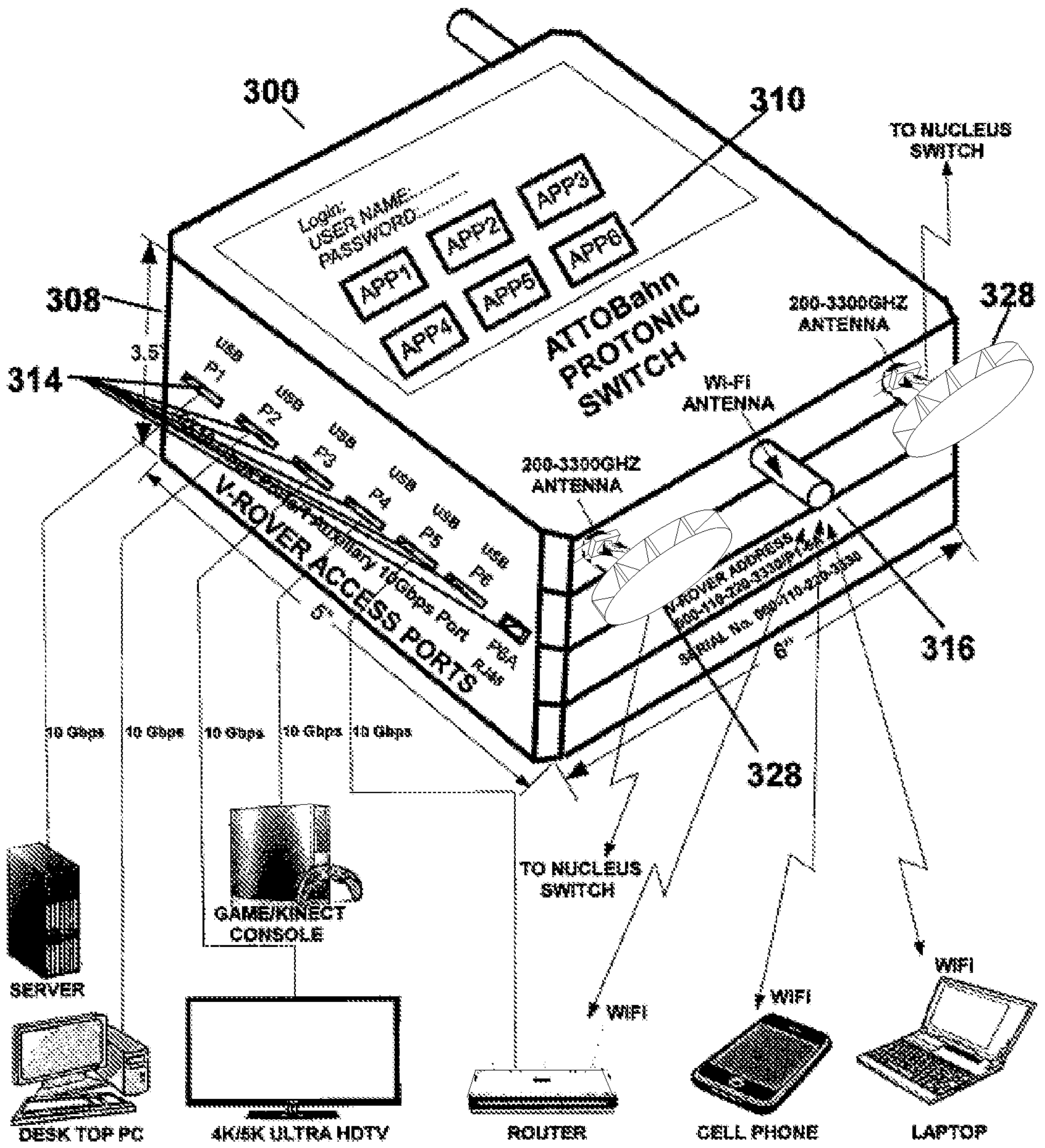
FIG. 32 shows the Protonic Switch communication device housing displaying the physical connectivity to typical end users' PCs, Laptops, game console and kinetic system, servers, etc.

As an embodiment of the invention FIG. 32 shows the end user physical connections to the Protonic Switch internal Viral Orbital Vehicle. The ports 314 of the unit can connects to desktop PC, game console/kinetic, server, 4K/5K/8K ultra high definition TVs, digital HDTV, etc. The Protonic Switch lower frequency antenna 316 provides WiFi and WiGi, Bluetooth, wireless connections to routers, cell phones, laptops, and numerous wireless devices.

Figure 33:
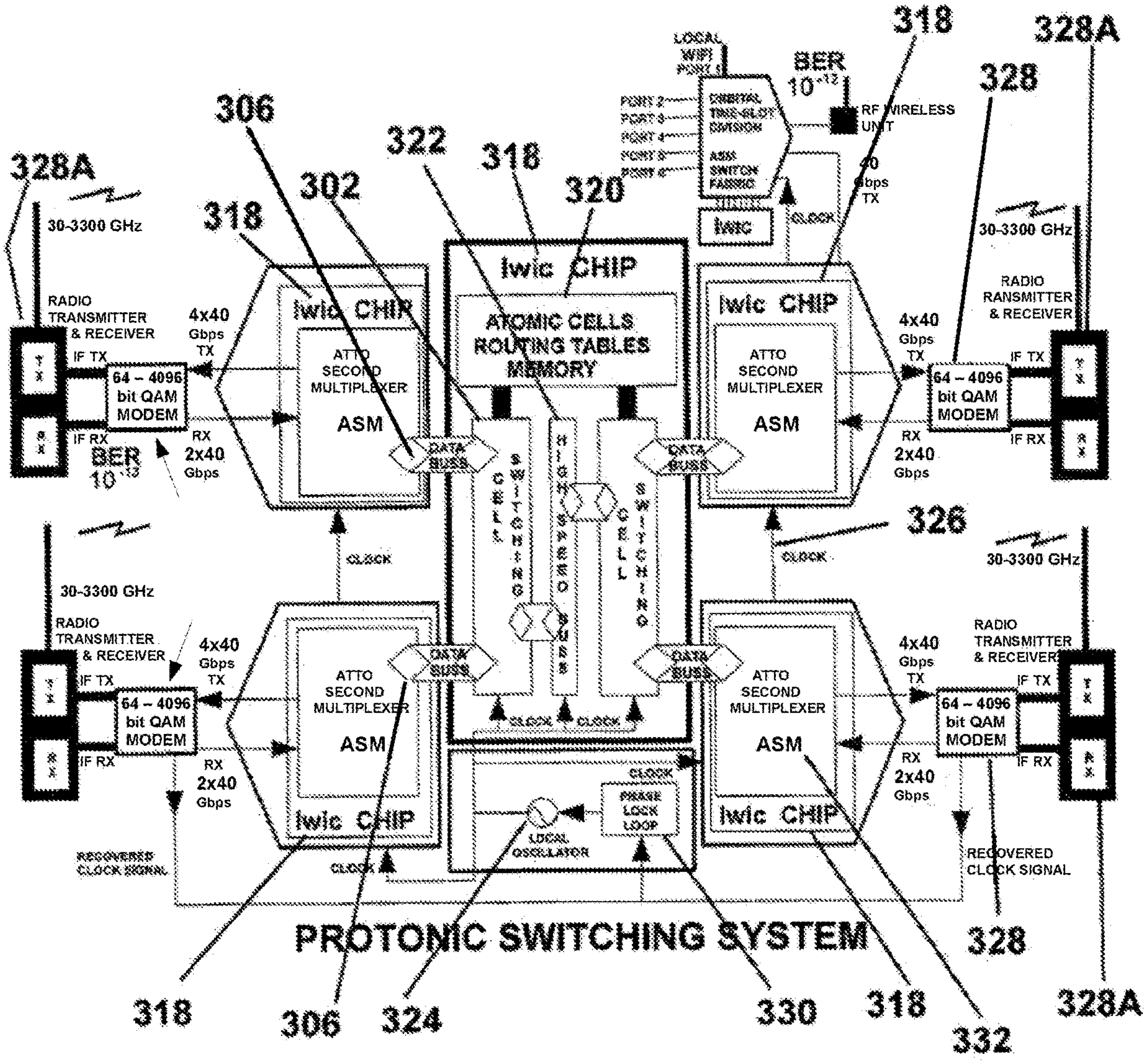
FIG. 33 is a series of block diagrams that illustrates the internal operations of the Protonic Switch communications device on end user information and digital streams which is an embodiment of this invention.

As an embodiment of the invention FIG. 33 displays the internal operations of the Protonic Switch 300. The Protonic Switch is positioned, installed, and placed in: homes; cafes such as Starbucks, Panera Bread, etc.; vehicles (cars, trucks, RVs, etc.); school classrooms and communications closets; a person's pocket or pocket books; corporate offices communications rooms, workers' desktops; aerial drones or balloons; data centers, cloud computing locations, Common Carriers, ISPs, news TV broadcast stations; etc.

The PSL switching fabric consists of a core cell switching node 302 surrounded by 16 ASM multiplexers 332 with each multiplexer running four individual 64-4096-bit QAM modems 328 and associated RF system 328A. The Four ASM/64-4096-bit QAM Modems/RF systems drives a total bandwidth ranging from of 16×40 GBps to 16×1 TBps digital steams, adding up to a high capacity digital switching system with an enormous bandwidth of 0.64 Terabits per second (0.64 TBps) or 640,000,000,000 bits per second to 16 TBps. The core of the cell switching fabric consists of several high-speed busses 306, that accommodate the passage of the data from the ASM orbital time-slots and place them in the queue to read the ROVERs cell frames destination addresses by the MAST. The cells that came in from the ROVERs which are not destined for ROVERs in the same molecular domain that the Protonic Switch serves, are automatically switched to the time-slots that are connected to the Nucleus Switching hubs at the central switching nodes in the core backbone network. This arrangement of not looking up routing tables for the Global and Area Codes addresses that transit the Protonic Switches radically reduces latency through the protonic nodes.

This helps to improve the overall network performance and increases data throughput across the infrastructure. The ASM and cell switching high-speed capabilities are provided by the Instinctively Wise Integrated Circuit (IWIC) chip 318. The IWIC, high-speed buss, and modem use the clocking signal 326 generated by the internal oscillator 324. The clocking stability is obtained from clock recovered signal from the received digital stream from the modem which controls the Phase Lock Loop (PLL) device 330 that subsequently stabilizes the oscillator output clocking signal. Since the received digital signal from the Protonic Switch comes from the digital stream from the Nucleus Switch hub which is synchronized to the Atomic Cesium Beam master clocking system that is referenced to the Global Position System.

The hierarchical design of the network whereby the ROVERs do communicate only with each other and the Protonic nodes simplifies the network switching processes and allows a simply algorithm to accommodate the switching between the Protonic nodes and their acquired orbiting ROVERs. The Hierarchical design also allows the Protonic nodes to switch cells only between the ROVERs and the Nucleus Switching nodes. The MAST cell switching tables 320 in the Protonic Switch memory only carries their acquired ROVERs designation addresses and keeps track of these ROVERs orbital status, when they are on and acquired by the switch. The Protonic Switch reads the incoming cells from the Nucleus Switch, looks up the atomic cells routing tables, and then insert them into the orbital time-slots in the ASM that is connected to that designation ROVER, where the cell terminates.

The network is architected at the PSL to allow viral behavior of the ROVERs not just when they are being adopted by a Protonic Switch but also when they lose that adoption due to a failure of a Protonic Switch. When a Protonic Switch is turned off or its battery dies, or a component fails in the device, all of the ROVERs that were orbiting that switch as they primary adopter are automatically adopted to their secondary Protonic Switch. The ROVER's traffic is switched to their new adopter instantaneously and the service continues to function normally. Any loss of data during the ultra-fast adoption transition of the ROVER, between the failed primary Protonic Switch and the secondary Protonic Switch, is compensated at the end user terminating host or digital buffers in the case of native Attobahn voice or video signals.

The ROVER plays a critical role along with the Protonic Switches in network recover due to failures. The ROVER immediately recognizes when its primary adopter (Protonic Switch) fails or go offline and instantaneously switches all upstream and transitory data that were using its primary adopter route to its secondary adopter other links. The ROVERs that lost their primary adopter now makes their secondary adopter their primary adopter. These newly adopted V-ROVERs then seek out a new secondary adopting Protonic Switch within their operating network molecule. This arrangement stays in place until another failure occurs to their primary adopter, then the same viral adoption process is initiated again.

Each Protonic Switching node is equipped with a local V-ROVER that collects local end user traffic, so that the automobiles, coffee shops, city power spots (hot spots), homes, etc., that are housing these switches can be given network access. The locally attached V-ROVER is hard wired to one of the Protonic Switch's ASMs. This is the only originating and terminating port that the PSL layer accommodates. All other PSL ports are purely transition ports, that is, ports that transit traffic between the Access Network Layer (Viral Orbital Vehicles) and the Nucleus Switching Layer (Core Energetic Layer).

The local V-ROVER has a secondary mmW radio frequency (RF) port that also connects it to other V-ROVERs in its network molecular domain. This V-ROVER is hard wired connected to its Protonic Switch (its closest) as its primary adopter and the adopter connected to its RF port as its secondary adopter. If the local Protonic Switch fails, then the local V-ROVER goes into the resilient adoption and network recovery process.

The Protonic Switches are equipped with a minimum of eight external port interfaces for its local V-ROVER device end users' connections. This internal V-ROVER runs at 40 GBps and transfers its data from the Viral Orbital Vehicle to the molecular network. The other interfaces of the Protonic Switch are at the RF level running at 16×40

GBps across four 200-3300 GHz signals. This switch is basically self-contained and has all of its digital signal movement across its ultra-high terabits per second busses that connects its switching fabric, ASMs, and 64-4096-bit QAM modulators.

The Protonic Switching Layer (PSL) is synchronized to the Nucleus Switching Layer (NSL) and Access Network Layer (ANL) systems using recovery-looped back clocking schema to the higher level standard oscillator. The standard oscillator is referenced to the GPS service worldwide, allowing clock stability.

This high level of clocking stability when distributed to the PSL level via the NSL system and radio links gives a clocking and synchronization stability of 1 part of 10 {circumflex over ( )} 13.

The PSL nodes are all set for recovered clock from the Intermediate Frequency at the demodulator. The recovered clock signal controls the internal oscillator and reference its output digital signal which then drives the high-speed buss, ASM gates and IWIC chip. This makes sure that all of the digital signal that are being switched and interleaved in the orbital time-slots of the ASM are precisely synchronized and thus reducing bit errors rate.

The Protonic switch is the second communications device of the Viral Molecular network and it has a housing that is equipped with a cell framing high-speed switch. The Protonic Switch includes the function of placing the 70-byte cell frames into the application specific integrated circuit (ASIC) called the IWIC which stands for Instinctively Wise Integrated Circuit.

The IWIC is the cell switching fabric of the Viral Orbital Vehicle (ROVERs), Protonic Switch, and Nucleus Switch. This chip operates in the terahertz frequency rates and it takes the cell frames that encapsulates the customers digital stream information and place them onto the high-speed switching buss. The Protonic Switch has sixteen (16) parallel high-speed switching busses. Each bus runs at 2 terabits per second (TBps) and the sixteen parallel busses move the customer digital stream encapsulated in the cell frames at combined digital speed of 32 Terabits per second (TBps). The cell switch provides a 32 TBps switching throughput between its Viral Orbital Vehicles (ROVERs) connected to it and the Nucleus Switches.

The Protonic Switch housing has an Atto Second Multiplexing (ASM) circuitry that uses the IWIC chip to place the switched cell frames into Time Division Multiple Access (TDMA) orbital time slots (OTS) across sixteen digital streams running at 40 Gigabits per second (GBps) to 1 Tera Bits per second (TBps) each, providing an aggregate data rate of 640 GBps to 16 TBps.

As shown in FIG. 20 which is an embodiment of this invention, the ASM takes cell frames from the high-speed busses of the cell switch and places them into TDMA orbital time slots of 0.25 micro second period, accommodating 10,000 bits per time slot (OTS). Ten of these orbital time slots makes one of the Atto Second Multiplexing (ASM) frames, therefore each ASM frame has 100,000 bits every 2.5 micro second.

There are 400,000 ASM frames every second in each 40 GBps digital stream. Twenty-five (25) ASM frames fits in one (1) of the Protonic Switch port digital stream of 1 TBps. Each of these ASM frames are inserted into a designated TDMA time slot associated with a ROVER device that it is communicating with in the network. The Protonic Switch ASM moves 640 GBps to 16 TBps via 16 digital streams to the intermediate frequency (IF) QAM modem of the radio frequency section. These digital streams pass through the link encryption circuitry as illustrated in FIG. 33 which is an embodiment of this invention. The Protonic Switch has a radio frequency (RF) section that consist of four (4) quad intermediate frequency (IF) modems and RF transmitter/receiver with 16 RF signals.

The IF modem is a 64-4096-bit QAM that takes the 16 individual 40 GBps to 16 TBps digital streams from the ASM modulate them with one of the 16 RF carriers. The RF carriers is in the 30 to 3300 Gigahertz (GHz) range. The Protonic Switch housing has an oscillator circuitry that generates all of the digital clocking signals for all of the circuitry that needs digital clocking signals to time their operation. These circuitries are the port interface drivers, high-speed busses, ASM, IF modem and RF equipment. The oscillator is synchronized to the Global Positioning System by recovering the clocking signal from the received digital streams of the Protonic Switches. The oscillator has a phase lock loop circuitry that uses the recovered clock signal from the received digital stream and control the stability of the oscillator output digital signal.

Protonic Switch System Schematics

Figure 34:
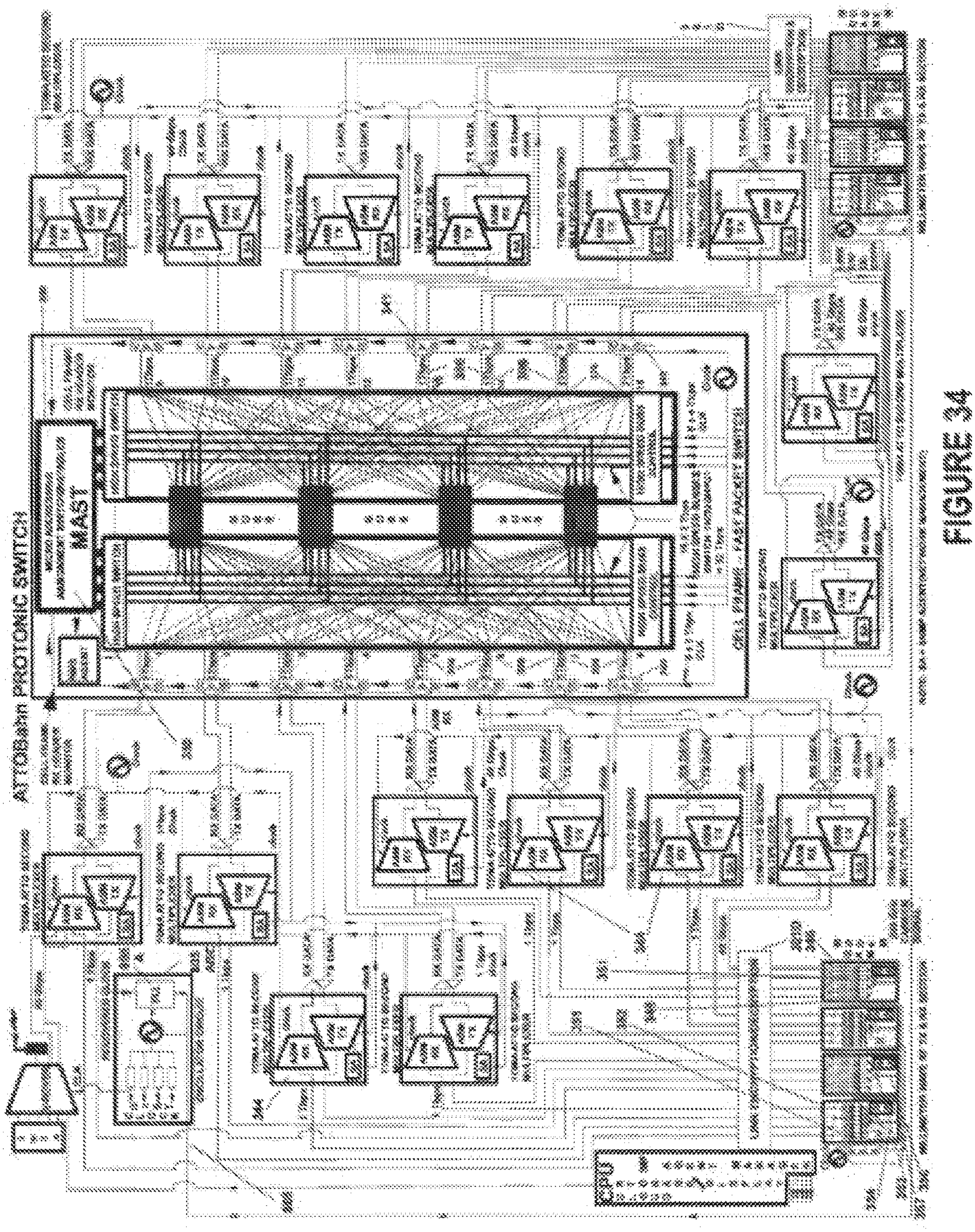
FIG. 34 illustrates the Protonic Switch technical schematic layout of its cell frame switching fabric, ASM, QAM modems, RF amplifier and receiver, management system, and CPU which is an embodiment of this invention.

FIG. 34 is an illustration of the Protonic Switch design circuitry schematics which is an embodiment of this invention, and gives a detailed layout of the internal components of the switch. The sixteen (16) high speed 40 GBps to 1 TBps data ports 306 are equipped with input clocking speed of 40 GBps to 1 TBps that is synchronized to derived/recovered clock signal from the network Cesium Beam oscillator with a stability of one part in 10 trillion. Each port interface provides a highly stable clocking signal 805C to time in and out the data signals from the network.

Local V-Rover End User Port Interface

Figure 35:
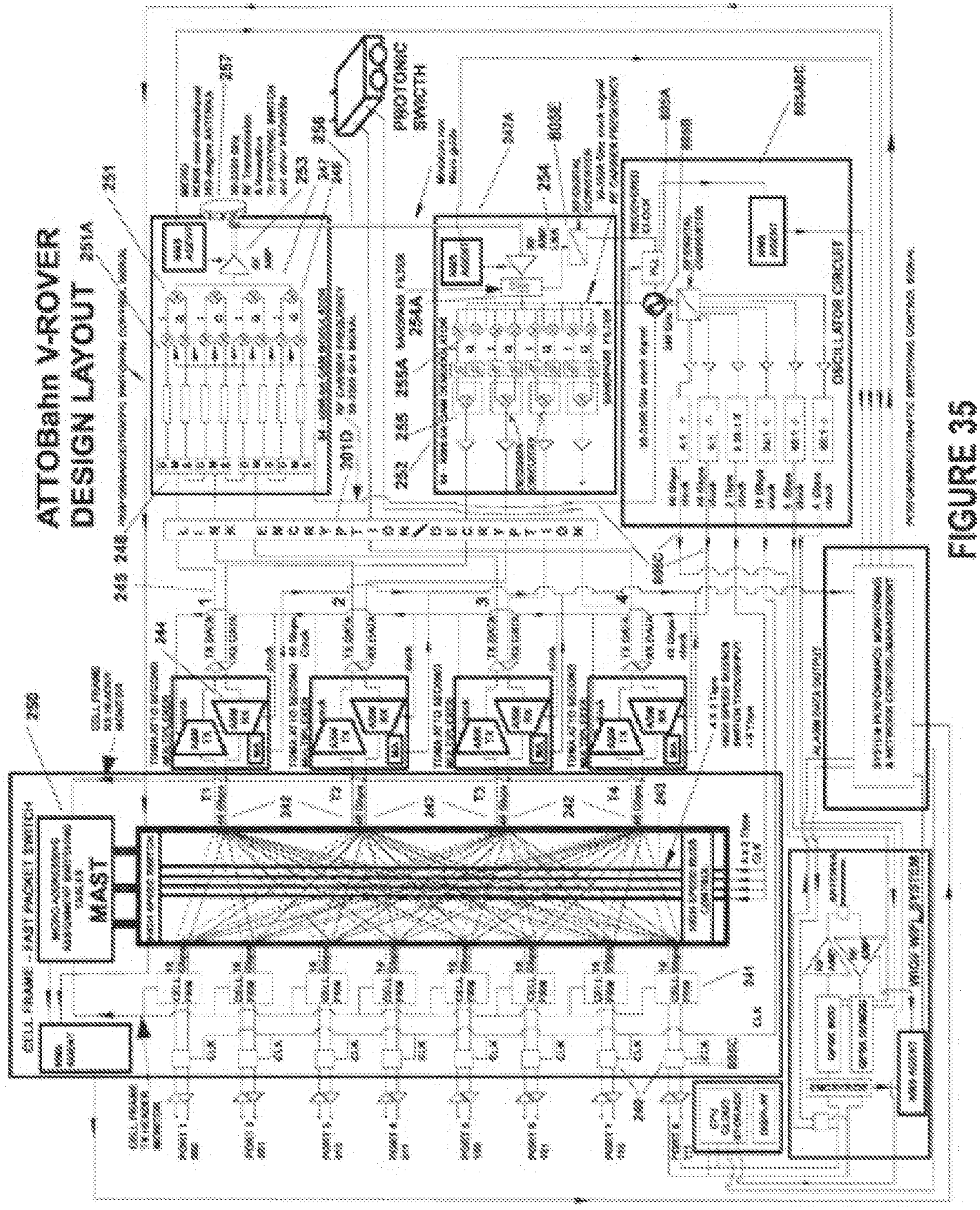
FIG. 35 illustrates the V-ROVER that is integrated in the Protonic Switch.

As shown in FIG. 35 which is an embodiment of the invention, the local V-ROVER consists of 8 physical ports that have USB; (HDMI); an Ethernet port, a RJ45 modular connector; an IEEE 1394 interface (also known as FireWire) and/or a short-range communication ports such as a Bluetooth; Zigbee; near field communication; WiFi and WiGi; and infrared interface. These physical ports receive the end user information. The customer information from a computer which can be a laptop, desktop, server, mainframe, or super computer; a tablet via a WiFi or direct cable connection; a cell phone; voice audio system; distribution and broadcast video from a video server; broadcast TV; broadcast radio station stereo, audio announcer video, and radio social media data; Attobahn mobile cell phone calls; news TV studio quality TV systems video signals; 3D sporting events TV cameras signals, 4K/5K/8K ultra high definition TV signals; movies download information signal; in the field real-time TV news reporting video stream; broadcast movie cinema theaters network video signals; a Local Area Network digital stream; game console; virtual reality data; kinetic system data; Internet TCP/IP data; nonstandard data; residential and commercial building security system data; remote control telemetry systems information for remote robotics manufacturing machines devices signals and commands; building management and operations systems data; Internet of Things data streams that includes but not limited to home electronic systems and devices; home appliances management and control signals; factory floor machinery systems performance monitoring, management; and control signals data; personal electronic devices data signals; etc.

V-Rover (Mast)

As shown in FIG. 35 which is an embodiment of this invention, the local V-ROVER (of the Protonic Switch) port clocks in each data type via a small buffer 240, that takes care of the incoming data signal and the clocking signal phase difference. Once the data signal is synchronized with the V-ROVER clocking signal, the Cell Frame System (CFS) 241 scrips off a copy of the cell frame Destination Address and sends it to Micro Address Assignment Switching Tables (MAST) system 250. The MAST then determines if the Destination Address device ROVER is within the same molecular domain (400 V-ROVERs, Nano-ROVERs, and Atto-ROVERs) as the Originating Address ROVER device.

If the Origination and Destination addresses are in the same domain, then the cell frame is switch via anyone of the two 40 GBps trunk ports 242 where the frames is transmitted either to the Protonic Switch or the neighboring ROVER. If the cell frames Destination Address is not in the same molecular domain as the Origination Address ROVER device, then the cell switch switches the frame to trunk port 1 which is connected to the Protonic Switch that controls the molecular domain.

The design to have a frame whose Destination Address ROVER device is not within the local molecular domain, be automatically sent to the Protonic Switching Layer (PSL) of the network, is to reduce the switching latency through the network. If this frame is switched to its neighboring ROVER, instead of going directly to a Protonic Switch, the frame will have to transit many ROVER devices, before it leaves the molecular domain to its final destination in another domain.

Protonic Switch Mast

As shown in FIG. 34 which is an embodiment of this invention, the Protonic Switch 16×1 TBps high speed digital ports 306, clocks in data from the ASM via buffers 340, that takes care of the incoming data signal and the clocking signal phase difference. Once the data signal is synchronized with switch clocking signal, the Cell Frame System (CFS) 341 scrips off a copy of the cell frame ROVERs Destination Addresses (48 bits) and send them to the Micro Address Assignment Switching Tables (MAST) system 350. The MAST then determines if the ROVER Destination Address is within the same molecular domain (400 V-ROVERs, Nano-ROVERS, and Atto-ROVERs) as the Originating Address ROVER device.

If the Origination and Destination addresses are in the same domain, then the cell frame is switch to its ROVER ASM timeslot 242 where the frames are transmitted to that designation ROVER. If the cell frames Destination Address is not in the same or immediate neighboring molecular domain as the Origination Address ROVER device, then the cell switch switches the frame to the Nucleus Switch to the NSL layer of the network. When the Nucleus Switch reads that cell frame, it reads the Global and Area Codes addresses and determine whether to send it to another Arca Code, Global Code, or to a Protonic Switch that controls the molecular domain that the destination ROVER address resides.

The design to have a frame whose ROVER Destination Address device is not within the local molecular domain or neighboring domain, be automatically sent to the Protonic Switching Layer (PSL) of the network, is to reduce the switching latency through the network. If this frame is switched to its neighboring ROVER, instead of going directly to a Protonic Switch, the frame will have to transit many ROVER devices, before it leaves the molecular domain to its final destination in another domain.

Protonic Switching Throughput

The Protonic Switch cell frame switching fabric which is an embodiment of this invention, uses two group eight (8)

individual busses 343 running at 2 TBps per buss. Each of the 16 switch ports operate at 1 TBps. This arrangement gives the Protonic Switch cell switch a combined switching throughput of 32 GBps. The switch can move any 560-bits cell frame in and out of the switch within an average time of 280 picoseconds. The switch can empty any of the 40 GBps ROVER digital stream of data within less than 5 milliseconds. The digital streams are clock in and out of the cell switch by 16×2 GHz highly stable Cesium Beam 800 (FIG. 84) reference source clock signals which is an embodiment of this invention.

Protonic Switch Time Division Multiple Access (Tdma)

Figure 36:
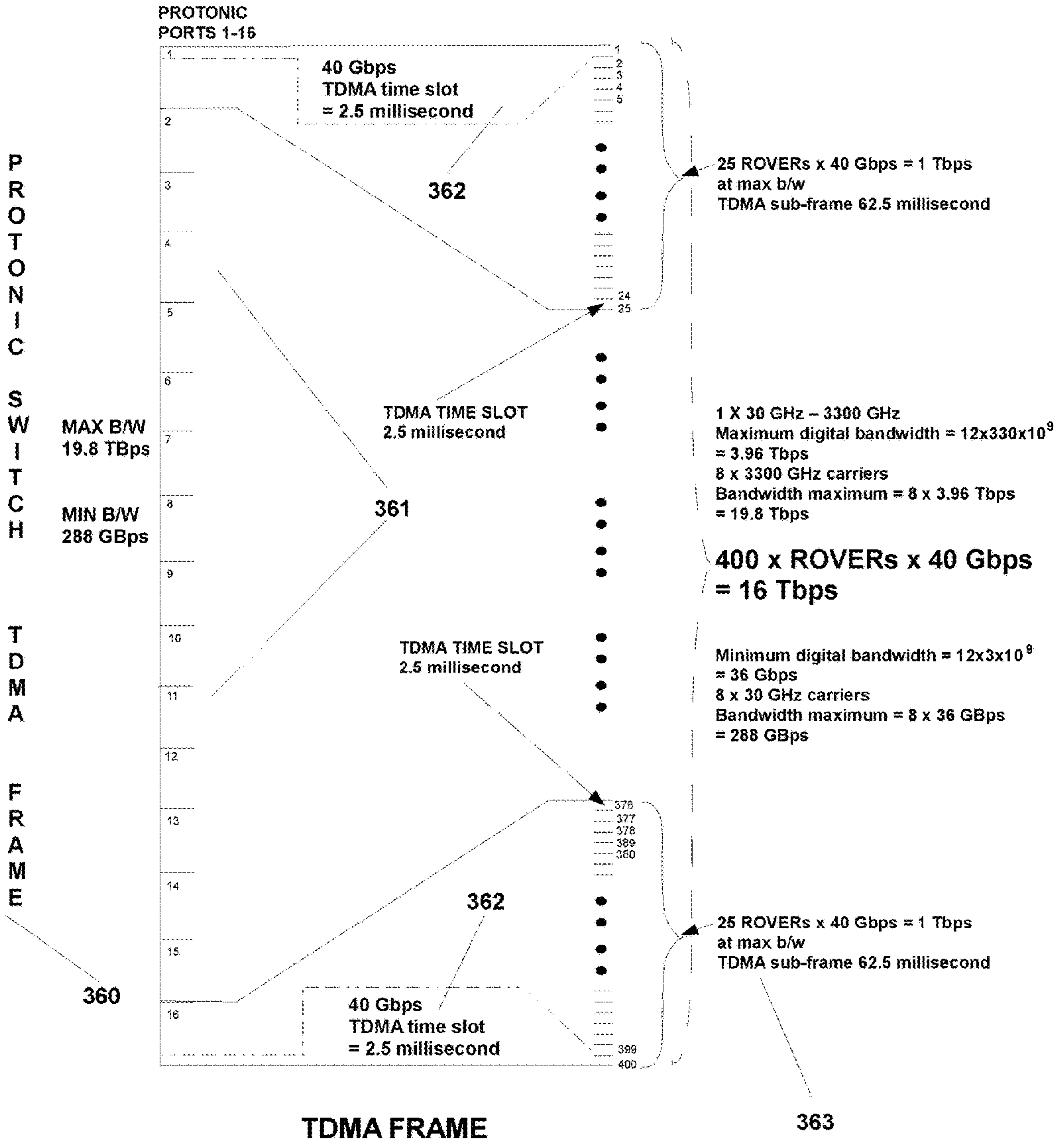
FIG. 36 illustrates the Protonic Switch Time Division Multiple Access (TDMA) and the Atto-Second Multiplexing frame format for the 16 GBps digital stream which is an embodiment of this invention.
Figure 37:
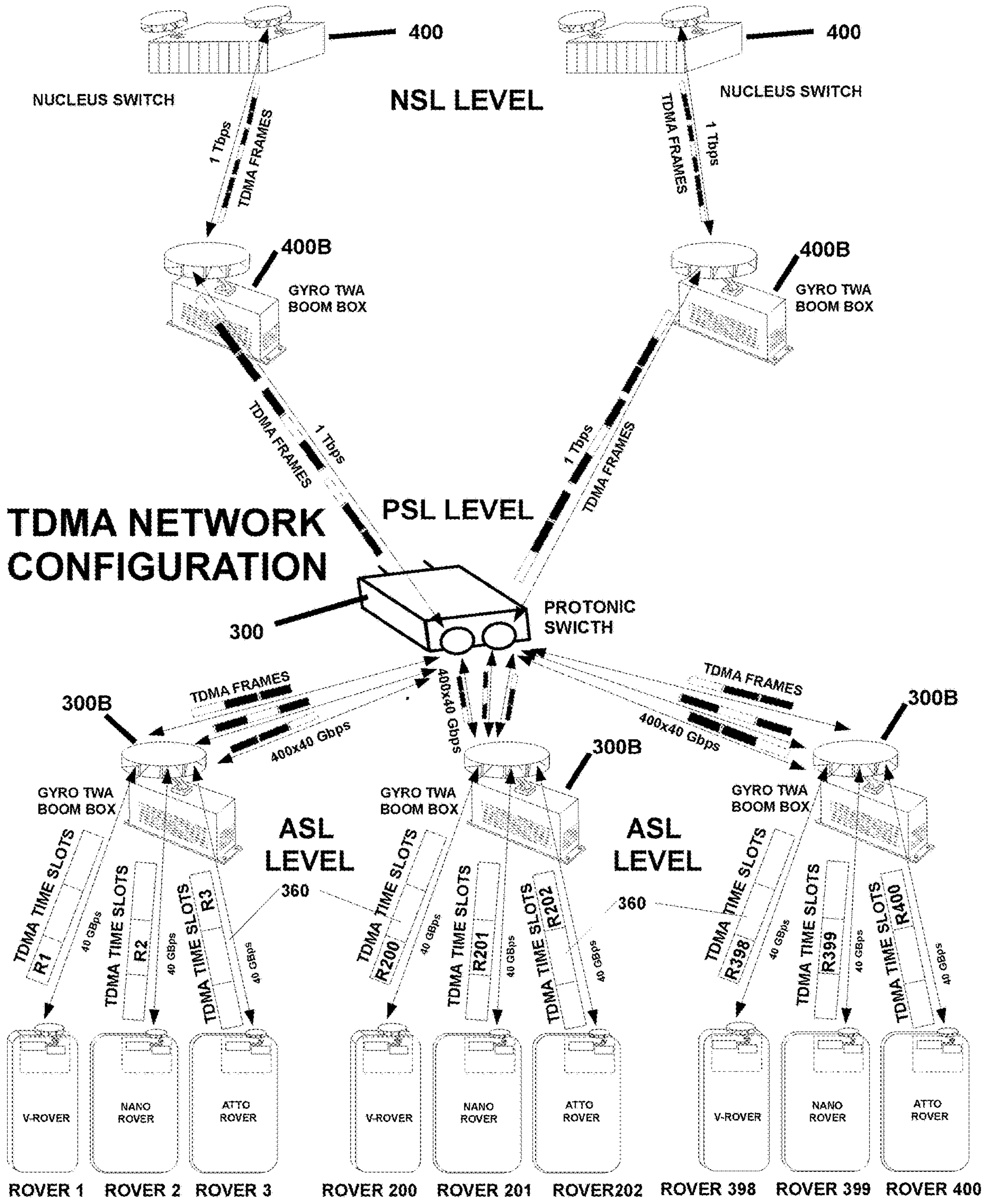
FIG. 37 is an illustration of the Attobahn TDMA connection paths from the Access Level Network V-ROVERs, Nano-ROVERs, and Atto-ROVERs to the Protonic Switching Layer Protonic Switches, and to the Nucleus Switching Layer Nucleus Switches which is an embodiment of this invention.

As shown in FIGS. 36.0 which are an embodiment of this invention, the Protonic Switch 300 uses time division multiple access (TDMA) 360 design to handle the 400×ROVER devices transmission communications 200 that are connected to it. The Switch's TDMA frame accommodates all 400×ROVERs' high speed 40 GBps digital streams per second. The TDMA frame 361 assigns a time slot of 2.5 milliseconds 362 for each of the 400 ROVERs to move their data in and out of the Switch. Each ROVER transmits its 40 GBps within its designated time of 2.5 milliseconds. The TDMA frames for the ROVERs are sub divided into 16 frames with each frame being 25×40 GBps=1 TBps. Therefore, in each TDMA sub-frame there are 25 ROVERs data signals occupying 62.5 milli-seconds (ms) time slot. The total bandwidth of the 16 TDMA frames in one second from the 16 ports is 16 TBps 306 for the 400 ROVERs as shown in FIG. 33.

As shown in FIG. 34 which is an embodiment of this invention, ports 15 and 16 of the Protonic Switch 370 are used to connect the two Nucleus Switches 400 at the NSL level of the network. Each of these two ports share 1 TBps with 25 ROVERs and 1 TBps with one of the Nucleus Switch. Therefore, each Protonic to Nucleus switch TDMA frame connection has a maximum of 1 TBps.

As illustrated in FIG. 34 which is an embodiment of this invention, the Protonic Switch clocks in the TDMA frames bursting digital streams from the QAM modems 346 into the 16 TDMA ASM systems 344, where the TDMA frames are demultiplexed into the ASM OTS and deliver to the 16×1 TBps ports 306 of the cell switch.

The cell switch sends the cell frames to the MAST 350 which reads ROVERs address headers to determine if the cell frame is designated for one of the ROVERs within its molecular domain. If cell frame is not for its domain, the Switch sends it to the Nucleus Switch layer of the network for further distribution. If the cell is for one of the ROVERs in the domain that the Protonic Switch serves, then that frame is switch to the correct ASM frame and place in the associated TDMA burst time slot for the designated ROVER.

Atto Second Multiplexing (ASM)

As illustrated in FIG. 34 which is an embodiment of this invention, the Protonic Switch high speed 16×1 TBps ports digital streams are fed into the Atto Second Multiplexer (ASM) 344 via the Encryption System 301D. The ASM frames are organized into the Orbital Time Slot (OTS) frame as displayed in FIG. 19. The 16 ASM digital frames are placed into the TDMA time slots and exit the ASM ports 345 and then send to the QAM modulators 346 for transmission across the millimeter wave radio frequency (RF) links.

The TDMA ASMs receive digital frames from the QAM demodulators and demultiplex them from the OTS back into the 16×1 TBps data streams. The cell switch trunk ports 342 monitor the incoming cell frames from the ROVERs and the two Nucleus Switches from NSL level of the network, and then sent the cell frames to the MAST for processing. The Protonic Switch MAST reads data streams 48-bit Destination Address in the cell frames, examines the addresses, and when the address for the local ROVER is identified, the MAST reads the 3-bit physical port address and instructs the switch to switch those cell frames to their designated ports.

When the MAST determines that a 48-bit Destination Address is not for its local ROVER, then it instructs the switch to switch that cell frame toward a ROVER if the address is associated with one of the ROVERs within its molecular domain. If the address is not for any ROVER within its domain, then the switch send that cell frame to one of the switch ports that serves the two Nucleus Switches that it is connected to within the NSL level of the network.

Link Encryption

The Protonic Switch ASM 16 trunks terminate into the Link Encryption System 301D. The link Encryption System is an additional layer of security beneath the Application Encryption System that sits under the AAPI as shown in FIG. 6. The Link Encryption System as shown in FIG. 34 which is an embodiment of this invention, encrypts the sixteen 40 GBps to 16 TBps data streams that come out from the ASMs. This process ensures that cyber adversaries cannot see Attobahn data as it traverses the millimeter wave spectrum. The Link Encryption System uses a private key cypher between the ROVERs, Protonic Switches, and Nucleus Switches. This encryption system at a minimum meets the AES encryption level but exceeds it in the way the encryption methodology is implemented between the Access Network Layer, Protonic Switching Layer, and Nucleus Switching Layer of the network.

Protonic Switch QAM Modem

The Protonic Switch Quadrature Amplitude Modem (QAM) 346 as shown in FIG. 34 which is an embodiment of this invention, is a four-section modulator and demodulator. Each section accepts 16 digital baseband signal of 40 GBps to 16 TBps that modulates the 30 GHz to 3300 GHz carrier signal that is generated by local Cesium Beam referenced oscillator circuit 805ABC. QAM Modem Maximum Digital Bandwidth Capacity The Protonic Switch QAM modulator uses a 64-4096-bit quadrature adaptive modulation scheme. The modulator uses an adaptive scheme that allows the transmission bit rate to vary according to the condition of the millimeter wave RF transmission link signal-to-noise ratio (S/N). The modulator monitors the receive S/N ratio and when this level meets its lowest predetermined threshold, the QAM modulator increases the bit modulation to its maximum of 4096-bit format, resulting in a 12:1 symbol rate. Therefore, for every one hertz of bandwidth, the system can transmit 12 bits. This arrangement allows the Protonic Switch to have a maximum digital bandwidth capacity of 12×24 GHz (when using a bandwidth 240 GHz carrier)=288 GBps. Taking 16×240 GHz carriers, the full capacity of the Protonic Switch at a carrier frequency of 240 GHz is 16×288 GBps-4.608 TBps.

Across the full spectrum of Attobahn millimeter wave RF signal operation of 30-3300 GHz, the range of Atto-ROVER at maximum 4096-bit QAM will be:

$$\text{30 GHz carrier, 3 GHz bandwidth: } 12\times 3\text{ GHz}\times 16\text{ Carrier Signals} = 576\,GBps\text{ (Giga Bits per second)}$$

$$\text{3300 GHz, 330 GHz bandwidth: } 12\times 330\text{ GHz}\times 16\text{ Carrier Signals} = 63.36\,TBps\text{ (Tera Bits per second). Therfore, the Protonic Switch has a maximum digital bandwidth capacity of } 63.36\,TBps.$$

QAM Modem Minimum Digital Bandwidth Capacity

The Protonic Switch modulator monitors the receive S/N ratio and when this level meets its highest predetermined threshold, the QAM modulator decreases the bit modulation to its minimum of 64-bit format, resulting in a 6:1 symbol rate. Therefore, for every one hertz of bandwidth, the system can transmit 6 bits. This arrangement allows the Protonic Switch to have a maximum digital bandwidth capacity of 6×24 GHz (when using a bandwidth 240 GHZ carrier)=1.44 GBps. Taking the sixteen 240 GHz carriers, the full capacity of the Protonic Switch at a carrier frequency of 240 GHz is 16×1.44 GBps=23.04 GBps.

Across the full spectrum of Attobahn millimeter wave RF signal operation of 30-3300 GHz, the range of V-ROVER at minimum 64-bit QAM will be:

$$\text{30 GHz carrier, 3 GHZ bandwidth: } 6\times 3\text{ GHz}\times 16\text{ Carrier Signals} = 288\ \textit{GBps}\text{ (Giga Bits per second)}$$

$$\text{3300 GHZ, 330 GHz bandwidth: } 6\times 330\text{ GHz}\times 16\text{ Carrier Signals} = 31.68\ \textit{TBps}\text{ (Tera Bits per second)}$$

Therefore, the Protonic Switch has a minimum digital bandwidth capacity of 288 GBps. Hence, the digital bandwidth range of the Protonic Switch across the millimeter and ultra-high frequency range of 30 GHz to 3300 GHz is 288 GBps to 63.36 TBps.

The Protonic Switch QAM Modem automatically adjusts its constellation points of the modulator between 64-bit to 4096-bit. When the S/N decreases the bit error rate of the received digital bits increases if the constellation points remain the same. Therefore, the modulator is designed to harmoniously reduce its constellation points and symbol rate with the S/N ratio level, thus maintaining the bit error rate for quality service delivery over wider bandwidth. This dynamic performance design allows the data service of Attobahn to gracefully operate at a high quality without the end user realizing a degradation of service performance.

Modem Data Performance Management

The Protonic Switch modulator Data Management Splitter (DMS) 348 circuitry which is an embodiment of this invention, monitors the modulator links' performances and correlates each of the sixteen (16) RF links S/N ratio with the symbol rate it applies to the modulation scheme. The modulator simultaneously takes into consideration the degradation of a link and the subsequent symbol rate reduction, and immediately throttle back data that is designated for the degraded link, and divert its data traffic to a better performing modulator.

Hence, if modulator No. 1 detects a degradation of its RF link, then the modem system with take traffic from that degraded modulator and direct it to modulator No. 2 for transmission across the network. This design arrangement allows Protonic Switch system to management its data traffic very efficiently and maintain system performance even during transmission link degradation. The DMS carries out these data management functions before it splits the data signal into two streams to the in-phase (I) and 90-degree out of phase, quadrature (Q) circuitry 351 for the QAM modulation process.

Demodulator

The Protonic Switch QAM demodulator 352 functions in the reverse of its modulator. It accepts the 16 RF I-Q signals from the RF Low Noise Amplifier (LNA) 354 and feeds it to the 16 I-Q circuitries 355 where the original digital streams are combined after demodulation. The demodulator tracks the incoming I-Q signals symbol rate and automatically adjust itself to the incoming rate and harmoniously demodulate the signal at the correct digital rate. Therefore, if the RF transmission link degrades and the modulator decreased the symbol rate from its maximum 4096-bit rate to 64-bit rate, the demodulator automatically tracks the lower symbol rate and demodulates the digital bits at the lower rate. This arrangement makes sure that the quality of the end-to-end data connection is maintained, by temporarily lowering the digital bit rate until the link performance increases.

Protonic Switch RF Circuitry

The Protonic Switch millimeter wave (mmW) radio frequency (RF) circuitry 347A is design to operate in the 30 GHz to 3300 GHz range and deliver broadband digital data with a bit error rate (BER) of 1 part in 1 billion to 1 trillion under various climatic conditions.

Protonic Switch mmW RF Transmitter

The Protonic Switch mmW RF Transmitter (TX) stage 347 consists of a high frequency upconverter mixer 351A that allows the local oscillator frequency (LO) which has a frequency range from 30 GHz to 3300 GHz to mix the 3 GHz to 330 GHz bandwidth baseband I-Q modem signals with the RF 30 GHz to 3330 GHz carrier signal. The mixer RF modulated carrier signal is fed to the super high frequency (30-3300 GHz) transmitter amplifier 353. The mmW RF TX has a power gain of 1.5 dB to 20 dB. The TX amplifier output signal is fed to the rectangular mmW waveguide 356. The waveguide is connected to the mmW 360-degree circular antenna 357 which is an embodiment of this invention.

Protonic Switch mmW RF Receiver

FIG. 34 which is an embodiment of this invention, shows the Protonic Switch mmW Receiver (RX) stage that consists of the mmW 360-degree antenna 357 connected to the receiving rectangular mmW waveguide 356. The incoming mmW RF signal is received by the 360-degree antenna, where the received mmW 30 GHz to 3300 GHz signal is sent via the rectangular-waveguide to the Low Noise Amplifier (LNA) 354 which has up to a 30-dB gain.

After the signal leaves, the LNA, it passes through the receiver bandpass filter 354A and fed to the high frequency mixer. The high frequency down converter mixer 352A allows the local oscillator frequency (LO) which has a frequency range from 30 GHz to 3300 GHz to demodulate the I and Q phase amplitude 30 GHz to 3300 GHz carrier signals back to the baseband bandwidth of 3 GHZ to 330 GHz. The bandwidth baseband I-Q signals 355 are fed to the 64-4096 QAM demodulator 352 where the separated 16 I-Q digital data signals are combined back into the original single 40 GBps data stream. The QAM demodulator 352 sixteen (16) 40 GBps to 16 TBps data streams are fed to the decryption circuitry and to the cell switch via the TDMA ASM. Protonic Switch Clocking & Synchronization Circuitry FIG. 34 show the Protonic Switch internal oscillator 805ABC which is controlled by a Phase Lock Loop (PLL) circuit 805A that receives it reference control voltage from the recovered clock signal 805. The recovered clock signal is derived from the received mmW RF signal from two LNA outputs that came from the two Nucleus Switches that are connected to the Protonic Switch. These two LNA outputs are used as a primary and backup clocking signals for the oscillator. The received mmW RF signal is sample and converted into digital pulses by the RF-to-digital converter 805E as illustrated in FIG. 34 which is an embodiment of this invention.

The mmW RF signal that is received by the Protonic Switch that came from the two Nucleus Switches which serves the Protonic Switch molecular domain. Since each Nucleus Switch RF and digital signals are reference to the uplink National Backbone and Global Nucleus Switches which are connected to Attobahn clock standard Atomic Cesium Beam master oscillator, as illustrated in FIG. 107 which is an embodiment of this invention. The Protonic Switch is in effect referenced to the Atomic Cesium Beam high stability oscillatory system. Since the Atomic Cesium Beam oscillatory system is referenced to the Global Position Satellite (GPS), it means that all of Attobahn systems globally are referenced to the GPS.

This Attobahn clocking and synchronization design makes all of the digital clocking oscillator in every Nucleus Switch, Protonic Switch, V-ROVER, Nano-ROVER, Atto-ROVER and Attobahn ancillary communications systems such as fiber optics terminals and Gateway Routers referenced to the GPS worldwide.

The referenced GPS clocking signal derived from the Protonic Switch mmW RF signal varies the PLL output voltage in harmony with the received GPS reference signal phases between 0-360 degrees of its sinusoid at the GNCCs (Global Network Control Center) Atomic Cesium Oscillators. The PLL output voltage controls the output frequency of the Protonic Switch local oscillator which in effect is synchronized to the Atomic Cesium Clock at the GNCCs, that is referenced to the GPS.

The Protonic Switch local V-ROVER clocking system is equipped with frequency multiplier and divider circuitry to supply the varying clock frequencies to following sections of the system:

1. *RF* mixer/*Upconverter*/Down Converter $1 \times 30 - 3300$ GHz
2. *QAM* Modem $1 \times 30 - 3300$ GHz signal
3. Cell Switch $2 \times 2$ *THz* signals
4. *ASM* $2 \times 40$ GHz signals
5. End User Ports $8 \times 10$ GHz $- 20$ GHz signal
6. CPU & Cloud Storage $1 \times 2$ GHz signal
7. WiFi & *WiGi* Systems $1 \times 5$ GHz and $1 \times 60$ GHz signals The Protonic Switch clocking system design ensures that Attobahn data information is completely synchronized with the Atomic Cesium Clock source and the GPS, so that all applications across the network is digitally synchronized to the network infrastructure which radically minimizes bit errors and significantly improved service performance.

Multi-Processor & Services

The Protonic Switch is equipped with dual quad-core 4 GHZ, 8 GB ROM, 500 GB storage CPU that manages the Cloud Storage service, network management data, and various administrative functions such as system configuration, alarms message display, and user services display in device.

The CPU monitors the system performance information and communicates the information to the Protonic Switch Network Management System (RNMS) via the logical port 1 (FIG. 6) Attobahn Network Management Port (ANMP) EXT.001 of its local V-ROVER. The end user has a touch screen interface to interact with the local V-ROVER to set passwords, access services, purchase shows, communicate with customer service, etc.

Figure 38:
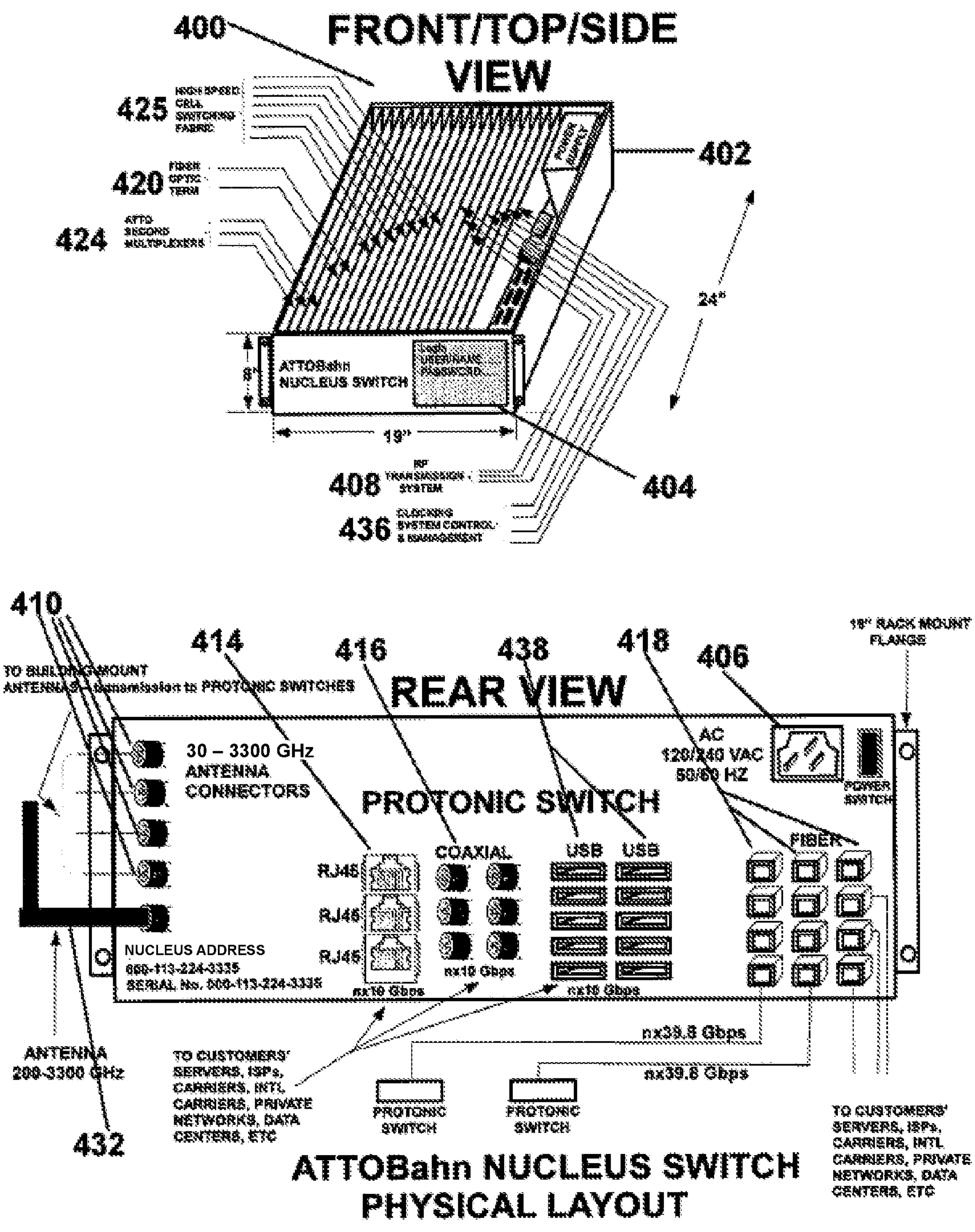
FIG. 38 is a block diagram that illustrates the Nucleus Switch communications device housing front view with its digital display used for local system configuration and management; the parallel circuit card (blades that contain the cell switching fabric, ASMs, Clocking System control, management, and operational status Fiber Optic Terminals, and RF transmitters and LNA receiver's circuitries; and the power supply circuitry which is an embodiment of this invention.

The local V-ROVER CPU runs the following end user Personal Services APPs and administrative functions:

1. Personal InfoMail
2. Personal Social Media
3. Personal Infotainment
4. Personal Cloud
5. Phone Services
6. New Movie Releases Services Download Storage/Deletion Management
7. Broadcast Music Services
8. Broadcast TV Services
9. Online WORD, SPREAD SHEET, DRAW, & DATABASE
10. Habitual APP Services
11. GROUP Pay Per View Services
12. Concert Pay Per View
12. Online Virtual Reality
13. Online Video Games Services
14. Attobahn Advertisement Display Services Management (banners and video fade in/out)
15. Atto View Dashboard Management
16. Partner Services Management
17. Pay Per View Management
18. VIDEO Download Storage/Deletion Management
19. General APPs (Google, Facebook, Twitter, Amazon, What's Up, etc.)
20. Camera Each one of these services, Cloud service access, and storage management for the local ROVER is controlled by the Cloud APP in the Protonic Switch CPU. Nucleus Switch As an embodiment of the invention FIG. 38(A,B) displays the Nucleus Switch unit 400. The unit is house in a metal casing 402 on the sides, bottom and top with a hard-plastic front panel that has a LCD display 404 for system configuration and onsite management. The unit is 24 inches long, 19 inches wide, and 8 inches high. The unit has a card cage that holds the TDMA Atto Second Multiplexers (ASM) 424, the fiber optic terminals 420, the high-speed cell switching fabric 425, RF transmission system 408 and the clocking and system control & management 436. The unit is designed to be rack/cabinet/shelf mounted using a screw flange or optionally the unit is designed to stand alone, wall mounted, or rest on a table or shelf.

The rear of the Nucleus Switch is configured with but not limited to RJ45 ports 414 that runs at digital speeds of nx 10 GBps; coaxial ports 416 at digital speeds of nx 10 GBps; USB ports 438 at digital speeds of nx 10 GBps; fiber optics ports 418 at speeds of 10 GBps to 768 GBps; etc. The unit has five antenna port 410 for the high frequency 200 to 3300 GHz RF signals. The unit use a standard 120 VAC electrical connector 406.

Figure 39:
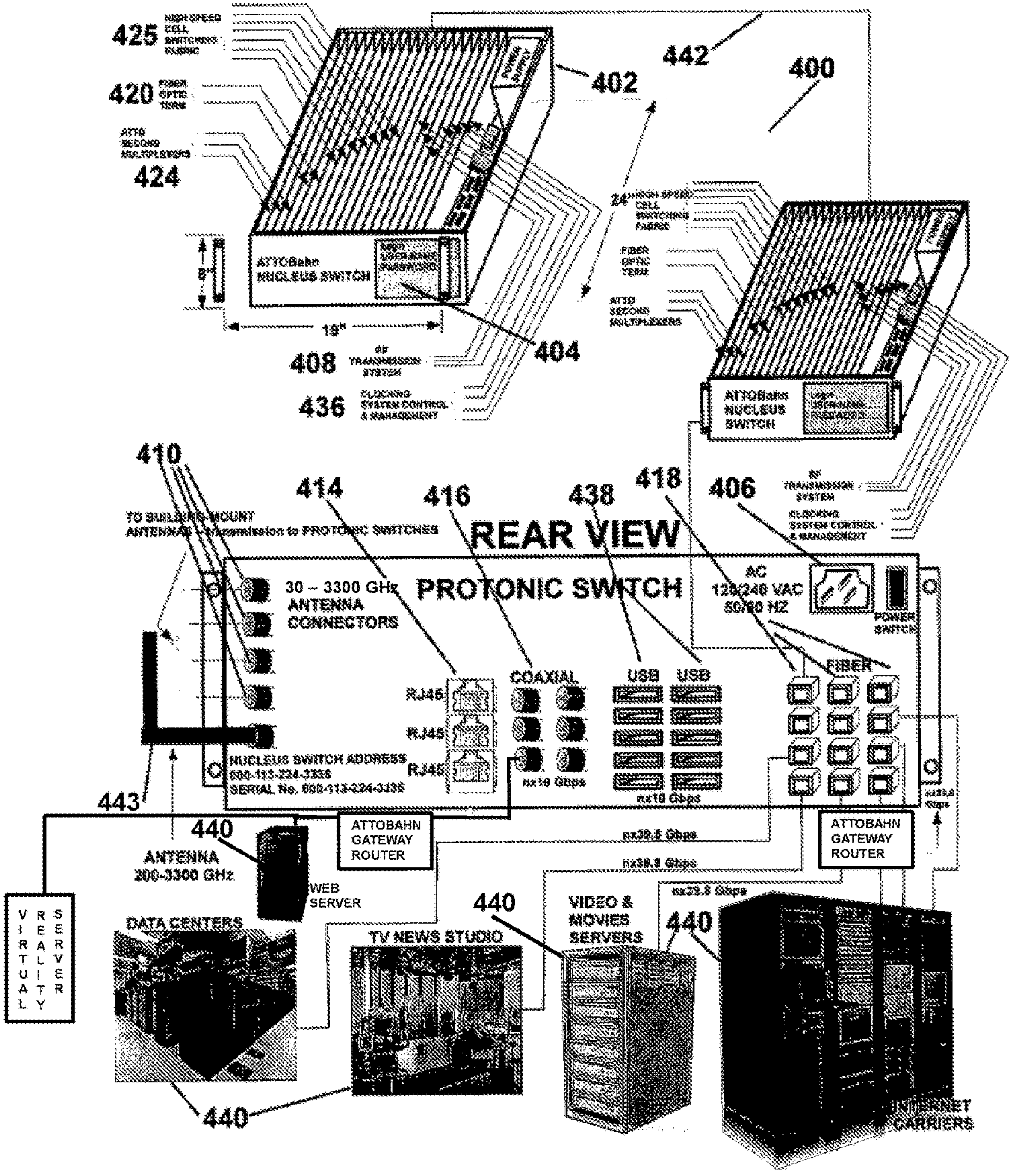
FIG. 39 shows the Nucleus Switch communication device housing displaying the physical connectivity to typical corporate end users' server farms, cloud operations, ISPs, carrier, cable providers, Over The Top (OTT) Video operators, social media services, search engines, TV News Broadcasting stations, Radio Broadcasting stations, corporations data centers and private networks which is an embodiment of this invention.

As an embodiment of the invention FIG. 39 shows the Nucleus Switch unit 400 physical connectivity to end user's systems 440. The Nucleus Switch is designed to connect directly but not limited to fiber optic ports running at 39.8 to 768 GBps to connect to other viral molecular network intra city, intercity, and international Nucleus hub locations; high capacity corporate customers systems; Internet Service Providers; Inter-Exchange Carriers, Local Exchange Carriers; cloud computing systems; TV studio broadcast customers; 3D TV sporting event stadiums; movies streaming companies; real time movie distribution to cinemas; large content providers, etc.

The Nucleus Switch device housing embodiment includes the function of placing the 70-byte cell frames into the application specific integrated circuit (ASIC) called the IWIC which stands for Instinctively Wise Integrated Circuit. The IWIC is the cell switching fabric of the Viral Orbital Vehicle, Protonic Switch, and Nucleus Switch. This chip operates in the terahertz frequency rates and it takes the cell frames that encapsulates the customers digital stream information and place them onto the high-speed switching buss. The Nucleus Switch has from 96 to 960 parallel high-speed switching busses depending on the amount of Nucleus Switches that are implemented at the Nucleus hub location.

The Nucleus Switches are designed to be stacked together by inter connecting to a maximum of 10 of them via their fiber optics ports to form a contiguous matrix of Nucleus Switches providing a maximum 960 parallel busses×2 terabits per second (TBps) per buss. Each bus runs at 2 TBps and the 960 stacked parallel busses move the customer digital stream encapsulated in the cell frames at combined digital speed of 1.92 Exabits per second (EBps). The 10 stacked cell switch provides a 1.92 EBps switching throughput between its connected Protonic Switches; other viral molecular network intra city, intercity, and international Nucleus hub location; high capacity corporate customers systems; Internet Service Providers; Inter-Exchange Carriers, Local Exchange Carriers; cloud computing systems; TV studio broadcast customers; 3D TV sporting event stadiums; movies streaming companies; real time movie distribution to cinemas; large content providers, etc.

The Nucleus Switch housing has a TDMA Atto Second Multiplexing (ASM) circuitry that uses the IWIC chip to place the switched cell frames into orbital time slots (OTS) across 96 digital streams running at 40 Gigabits per second (GBps) to 1 TBps each, providing an aggregate data rate of 640 GBps to 96 TBps.

As illustrated in FIG. 20 which is an embodiment of this invention, the ASM takes cell frames from the high-speed busses of the cell switch and places them into orbital time slots of 0.25 micro second period, accommodating 10,000 bits per time slot (OTS). Ten of these orbital time slots makes one of the Atto Second Multiplexing (ASM) frames, therefore each ASM frame has 100,000 bits every 2.5 micro second. There are 400,000 ASM frames every second in each 40 GBps digital stream. The ASM moves 640 GBps to 160 TBps via 160 digital streams to the intermediate frequency (IF) modem of the radio frequency section of the Nucleus Switch.

Nucleus Switch System Schematics

Figure 40:
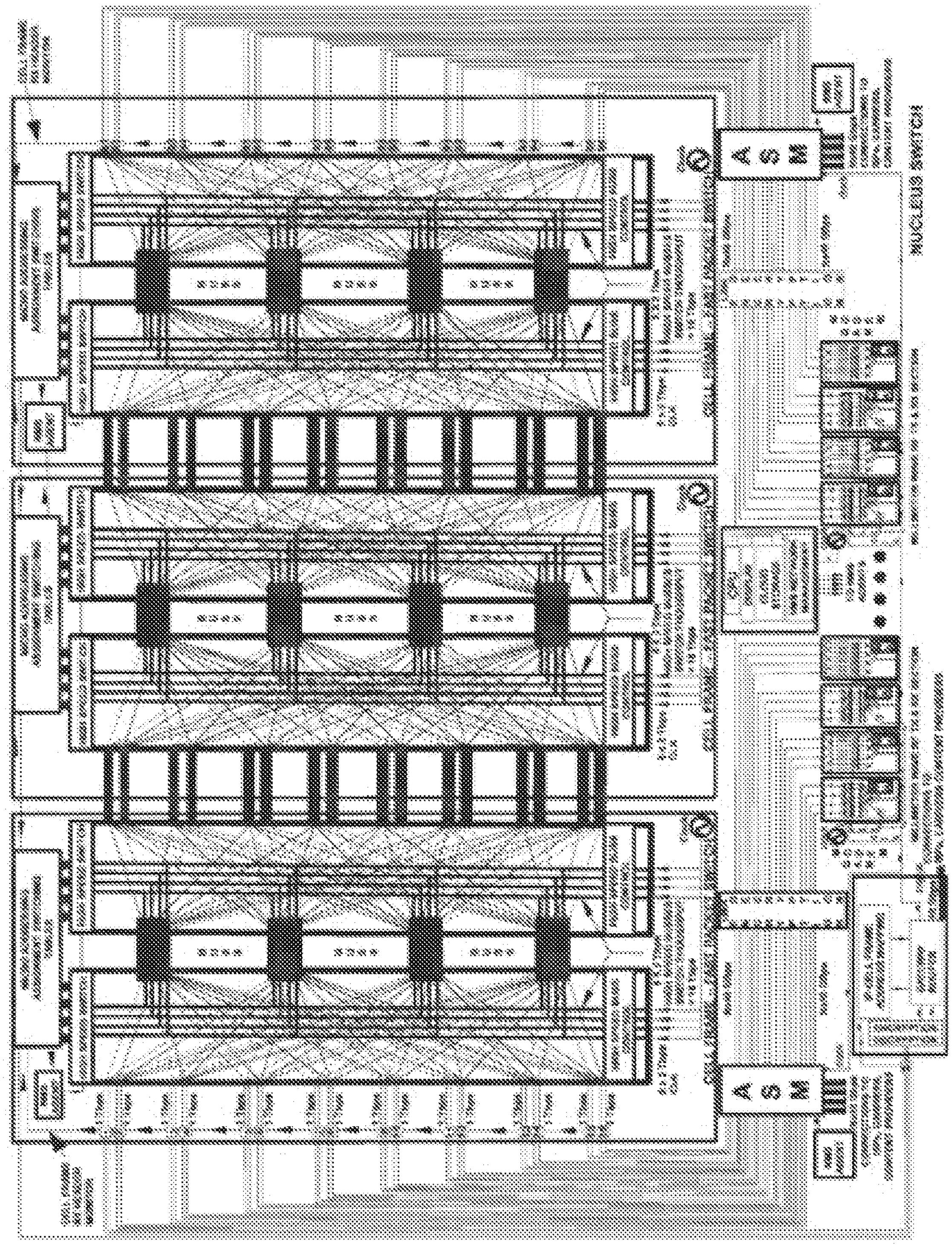
FIG. 40 illustrates the Nucleus Switch technical schematic layout of its cell frame switching fabric, ASM, QAM modems, RF amplifier and receiver, management system, and CPU which is an embodiment of this invention.

FIG. 40 is an illustration of the Protonic Switch design circuitry schematics which is an embodiment of this invention, and gives a detailed layout of the internal components of the switch. The ninety-six (96) high speed 40 GBps to 1 TBps data ports 406 are equipped with input clocking speed of 40 GBps to 1 TBps that is synchronized to derived/recovered clock signal 805ABC from the network Cesium Beam oscillator with a stability of one part in 10 trillion. Each port interface provides a highly stable clocking signal 805C to time in and out the data signals from the network.

Nucleus Switch Mast

As shown in FIG. 40 which is an embodiment of this invention, the Nucleus Switch 96×1 TBps high speed digital ports 406, clocks in data from the ASM via buffers 440, that takes care of the incoming data signal and the clocking signal phase difference. Once the data signal is synchronized with switch clocking signal, the Cell Frame System (CFS) 441 scrips off a copy of the cell frame Global Code (2 bits) and City Code Addresses (6 bits) and send them to the Micro Address Assignment Switching Tables (MAST) system 450. The MAST determines if the Destination Address is within the same Global Region (NA, EMEA, ASPAC, and CCSA) or City Code-national areas (V-ROVERs, Nano-ROVERs, Atto-ROVERs, Nucleus Switch connected servers, server farms, main-frame computers, corporate networks, ISPs, Common Carriers, Cable Companies, OTT Providers, Content Providers, etc.) that it serves.

If the Global and City Code addresses are in the same global and national region, then the cell frame is switch to Nucleus Cell Switch port associated with the TDMA ASM timeslot 442, where the cell frame is transmitted to its designation device. If the cell frames Global or City Code is not in the same, then the cell switch switches the frame to the Nucleus Switch that directs that frame to the NSL layer of the network that serves that regional or national area.

Global Gateway Nucleus Switch Mast

As depicted in FIG. 14 which is an embodiment of this invention, the Global Gateway Nucleus Switches 400G are designed to move cell frames through their switch fabric as fast as possible. In addition to the ultra-high speed switching busses and combined throughput of 92 TBps, the switches' MASTs are designed to only read the Global Codes two (2) bits 102A of each cell frame and ignore the other 558 bits. The switch quickly determines which Global Code it is:

TABLE-US-00003 Bits 00 North America Bits 01 EMEA Bits 10 ASPAC Bits 11 CCSA After reading the two bits the Global Gateway Nucleus Switch sends the cell frame to the output port that connects to the designated Global Gateway Nucleus Switch. The frame is placed into the TDMA time slot in the ASM that associated with the distant global gateway switch.

The cell frame addressing schema design of only reading the two bits of the Global Codes allows the Global Gateway Nucleus Switch to radically reduce the switching latency through these switches. The latency through the switch in the order of 10 nano seconds to 1 micros second.

National Nucleus Switch Mast

The National Nucleus Switches 400 as shown in FIGS. 14.0 and 40.0 is an embodiment of this invention. These switches are equipped with MASTs 450 (FIG. 40) that only focus on reading the first two bits of the frame which is the Global Code of each cell frame. Once the MAST determines that the Global Code is not its local region, then it immediately, sent the frame to the Global Gateway Nucleus Switch 400G (FIG. 14) in the International switching layer of the network.

As soon as the MAST reads that the Global Code is not for its local region, then it reads the next six bits (bit number 3 to number 8) 103A (FIG. 14) to determine which local Area Code it is designate for, and switch the frame to the port associated with that Area Code. If the Area Code six bits (bit 3 to bit 8) is associated with National Nucleus Switch, that switch MAST reads the next 48 bits (bit 9 to bit 56 as shown in FIG. 14) which are the Designated ROVER or Business Nucleus Switch (servers, server farms, main-frame computers, corporate networks, ISPs, Common Carriers, Cable Companies, OTT Providers, Content Providers, etc.) address. The switch then sent that cell frame to the Protonic Switch domain where the ROVER device with the designated address is located or to the Business Nucleus Switch.

Nucleus Switching Throughput

The Nucleus Switch cell frame switching fabric which is an embodiment of this invention, uses six (6) groups of eight (8) individual busses 443 running at 2 TBps per buss. Each of the 96 switch ports operate at 1 TBps. This arrangement gives the Nucleus Switch cell switch a combined switching throughput of 96 GBps. The switch can move any 560-bits cell frame in and out of the switch within an average time of 280 picoseconds. The switch can empty any of the 40 GBps ROVER digital stream of data within less than 5 milliseconds. The digital streams are clock in and out of the cell switch by 48×2 GHz highly stable Cesium Beam 800 (FIG. 107) reference source clock signals which is an embodiment of this invention.

Nucleus Switch Time Division Multiple Access (TDMA)

As shown in FIGS. 40.0 which are an embodiment of this invention, the Nucleus Switch 400 has 96 TBps that can handle 2,400×40 GBps ROVERs across 6-time division multiple access TDMA frames 460, running at 16 TBps per frame. The Switch's TDMA frame accommodates all 2,400× ROVERs' high speed 40 GBps digital streams per second. The TDMA frame 461 assigns a time slot of 2.5 milliseconds (ms) for each of the 2,400 ROVERs to move their data in and out of the Switch. Each ROVER transmits its 40 GBps within its designated time of 2.5 ms per frame 362 (FIG. 36). The Nucleus Switch TDMA frames are sub divided into 16 frames with each frame being 25×40 GBps=1 TBps. Therefore, in each TDMA frame there are 16 sub-frames of 25 ROVERs data signals with each occupying a 62.5 milliseconds (ms) time slot 363 (FIG. 36). Each Nucleus TDMA time slot is 2.5 ms, where 40 GBps stream is transported between the Nucleus Switches and Protonic Switches. The total bandwidth of the Nucleus Switch TDMA frames in one second from the 96 ports is 96 TBps 462 (FIG. 40) for the 2,400 ROVERs.

As illustrated in FIG. 40 which is an embodiment of this invention, the Nucleus Switch clocks in the TDMA frames bursting digital streams from the QAM modems 446 into the 96 TDMA ASM systems 444, where the TDMA frames are demultiplexed into the ASM OTS and deliver to the 96×1 TBps ports 462 of the cell switch. The cell switch sends the cell frames to the MAST 450 which reads the Global and Area Codes address headers to determine if the cell frame is designated for one of the four Global regions (NA, EMEA, ASPAC & CCSA) or within its Area Code. The switch sends the cell frame to its Global region or its local Area Code via the correct ASM frame and place in the associated TDMA burst time slot for the designated Global Gateway Nucleus Switch or Protonic Switch respectively.

Atto Second Multiplexing (ASM)

As illustrated in FIG. 40 which is an embodiment of this invention, the Nucleus Switch high speed 96×1 TBps ports digital streams are fed into the Atto Second Multiplexer (ASM) 444 via the Encryption System 401C. The ASM frames are organized into the Orbital Time Slot (OTS) frame as displayed in FIG. 19. The 96 ASM digital frames are placed into the TDMA time slots, exit the ASM ports 445, and then send to the QAM modulators 446 for transmission across the millimeter wave radio frequency (RF) links.

The TDMA ASMs receive digital frames from the QAM demodulators and demultiplex them from the OTS back into the 96×1 TBps data streams. The cell switch trunk ports 442 monitor the incoming cell frames from the TDMA ASM time slots sent the them to the MAST 450 for processing. The Protonic Switch MAST reads data streams 48-bit Destination Address in the cell frames, examines the addresses instructs the switch to switch those cell frames to their designated ports.

Link Encryption

The Nucleus Switch ASM 96 trunks terminate into the Link Encryption System 401D. The link Encryption System in the Nucleus Switch is an additional layer of security beneath the Application Encryption System that sits under the AAPI as shown in FIG. 6. The Link Encryption System as shown in FIG. 40 which is an embodiment of this invention, encrypts the ninety-six (96) 40 GBps data streams that come out of the ASMs.

The Nucleus Switches Link Encryption System uses a private key cypher between themselves and the Protonic Switches to ensures that cyber adversaries cannot see Attobahn data as it traverses the millimeter wave spectrum across the network. The end-to-end link encryption system meets the AES encryption level and exceeds it in the way the encryption methodology is implemented between the Access Network Layer, Protonic Switching Layer, and Nucleus Switching Layer of the network.

Nucleus Switch QAM Modem

The Nucleus Switch Quadrature Amplitude Modem (QAM) 446 as shown in FIG. 40 which is an embodiment of this invention, is a sixteen-section modulator and demodulator. Each section accepts 16 digital baseband signal of 40 GBps to 96 TBps that modulates the 30 GHz to 3300 GHz carrier signal that is generated by local Cesium Beam referenced oscillator circuit 805ABC. Nucleus Switch QAM Modem Maximum Digital Bandwidth Capacity The Nucleus Switch QAM modulator uses a 64-4096-bit quadrature adaptive modulation scheme. The modulator uses an adaptive scheme that allows the transmission bit rate to vary according to the condition of the millimeter wave RF transmission link signal-to-noise ratio (S/N). The Nucleus Switch modulator monitors the receive S/N ratio and when this level meets its lowest predetermined threshold, the QAM modulator increases the bit modulation to its maximum of 4096-bit format, resulting in a 12:1 symbol rate. Therefore, for every one hertz of bandwidth, the system can transmit 12 bits. This arrangement allows the Nucleus Switch to have a maximum digital bandwidth capacity of 12×24 GHZ (when using a bandwidth 240 GHZ carrier) =288 GBps. Taking 96×240 GHz carriers, the full capacity of the Nucleus Switch at a carrier frequency of 240 GHz is 96×288 GBps-27.648 TBps.

The Nucleus Switch millimeter wave RF signal operation of 30-3300 GHz, the maximum bandwidth at 4096-bit QAM will be:

$$30\text{ GHz, }3\text{ GHz bandwidth: }12\times 3\text{ GHz}\times 96\text{ Carrier Signals} = 3.456\ TBps\text{ (Tera Bits per second)}$$

3300 GHz, 330 GHz bandwidth: 12×330 GHz×96 Carrier Signals=380.16 TBps (Tera Bits per second). Therefore, the Nucleus Switch has a maximum digital bandwidth capacity of 380.16 TBps. Nucleus Switch QAM Modem Minimum Digital Bandwidth Capacity The Nucleus Switch modulator monitors the receive S/N ratio and when this level meets its highest predetermined threshold, the QAM modulator decreases the bit modulation to its minimum of 64-bit format, resulting in a 6:1 symbol rate. Therefore, for every one hertz of bandwidth, the system can transmit 6 bits. This arrangement allows the Nucleus Switch to have a maximum digital bandwidth capacity of 6×24 GHz (when using a bandwidth 240 GHZ carrier)=1.44 GBps. Taking the sixteen 240 GHz carriers, the full capacity of the Nucleus Switch at a carrier frequency of 240 GHz is 96×1.44 GBps=138.24 GBps.

Across the full spectrum of Nucleus Switch millimeter wave RF signal operation of 30-3300 GHz, the range of the Switch at minimum 64-bit QAM will be:

$$30\text{ GHz carrier, 3 GHz bandwidth: }6\times 3\text{ GHz}\times 96\text{ Carrier Signals} = 1.728\ TBps\text{ (Giga Bits per second)}$$

$$3300\text{ GHz, 330 GHz bandwidth: }6\times 330\text{ GHz}\times 96\text{ Carrier Signals} = 190.08\ TBps\text{ (Tera Bits per second)}$$

Therefore, the Nucleus Switch has a minimum digital bandwidth capacity of 1.728 TBps. Hence, the digital bandwidth range of the Nucleus Switch across the millimeter and ultra-high frequency range of 30 GHz to 3300 GHz is 1.728 TBps GBps to 380.16 TBps.

The Nucleus Switch QAM Modem automatically adjusts its constellation points of the modulator between 64-bit to 4096-bit. When the S/N decreases the bit error rate of the received digital bits increases if the constellation points remain the same. Therefore, the Nucleus Switch modulator is designed to harmoniously reduce its constellation points and symbol rate with the S/N ratio level, thus maintaining the bit error rate for quality service delivery over wider bandwidth. This dynamic performance design allows the data service of Attobahn to gracefully operate at a high quality without the end user realizing a degradation of service performance.

Nucleus Switch Modem Data Performance Management

The Nucleus Switch modulator Data Management Splitter (DMS) 448 circuitry which is an embodiment of this invention, monitors the modulator links' performances and correlates each of the ninety-six (96) RF links S/N ratio with the symbol rate it applies to the modulation scheme. The modulator simultaneously takes into consideration the degradation of a link and the subsequent symbol rate reduction, and immediately throttle back data that is designated for the degraded link, and divert its data traffic to a better performing modulator.

Hence, if modulator No. 1 detects a degradation of its RF link, then the modem system with take traffic from that degraded modulator and direct it to modulator No. 2 for transmission across the network. This design arrangement allows Nucleus Switch system to management its data traffic very efficiently and maintain system performance even during transmission link degradation. The DMS carries out these data management functions before it splits the data signal into two streams to the in-phase (I) and 90-degree out of phase, quadrature (Q) circuitry 451 for the QAM modulation process.

Nucleus Switch Demodulator

The Nucleus Switch QAM demodulator 452 functions in the reverse of its modulator. It accepts the 96 RF I-Q signals from the RF Low Noise Amplifier (LNA) 454 and feeds it to the 96 I-Q circuitries 455 where the original digital streams are combined after demodulation. The demodulator tracks the incoming I-Q signals symbol rate and automatically adjust itself to the incoming rate and harmoniously demodulate the signal at the correct digital rate. Therefore, if the RF transmission link degrades and the modulator decreased the symbol rate from its maximum 4096-bit rate to 64-bit rate, the demodulator automatically tracks the lower symbol rate and demodulates the digital bits at the lower rate. This arrangement makes sure that the quality of the end-to-end data connection is maintained, by temporarily lowering the digital bit rate until the link performance increases.

Nucleus Switch RF Circuitry

FIG. 40 which is an embodiment of this invention, shows the Nucleus Switch millimeter wave (mmW) radio frequency (RF) circuitry 447A that is design to operate in the 30 GHz to 3300 GHz range and deliver broadband digital data with a bit error rate (BER) of 1 part in 1 billion to 1 trillion under various climatic conditions.

Nucleus Switch mmW RF Transmitter

FIG. 40 which is an embodiment of this invention, shows the Nucleus Switch mmW RF Transmitter (TX) stage 447 that consists of a high frequency upconverter mixer 451A that allows the local oscillator frequency (LO) which has a frequency range from 30 GHz to 3300 GHz to mix the 3 GHz to 330 GHz bandwidth baseband I-Q modem signals with the RF 30 GHz to 3330 GHz carrier signal. The mixer RF modulated carrier signal is fed to the super high frequency (30-3300 GHz) transmitter amplifier 453. The mmW RF TX has a power gain of 1.5 dB to 20 dB. The TX amplifier output signal is fed to the rectangular mmW waveguide 456. The waveguide is connected to the mmW 360-degree circular antenna 457 which is an embodiment of this invention.

Nucleus Switch mmW RF Receiver

FIG. 40 which is an embodiment of this invention, shows the Nucleus Switch mmW Receiver (RX) stage 447A that consists of the mmW 360-degree antenna 457 connected to the receiving rectangular mmW waveguide 456. The incoming mmW RF signal is received by the 360-degree antenna, where the received mmW 30 GHz to 3300 GHz signal is sent via the rectangular waveguide to the Low Noise Amplifier (LNA) 454 which has up to a 30-dB gain.

After the signal leaves, the LNA, it passes through the receiver bandpass filter 454A and fed to the high frequency mixer. The high frequency down converter mixer 452A allows the local oscillator frequency (LO) which has a frequency range from 30 GHz to 3300 GHz to demodulate the I and Q phase amplitude 30 GHz to 3300 GHz carrier signals back to the baseband bandwidth of 3 GHz to 330 GHz. The bandwidth baseband Q signals 455 are fed to the 64-4096 QAM demodulator 452 where the separated 96 I-Q digital data signals are combined back into the original single 40 GBps data stream. The QAM demodulator 452 ninety-six (96) 40 GBps to 96 TBps data streams are fed to the decryption circuitry and to the cell switch via the TDMA ASM.

Nucleus Switch Clocking & Synchronization Circuitry

FIG. 40 show the Nucleus Switch internal oscillator 805ABC which is controlled by a Phase Lock Loop (PLL) circuit 805A that receives it reference control voltage from the recovered clock signal 805. The recovered clock signal is derived from the received mmW RF signal from two LNA outputs that came from the two Global Gateway and National Nucleus Switches that are connected to the Nucleus Switch. These two LNA outputs are used as a primary and backup clocking signals for the oscillator. The received mmW RF signal is sample and converted into digital pulses by the RF-to-digital converter 805E as illustrated in FIG. 40 which is an embodiment of this invention.

The mmW RF signal that is received by the Nucleus Switch that came from the two Nucleus Switches which serves the Protonic Switch molecular domain. Since each Nucleus Switch RF and digital signals are reference to the uplink National Backbone and Global Nucleus Switches which are connected to Attobahn clock standard Atomic Cesium Beam master oscillator, as illustrated in FIG. 107 which is an embodiment of this invention. The Protonic Switch is in effect referenced to the Atomic Cesium Beam high stability oscillatory system. Since the Atomic Cesium Beam oscillatory system is referenced to the Global Position Satellite (GPS), it means that all of Attobahn systems globally are referenced to the GPS.

This Attobahn clocking and synchronization design makes all of the digital clocking oscillator in every Nucleus Switch, Protonic Switch, V-ROVER, Nano-ROVER, Atto-ROVER and Attobahn ancillary communications systems such as fiber optics terminals and Gateway Routers referenced to the GPS worldwide.

The referenced GPS clocking signal derived from the Nucleus Switch mmW RF signal varies the PLL output voltage in harmony with the received GPS reference signal phases between 0-360 degrees of its sinusoid at the GNCCs (Global Network Control Center) Atomic Cesium Oscillators. The PLL output voltage controls the output frequency of the Nucleus Switch local oscillator which in effect is synchronized to the Atomic Cesium Clock at the GNCCs, that is referenced to the GPS.

The Nucleus Switch clocking system is equipped with frequency multiplier and divider circuitry to supply the varying clock frequencies to following sections of the system:

1. *RF* mixer/*Upconverter*/Down Converter $1\times30-3300$ GHz
2. *QAM* Modem $1\times30-3300$ GHz signal
3. Cell Switch $8\times2$ *THz* signals
4. *ASM* 40 GHz signals
5. CPU & Cloud Storage $1\times2$ GHz signal The Nucleus Switch clocking system design ensures that Attobahn data information is completely synchronized with the Atomic Cesium Clock source and the GPS, so that all applications across the network is digitally synchronized to the network infrastructure which radically minimizes bit errors and significantly improved service performance.

Nucleus Switch Multi-Processor & Services

The Nucleus Switch is equipped with dual quad-core 4 GHZ, 8 GB ROM, 500 GB storage CPU that manages the Cloud Storage service, network management data, and various administrative functions such as system configuration, alarms message display, and user services display in device.

The CPU monitors the system performance information and communicates the information to the Nucleus Switch Network Management System (NNMS) via the logical port 0.1 (FIG. 6) Attobahn Network Management Port (ANMP) EXT.001. The end user has a touch screen interface to interact with the Nucleus Switch to set passwords, access services, and communicate with customer service, etc.

The local V-ROVER CPU runs the following end user Cloud Storage for the network Personal Services APPs and administrative functions:

1. Personal InfoMail
2. Personal Social Media
3. Personal Infotainment
4. Personal Cloud
5. Phone Services
6. New Movie Releases Services Download Storage/Deletion Management
7. Broadcast Music Services
8. Broadcast TV Services
9. Online WORD, SPREAD SHEET, DRAW, & DATABASE
10. Habitual APP Services
11. GROUP Pay Per View Services
12. Concert Pay Per View
12. Online Virtual Reality
13. Online Video Games Services
14. Attobahn Advertisement Display Services Management (banners and video fade in/out)
15. Atto View Dashboard Management
16. Partner Services Management
17. Pay Per View Management
18. VIDEO Download Storage/Deletion Management
19. General APPs (Google, Facebook, Twitter, Amazon, What's Up, etc.)
20. Camera Each one of these services Cloud storage service access and management for the Nucleus Switch is controlled by the Cloud APP in the Nucleus Switch CPU.

Attobahn Switching Fabric

Figure 41:
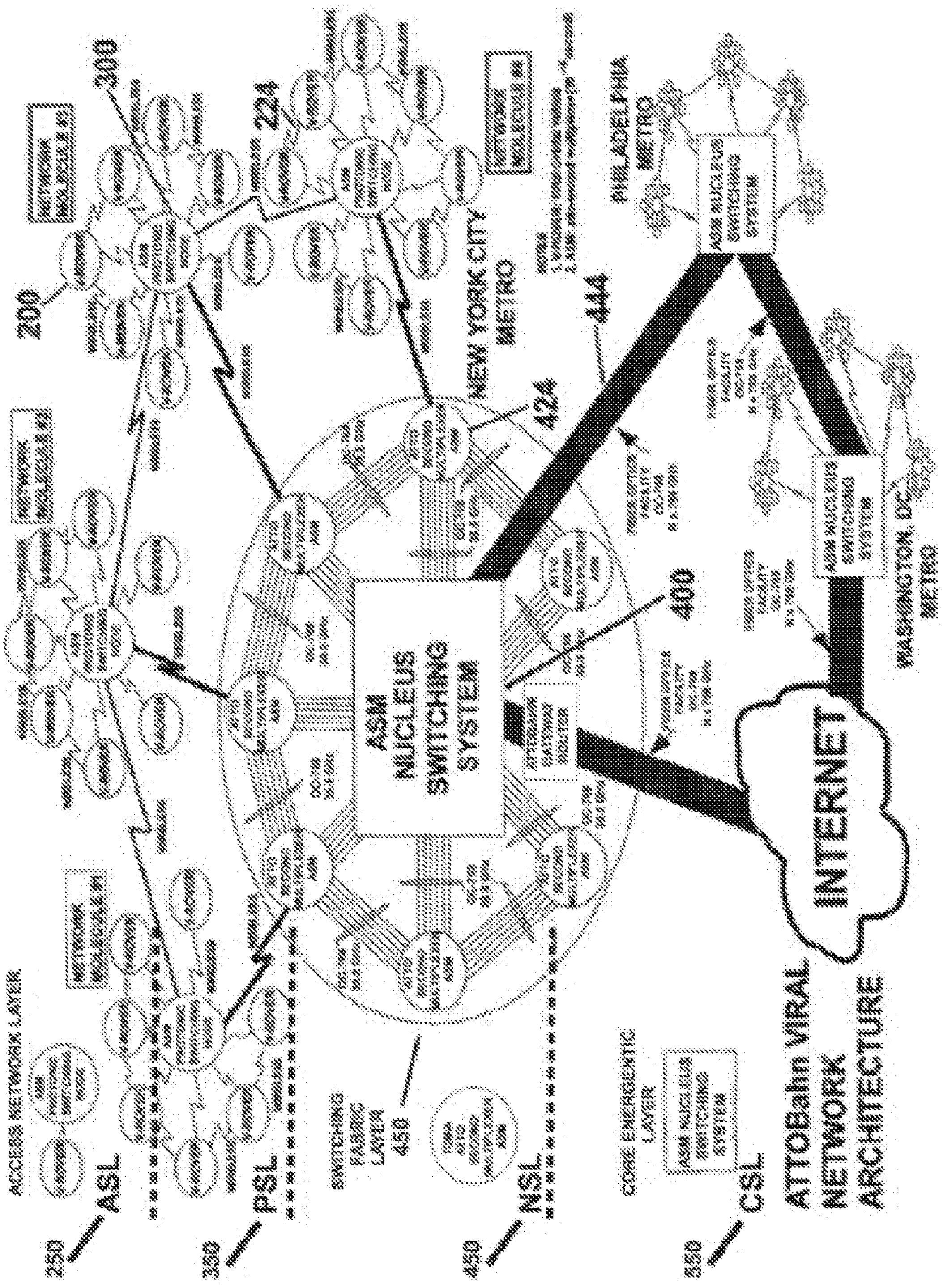
FIG. 41 shows the Viral Molecular Network Protonic Switch and the Viral Orbital Vehicle access nodes atomic molecular domains inter connectivity and the Nucleus Switch/ASM hub networking connectivity which is an embodiment of this invention.

As an embodiment to the invention FIG. 41 shows Attobahn Viral Molecular Network Protonic Switch and the Viral Orbital Vehicle access nodes atomic molecular domains inter connectivity and the Nucleus Switch/ASM hub networking connectivity.

FIG. 41 shows the high capacity backbone of the viral molecular network which is the Nucleus Switching Layer 450 that consists of the terabits per second Nucleus Switch/ASMs 424, ultra-high speed switching fabrics, and broadband fiber optics SONET based intra and inter city facilities 444. This section of the network is the primary interface into the Internet, public local exchange and inter exchange common carriers, international carriers, corporate networks, content providers (TV, news, movies, etc.), and government agencies (nonmilitary).

The Nucleus Switches 400 (NSL) cell fabric are front end by their TDMA ASMs which are connected to the Protonic Switches 300 (PSL) via RF signals. The hub Nucleus Switch/ASMs 424 acts as intermediary switches between the PSL 350 and the core backbone switches (CSL) 550. These Nucleus Switch/ASMs NSL 450 are equipped with a switching fabric that functions as a shield for the Core Backbone Nucleus Switches. The Nucleus Switch/ASM at the Intra-City level manages the data traffic by keeping local intra city traffic from accessing the Core Backbone Inter-City Nucleus Switching Fabric 550.

This arrangement eliminates network bandwidth utilization inefficiencies, by using the Intra-City Nucleus Switches/ASM to only switch non-core backbone network traffic and have the Core Backbone Nucleus Switches only switch the Inter-City and global data traffic. This arrangement keeps local transitory traffic between the ROVERs nodes 200 at the Access Switching Layer (ASL) 250, the Protonic Switches, and the Intra-City Hub Nucleus Switch/ASMs data traffic within the local ANL and PSL levels.

Figure 42:
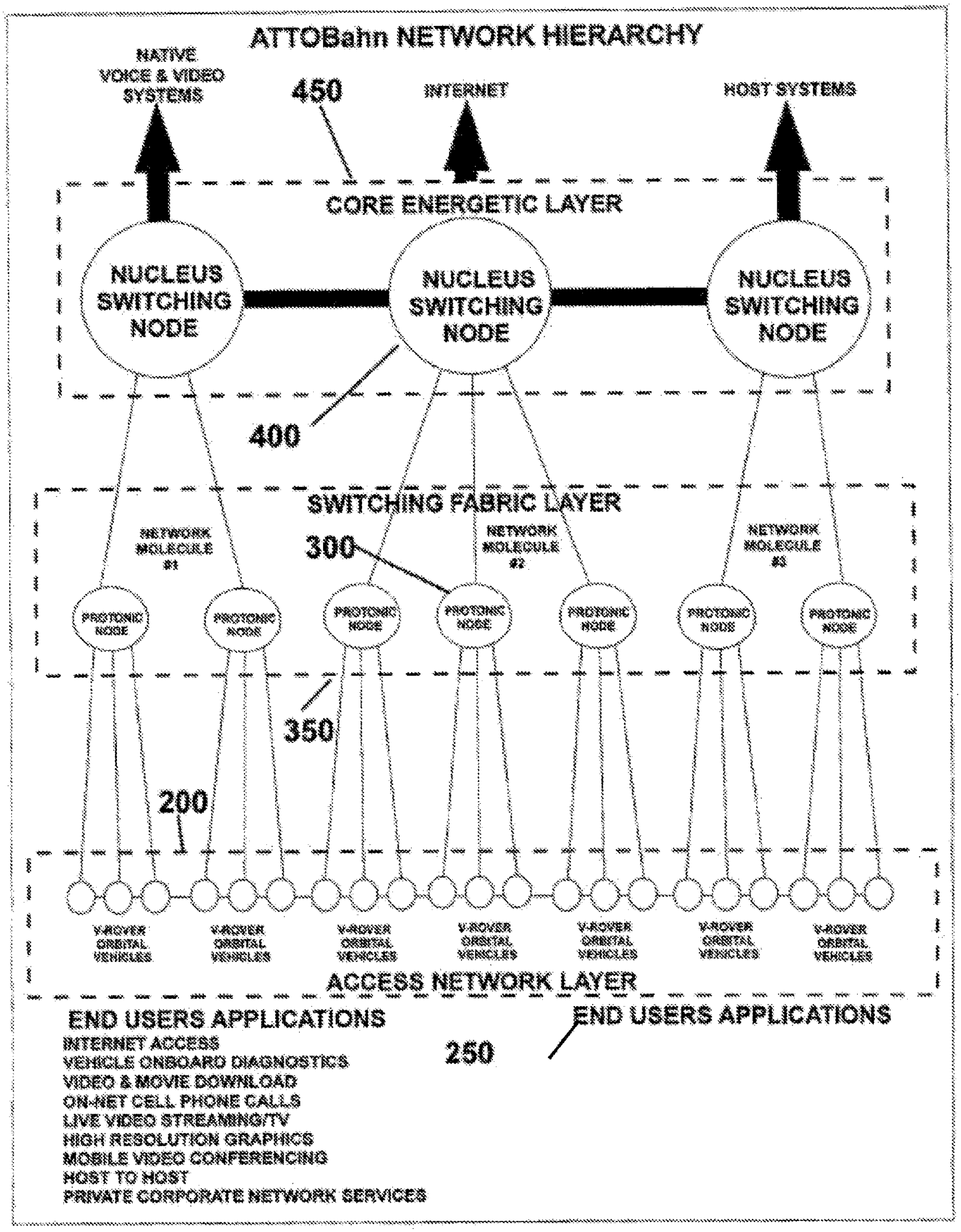
FIG. 42 shows the Viral Molecular network Access Network Layer (ANL), Protonic Switching Layer (PSL), and the Core Energetic Nucleus Switching Layer (NSL) network hierarchy which is an embodiment of this invention.

The hub ASMs selects all traffic that are designated for the Internet; other cities outside the local area; host to host high-speed data traffic; private corporate network information; native voice and video signals that are destined to specific end users' systems; video and movie download request to content providers; on-net cell phone calls; 10 gigabit Ethernet LAN services; etc. FIG. 15 shows the ASM switching controls that keeps local traffic within the local Molecule Networks domains, Attobahn Tri-Switching Levels As an embodiment of the invention FIG. 42 shows the Viral Molecular network Access Network Layer (ANL) 250, Protonic Switching Layer (PSL) 350, and the Nucleus Switching Layer (NSL) 450 tri-levels hierarchy. The network is architected in these three layers that comprise of the Viral Orbital Vehicles (ROVERs) 200, Protonic Switches 300, and Nucleus Switches 400 respectively to allow highly efficient switching of cell frames through the infrastructure by breaking the most congested part of the network, the ANL, in small manageable domains called atomic molecular domains These domains that are controlled by the Protonic Switch are called network molecules 350.

The ASL feeds its traffic to the PSL that manages all local traffic and keep that traffic local and makes sure that it does not go up to the NSL and waste bandwidth and cell switching resources at the NSL. Therefore, any traffic from a Viral Orbital Vehicle (ROVER) 200 that is destined for another Viral Orbital Vehicle (ROVER) in the same domain stay at the ASL by either going from Viral Orbital Vehicle to Viral Orbital Vehicle as shown at the 250 layer or traversing its adoptive Protonic Switch 300 to the destined Viral Orbital Vehicle in the same domain All traffic from a Viral Orbital Vehicle that is destined for another Viral Orbital Vehicle that is destined for the Internet or another Viral Orbital Vehicle in a distant must traverse the PSL and a Nucleus Switch at the NSL.

Attobahn Network Switching Hierarchy

Figure 43:
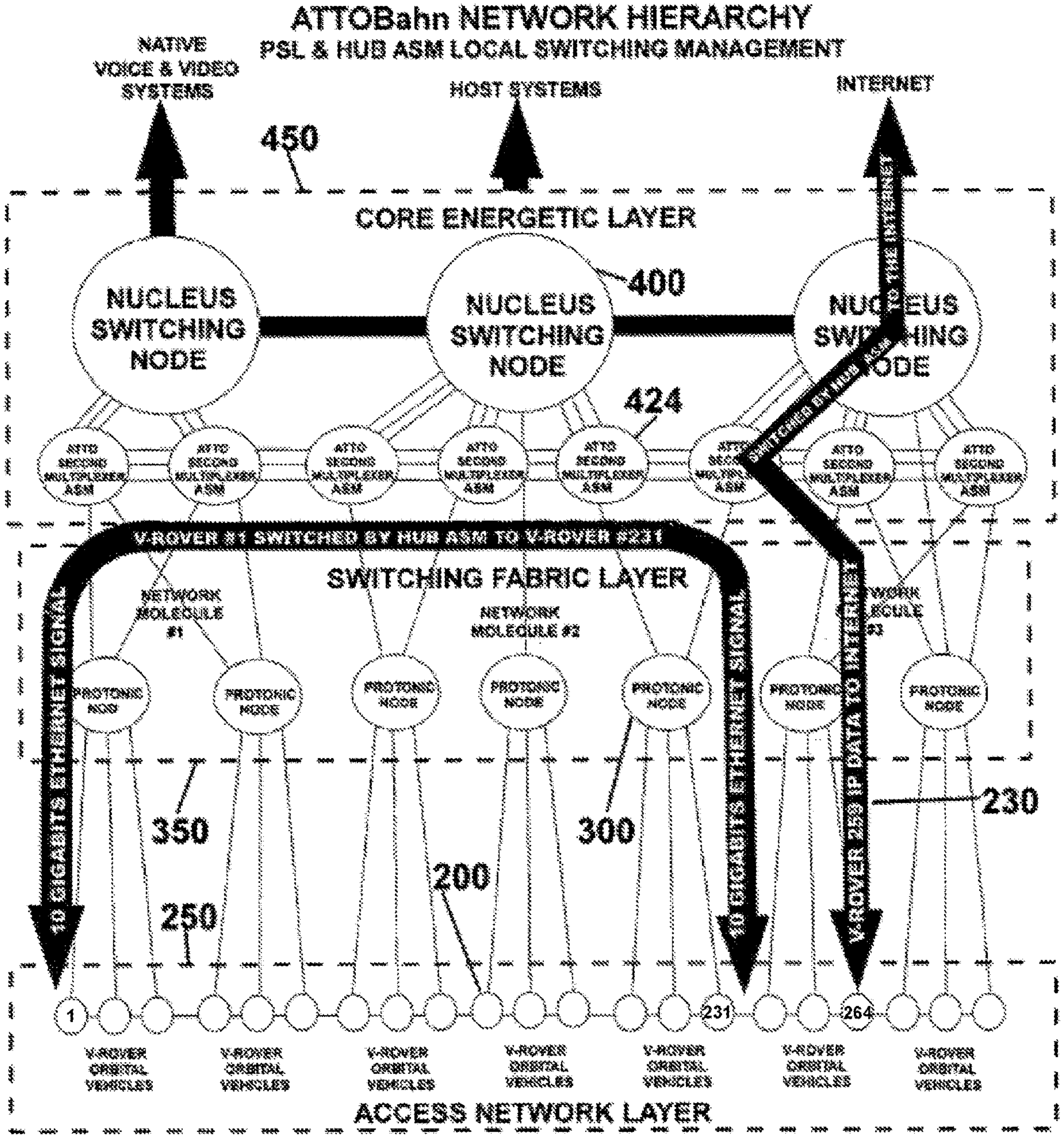
FIG. 43 shows the Viral Molecular network Protonic Switching Layer, connected to the V-ROVERs at the Access Network Layer, and to the Nucleus Switching Layer-switching management of local atomic molecular intra and inter domain and inter city traffic management.

As an embodiment of the invention FIG. 43 the Viral Molecular network Protonic Switching Layer and the hub ASMs switching management of local atomic molecular intra and inter domain and inter city traffic management. The network layers allow Viral Orbital Vehicles 200 to switch traffic between each other via the Protonic Switch 300. The Viral Orbital Vehicle to Protonic Switch cell switching is accomplished by the Protonic Switch reading the cell frame destination address and deciding whether to send the cell uplink to the Nucleus Switching Layer 450 or to switch the cell frame back down to the ANL 250 if the cell is designated for a local Viral Orbital Vehicle connected to it. In the example showed in this Figure involves Viral Orbital Vehicle #1 and Viral Orbital Vehicle #231, the Viral Orbital Vehicle #1 selects the shortest path to get to the destination Viral Orbital Vehicle ID 231 by going directly its adopted Protonic Switch which sent the cell frames to the hubs ASMs 424 and subsequently to a neighboring Protonic Switch that terminates the connection to the destination Viral Orbital Vehicle.

The second example shown is Viral Orbital Vehicle (ROVER) ID 264 send data to a Viral Orbital Vehicle (ROVER) in a distant city. The cells are switched by the Viral Orbital Vehicle adopted Protonic Switch which read the cell header and determines that the cell must go to the Nucleus Switch 400 in the NSL 450 which switches the cell to the distant city. This arrangement manages the utilization of critical bandwidth and switching resources by not sending cells destined for local connection up to the NSL.

Attobahn Vehicular Transportation Infrastructure

Figure 44:
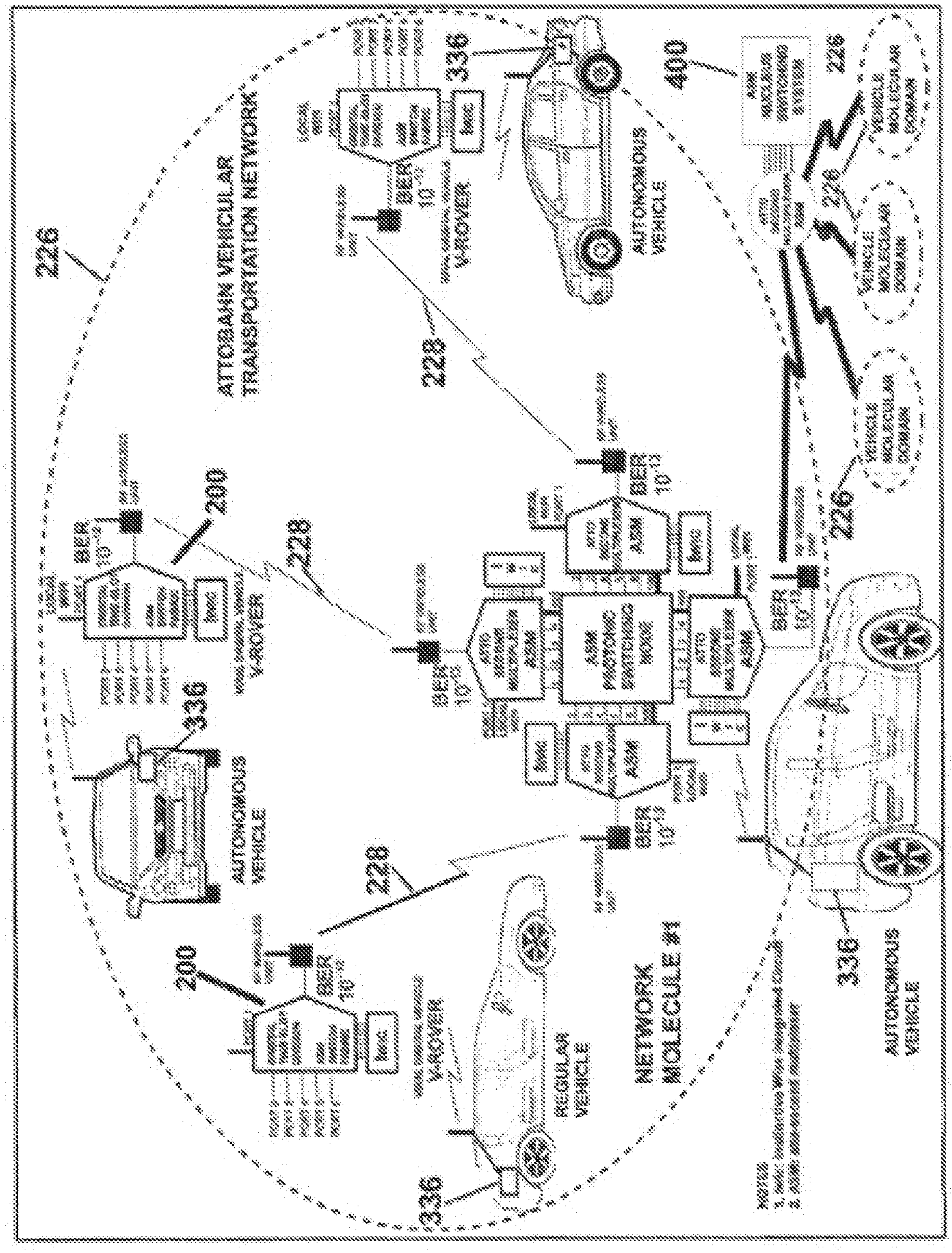
FIG. 44 illustrates the Viral Molecular Network Protonic Switch vehicular implementation for the Protonic Switching Layer which is part of this invention.

As an embodiment of the invention FIG. 44 shows the Viral Molecular network Protonic Switch 300 and Viral Orbital Vehicles (ROVERs) 200 vehicular implementation for the Protonic Switching Layer. The Vehicular Protonic Switch 336 and the ROVERs 200 are installed in cars, trucks, SUVs, fleets, etc., for Attobahn Vehicular Transportation Network (AVTN). These switches 336 are in motion as the vehicles move and adopt various Viral Orbital Vehicles (ROVERs) as they come into proximity of them. The millimeter wave (mmW) RF connection links 228 between the Protonic Switch and their adopted Viral Orbital Vehicle (ROVERs) constantly changes as these vehicles move through the city. The Viral Orbital Vehicles and the Protonic Switches are designed to function in this mobile environment with high quality data rates up to 1 part in one (1) trillion BER.

The Attobahn Vehicular Transportation Network (AVTN) is designed to allow autonomous driving vehicle to operate individually and between each other within the contiguous network. The vehicles collision and directional signals are transported through the ROVERs and Protonic Switches millimeter wave RF signals. The autonomous vehicle management APP resides in the both the standalone ROVER device and the internal ROVER in each vehicle. These Autonomous Vehicle and regular vehicle APPs in each vehicle communicates with each other at 10 GBps digital signal speed. These APPs are also installed in regular vehicles where they can communicate with autonomous vehicles within the AVTN. The regular and autonomous vehicles can share road conditions; traffic information; environmental conditions; videos from the each other external cameras; infotainment data; etc., with each other.

The AVTN is separated into operational domains 226 called vehicular molecular domains which consist of 4×400 Viral Orbital Vehicles to 4 Protonic Switches. The Protonic Switches from each domain connect via multi RF links to several Nucleus Switches via hub TDMA ASMs at the viral molecular network city hubs. These domains are connected together to form a contiguous AVTN within a city and across a region. The AVTN infrastructure technology follows the aforementioned detailed designs of the ROVERs, Protonic Switches, and Nucleus Switches in the Attobahn network infrastructure.

North America Backbone

Network which encompasses the use of the Nucleus Switches to provide nationwide communications for the end users which is an embodiment of this invention. The backbone switches connect the major NFL cities at the high capacity bandwidth tertiary level and the integrate the secondary layer of the core in smaller cities. The International backbone layer connects the major international cities. The network is scaled into major east coast hubs 501 which consists of New York, Washington, D.C., Atlanta Toronto, Montreal, and Miami; major mid-west hubs 502 which consists of Chicago, St. Louis, and Texas; major west coast hubs 503 which consists of Seattle, San Francisco, Los Angeles, and Phoenix.

These major hubs are connected to each other via Attobahn Backbone mmW Ultra High-Power Gyro TWA Boom Box RF links (see FIGS. 58, 59, 60, 68 and 70,) and high capacity fiber optics links 504 operating at multiple 768 GBps between the Nucleus Switches. These fiber optics links are diverse from each other in term of routes, cable trench, Point-of-Presence (POP) to make sure that the viral molecular network has no common point of failure on the backbone network. This redundancy design works in harmony with the design of the Nucleus Switches cell switching schema so that when a failure occurs on a fiber link or a Nucleus Switch that no city is isolated and thus the users in that city sill have no service.

The Nucleus Switch fiber optic failure alarm alert and the cell switch rerouting around the failure is determine by an algorithm that works with the time that the fiber optic terminals takes to switchover to their backup link before the cell switch starts to reroute cells too prematurely so that systems that recovery time is extended. Viral Molecular network Nucleus Switch is designed to work with the fiber optic terminals and switches to coordinate the network failed facilities recovery.

Figure 45:
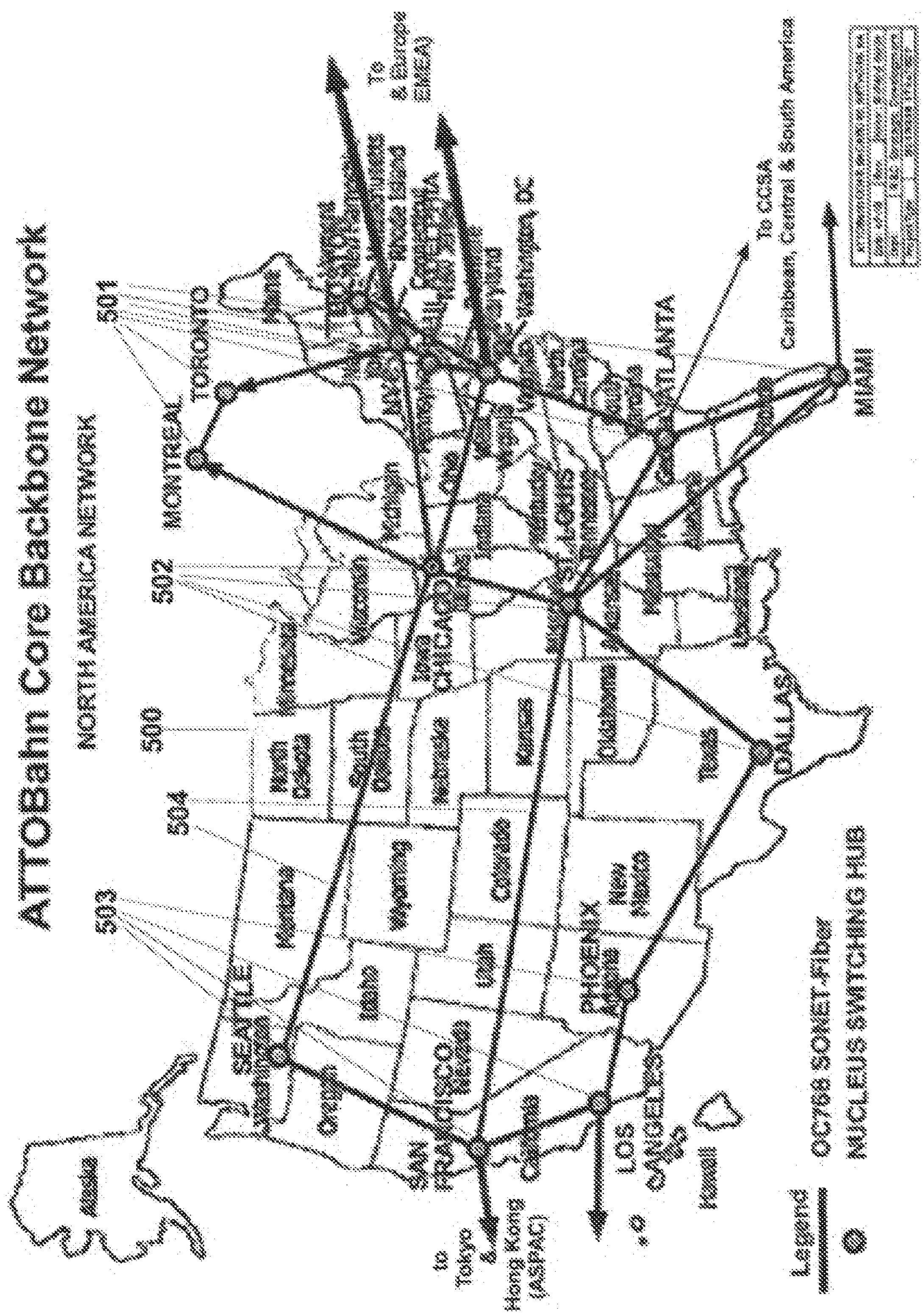
FIG. 45 shows the Viral Molecular Network North America Core Backbone network which encompasses the use of the Nucleus Switches to provide nationwide communications for the end users which is an embodiment of this invention.

The Viral Molecular North America backbone network as illustrated in FIG. 45.0, initially consists of the following major cities network hubs that are equipped with core Nucleus Switches are Boston, New York, Philadelphia, Washington DC, Atlanta, Miami, Chicago, St. Louis, Dallas, Phoenix, Los Angeles, San Francisco, Seattle, Montreal, and Toronto. The facilities between these hubs are multiple fiber optic SONET OC-768 circuits terminating on the Nucleus switches. These locations are based on their metropolitan concentration of people; with New York city metro totaling some 19,000,000; Los Angeles having over 13,000,000; Chicago with 9,555,000; Dallas and Houston each with over 6,700,000; Washington DC, Miami, and Atlanta metros each boasting more than 5,500,000; etc.

North America Network Self-Healing & Disaster Recovery

Figure 46:
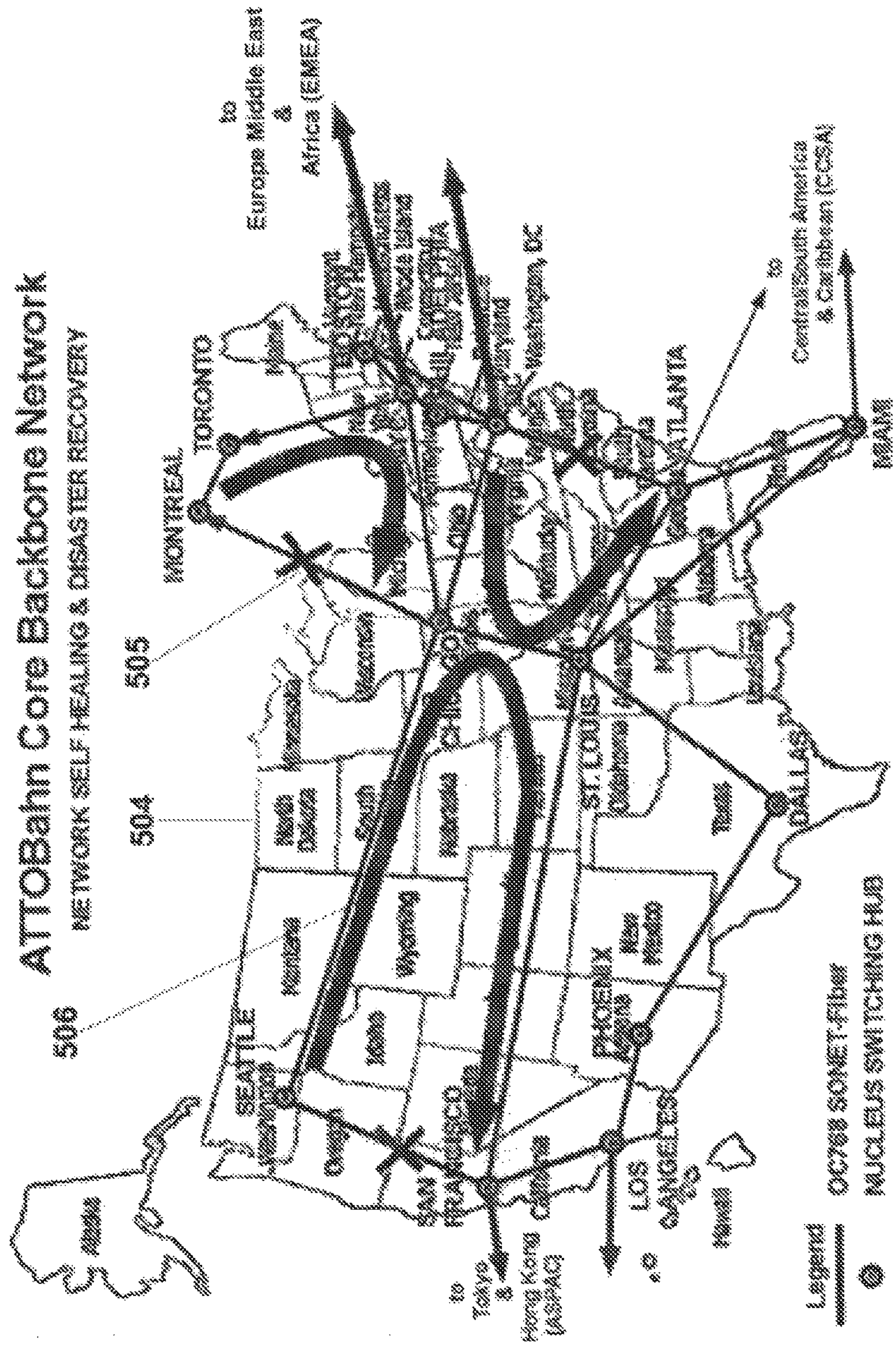
FIG. 46 illustrates the Viral Molecular Network self-healing and disaster recovery design of the Core North Backbone portion of the network which is key embodiment of this invention.

FIG. 46 illustrates the Attobahn Viral Molecular network self-healing and disaster recovery design of the Core North Backbone portion of the network which is key embodiment of this invention. The network is designed with self-healing rings between the key hubs cities. The rings allow the Nucleus Switches to automatically reroute traffic when a fiber optic facility fails. The switches recognize the loss of the facility digital signal after a few micro-seconds and immediately goes into service recovery process and switch all of the traffic that was being sent to the failed facility to the other routes and distribute the traffic across those routes depending on their original destination.

For example, if multiple OC-768 SONET fiber facilities or one of the Attobahn Backbone mmW Ultra High-Power Gyro TWA Boom Box RF links (see FIGS. 58, 59, 60, 68 and 70) between San Francisco and Seattle fails, the Nucleus Switches between these two locations immediately recognizes this failed condition and take corrective action. The Seattle switches start rerouting the traffic destined for San Francisco location and transitory traffic through the Chicago and St. Louis switches and back to San Francisco.

The same series of actions and network self-healing processes are initiated when failures occur between Chicago and Montreal, with the switches pumping the recovered traffic destined for Chicago through Toronto and New York and back to Chicago. A similar set of actions will be taken by the switches between Washington DC and Atlanta to recover the traffic lost between these two locations by switching them through Chicago and St. Louis. All of these actions are executed instantaneously without the knowledge of end users and without any impact on their services. The speed at which this rerouting takes place at is faster than the end systems can respond to the failure of the mmW RF Ultra High-Power Gyro TWA RF systems or fiber facilities.

The natural respond by most end systems such as TCP/IP devices is to retransmit any small amount of loss data and most digital voice and video systems' line buffering will compensate for the momentary loss of data stream. This self-healing capability of the network keeps its operational performance in the 99.9 percentile. All of these performance and self-correcting activities of the network is captured by the network management system and the Global Network Control Centers (GNCCs) personnel.

Attobahn Traffic Management

Global Traffic Switching Management

Figure 47:
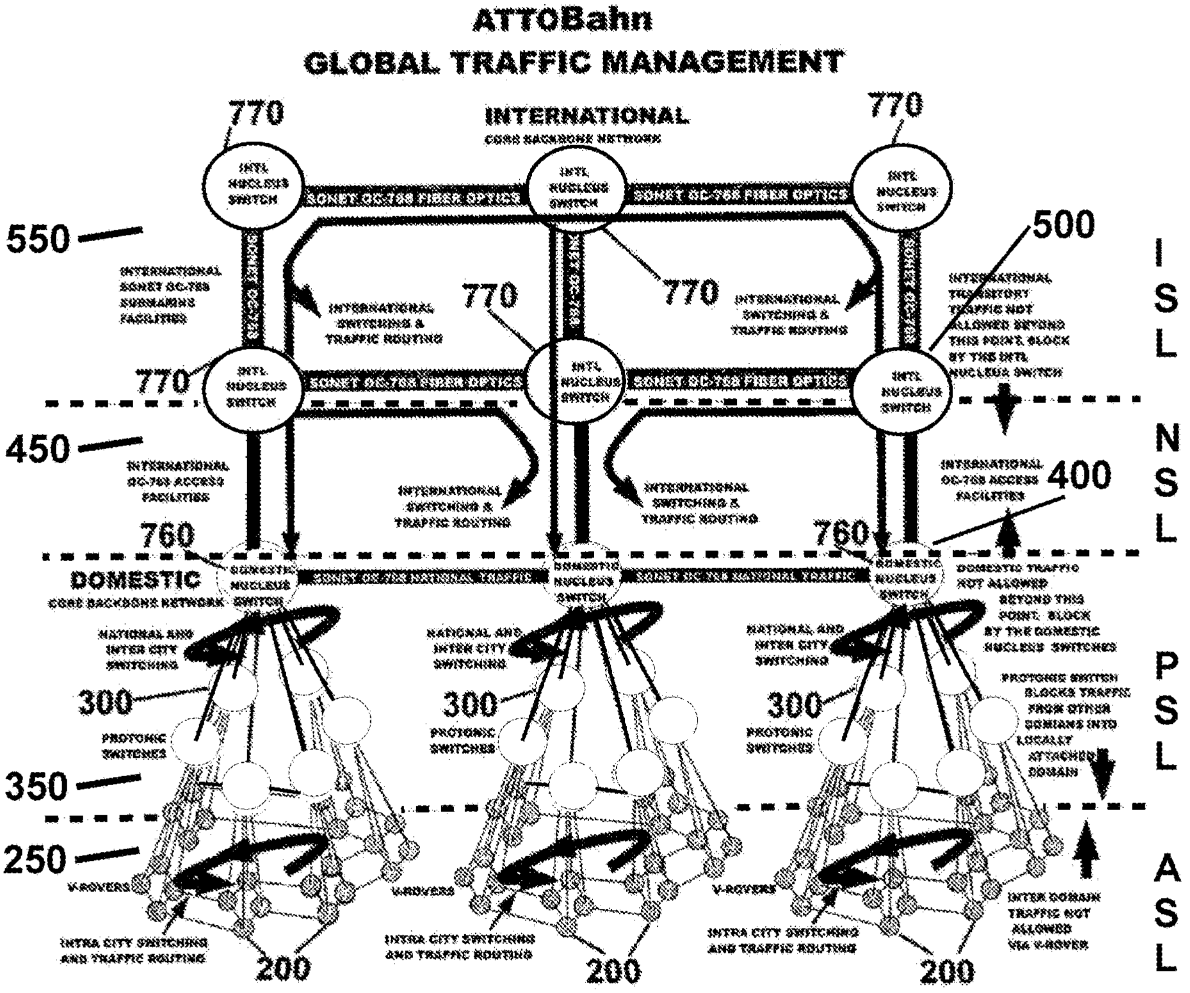
FIG. 47 is an illustration of Viral Molecular network global traffic management of the digital streams between its global international gateway hubs utilizing the Nucleus Switches which is an embodiment of this invention.

FIG. 47 is an illustration of the Viral Molecular network global traffic management of the digital streams between its global international gateway hubs 500 utilizing the Nucleus Switches 400 which is an embodiment of this invention. The switches routing and mapping systems are configured to manage the network traffic on a national and international level, based on cost factors and bandwidth distribution efficiency. The global core backbone network is divided into molecular domains on a national level (Area Codes—see FIG. 10) which feeds into the tertiary global layer (Global Codes—see FIG. 10) of the network.

The entire traffic management process on a global scale is self-manage by the switches at the Access Switching Layer (ASL) 250, Protonic Switching Layer (PSL) 350, Nucleus Switching Layer (NSL) 450, and the International Switching Layer (ISL) Access Network Layer Traffic Management As illustrated in FIG. 47 which is an embodiment of this invention, the Access Switching Layer (ASL) 250 level of the Viral Orbital Vehicles (ROVERs) determines which traffic is transiting its node and switch it to one of its two neighboring Viral Orbital Vehicles 200 depending on the cell frame destination node or to its adopted Protonic Switch. At the ASL level, all of the traffic traversing between the Viral Orbital Vehicles are being terminated on one of the Viral Orbital Vehicles in that atomic domain. The Protonic Switch 300 that acts as a gate keeper for the atomic domain that its presides over. Therefore, once traffic is moving within the ASL, it is either on its way from its source Viral Orbital Vehicle to its presiding Protonic Switch, that had already adopted it as its primary adopter; or it is being transit toward its destination Viral Orbital Vehicle. Hence, all of the traffic in an atomic domain is for that domain in the form of leaving its Viral Orbital Vehicle on its way to the Protonic Switch 300 to go toward the Nucleus Switch 400 and then sent to the Internet, a corporate host, native video or on-net voice/calls, movie download, etc. or being transit to be terminated on one of the Viral Orbital Vehicle in the domain. This traffic management makes sure that traffic for other atomic domains are not using bandwidth and switching resources in another domain, thus achieving bandwidth efficiency within the ASL.

Protonic Switching Layer Traffic Management

As illustrated in FIG. 47 which is an embodiment of this invention, the Protonic Switches 350 has the presiding responsibility of managing the traffic in its atomic molecular domain and blocking all traffic destined to another atomic molecular domain from entering its locally attached domain. Also, the Protonic Switch has the responsibility of switching all traffic to the hub ASMs. The Protonic Switches read the cell frames header and directs the cells to the domestic Nucleus Switch/ASMs 400 for inter atomic molecular domains traffic 760; intra city or inter city traffic; national or international traffic 770. The Protonic Switches do not have to separate the aforementioned traffic groups, instead it simply looks for its atomic domain traffic on the outbound and inbound traffic.

If the inbound traffic cell frame header does not have its atomic domain header, it blocks it from entering its atomic domain and switch it back to its hub ASM switch. All outbound traffic from the Viral Orbital Vehicles are switched by the Protonic Switch directly to its presiding hub ASM switch. This switching and traffic management design of the Protonic Switches minimizes the amount of switching management that they have to do, thus speeding up switching and reducing traffic latency through the switches.

Nucleus & Hub ASMs Switching/Traffic Management

As illustrated in FIG. 47 which is an embodiment of this invention, the domestic hub ASMs and Nucleus Switch 760 directs all traffic from the PSL 350 level to other atomic domains 250 within the molecular domain that it oversees. In addition, the hub domestic Nucleus Switch/ASMs 760 switch the traffic at the NSL 450 that is destined for other Nucleus Switch/ASMs' molecular domains or send the traffic to the International Nucleus Switches 770 at the ISL level 550. Therefore, the hub domestic hub Nucleus Switch/ASMs manage all intra city traffic between molecular domains and the International Nucleus Switch switches the international traffic between the Global Codes.

These ASMs block all local traffic from entering the Nucleus Switch and the national network. The ASMs and Nucleus Switch international hubs 770 read the cell frames headers to determine the destination of the traffic and switch all traffic destined for another city or internationally to the Nucleus Switch. This arrangement keeps all local traffic from entering the national or international core backbone.

The Nucleus Switches are strategically located at the major cities around the world. These switches are responsible for managing traffic between the cities within a national network. The switches read the cell frames headers and route the traffic to their peers in within the national networks and between the International Switches. These switches insure that domestic traffic are kept out of the international core backbone which eliminate national traffic from using expensive international facilities, reduces network latency, increase bandwidth utilization efficiency.

Global Core Backbone Network

Figure 48:
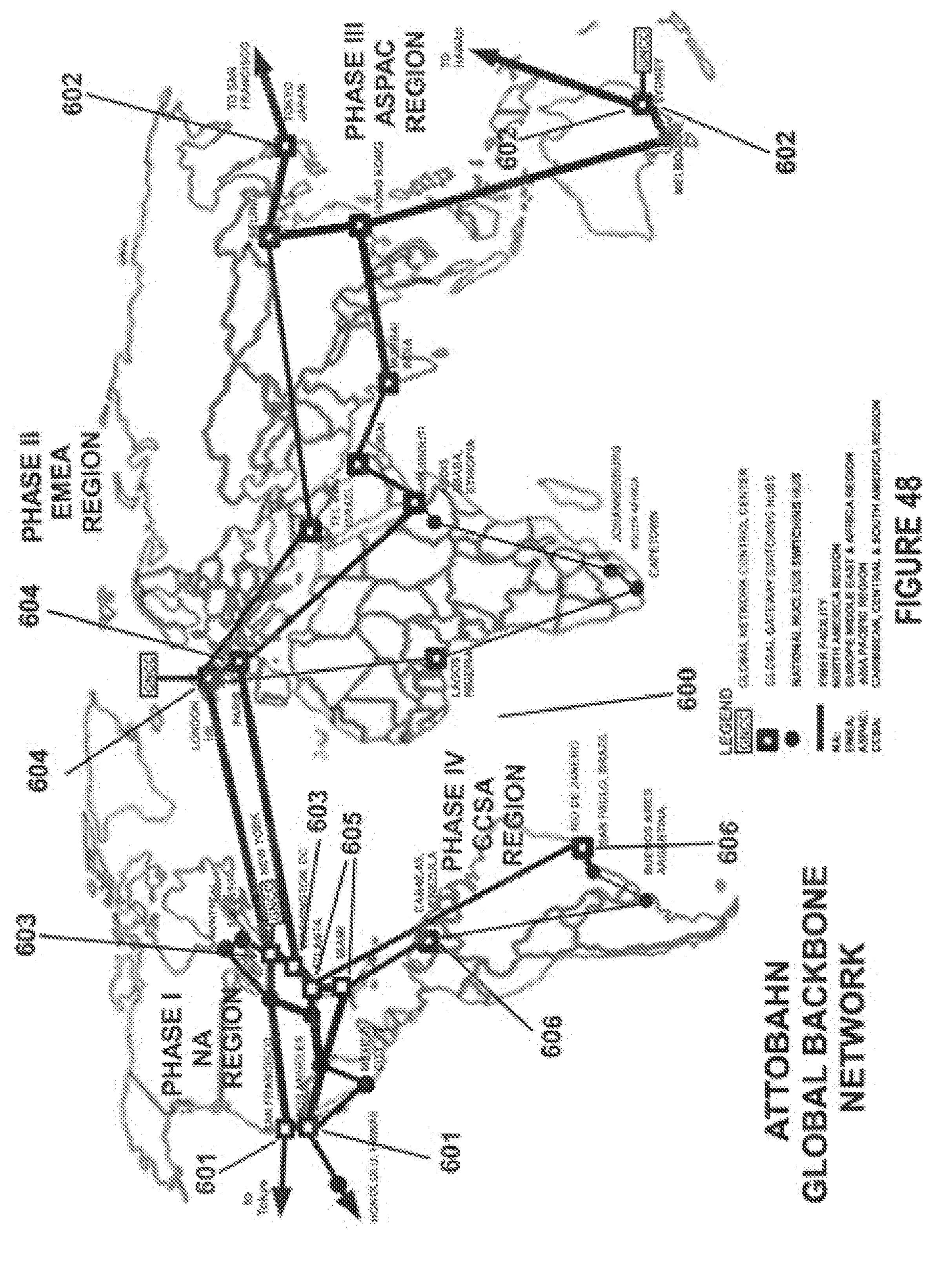
FIG. 48 is a depiction of the Viral Molecular network global core backbone international portion of the network connecting key countries Nucleus Switching hubs to provide viral molecular network customers with international connectivity which is embodiment of this invention.

FIG. 48 which is an embodiment of this invention, is a depiction of the Viral Molecular network global core backbone international portion 600 of the network connecting key countries Nucleus Switching hubs to provide the viral molecular network customers with international connectivity which is key part of this invention.

The International Switches preside over the traffic passed to it from the national networks destined to other countries as shown in FIG. 48. These switches only focus on cells that the national switches pass to them and do not get involved with national traffic distribution. The International Switches examine the cell frames headers and determines which Global Code the cells are destined to and switch them to correct international node and associated Sonet facility.

Several International Switches function as global gateway switches that interface each of the four global regions: The global gateway switches 601 in the US in San Francisco and Los Angeles function as the North America (NA) regional hubs connecting the ASPAC region 602 at Sydney, Australia and Tokyo, Japan. The four gateway switches on the East Coast of the United States of America in New York 603 and Washington DC, connect the Europe Middle East & Africa (EMEA) Europe gateways 604 in London, United Kingdom and Paris, France. The two gateway nodes in Atlanta and Miami 605 connects the gateway nodes in Caribbean, Central & South America (CCSA) region 606 at the cities of Rio De Janeiro, Brazil and Caracas, Venezuela.

The global gateway nodes in Paris connects to the gateway nodes in Lagos, Nigeria and Djibouti City in Africa. The London City node connects the western part of Asia in Tel Aviv, Israel. This design provides a hierarchical configuration that isolates traffic to various regions. For example, the gateway node in Djibouti City and Lagos reads the cell frames of all the traffic coming into and leaving Africa and only allow traffic terminating on the continent (City Codes) to pass through. Also, these switches only allow traffic that are destined for another region to leave the continent. These switches block all intra continental traffic from passing to the other regions' gateway switches. This capability of these switches manages the continental traffic and transiting traffic for other regions.

Global Backbone Network Self-Healing & Disaster Recovery

Figure 49:
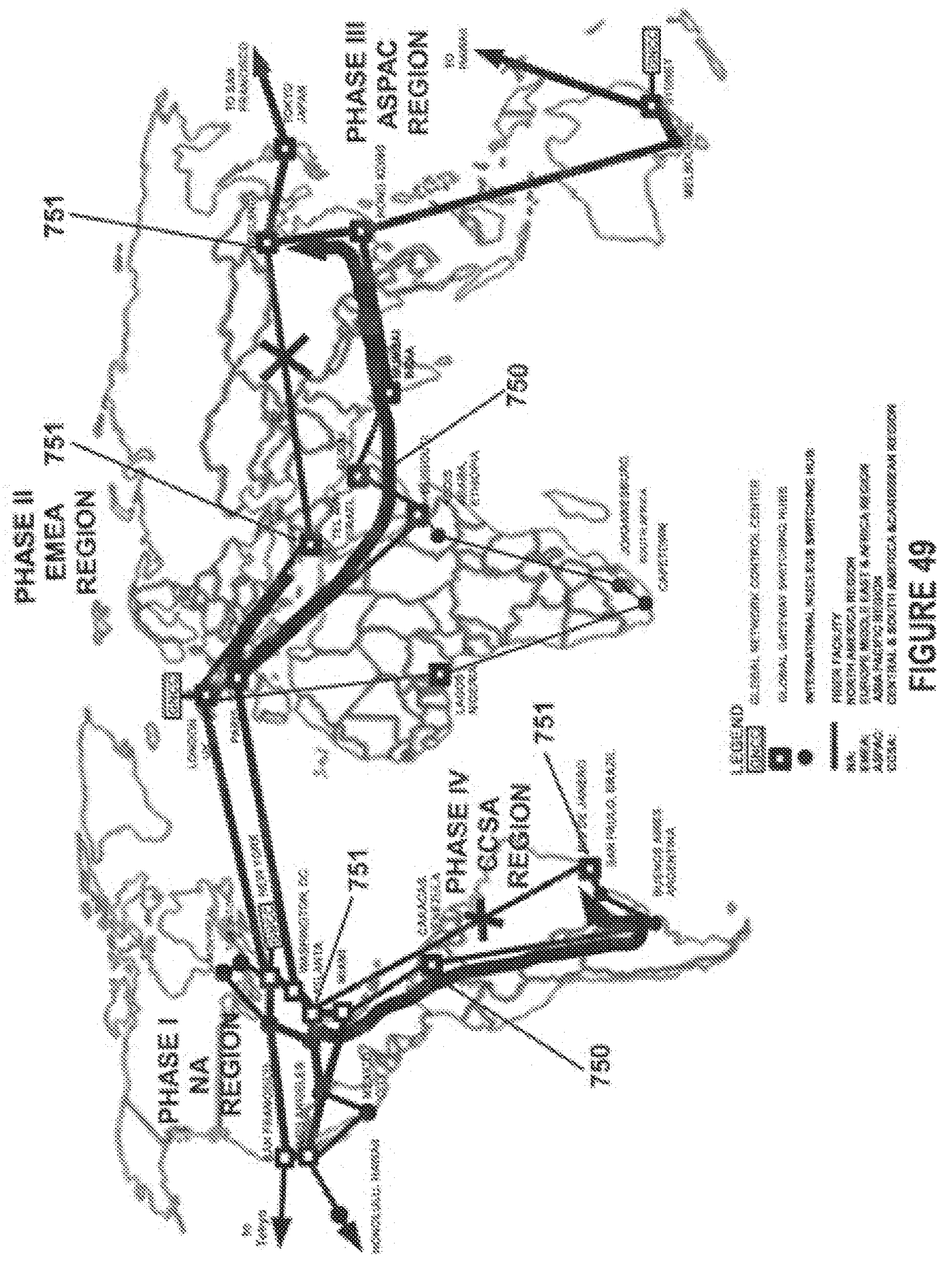
FIG. 49 displays the Viral Molecular network self-healing and dynamic disaster recovery of the global core backbone international portion of this network which is an embodiment of this invention.

FIG. 49 which is an embodiment of this invention, displays the Viral Molecular network self-healing and dynamic disaster recovery of the global core backbone international portion of this network which is an embodiment of this invention. The global core network as depicted in FIG. 49 is designed with self-healing rings 750 connecting the global gateway switches. The first ring is formed between New York, Washington DC, London and Paris. The second ring is between Atlanta, Miami, Caracas, and Rio De Janeiro via Buenos Aires. The third ring is between London, Paris, Lagos, and Djibouti, via Cape Town, Johannesburg, and Addis Ababa. The fourth ring is between London, Paris, Tel Aviv, Beijing, Hong Kong via Djibouti, Dubai, and Mumbai. The fifth ring is between Beijing, Hong Kong, Melbourne, Sydney, Hawaii, Tokyo, San Francisco, and Los Angeles. These rings are design in such a manner that if one of the Sonet facilities fails, then the gateway switches in that ring will immediately go into action of rerouting the traffic around the failure as shown in FIG. 48.

The gateway switches are so configured that if the Sonet facility fails in ring number two between Atlanta and Rio De Janeiro, the switches immediately recognize the problem and start to reroute the traffic that was using this path through the switches and facilities in Atlanta, Caracas, San Paulo and then to its original destination in Rio De Janeiro. The same scenario is show on ring number four after a failure between Israel and Beijing.

The switches between the two facilities reroute the traffic around the failed facility from Tel Aviv to London then through Paris, Djibouti City, Dubai, Mumbai, Hong Kong, and to Beijing. All of this is carried out between the switches in micro seconds. The speed of healing these failed rings result in minimal loss of data and in most cases, will not even be notice by the end users and their systems. All of the rings between the gateway nodes are self-healing, thus making the network very robust in term of recovery and performance.

Global Network Control Centers

Figure 50:
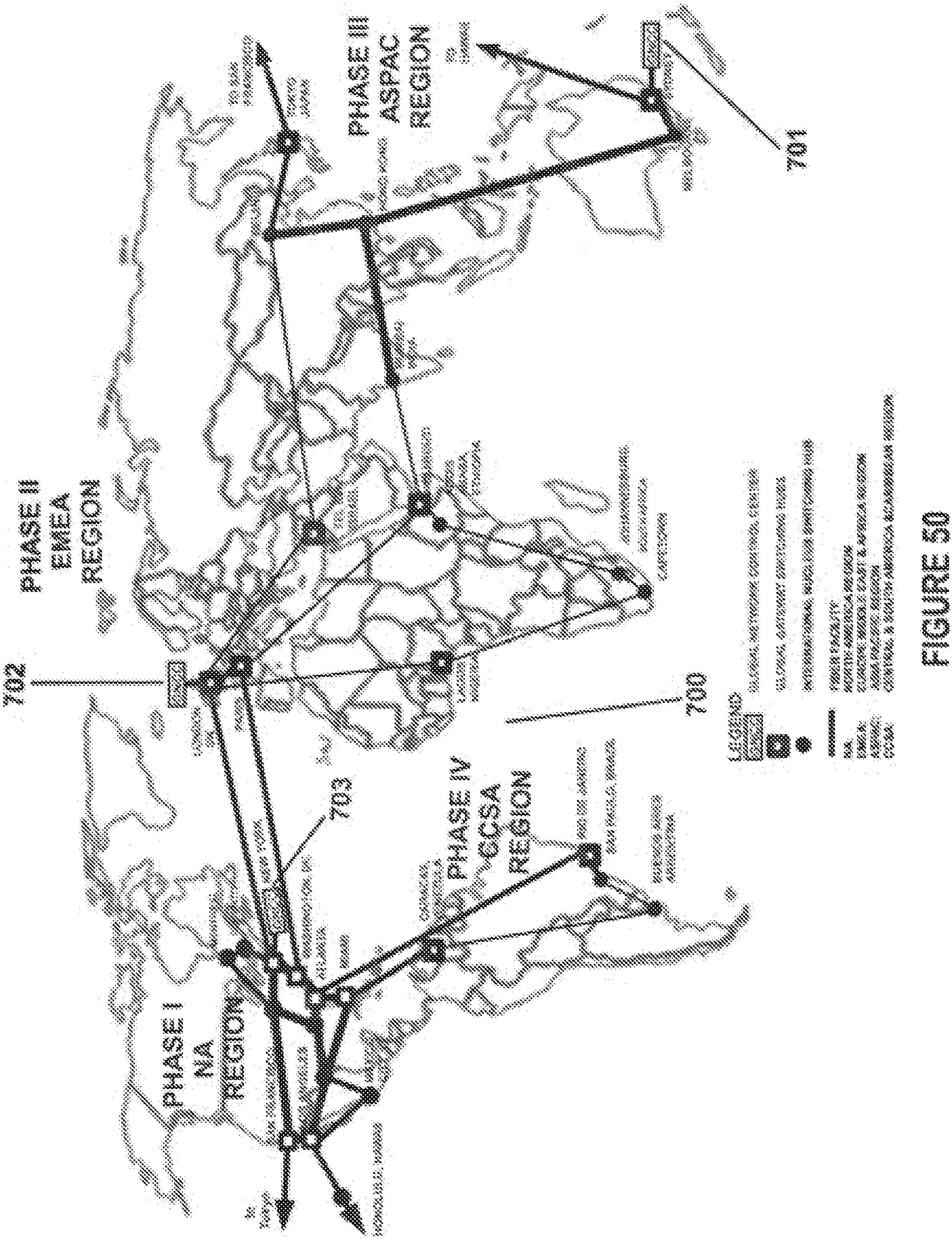
FIG. 50 is an illustration of Attobahn three Global Network Control Centers (GNCC) in New York, USA, London, UK, and Sydney Australia that manage the V-ROVERs, Nano-ROVERs, Atto-ROVERs, Protonic Switches, Nucleus Switches, Boom Box Gyro TWAs, Mini Boom Box Gyro TWAs, window mount millimeter wave antenna repeaters, door and wall millimeter wave antenna repeaters, and fiber optics terminals equipment which is an embodiment of this invention.

FIG. 50 depicts the Global Network Control Centers 700 in North America, ASPAC (Asia Pacific), and EMEA (Europe Middle-East, and Africa) which is an embodiment to the invention. The Viral Molecular Network is controlled by three Global Network Control Centers (GNCCs) as shown in FIG. 49. The GNCCs manage the network on an end-to-end basis by monitoring all International and domestic Nucleus Switches/ASMs, and Protonic switches. Also, the GNCCs monitor the Viral Orbital Vehicles (ROVERs), RF Systems, Gateway Routers, and Fiber Optic Terminals.

The monitoring process consists of receiving the system status of all network devices and systems across the global network infrastructure. All of the monitoring and performance reporting is carried out in real time. At any moment, the GNCCs can instantaneously determine the status of any one of the aforementioned network switches and systems.

The three GNCCs are strategically located in Sydney 701, London 702, and New York 703. These GNCCs will operate 24 hours per day 7 days per week (24/7) with the controlling GNCC following the sun, the controlling GNCC starts with the first GNCC in the East, being Sydney and as the Earth turns with the Sun covering the Earth from Sydney to London to New York. This means that while the UK and United States are sleeping at nights (minimal staff), Sydney GNCC will be in charge with its full complement of day-shift staff.

When Australia business day comes to end and their go on minimal staff, then following the Sun, London will now be up and running at full staff and take over the primary control of the network. This process is later followed by New York taking control as London staff winds down the business day.

This network management process is called follow the sun and is very effective in management of large scale global network.

The GNCC will be co-located with the Global Gateway hubs and will be equipped with various network management tools such as the Viral Orbital Vehicles, Protonic, ASMs, Nucleus, and International Switches NMSs (Network Management Systems). The GNCCs will each have a Manager of Manager (MOM) network management tool called the ATTOMOM. The ATTOMOM consolidates and integrates all alarms and performance information that are received from the various networking systems in the network and present them in a logical and orderly manner. The ATTOMOM will present all alarms and performance issues as root cause analysis so that technical operations staff can quickly isolate the problem and restore any failed service. Also with the MOM comprehensive real-time reporting system, the viral molecular network operations staff will be proactive in managing the network.

Attobahn Manager of Manager (Attomom)

Figure 51:
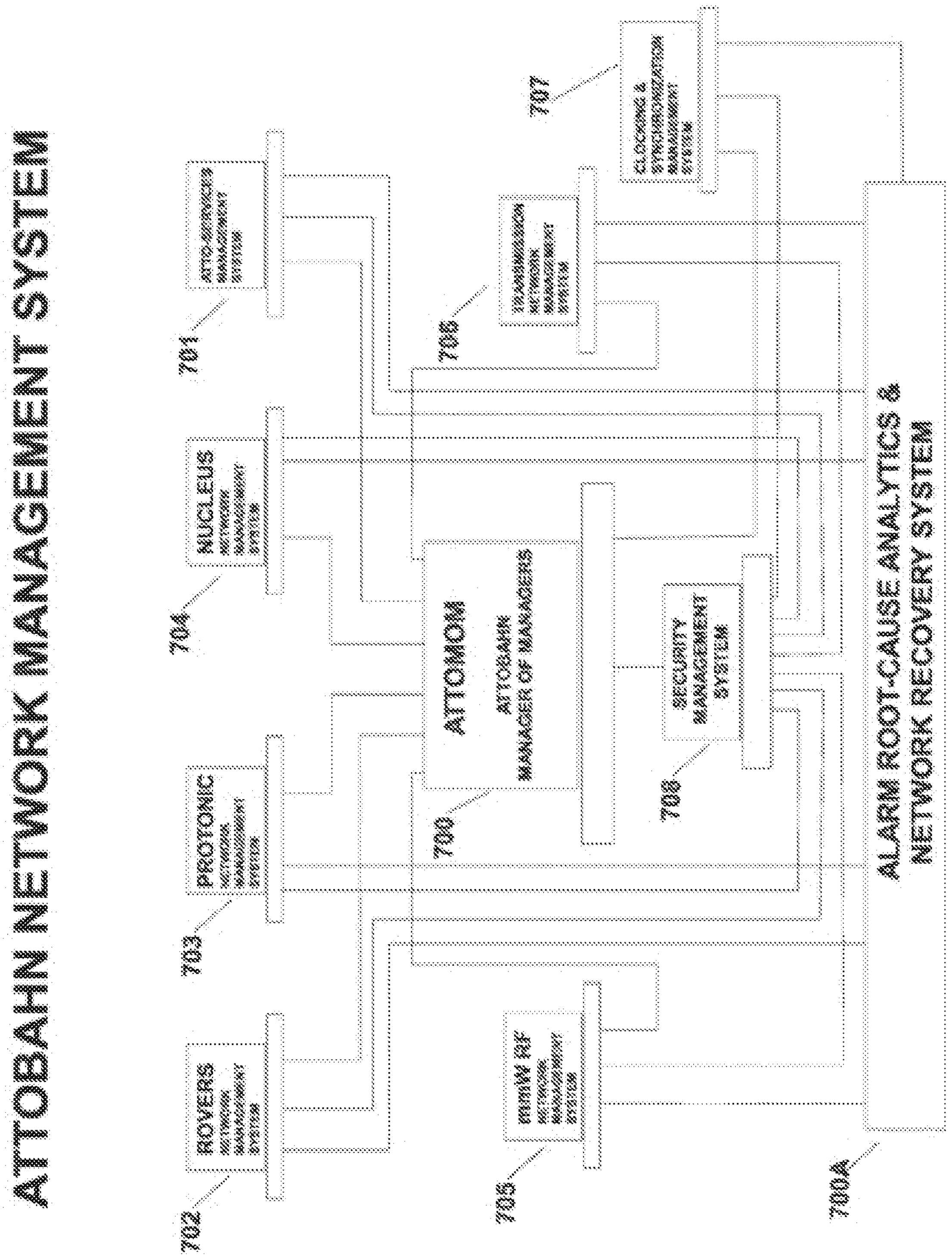
FIG. 51 is an illustration of Attobahn network management systems, its central Manager of Managers (MOM), and associated Alarm Root Cause & Network Recovery System that are located at the three Global Network Control Centers (GNCC) which is an embodiment of this invention.

As illustrated in FIG. 51 which is an embodiment of this invention, ATTOMOM 700 is a customized centralized network management system that collects, analyze, and makes service restoration decisions based on the root-cause problem analysis function 700A of system performance degradation, intermittent outage, outage, and catastrophic outages.

ATTOMOM integrates the following Attobahn network systems:

1. Atto-Services Management System (ASMS) 701
2. ROVERs Network Management System (RNMS) 702
3. Protonic Switch Network Management System (PNMS) 703
4. Nucleus Switch Network Management System (NNMS) 704
5. Millimeter Wave RF Network Management System (RFNMS) 705
6. Router & Transmission Network Management System (RTNMS) 706
7. Clocking & Synchronization Management System 707
8. Security Management System (SMS) 708

Each of these management systems send the following information to ATTOMOM:

1. System Alarm status reporting.
2. Network systems configuration changes.
3. System real-time operational performance reporting.
4. Security access, threats, rejections, protective actions, and changes.
5. Access Control Management reports.
6. Network failure recovery actions information
7. Planned Routine Maintenance and Emergency Maintenance Status reports.
8. Disaster Recovery plans and actions implemented reports ATTOMOM and all of its subordinate network management systems information is gather and sent via the APPI logical port 1 ANMP. The ATTOMOM is continuously supplied with the aforementioned network management systems information and after data analysis; root-cause problem determination; the alarm and performance information is acted upon with pre-programmed actions; and appropriate human intervention. The ATTOMOM system aids the Global Network Control Centers technicians in expeditiously resolving network problems.

Attobahn Atto-Services Management System

Figure 52:
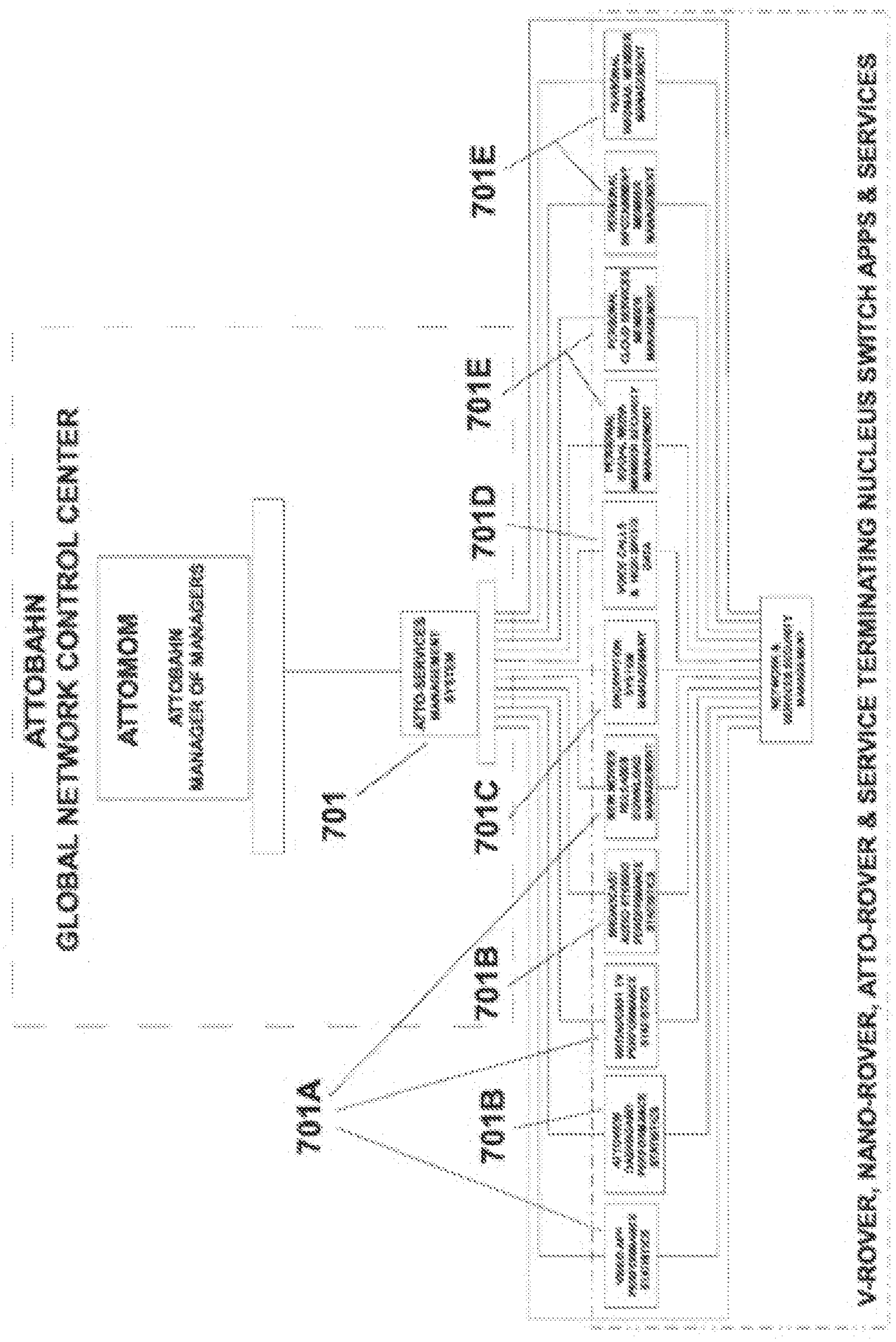
FIG. 52 is an illustration of the Atto-Services management system, its series of management tools, and associated security management system that feeds into the MOM which is an embodiment of this invention.

As shown in FIG. 52 which is an embodiment of this invention, Attobahn Atto-Services Management System (ASMS) is located at the three Global Network Control Center (GNCC) in New York, London, and Sydney. The GNCC technicians manage the ASMS to remotely configure and control the APPI logical ports assignment, activate and deactivate them into and out of service as needed on each ROVER. The ASMS monitors the following applications and services performance:

1. Video APPs operational statistics—the ASMS monitors the video traffic 701A for the following services:

A. 4K/5K/8K Video
B. Broadcast TV Video
C. 3D Video
D. New release movies

These video APPs traverse logical ports 7, 10, 11, and 12 as illustrated in FIGS. 6 and 16.0, and keep track of the latency between the client and server APPs across the network. Performance statistics such as:

APPs request process time between hosts
video download times
video service interruptions 2. Atto View Dashboard 701B user interface which traverses logical port 17 is monitored by the ASMS to capture the performance for the Habitual Services; Ads presentations statistics; Games APPs access and quality of service in terms of response time between players and games servers; Virtual Reality real-time service performance in terms of service access, latency between Cloud-based VR Servers and user googles, etc.
3. Broadcast Stereo Audio APP 701C quality is monitored and if the signal-to-noise ratio deteriorates below a certain value, it is reported with an alarm to the ASMS system.
4. The Application Encryption system 701D end-to-end performance and private key management is monitored and reported to the ASMS.
5. Voice Calls and High Speed Data APPs 701E which traverse logical ports 6, 14-16, 18-29 and future ports 129-512 are monitored and their latency between the client and server hosts across the network are monitored. Performance statistics such as:

APPs request process time between hosts
download times
service interruptions
Voice calls quality
BER 6. The Personal Social Media, Cloud, Infotainment, and Info-Mail which traverse logical ports 2, 3, 4, and 5 are constantly monitored for quality of service, APPs performance statistics, and overall service availability and uptime.
7. ASMS Security Management: Access to the ASMS system is managed by the Attobahn Security Management department within three GNCC. Access list, user authentication, and level of system uses is provided through the Attobahn Security Management System 708 which is an embodiment of this invention.

The ASMS monitors information from the Attobahn APPs & Security Directory, APPI, and logical ports and develop performance statistics from these information inputs to determine the quality of the service across the network.

Rovers Network Management System

Figure 53:
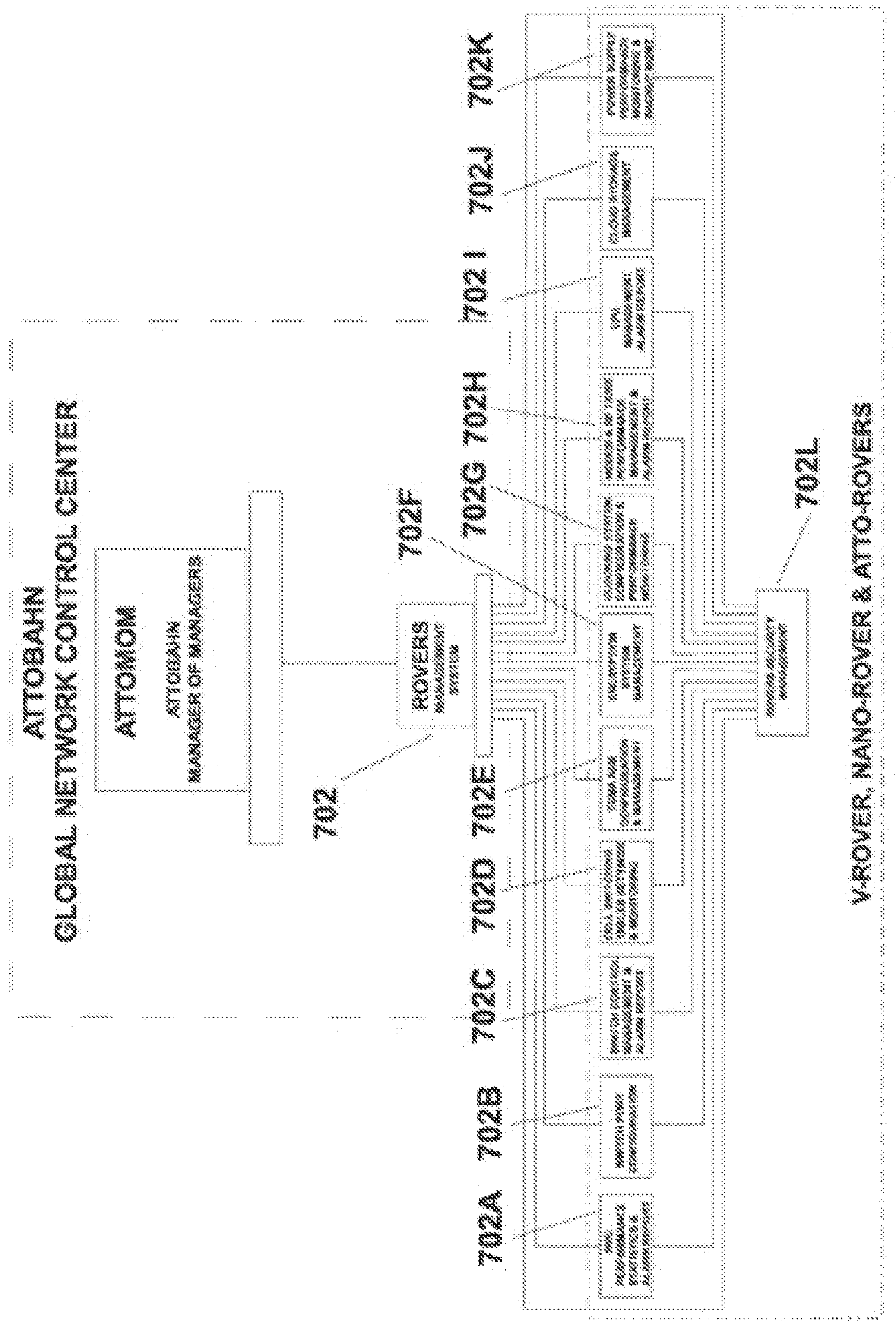
FIG. 53 is an illustration of the V-ROVERs/Nano-ROVERs/Atto-ROVERs management system, its series of management tools, and associated security management system that feeds into the MOM which is an embodiment of this invention.

FIG. 53 shows the ROVERs Network Management System (RNMS) 702 which is an embodiment of this invention. The RNMS is located at the three GNCCs and is used by the technicians to remotely configure, control, and monitor the real-time performance of the V-ROVERs, Nano-ROVERs, and Atto-ROVERs.

The RNMS is designed with the following functionality:

1. To report the IWIC chip 702A performance statistics such as cell switched per second; average buffer capacity utilization; MAST memory utilization; operating temperature; etc., are captured and sent to the RNMS via the APPI ANMP logical port.
2. Configuration management 702B: The ability to configure the 12-port switch; user interface port speed management; port electrical interface type; WiFi/WiGi system configuration and management.
3. Cell Switch 702C alarm and performance reporting. The BER level, cell address corrupted cell address, buffer overflow, clock synchronization phase shift and jitter; etc., are captured and reported to RNMS at the GNCC via the APPI ANMP logical port. 45
4. Cell Tables 702D updates, configuration, and switching performance monitoring and alarm reporting when these parameters falls below predefined parameters.
5. TDMA ASM 702E configuration, performance management, and alarm reporting.
6. The Encryption system 702F end-to-end link performance and private key management is monitored and reported to the RNMS.
7. The Clocking System 702G configuration, management, and performance statistics are allowed, captured and reported. Performance information such as clock jitter specifications, clock slips, and signal-to-noise ratio based upon predefined parameters.
8. Modem & RF Transmit/Receive systems 702H configuration, management, and performance statistics are allowed, captured and reported. Performance information such as signal-to-noise (S/N) specifications; BER; etc., and associated alarm and circuitry failure reporting.
9. CPU Processor 702I Management & Alarm Reporting. Performance information such as CPU utilization; memory utilization; processes in use; uptime; services in use; social media memory utilization; processors in use, cache utilization; speed; etc., from each ROVER, will be submitted to the RNMS located at the GNCCs.
10. Cloud Storage 702K configuration and management. Performance data such as memory utilization; info-mail storage, social media storage; phone contact storage; movies/video storage; etc., are sent to the RNMS at the GNCCs.
11. Power Supply 702K performance monitoring and backup management.
12. RNMS Security Management 702L: Access to the RNMS system is managed by the Attobahn Security Management department within the three GNCCs. Access list, user authentication, and level of system uses is provided through the Attobahn Security Management System 708 which is an embodiment of this invention.

Protonic Network Management System

Figure 54:
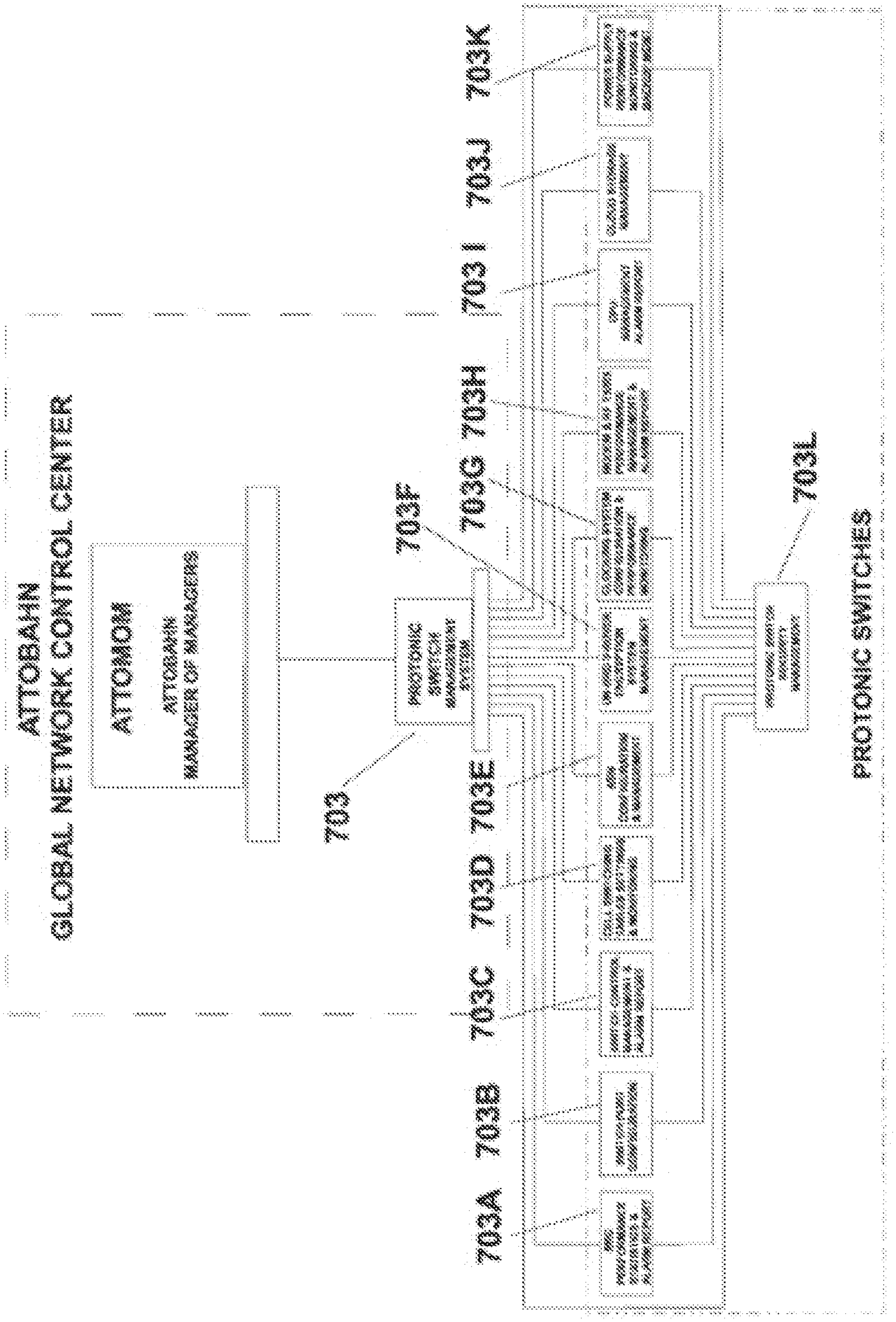
FIG. 54 is an illustration of the Protonic Switches management system, its series of management tools, and associated security management system that feeds into the MOM which is an embodiment of this invention.

FIG. 54 shows the Protonic Network Management System (PNMS) 703 which is an embodiment of this invention. The PNMS is located at the three GNCCs and is used by the technicians to remotely configure, control, and monitor the real-time performance of the Protonic Switches.

The PNMS is designed with the following functionality:

1. To report the IWIC chip 703A performance statistics such as cell switched per second; average buffer capacity utilization; MAST memory utilization; operating temperature; etc., are captured and sent to the PNMS via the APPI ANMP logical port.
2. Configuration management 703B: The ability to configure the 16×1 TBps-port switch; local V-ROVER user interface port speed management; port electrical interface type; WiFi/WiGi system configuration and management.
3. Cell Switch 703C alarm and performance reporting. The BER level, cell address corrupted cell address, buffer overflow, clock synchronization phase shift and jitter; etc., are captured and reported to PNMS at the GNCC via the APPI ANMP logical port. 45
4. Cell Tables 703D updates, configuration, and switching performance monitoring and alarm reporting when these parameters falls below predefined parameters.
5. TDMA ASM 703E configuration, performance management, and alarm reporting.
6. The Encryption system 703F end-to-end link performance and private key management is monitored and reported to the PNMS.
7. The Clocking System 703G configuration, management, and performance statistics are allowed, captured and reported. Performance information such as clock jitter specifications, clock slips, and signal-to-noise ratio based upon predefined parameters.
8. Modem & RF Transmit/Receive systems 703H configuration, management, and performance statistics are allowed, captured and reported. Performance information such as signal-to-noise (S/N) specifications; BER; etc., and associated alarm and circuitry failure reporting.
9. CPU Processor 703I Management & Alarm Reporting. Performance information such as CPU utilization; memory utilization; processes in use; uptime; services in use; social media memory utilization; processors in use, cache utilization; speed; etc., from each Protonic Switch, will be submitted to the PNMS located at the GNCCs.
10. Cloud Storage 703K configuration and management. Performance data such as memory utilization; info-mail storage, social media storage; phone contact storage; movies/video storage; etc., are sent to the PNMS at the GNCCs.
11. Power Supply 703K performance monitoring and backup management.
12. PNMS Security Management 703L: Access to the PNMS system is managed by the Attobahn Security Management department within the three GNCCs. Access list, user authentication, and level of system uses is provided through the Attobahn Security Management System 708 which is an embodiment of this invention.

Nucleus Network Management System

Figure 55:
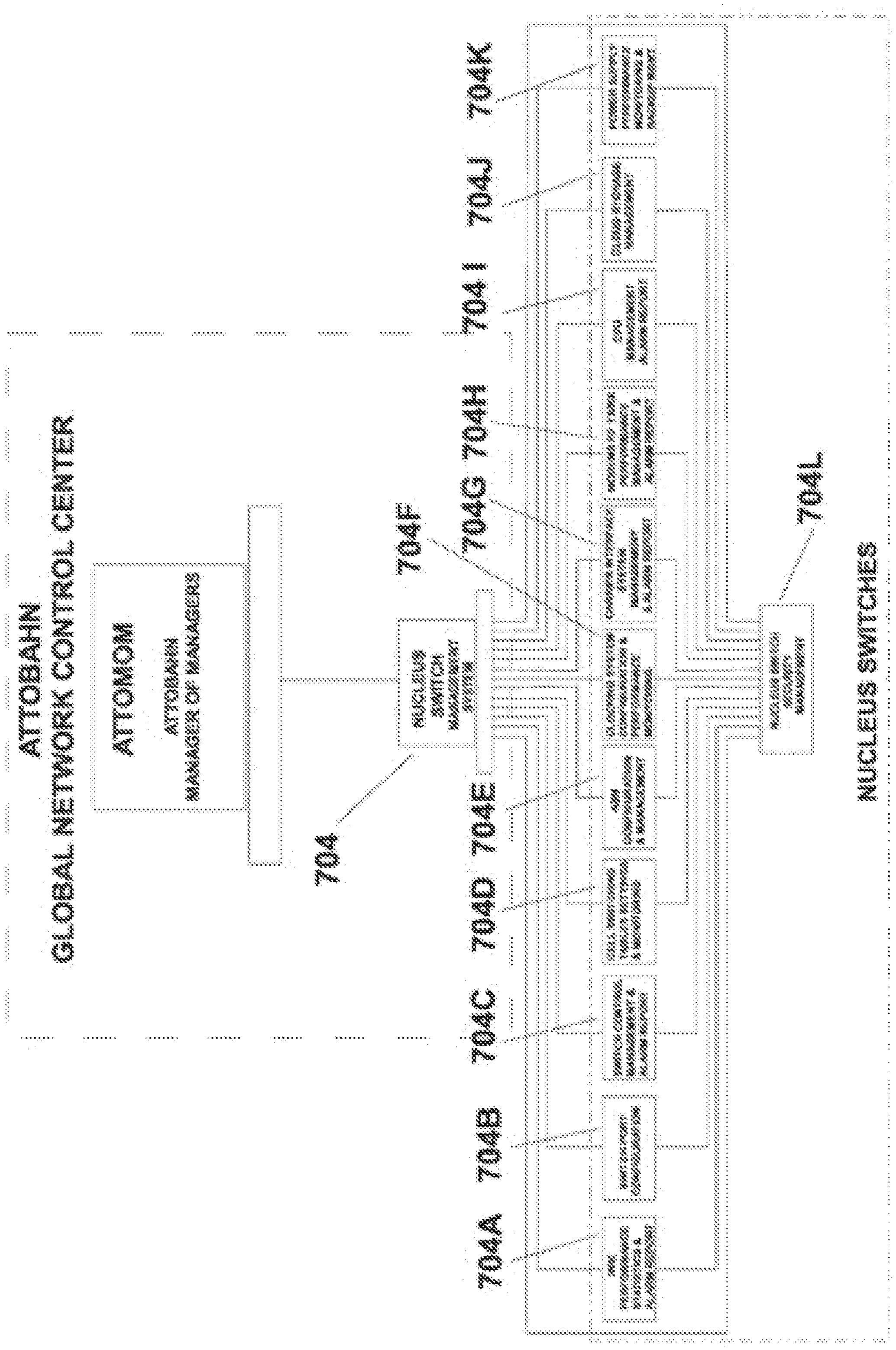
FIG. 55 is an illustration of the Nucleus Switches management system, its series of management tools, and associated security management system that feeds into the MOM which is an embodiment of this invention.

FIG. 55 shows the Nucleus Network Management System (NNMS) 704 which is an embodiment of this invention. The NNMS is located at the three GNCCs and is used by the technicians to remotely configure, control, and monitor the real-time performance of the Protonic Switches.

The NNMS is designed with the following functionality:

1. To report the IWIC chip 704A performance statistics such as cell switched per second; average buffer capacity utilization; MAST memory utilization; operating temperature; etc., are captured and sent to the NNMS via the APPI ANMP logical port.
2. Configuration management 704B: The ability to configure the 96×1 TBps-port switch; port speed management; and port system configuration and management.

3. Cell Switch 704C alarm and performance reporting. The BER level, cell address corrupted cell address, buffer overflow, clock synchronization phase shift and jitter; etc., are captured and reported to NNMS at the GNCC via the APPI ANMP logical port. 45
4. Cell Tables 704D updates, configuration, and switching performance monitoring and alarm reporting when these parameters falls below predefined parameters.
5. TDMA ASM 704E configuration, performance management, and alarm reporting.
6. The Encryption system 704F end-to-end link performance and private key management is monitored and reported to the NNMS.
7. The Clocking System 704G configuration, management, and performance statistics are allowed, captured and reported. Performance information such as clock jitter specifications, clock slips, and signal-to-noise ratio based upon predefined parameters.
8. Modem & RF Transmit/Receive systems 704H configuration, management, and performance statistics are allowed, captured and reported. Performance information such as signal-to-noise (S/N) specifications; BER; etc., and associated alarm and circuitry failure reporting.
9. CPU Processor 704I Management & Alarm Reporting. Performance information such as CPU utilization; memory utilization; processes in use; uptime; services in use; social media memory utilization; processors in use, cache utilization; speed; etc., from each Nucleus Switch, will be submitted to the NNMS located at the GNCCs.
10. Cloud Storage 704K configuration and management. Performance data such as memory utilization; info-mail storage, social media storage; phone contact storage; movies/video storage; etc., are sent to the NNMS at the GNCCs.
11. Power Supply 704K performance monitoring and backup management.
12. NNMS Security Management 704L: Access to the NNMS system is managed by the Attobahn Security Management department within the three GNCCs. Access list, user authentication, and level of system uses is provided through the Attobahn Security Management System 708 which is an embodiment of this invention.

Millimeter Wave RF Management System

Figure 56:
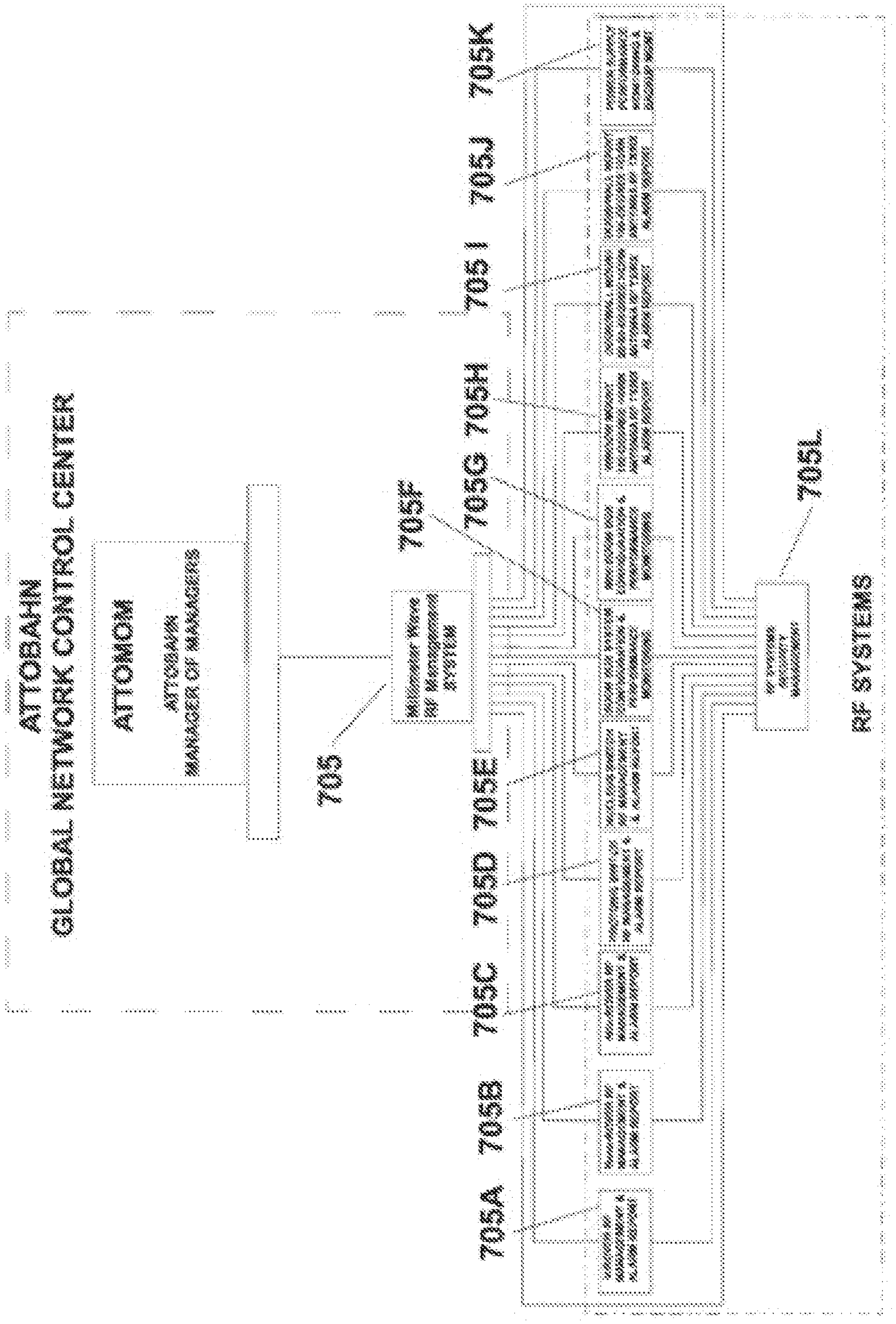
FIG. 56 is an illustration of the Millimeter Wave RF management system, its series of management tools, and associated security management system that feeds into the MOM which is an embodiment of this invention.
Figure 57:
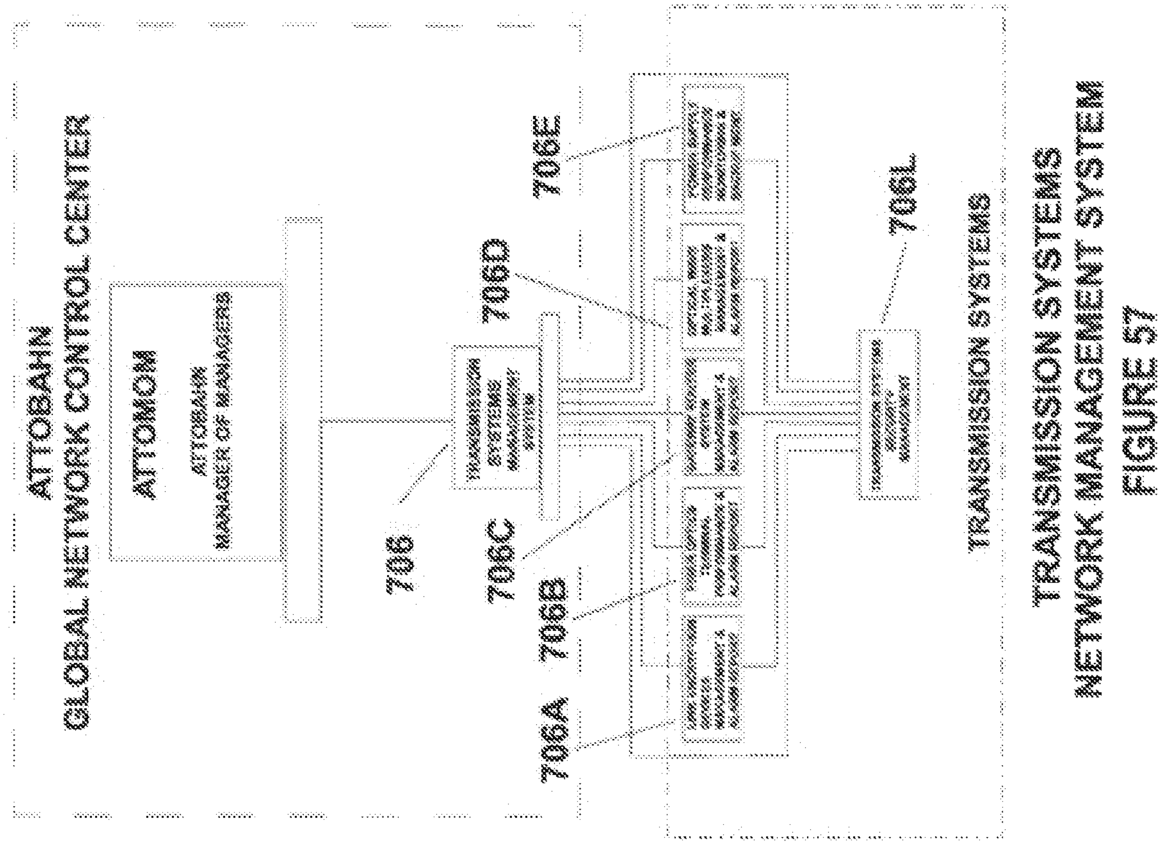
FIG. 57 is an illustration of the Transmission Systems (Fiber Optic Terminals, Fiber Optic Multiplexers, Fiber Optic Switches, Satellite Systems) management system, its series of management tools, and associated security management system that feeds into the MOM which is an embodiment of this invention.

FIG. 56 shows the Millimeter Wave RF Management System (MRMS) 705 which is an embodiment of this invention. The MRMS is located at the three GNCCs and is designed with following functionality:

1. The V-ROVER millimeter wave RF 705A transmitter amplifier output power level is monitored and reported to the MRMS at the GNCCs via the ANMP logical port. The signal-to-noise (S/N) ratio of the V-ROVER RF receiver Low Noise Amplifier (LNA) is monitored by the MRMS and when it falls beneath a certain threshold, an alarm is generated for the GNCCs technicians to take action to fix the problem before it deteriorates to the point of failure.
2. The Nano-ROVER millimeter wave RF 705B transmitter amplifier output power level is monitored and reported to the MRMS at the GNCCs via the ANMP logical port. The signal-to-noise (S/N) ratio of the Nano-ROVER RF receiver Low Noise Amplifier (LNA) is monitored by the MRMS and when it falls beneath a certain threshold, an alarm is generated for the GNCCs technicians to take action to fix the problem before it deteriorates to the point of failure.
3. The Atto-ROVER millimeter wave RF 705C transmitter amplifier output power level is monitored and reported to the MRMS at the GNCCs via the ANMP logical port. The signal-to-noise (S/N) ratio of the Atto-ROVER RF receiver Low Noise Amplifier (LNA) is monitored by the MRMS and when it falls beneath a certain threshold, an alarm is generated for the GNCCs technicians to take action to fix the problem before it deteriorates to the point of failure.
4. The Protonic Switch millimeter wave RF 705D transmitter amplifier output power level is monitored and reported to the MRMS at the GNCCs via the ANMP logical port. The signal-to-noise (S/N) ratio of the Protonic Switch RF receiver Low Noise Amplifier (LNA) is monitored by the MRMS and when it falls beneath a certain threshold, an alarm is generated for the GNCCs technicians to take action to fix the problem before it deteriorates to the point of failure.
5. The Nucleus Switch millimeter wave RF 705E transmitter amplifier output power level is monitored and reported to the MRMS at the GNCCs via the ANMP logical port. The signal-to-noise (S/N) ratio of the Nucleus Switch RF receiver Low Noise Amplifier (LNA) is monitored by the MRMS and when it falls beneath a certain threshold, an alarm is generated for the GNCCs technicians to take action to fix the problem before it deteriorates to the point of failure.
6. The GYRO TWA Boom Box 705F high power tube, cathode and collector section circuitry performance and temperature control operating specifications are monitored by the MRMS. The MRMS monitors the TWA water cooling system and report the fluid temperature to the GNCCs.
7. The GYRO TWA Mini Boom Box 705G high power tube, cathode and collector section circuitry performance and temperature control operating specifications are monitored by the MRMS. The MRMS monitors the TWA water cooling system and report the fluid temperature to the GNCCs.
8. The Window Mount mmW 180-Degree Horn Antenna Repeater RF Amplifier 705H signal-to-noise (S/N) ratio is monitored by the MRMS at GNCCs.
9. The Door/Wall Mount mmW 20-60-Degree Horn Antenna Repeater RF Amplifier 705I signal-to-noise (S/N) ratio is monitored by the MRMS at GNCCs.
10. The Door/Wall Mount mmW 180-Degree Horn Antenna Repeater RF Amplifier 705J signal-to-noise (S/N) ratio is monitored by the MRMS at GNCCs.
11. The Gyro TWA Boom Box and Mini Boom Box Power Supply 705K performance monitoring and backup management information is sent to the MRMS at the GNCCs.
12. MRMS Security Management 705L: Access to the NRMS system is managed by the Attobahn Security Management department within the three GNCCs. Access list, user authentication, and level of system uses is provided through the Attobahn Security Management System 708 which is an embodiment of this invention. Transmission System Management System FIG. 57 shows the Transmission System Management System (TSMS) 706 is located at the three GNCCs which is an embodiment of this invention. The functional capabilities of the TSMS is as follows:

1. The standalone Link Encryption 40 GBps devices 706A between the digital 40 GBps links that feeds the OC-768 Fiber Optic Terminals (FOTs) configuration management and performance statistics reporting messaging are controlled by the TSMS. These standalone Encryption devices operational performance alarm messages will be capture by the TSMS.
2. The Fiber Optic terminals (FOTs) 706B configuration and alarm reporting information will be controlled by the TSMS. The TSMS will monitor the BER, buffer overload, clock slips, and network link outages which will allow the GNCCs' technicians to proactively fix degraded systems and facilities before they become network outages.
3. The Gateway Routers 706C that interface the Nucleus Switches and the Internet are configured and managed by TSMS at the GNCCs.
4. The Optical Wave Multiplexers 706D that fed the FOTs are configured and managed by the TSMS at the GNCCs.
5. TSMS Security Management 706E: Access to the TSMS system is managed by the Attobahn Security Management department within the three GNCCs. Access list, user authentication, and level of system uses is provided through the Attobahn Security Management System 708 which is an embodiment of this invention.

Clocking & Synchronization Management System

Figure 58:
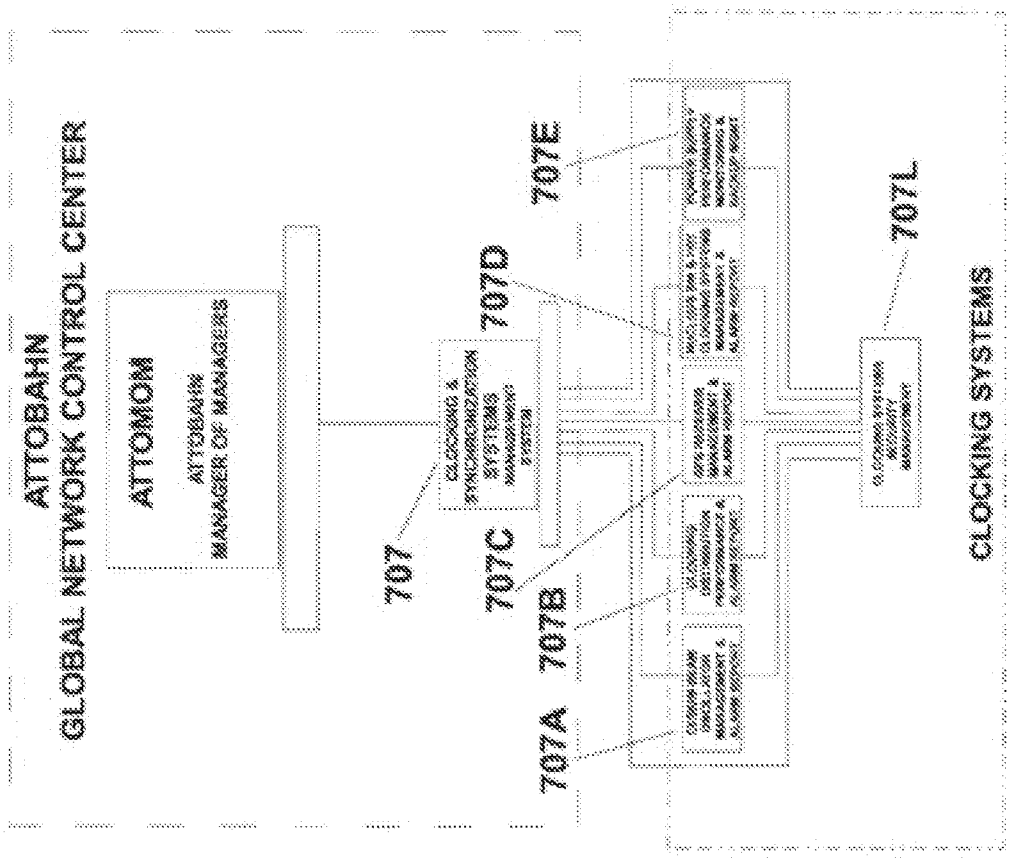
FIG. 58 is an illustration of the Clocking & Synchronization Systems management system, its series of management tools, and associated security management system that feeds into the MOM is an embodiment of this invention.

FIG. 58 illustrates the Attobahn Clocking & Synchronization Management System (CSMS) 707 which is an embodiment of this invention is located at the three GNCCs. The CSMS is designed with the following functional capabilities:

1. The Cesium. Beam Oscillator 707A is configured, controlled, and managed by the CSMS. The CSMS monitors the oscillator system clock output stability, temperature control in real-time and keep track of clock accuracy stability. If the clock stability drops beneath predefined levels, the CSMS receives system degradation alarms.
2. The Clocking Distribution System (CDS) 707B is configured, controlled, and managed by the CSMS. The alarm messages from the CDS are sent to the CSMS which are collocated together at the GNCCs.
3. The redundant and diverse GPS receivers 707C are configured, controlled, and managed by the CSMS. The alarm messages from the GPS systems are sent to the CSMS which are collocated together at the GNCCs.
4. The Global Gateway Nucleus Switches and the National FOTs 707D and their Optical Wave multiplexers are the first phase of the network that are fed by the Cesium Beam GPS reference clocking system. These global and national level systems are clocking and synchronization are monitored in real-time and their clock stability is tracked continuously by the CSMS. If the stability of these clock signals deteriorates, then alarms are generated and sent to the CSMS.
5. The clocking and synchronization system primary and backup power supplies 707E are monitored by the CSMS. If the power supplies performance deteriorates, then alarm messages are sent to the CSMS.
6. CSMS Security Management 706E: Access to the CSMS system is managed by the Attobahn Security Management department within the three GNCCs. Access list, user authentication, and level of system uses is provided through the Attobahn Security Management System 708 which is an embodiment of this invention.

Attobahn Millimeter Wave RF System Architecture

Figure 59:
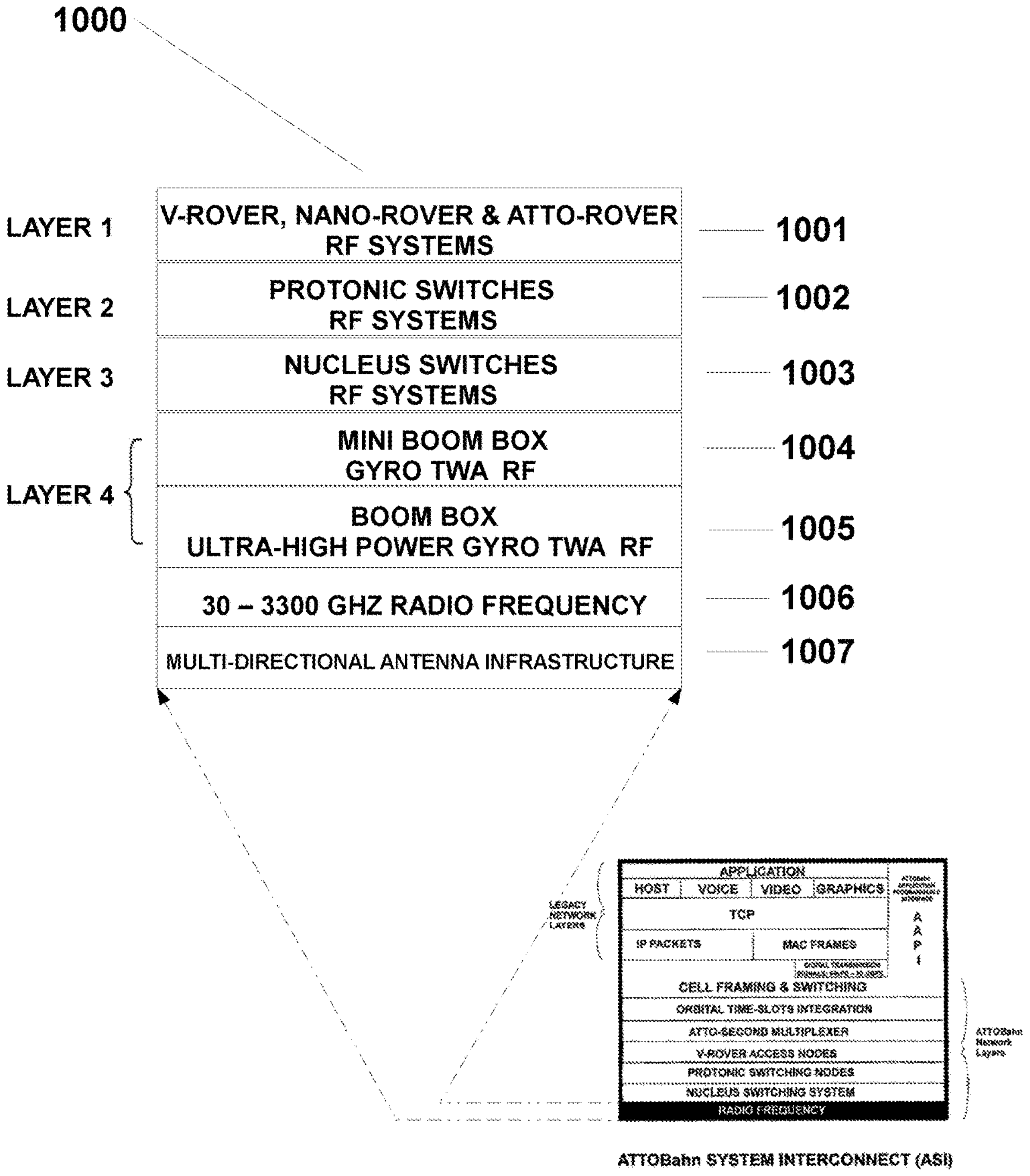
FIG. 59 is an illustration of Attobahn Millimeter Wave Radio Frequency (RF) network transmission architecture that displays its functional layers from the ultra-power Boom Box Gyro TWA to the low power repeater antennae in the end user devices which is an embodiment of this invention.

FIG. 59 shows the Attobahn Millimeter Wave (mmW) Radio Frequency (RF) transmission architecture 1000 which is an embodiment of this invention. The Attobahn mmW RF Architecture is based on high frequency electromagnetic radio signals, operating at the ultra-high end of the millimeter wave band and into the infrared band. The frequency band is in the order of 30 to 3300 gigahertz (GHz) range 1006, at the upper end of the millimeter wave spectrum and into the infrared spectrum. The upper end of this band between 200 to 3300 GHZ allocation is outside the commonly used FCC operating bands, thus allowing the Viral Molecular Network to utilize a wide bandwidth for its terabits digital stream.

Figure 60:
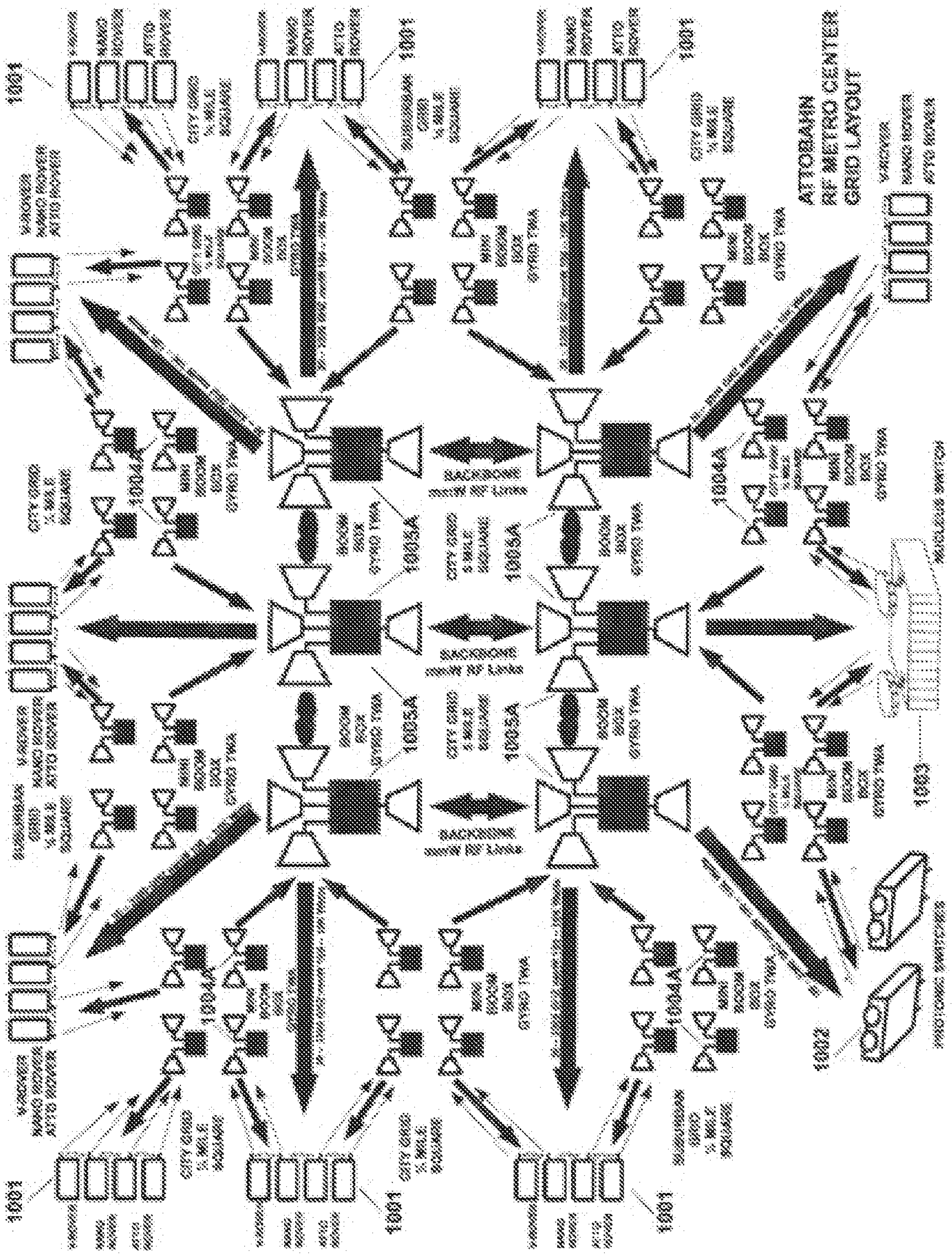
FIG. 60 is an illustration of the Attobahn Millimeter Wave RF Metro Center Grid Layout of its Boom Box Gyro TWAs and Mini Boom Box Gyro TWAs in various ¼-mile squares configuration with a city or suburban areas which is an embodiment of this invention.

The Attobahn RF transmission system architecture 1000 is shown in FIG. 58.0. The architecture consists of the following RF layers:

1. LAYER I: Attobahn Viral Orbital Vehicles (V-ROVERs, Nano-ROVERs, and Atto-ROVERs) RF systems 1001.
2. LAYER II: The Protonic Switches RF systems 1002.
3. LAYER III: Nucleus Switches RF systems 1003.
4. LAYER IV: Ultra High Power (UHP) Gyro Traveling Wave Tube Amplifier (TWA) RF systems, called the Boom Box layer 1004 (Mini Boom Box) and 1005 (Boom Box). Attobahn mmW Strategic Transmission Infrastructure Attobahn RF transmission systems architecture Layers I to III sits on top of Layer IV, Ultra High Power (UHP) Gyro Traveling Wave Tube Amplifier (TWA) RF systems called the Boom Box layer 1005 as illustrated in FIG. 60. The Boom Box 1004 and 1005 layer is common to the other three RF transmission layers.

As illustrated in FIG. 60 which is an embodiment of this invention, ROVERs 1001 RF signals are received by each Gyro TWA Mini Boom Box RF 1004 receiver within that Gyro TWA Mini Boom Box's grid 1004A and amplified to 1.5 watts to 100 watts. These amplified RF signals are retransmitted and is received by the larger UHP Gyro TWA Boom Box 1005 within its Boom Box grid 1005A, where they are further amplified to as much 10,000 watts. These UHP RF signals are retransmitted to the Protonic Switches RF systems 1002 and other ROVERs RF systems 1001 anywhere within that UHP Gyro TWA Boom Box grid 1005A.

The Protonic Switches RF systems 1002 receive the mmW RF signals. These switches demodulate the 1-Q QAM signals into their original high speed digital signals, sent them to the TDMA ASM, where the TDMA time-slots and subsequent ASM OTS are demultiplex and the data stream is fed into the cell switch. The cell switch distributes the high-speed cells to their appropriate ports that feed the high capacity links to the Nucleus Switches. The Protonic Switch RF amplifiers transmit the mmW signals to the Mini Boxes grid 1004A that serves its molecular domain. The Gyro TWA Mini Boom Box 1004A receives, amplifies, and retransmits the mmW RF signal to the UHP Gyro TWA Boom Box grid 1005A. The Boom Box retransmits the RF signal to the Nucleus Switch.

The strategic configurations of the Mini Boom Boxes and the Boom Boxes into city and suburban high power mmW transmission grids is key to the reliability performance of Attobahn mmW network infrastructure.

mmW RF High Power Grid Matrix

Figure 61:
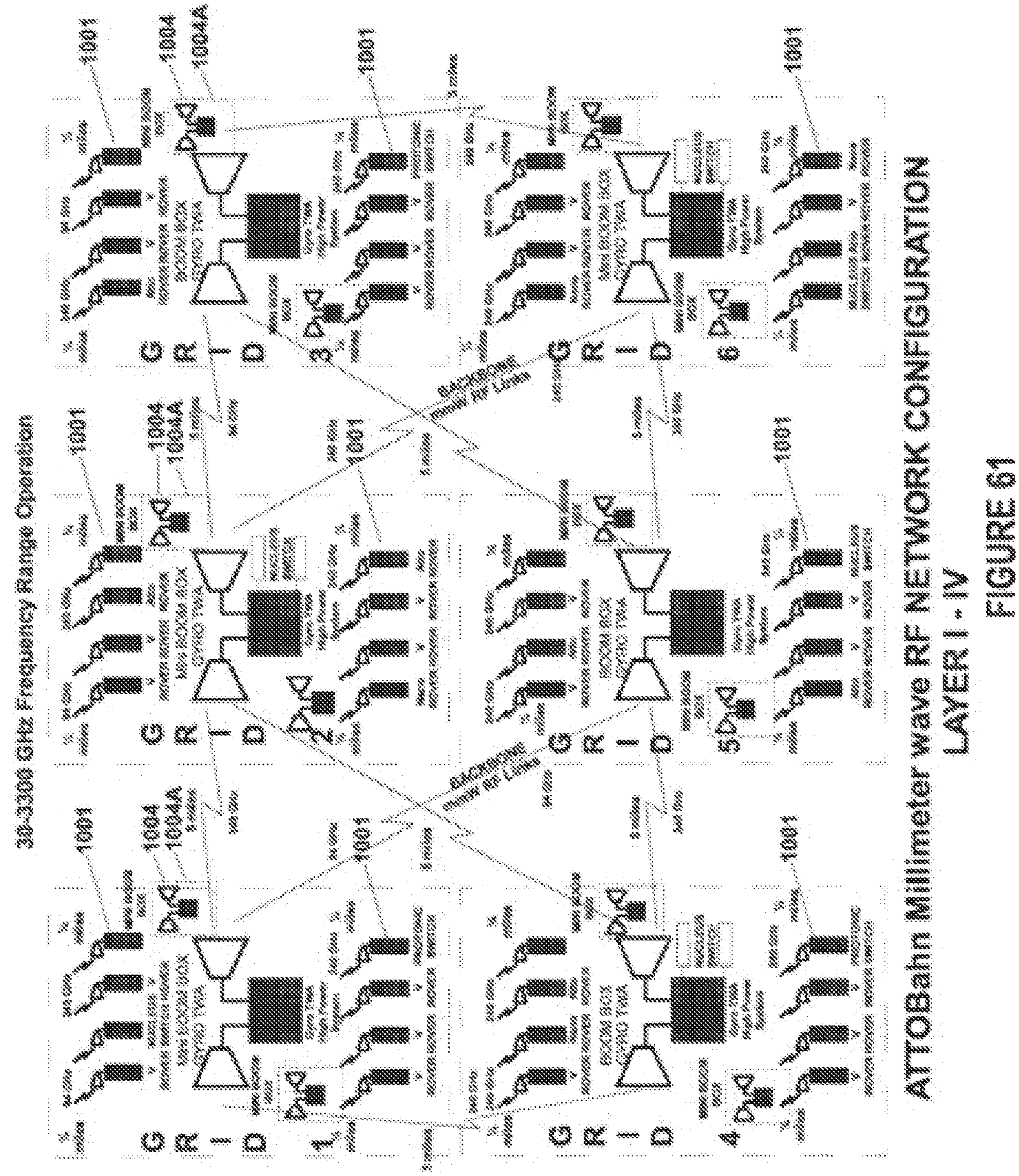
FIG. 61 is an illustration of the Attobahn Millimeter Wave RF Network Configuration of its Boom Box Gyro TWAs and Mini Boom Box Gyro TWAs in various 5-mile squares grids and ¼-mile squares grids respectively; V-ROVERs, Nano-ROVERs, Atto-ROVERs, Protonic Switches, and Nucleus Switches which is an embodiment of this invention.

FIG. 61 illustrates the Attobahn mmW High Power Grid Matrix (HPGM) 1000 which is an embodiment of this invention. The HPGM is architected and designed with end-to-end service reliability as its primary goal. The Attobahn mmW HPGM technical strategy is keep these delicate RF signals power levels high, to mitigate the natural atmospheric attenuating phenomenon associated with mmW transmission. To solve the physics of this phenomenon, the HPGM is designed with the Mini Boom Box grids 1004A output power saturating ¼ mile city and suburban street blocks, and the UHP Boom Box grids 1005A output power dominating 5-mile grids around cities and suburban areas.

The Gyro TWA Mini Boom Box 1004 and the Gyro TWA Boom Box 1005 amplify the mmW signals from 1.5 to 10,000 watts respectively. The mmW RF signals from the ROVERs RF system 1001, Protonic Switches RF systems 1002, and Nucleus Switches RF systems 1003 are placed into the Mini Boom Boxes smaller grids within 300 feet to ¼ mile matrices and all ROVERs within these grids can easily communicate with each other in this arrangement.

The larger Boom Boxes grids that cover ¼-mile to 5-mile matrices allow the lower transmitting power of the ROVER, Protonic Switches, and Nucleus Switches RF signals to reach further and provide reliable signal strength for the entire network to function in the 99.9% reliability percentage. The mmW RF transmission are increased to very long distances by using the Backbone Gyro TWA Boom Boxes as shown in FIGS. 59.0, 60.0, 69.0, 71.0 and 73.0. This engineering HPGM architecture is essential for the operation of Attobahn Viral Molecular Network.

Gyro TWA System

The Attobahn network has utilize Gyro TWA High Power and Ultra High Power mmW amplifiers called Mini Boom Boxes and Boom Boxes respectively. These Gyro TWAs are distributed and connected in such fashion that they guaranty the delivery of the mmW waves at great distance compared to silicon and GAN types amplifiers.

Figure 62:
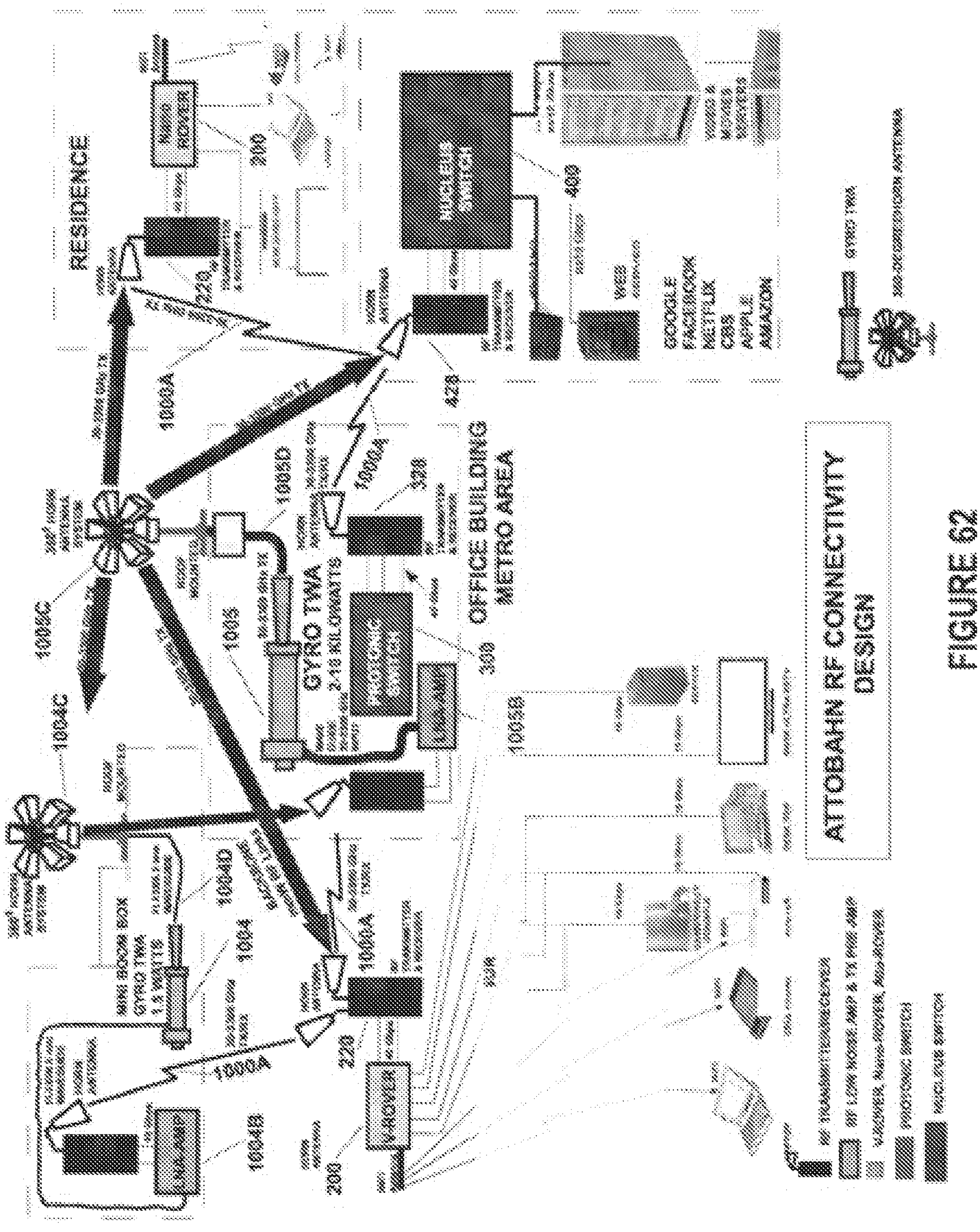
FIG. 62 is an illustration of the millimeter wave RF connectivity from the V-ROVERs, Nano-ROVERs, and Atto-ROVERs to the Mini Boom Boxes Gyro TWAs; Protonic Switches and Nucleus Switches RF transmission to the Mini Boom Boxes Gyro TWAs; the Mini Boxes Gyro TWAs RF transmission to the Boom Boxes Gyro TWAs; and the Boom Boxes Gyro TWAs RF transmission to the V-ROVERs, Nano-ROVERs, Atto-ROVERs, Protonic Switches, and Nucleus Switches which is an embodiment of this invention.

FIG. 62 shows the engineering design configuration of the GyroTWAs 1004 and 1005 which is an embodiment of this invention, the connected method of their terrestrial satellite-like repeater arrangement, and their horn antenna structure 1004B and 1004C. The Mini Boom Boxes and Boom Boxes are strategically located on building roofs, house roofs, utility poles, utility towers, etc.

The strategic positions of the TWAs allow them to receive the mmW RF signals from ROVERs, Protonic Switches, and Nucleus Switches and retransmit these amplified signals to these devices. Each TWA is accompanied with a LNA mmW receiver 1005B, that receives the mmW RF signals 1000A from the ROVERs 200, Protonic Switches 200, and Nucleus Switches 300. As shown in FIG. 62 and feed these signals into the Gyro TWA Boom Box 1005. The signal is amplified and sent to the 360-degree feed horn 1005C after traversing the mmW waveguide 1005D.

The Gyro TWA Mini Boom Box is equipped with a mmW LNA RF receiver 1004B, that receives the mmW RF signals 1000A from the ROVERs 200, Protonic Switches 300, and the Nucleus Switches 400. As shown in FIG. 62 and feed these signals into the Gyro TWA Mini Boom Box 1004. The signal is amplified and sent to the 360-degree feed horn 1004C after traversing the mmW waveguide 1004D.

As shown in FIG. 62 which is an embodiment of this invention, the ROVERs 220, Protonic Switches 328, and Nucleus Switches 428 mmW transmitter amplifiers 220 handle frequency range from 30 GHz to 3300 GHz. The LNA receivers receive the UHP mmW RF signals from the Boom Box and the Mini Boxes, depending on the S/N of their received signals. The LNA receiver are designed to select the stronger signal that its receives and pass in to its QAM demodulator.

Attobahn mmW RF 4-8KTV & HD Radio Broadcast Services 4-8K TV Broadcast

Figure 63:
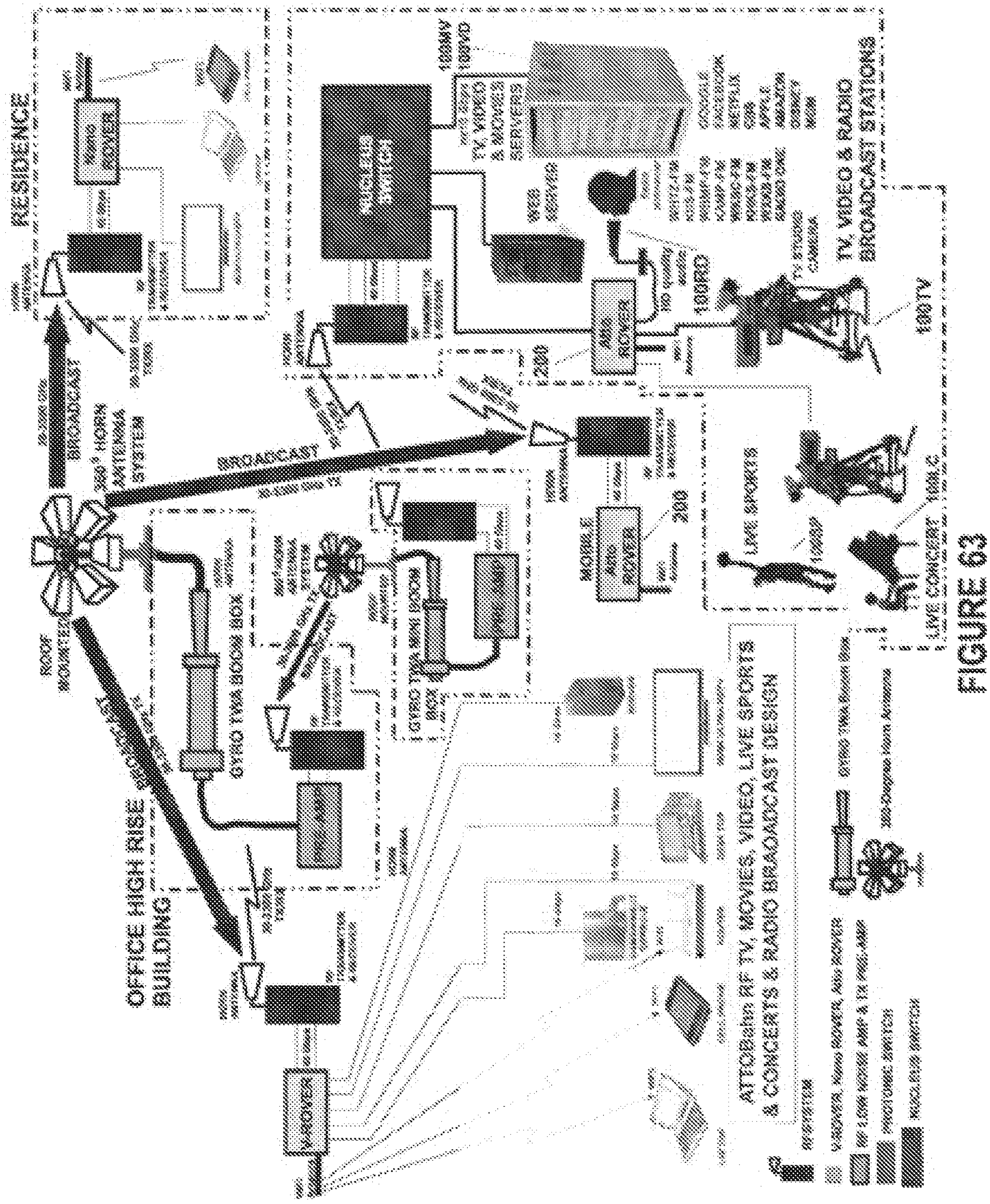
FIG. 63 is an illustration of the millimeter wave RF Broadcast Transmission services from the Boom Boxes Gyro TWAs to V-ROVERs, Nano-ROVERs, and Atto-ROVERs which is an embodiment of this invention.

FIG. 63 shows the Attobahn mmW TV & Radio Broadcast Transmission network infrastructure which is an embodiment of this invention. The 4-8K TV Broadcast services APP 110 is sent to the Atto-ROVER APPI logical port 10. The 4-8K TV Broadcast digital stream from its 4-8K TV camera 100TV is clocked into the Atto-ROVER 200 at 10 GBps. The cell switch sends out the Broadcast TV via its mmW RF transmitter 220.

The Atto-ROVER RF transmitted signal 1000A is sent to the Gyro TWA Mini Boom Box 1004 where it is amplified and retransmitted to the Gyro TWA boom Box 1005. The Boom Box amplifies the TV Broadcast signal and transmits it at 10,000 watts into the surrounding area. Any V-ROVER, Nano-ROVER, or Atto-ROVER within that broadcast grid can receive the Broadcast TV signal.

The 4-8K TV Broadcast signal transmission range is extended for miles by feeding it through Attobahn Backbone Gyro TWA UHP Boom Boxes ad illustrated in FIGS. 60.0, 61.0, 70.0, 72.0, and 74.0 which are embodiments of this invention.

Broadcast Movies, Videos, Live 3D-Sports & Concerts

FIG. 63 shows the Attobahn mmW TV & Movies, Videos, and 3D Live-Sports & Live-Concerts Broadcast Transmission network infrastructure which is an embodiment of this invention. The Movies, Videos, and Live-Sports & Live-Concerts Broadcast services APP 121, 122, 111, and 124 are sent to the Atto-ROVER APPI logical port 21, 22, 11, and 24. The 4-8K Movies, Videos, and 3D Live 4-8K Video and accompanying HD Audio Broadcast digital streams from its Movies and Videos servers, and Live-Sports & Live-Concert feeds 100MV, 100VD, 100SP, and 100LC respectively, are clocked into the Atto-ROVER 200 at 10 GBps per signal. The cell switch sends out the Movies and Videos servers, and Live-Sports & Live-Concert feeds broadcast signals via its mmW RF transmitter 220.

The Atto-ROVER RF transmitted signal 1000A is sent to the Gyro TWA Mini Boom Box 1004 where it is amplified and retransmitted to the Gyro TWA boom Box 1005. The Boom Box amplifies the mmW TV & Movies, Videos, and 3D Live-Sports & Live-Concerts Broadcast signals and transmits them at 10,000 watts into the surrounding area. Any V-ROVER, Nano-ROVER, or Atto-ROVER within that broadcast grid can receive the Broadcast TV signal.

The 4-8K Movies, Videos, Live 4-8K Video and accompanying HD Audio Broadcast digital streams from its Movies and Videos servers, and Live-Sports & Live-Concert Broadcast signals transmission range is extended for miles by feeding them through Attobahn Backbone Gyro TWA UHP Boom Boxes ad illustrated in FIGS. 60.0, 61.0, 70.0, 72.0, and 74.0 which are embodiments of this invention.

HD Audio Radio Broadcast

FIG. 63 shows the Attobahn mmW TV & Radio Broadcast Transmission network infrastructure which is an embodiment of this invention. The HD (44 KHZ-96 KHZ) Audio Radio Broadcast services APP 120 is sent to the Atto-ROVER APPI logical port 20. The HD Audio Radio Broadcast digital stream from the Radio Station announcer 100RD is clocked into the Atto-ROVER 200 at 10 GBps. The cell switch sends out the Broadcast Radio signal via its mmW RF transmitter 220.

The Atto-ROVER RF transmitted signal 1000A is sent to the Gyro TWA Mini Boom Box 1004 where it is amplified and retransmitted to the Gyro TWA boom Box 1005. The Boom Box amplifies the HD Audio Broadcast signal and transmits it at 10,000 watts into the surrounding area. Any V-ROVER, Nano-ROVER, or Atto-ROVER within that broadcast grid can receive the HD Audio Broadcast signal.

The HD Audio Broadcast signal transmission range is extended for miles by feeding it through Attobahn Backbone Gyro TWA UHP Boom Boxes ad illustrated in FIGS. 60.0, 61.0, 70.0, 72.0, and 74.0 which are embodiments of this invention.

Rovers, Protonic Switch & Nucleus Switch RF Design

The RF architecture infrastructure grid network design is shown in FIGS. 60.0. As illustrated in FIGS. 40.0, 34.0, 29.0, and 25.0 which is an embodiment of this invention, the RF section of the Viral Orbital Vehicles (V-ROVER, Nano ROVER, and the Atto ROVER), the Protonic switch, and the Nucleus Switch use a broadband 64-4096-bit Quadrature Amplitude Modulation (QAM) modulator and demodulator for its multiple 40 GBps to 1 TBps digital baseband to and from the RF transmitter and receiver respectively.

The ROVERs, Protonic Switches, and Nucleus Switches RF transmitter output power, with the combination of the Gyro TWA Mini Boom Boxes and the Boom Boxes, provide high enough wattage for the RF signals to be received by the devices with a decibel (dB) level that allows the recovered digital stream from the demodulator to be within a Bit Error Rate (BER) range of 1 part of 1,000,000,000 to 1 part of 1,000,000,000,000 (that is one-bit error in every 1 billion to one trillion bits respectively). This ensures that the data throughput is very high over a long-term basis.

RF Transmission Configuration-V-ROVERS to Boom Box

Figure 64:
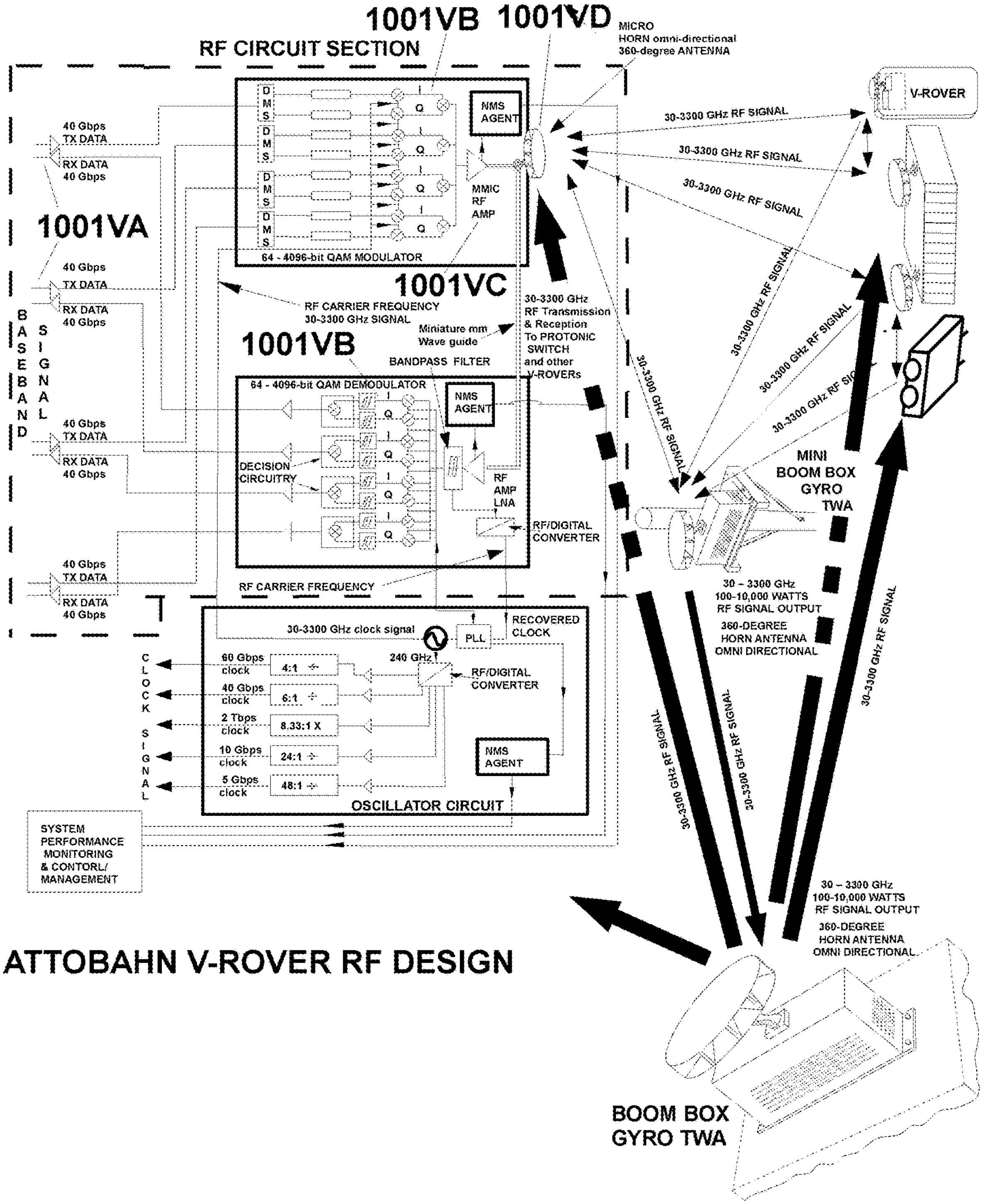
FIG. 64 is an illustration of Attobahn V-ROVERs millimeter wave RF design of its QAM modems; transmitter amplifier; LNA receiver, clocking & synchronization integration into these circuitries; and its 360-degree horn antenna which is an embodiment of this invention.

As illustrated in FIG. 64 which is an embodiment of this invention, the V-ROVERs is equipped with eight (8) physical 10 Gigabits per second (GBps) input/output ports connected to customers' terminating devices such as 4K/8K UHDF TV, computing devices, smart phones, servers, game systems, Virtual Realty devices, etc. These 10 GBps ports are connected to a high-speed switch that has four (4) 40 GBps aggregate digital streams 1001VA connected to four 64-4096-bit Quadrature Amplitude Modulation (QAM) 1001VB modulator/demodulators (modems). Each of the four (4) QAM modulator output RF signals operate in the 30 to 3300 GHz range.

The V-ROVERs four (4) output 30 to 3300 GHz RF signals, each has a bandwidth of 40 GBps. The four (4) 30 to 3300 GHz RF signals are transmitted via Millimeter Monolithic Integrated Circuit (MMIC) RF amplifiers 1001VC. The four (4) output RF signal are transmitted via a mmW 360-degree omni-directional horn antenna 1001VD. The RF signal are transmitted in all directions from the V-ROVERs and are received by the Mini Boom Box and Boom Box 360-degree omni-directional antenna 1004F and 1004G within its grid of 300 feet to ¼ mile. The V-ROVER output RF signal received by the Mini Boom Box or Boom Box is fed into the Gyro TWA Ultra High Power amplifier.

The Mimi Boom Box Gyro TWA Ultra High Power 1004 amplifier amplifies the V-ROVERs received RF signals to 1.5 to 100 Watts and the Boom Box Gyro TWA Ultra High Power amplifier 1005 amplifies these RF signals 500 to 10,000 Watts. The Boom Boxes amplified RF outputs are fed to 360-degree omni-directional horn antennas. The Mini Boom Boxes and the Boom Boxes grids' RF radiations covers radius distances of up to 10 miles and in some cases even further distances depending on atmospheric conditions. These interconnected grids are combined to cover hundreds of miles around suburban areas and between cities.

The transmitted RF signals from the Mini Boom Box and Boom Box is received by the V-ROVERs, Nano-ROVERs, Atto-ROVERs, and Protonic Switches within the Boom Boxes RF grid at an extremely high power level. Therefore, the Boom Boxes act like RF transmission repeaters or terrestrial communications satellites that amplifies the V-ROVERs, Nano-ROVERs, Atto-ROVERs, Protonic Switches, and Nucleus Switches. The Boom Boxes are positioned on buildings (commercial or selected residential buildings) roof tops, communications towers, and aerial drones.

RF Transmission Configuration-Nano-ROVERs to Boom Box

Figure 65:
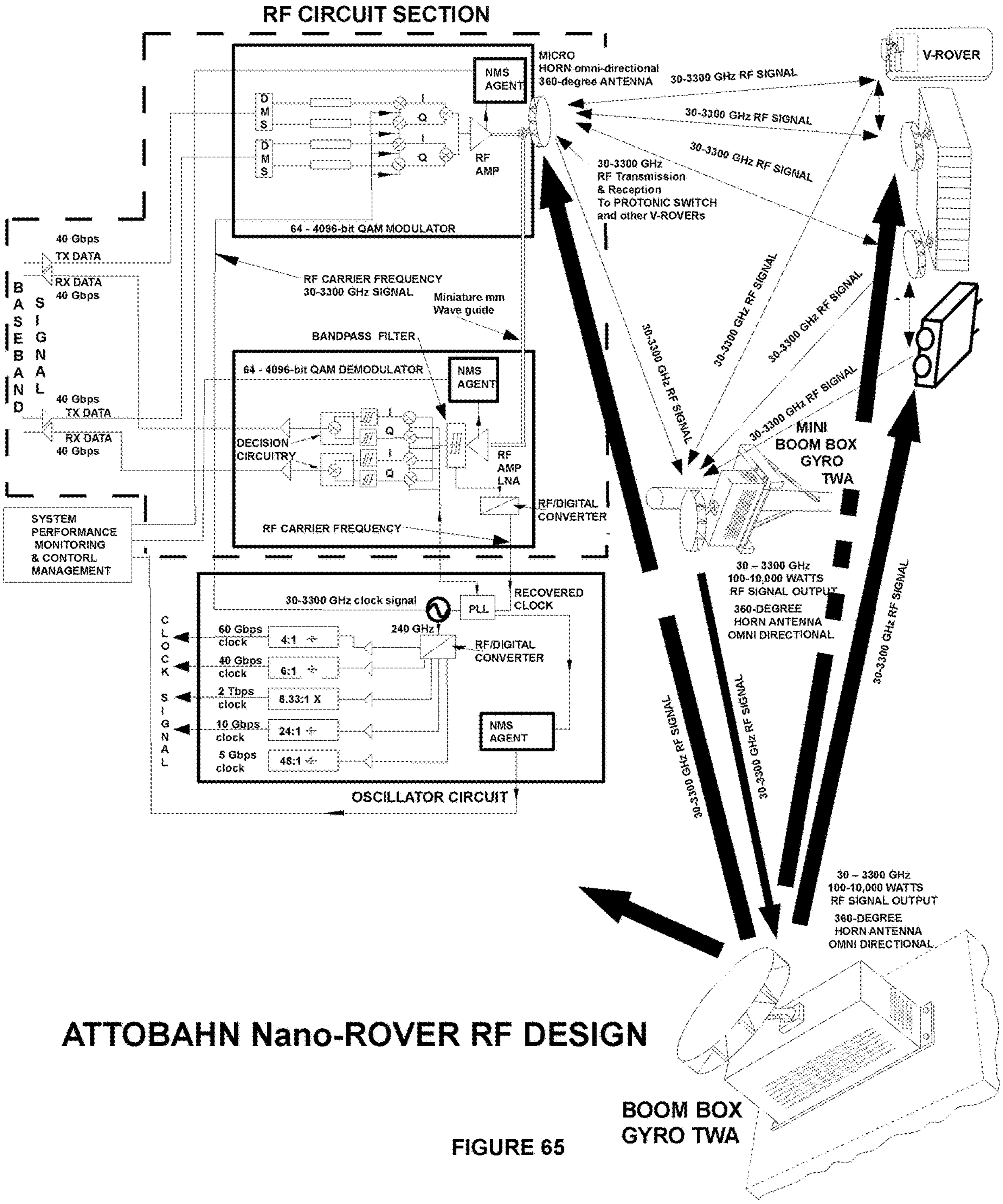
FIG. 65 is an illustration of Attobahn Nano-ROVERs millimeter wave RF design of its QAM modems; transmitter amplifier; LNA receiver, clocking & synchronization integration into these circuitries; and its 360-degree horn antenna which is an embodiment of this invention.

As illustrated in FIG. 65 which is an embodiment of this invention, the Nano-ROVERs is equipped with four (4) physical 10 Gigabits per second (GBps) input/output ports connected to customers' terminating devices such as 4K/8K UHDF TV, computing devices, smart phones, servers, game systems, Virtual Realty devices, etc. These 10 GBps ports are connected to a high-speed switch that has two (2) 40 GBps aggregate digital streams 1001NA that connected to two (2) 64-4096-bit Quadrature Amplitude Modulation (QAM) modulator/demodulators (modems). Each of the two (2) QAM1001NB modulator output RF signals operate in the 30 to 3300 GHZ range.

The Nano-ROVERs two (2) output 30 to 3300 GHz RF signals, each has a bandwidth of 40 GBps. The two (2) 30 to 3300 GHz RF signals are transmitted via Millimeter Monolithic Integrated Circuit (MMIC) RF amplifiers 1001NC. The two (2) output RF signal are transmitted via mmW 360-degree omni-directional horn antenna 1001ND. The RF signal are transmitted in all directions from the Nano-ROVERs are received by the Mini Boom Box and Boom Box 360-degree omni-directional antenna 1004F and 1005F within its grid of 300 feet to ¼ mile. The output of the receiver is feed into the Boom Box Gyro TWA Ultra High Power amplifier.

The Mimi Boom Box Gyro TWA Ultra High Power amplifier 1004 amplifies the Nano-ROVERs received RF signals to 10 to 500 Watts and the Boom Box Gyro TWA Ultra High Power amplifier 1005 amplifies these RF signals 500 to 10,000 Watts. The Boom Boxes amplified RF outputs are fed to 360-degree omni-directional horn antennas. The Mini Boom Boxes and the Boom Boxes grids' RF radiations covers radius distances of up to 10 miles and in some cases, even further distances depending on atmospheric conditions. These interconnected grids are combined to cover hundreds of miles around suburban areas and between cities.

The transmitted RF signals from the Mini Boom Box and Boom Box are received by all of the Nano-ROVERs, V-ROVERs, Atto-ROVERs, and Protonic Switches within these Boom Boxes RF grid at an extremely high power level. Therefore, the Boom Boxes act like RF transmission repeaters or terrestrial communications satellites that amplifies the Nano-ROVERs, V-ROVERs, Atto-ROVERs, Protonic Switches, and Nucleus Switches. The Boom Boxes are positioned on buildings (commercial or selected residential buildings) roof tops, communications towers, and aerial drones.

RF Transmission Configuration-Atto-Rovers to Boom Box

Figure 66:
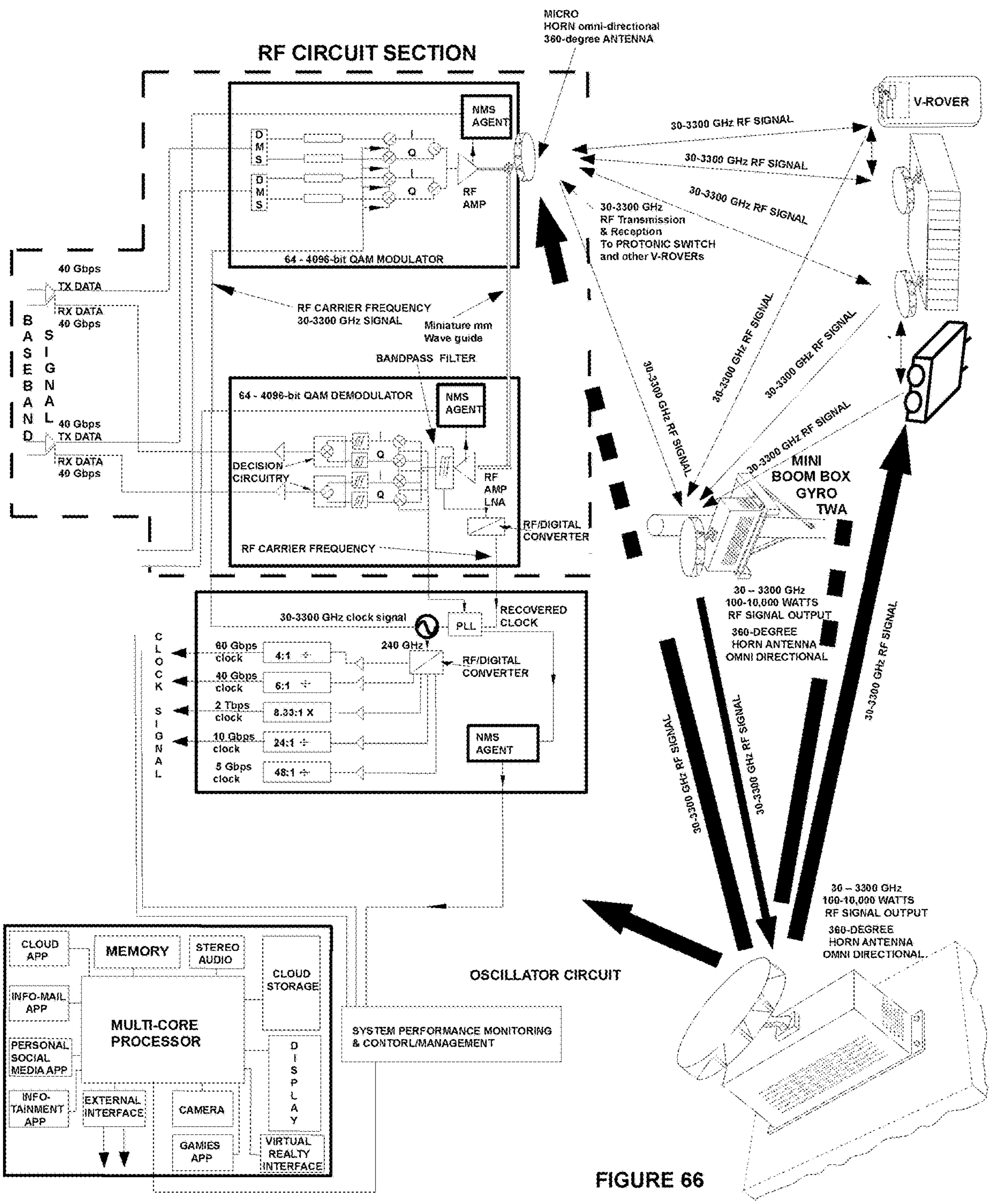
FIG. 66 is an illustration of Attobahn Atto-ROVERs millimeter wave RF design of its QAM modems; transmitter amplifier; LNA receiver, clocking & synchronization integration into these circuitries; and its 360-degree horn antenna which is an embodiment of this invention.

As illustrated in FIG. 66 which is an embodiment of this invention, the Atto-ROVERs is equipped with two (2) physical 10 Gigabits per second (GBps) input/output ports connected to customers' terminating devices such as 4K/8K UHDF TV, computing devices, smart phones, servers, game systems, Virtual Realty devices, etc. These 10 GBps ports are connected to a high-speed switch that has two (2) 40 GBps aggregate digital streams 1001AA that connected to two (2) 64-4096-bit Quadrature Amplitude Modulation (QAM) 1001AB modulator/demodulators (modems). Each of the two (2) QAM modulator output RF signals operate in the 30 to 3300 GHz range.

The Atto-ROVERs two (2) output 30 to 3300 GHz RF signals, each has a bandwidth of 40 GBps. The two (2) 30 to 3300 GHz RF signals are transmitted via Millimeter Monolithic Integrated Circuit (MMIC) RF amplifiers 1001AC. The two (2) output RF signal are transmitted via mmW 360-degree omni-directional horn antenna 1001AD. The RF signal are transmitted in all directions from the Atto-ROVERs are received by the Mini Boom Box and Boom Box 360-degree omni-directional antenna 1004F and 1005F within its grid of 300 feet to ¼ mile. The output of the receiver is feed into the Boom Box Gyro TWA Ultra High Power amplifier.

The Mimi Boom Box Gyro TWA Ultra High Power amplifier 1004 amplifies the Atto-ROVERs received RF signals to 10 to 500 Watts and the Boom Box Gyro TWA Ultra High Power amplifier 1005 amplifies these RF signals 500 to 10,000 Watts. The Boom Boxes amplified RF outputs are fed to 360-degree omni-directional horn antennas. The Mini Boom Boxes and the Boom Boxes grids' RF radiations covers radius distances of up to 10 miles and in some cases, even further distances depending on atmospheric conditions. These interconnected grids are combined to cover hundreds of miles around suburban areas and between cities.

The transmitted RF signals from the Mini Boom Box and Boom Box are received by the Atto-ROVERs, V-ROVERs, Nano-ROVERs, and Protonic Switches within these Boom Boxes RF grid at an extremely high power level. Therefore, the Boom Boxes act like RF transmission repeaters or terrestrial communications satellites that amplifies the Atto-ROVERs, V-ROVERS, Nano-ROVERs, Protonic Switches, and Nucleus Switches RF signals and retransmit them back into the open area within its grid. The Boom Boxes are positioned on buildings (commercial or selected residential buildings) roof tops, communications towers, and aerial drones.

RF Layer II: Protonic Switch RF Design

Figure 67:
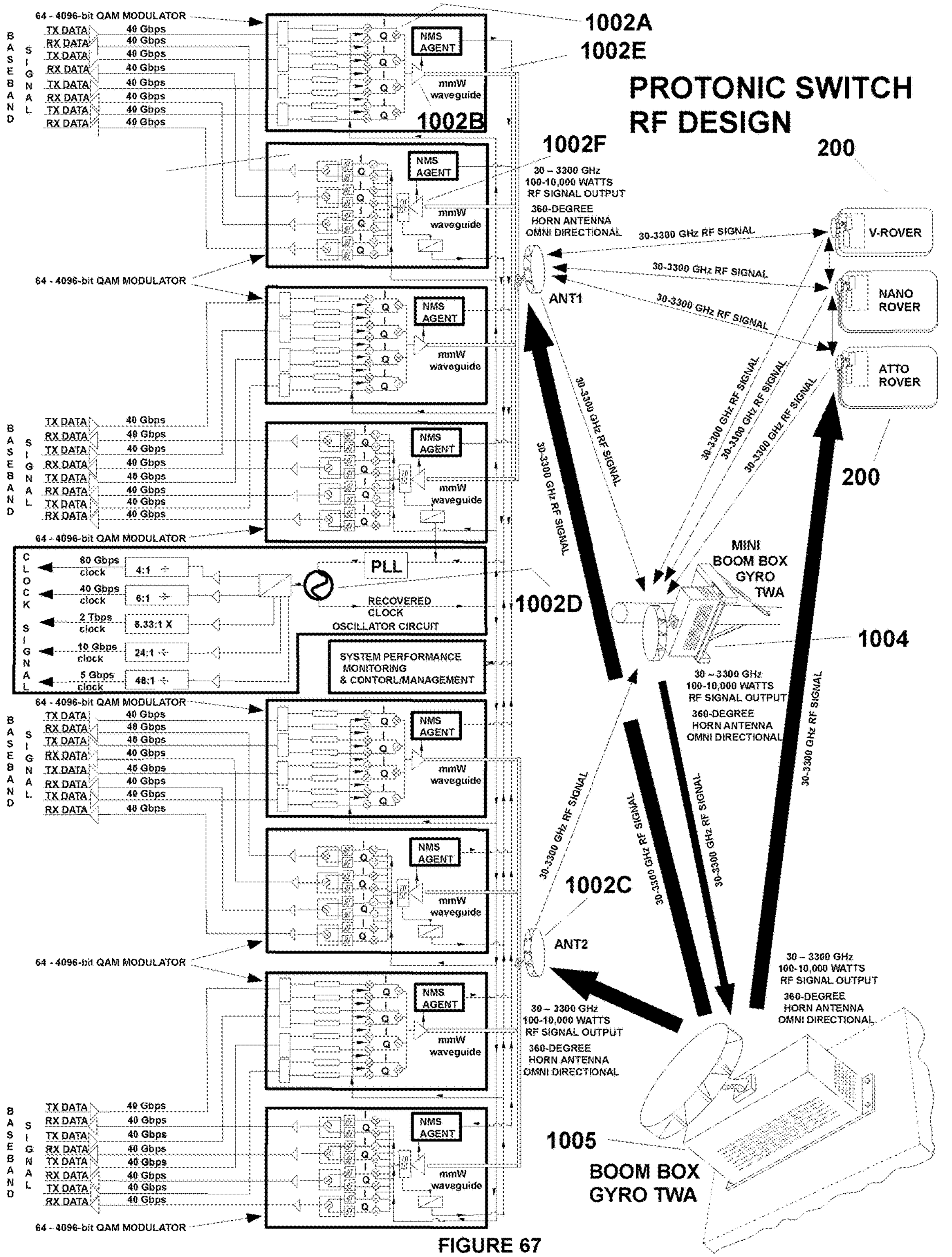
FIG. 67 is an illustration of Attobahn Protonic Switches millimeter wave RF design of its QAM modems; transmitter amplifier; LNA receiver, clocking & synchronization integration into these circuitries; its dual 360-degree horn antennae, and its RF transmission to the V-ROVERS, Nano-ROVERs, Atto-ROVERs, Mini Boom Boxes Gyro TWAs, and the Boom Boxes Gyro TWAs which is an embodiment of this invention.

As shown in FIG. 67 which is an embodiment of this invention, the Attobahn Protonic Switch RF System 1002 is a millimeter wave communications device that is equipped with 16 modems 1002A that have auto-adjust modulation function, whereby it encodes (mapping) each of the 16 basebands 1 TBps digital stream from the TDMA ASM multiplexer, using a range from 64-bit to 4096-bit QAM.

The modem makes the adjustment depending on the RF communications link's signal-to-noise ratio (S/N) level (dBm). The Protonic Switch receiver monitors the received RF signal signal-to-noise ratio (S/N) level. If the dBm level drops beneath a defined threshold, a message is fed to the QAM modem to reduce its bit encoding (demapping) from its maximum 4096-bit downwards to as low as 64-bit and correspondingly the demodulator follow suit and similarly reduces it bit decoding level.

The bandwidth of each RF carrier of the Attobahn RF architecture is approximately 10% of the carrier frequency. Therefore, at one of its primary carrier frequency of 240 GHZ, the available bandwidth will be approximately 24 GHz. Hence, when the 64-4096 QAM modem has its maximum signal-to-noise ratio which uses its maximum 4096-bit QAM, produces a 10 bits/Hz, resulting in a maximum modulated bandwidth of 240 GBps per carrier.

The Protonic Switch is equipped with sixteen (16) 64-4096-bit QAM modems. Each of these modem's signal is fed to the mixer/up-converter 30 GHz to 3300 GHz RF carrier and corresponding output RF amplifiers 1002B. The amplified output RF signals are propagated via a 360-degree horn antenna 1002C into the communication grid area, where these signals are received by the Boom Box and or Mini Boom Box receiver that serves that communications grid area. The Mini Boom Box 1004 and Boom Box 1005 receives the Nucleus Switch RF signal and amplifies it with the Gyro TWA amplifier between 1.5 Watts to 10,000 Watts. These UHP amplifier retransmits the RF signal back into the communications grid to be receives by Protonic and Nucleus Switches and various communications devices.

Protonic Switch mmW RF Transmitter

As shown in FIG. 67 which is an embodiment of this invention, the Protonic Switch mmW RF Transmitter (TX) stage consists of a MMIC mmW amplifier 1002B. The amplifier is fed by a high frequency upconverter mixer that allows the local oscillator frequency (LO) 1002D which has a frequency range from 30 GHz to 3300 GHz to mix the 3 GHz to 330 GHZ bandwidth baseband I-Q modem signals with the RF 30 GHz to 3330 GHz carrier signal. The mixer RF modulated carrier signal is fed to the super high frequency (30-3300 GHZ) transmitter amplifier. The MMIC mmW RF TX has a power gain of 1.5 dB to 20 dB. The TX amplifier output signal is fed to the rectangular mmW waveguide 1002E. The waveguide is connected to the mmW 360-degree circular antenna which is an embodiment of this invention. Protonic Switch mmW RF Receiver FIG. 67 which is an embodiment of this invention, shows the Protonic Switch mmW Receiver (RX) stage that consists of the mmW 360-degree antenna connected to the receiving rectangular mmW waveguide. The 360-degree horn antenna receives the ultra-high power retransmitted RF signal from the Boom Boxes and Mini Box Boxes that originated from V-ROVERs, Nano-ROVERs, Atto-ROVERs 200, Nucleus Switches 400, and other Protonic Switches 300. The mmW 30 GHz to 3300 GHz signal is sent via the rectangular waveguide to the Low Noise Amplifier (LNA) 1002F which has up to a 30-dB gain.

Figure 68:
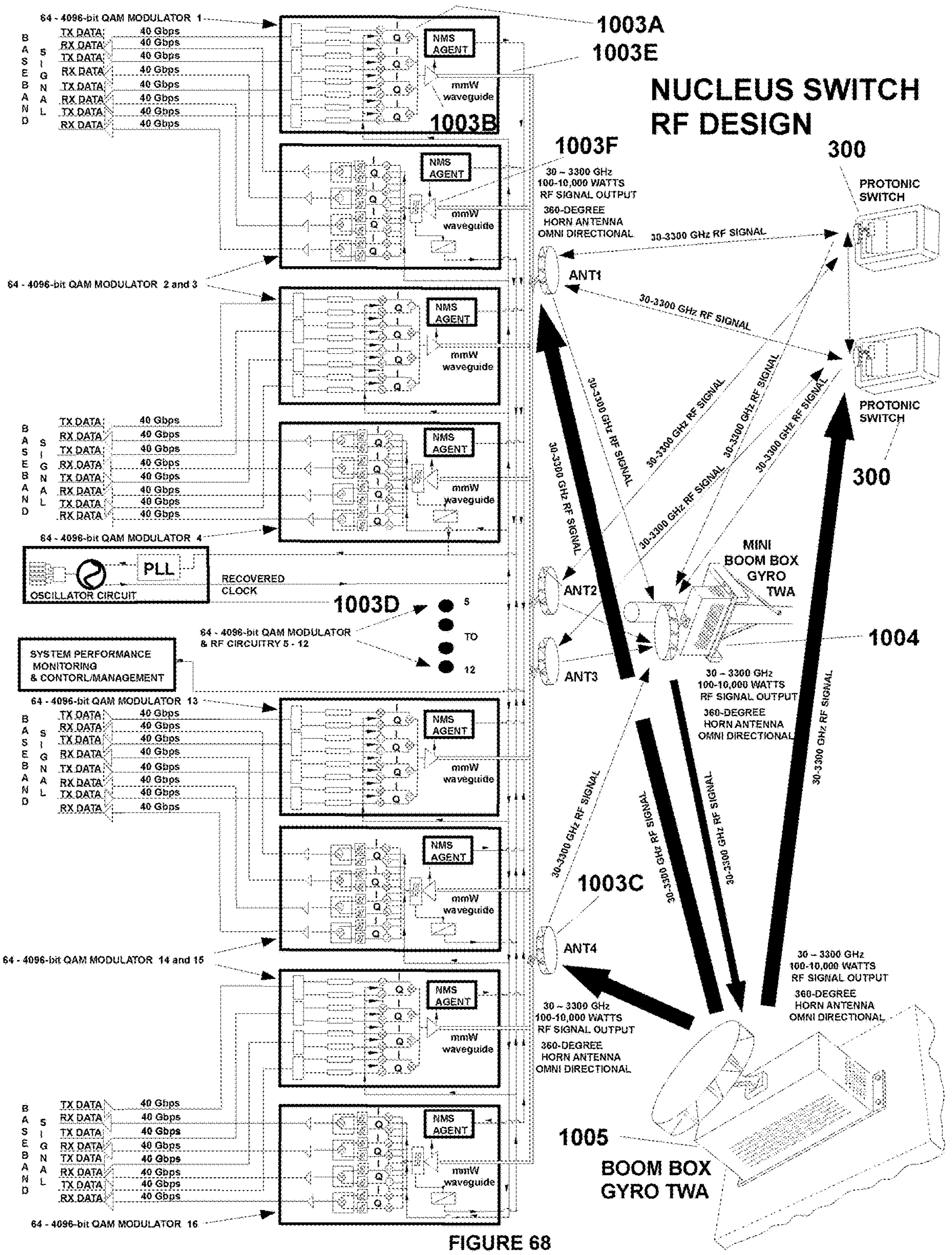
FIG. 68 is an illustration of Attobahn Nucleus Switches millimeter wave RF design of its QAM modems; transmitter amplifier; LNA receiver, clocking & synchronization integration into these circuitries; its quad 360-degree horn antennae, and its RF transmission to the Protonic Switches, Mini Boom Boxes Gyro TWAs, and the Boom Boxes Gyro TWAs which is an embodiment of this invention.

After the signal leaves, the LNA, it passes through the receiver bandpass filter and fed to the high frequency mixer. The high frequency down converter mixer allows the local oscillator frequency (LO) 1002D which has a frequency range from 30 GHz to 3300 GHz to demodulate the I and Q phase amplitude 30 GHz to 3300 GHz carrier signals back to the baseband bandwidth of 3 GHz to 330 GHz. The bandwidth baseband I-Q signals are fed to the 64-4096 QAM demodulator 1002G, where the separated 16 I-Q digital data signals are combined back into the original single 40 GBps to 1 TBps data stream. The QAM demodulator sixteen (16) 40 GBps to 16 TBps data streams are fed to the decryption circuitry and to the cell switch via the TDMA ASM.RF Layer III: Nucleus Switch RF Design As shown in FIG. 68 which is an embodiment of this invention, the Attobahn Nucleus Switch RF System 1003 is a millimeter wave communications device that is equipped with 96 modems 1003A that have auto-adjust modulation function, whereby it encodes (mapping) each of the 96 basebands 1 TBps digital stream from the TDMA ASM multiplexer, using a range from 64-bit to 4096-bit QAM.

The modem makes the adjustment depending on the RF communications link's signal-to-noise ratio (S/N) level (dBm). The Nucleus Switch receiver monitors the received RF signal signal-to-noise ratio (S/N) level. If the dBm level drops beneath a defined threshold, a message is fed to the QAM modem to reduce its bit encoding (demapping) from its maximum 4096-bit downwards to as low as 64-bit and correspondingly the demodulator follow suit and similarly reduces it bit decoding level.

The bandwidth of each RF carrier of the Attobahn RF architecture is approximately 10% of the carrier frequency. Therefore, at one of its primary carrier frequency of 240 GHZ, the available bandwidth will be approximately 24 GHz. Hence, when the 64-4096 QAM modem has its maximum signal-to-noise ratio which uses its maximum 4096-bit QAM, produces a 10 bits/Hz, resulting in a maximum modulated bandwidth of 240 GBps per carrier.

The Nucleus Switch is equipped with ninety-six (96) 64-4096-bit QAM modems. Each of these modem's signal is fed to the mixer/up-converter 30 GHz to 3300 GHz RF carrier and corresponding output RF amplifiers 1003B. The amplified output RF signals are propagated via a 360-degree horn antenna 1003C into the communication grid area, where these signals are received by the Boom Box and or Mini Boom Box receiver that serves that communications grid area. The Mini Boom Box 1004 and Boom Box 1005 receives the Nucleus Switch RF signal and amplifies it with the Gyro TWA amplifier between 1.5 Watts to 10,000 Watts. These UHP amplifier retransmits the RF signal back into the communications grid to be receives by Protonic and Nucleus Switches and various communications devices.

Nucleus Switch mmW RF Transmitter

As shown in FIG. 68 which is an embodiment of this invention, the Nucleus Switch mmW RF Transmitter (TX) stage consists of a MMIC mmW amplifier. The amplifier is fed by a high frequency upconverter mixer that allows the local oscillator frequency (LO) 1003D which has a frequency range from 30 GHz to 3300 GHz to mix the 3 GHz to 330 GHz bandwidth baseband I-Q modem signals with the RF 30 GHz to 3330 GHz carrier signal. The mixer RF modulated carrier signal is fed to the super high frequency (30-3300 GHZ) transmitter amplifier. The mmW RF TX has a power gain of 1.5 dB to 20 dB. The TX amplifier output signal is fed to the rectangular mmW waveguide. The waveguide 1003E is connected to the mmW 360-degree circular antenna which is an embodiment of this invention.

Nucleus Switch mmW RF Receiver

FIG. 68 which is an embodiment of this invention, shows the Nucleus Switch mmW Receiver (RX) stage that consists of the mmW 360-degree antenna connected to the receiving rectangular mmW waveguide. The 360-degree horn antenna receives the ultra-high power retransmitted RF signal from the Boom Boxes and Mini Box Boxes that originated from other Protonic Switches and other Nucleus Switches. The mmW 30 GHz to 3300 GHz signal is sent via the rectangular waveguide to the Low Noise Amplifier (LNA) 1003F which has up to a 30-dB gain.

After the signal leaves, the LNA, it passes through the receiver bandpass filter and fed to the high frequency mixer. The high frequency down converter mixer allows the local oscillator frequency (LO) 1003D which has a frequency range from 30 GHz to 3300 GHz to demodulate the I and Q phase amplitude 30 GHz to 3300 GHz carrier signals back to the baseband bandwidth of 3 GHz to 330 GHz. The bandwidth baseband I-Q signals are fed to the 64-4096 QAM demodulator 1003G, where the separated 96 I-Q digital data signals are combined back into the original single 40 GBps to 1 TBps data stream. The QAM demodulator ninety-six (96) 40 GBps to 96 TBps data streams are fed to the decryption circuitry and to the cell switch via the TDMA ASM.

Attobahn Infrastructure mmW Antenna Architecture

Figure 69:
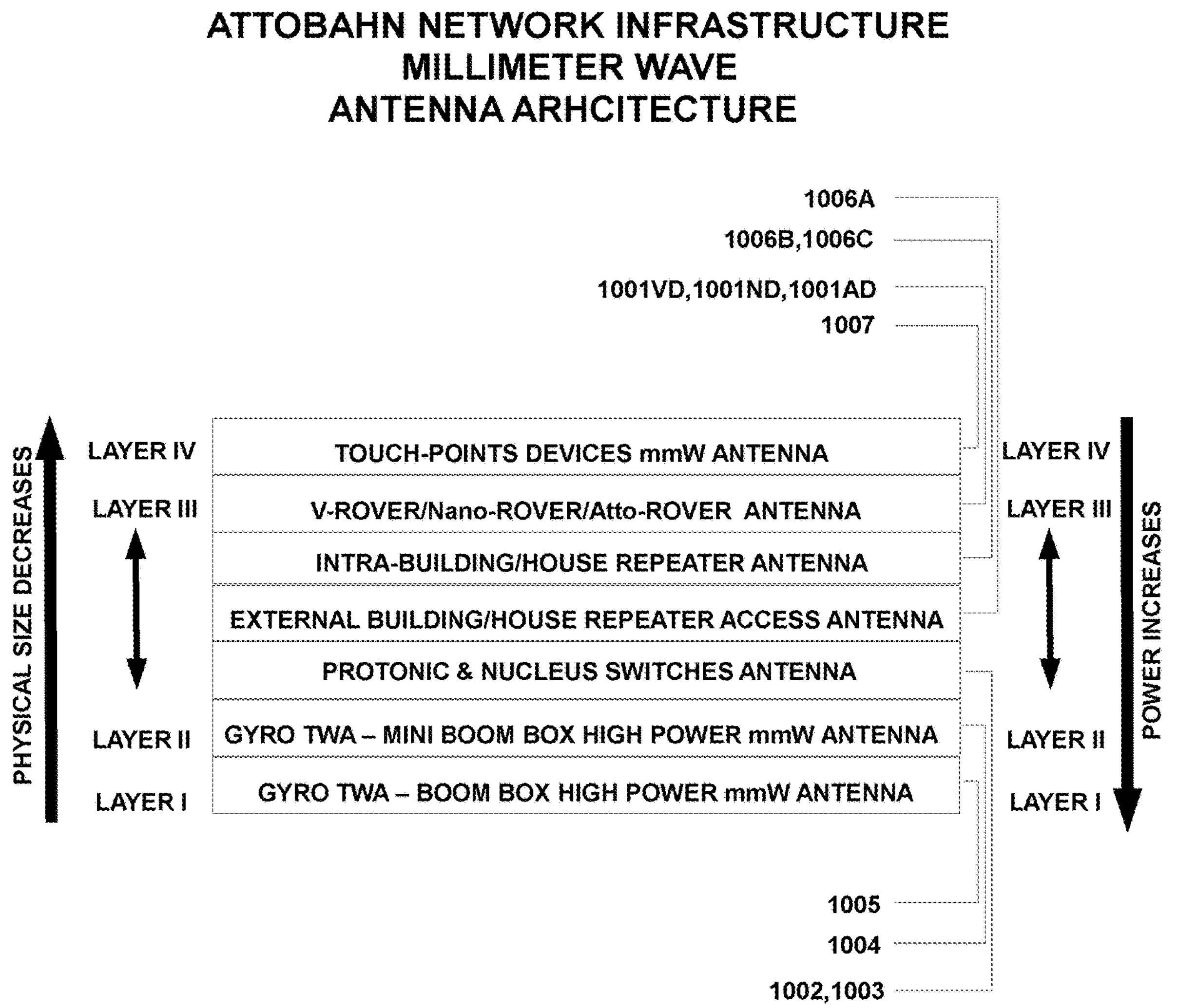
FIG. 69 is an illustration of Attobahn Network Infrastructure Millimeter Wave Antenna Architecture that ranges from the lower power Touch Points devices to the ultra-high power Boom Boxes Gyro TWAs antennae which is an embodiment of this invention.
Figure 70:
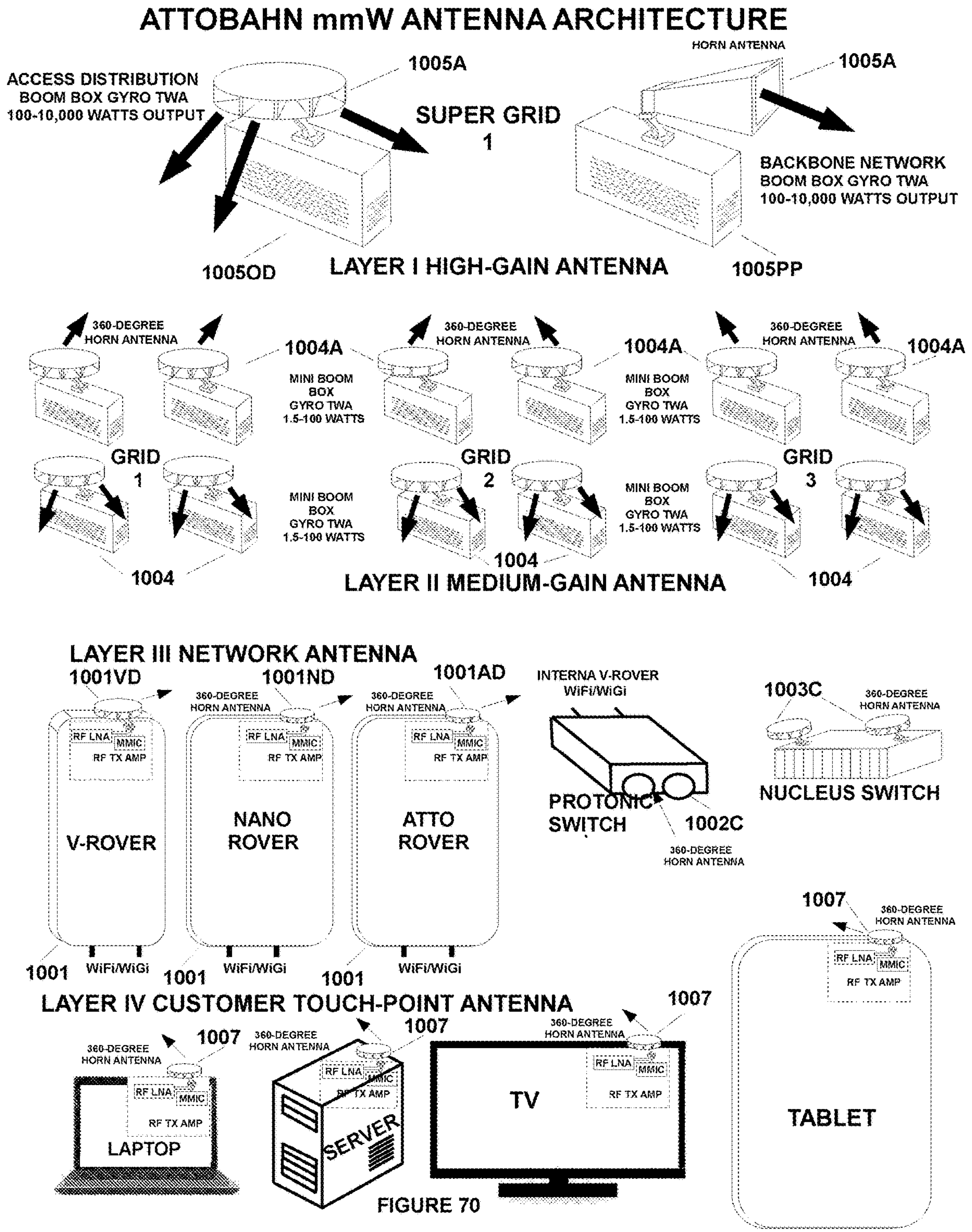
FIG. 70 is an illustration of the Attobahn Antenna LAYER I (two types of) ultra-high power Boom Boxes Gyro TWAs with their 360-degree horn antennae; LAYER II medium power Mini Boom Boxes Gyro TWAs with their 360-degree horn antennae urban and suburban grid configuration; LAYER III V-ROVERs, Nano-ROVERs, and Atto-ROVERs devices with their 360-degree horn antennae; and LAYER IV Touch Point devices with their 360-degree horn antennae which is an embodiment of this invention.

Attobahn mmW network infrastructure consists of a 5-layer millimeter wave antenna architecture as illustrated in FIG. 69 which is an embodiment of this invention. The antenna architecture is designed in the following layers:

1. Layer I is the Gyro TWA Boom Box mmW antenna 1005A.
2. Layer II is the Gyro TWA Mini Boom Box mmW antenna 1004A.
3. Layer III mmW antennae consists:
   i. Nucleus Switch mmW antenna 1003C.
   ii. Protonic Switch mmW WiFi/WiGi antennae 1002C.
   iii. V-ROVER mmW WiFi/WiGi antennae 1001VD.
   iv. Nano-ROVER mmW WiFi/WiGi antennae 1001ND.
   v. Atto-ROVER mmW WiFi/WiGi antennae 1001AD.
   vi. Window-mount mmW antennae amplifier repeater 1006A.
   vii. Door-mount mmW antennae amplifier repeater 1006B.
   viii Wall-mount mmW antennae amplifier repeater 1006D.
4. Layer IV is the Touch Points Devices mmW antennae 1007 (Laptops, tablets, phones, TV, servers, mainframe computers, super computers, games consoles, virtual reality systems, kinetics systems, IoT, machinery automation systems, autonomous vehicles, cars, trucks, heavy equipment, electrical systems, etc.). Antenna Power Specifications As shown in FIG. 70 which is an embodiment of this invention, Attobahn mmW antenna architecture has an inverse layered-power designed, whereby the output wattage increases as the layer decreases. The layered antennae power output ranges are:

1. Layer I—The UHP Gyro TWA Boom Box antennae 10050D and 1005PP that operate 30-3300 GHz RF signal with an output power of 500 to 10,000 watts.
2. Layer II—The Gyro TWA Mini Boom Box antenna 1004A that operates 30-3300 GHz RF signal with an output power of 1.5 to 100 watts
3. Layer III The Nucleus Switch mmW antennae 1003C that operate at 30-3300 GHz RF signal with an output power of 50 milliwatt to 3 watts.

The Protonic Switch mmW antenna 1002C that operates at 30-3300 GHz RF signal with an output power of 50 milliwatt to 3 watts.

The V-ROVER mmW antennae 1001VD that operate at 30-3300 GHz RF signal with an output power of 50 milliwatt to 3 watts.

The Nano-ROVER mmW antenna 1001ND that operates at 30-3300 GHz RF signal with an output power of 50 milliwatt to 3 watts.

The Atto-ROVER mmW antenna 1001AD that operates at 30-3300 GHz RF signal with an output power of 50 milliwatt to 3.0 watts.

Window-mount mmW antennae amplifier repeater 1006A that operate at 30-3300 GHz RF with an output power of 50 milliwatt to 3.0 watts.

Door-mount mmW antennae amplifier repeater 1006B that operate at 30-3300 GHz RF with an output power of 50 milliwatt to 2.0 watts.

Wall-mount mmW antennae amplifier repeater 1006C that operate at 30-3300 GHz RF with an output power of 50 milliwatt to 2.0 watts.

4. LAYER IV—Touch Points Devices mmW antennae 1007 that operate at 30-3300 GHz RF with an output power of 25 milliwatt to 1.5 watt. (Laptops, tablets, phones, TV, servers, mainframe computers, super computers, games consoles, virtual reality systems, kinetics systems, IoT, machinery automation systems, autonomous vehicles, cars, trucks, heavy equipment, electrical systems, etc.) mmW Gyro TWA Boom Box System Design Attobahn Gyro TWA Boom Box 1005 is an Ultra High Power amplifier that uses a Gyro Traveling Wave Amplifier tube 1005B for very high amplification of the mmW signals in the RF range from 30 GHz to 3300 GHz. The two types of Gyro TWA Boom Boxes are:

1. Omni-Directional UHP mmW Boom Box 10050D
2. Point-to-Point UHP mmW Boom Box 1005PP These two Gyro TWA Boom Boxes are illustrated in FIGS. 71.0 and 72.0 respectively, and are an embodiment of this invention.

Omni Directional UHP mmW Boom Box

Figure 71:
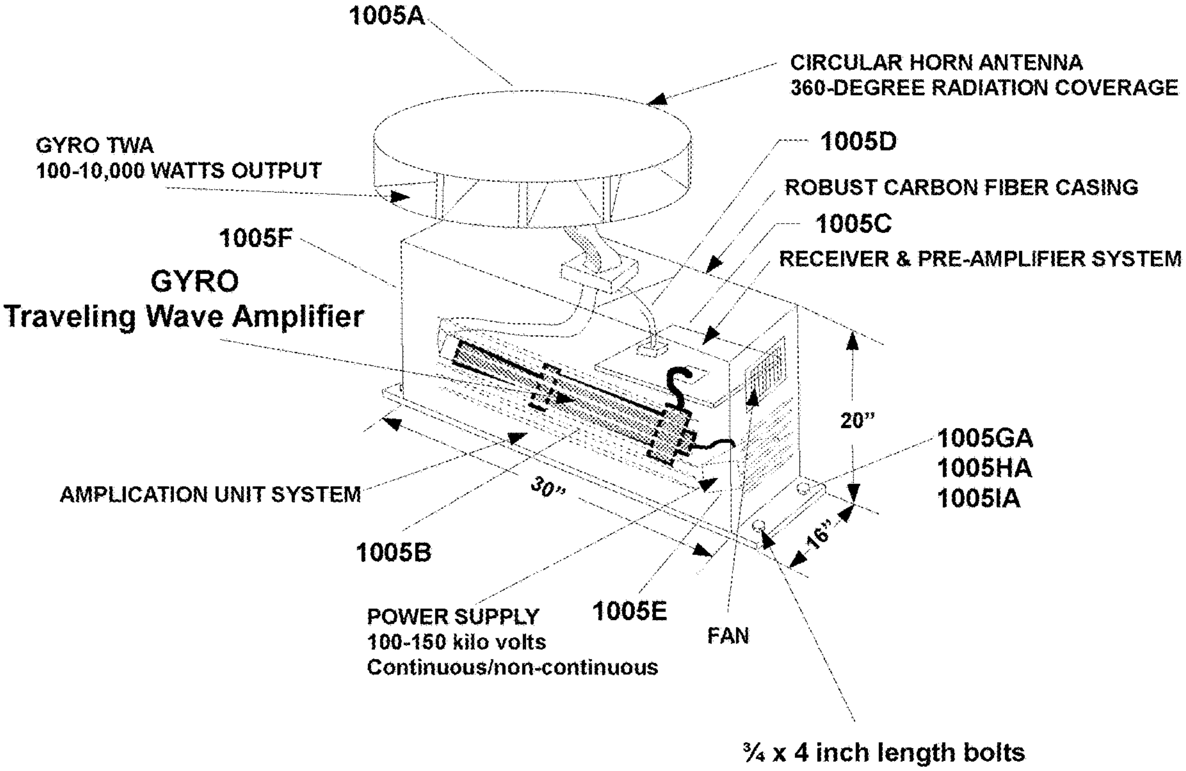
FIG. 71 is an illustration of the Attobahn Multi-Point ultra-high power Boom Box Gyro TWA system with its Traveling Wave Tube Amplifier (TWA); associated LNA RF receiver circuitry; antenna flexible millimeter wave guide; carbon granite casing; and 360-degree horn antenna which is an embodiment of this invention.

The Omni Directional UHP Boom Box (OD-UHP Boom Box) 10050D is illustrated in FIG. 71 which is an embodiment of this invention. Its Gyro Traveling Wave Amplifier (TWA) 1004B has an output power of 500 to 10,000 watts continuous and pulsating modes. The OD-UHP Boom Box is used in the network to amplify and retransmit the millimeter wave signals from the Gyro TWA Mini Boxes, V-ROVERs, Nano-ROVERS, Atto-ROVERs, Protonic Switches, and Nucleus Switches.

The Gyro TWA is accompanied by a millimeter wave RF receiver 1005C that operates in the 30 GHz to 3300 GHz RF range. The receiver is connected to the 360-degree directional horn antenna 1005A via a millimeter waveguide 1005D. The receiver has a Low Noise Amplifier (LNA) with a 20 DB gain. The LNA output mmW signals are fed to a pre-amp then to the Gyro TWA.

OD-UHP Boom Box is equipped with a 100 to 150 Kilo Volts power supply 1005E that operates in a continuous or pulsating mode.

The amplifier is housed in a special design carbon fiber case 1005F that has the following specifications and dimensions:

360-DEGREE OMNI-DIRECTIONAL HORN ANTENNA 1005A
LENGTH: 30 inches.
WIDTH: 16 inches.
HEIGHT: 20 inches.
WEIGHT: 50 lbs.
POWER SUPPLY: 110/240-VAC-source/100-150 KV continuous and non-continuous operation.
COOLING SYSTEM: continuous closed water cooling system.
COOLING FAN: 6 inch×6 inch 110/240 VAC.

Point-to-Point UHP mmW Boom Box

Figure 72:
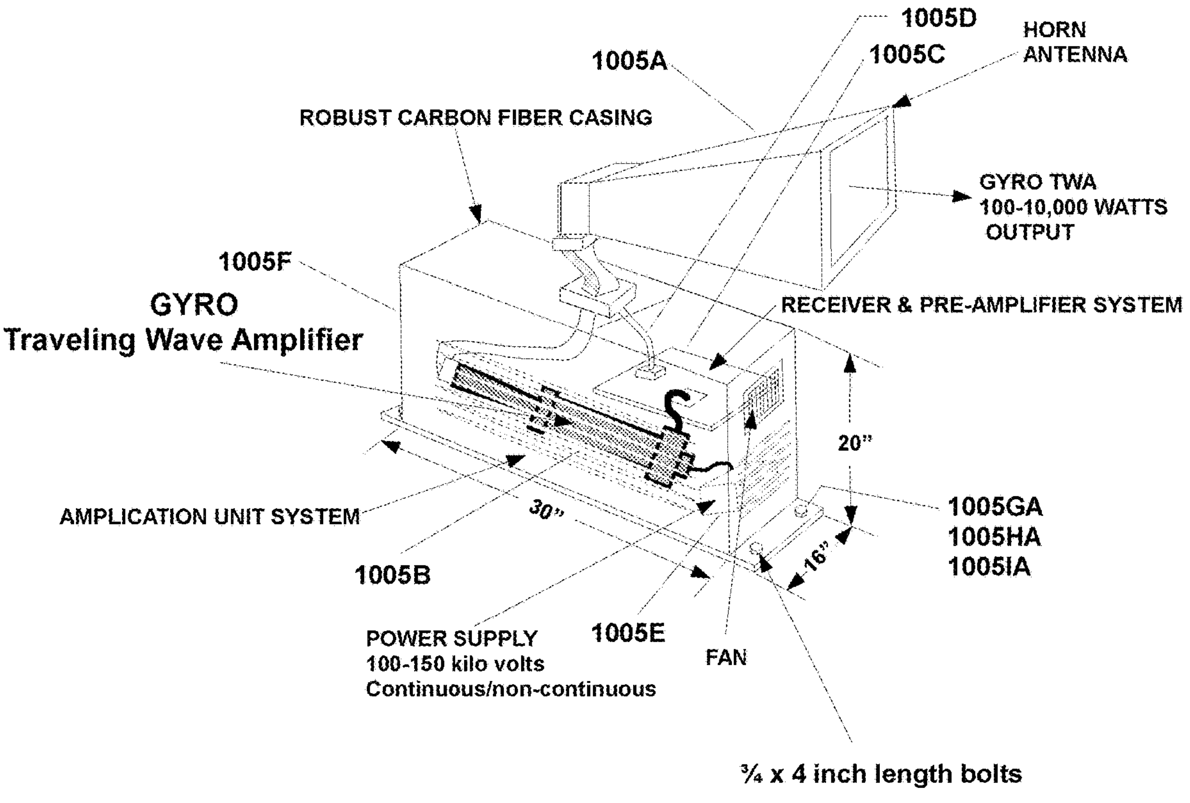
FIG. 72 is an illustration of the Attobahn Backbone Point-to-Point ultra-high power Boom Box Gyro TWA system with its Traveling Wave Tube Amplifier (TWA); associated LNA RF receiver circuitry; antenna flexible millimeter wave guide; carbon granite casing; and 20-60-degree horn antenna which is an embodiment of this invention.

The Point-to-Point UHP mmW Boom Box (PP-UHP Boom Box) 1005PP is illustrated in FIG. 72 which is an embodiment of this invention. Its Gyro Traveling Wave Amplifier (TWA) 1004B has an output power of 500 to 10,000 watts continuous and pulsating modes.

The PP-UHP Boom Box is designed as point-point backbone network RF transmission links between Attobahn network intra/intercity hubs, molecular network domains, and long-haul links. The PP-UHP Gyro TWA Boom Box is accompanied by a millimeter wave RF receiver 1005C that operates in the 30 GHz to 3300 GHz RF range. The receiver is connected to the 20-60-degree directional horn antenna 1005A via a millimeter waveguide 1005D. The receiver has a Low Noise Amplifier (LNA) with a 20 DB gain. The LNA output mmW signals are fed to a pre-amp then to the Gyro TWA.

PP-UHP Boom Box is equipped with a 100 to 150 Kilo Volts power supply 1005E that operates in a continuous or pulsating mode.

The amplifier is housed in a special design carbon fiber case 1005F that has the following specifications and dimensions:

20-60-DEGREE DIRECTIONAL HORN ANTENNA
LENGTH: 30 inches.
WIDTH: 16 inches.
HEIGHT: 20 inches.
WEIGHT: 50 lbs.
POWER SUPPLY: 110/240-VAC-source/100-150 KV continuous and non-continuous operation.
COOLING SYSTEM: continuous closed water cooling system.
COOLING FAN: 6 inch×6 inch 110/240 VAC.

Gyro TWA Boom Box Installation Designs

The Gyro TWA Boom Boxes 1005 provides the optimum RF transmission coverage in a geographic area when it is located at a higher elevation than the other mmW devices that it is beaming its RF signal toward. Some of the typical installation methods that Attobahn uses to mount the OD-UHP and PP-UHP Boom Boxes are shown in FIGS. 73.0 and 74.0 respectively, which are embodiments of this invention.

Omni Directional UHP mmW Boom Box Mounting

Figure 73:
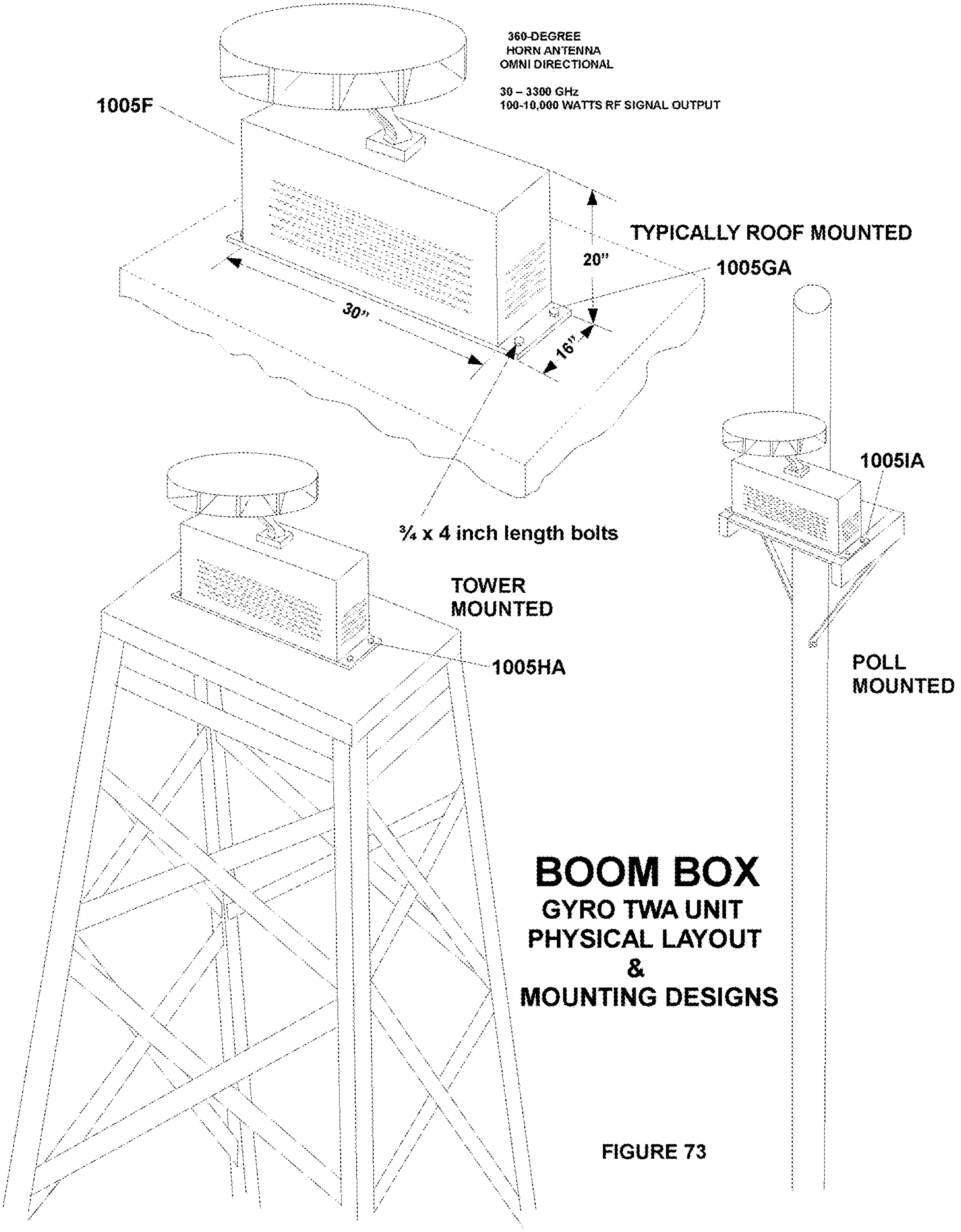
FIG. 73 is an illustration of the Attobahn Multi-Point ultra-high power Boom Box Gyro TWA system three typical physical mounting methods on a roof, tower, or pole which is an embodiment of this invention.

The mounting installation of the OD-UHP Boom Boxes shown in FIG. 73 consists of three methods but the mounting designs are not limited to just these three methods as part of this invention. The three methods illustrated in FIG. 73 are:

1. Roof Mount 1005G
2. Tower mount 1005H
3. Utility pole mount 10051 Roof Mount The OD UHP Boom Boxes roof-mount 1005G designs are arranged by having four blots installed at the base of the carbon fiber box structure that houses the TWA amplifier and other circuitry. The 50 lbs. carbon fiber box casing 1005F is secured to roof structure using four (4) ¾×4-inch length concrete bolts 1005GA for concrete mounting; ¾×4-inch for wood screws for wood beam mounting; and ¾×4-inch bolts with hex nuts for metal beam mounting. The mounting method and the bolts and screws strength is designed to withstand 120 miles per hour winds depending on the roof structure and how well OD UHP Boom Box is installed.

Tower Mount

As shown in FIG. 73 which is an embodiment of this invention, the OD UHP Boom Boxes is mounted on a standard communications tower 1005H. Attobahn will install these boxes on various types of towers 1005H. Attobahn will rent space on these towers and in specifics cases, Attobahn will build and install its own towers. The tower-mount designs are arranged by having four blots installed at the base of the carbon fiber box structure that houses the TWA amplifier and other circuitry. The 50 lbs. carbon fiber box casing 1005F is secured to flooring of the tower top structure using four (4) ¾×4-inch length bolts 1005HA with hex nuts for metal beam mounting. The mounting method and the bolts strength is designed to withstand 120 miles per hour winds depending on the roof structure and how well OD UHP Boom Box is installed.

Pole Mount

As shown in FIG. 73 which is an embodiment of this invention, the OD UHP Boom Boxes is mounted on a standard utility pole. Attobahn will install these boxes on various types of poles 10051 ranging from electrical utility poles to suburban neighborhood light poles. Attobahn will rent space on these utility poles and in specifics cases, Attobahn will build and install its own poles to install the OD UHP Boom Boxes. The pole-mount designs are arranged by having four blots installed at the base of the carbon fiber box structure that houses the TWA amplifier and other circuitry. The 50 lbs. carbon fiber box casing 1005F is secured to the pole structure using four (4) ¾×4-inch length bolts 10051A with hex nuts for metal beam mounting. The mounting method and the bolts strength is designed to withstand 120 miles per hour winds depending on the roof structure and how well OD UHP Boom Box is installed.

Point-to-Point UHP mmW Boom Box Mounting

Figure 74:
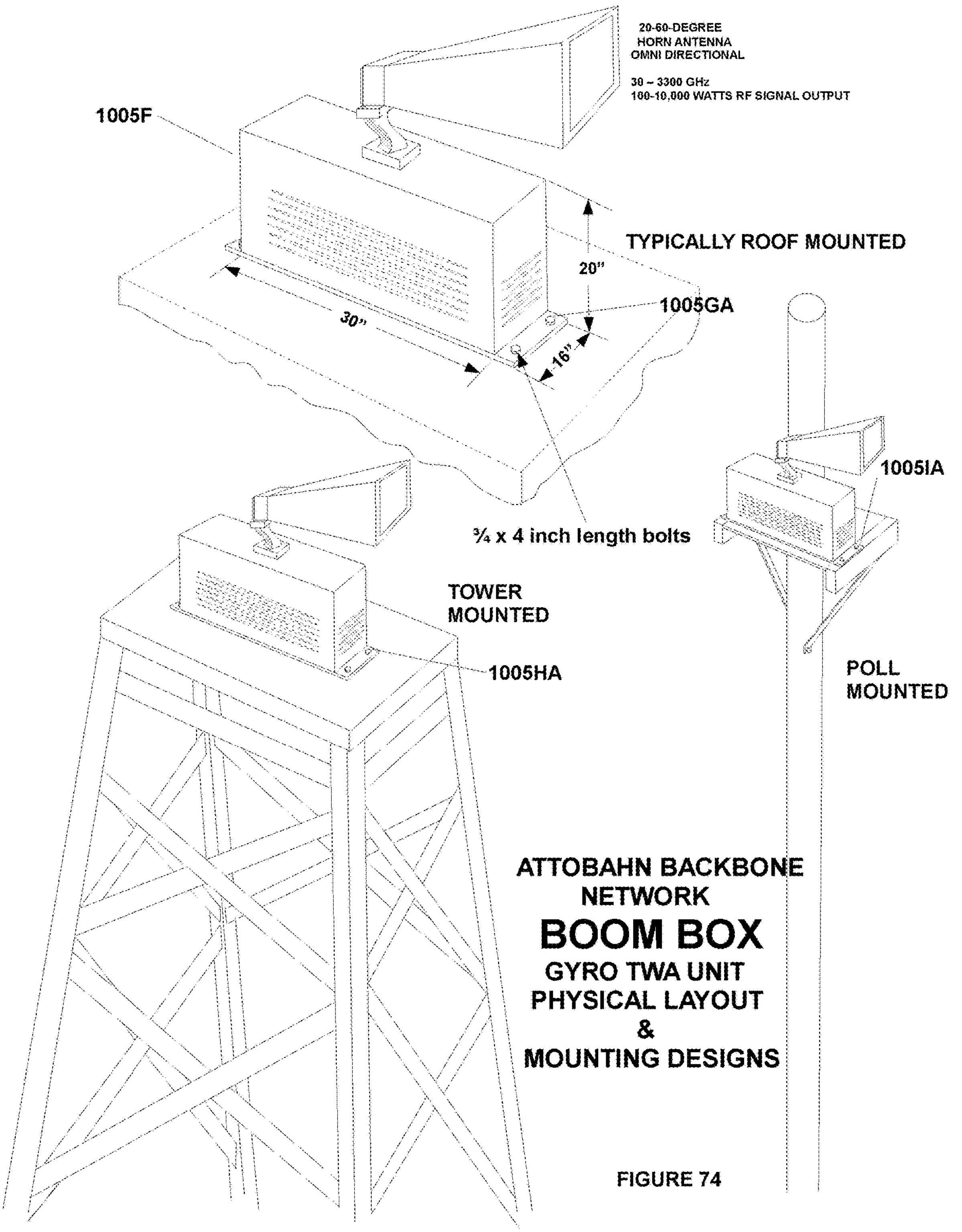
FIG. 74 is an illustration of the Attobahn Backbone Point-to-Point ultra-high power Boom Box Gyro TWA system three typical physical mounting methods on a roof, tower, or pole which is an embodiment of this invention.

As shown in FIG. 74 which is an embodiment of this invention, the mounting installation of the PP-UHP Boom Boxes 1005PP requires line-of-sight between two of these devices. The selected mounting technique adopted must ensure that the line-of-sight is maintained. Three mounting designs are shown in FIG. 74, but this invention is not limited to just these three designs. The three methods illustrated in FIG. 74.0 are:

1. Roof Mount 1005G
2. Tower mount 1005H
3. Utility pole mount 10051 Roof Mount The PP-UHP Boom Boxes roof-mount 1005F designs are arranged by having four blots installed at the base of the carbon fiber box structure that houses the TWA amplifier and other circuitry. The 50 lbs. carbon fiber box casing 1005F is secured to roof structure using four (4) ¾×4-inch length concrete bolts 1005GA for concrete mounting; ¾×4-inch for wood screws for wood beam mounting; and ¾×4 inch bolts with hex nuts for metal beam mounting. The mounting method and the bolts and screws strength is designed to withstand 120 miles per hour winds depending on the roof structure and how well PP-UHP Boom Box is installed.

Tower Mount

As shown in FIG. 74 which is an embodiment of this invention, the PP-UHP Boom Boxes is mounted on a standard communications tower 1005H. Attobahn will install these boxes on various types of towers. Attobahn will rent space on these towers and in specifics cases, Attobahn will build and install its own towers. The tower-mount designs are arranged by having four blots installed at the base of the carbon fiber box structure that houses the TWA amplifier and other circuitry. The 50 lbs. carbon fiber box casing 1005F is secured to flooring of the tower top structure using four (4) ¾×4-inch length bolts with hex nuts for metal beam mounting. The mounting method and the bolts strength is designed to withstand 120 miles per hour winds depending on the roof structure and how well PP-UHP Boom Box is installed.

Pole Mount

As shown in FIG. 74 which is an embodiment of this invention, the PP-UHP Boom Boxes is mounted on a standard utility pole 10051. Attobahn will install these boxes on various types of poles ranging from electrical utility poles to suburban neighborhood light poles. Attobahn will rent space on these utility poles and in specifics cases, Attobahn will build and install its own poles to install the PP-UHP Boom Boxes. The pole-mount designs are arranged by having four blots installed at the base of the carbon fiber box structure that houses the TWA amplifier and other circuitry. The 50 lbs. carbon fiber box casing 1005F is secured to the pole structure using four (4) ¾×4-inch length bolts 1005IA with hex nuts for metal beam mounting. The mounting method and the bolts strength is designed to withstand 120 miles per hour winds depending on the roof structure and how well PP-UHP Boom Box is installed.

mmW Gyro TWA Mini Boom Box System Design

Figure 75:
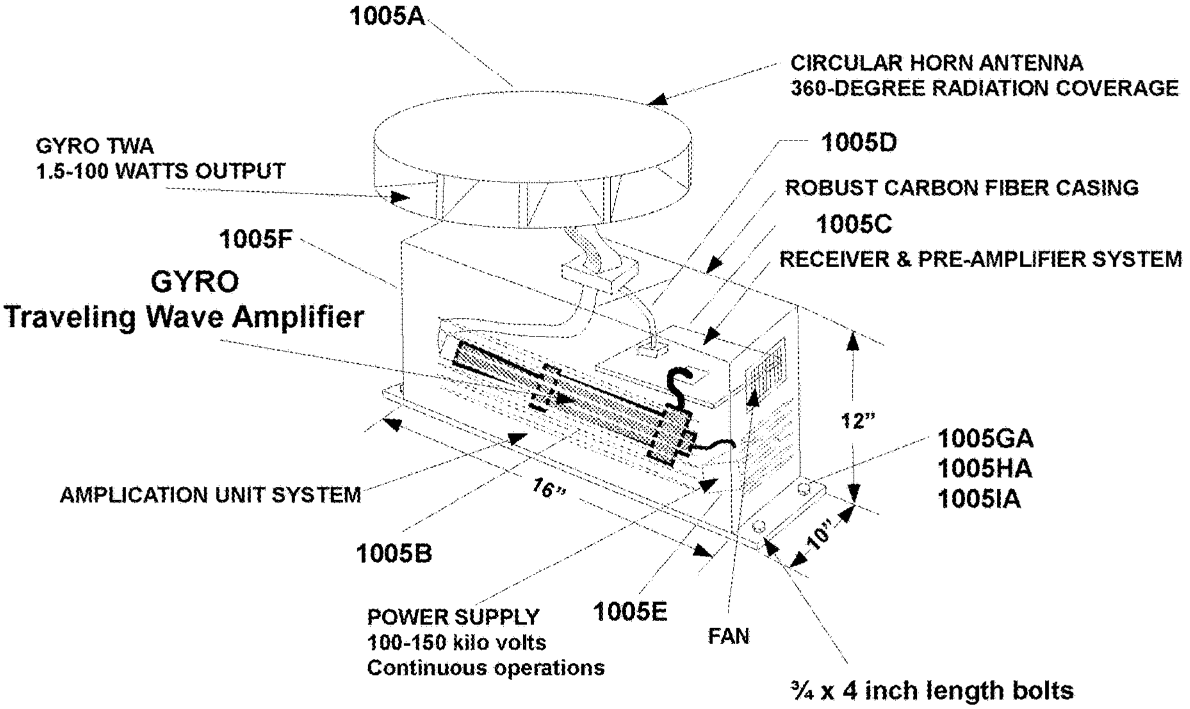
FIG. 75 is an illustration of the Attobahn Multi-Pont medium power Mini Boom Box Gyro TWA system with its Traveling Wave Tube Amplifier (TWA); associated LNA RF receiver circuitry; antenna flexible millimeter wave guide; carbon granite casing; and 360-degree horn antenna which is an embodiment of this invention.

As shown in FIG. 75 which is an embodiment of this invention, the Attobahn Gyro TWA Mini Boom Box 1004 is a High-Power amplifier that uses a Traveling Wave Amplifier (TWA) tube 1004B for very high amplification of the mmW signals in the RF range from 30 GHz to 3300 GHz.

It has an output power of 1.5 to 100 Watts continuous mode. The Mini Boom Box is used in the network to amplify and retransmit the millimeter wave signals from the Gyro TWA V-ROVERs, Nano-ROVERS, Atto-ROVERs, Protonic Switches, and Nucleus Switches.

The Gyro TWA is accompanied by a millimeter wave RF receiver 1004C that operates in the 30 GHz to 3300 GHz RF range. The receiver is connected to the 360-degree directional horn antenna 1004A via a millimeter waveguide 1004D. The receiver has a Low Noise Amplifier (LNA) with a 20 DB gain. The LNA output mmW signals are fed to a pre-amp then to the Gyro TWA.

Gyro TWA Boom Box is equipped with a 100 to 150 Kilo Volts power supply 1005E that operates in a continuous or pulsating mode.

The amplifier is housed in a special design carbon fiber case 1004F that has the following specifications and dimensions:

360-DEGREE OMNI-DIRECTIONAL HORN ANTENNA
LENGTH: 16 inches.
WIDTH: 10 inches.
HEIGHT: 12 inches.
WEIGHT: 30 lbs.
POWER SUPPLY: 110/240-VAC-source/100-150 KV continuous operations.
COOLING SYSTEM: continuous closed water cooling system.
COOLING FAN: 6 inch×6 inch 110/240 VAC.

mmW Mini Boom Box Mounting

Figure 76:
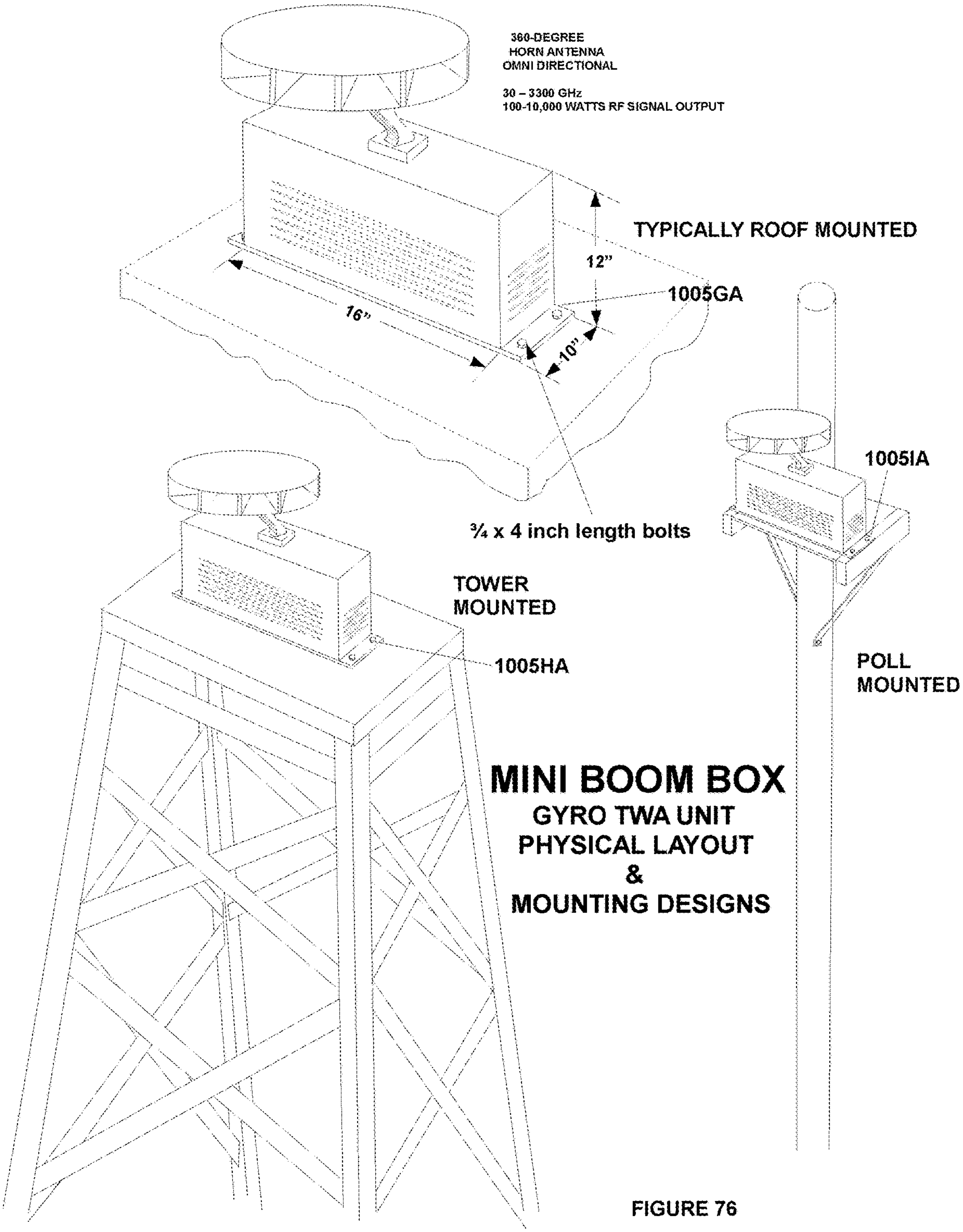
FIG. 76 is an illustration of the Attobahn Multi-Point medium power Mini Boom Box Gyro TWA system three typical physical mounting methods on a roof, tower, or pole which is an embodiment of this invention.

The mounting installation of the Mini Boom Boxes shown in FIG. 76 consists of three methods but the mounting designs are not limited to just these three methods as part of this invention. The three methods illustrated in FIG. 75 are:

1. Roof Mount 1004G
2. Tower mount 1004H
3. Utility pole mount 10041 Roof Mount The Mini Boom Boxes roof-mount 1004G designs are arranged by having four blots installed at the base of the carbon fiber box structure that houses the TWA amplifier and other circuitry. The 30 lbs. carbon fiber box casing is secured to roof structure using four (4) ¾×4-inch length concrete bolts 1004GA for concrete mounting; ¾×4-inch for wood screws for wood beam mounting; and ¾×4-inch bolts with hex nuts for metal beam mounting. The mounting method and the bolts and screws strength is designed to withstand 120 miles per hour winds depending on the roof structure and how well Mini Boom Box is installed. Tower Mount As shown in FIG. 76 which is an embodiment of this invention, the Mini Boom Boxes is mounted on a standard communications tower 1004H. Attobahn will install these boxes on various types of towers. Attobahn will rent space on these towers and in specifics cases, Attobahn will build and install its own towers. The tower-mount designs are arranged by having four blots installed at the base of the carbon fiber box structure that houses the TWA amplifier and other circuitry. The 30 lbs. carbon fiber box casing is secured to flooring of the tower top structure using four (4) ¾×4-inch length bolts 1004HA with hex nuts for metal beam mounting. The mounting method and the bolts strength is designed to withstand 120 miles per hour winds depending on the roof structure and how well Mini Boom Box is installed.

Pole Mount

As shown in FIG. 76 which is an embodiment of this invention, the Mini Boom Boxes is mounted on a standard utility pole. Attobahn will install these boxes on various types of poles 10041 ranging from electrical utility poles to suburban neighborhood light poles. Attobahn will rent space on these utility poles and in specifics cases, Attobahn will build and install its own poles to install the Mini Boom Boxes. The pole-mount designs are arranged by having four blots installed at the base of the carbon fiber box structure that houses the TWA amplifier and other circuitry. The 30 lbs. carbon fiber box casing is secured to the pole structure using four (4) ¾×4-inch length bolts 1004IA with hex nuts for metal beam mounting. The mounting method and the bolts strength is designed to withstand 120 miles per hour winds depending on the roof structure and how well Mini Boom Box is installed.

House/Building External Window-Mount mmW Antenna

Figure 77:
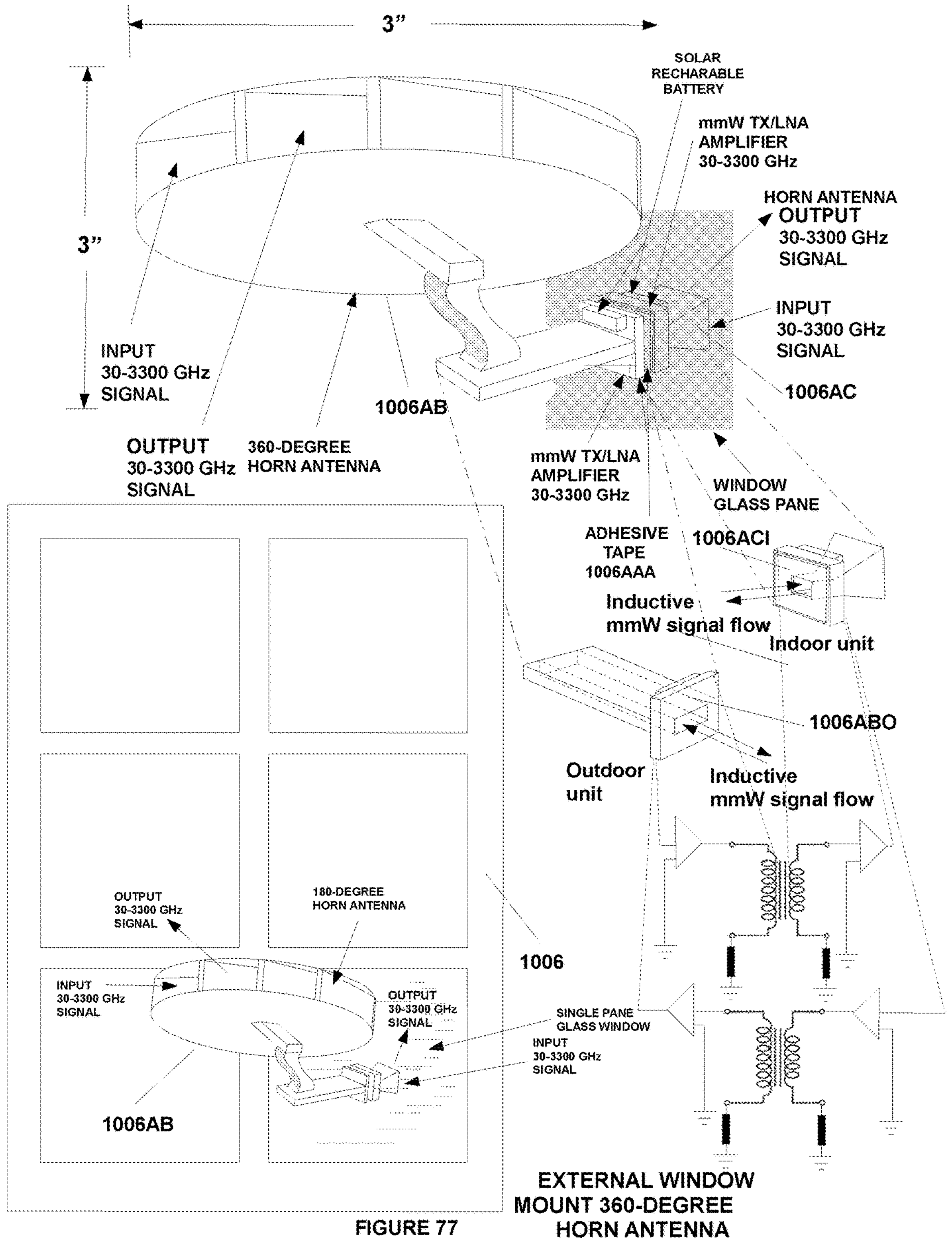
FIG. 77 is an illustration of Attobahn House External Window-Mount Millimeter Wave 360-degree Inductive antenna repeater amplifier system which is an embodiment of this invention.

FIG. 77 illustrates the House/Building External Window-Mount mmW Antenna 1006A which is an embodiment of this invention. The purpose of the Window-Mount mmW Antenna (WMMA) 1006A is to capture the millimeter wave propagated by the Boom Boxes, Mini Boom Boxes, Protonic Switches, V-ROVERs, Nano-ROVERs, and Atto-ROVERs on the external of the house or building and retransmit these mmW signal to permeate the interior of the house/building. The WMMA is mounted on the window 1006 as shown in FIG. 77.

There are two types of WMMA.

1. The 360-degree antenna amplifier repeater (360-WMMA) 1006AA.
2. The 180-degree antenna amplifier repeater (180-WMMA) 1006BB. 360-WMMA Inductive Coupling Connection Design The 360-degree antenna amplifier repeater (360-WMMA) 1006AA is an omni-directional horn antenna. The 360-WMMA is a Do-It-Yourself (DIY) device that is mounted on the user's window glass 1006. The antenna is mounted on the window glass both on the outside and inside as illustrated in FIG. 77 which is an embodiment of this invention. Both antenna pieces are made to adhere to the window glass by a thin self-adhesive strip 1006AAA on the window-side of the antenna device as illustrated in FIG. 77.0.

The 360-WMMA consists of two sections:

1. An outdoor 360-degree horn antenna 1006AB with an integrated mmW RF LNA with a 10-dB gain. The outdoor device has a solar power recharge battery integrated into the unit as show in FIG. 77. The outdoor device has an inductive coupling to the second section of the 360-WMMA.
2, The second section of the 360-WMMA is an indoor device that is installed on the inside of the window. The indoor device 1006AC is inductively couple to the outdoor section and is equipped with a 20-60-degree horn antenna that retransmits the mmW RF signal into the interior space of the house/building. The window-mount indoor device is also equipped with a solar rechargeable battery.

360-WMMA Inductive Circuitry Configuration

Figure 78:
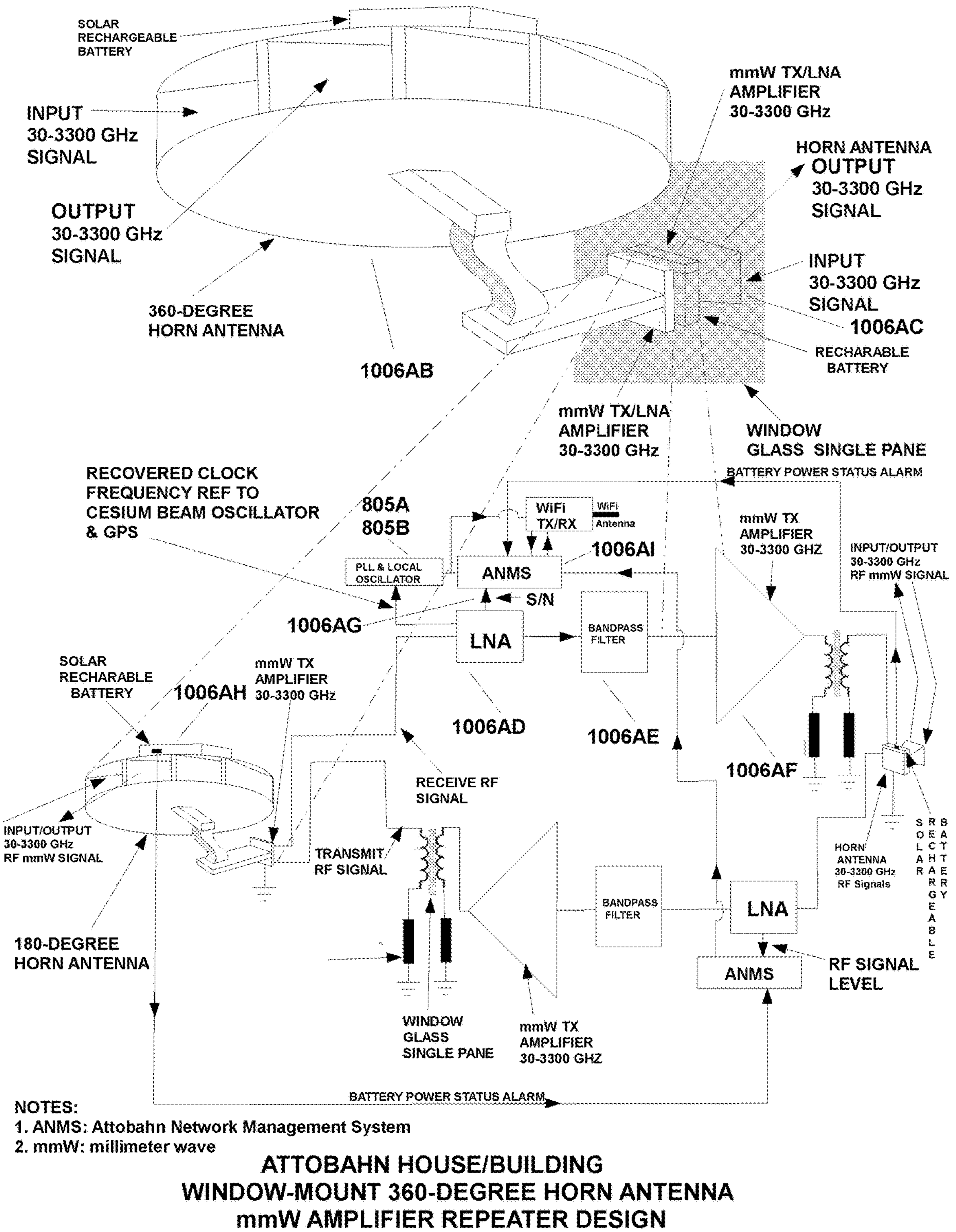
FIG. 78 is an illustration of Attobahn House External Window-Mount Millimeter Wave 360-degree Inductive antenna repeater amplifier system circuitry design which is an embodiment of this invention.

As illustrated in FIG. 78 which is am embodiment of this illustration, the 360-degree WMMA 1006AA inductive circuitry configuration consists of 360-degree horn antenna on the external section of the device. The external horn antenna 1006AB operates in the frequency range of 30 GHz to 3300 GHz RF with an output power of 50 milliwatts to 3.0 watt. The horn antenna is integrated with its Low Noise Amplifier (LNA) 1006AD.

The received 30 GHz to 3300 GHz mmW RF signal from the horn antenna is sent to the LNA which provides a 10-dB gain and passes the amplified signal to the Transmitter amplifier 1006AF via the baseband filter 1006AE. The RF signal is inductively couple to the indoor 20-60-degree indoor horn antenna 2006AC.

Figure 79:
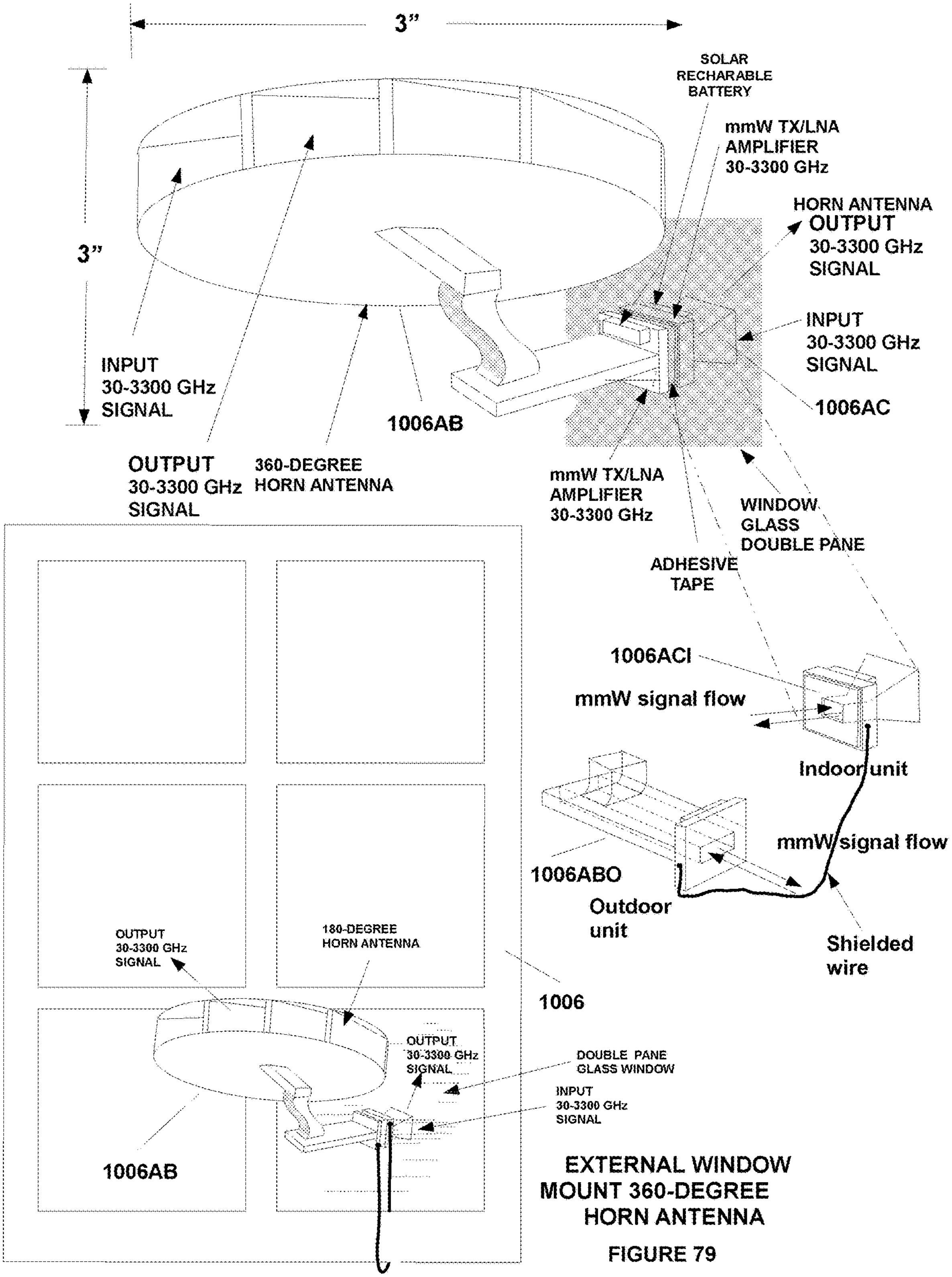
FIG. 79 is an illustration of Attobahn House External Window-Mount Millimeter Wave 360-degree Shielded-Wire antenna repeater amplifier system which is an embodiment of this invention.

The LNA signal-to-Noise ratio (S/N) 1006AG and the solar rechargeable battery 1006AH charge level information is captured and sent to the Attobahn Network Management System (ANMS) 1006AI agent in the 360-WMMA device. The ANMS output signal is sent to the nearest V-ROVER, Nano-ROVER, Atto-ROVER, or the Protonic Switch Local V-ROVER via the WiFi system 1006AJ in the 360-WMMA. The ANMS information arrives at the ROVERs WiFi receivers, where it is demodulated and pass to the APPI logical port 1. The information then traverses Attobahn network to the Millimeter Wave RF Management System at the Global Network Management Center (GNCC). 360-WMMA Inductive System Clocking & Synchronization Design As illustrated in FIG. 78 which is an embodiment to this invention, the 360-WMMA device uses recovered clock from the received mmW RF signal at the LNA. The recovered clocking signal is passed to the Phase Lock Loop (PLL) and local oscillator circuitry 805A and 805B which feds the WiFi transmitter and receiver system. The recovered clocking signal is referenced to the Attobahn Cesium Beam Atomic Clock located at the three GNCCs, that is effectively phased locked to the GPS. 360-WMMA Shielded-Wire Connection Design As illustrated in FIG. 79 which is an embodiment of this invention, the 360-WMMA Shielded-Wire Connection window-mount device is a 360-degree antenna amplifier repeater (360-WMMA) 1006AA. It has an omni-directional horn antenna. The indoor and out units are connected by a shielded-wire between the outdoor mmW LNA and indoor RF amplifier and associated 20-60-degree horn antenna. The 360-WMMA Shielded-Wire device is a Do-It-Yourself (DIY) device that is mounted on the user's window glass 1006. The antenna is mounted on the window glass both on the outside and inside as illustrated in FIG. 79 which is an embodiment of this invention. Both antenna pieces are made to adhere to the window glass by a thin self-adhesive strip on the window-side of the antenna device pieces as illustrated in FIG. 79.

Figure 80:
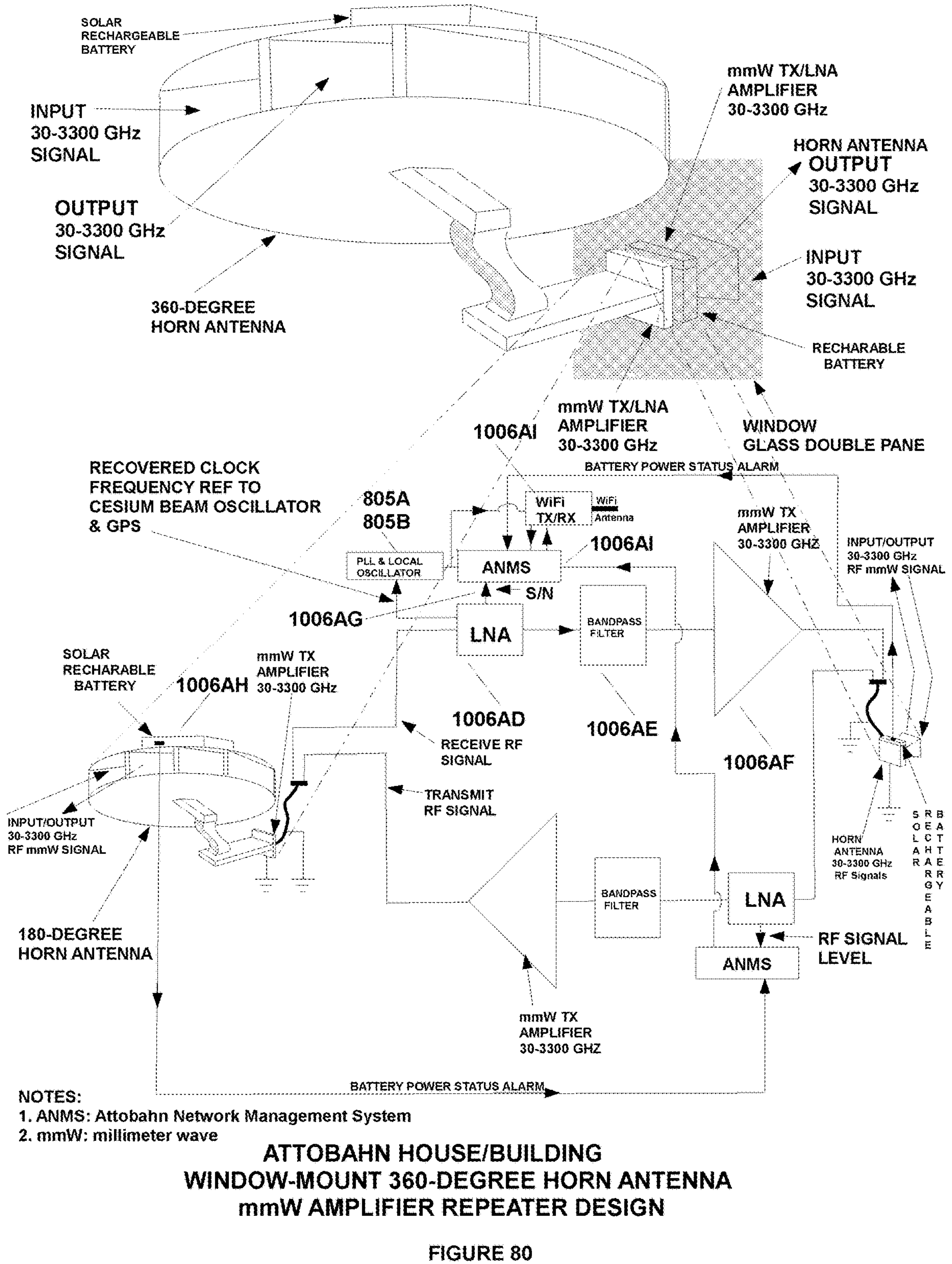
FIG. 80 is an illustration of Attobahn House External Window-Mount Millimeter Wave 360-degree Shielded-Wire antenna repeater amplifier system circuitry design which is an embodiment of this invention.

The 360-WMMA consists of two sections:

1. An outdoor 360-degree horn antenna with an integrated mmW RF LNA with a 10-dB gain. The outdoor device has a solar power rechargeable battery integrated into the unit as show in FIG. 79. The outdoor device is connected to second section of the 360-WMMA via a shielded-wire.
2, The second section of the 360-WMMA is an indoor device that is installed on the inside of the window. The indoor device is connected to the outdoor section via a shielded-wire. The indoor device is equipped with a 20-60-degree horn antenna that retransmits the mmW RF signal into the interior space of the house/building. The window-mount indoor device is also equipped with a solar rechargeable battery. 360-WMMA Shielded-Wire Circuitry Configuration As illustrated in FIG. 80 which is am embodiment of this illustration, the 360-degree WMMA (360-WMMA) 1006AA shield-wire configuration consists of 360-degree horn antenna on the external section of the device. The external horn antenna 1006AB operates in the frequency range of 30 GHz to 3300 GHz RF with an output power of 50 milliwatts to 3.0 watt. The horn antenna is integrated with its Low Noise Amplifier (LNA) 1006AD.

The received 30 GHz to 3300 GHz mmW RF signal from the horn antenna is sent to the LNA which provides a 10-dB gain and passes the amplified signal to the Transmitter amplifier 1006AE via the baseband filter 1006AF. The RF signal is connected to the indoor 20-60-degree indoor horn antenna 2006AC via a shielded-wire.

Figure 81:
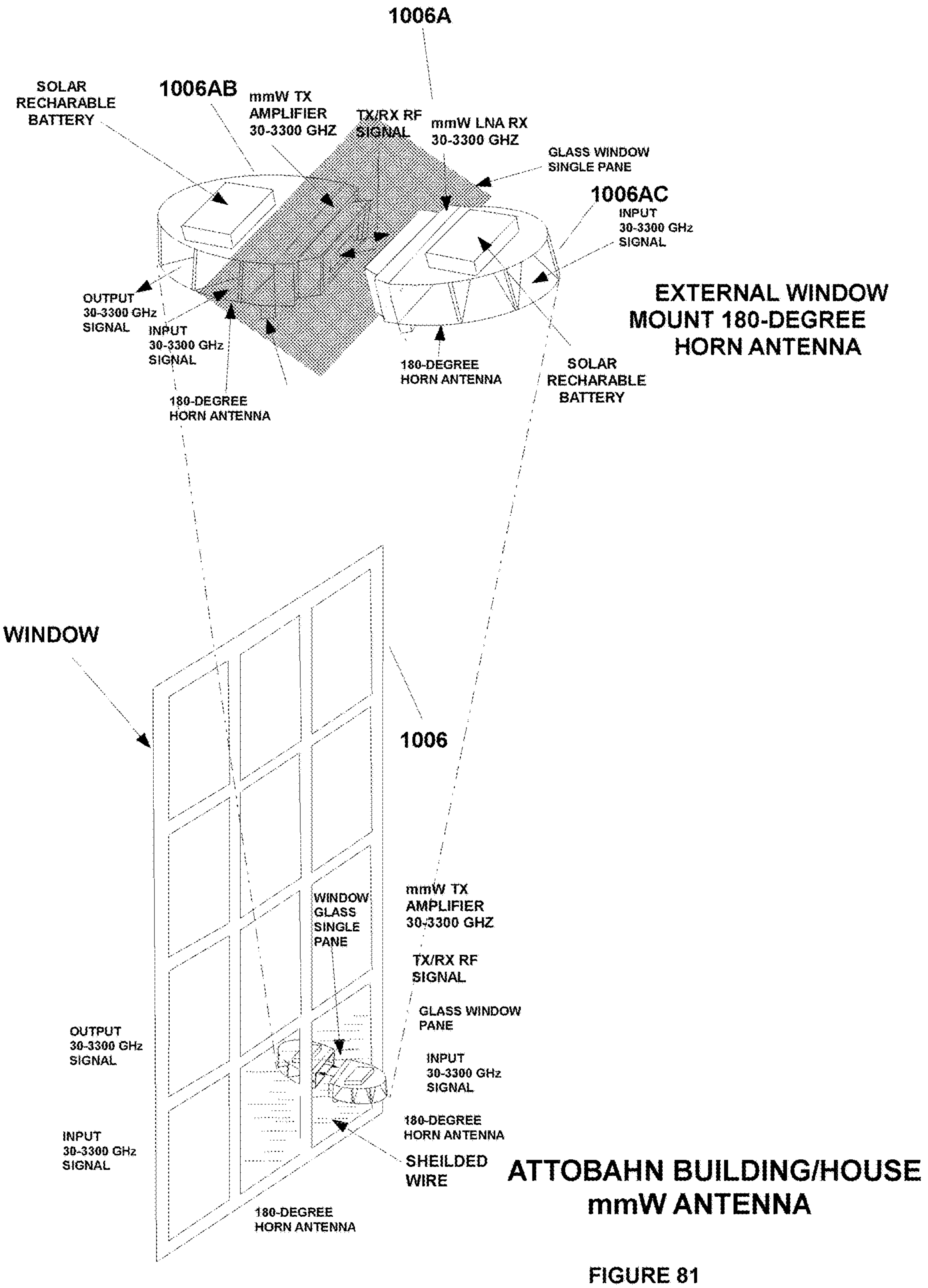
FIG. 81 is an illustration of Attobahn House External Window-Mount Millimeter Wave 180-degree Inductive antenna repeater amplifier system which is an embodiment of this invention.

The LNA signal-to-Noise ratio (S/N) 1006AG and the solar rechargeable battery charge level information 1006AH is captured and sent to the Attobahn Network Management System (ANMS) 1006AI agent in the 360-WMMA device. The ANMS output signal is sent to the nearest V-ROVER, Nano-ROVER, Atto-ROVER, or the Protonic Switch Local V-ROVER via the WiFi system 1006AJ in the 360-WMMA. The ANMS information arrives at the ROVERs WiFi receivers, where it is demodulated and pass to the APPI logical port 1. The information then traverses Attobahn network to the Millimeter Wave RF Management System at the Global Network Management Center (GNCC). 360-WMMA Shielded-Wire System Clocking & Synchronization Design As illustrated in FIG. 80 which is an embodiment to this invention, the 360-WMMA device uses recovered clock from the received mmW RF signal at the LNA. The recovered clocking signal is passed to the Phase Lock Loop (PLL) and local oscillator circuitry 805A and 805B which feds the WiFi transmitter and receiver system. The recovered clocking signal is referenced to the Attobahn Cesium Beam Atomic Clock located at the three GNCCs, that is effectively phased locked to the GPS. 180-WMMA Inductive Coupling Connection Design The 180-degree antenna amplifier repeater (180-WMMA) 1006BB is an omni-directional horn antenna. The 180-WMMA is a Do-It-Yourself (DIY) device that is mounted on the user's window glass 1006. The antenna is mounted on the window glass both on the outside and inside as illustrated in FIG. 81 which is an embodiment of this invention. Both antenna pieces are made to adhere to the window glass by a thin self-adhesive strip on the window-side of the antenna device as illustrated in FIG. 81.

Figure 82:
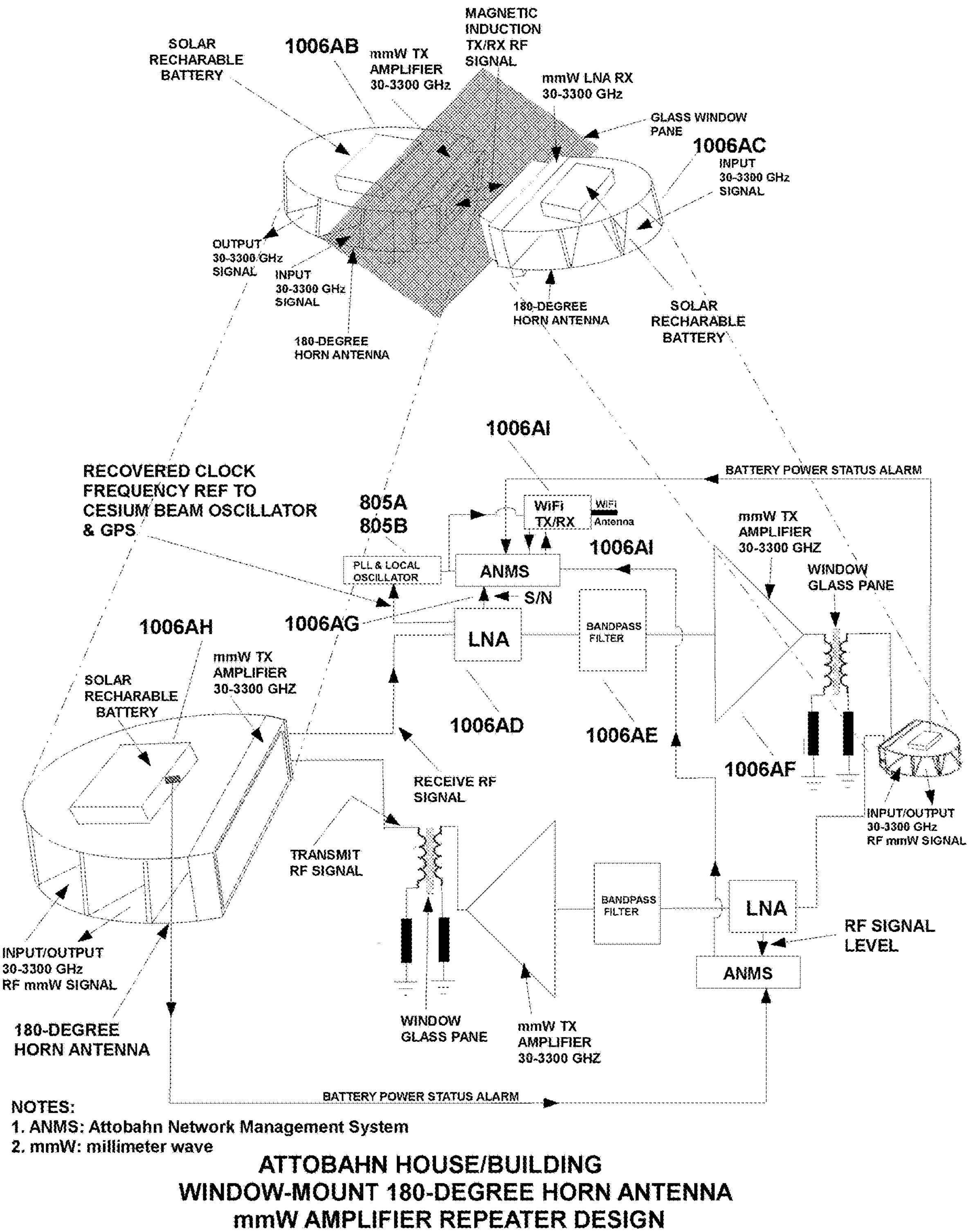
FIG. 82 is an illustration of Attobahn House External Window-Mount Millimeter Wave 180-degree Inductive antenna repeater amplifier system circuitry design which is an embodiment of this invention.

The 180-WMMA consists of two sections:

1. An outdoor 180-degree horn antenna 1006AB with an integrated mmW RF LNA with a 10-dB gain. The outdoor device has a solar power recharge battery integrated into the unit as show in FIG. 81. The outdoor device has an inductive coupling to the second section of the 360-WMMA.
2, The second section of the 180-WMMA is an indoor 180-degree horn antenna 1006AC device, that is installed on the inside of the window. The indoor device is inductively couple to the outdoor section and is equipped with a 180-degree horn antenna that retransmits the mmW RF signal into the interior space of the house/building. The window-mount indoor device is also equipped with a solar rechargeable battery. 180-WMMA Inductive Circuitry Configuration As illustrated in FIG. 82 which is am embodiment of this illustration, the 180-degree WMMA 1006BB inductive circuitry configuration consists of 180-degree horn antenna on the external section of the device. The external horn antenna 1006AB operates in the frequency range of 30 GHz to 3300 GHz RF with an output power of 50 milliwatts to 3.0 watt. The horn antenna is integrated with its Low Noise Amplifier (LNA) 1006AD.

The received 30 GHz to 3300 GHz mmW RF signal from the horn antenna is sent to the LNA which provides a 10-dB gain and passes the amplified signal to the Transmitter amplifier 1006AE via the baseband filter 1006AF. The RF signal is inductively couple to the indoor 180-degree indoor horn antenna 2006AC.

Figure 83:
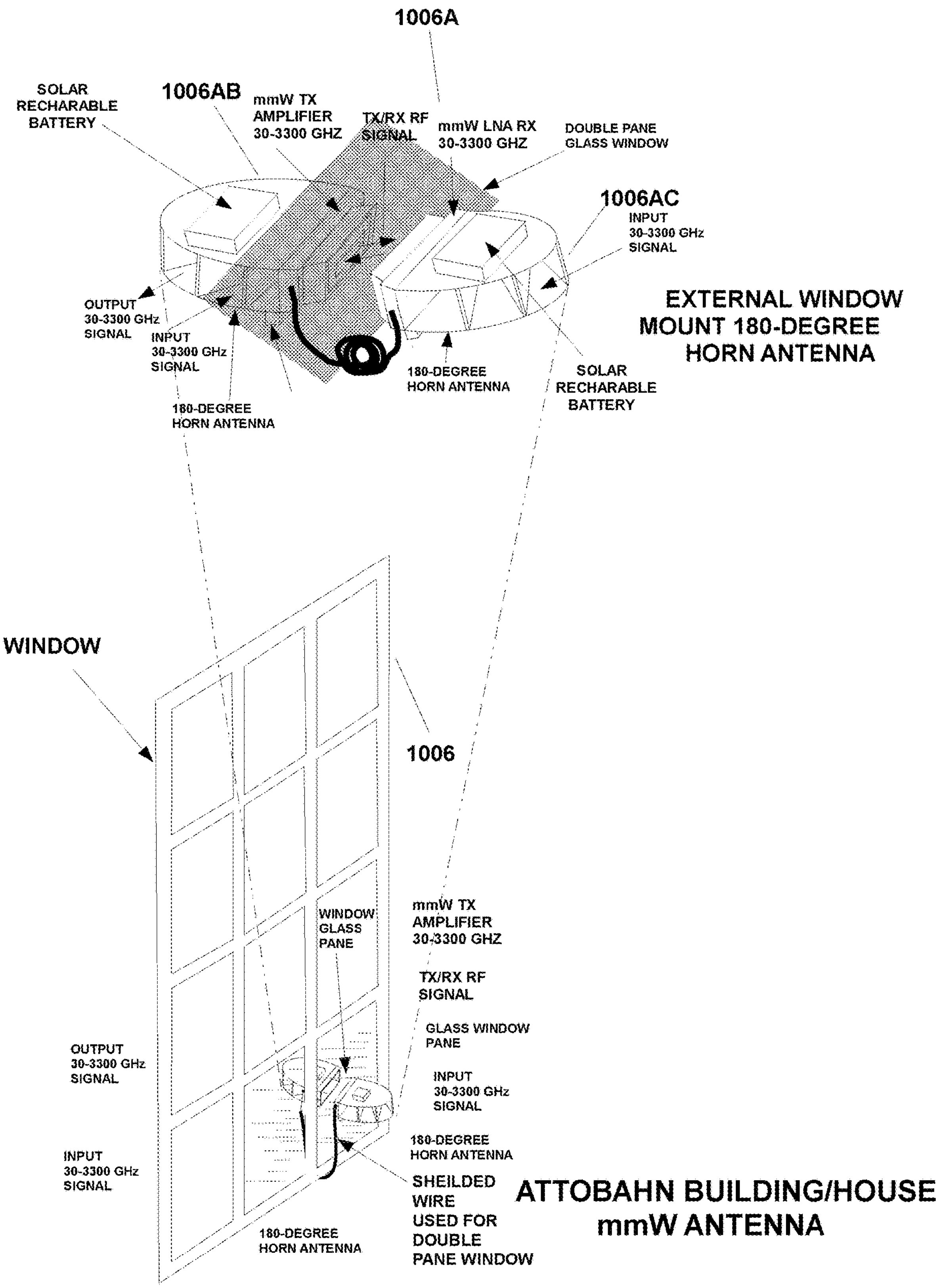
FIG. 83 is an illustration of Attobahn House External Window-Mount Millimeter Wave 180-degree Shielded-Wire antenna repeater amplifier system which is an embodiment of this invention.

The LNA signal-to-Noise ratio (S/N) 1006AG and the solar rechargeable battery charge level information 1006AH is captured and sent to the Attobahn Network Management System (ANMS) 1006AI agent in the 180-WMMA device. The ANMS output signal is sent to the nearest V-ROVER, Nano-ROVER, Atto-ROVER, or the Protonic Switch Local V-ROVER via the WiFi system 1006AJ in the 180-WMMA. The ANMS information arrives at the ROVERs WiFi receivers, where it is demodulated and pass to the APPI logical port 1. The information then traverses Attobahn network to the Millimeter Wave RF Management System at the Global Network Management Center (GNCC). 180-WMMA Inductive System Clocking & Synchronization Design As illustrated in FIG. 82 which is an embodiment to this invention, the 180-WMMA device uses recovered clock from the received mmW RF signal at the LNA. The recovered clocking signal is passed to the Phase Lock Loop (PLL) and local oscillator circuitry 805A and 805B which feds the WiFi transmitter and receiver system. The recovered clocking signal is referenced to the Attobahn Cesium Beam Atomic Clock located at the three GNCCs, that is effectively phased locked to the GP 180-WMMA Shielded-Wire Connection Design As illustrated in FIG. 83 which is an embodiment of this invention, the 180-WMMA Shielded-Wire Connection window-mount device is a 180-degree antenna amplifier repeater (360-WMMA) 1006BB. It has an omni-directional horn antenna. The indoor and out units are connected by a shielded-wire between the outdoor mmW LNA and indoor RF amplifier and associated 180-degree horn antenna. The 180-WMMA Shielded-Wire device is a Do-It-Yourself (DIY) device that is mounted on the user's window glass 1006. The antenna is mounted on the window glass both on the outside and inside as illustrated in FIG. 83 which is an embodiment of this invention. Both antenna pieces are made to adhere to the window glass by a thin self-adhesive strip on the window-side of the antenna device as illustrated in FIG. 83.

The 180-WMMA consists of two sections:

1. An outdoor 180-degree horn antenna with an integrated mmW RF LNA with a 10-dB gain. The outdoor device has a solar power rechargeable battery integrated into the unit as show in FIG. 83. The outdoor device is connected to second section of the 180-WMMA via a shielded-wire.

Figure 84:
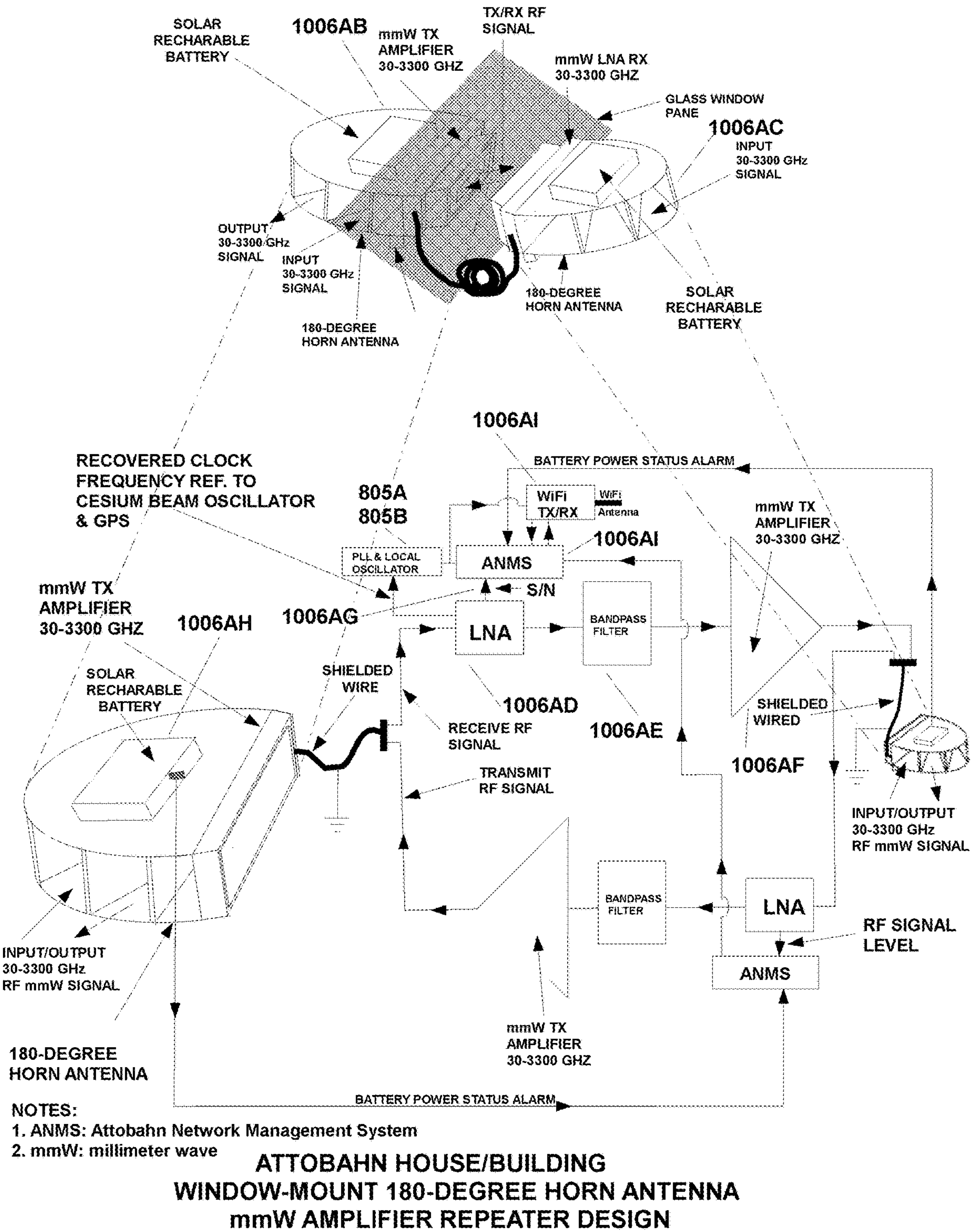
FIG. 84 is an illustration of Attobahn House External Window-Mount Millimeter Wave 180-degree Shielded-Wire antenna repeater amplifier system circuitry design which is an embodiment of this invention.

2. The second section of the 180-WMMA is an indoor device that is installed on the inside of the window. The indoor device is connected to the outdoor section via a shielded-wire. The indoor device is equipped with a 180-degree horn antenna that retransmits the mmW RF signal into the interior space of the house/building. The window-mount indoor device is also equipped with a solar rechargeable battery. 180-WMMA Shielded-Wire Circuitry Configuration As illustrated in FIG. 84 which is an embodiment of this illustration, the 180-degree WMMA 1006BB shield-wire configuration consists of 180-degree horn antenna on the external section of the device. The external horn antenna 1006AB operates in the frequency range of 30 GHz to 3300 GHz RF with an output power of 50 milliwatts to 3.0 watt. The horn antenna is integrated with its Low Noise Amplifier (LNA) 1006AD.

The received 30 GHz to 3300 GHz mmW RF signal from the horn antenna is sent to the LNA which provides a 10-dB gain and passes the amplified signal to the Transmitter amplifier 1006AE via the baseband filter 1006AF. The RF signal is connected to the indoor 180-degree indoor horn antenna 2006AC via a shielded-wire.

Figure 85:
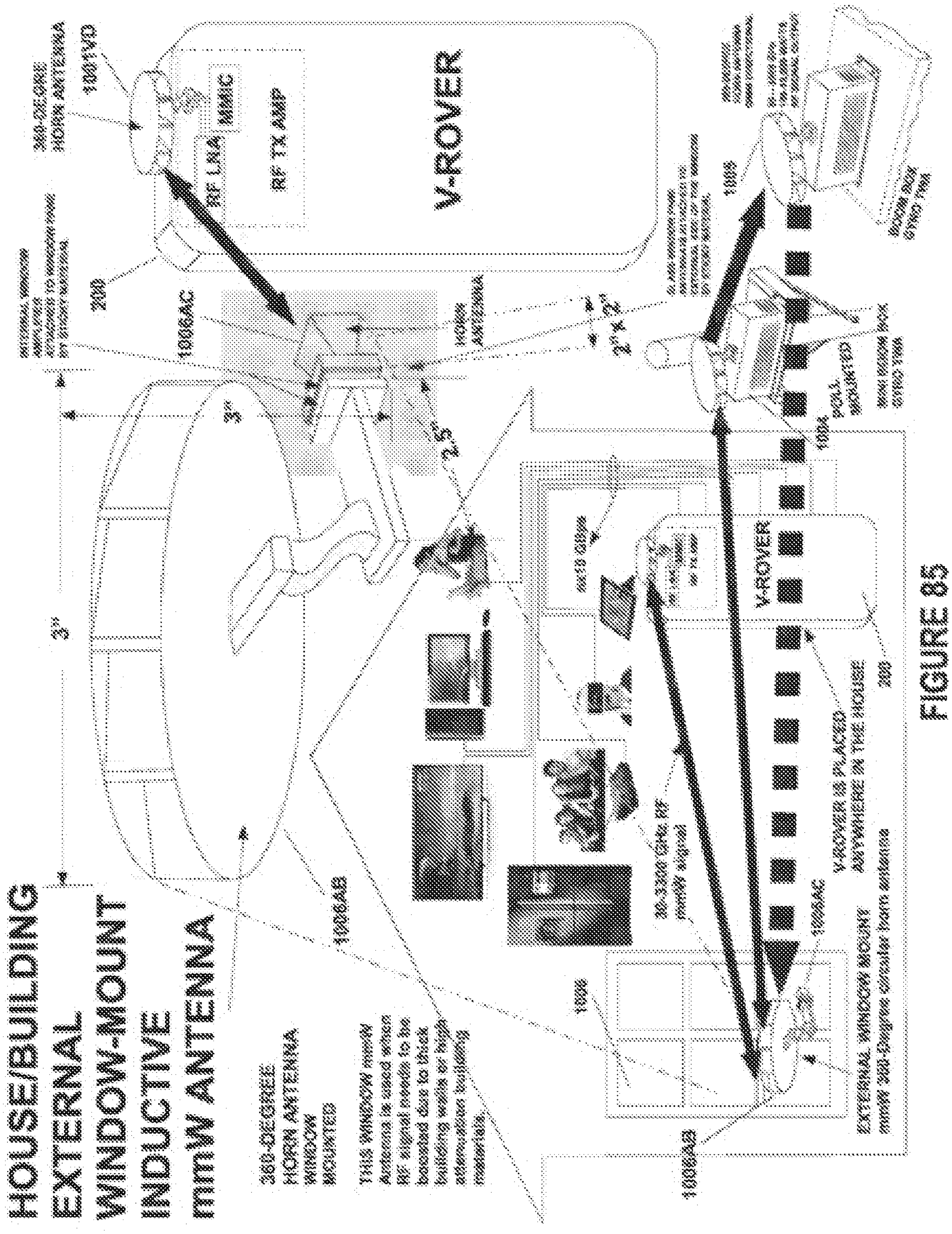
FIG. 85 is an illustration of Attobahn House External Window-Mount millimeter wave 360-degree Inductive Antenna Repeater Amplifier system and its RF transmission connection to the indoor V-ROVERs, Nano-ROVERs, Atto-ROVERs house which is an embodiment of this invention.

The LNA signal-to-Noise ratio (S/N) 1006AG and the solar rechargeable battery charge level information 1006AH is captured and sent to the Attobahn Network Management System (ANMS) 1006AI agent in the 360-WMMA device. The ANMS output signal is sent to the nearest V-ROVER, Nano-ROVER, Atto-ROVER, or the Protonic Switch Local V-ROVER via the WiFi system 1006AJ in the 180-WMMA. The ANMS information arrives at the ROVERs WiFi receivers, where it is demodulated and pass to the APPI logical port 1. The information then traverses Attobahn network to the Millimeter Wave RF Management System at the Global Network Management Center (GNCC). 180-WMMA Shielded-Wire System Clocking & Synchronization Design As illustrated in FIG. 84 which is an embodiment to this invention, the 360-WMMA device uses recovered clock from the received mmW RF signal at the LNA. The recovered clocking signal is passed to the Phase Lock Loop (PLL) and local oscillator circuitry 805A and 805B which feds the WiFi transmitter and receiver system. The recovered clocking signal is referenced to the Attobahn Cesium Beam Atomic Clock located at the three GNCCs, that is effectively phased locked to the GP 360-Inductive Window-Mount mmW Antenna Installation The Inductive 360-degree mmW Antenna (360-WMMA) design of its external 1006AB and indoor 1006AC section makes the installation process simple, by just aligning them in proximity of each other on the opposite side of the window glass. This is an illustrated in FIG. 77 which is an embodiment of this invention. The system is design with the simplicity of a Do-it-Yourself (DIY) installation process, whereby:

1. The user simply plea off the adhesive strip covering which exposes the adhesive tape on the external (outside) 1006ABO and the indoor 1006ACI sections that face the window glass pane.
2. Then firmly places the external and internal antenna pieces opposite each other onto the window glass.
3. Align the external and indoor section of the (360-WMMA). The user ensures that the two antenna pieces properly face each other on both sides of the window glass as shown in FIG. 77. 360-Shielded-Wire Window-Mount mmW Antenna Installation The Inductive 360-degree mmW Antenna (360-WMMA) design of its external (outdoor) 1006AB and indoor 1006AC sections makes the installation process simple, by just aligning them in proximity of each other on the opposite side of the window glass. This is illustrated in FIG. 79 which is an embodiment of this invention. The system is design with the simplicity of a Do-it-Yourself (DIY) installation process, whereby:

1. The user simply plea off the adhesive strip covering which exposes the adhesive tape on the external (outside) 1006ABO and the indoor 1006ACI sections that face the window glass pane.
2. Then firmly places the external and internal antenna pieces opposite each other onto the outside and inside of the window glass respectively.
3. Plug in one end of the shielded-wire to the hole on the side of the external 360-degree horn antenna. Run the shielded-wire under the window lower edge and connect the other end of the shielded-wire on the side of the indoor 20-60-degree horn antenna on the inside of the window.
4. Align the external and indoor section of the 360-WMMA. The user ensures that the two antenna pieces properly face each other on both sides of the window glass as shown in FIG. 79. 180-Inductive Window-Mount mmW Antenna Installation The Inductive 180-degree mmW Antenna (160-WMMA) design of its external (outdoor) 1006AB and indoor 1006AC sections makes the installation process simple, by just aligning them in proximity of each other on the opposite side of the window glass. This is illustrated in FIG. 81 which is an embodiment of this invention. The system is design with the simplicity of a Do-it-Yourself (DIY) installation process, whereby:

1. The user simply plea off the adhesive strip covering which exposes the adhesive tape on the external (outside) 1006ABO and the indoor 1006ACI sections that face the window glass pane.
2. Then firmly places the external and internal antenna pieces opposite each other onto the outside and inside of the window glass respectively.
3. Plug in one end of the shielded-wire to the hole on the side of the external 180-degree horn antenna. Run the shielded-wire under the window lower edge and connect the other end of the shielded-wire on the side of the indoor 180-degree horn antenna on the inside of the window.
4. Align the external and indoor section of the 180-WMMA. The user ensures that the two antenna pieces properly face each other on both sides of the window glass as shown in FIG. 81. 180-Shielded-Wire Window-Mount mmW Antenna Installation The shielded-wire 180-degree mmW Antenna (180-WMMA) design of its external (outdoor) 1006AB and indoor 1006AC sections makes the installation process simple, by just aligning them in proximity of each other on the opposite side of the window glass. This is illustrated in FIG. 83 which is an embodiment of this invention. The system is design with the simplicity of a Do-it-Yourself (DIY) installation process, whereby:

1. The user simply plea off the adhesive strip covering which exposes the adhesive tape on the external (outside) 1006ABO and the indoor 1006ACI sections that face the window glass pane.
2. Then firmly places the external and internal antenna pieces opposite each other onto the outside and inside of the window glass respectively.
3. Plug in one end of the shielded-wire to the hole on the side of the external 180-degree horn antenna. Run the shielded-wire under the window lower edge and connect the other end of the shielded-wire on the side of the indoor 180-degree horn antenna on the inside of the window.
4. Align the external and indoor section of the 180-WMMA. The user ensures that the two antenna pieces properly face each other on both sides of the window glass as shown in FIG. 83. House Window-Mount 360-Degree mmW RF Communications Inductive Design The 360-Degree mmW RF Antenna Repeater Amplifier (360-WMMA) Inductive unit 1006AA is designed to be used for homes and buildings, where the received millimeter wave RF signals from the network is low or cannot penetrate the walls. The unit provides a 10-20-dB gain between its external (outdoor) and indoor sections. Technical Specifications:

1. HORN ANTENNA ANGLE: 360-DEGREE EXTERNAL
2. HORN ANTENNA ANGLE: 20-60-DEGREE INTERVAL
3. OUTPUT POWER: 50 Milliwatts-3.0 WATTS
4. HORN ANTENNA LENGTH: 3 INCHES
5. HORN ANTENNA HEIGHT: 3 INCH
6. HORN ANTENNA WIDTH: 3 INCH
7. HORN ANTENNA WEIGHT WINDOW-FACING: 3 OUNCES
8. HORN ANTENNA WEIGHT INTERIOR FACING: 2 OUNCES FIG. 85 show the 360-WMMA 1006AA which is an embodiment of this invention. Incoming RF millimeter waves from the Gyro TWA Boom Box 1005 is received by the 360-WMMA outdoor unit 1006AB, that amplifies the signal with a 10-dB gain through its LNA. The signal is then inductively coupled to the indoor unit 1006AC of the 360-WMMA. The indoor unit amplifies the signal and transmits it out of its 20-60-degree horn antenna toward the V-ROVER, Nano-ROVER and Atto-ROVER.

The V-ROVER, Nano-ROVER, and Atto-ROVER 200 transmitted signals are received by the 360-WMMA indoor section where they are amplified and passed to the 360-degree horn antenna and transmitted out to the Gyro TWA Mini Boom Box 1004. The Mini Boom Box amplifies the millimeter wave RF signal and retransmit it to the Boom Box, where the signals are further amplified to ultra-high power. The signals are transmitted from the Boom Box to the other V-ROVERs, Nano-ROVERs, Atto-ROVERs, and Protonic Switches.

Inside the house the V-ROVER, Nano-ROVER, and Atto-ROVER is connected to the users' Touch Points devices such as tablets, laptops, PCs, smart phones, Virtual Reality units, game consoles, 4K/5K/8K TVs, etc., via high speed serial cables, WiFi and WiGi systems.

House Window-Mount 360-Degree mmW RF Communications

Shield-Wire Design

Figure 86:
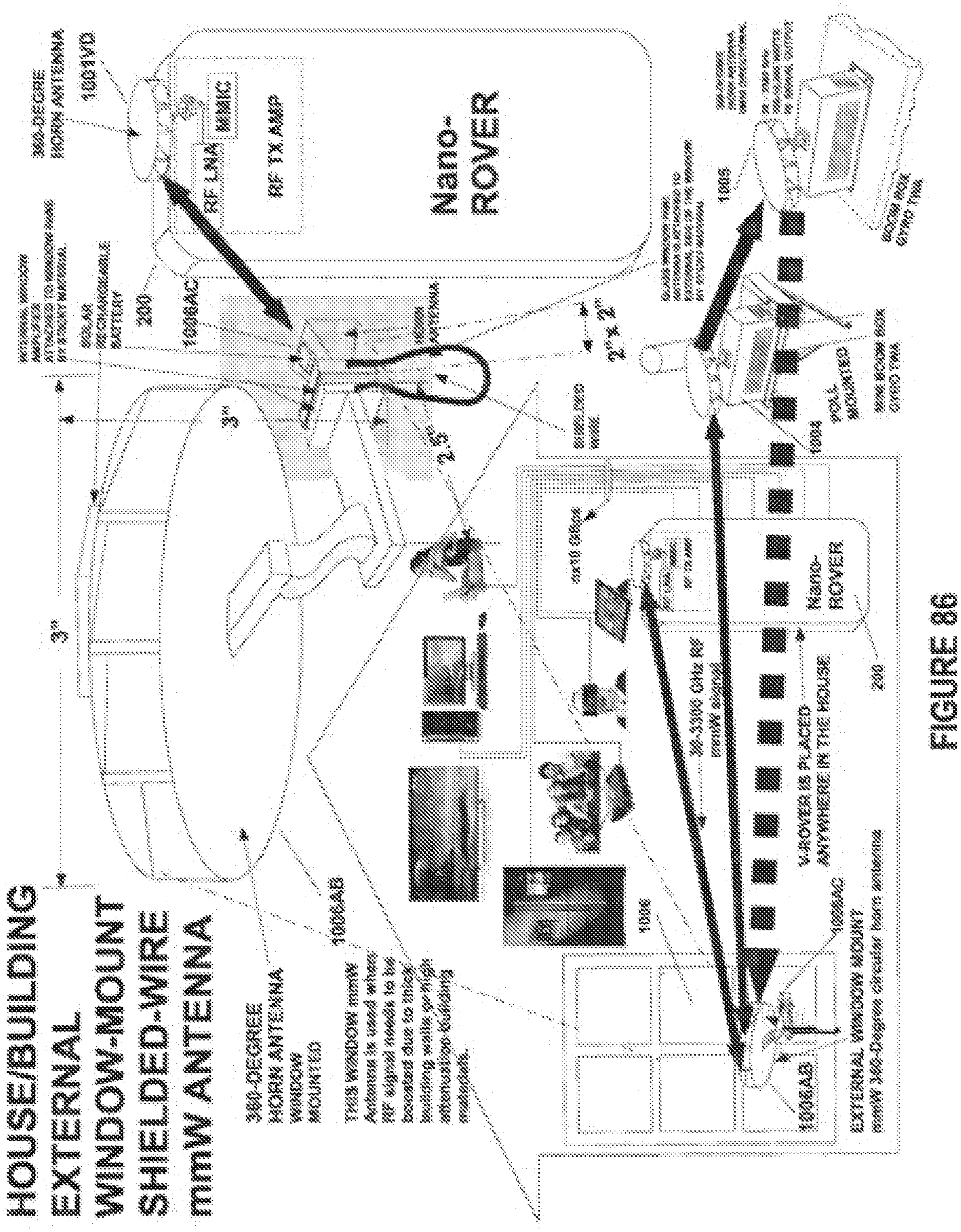
FIG. 86 is an illustration of Attobahn House External Window-Mount millimeter wave 360-degree Shielded-Wire Antenna Repeater Amplifier system and its RF transmission connection to the indoor V-ROVERs, Nano-ROVERs, Atto-ROVERs house which is an embodiment of this invention.

The 360-Degree mmW RF Antenna Repeater Amplifier (360-WMMA) Shielded-Wire unit 1006BB is designed to be used for homes and buildings, where the received millimeter wave RF signals from the network is low or cannot penetrate the walls. The unit provides a 10-20-dB gain between its external (outdoor) and indoor sections. Technical Specifications 1. HORN ANTENNA ANGLE: 360-DEGREE EXTERNAL
2. HORN ANTENNA ANGLE: 20-60-DEGREE INTERVAL
3. OUTPUT POWER: 50 Milliwatts-3.0 WATTS
4. HORN ANTENNA LENGTH: 3 INCHES
5. HORN ANTENNA HEIGHT: 3 INCH
6. HORN ANTENNA WIDTH: 3 INCH
7. HORN ANTENNA WEIGHT WINDOW-FACING: 3 OUNCES
8. HORN ANTENNA WEIGHT INTERIOR FACING: 2 OUNCES FIG. 86 show the 360-Degree mmW RF Antenna Repeater Amplifier (360-WMMA) 1006BB which is an embodiment of this invention. Incoming RF millimeter waves from the Gyro TWA Boom Box 1005 is received by the 360-WMMA outdoor unit 1006AB, that amplifies the signal with a 10-dB gain through its LNA. The signal is then inductively coupled to the indoor unit 1006AC of the 360-WMMA. The indoor unit amplifies the signal and transmits it out of its 20-60-degree horn antenna toward the V-ROVER, Nano-ROVER and Atto-ROVER 200.

The V-ROVER, Nano-ROVER, and Atto-ROVER 200 transmitted signals are received by the 360-WMMA indoor section where they are amplified and passed to the 360-degree horn antenna and transmitted out to the Gyro TWA Mini Boom Box 1004. The Mini Boom Box amplifies the millimeter wave RF signal and retransmit it to the Boom Box, where the signals are further amplified to ultra-high power. The signals are transmitted from the Boom Box to the other V-ROVERs, Nano-ROVERs, Atto-ROVERs, and Protonic Switches.

Inside the house the V-ROVER, Nano-ROVER, and Atto-ROVER is connected to the users' Touch Points devices such as tablets, laptops, PCs, smart phones, Virtual Reality units, game consoles, 4K/5K/8K TVs, etc., via high speed serial cables, WiFi and WiGi systems.

Building Ceiling-Mount 360-Degree mmW RF Communications

Inductive Design

Figure 87:
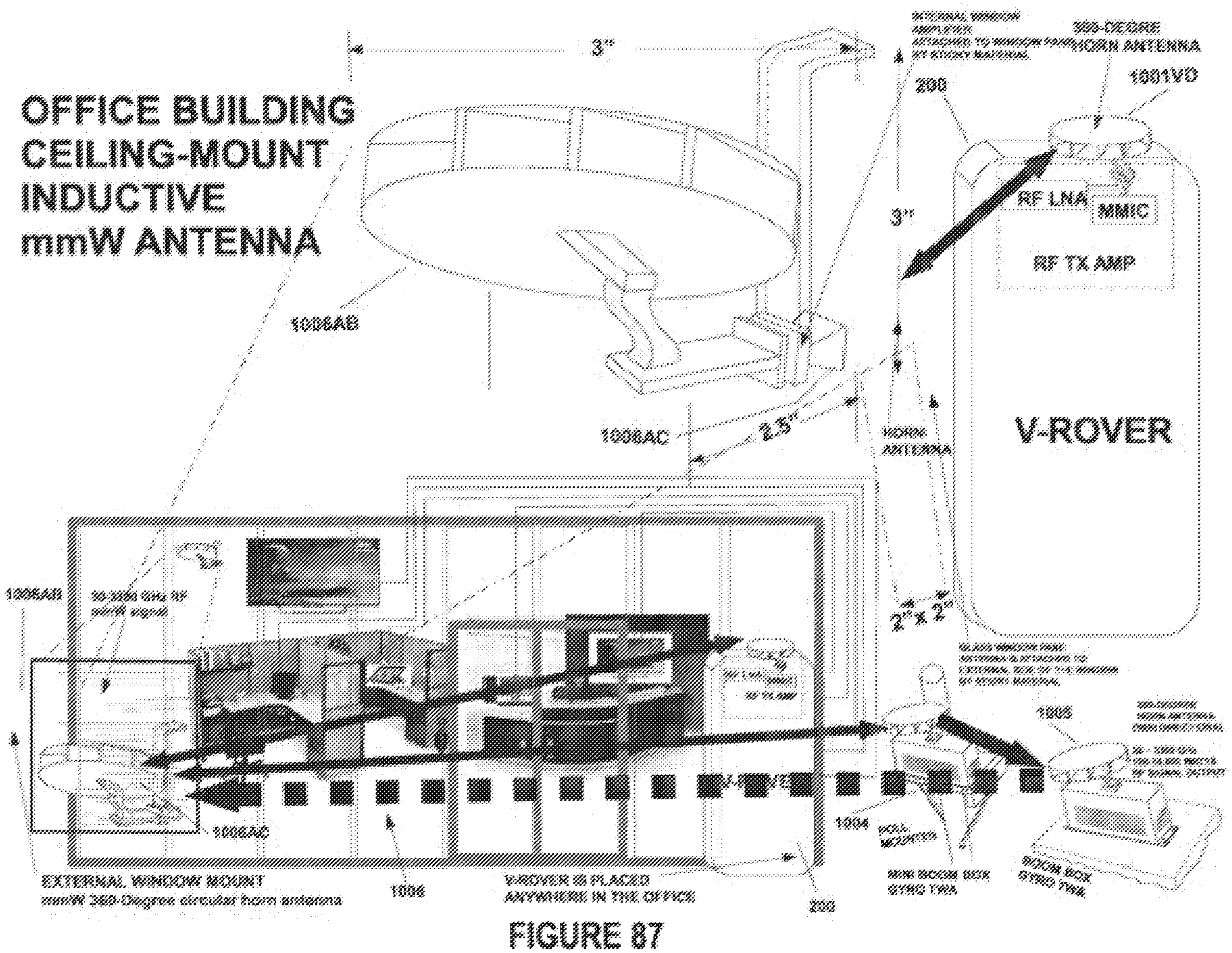
FIG. 87 is an illustration of Attobahn Office Building Internal Ceiling-Mount millimeter wave 360-degree Inductive Antenna Repeater Amplifier system and its RF transmission connection to the indoor V-ROVERs, Nano-ROVERs, Atto-ROVERs house which is an embodiment of this invention.

The 360-Degree Ceiling-Mount mmW RF Antenna Repeater Amplifier (360-CMMA) Inductive unit 1006AA is designed to be used for homes and 1-4 stories buildings, where the received millimeter wave RF signals from the network is low or cannot penetrate the walls. The unit provides a 10-20-dB gain between its window-facing and interior-facing sections. Technical Specifications 1. HORN ANTENNA ANGLE: 360-DEGREE WINDOW-FACING
2. HORN ANTENNA ANGLE: 20-60-DEGREE EXTERIOR-FACING
3. OUTPUT POWER: 50 Milliwatts-3.0 WATTS
4. HORN ANTENNA LENGTH: 3 INCHES
5. HORN ANTENNA HEIGHT: 3 INCHES
6. HORN ANTENNA WIDTH: 3 INCHES
7. HORN ANTENNA WEIGHT WINDOW-FACING: 3 OUNCES
8. HORN ANTENNA WEIGHT INTERIOR-FACING: 2 OUNCES FIG. 87 show the 360-CMMA 1006AA which is an embodiment of this invention. The 360-CMMA is mounted in the ceiling close to the office building glass window 1006. Incoming RF millimeter waves from the Gyro TWA Boom Box 1005 is received by the 360-CMMA outdoor unit 1006AB, that amplifies the signal with a 10-dB gain through its LNA. The signal is then inductively coupled to the indoor unit 1006AC of the 360-CMMA. The indoor unit amplifies the signal and transmits it out of its 20-60-degree horn antenna toward the V-ROVER, Nano-ROVER and Atto-ROVER in the building.

The V-ROVER, Nano-ROVER, and Atto-ROVER 200 transmitted signals are received by the 360-CMMA indoor section where they are amplified and passed to the 360-degree horn antenna and transmitted out to the Gyro TWA Mini Boom Box 1004. The Mini Boom Box amplifies the millimeter wave RF signal and retransmit it to the Boom Box, where the signals are further amplified to ultra-high power. The signals are transmitted from the Boom Box to the other V-ROVERs, Nano-ROVERs, Atto-ROVERs, and Protonic Switches.

Inside the 1-4 stories office building, the V-ROVER, Nano-ROVER, and Atto-ROVER is connected to the users' Touch Points devices such as tablets, laptops, PCs, smart phones, Virtual Reality units, 4K/5K/8K TVs, etc., via high speed serial cables, WiFi and WiGi systems.

House Window-Mount 180-Degree mmW RF Communications

Inductive Design

Figure 88:
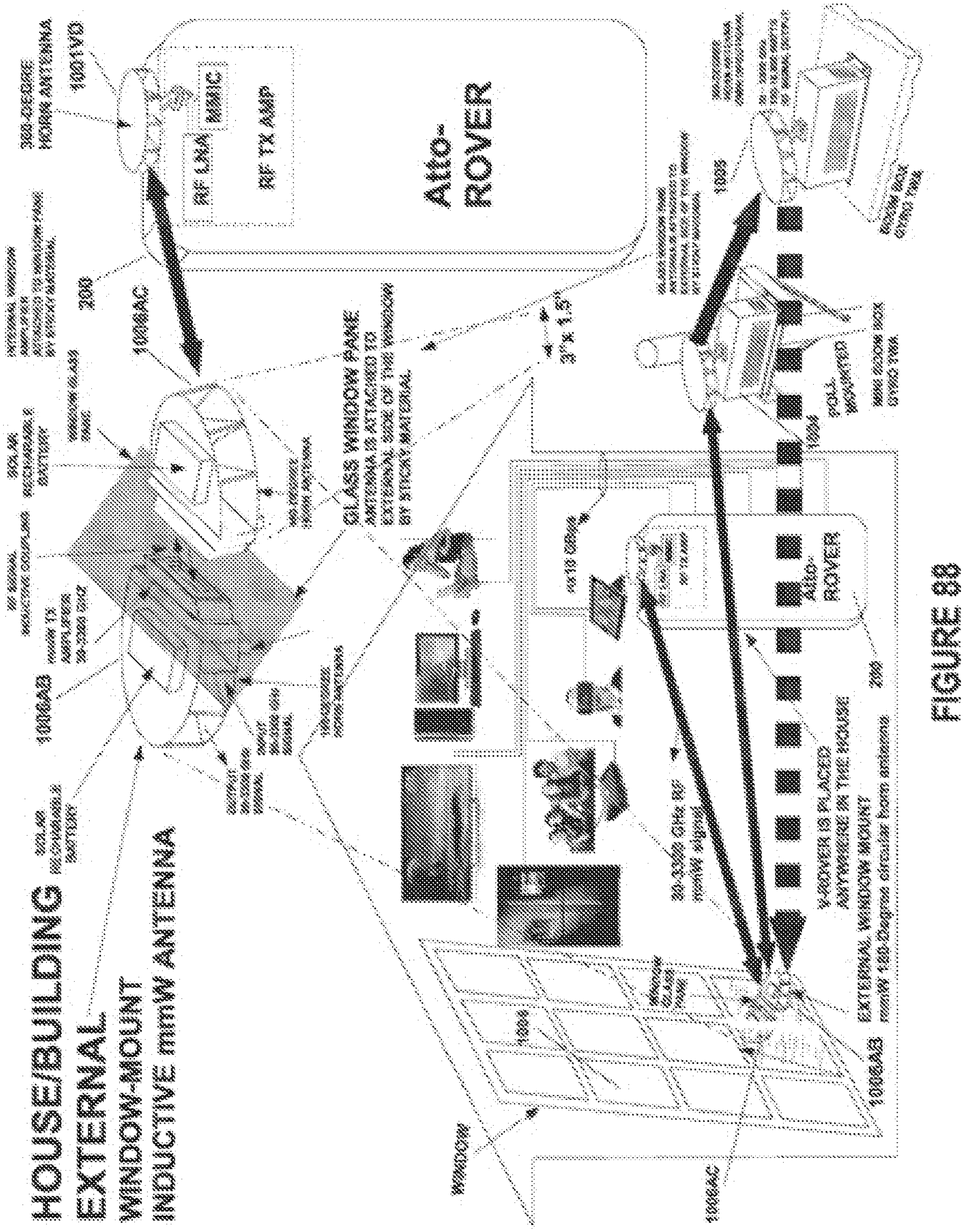
FIG. 88 is an illustration of Attobahn House External Window-Mount millimeter wave 180-degree Inductive Antenna Repeater Amplifier system and its RF transmission connection to the indoor V-ROVERs, Nano-ROVERs, Atto-ROVERs house which is an embodiment of this invention.

The 180-Degree mmW RF Antenna Repeater Amplifier (180-WMMA) Inductive unit 1006BB is designed to be used for homes and buildings, where the received millimeter wave RF signals from the network is low or cannot penetrate the walls. The unit provides a 10-20-dB gain between its external (outdoor) and indoor sections. Technical Specifications 1. HORN ANTENNA ANGLE: 180-DEGREE
2. OUTPUT POWER: 50 Milliwatts-3.0 WATT
3. HORN ANTENNA LENGTH: 2 INCHES
4. HORN ANTENNA HEIGHT: 1 INCH
5. HORN ANTENNA WIDTH: 1 INCH
6. HORN ANTENNA WEIGHT HALLWAY: 2 OUNCES
7. HORN ANTENNA WEIGHT ROOM: 2 OUNCES FIG. 88 show the 180-WMMA 1006AA which is an embodiment of this invention. Incoming RF millimeter waves from the Gyro TWA Boom Box 1005 is received by the 180-WMMA outdoor unit 1006AB, that amplifies the signal with a 10-dB gain through its LNA. The signal is then inductively coupled to the indoor unit 1006AC of the 180-WMMA. The indoor unit amplifies the signal and transmits it out of its 180-degree horn antenna toward the V-ROVER, Nano-ROVER and Atto-ROVER 200.

The V-ROVER, Nano-ROVER, and Atto-ROVER 200 transmitted signals are received by the 180-WMMA indoor section where they are amplified and passed to the 180-degree horn antenna and transmitted out to the Gyro TWA Mini Boom Box 1004. The Mini Boom Box amplifies the millimeter wave RF signal and retransmit it to the Boom Box, where the signals are further amplified to ultra-high power. The signals are transmitted from the Boom Box to the other V-ROVERs, Nano-ROVERS, Atto-ROVERs, and Protonic Switches.

Inside the house the V-ROVER, Nano-ROVER, and Atto-ROVER is connected to the users' Touch Points devices such as tablets, laptops, PCs, smart phones, Virtual Reality units, game console, 4K/5K/8K TVs, etc., via high speed serial cables, WiFi and WiGi systems.

House Window-Mount 180-Degree mmW RF Communications Shield-Wire Design

Figure 89:
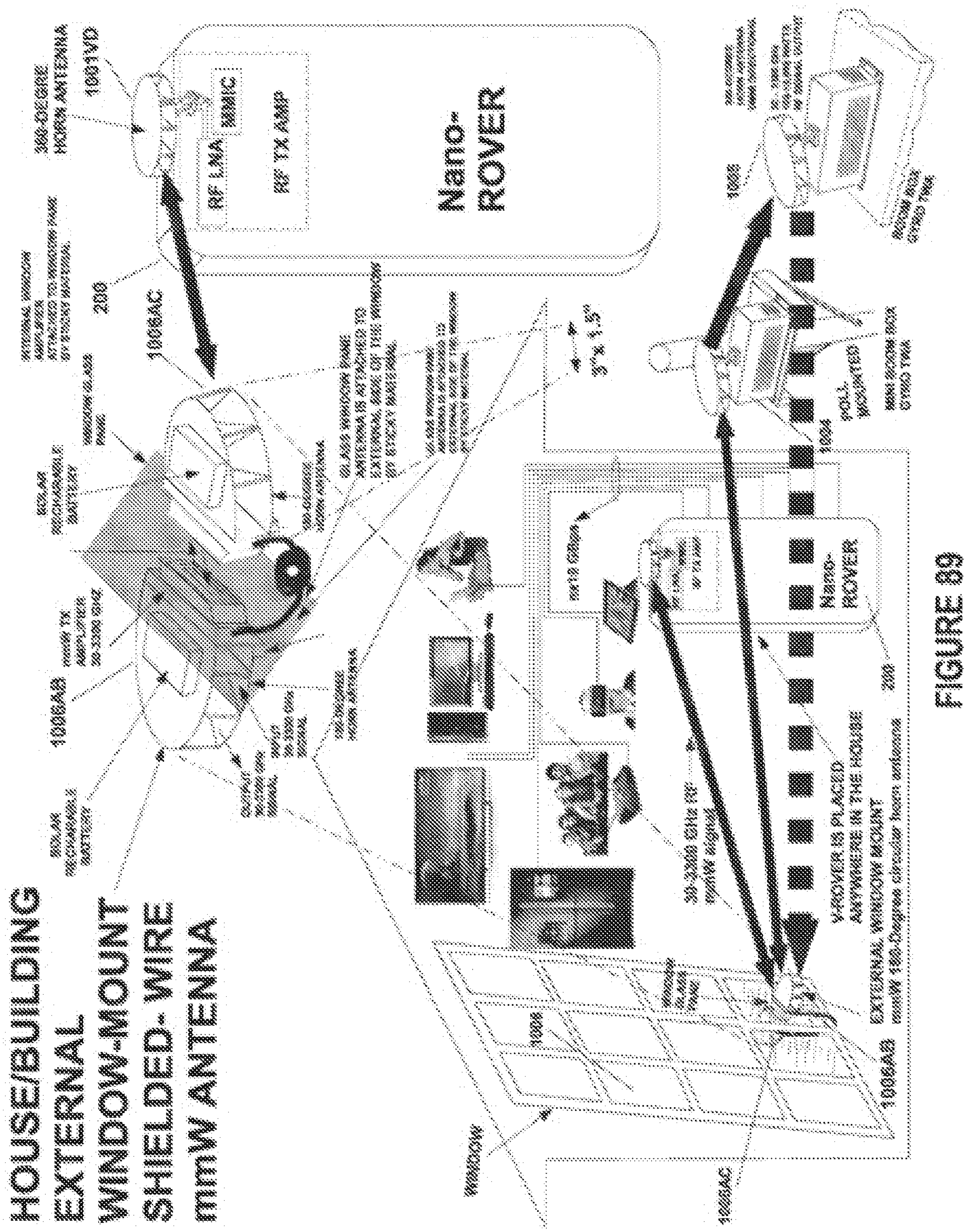
FIG. 89 is an illustration of Attobahn House External Window-Mount millimeter wave 180-degree Shielded-Wire Antenna Repeater Amplifier system and its RF transmission connection to the indoor V-ROVERs, Nano-ROVERs, Atto-ROVERs house which is an embodiment of this invention.

The 180-Degree mmW RF Antenna Repeater Amplifier (180-WMMA) Shielded-Wire unit 1006BB is designed to be used for homes and buildings, where the received millimeter wave RF signals from the network is low or cannot penetrate the walls. The unit provides a 10-20-dB gain between its external (outdoor) and indoor sections. Technical Specifications 1. HORN ANTENNA ANGLE: 180-DEGREE
2. OUTPUT POWER: 50 Milliwatts-3.0 WATT
3. HORN ANTENNA LENGTH: 2 INCHES
4. HORN ANTENNA HEIGHT: 1 INCH
5. HORN ANTENNA WIDTH: 1 INCH
6. HORN ANTENNA WEIGHT HALLWAY: 2 OUNCES
7. HORN ANTENNA WEIGHT ROOM: 2 OUNCES FIG. 89 show the 180-Degree Window-Mount mmW RF Antenna Repeater Amplifier (180-WMMA) 1006BB which is an embodiment of this invention. Incoming RF millimeter waves from the Gyro TWA Boom Box 1005 is received by the 180-WMMA outdoor unit 1006AB, that amplifies the signal with a 10-dB gain through its LNA. The signal is then sent to the indoor unit 1006AC of the 180-WMMA via shielded-wire. The indoor unit amplifies the signal and transmits it out of its 180-degree horn antenna toward the V-ROVER, Nano-ROVER and Atto-ROVER 200.

The V-ROVER, Nano-ROVER, and Atto-ROVER 200 transmitted signals are received by the 180-WMMA indoor section 1006AC where they are amplified and passed to the 180-degree horn antenna and transmitted out to the Gyro TWA Mini Boom Box 1004. The Mini Boom Box amplifies the millimeter wave RF signal and retransmit it to the Boom Box, where the signals are further amplified to ultra-high power. The signals are transmitted from the Boom Box to the other V-ROVERs, Nano-ROVERs, Atto-ROVERs, and Protonic Switches.

Inside the house the V-ROVER, Nano-ROVER, and Atto-ROVER is connected to the users' Touch Points devices such as tablets, laptops, PCs, smart phones, Virtual Reality units, game console, 4K/5K/8K TVs, etc., via high speed serial cables, WiFi and WiGi systems.

Building Ceiling-Mount 180-Degree mmW RF Communications

Inductive Design

Figure 90:
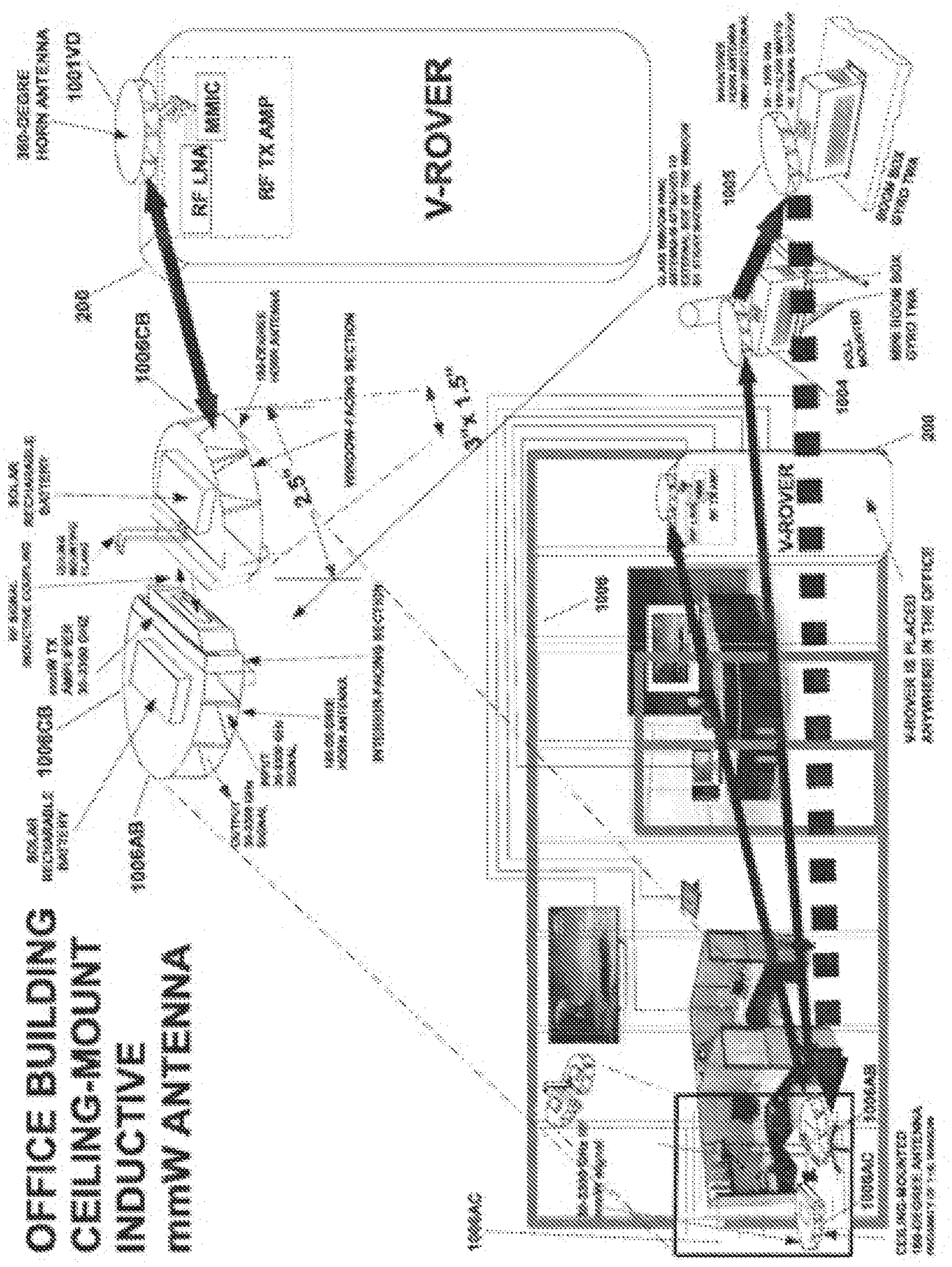
FIG. 90 is an illustration of Attobahn Office Building Internal Ceiling-Mount millimeter wave 180-degree Inductive Antenna Repeater Amplifier system and its RF transmission connection to the indoor V-ROVERs, Nano-ROVERs, Atto-ROVERs house which is an embodiment of this invention.

The 180-Degree Ceiling-Mount mmW RF Antenna Repeater Amplifier (180-CMMA) Inductive unit 1006AA is designed to be used for small office 1-4 stories buildings, where the received millimeter wave RF signals from the network is low or cannot penetrate the walls. The unit provides a 10-20-dB gain between its window-facing and interior-facing sections. Technical Specifications 1. HORN ANTENNA ANGLE: 180-DEGREE
2. OUTPUT POWER: 50 Milliwatts-3.0 WATT
3. HORN ANTENNA LENGTH: 2 INCHES
4. HORN ANTENNA HEIGHT: 1 INCH
5. HORN ANTENNA WIDTH: 1 INCH
6. HORN ANTENNA WEIGHT WINDOW-FACING: 2 OUNCES
7. HORN ANTENNA WEIGHT INTERIOR-FACING: 2 OUNCES FIG. 90 show the 180-CMMA 1006AA which is an embodiment of this invention. The 180-CMMA is mounted on the office building glass window 1006. Incoming RF millimeter waves from the Gyro TWA Boom Box 1005 is received by the 180-CMMA outdoor unit 1006AB, that amplifies the signal with a 10-dB gain through its LNA. The signal is then inductively coupled to the indoor unit 1006AC of the 180-CMMA. The indoor unit amplifies the signal and transmits it out of its 180-degree horn antenna toward the V-ROVER, Nano-ROVER and Atto-ROVER in the building.

The V-ROVER, Nano-ROVER, and Atto-ROVER 200 transmitted signals are received by the 180-CMMA interior-facing section where they are amplified and passed to the window-facing 180-degree horn antenna and transmitted out to the Gyro TWA Mini Boom Box 1004. The Mini Boom Box amplifies the millimeter wave RF signal and retransmit it to the Boom Box, where the signals are further amplified to ultra-high power. The signals are transmitted from the Boom Box to the other V-ROVERs, Nano-ROVERs, Atto-ROVERs, and Protonic Switches.

Figure 91:
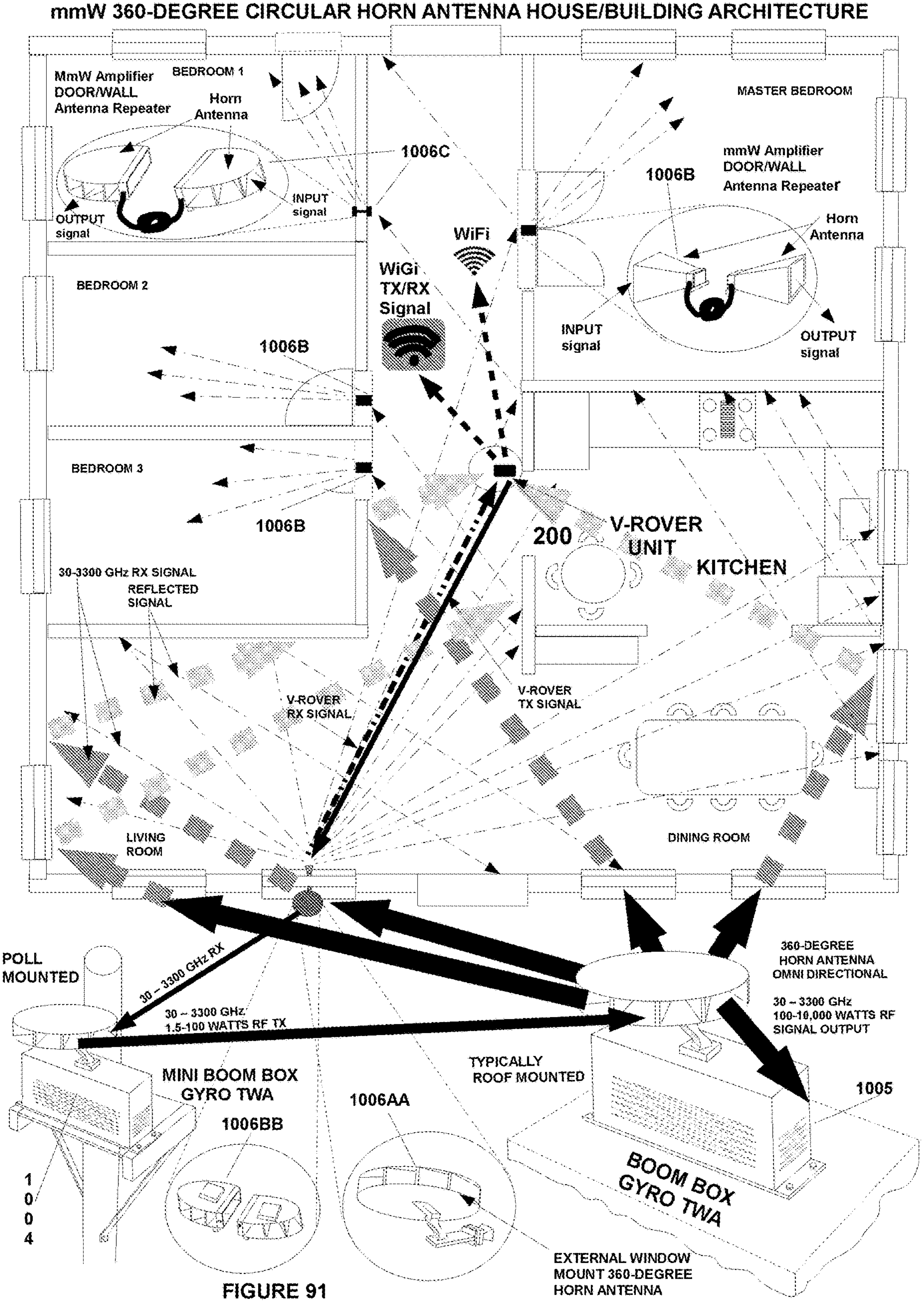
FIG. 91 is an illustration of Attobahn House External Window-Mount millimeter wave 360-degree antenna amplifier repeater architecture and its RF transmission connection to the Mini Boom Box Gyro TWAs and the Boom Box Gyro TWAs and the indoor V-ROVERs, Nano-ROVERs, Atto-ROVERs, door/wall mmW Antenna Repeater, and the Touch Point devices throughout the house which is an embodiment of this invention.

Inside the office building, the V-ROVER, Nano-ROVER, and Atto-ROVER is connected to the users' Touch Points devices such as tablets, laptops, PCs, smart phones, Virtual Reality units, 4K/5K/8K TVs, etc., via high speed serial cables, WiFi and WiGi systems. mmW House & Building Distribution Design The mmW House & Building Distribution Design as illustrated in FIG. 91 which is an embodiment of this invention. The design takes into consideration:

1. The received mmW RF signals and how they are distributed throughout the house;
2. The transmit mmW signals from the V-ROVERs, Nano-ROVERs, Atto-ROVERs, and Protonic Switches and how there are concentrated by the Window-Mount 360-WMMA 1006AA and 180-WMMA 1006BB mmW Antenna Amplifier Repeaters.

Received mmW RF Distribution

Incoming mmW RF signals from the Gyro TWA Boom Box 1005 enter the 360-WMMA 1006AA or the 180-WMMA 1006BB antenna on the window. The signal is amplified and retransmitted to the interior of the house via the 20-60-degree or 180-degree horn antenna section of the unit. The signals permeate the area close to the window and surrounding areas through open passage ways as illustrated in FIG. 91.

In cases where the mmW RF signals cannot penetrate the walls because they are too thick, contain materials that significantly absorb these signals, or have electromagnetic shielding effects, the design uses Door-Mount and Wall-Mount Antenna Amplifier Repeaters to get the signals into rooms and other areas of the house.

Door & Wall Mount Antennae Repeater Amplifiers

As illustrated in FIG. 91 which is an embodiment of this invention, the mmW RF Door-Mount Antenna Repeater Amplifier (DMMA) 1006B receives the millimeter wave RF signals from the 360-WMMA 1006AB or 180-WMMA 1006AC, amplifies these signals, and retransmit them into the room that it serves. Any Attobahn mmW device such as V-ROVER, Nano-ROVER, Atto-ROVER 200 of Touch Point device can pick up the amplified millimeter wave signals that enter the room.

The mmW RF Wall-Mount Antenna Amplifier Repeaters (WLMA) 1006C receives the millimeter wave RF signals from the 360-WMMA or 180-WMMA via one of its horn antenna on the wall facing the WMMAs, amplifies these signals, and retransmit them via its other antenna in the interior area on the other side of the wall into the room that it serves. Any Attobahn mmW device such as V-ROVER, Nano-ROVER, Atto-ROVER 200 of Touch Point device 1007 can pick up the amplified millimeter wave signals that enter the room.

RF retransmitted signals from the Window-Mount 360-WMMA and 180-WMMA 1006AB and 1006AC into the house are also received directly by the V-ROVER, Nano-ROVER, Atto-ROVER 200, or Protonic Switch 300 directly or via reflections off the walls of the house as illustrated in FIG. 91.

The ultra-high power mmW RF signal from the Boom Box 1005 is powerful enough to penetrate most house walls and directly or via reflections off the walls reach the V-ROVER. Nano-ROVER, Atto-ROVER 200 or Protonic Switch 300 in the house.

mmW RF Door-Mount Antennae Amplifier Repeater

Figure 92:
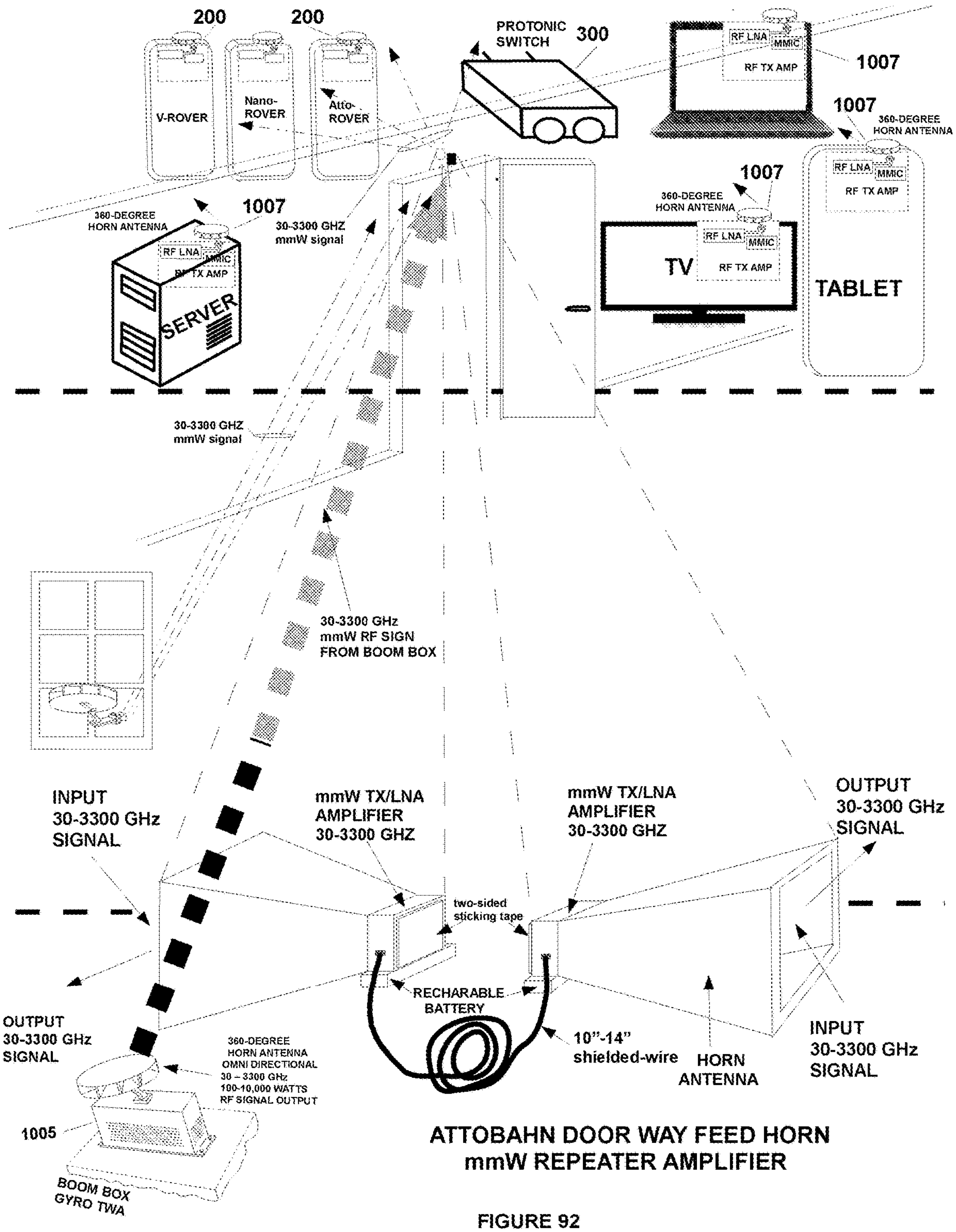
FIG. 92 is an illustration of the Attobahn Door Way 20-60-degree Shielded-Wire Feed Horn Millimeter Wave Repeater Amplifier which is an embodiment of this invention.

The two designs of the Door-Mount Antenna Amplifier Repeater consist:

1. The 20-60-Degree Door-Mount Antenna Amplifier Repeater (20-60-DMMA).
2. The 180-Degree Door Mount Antenna Amplifier (180-DMMA). mmW 20-60-Degree Door Mount Antenna The 20-60-Degree Door-Mount Antenna Amplifier Repeater (20-60-DMMA) 1006B is mounted above the doorway as illustrated in FIG. 92 which is an embodiment of this invention. Technical Specifications 1. HORN ANTENNA ANGLE: 20-60-DEGREE
2. OUTPUT POWER: 50 Milliwatts-2.0 WATT
3. HORN ANTENNA LENGTH: 2 INCHES
4. HORN ANTENNA HEIGHT: 1 INCH
5. HORN ANTENNA WIDTH: 1 INCH
6. HORN ANTENNA WEIGHT HALLWAY: 2 OUNCES
7. HORN ANTENNA WEIGHT ROOM: 2 OUNCES The 20-60-DMMA 1006B has a hallway horn antenna 1006BA that receives and transmit millimeter wave signals to the 360-WMMA and the 180-WMMA mounted on the window. The hallway horn antenna 1006BA also can receive the ultra-high power millimeter wave signals from the Boom Box 1005 that may have penetrate through the walls of the house as shown in FIG. 92. The hallway antenna section amplifies the millimeter wave signals and pass them on to the room horn antenna 1006BC. The room horn antenna further amplifies the RF signals and retransmit them into the room toward the V-ROVERs, Nano-ROVERs, Atto-ROVERs, Protonic Switches, and Touch Point devices that are equipped with Attobahn millimeter wave RF circuitry.

mmW 20-60-Degree Door-Mounted Antenna Circuit Configuration

Figure 93:
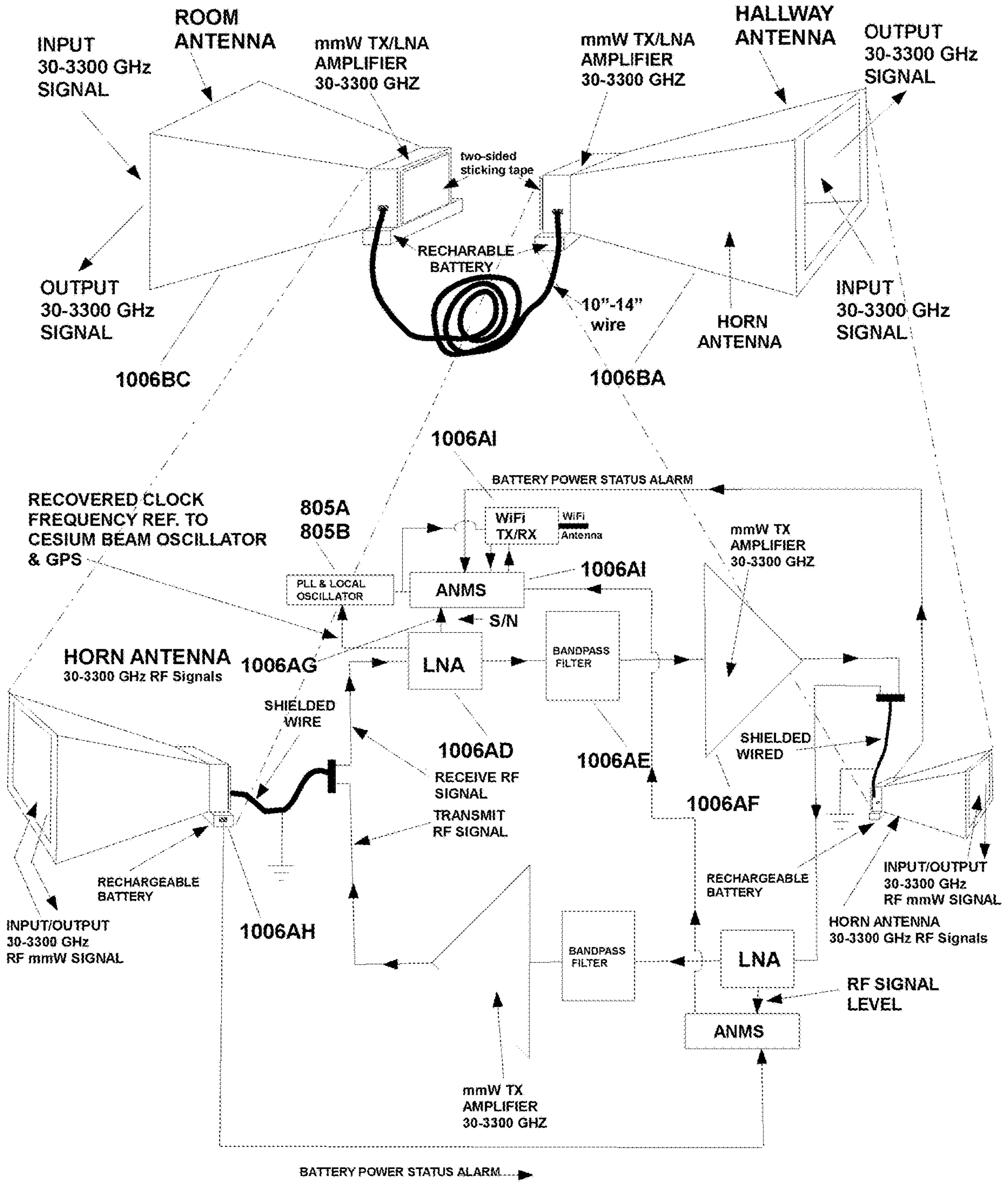
FIG. 93 is an illustration of the Attobahn Door Way 20-60-degree Shielded-Wire Feed Horn Millimeter Wave Repeater Amplifier circuitry design which is an embodiment of this invention.

As illustrated in FIG. 93 which is am embodiment of this illustration, the 20-60-degree DMMA (20-60-DMMA) 1006B shielded-wire circuit configuration consists of 20-60-degree horn antenna 1006BA on the hallway section of the device. The hallway horn antenna 1006BA operates in the frequency range of 30 GHz to 3300 GHz RF with an output power of 50 Milliwatts to 2.0 watts. The horn antenna is integrated with its Low Noise Amplifier (LNA) 1006BD.

The received 30 GHz to 3300 GHz mmW RF signal from the 20-60-degree horn antenna is sent to the LNA which provides a 10-dB gain and passes the amplified signal to the Transmitter Amplifier 1006BE via the baseband filter 1006BF. The RF signal is connected to the 20-60-degree room horn antenna 2006BC via a shielded-wire.

The LNA signal-to-Noise ratio (S/N) 1006AG and the solar rechargeable battery charge level information 1006AH is captured and sent to the Attobahn Network Management System (ANMS) 1006AI agent in the 360-WMMA device. The ANMS output signal is sent to the nearest V-ROVER, Nano-ROVER, Atto-ROVER, or the Protonic Switch Local V-ROVER via the WiFi system 1006AJ in the 360-WMMA. The ANMS information arrives at the ROVERs WiFi receivers, where it is demodulated and pass to the APPI logical port 1. The information then traverses Attobahn network to the Millimeter Wave RF Management System at the Global Network Management Center (GNCC). 20-60-DMMA System Clocking & Synchronization Design As illustrated in FIG. 93 which is an embodiment to this invention, the 20-60-DMMA device uses recovered clock from the received mmW RF signal at the LNA. The recovered clocking signal is passed to the Phase Lock Loop (PLL) and local oscillator circuitry 805A and 805B which feds the WiFi transmitter and receiver system. The recovered clocking signal is referenced to the Attobahn Cesium Beam Atomic Clock located at the three GNCCs, that is effectively phased locked to the GPS. 20-60-Degree Door-Mount mmW Antenna Installation The 20-60-Degree Door-Mount Antenna Amplifier Repeater (20-60-DMMA) 1006B hallway and room antennae sections make the installation process simple, by just aligning them on the opposite side of the door upper cross trim 100661. This is illustrated in FIG. 93 which is an embodiment of this invention. The system is design with the simplicity of a Do-it-Yourself (DIY) installation process, whereby: 1. The user simply plea off the adhesive strip covering which exposes the adhesive tape on the hallway antenna 1006BA and the room antenna 1006BC sections as shown in FIG. 93.

Figure 94:
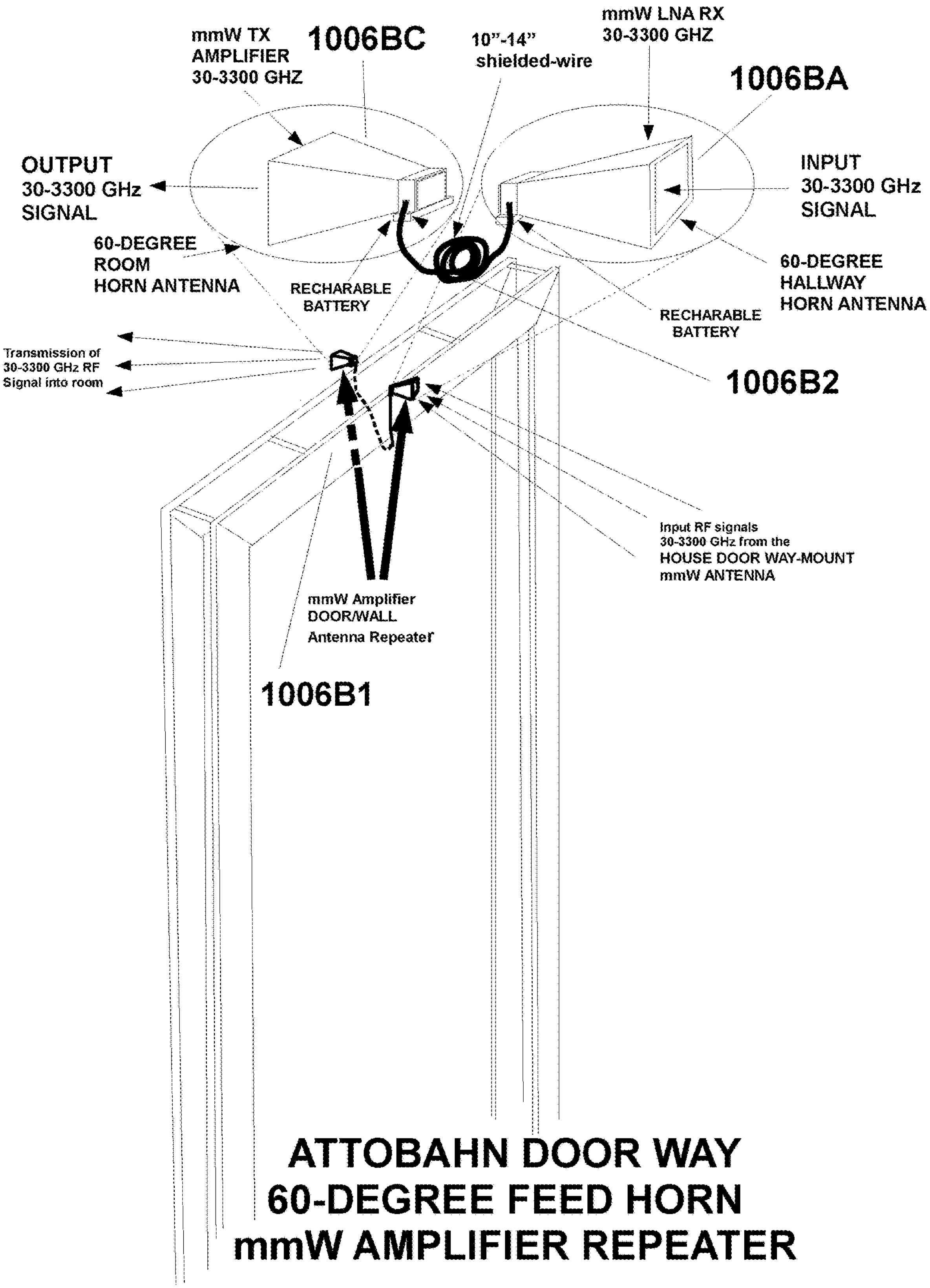
FIG. 94 is an illustration of the Attobahn Door Way 20-60-degree Shielded-Wire Feed Horn Millimeter Wave Repeater Amplifier installation configuration which is an embodiment of this invention.
Figure 95:
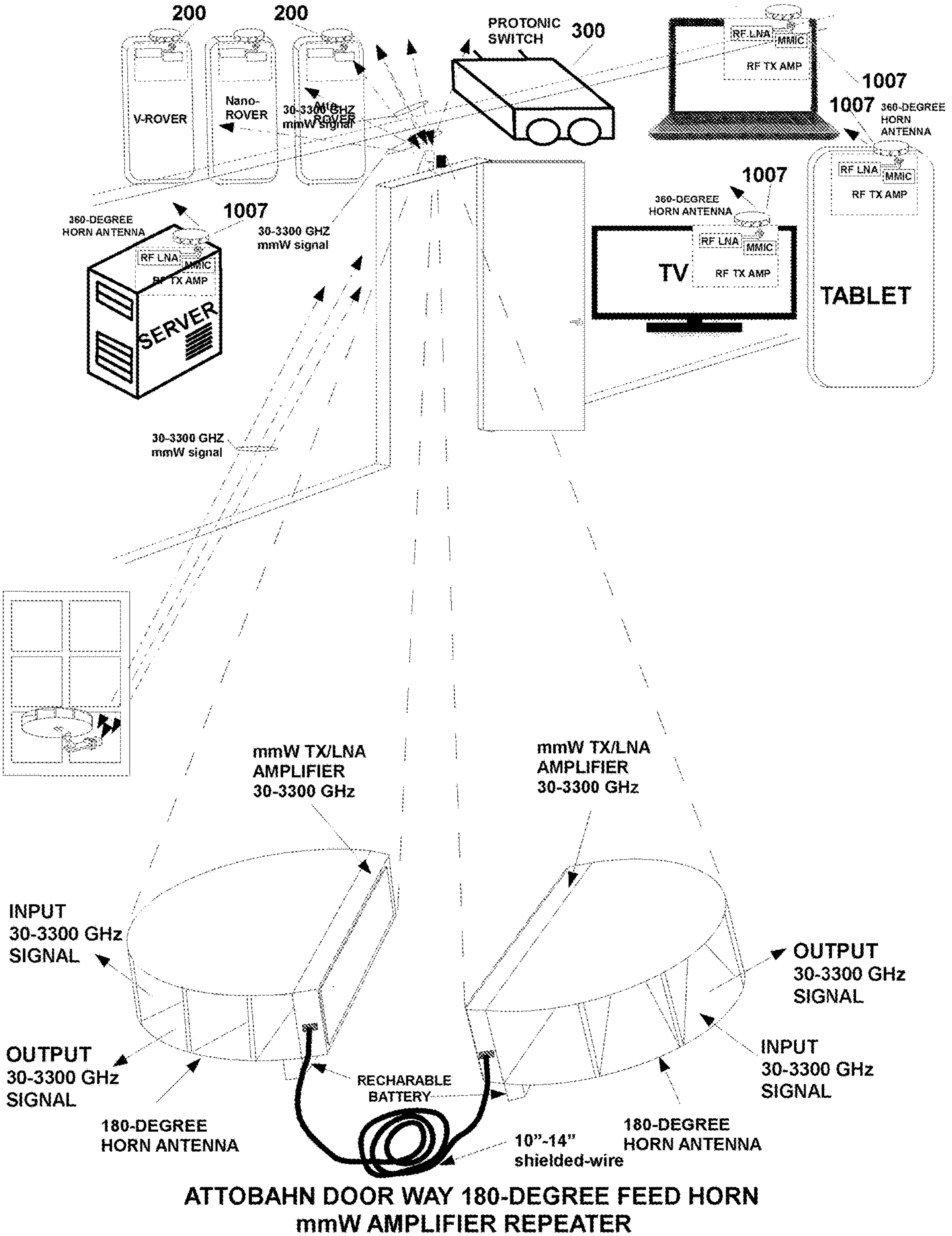
FIG. 95 is an illustration of the Attobahn Door Way 180-degree Shielded-Wire Feed Horn Millimeter Wave Repeater Amplifier which is an embodiment of this invention.

2. Then firmly places the hallway and room antenna pieces opposite each other onto the door upper trim of the doorway as shown in FIG. 93.
3. Plug in one end of the shielded-wire 1006132 to the hole on the side of the hallway 20-60-degree horn antenna. Run the shielded-wire under the doorway lower edge and connect the other end of the shielded-wire on the side of the room 20-60-degree horn antenna on the inside of the doorway.
4. Align the hallway and room section of the 20-60-DMMA. The user ensures that the two antenna pieces properly face each other on both sides of the door as shown in FIG. 93. mmW 180-Degree Door Mount Antenna The 180-Degree Door-Mount Antenna Amplifier Repeater (180-DMMA) 1006C is mounted above the doorway as illustrated in FIG. 94 which is an embodiment of this invention. Technical Specifications 1. HORN ANTENNA ANGLE: 180-DEGREE
2. OUTPUT POWER: 50 Milliwatts-2.0 WATT
3. HORN ANTENNA LENGTH: 2 INCHES
4. HORN ANTENNA HEIGHT: 1 INCH
5. HORN ANTENNA WIDTH: 1 INCH
6. HORN ANTENNA WEIGHT HALLWAY: 2 OUNCES
7. HORN ANTENNA WEIGHT ROOM: 2 OUNCES The 180-DMMA 1006C has a hallway horn antenna 1006CA that receives and transmit millimeter wave signals to the 360-WMMA 1006AB and the 180-WMMA 1006AC mounted on the window. The hallway horn antenna 1006CA also can receive the ultra-high power millimeter wave signals from the Boom Box 1005 that may have penetrate through the walls of the house as shown in FIG. 93. The hallway antenna section amplifies the millimeter wave signals and pass them on to the room horn antenna 1006CB. The room horn antenna further amplifies the RF signals and retransmit them into the room toward the V-ROVERs, Nano-ROVERs, Atto-ROVERs 200, Protonic Switches, and Touch Point devices 1007 that are equipped with Attobahn millimeter wave RF circuitry.

mmW 180-Degree Door-Mounted Antenna Circuit Configuration

Figure 96:
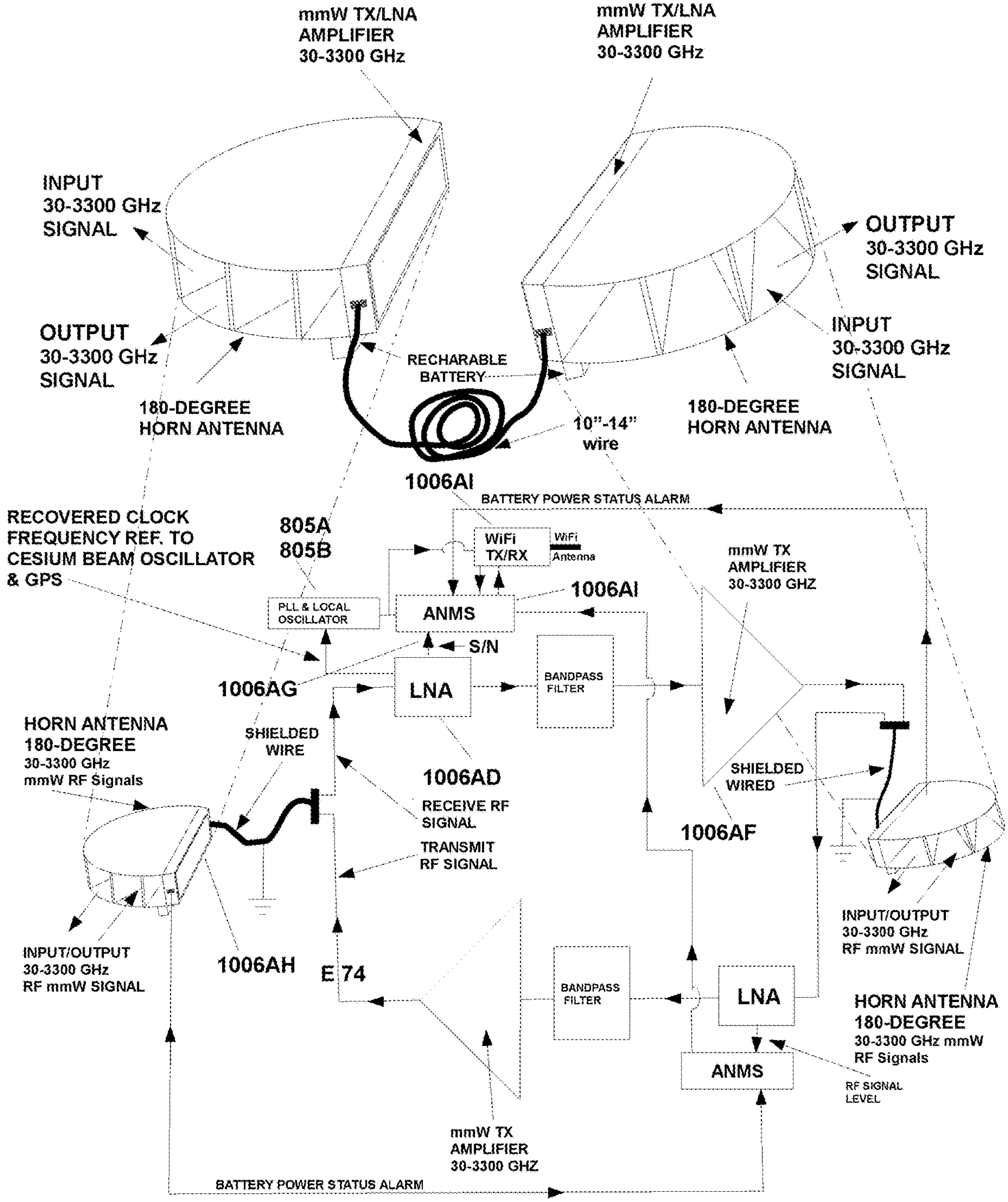
FIG. 96 is an illustration of the Attobahn Door Way 180-degree Shielded-Wire Feed Horn Millimeter Wave Repeater Amplifier circuitry design which is an embodiment of this invention.

As illustrated in FIG. 96 which is am embodiment of this illustration, the 180-degree DMMA (180-DMMA) 1006C shielded-wire circuit configuration consists of 180-degree horn antenna 1006CA on the hallway section of the device. The hallway horn antenna 1006CA operates in the frequency range of 30 GHz to 3300 GHz RF with an output power of 50 Milliwatts to 2.0 watts. The horn antenna is integrated with its Low Noise Amplifier (LNA) 1006CD.

The received 30 GHz to 3300 GHz mmW RF signal from the 180-degree horn antenna is sent to the LNA which provides a 10-dB gain and passes the amplified signal to the Transmitter Amplifier 1006CE via the baseband filter 1006CF. The RF signal is connected to the 180-degree room horn antenna 2006CC via a shielded-wire.

Figure 97:
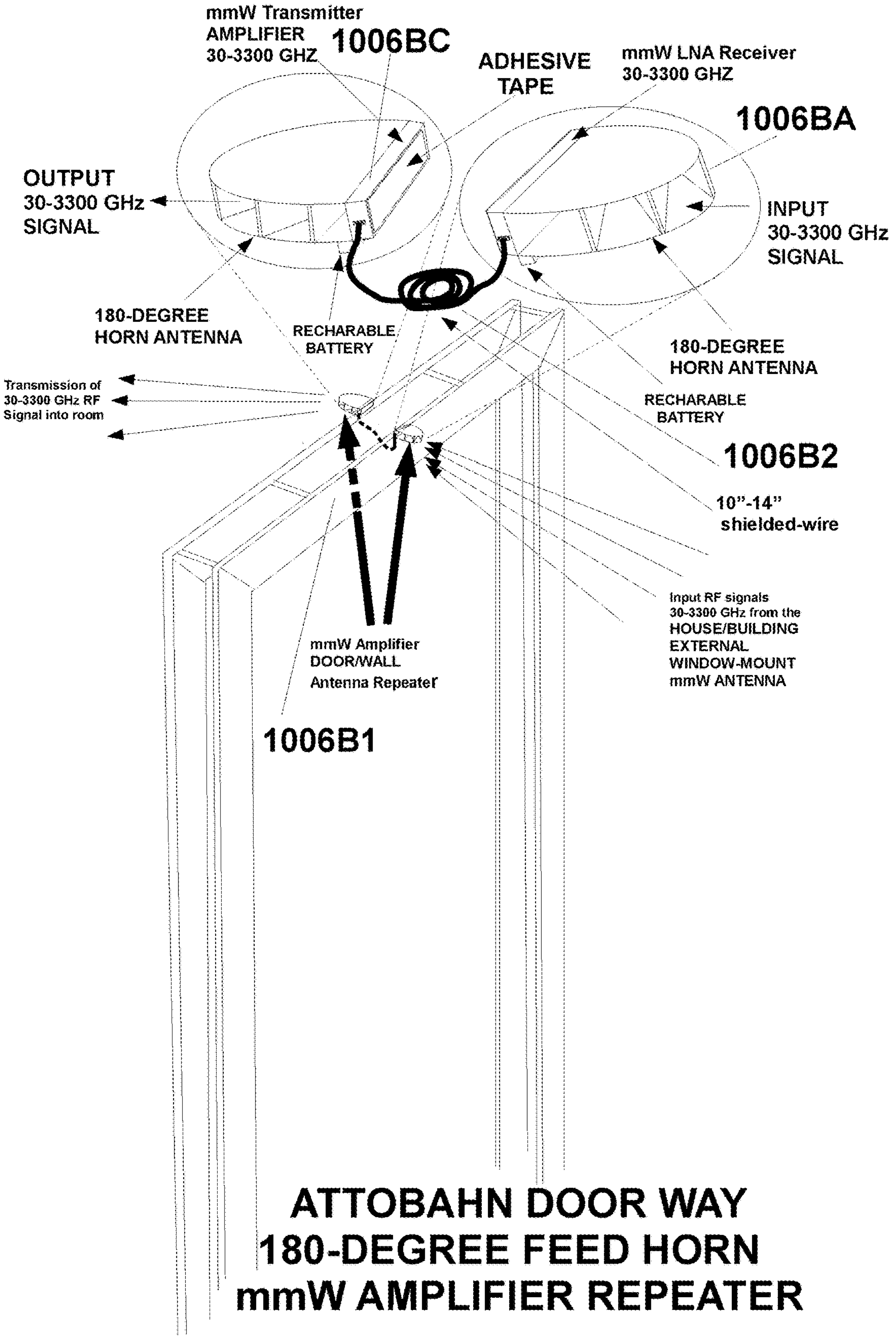
FIG. 97 is an illustration of the Attobahn Door Way 180-degree Shielded-Wire Feed Horn Millimeter Wave Repeater Amplifier installation configuration which is an embodiment of this invention.
Figure 98:
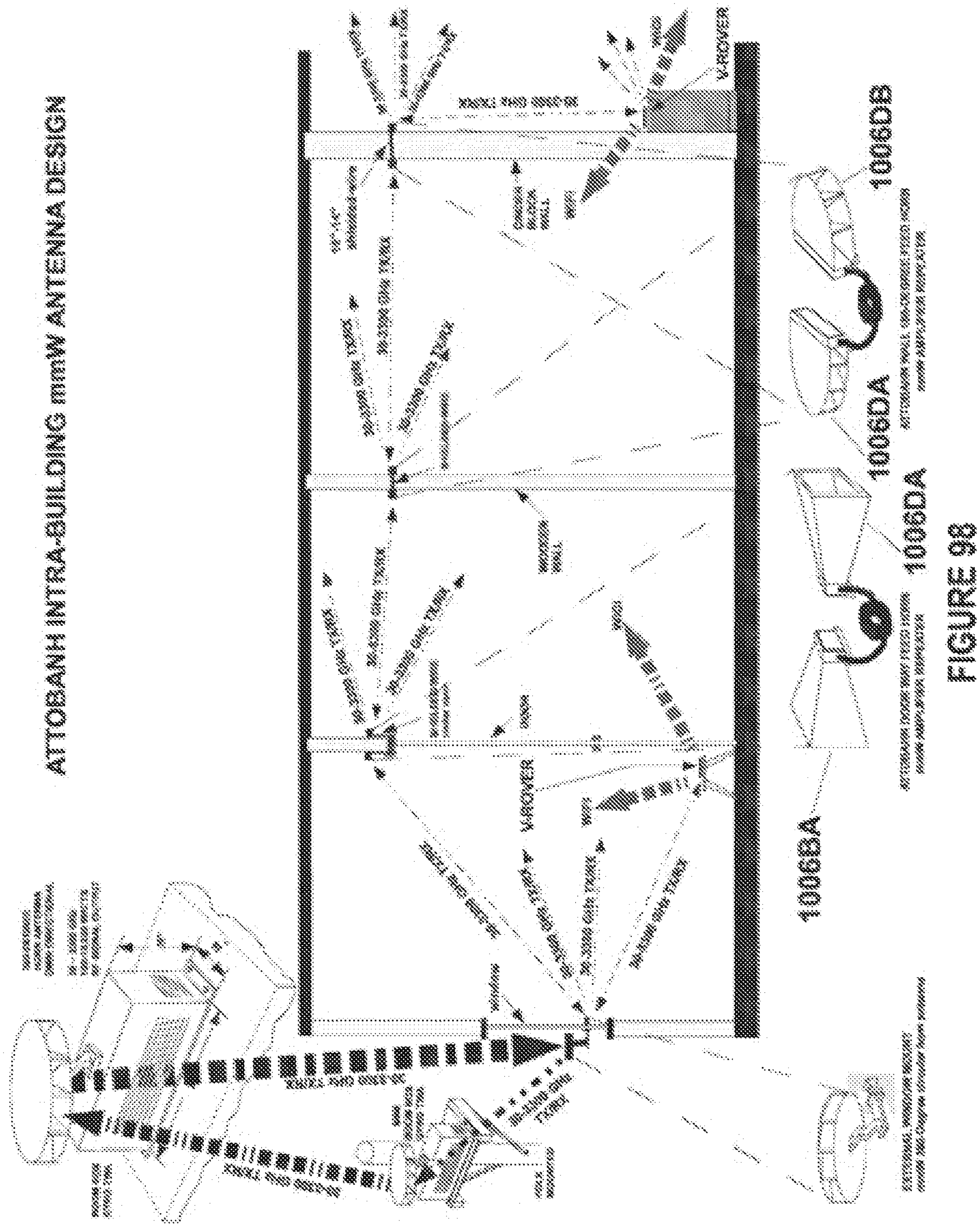
FIG. 98 is an illustration of the 180-Degree Wall-Mount Antenna Amplifier Repeater mounted on the outside and inside walls of the room which is an embodiment of this invention.

The LNA signal-to-Noise ratio (S/N) 1006CG and the solar rechargeable battery charge level information 1006CH is captured and sent to the Attobahn Network Management System (ANMS) 1006CI agent in the 360-WMMA device. The ANMS output signal is sent to the nearest V-ROVER, Nano-ROVER, Atto-ROVER, or the Protonic Switch Local V-ROVER via the WiFi system 1006CJ in the 360-WMMA. The ANMS information arrives at the ROVERS WiFi receivers, where it is demodulated and pass to the APPI logical port 1. The information then traverses Attobahn network to the Millimeter Wave RF Management System at the Global Network Management Center (GNCC). 180-DMMA System Clocking & Synchronization Design As illustrated in FIG. 96 which is an embodiment to this invention, the 180-DMMA device uses recovered clock from the received mmW RF signal at the LNA. The recovered clocking signal is passed to the Phase Lock Loop (PLL) and local oscillator circuitry 805A and 805B which feds the WiFi transmitter and receiver system. The recovered clocking signal is referenced to the Attobahn Cesium Beam Atomic Clock located at the three GNCCs, that is effectively phased locked to the GPS. 180-Degree Door-Mount mmW Antenna Installation The 180-Degree Door-Mount Antenna Amplifier Repeater (180-DMMA) 1006C hallway and room antennae sections make the installation process simple, by just aligning them on the opposite side of the door upper cross trim 1006C1. This is illustrated in FIG. 97 which is an embodiment of this invention. The system is design with the simplicity of a Do-it-Yourself (DIY) installation process, whereby:

1. The user simply plea off the adhesive strip covering which exposes the adhesive tape on the hallway antenna 1006CA and the room antenna 1006CB sections as shown in FIG. 97.
2. Then firmly places the hallway and room antenna pieces opposite each other onto the door upper trim of the doorway as shown in FIG. 97.
3. Plug in one end of the shielded-wire 1006B2 to the hole on the side of the hallway 180-degree horn antenna 1006CA. Run the shielded-wire under the doorway lower edge and connect the other end of the shielded-wire on the side of the room 180-degree horn antenna 1006CB on the inside of the doorway.
4. Align the hallway and room section of the 180-DMMA. The user ensures that the two antenna pieces properly face each other on both sides of the door as shown in FIG. 97. mmW RF Wall-Mount Antennae Amplifier Repeater The 180-Degree Wall-Mount Antenna Amplifier Repeater (180-WAMA) 1006D is mounted on the outside and inside walls of the room as illustrated in FIG. 98 which is an embodiment of this invention. Technical Specifications 1. HORN ANTENNA ANGLE OUTSIDE WALL: 180-GREE
2. HORN ANTENNA ANGLE INSIDE WALL: 180-DEGREE
3. OUTPUT POWER: 50 Milliwatts-2.0 WATT
4. HORN ANTENNA LENGTH: 2 INCHES
5. HORN ANTENNA HEIGHT: 1 INCH
6. HORN ANTENNA WIDTH: 1 INCH
7. HORN ANTENNA WEIGHT HALLWAY: 2 OUNCES
8. HORN ANTENNA WEIGHT ROOM: 2 OUNCES The 180-WAMA 1006D has an outside room wall antenna 1006DA that receives and transmit millimeter wave signals from and to the 360-WMMA 1006AB and the 180-WMMA 1006AC mounted on the window. The outside room wall antenna 1006DA also can receive the ultra-high power millimeter wave signals from the Boom Box 1005 that may have penetrate through the walls of the house or building as shown in FIG. 97.0. The outside room wall antenna section amplifies the millimeter wave signals and pass them on to the inside room wall horn antenna 1006CB via a shielded-wire. The inside room wall horn antenna further amplifies the RF signals and retransmit them into the room toward the V-ROVERs, Nano-ROVERs, Atto-ROVERs 200, Protonic Switches, and Touch Point devices 1007 that are equipped with Attobahn millimeter wave RF circuitry.

mmW 180-Degree Wall-Mounted Antenna Circuit Configuration

Figure 99:
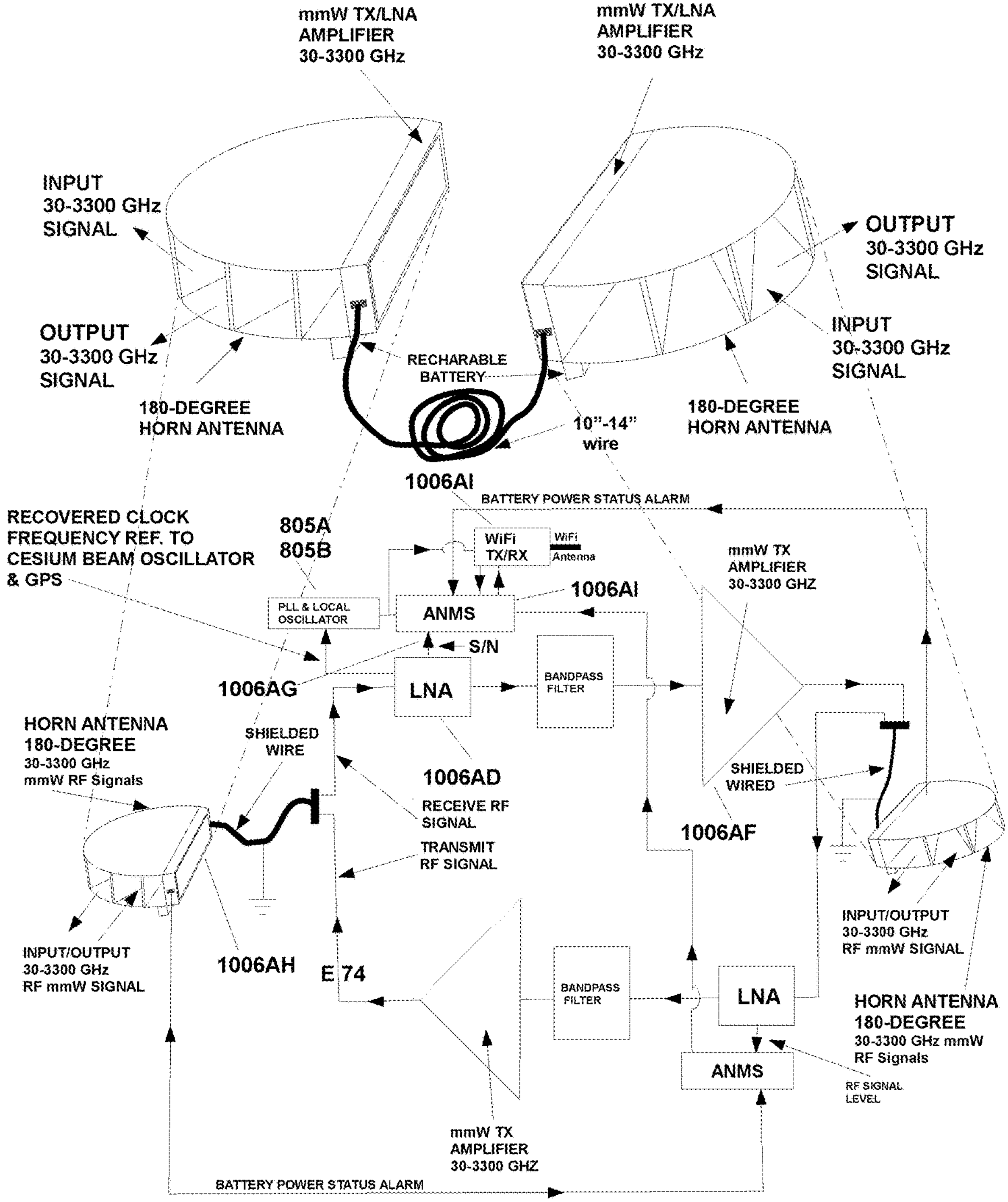
FIG. 99 is an illustration of the Attobahn Wall-Mount 180-degree Shielded-Wire Feed Horn Millimeter Wave Repeater Amplifier circuitry design which is an embodiment of this invention.

As illustrated in FIG. 99 which is am embodiment of this illustration, the 180-degree WAMA (180-WAMA) 1006D shielded-wire circuit configuration consists of 180-degree horn antenna 1006DA on the outside room wall section of the device. The outside room wall horn antenna 1006DA operates in the frequency range of 30 GHz to 3300 GHz RF with an output power of 50 Milliwatts to 2.0 watts. The horn antenna is integrated with its Low Noise Amplifier (LNA) 1006CD.

The received 30 GHz to 3300 GHz mmW RF signal from the 180-degree horn antenna is sent to the LNA which provides a 10-dB gain and passes the amplified signal to the Transmitter Amplifier 1006DE via the baseband filter 1006DF. The RF signal is connected to the 180-degree room horn antenna 2006DB via a shielded-wire.

Figure 100:
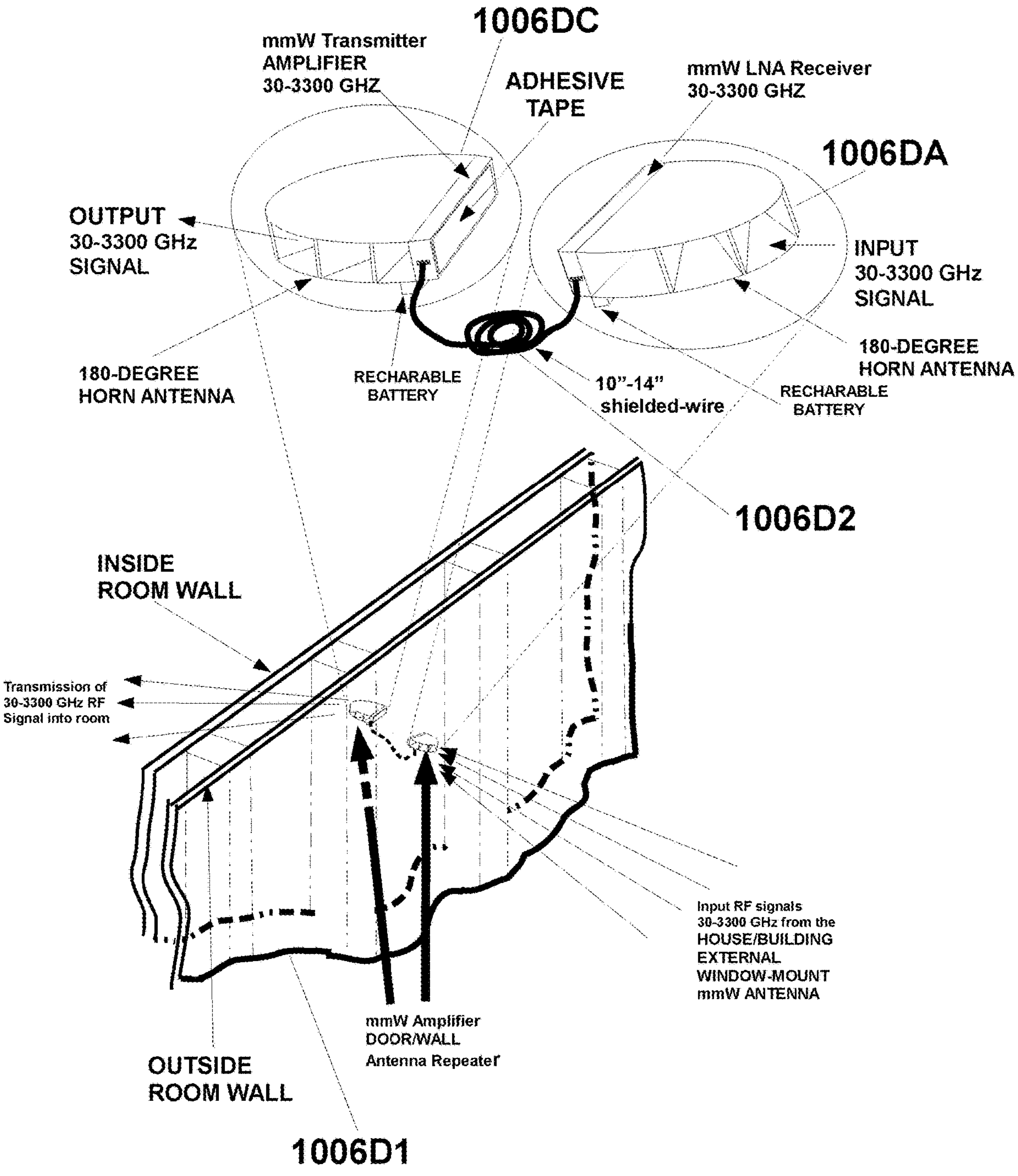
FIG. 100 is an illustration of the Attobahn Wall-Mount 180-degree Shielded-Wire Feed Horn Millimeter Wave Repeater Amplifier installation configuration which is an embodiment of this invention.
Figure 101:
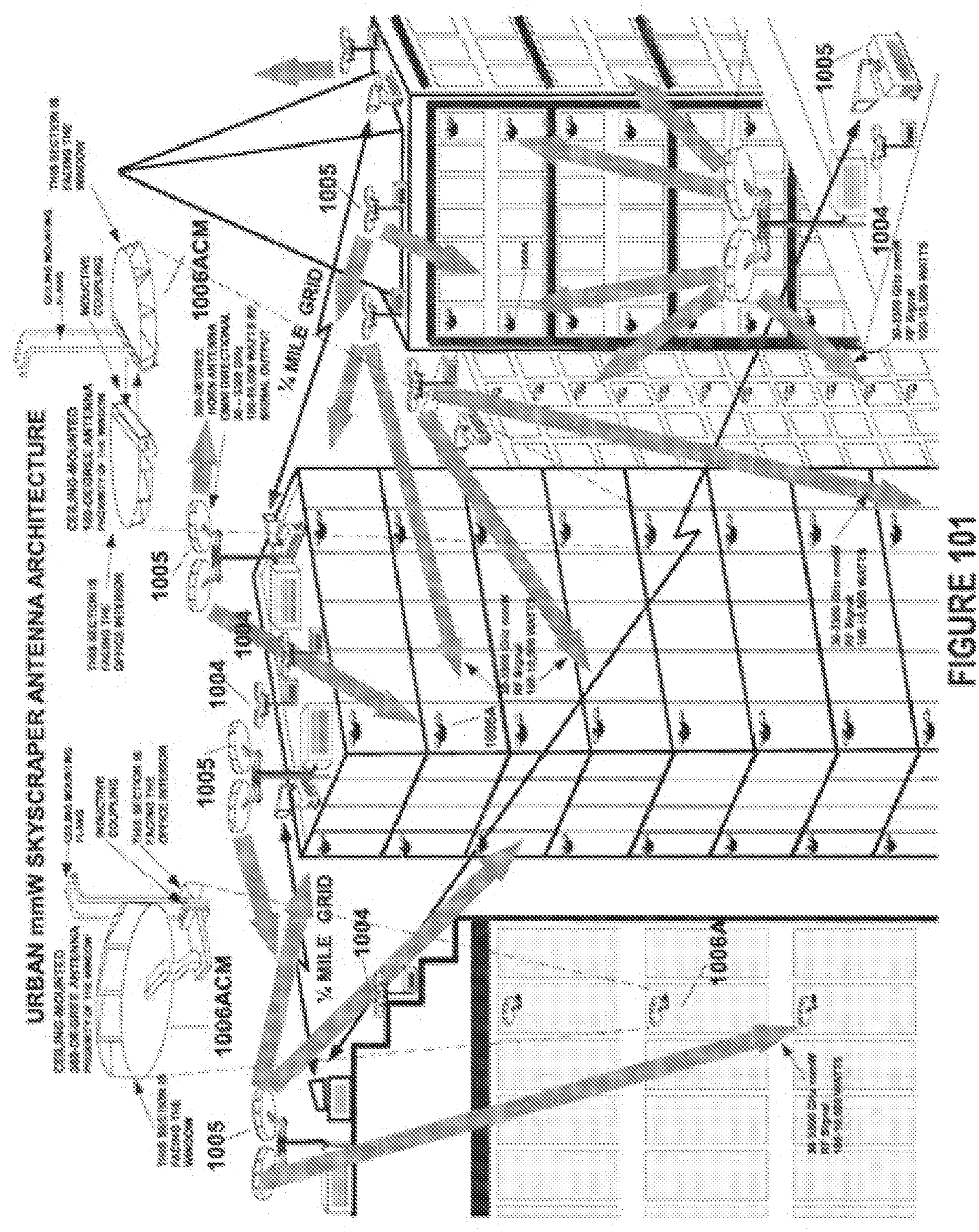
FIG. 101 illustrates the Attobahn Urban Skyscraper Antenna Architecture design which is an embodiment of this invention.

The LNA signal-to-Noise ratio (S/N) 100DG and the solar rechargeable battery charge level information 1006DH is captured and sent to the Attobahn Network Management System (ANMS) 1006DI agent in the 360-WMMA device. The ANMS output signal is sent to the nearest V-ROVER, Nano-ROVER, Atto-ROVER, or the Protonic Switch Local V-ROVER via the WiFi system 1006DJ in the 360-WMMA. The ANMS information arrives at the ROVERs WiFi receivers, where it is demodulated and pass to the APPI logical port 1. The information then traverses Attobahn network to the Millimeter Wave RF Management System at the Global Network Management Center (GNCC). 180-WAMA Shielded-Wire System Clocking & Synchronization Design As illustrated in FIG. 99 which is an embodiment to this invention, the 180-WAMA device uses recovered clock from the received mmW RF signal at the LNA. The recovered clocking signal is passed to the Phase Lock Loop (PLL) and local oscillator circuitry 805A and 805B which feds the WiFi transmitter and receiver system. The recovered clocking signal is referenced to the Attobahn Cesium Beam Atomic Clock located at the three GNCCs, that is effectively phased locked to the GPS. 180-Degree Wall-Mount mmW Antenna Installation The 180-Degree Wall-Mount Antenna Amplifier Repeater (180-WAMA) 1006D outside room wall and inside room wall antennae sections make the installation process simple, by just aligning them on the opposite sides of the walls 1006D1. This is illustrated in FIG. 100 which is an embodiment of this invention. The system is design with the simplicity of a Do-it-Yourself (DIY) installation process, whereby:

1. The user simply plea off the adhesive strip covering which exposes the adhesive tape on the outside room wall antenna 1006DA and the inside room wall antenna 1006DB sections as shown in FIG. 100.
2. Then firmly place the inside and outside room walls antenna pieces opposite each other onto the walls as shown in FIG. 100.
3. Drill a ¼ inch hole through the wall on aligned the spots on the outside room wall and the inside room wall where the two antennae sections will be installed.
4. Plug in one end of the shielded-wire 1006D2 into the hole on the side of the outside room wall 180-degree horn antenna 1006DA. Run the shielded-wire through the hole in the wall and connect the other end of the shielded-wire into the side of the inside room wall 180-degree horn antenna 1006DB.
5. Align the outside room wall of the 180-WAMA. The user ensures that the two antenna pieces properly face each other on both sides of the wall as shown in FIG. 99. Urban Skyscraper Building Antenna Architecture Attobahn Urban Skyscraper Antenna Architecture design consists of multiple strategically positioned Gyro TWA Boom Boxes systems equipped with 360-degree omni-directional and line-of-sight horn antennae. The architecture is illustrated in FIG. 101 which is an embodiment of this invention.

The Ultra-High Power Gyro TWA Boom Boxes systems 1005 are positioned on the highest buildings in the city in ¼-mile grids. These Boom Boxes omni-directional 360-degree horn antenna directs the ultra-high power millimeter wave RF signals in every direction toward the neighboring buildings within their grid. The power of these signals is strong enough to penetrate most building walls and double-window panes to be received by the indoor ceiling-mounted mmW RF Antenna Repeater Amplifier (CMMA) 1006A that are located on each office floor (or apartment/condo).

There are two types of ceiling-mounted mmW RF Antenna Repeater Amplifier (CMMA) devices.

1. Ceiling-Mount 360-Degree mmW RF Antenna Repeater Amplifier.
2. Ceiling-Mount 180-Degree mmW RF Antenna Repeater Amplifier.

Buildings Ceiling-Mount 360-Degree mmW RF Antenna Repeater Amplifier

Inductive Design

Figure 102:
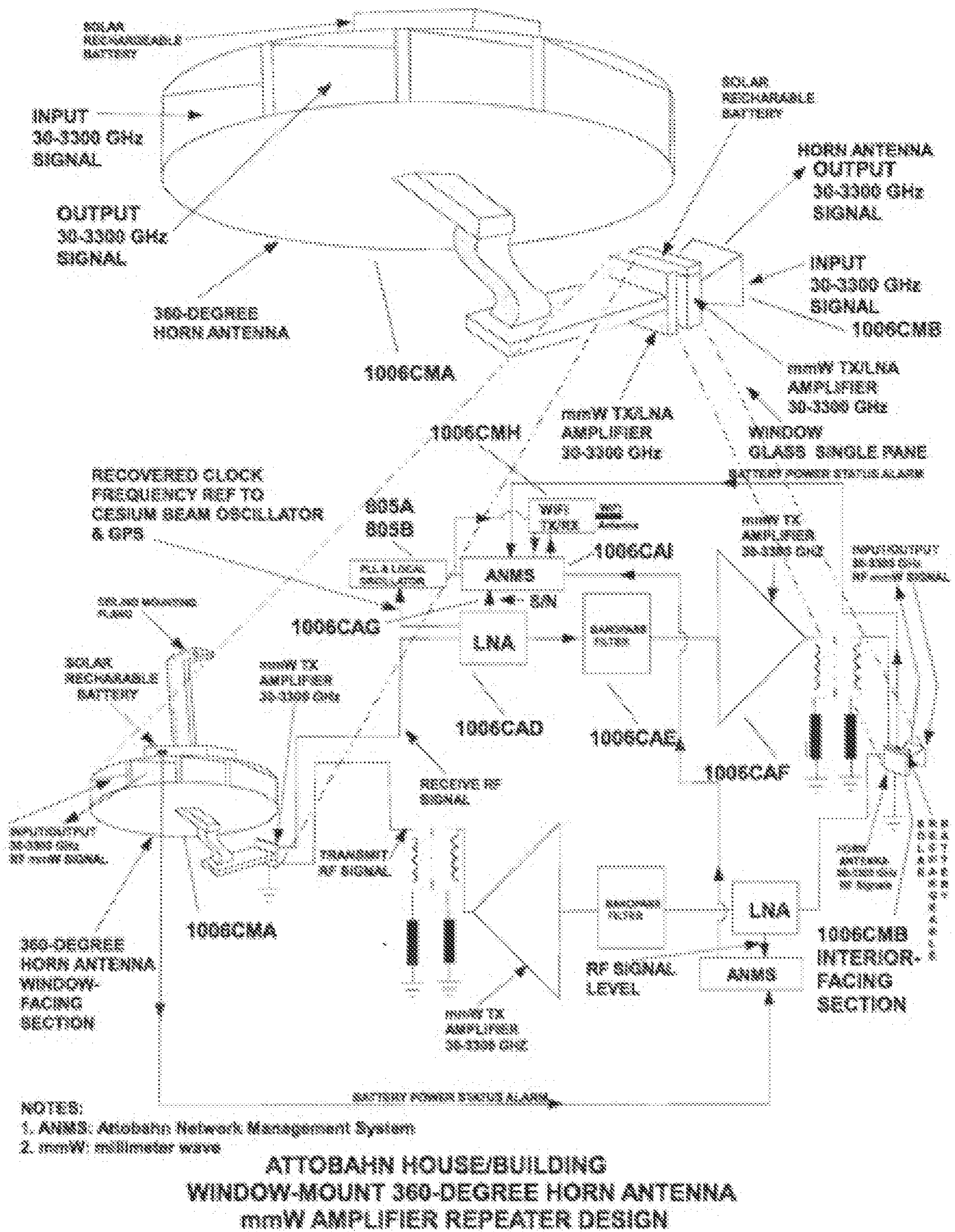
FIG. 102 illustrates the Ceiling-Mount 360-Degree mmW RF Antenna Repeater Amplifier Inductive Unit is designed to be used for office buildings which is an embodiment of this invention.

The Ceiling-Mount 360-Degree mmW RF Antenna Repeater Amplifier (360-CMMA) inductive unit 1006CM is designed to be used for buildings, where the received millimeter wave RF signals from the network is powerful enough to penetrate the walls and double-pane glass windows to the interior of the building floors areas. The unit provides a 10-20-dB gain between its window-facing and interior space-facing sections. Technical Specifications 1. HORN ANTENNA ANGLE: 360-DEGREE WINDOW-FACING
2. HORN ANTENNA ANGLE: 20-60-DEGREE INTERIOR-FACING
3. OUTPUT POWER: 1.0 WATT-1.5 WATTS
4. HORN ANTENNA LENGTH: 3 INCHES
5. HORN ANTENNA HEIGHT: 3 INCH
6. HORN ANTENNA WIDTH: 3 INCH
7. HORN ANTENNA WEIGHT WINDOW-FACING: 3 OUNCES
8. HORN ANTENNA WEIGHT INTERIOR FACING: 2 OUNCES FIG. 102 show the Ceiling Mount 360-Degree mmW RF Antenna Repeater Amplifier (360-CMMA) 1006ACM which is an embodiment of this invention. Incoming RF millimeter waves from the Gyro TWA Boom Box 1005 is received by the 360-CMMA window-facing section of the unit 1006CMA, that amplifies the signal with a 10-dB gain through its LNA. The signal is then sent to the interior-facing section of the unit 1006CMB of the 360-CMMA via inductive coupling. The interior-facing section amplifies the millimeter wave RF signals and transmits it out of its 20-60-degree horn antenna toward the V-ROVER, Nano-ROVER, Atto-ROVER 200, Protonic Switch, or Touch Points devices that equipped with Attobahn millimeter wave RF circuitry.

The V-ROVER, Nano-ROVER, Atto-ROVER 200, Protonic Switch, or Touch Points devices that equipped with Attobahn millimeter wave RF circuitry transmitted signals are received by the 20-60-Degree horn antenna of the interior-facing section of the 360-CMMA device. The received signals are then amplified and passed to the 360-degree horn antenna and transmitted out to the Gyro TWA Mini Boom Box 1004. The Mini Boom Box amplifies the millimeter wave RF signal and retransmit it to the Boom Box, where the signals are further amplified to ultra-high power. The signals are transmitted from the Boom Box to the other V-ROVERs, Nano-ROVERS, Atto-ROVERs, and Protonic Switches. Inside the building, the V-ROVER, Nano-ROVER, and Atto-ROVER is connected to the users' Touch Points devices such as servers, security systems, environmental systems, tablets, laptops, PCs, smart phones, 4K/5K/8K TVs, etc., via high speed serial cables, WiFi and WiGi systems. 360-CMMA Inductive Circuitry Configuration As illustrated in FIG. 102 which is am embodiment of this illustration, the 360-degree WMMA 1006CM inductive circuitry configuration consists of 360-degree horn antenna on the window-facing section 1006CMA of the device. The window-facing 360-degree horn antenna 1006CMA operates in the frequency range of 30 GHz to 3300 GHz RF with an output power of 1.0 to 1.5 watt. The horn antenna is integrated with its Low Noise Amplifier (LNA) 1006CMD.

The received 30 GHz to 3300 GHz mmW RF signal from the horn antenna is sent to the LNA which provides a 10-dB gain and passes the amplified signal to the Transmitter Amplifier 1006CMF via the baseband filter 1006CME. The RF signal is inductively couple to the interior-facing 20-60-degree indoor horn antenna 1006CMC.

The LNA signal-to-Noise ratio (S/N) 1006CMG and the solar rechargeable battery 1006CMH charge level information is captured and sent to the Attobahn Network Management System (ANMS) 1006CMI agent in the 360-CMMA device. The ANMS output signal is sent to the nearest V-ROVER, Nano-ROVER, Atto-ROVER, or the Protonic Switch Local V-ROVER via the WiFi system 1006CMJ in the 360-CMMA. The ANMS information arrives at the ROVERs WiFi receivers, where it is demodulated and pass to the APPI logical port 1. The information then traverses Attobahn network to the Millimeter Wave RF Management System at the Global Network Management Center (GNCC). 360-CMMA Inductive System Clocking & Synchronization Design As illustrated in FIG. 102 which is an embodiment to this invention, the 360-CMMA device uses recovered clock from the received mmW RF signal at the LNA. The recovered clocking signal is passed to the Phase Lock Loop (PLL) and local oscillator circuitry 805A and 805B which feds the WiFi transmitter and receiver system. The recovered clocking signal is referenced to the Attobahn Cesium Beam Atomic Clock located at the three GNCCs, that is effectively phased locked to the GPS.

Buildings Ceiling-Mount 180-Degree mmW RF Antenna Repeater Amplifier

Inductive Design

Figure 103:
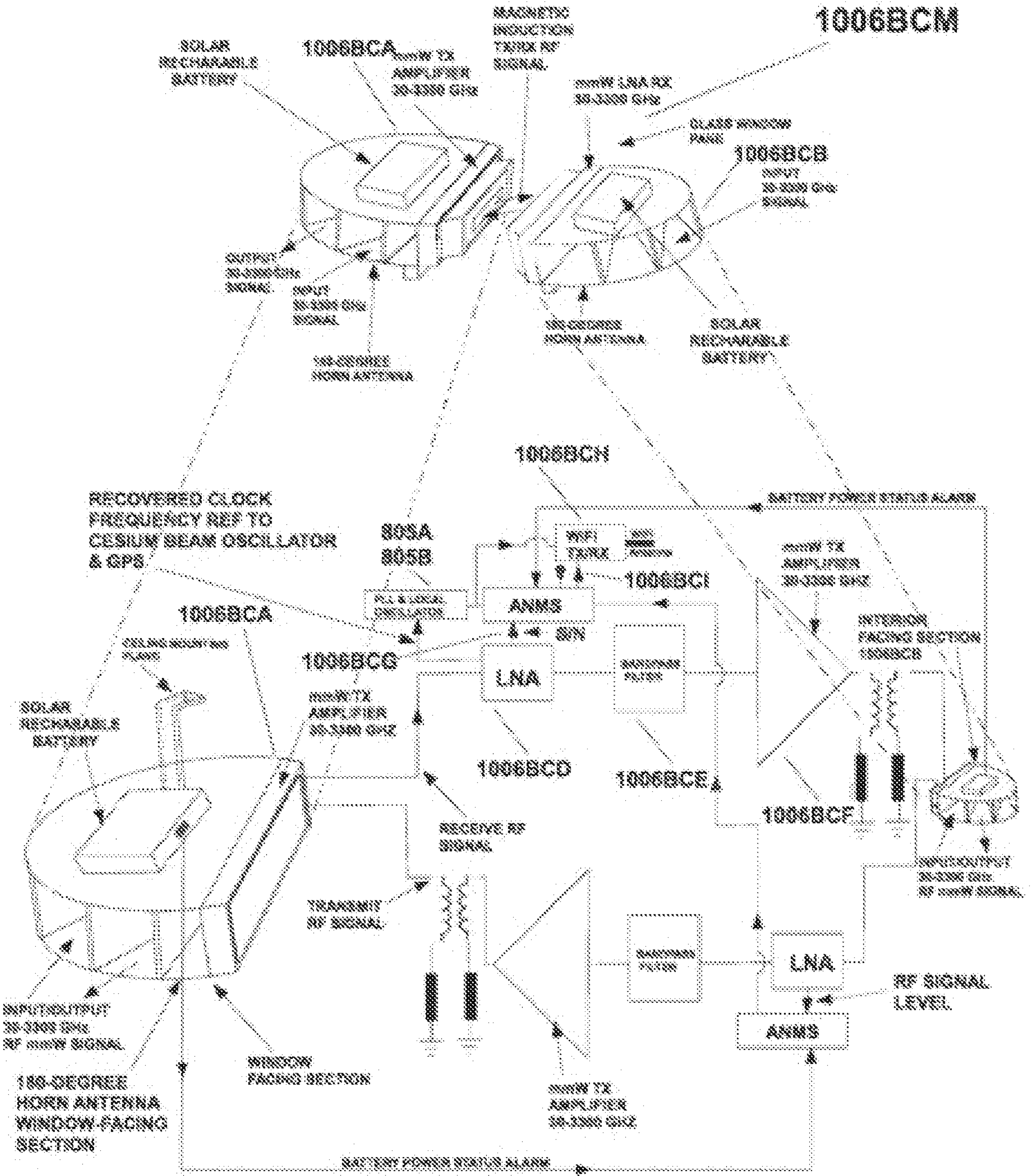
FIG. 103 illustrates the Ceiling-Mount 180-Degree mmW RF Antenna Repeater Amplifier Inductive Unit is designed to be used for office buildings which is an embodiment of this invention.

The 180-Degree mmW RF Antenna Repeater Amplifier (180-CMMA) inductive unit 1006CM is designed to be used for buildings, where the received millimeter wave RF signals from the network is powerful enough to penetrate the walls and double-pane glass windows to the interior of the building floors areas. The unit provides a 10-20-dB gain between its window-facing and interior space-facing sections. Technical Specifications 1. HORN ANTENNA ANGLE: 180-DEGREE WINDOW-FACING
2. HORN ANTENNA ANGLE: 180-DEGREE INTERIOR-FACING
3. OUTPUT POWER: 1.0 WATT-1.5 WATTS
4. HORN ANTENNA LENGTH: 3 INCHES
5. HORN ANTENNA HEIGHT: 3 INCH
6. HORN ANTENNA WIDTH: 3 INCH
7. HORN ANTENNA WEIGHT WINDOW-FACING: 2 OUNCES
8. HORN ANTENNA WEIGHT INTERIOR FACING: 2 OUNCES FIG. 103 show the Ceiling Mount 180-Degree mmW RF Antenna Repeater Amplifier (180-CMMA) 1006BCM which is an embodiment of this invention. Incoming RF millimeter waves from the Gyro TWA Boom Box 1005 is received by the 180-CMMA window-facing section of the unit 1006BCA, that amplifies the signal with a 10-dB gain through its LNA. The signal is then sent to the interior-facing section of the unit 1006BCB of the 180-CMMA via inductive coupling. The interior-facing section amplifies the millimeter wave RF signals and transmits it out of its 180-degree horn antenna toward the V-ROVER, Nano-ROVER, Atto-ROVER 200, Protonic Switch, or Touch Points devices 1007 that equipped with Attobahn millimeter wave RF circuitry.

The V-ROVER, Nano-ROVER, Atto-ROVER 200, Protonic Switch, or Touch Points devices 1007 that equipped with Attobahn millimeter wave RF circuitry transmitted signals are received by 180-Degree horn antenna of the interior-facing section of the 180-CMMA device 1006BCB. The received signals are then amplified and passed to the window-facing 180-degree horn antenna 1006BCA and transmitted out to the Gyro TWA Mini Boom Box 1004. The Mini Boom Box amplifies the millimeter wave RF signal and retransmit it to the Gyro TWA Boom Box 1005, where the signals are further amplified to ultra-high power. The signals are transmitted from the Boom Box to the other V-ROVERs, Nano-ROVERs, Atto-ROVERs, and Protonic Switches.

Inside the building, the V-ROVER, Nano-ROVER, and Atto-ROVER 200 is connected to the users' Touch Points devices 1007 such as servers, security systems, environmental systems, tablets, laptops, PCs, smart phones, 4K/5K/8K TVs, etc., via high speed serial cables, WiFi and WiGi systems. 180-CMMA Inductive Circuitry Configuration As illustrated in FIG. 103 which is am embodiment of this illustration, the 180-degree CMMA 1006BCM inductive circuitry configuration consists of 180-degree horn antenna on the window-facing section 1006BCA of the device. The 180-degree horn antenna 1006BCA operates in the frequency range of 30 GHz to 3300 GHz RF with an output power of 1.0 milliwatt to 1.5 watt. The window-facing 180-degree horn antenna is integrated with its Low Noise Amplifier (LNA) 1006BCD.

The received 30 GHz to 3300 GHz mmW RF signal from the window-facing 180-degree horn antenna is sent to the LNA which provides a 10-dB gain and passes the amplified signal to the Transmitter Amplifier 1006BCE via the baseband filter 1006BCF. The RF signal is inductively couple to the interior-facing 180-degree indoor horn antenna 2006BCB.

The LNA signal-to-Noise ratio (S/N) 1006BCG and the solar rechargeable battery charge level information 1006BCH is captured and sent to the Attobahn Network Management System (ANMS) 1006BCI agent in the 180-CMMA device. The ANMS output signal is sent to the nearest V-ROVER, Nano-ROVER, Atto-ROVER, or the Protonic Switch Local V-ROVER via the WiFi system 1006BCJ in the 180-CMMA. The ANMS information arrives at the ROVERs WiFi receivers, where it is demodulated and pass to the APPI logical port 1. The information then traverses Attobahn network to the Millimeter Wave RF Management System at the Global Network Management Center (GNCC). 180-CMMA Inductive System Clocking & Synchronization Design As illustrated in FIG. 103 which is an embodiment to this invention, the 180-CMMA device uses recovered clock from the received mmW RF signal at the LNA. The recovered clocking signal is passed to the Phase Lock Loop (PLL) and local oscillator circuitry 805A and 805B which feds the WiFi transmitter and receiver system. The recovered clocking signal is referenced to the Attobahn Cesium Beam Atomic Clock located at the three GNCCs, that is effectively phased locked to the GPS.

Skyscraper Office Space mmW Distribution Design

Attobahn millimeter wave RF signal distribution architecture includes the design of permeating these waves throughout the office building space. FIG. 103 illustrates the utilization of the following Attobahn designed millimeter wave RF antennae:

1. The Ceiling-Mount 360-Degree mmW RF Antenna Repeater Amplifier (360-CMMA) inductive unit 1006CM.
2. The Ceiling-Mount 180-Degree mmW RF Antenna Amplifier Repeater (180-CMMA) inductive unit 1006BM.
3. The 20-60-Degree Door-Mount Antenna Amplifier Repeater (20-60-DMMA) 1006B.
4. The 180-Degree Door-Mount Antenna Amplifier Repeater (180-DMMA) 1006B.

Figure 104:
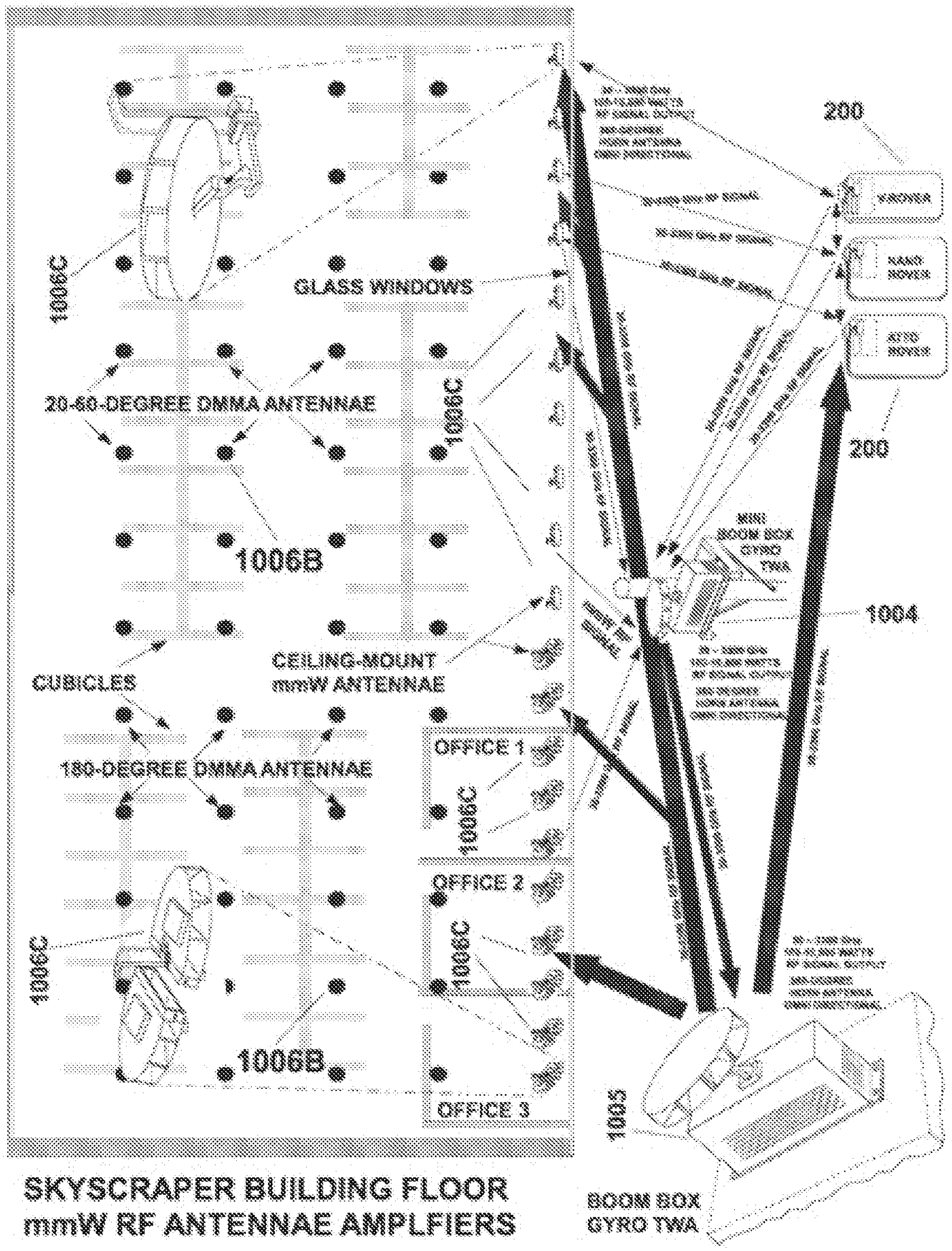
FIG. 104 illustrates the Attobahn Skyscraper Office Space Millimeter Wave Ceiling and Wall-Mount Antennae Design.

As shown in FIG. 104 which is an embodiment of this invention, these antennae are strategically arranged in the office space to ensure that the entire space is saturated with the millimeter RF signals. This design eliminates any dead spots in the service space. The 360-CMMA 1006CM and 180-CMMA 1006BM are distributed approximately every 30 feet along the window, in the ceiling, positioned about two (2) inches from the window glass.

Approximately every twenty (20) feet away from the ceiling-mounted 360-CMMA and 180-CMMA antennae toward the interior direction of the office, are positioned 20-60-DMMA 1006B and 180-DMMA 1006B in 20-foor grids amongst the cubicle area (open area). These devices act as millimeter wave RF signal repeater amplifiers that amplify these signals within their grids in both the receive and transmit directions in and out of the office.

Office Floor Receive Signal Process

The incoming millimeter wave RF signals from the Gyro TWA Boom Boxes 1005 are received and amplified by the CMMA 1006CM antennae at the windows 1008. These antennae then retransmit the signals which are received by the DMMAs antennae that boost the signals again and distribute them to the surrounding Touch Points devices within the 20-foot grids in the open office spaces (cubicles). In order to serve closed offices, conference rooms, utility rooms and closets, the 360-DMMAs 10068 and 180-DMMAs 1006C are deployed above the doors of these offices and rooms as shown in FIG. 94 and FIG. 97 respectively which is an embodiment of this invention. The signals are distributed to the V-ROVERs, Nano-ROVERs, Atto-ROVERS, and Protonic switches in that office or room. Also, Touch Points devices that are equipped with Attobahn millimeter wave RF circuitry in those office and rooms receive the signals.

In the cases of office space with rooms where the walls are thick or made with high millimeter wave attenuation material, then the Wall-Mounted 180-Degree mmW RF Signal Repeater Amplifier (180-WAMA) 1006C are used to amplify and retransmit the signal from the exterior to the interior of the wall as illustrated in FIG. 98 which is an embodiment of this invention. The retransmitted signals are then distributed to the Touch Point devices in the room.

Office Floor Transmit Signal Process

The millimeter waves that are transmitted by Touch Point devices 1007 that equipped with Attobahn millimeter wave RF circuitry; V-ROVERs; Nano-ROVERs; Atto-ROVERs; and Protonic Switches are captured by the 360-DMMAs, 180-DMMAs, and the 180-WAMAs units within their servicing grids, offices, and rooms. These units amplify the RF signals and retransmit them towards the CCMAs 1006CM.

The CMMAs that are mounted in the ceiling along the windows 1006 of the office floor, receive the RF signals, amplify them, and then retransmit them to the Gyro TWA Mini Boom Boxes 1004 that serve the grid where the office building is located. The Mini Boom Boxes reamplify the signals and send them to the Ultra-High Power Gyro TWA Boom Boxes 1005 where the signals are amplified and retransmitted at powers in the range of 100 to 10,000 Watts.

Attobahn mmW RF Antennae Repeater Amplifier

Attobahn mmW RF Antennae Repeater Amplifiers are a critical part of the over-all millimeter wave RF architecture. This architecture is an embodiment of this invention. The design and implementation of these devices within the network architecture aid in mitigation of the signal-to-noise ratio (S/N) rapid degradation as these signals travel through a house or other types of buildings.

Figure 105:
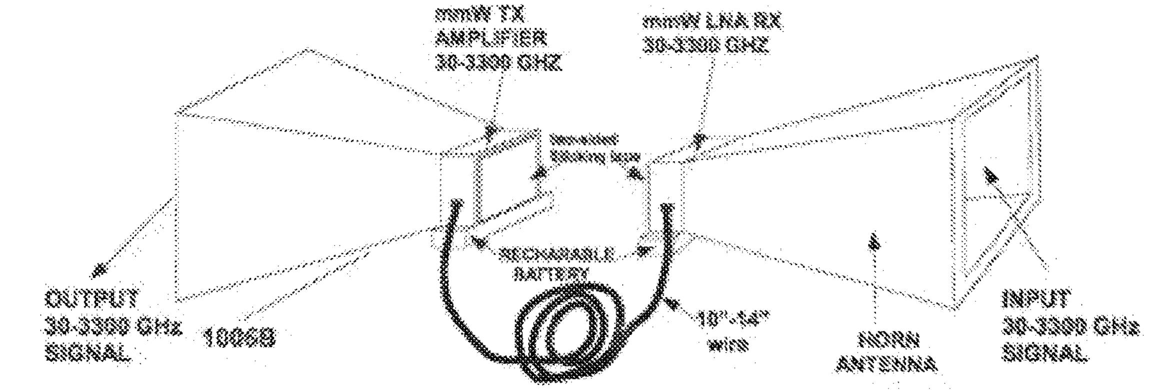
FIG. 105 illustrates the typical Attobahn House/Building Window, Door, Wall, and Ceiling-Mount Millimeter Wave Antennae designs.
Figure 105:
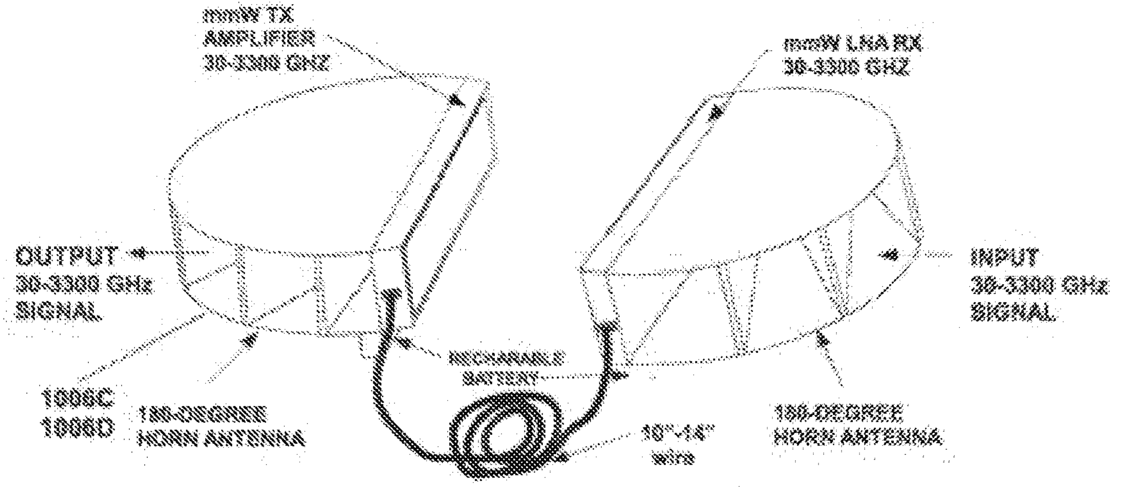
Figure 105:
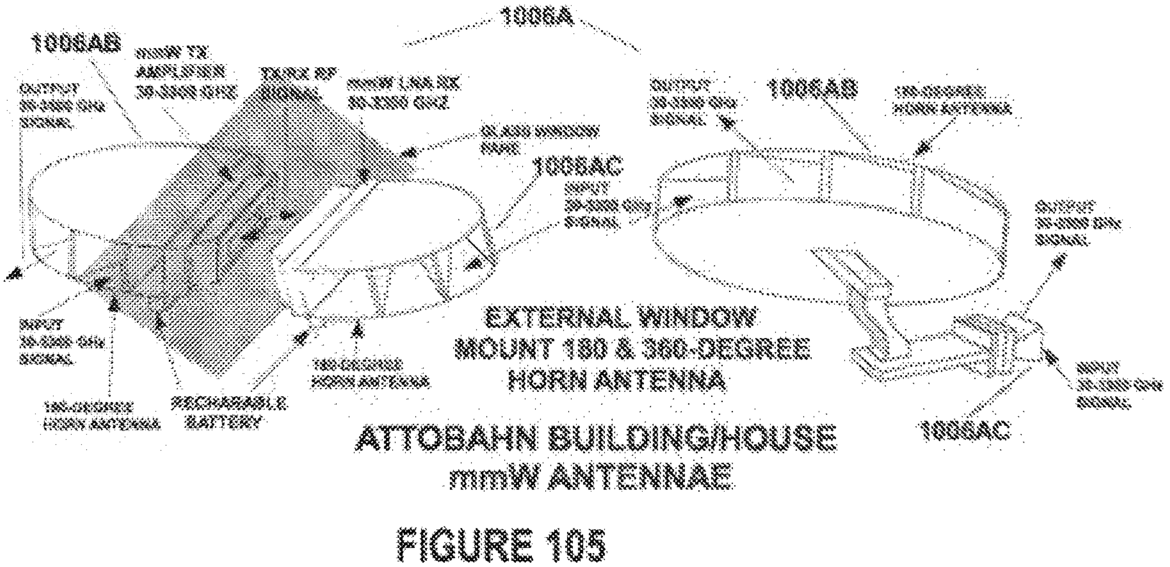

FIG. 105 shows the series of Attobahn mmW RF Antennae Repeater Amplifiers which is an embodiment of this invention. These devices take the weaken millimeter wave signals and amplify them to a stronger level, then retransmit them into areas of the house or building that they were unable reach prior to being amplified. The design makes the network services reliable and robust. It provides the users with a good ultra-broadband network services experience, regardless of where the user is located in the house or building.

Figure 106:
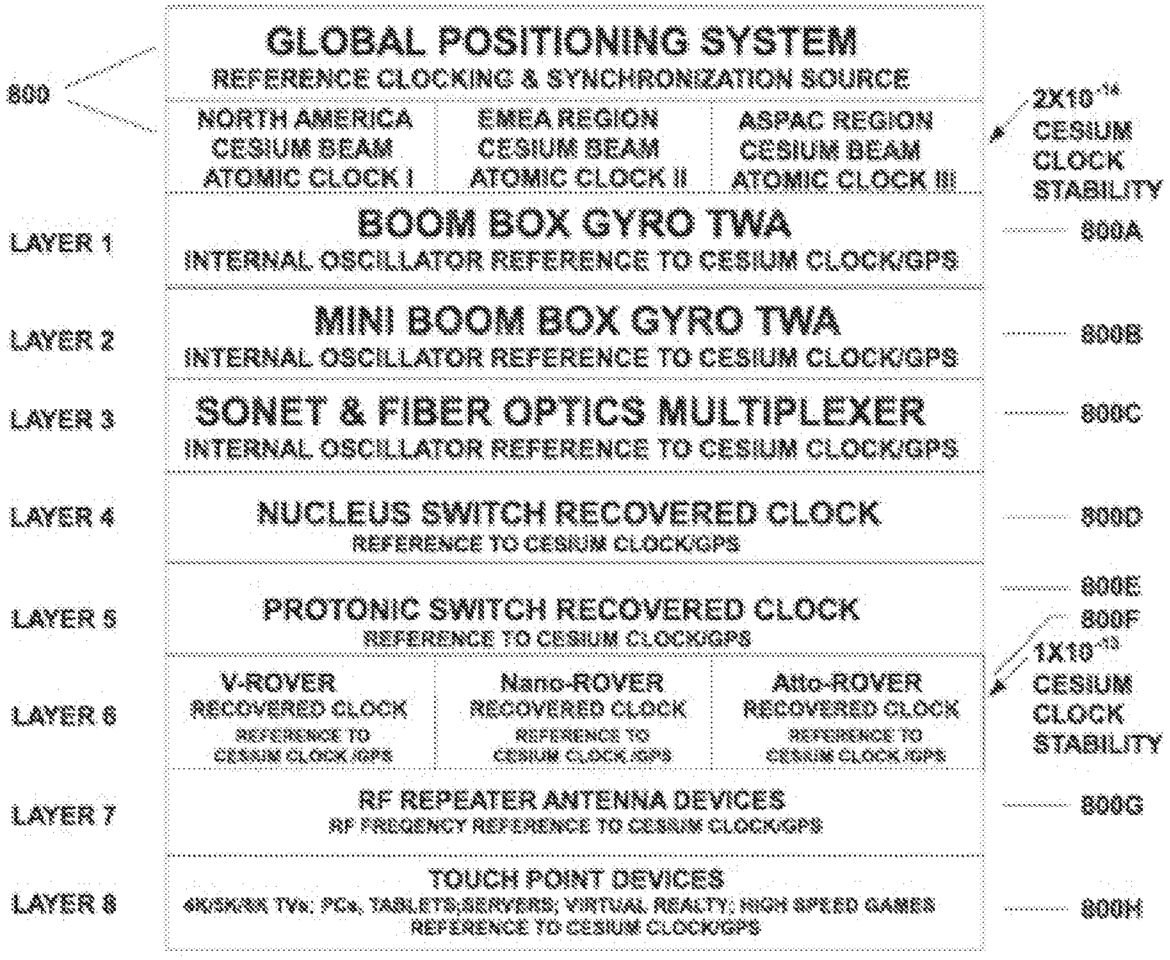
FIG. 106 is an illustration of Attobahn Clocking & Timing Standard Synchronization Architecture from its Global Position System (GPS) Reference source to its Touch Point devices clocking synchronization which is an embodiment of this invention.

The following Attobahn mmW RF Antennae Repeater Amplifiers shown in FIG. 105 are:

1. The Window-Mount 360-degree antenna amplifier repeater (360-WMMA) 1006AA.
2. The Window-Mount 180-degree antenna amplifier repeater (180-WMMA) 1006BB.
3. The 20-60-Degree Door-Mount Antenna Amplifier Repeater (20-60-DMMA).
4. The 180-Degree Door-Mount Antenna Amplifier Repeater (180-DMMA) 1006C.
5. The 180-Degree Wall-Mount Antenna Amplifier Repeater (180-WAMA) 1006D.
6. The Ceiling-Mount 360-Degree mmW RF Antenna Repeater Amplifier 1006CM.
7. The Ceiling-Mount 180-Degree mmW RF Antenna Repeater Amplifier 1006CM. Attobahn Clocking & Synchronization Architecture As illustrated in FIG. 106 which is an embodiment of this invention, the Attobahn Coordinated Timing (ACT) Clocking & Synchronization Architecture 800 consists of a timing standard that utilizes one of the highest available atomic clocking oscillatory system. The architecture has eight (8) digital transmission layers that are synchronized to a common clocking source, thus allowing a fully digital signal phase-locked network from the highest-level network systems to end users' Touch Point systems.

The eight (8) layers of the architecture are:

1. The Gyro TWA Boom Box Systems oscillatory circuitry 800A which functions in the high millimeter wave RF range between 30 GHz and 3300 GHz.
2. The Gyro TWA Boom Box Systems oscillatory circuitry 800B which functions in the high millimeter wave RF range between 30 GHz and 3300 GHz.
3. The SONET Fiber Optic Terminals and digital multiplexers oscillatory circuitry 810 that operates in the optical frequency and high speed digital range.
4. The Nucleus Switch high speed digital cell switching and millimeter wave RF systems oscillatory circuitry 803.
5. The Protonic Switches high speed digital cell switching and millimeter wave RF systems oscillatory circuitry 804.
6. The ROVERs Switches high speed digital cell switching and millimeter wave RF systems oscillatory circuitry 805.
7. mmW RF Antenna Repeater Amplifiers oscillatory circuitry which functions in the high millimeter wave RF range between 30 GHz and 3300 GHz 807,809.
8. The end user Touch Points devices digital circuitry synchronization 800H.

As shown in FIG. 107 which is an embodiment of this invention, the Attobahn Clocking & Synchronization Architecture (ACSA) uses the Global Positioning System (GPS) 801 as the global timing reference between its three timing and synchronization locations. ACSA has three Cesium Beam highly stable oscillators 800 strategically located at three of Attobahn's four business regions in the world.

The Cesium Beam oscillators 800 are located at Attobahn Global Network Control Centers (GNCCs) in the following regions:

1. North America (NA) GNCC.
2. Europe Middle East & Africa (EMEA) GNCC.
3. Asia Pacific (ASPAC) GNCC.

Attobahn design the ACSA with three GPS satellite station receivers 801 are collocated with the Cesium Beam oscillators 800 at the three GNCCs. These GPS timing signals received at the three locations are compared their results to communicate the Cesium Beam oscillator timing to develop Attobahn Coordinated Time (ACT). The ACT becomes the network reference timing signal to synchronize all local oscillators in the Gyro TWA Boom Box and Mini Boom Boxes; Nucleus Switches, Protonic Switches, V-ROVERs; Nano-ROVERs; Atto-ROVERs; and the Touch Points devices.

The ACT clocking and synchronization distribution throughout Attobahn network is accomplished in the following manner as illustrated in FIG. 107 which is an embodiment of this invention:

1. The ACT output reference digital clocking signals are sent out of the Cesium Beam oscillators 800 to the Clocking Distribution Systems (CDS) 802 at the three GNCC locations.
2. The CDS splits the input primary and secondary ACT reference digital signals across a series of drivers to produce several reference clocking signals 802AB.
3. The clocking signals 802A from the CDS are then distributed to:

i. SONET Fiber Optic Systems 810.
ii. Gyro TWA Boom Boxes 806
iii. Gyro TWA Mini Boxes 808.
iv. Nucleus Switches 803.

All of these network systems receive the clocking signals from the CDS at their Phase Lock Loop (PLL) 806A circuitry which is tuned to this reference clocking signal frequency. The PLL corrective voltage levels vary in harmony with the phase of the digital pulses of the incoming reference clocking signal. The PLL corrective voltage is fed to the local oscillators of the aforementioned network systems. The PLL controls the local oscillators out frequency in harmony with the incoming reference clocking signal. This arrangement synchronizes the local oscillator frequency accuracy to the ACT reference clocking Cesium Beam Oscillators at the three GNCCs.

The rest of the network systems such as Protonic Switches 804, V-ROVERs 805, Nano-ROVERs 805A, Atto-ROVERs 805B, mmW RF Antenna Repeater Amplifiers 809; and end user Touch Points devices that are equipped with Attobahn's IWIC chips, utilizes recovered-looped clocking method. The recovered-looped clocking method work by recovering the clocking signal from the received millimeter wave signals and converting them to digital signals which feed the PLL circuitry of the local oscillator. The output frequency of the local oscillators is controlled by their PLL control voltage which is referenced to the ACT high stability Cesium Beam Clocking System. This arrangement in effect results in all clocking systems throughout the network being synchronized and referenced to the ACT high stability Cesium Beam Oscillator clocking systems at the three GNCCs.

Attobahn Instinctively Wise Integrated Circuit (IWIC)

Figure 108:
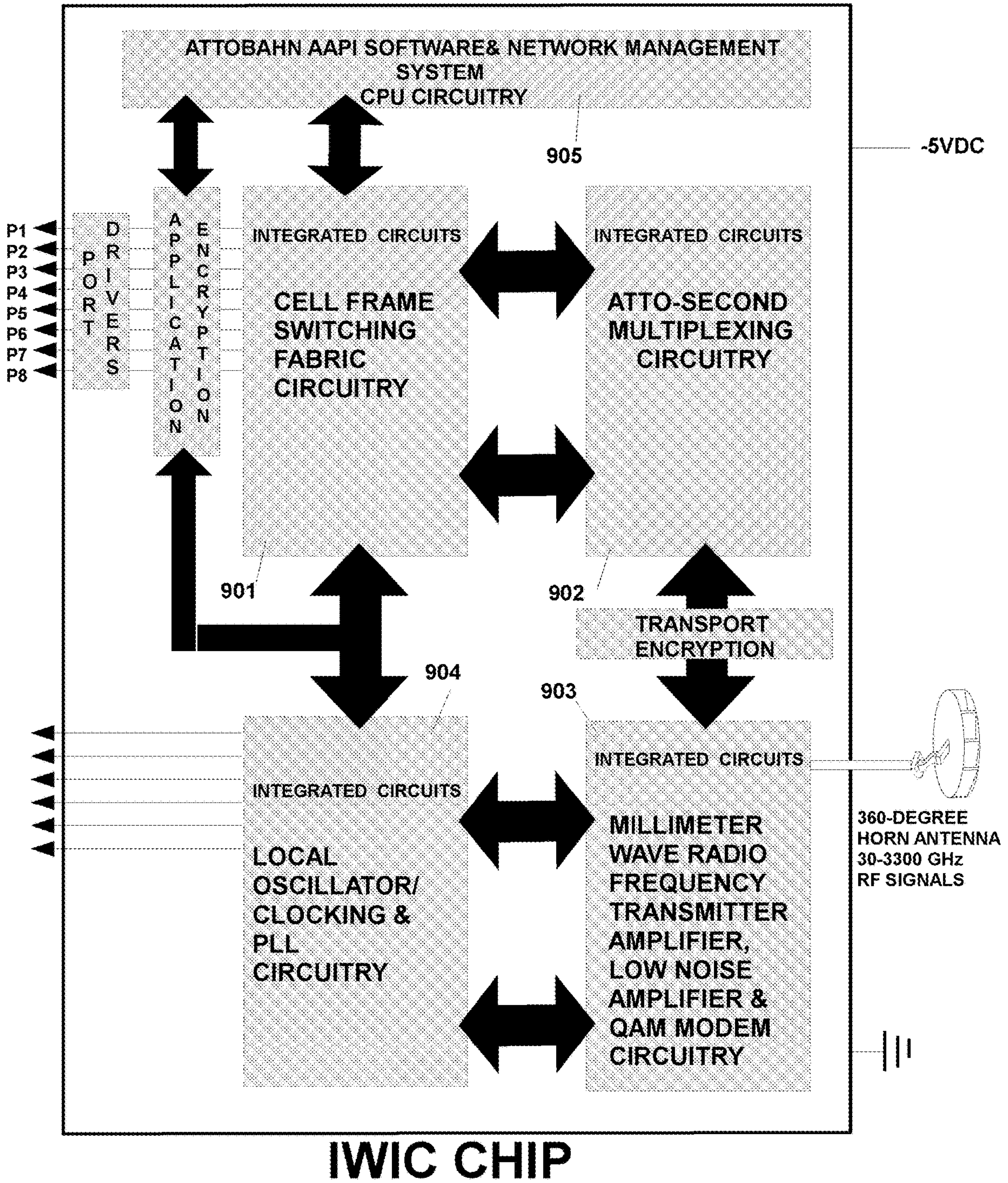
FIG. 108 is an illustration of Attobahn Instinctively Wise Integrated Circuit (IWIC) chip internal configuration with its four primary circuitries: the cell frame switching circuitry; Atto Second Multiplexer circuitry; local oscillatory circuitry; and the RF section with its millimeter wave transmitter amplifier, receiver low noise amplifier, QAM modem and 360-degree horn antenna.

As illustrated in FIG. 108 which is an embodiment of this invention, the Attobahn Instinctively Wise Integrated Circuit called the IWIC chip is a custom design application specific integrated circuit (ASIC). The IWIC chip is a major component of the Attobahn network systems. The IWIC chip plays a prominent role in the operations of the V-ROVERs, Nano-ROVERs, Atto-ROVERs, Protonic Switches, and the Nucleus Switches.

The primary functions of the IWIC chip is its high-speed terra bit per second switching fabric as described in Figures consists of four sections. The five sections are:

1. Cell frame switching fabric circuitry 901.
2. Atto-second multiplexing circuitry 902.
3. Millimeter wave RF amplifier, LNA, and QAM modem circuitry 903.
4. Local Oscillator and PLL circuitry 904.
5. CPU circuitry 905.

As shown in FIG. 107 which is an embodiment of this invention, the IWIC chip utilizes specific circuitry design for the cell frame switching and atto-second multiplexing functions and associated port drivers. The chip uses multiple high speed 2 THz digital clocking signals for timing in and out data through the switching fabric of the chip.

The millimeter wave RF amplifier, LNA, and QAM modem circuitry are in a separate area of the chip. This section of the chip uses MMIC substrate for the transmitter and receiver amplifiers.

The local oscillator and PLL are in separate area of the IWIC chip. All connections through the chip uses photolithographic laminated substrate. The IWIC chip is a mixed-signal circuit of digital and analog circuitry. The hardware description language (HDL) of the IWIC chip provides specific instructions of the operations of the logic circuits; circuit gates switching speeds between ports; cell switch ports switching decisions by the Micro Address Assignment Switching Tables (MAST) in the V-ROVERs, Nano-ROVERs, Atto-ROVERs, Protonic Switches, and Nucleus Switches.

The IWIC chip also has a CPU section that is a dual quad-core 4 GHZ, 8 GB ROM, 500 GB storage CPU that manages the Cloud Storage service; network management data; application level encryption and link encryption; and various administrative functions such as system configuration; alarms message display; and user services display in device.

The CPU monitors the system performance information and communicates the information to the Nucleus Switch Network Management System (NNMS) via the logical port 1 (FIG. 6) Attobahn Network Management Port (ANMP) EXT.001. The end user has a touch screen interface to interact with the Nucleus Switch to set passwords, access services, and communicate with customer service, etc.

Figure 109:
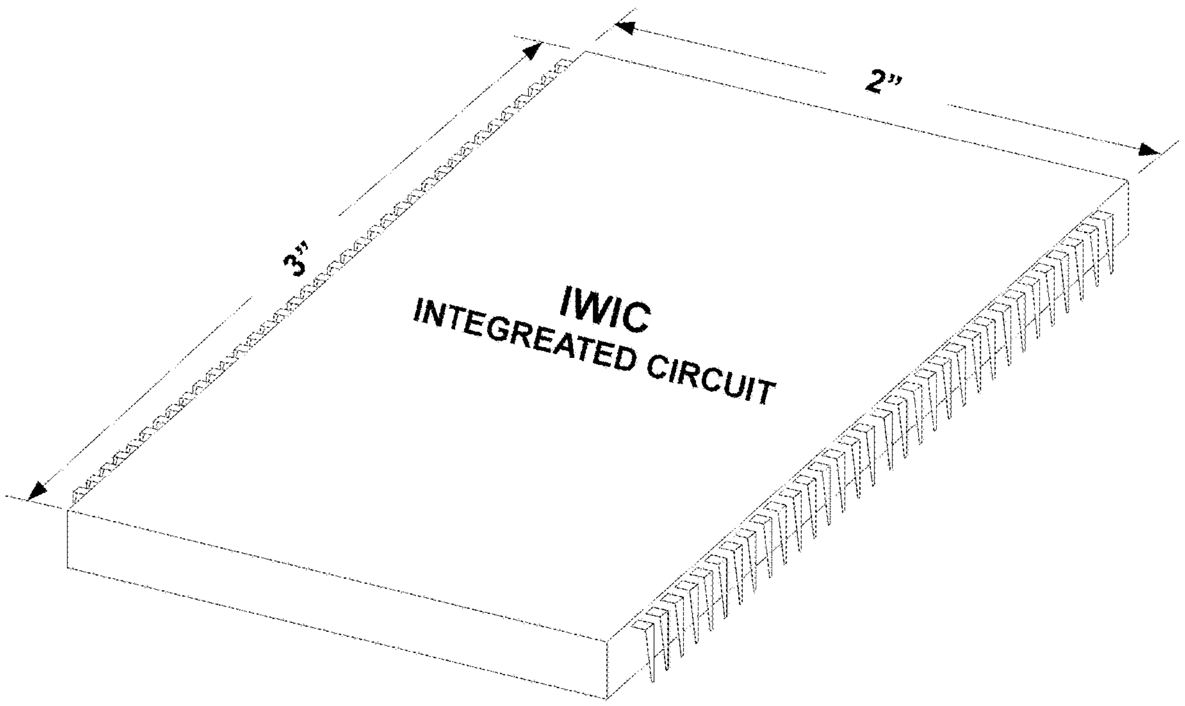
FIG. 109 is an illustration of the Attobahn Instinctively Wise Integrated Circuit called the IWIC chip physical specifications which is an embodiment of this invention.

The physical size of the IWIC chip is shown in FIG. 109 which is an embodiment of this invention. Technical Specifications 1.0 PHYSICAL SIZE:

i. LENGTH: 3 INCHES ii. WIDTH: 2 INCHES iii. HEIGHT: 0.25 INCH 2.0 SUPPL VOLTAGE: −1.0 TO −5 VDC 3.0 CURRENT: 10 micro amps to 40 milliamps 4.0 68 pins 5.0 OPERATING TEMPERATURE: −55 C to 125 C

SUMMARY

In one embodiment, a 30 GHz-3300 GHz millimeter wave wireless communication device for a high-speed, high capacity dedicated mobile network system comprises a housing having at least one USB port for receiving an information stream from an end user application running at digital speeds of 10 MBps and higher; at least one integrated circuit chip connected inside the housing; a port for receiving an information stream from a wireless local area network; at least one clock; an attosecond multiplexer TDMA; a local oscillator; at least one phase lock loop; at least one orbital time slot; and at least one millimeter wave RF unit having a 64-4096-bit QAM modulator; wherein the integrated circuit chip converts the information stream from the at least one port into at least one fixed cell frame; wherein at least one fixed cell frame is processed by the attosecond multiplexer TDMA and delivered to at least one orbital time slot for delivery as an ultra-high digital data stream to a terminating network; and wherein the millimeter wave wireless communication device creates the high-speed, high capacity dedicated molecular network with at least one other wireless communication device.

In one embodiment of at least a Gyro TWA Boom Box ultra-high power 30 GHz-3300 GHz millimeter wave amplifier that has at least a 30 GHz-3300 GHz receiver; a 360-degree horn antenna; a 20-60-degree horn antenna; a flexible millimeter wave waveguide; a high voltage DC continuous and pulsating (non-continuous) power supply, and a casing that the Gyro TWA and associated components are enclosed. The Gyro TWA Boom Box ultra-high power amplifier has an output power wattage of 100 Watts 10,000 Watts.

In one embodiment of at least a Gyro TWA Mini Boom Box ultra-high power 30 GHz-3300 GHz millimeter wave amplifier that has at least a 30 GHz-3300 GHz receiver; a 360-degree horn antenna; a 20-60-degree horn antenna; a flexible millimeter wave waveguide; a high voltage DC continuous and pulsating (non-continuous) power supply, and a casing that the Gyro TWA and associated components are enclosed. The Gyro TWA Boom Box ultra-high power amplifier has an output power wattage of 1.5 to 100 Watts.

The 30 GHz-3300 GHz wireless communication device of claim 1, wherein at least one port accepts high-speed data streams from a group comprising host packets, TCP/IP packets, Voice Over IP packets, Video IP packets, Video over cell frames, Voice over cell frames, graphic packets, MAC frames and data packets. At least one port transmits undedicated raw data from host packets, TCP/IP packets, Voice Over IP packets, Video IP packets, Video over cell frames, Voice over cell frames, graphic packets, MAC frames and data packets at least one fixed cell frame to the terminating network. The integrated circuit chip constantly reads a header for at least one fixed cell frame for its port designation address by a Attobahn cell frame protocol. The fixed cell frame up to 80 bytes.

In one embodiment The high-speed, high capacity dedicated molecular network comprises an Access Network Layer (ANL); a Protonic Switching Layer (PSL); a Nucleus Switching Layer (NSL); wherein the ANL includes the at least one 30 GHZ-3300 GHZ millimeter wave wireless communication device that transmits and receives an information stream of at least one fixed sized cell frame which is 30 GHz-3300 GHz millimeter wave wirelessly transmitted and received in the at least one orbital time slots of wireless information streams in the PSL. The PSL includes at least one Protonic Switch for communication with at least one orbital time slot of an information stream from the internet, cable, telephone, and private networks to transmit and receive at least one fixed size cell frame to and from at least one port of additional 30 GHz-3300 GHz millimeter wave wireless communication devices via the NSL; and wherein the NSL includes at least one nucleus switch positioned at fixed locations to create a primary interface between the PSL and the internet, telephone, cable and private networks.

In one embodiment, a high-speed, high capacity dedicated 30 GHz-3300 GHz millimeter wave mobile network system, comprising: an Access Network Layer (ANL); a Protonic Switching Layer (PSL); a Nucleus Switching Layer (NSL); wherein the ANL includes at least one 30 GHz-3300 GHz millimeter wave wireless communication device comprising a housing having at least one USB port for receiving an information stream from an end user application, at least one integrated circuit chip connected inside the housing, a port for receiving an information stream from a wireless local area network, at least one clock, an attosecond multiplexer TDMA, a local oscillator, at least one phase lock loop, at least one orbital time slot, and at least one RF unit having a 64-4096-bit QAM modulator; wherein the PSL includes at least one Protonic Switch with at least one 30 GHz-3300 GHz millimeter wave wireless communication device comprising a housing having at least one USB port for receiving an information stream from an end user application, with at least one integrated circuit chip connected inside the housing, at least one clock, an attosecond multiplexer TDMA, a local oscillator, at least one phase lock loop, at least one orbital time slot, and at least one 30 RF unit having a 64-4096-bit QAM modulator at least one orbital time slot of an information stream from the internet, cable, telephone, and private networks to transmit and receive at least one fixed size cell frame to and from at least one port of additional 30 GHz-3300 GHz millimeter wave wireless communication devices via the NSL; and wherein the NSL includes at least one Nucleus Switch positioned at fixed locations to create a primary interface between the PSL and the internet, telephone, cable and private networks. The NSL includes at least one Nucleus Switch with at least one 30 GHZ-3300 GHZ millimeter wave wireless communication device comprising a housing having at least one USB port for receiving an information stream consisting of user application, with at least one integrated circuit chip connected inside the housing, at least one clock, an Attosecond multiplexer TDMA, a local oscillator, at least one phase lock loop, at least one orbital time slot, and at least one 30 GHz-3300 GHz millimeter wave RF unit having a 64-4096-bit QAM modulator at least one orbital time slot of an information stream from the internet, cable, telephone, and private networks to transmit and receive at least one fixed size cell frame to and from at least one port of additional 30 GHz-3300 GHz millimeter wave wireless communication devices.

A plurality of Attosecond Multiplexer TDMA, which are interconnected to each other and at least one Nucleus Switch, wherein each attosecond multiplexer is wirelessly coupled to the PSL, and acts as an intermediary between the PSL, other attosecond multiplexers TDMA and the at least one Nucleus Switch.

In one embodiment, a method of transmitting an information stream over a high-speed, high capacity mobile 30 GHz-3300 GHz millimeter wave wireless network system, comprising the steps of: Receiving an information stream from an Access Network Layer (ANL) to a 30 GH2-3300 GHz millimeter wave wireless communication device comprising a housing having at least one port for receiving an information stream from an end user application, at least one integrated circuit chip connected inside the housing, a port for receiving an information stream from a wireless local area network, at least one clock, an attosecond multiplexer TDMA, a local oscillator, at least one phase lock loop, at least one orbital time slot, and at least one 30 GHZ-3300 GHz millimeter wave RF unit having a 64-4096-bit QAM modulator; converting the information stream from the at least one port into at least one fixed cell frame by the integrated circuit chip; transmitting at least one fixed cell frame of the information stream to at least one orbital time slot from at least one port of additional 30 GHz-3300 GHz millimeter wave wireless communication devices via the Protonic Switching Layer (PSL); and receiving at least one fixed cell frame of the information stream by at least one nucleus switch positioned at fixed locations to create a primary interface Nucleus Switching layer (NSL) between the PSL and the internet, telephone, cable and private networks of an end user.

Still further enumerated aspects of the invention are enumerated in the following paragraphs:

Aspect 1. A communication device (V-ROVER, Nano-ROVER, Atto-ROVER, Protonic Switch, and Nucleus Switch) for a mobile network system, wherein the communication device creates a high-speed, high capacity dedicated molecular network with at least one other communication device, the device comprising:

- a framing cell for converting an information stream received by the communication device into at least one fixed cell frame;
- an atto-second multiplexer for processing the at least one fixed cell frame;
- a data bus for delivering the at least one fixed cell frame to at least one orbital time slot, the orbital time slot transmitting the at least one fixed cell frame to a terminating network.

Aspect 2. A radio frequency communications network architecture devices that creates a Millimeter Wave Radio Frequency (RF) transmission architecture which is based on high frequency electromagnetic radio signals, operating in the millimeter frequency band (30 GHz to 300 GHz) and up to 3300 gigahertz (GHz) range, at the upper end of the millimeter wave spectrum and into the infrared spectrum, utilizing a Gyro Traveling Wave Tube Amplifier Ultra-High Power output ranging from 1.5 Watts to 10,000 Watts (called a Gyro TWA Mini Boom Box and Gyro TWA Boom Box) that receives and amplifies the RF signals from any V-ROVERs, Nano-ROVERs, Atto-ROVERs, Protonic Switches, Nucleus Switches, and Touch Points (4K/5/K/8K TVS; PCs, TABLETS; CLOUD SERVERS, SMART PHONES; TV & RADIO BROADCAST; VIRTUAL REALTY; HIGH SPEED GAMES; VIDEO/MOVIES DOWNLOADS; NEW MOVIES RELEASES DISTRIBUTION; PERSONAL CLOUD, SOCIAL MEDIA, INFO-MAIL; INFOTAINMENTS; INTEL TRANSPORT MET SERVICES; CORP NETS; AUTONOMOUS VEHICLE NET SERVICES; MOBILE VIDEO CONF; IoT; etc.) devices that are equipped with Attobahn IWIC chips within that Boom Box's grid area and retransmits these RF signals back into the grid and is received by any V-ROVERs, Nano-ROVERs, Atto-ROVERs, Protonic Switches, Nucleus Switches, and Touch Point devices within 300 feet to 5 miles and beyond within and outside the said grid. Aspect 3. An Attobahn Application Programmable Interface (AAPI) which is an embodiment of this invention, that interface end users' applications, logical port assignment, encryption, and cell frame switching functions. The operations of the AAPI is series of proprietary subroutines and definitions that allows various applications for the Web, Semantics Web, IoT, and non-standard, private applications to interface to the Attobahn network. The AAPI has a library data set for developers to use to tie their proprietary applications (APPS) into the network infrastructure.

Aspect 4. The communication device of aspect 1, wherein the fixed cell frame is up 80 bytes.

Aspect 5. The communication device of aspect 1 being installed in an automobile.

Aspect 6. The communication device of aspect 1, wherein the atto-second multiplexer TDMA uses an IWIC chip to place the cell frames into the orbital time slot.

Aspect 7. A method of transmitting an information stream over a mobile network, the method comprising:

- receiving an information stream from a 30 GHz to 3300 GHz millimeter wave wireless communication device;
- converting the information stream into at least one fixed cell frame by an integrated circuit; multiplexing at least one fixed cell frames;
- transmitting the multiplexed fixed cell frames to a 30 GHz-3300 GHz millimeter wave wireless and fiber optics terminating network.

Aspect 8. A wireless communication device (V-ROVER, Nano-ROVER, Atto-ROVER, Protonic Switch, and Nucleus Switch), comprising:

- a housing having at least one port for receiving an information stream;
- at least one integrated circuit chip, the integrated circuit chip comprising:
- at least one framing cell;
- at least one multiplexer;
- at least one orbital time slot;
- at least one local oscillator;
- at least one phase lock loop;
- at least one high-speed bus;
- at least one application layer data encryption and decryption circuitry;
- at least one data stream link encryption and decryption circuitry;
- a high frequency 30 GHz-3300 GHz millimeter wave 360-degree/20-60-degree horn antenna;
- a low frequency antenna.

Aspect 9. The 30 GHz-3300 GHz millimeter wave wireless communication device, wherein its multiplexer is an atto-second multiplexer TDMA system.

Aspect 10. The wireless communication device of aspect 6, wherein the integrated circuit chip places at least one cell frame onto at least a high-speed terra bits per second (TBps) switching buss, the cell frame encapsulating the customers digital stream information.

Aspect 11. The wireless communication device, wherein the atto-second multiplexer uses an IWIC chip to place the cell frames into the orbital time slot.

Aspect 12. The wireless communication device of aspect 6 being installed in a transportation vehicle.

Aspect 13. The wireless communication device of aspect 6 being installed in homes, various building structures, and aerial drones.

Aspect 14. The wireless communication device of aspect 6 being a mobile device that is carried by a human or any mechanical system.

Aspect 15. The communication device of aspect 1, wherein the Atto-Rover can transmit, receive and display data signals for the following services and applications:

Aspect 16. managing the P2 Technology (P2=Personal & Private) that consists of:

PERSONAL CLOUD storage
PERSONAL CLOUD APP
PERSONAL SOCIAL MEDIA storage
PERSONAL SOCIAL MEDIA APP
PERSONAL INFO-MAIL storage
PERSONAL INFO-MAIL APP
PERSONAL INFOTAINMENT storage
PERSONAL INFOTAINMENT APP
VIRTUAL REALTY INTERFACE
GAMES APP Aspect 17, The 30 GHz-3330 GHz RF millimeter wave communications network architecture devices of aspect 2 has an ultra-high power Gyro TWA amplifier (Mini Boom Box and Boom Box) with an operating frequency range from 30 GHz to 3300 GHz and output power from 1.5 Watts to 10,000 Watts.

Aspect 18. The 30 GHZ-3330 GHz RF millimeter wave communications network architecture devices of aspect 2 has an ultra-high power Gyro TWA amplifier (Mini Boom Box and Boom Box) with an operating frequency range from 30 GHz to 3300 GHz and output power from 1.5 Watts to 10,000 Watts that function in grid areas located in cities, suburbs, and villages around the world that receives 30 GHz-3300 GHz millimeter wave RF signals from V-ROVERs, Nano-ROVERs, Atto-ROVERs, Protonic Switches, and Nucleus Switch and other millimeter wave communications devices and amplifies these RF signals and retransmits them back into the grid area cover from 300 feet to 5 miles or even further distances.

Aspect 19. The 30 GHZ-3330 GHz RF millimeter wave communications network architecture devices of aspect 2 ultra-high Gyro TWA amplifier (Mini Boom Box and Boom Box) are installed on top of buildings, towers, in aerial drones, communications cabinets, utility poles and systems, and street metal boxes with extended flexible wave guides to 360-degree/20-60-degree horn antennas on poles or building roofs.

Aspect 20. The 30 GHz-3330 GHz RF millimeter wave communications network architecture devices of aspect 2 has at least one waveguide connected to one or more 360-degree/20-60-degree horn antenna/s where its ultra-high power Gyro TWA amplifier (Mini Boom Box and Boom Box) output power of 1.5 to 10,000 Watts are emitted in the frequency range 30 GHz to 3300 GHz.

Aspect 21. The 30 GHz-3330 GHz RF millimeter wave communications network architecture devices of aspect 2 has at least one communications device as described in aspect 1 V-ROVER that a have a RF millimeter wave 30 GHz to 3300 GHz communication link to the ultra-high power Gyro TWA amplifier (Mini Boom Box and Boom Box) where its RF signal is received and amplified to 1.5 to 10,000 Watts and retransmitted to be received by at least one of the communication devices as described in aspect 1.

Aspect 22. The 30 GHz-3330 GHz RF millimeter wave communications network architecture devices of aspect 2 has at least one communications device as described in aspect 1 Nano-ROVER that a have a RF millimeter wave 30 GHz to 3300 GHz communication link to the high power (Boom Box) Gyro TWA amplifier where its RF signal is received and amplified to 1.5 to 10,000 Watts and retransmitted to be received by at least one of the communication devices as described in aspect 1. Aspect 23. The 30 GHZ-3330 GHz RF millimeter wave communications network architecture devices of aspect 2 has at least one communications device as described in aspect 1 Atto-ROVER that a have a RF millimeter wave 30 GHz to 3300 GHz communication link to the ultra-high Gyro TWA amplifier (Mini Boom Box and Boom Box) where its RF signal is received and amplified to 1.5 to 10,000 Watts and retransmitted to be received by at least one of the communication devices as described in aspect 1.

Aspect 24. The 30 GHZ-3330 GHz RF millimeter wave communications network architecture devices of aspect 2 has at least one communications device as described in aspect 1 Protonic Switch that a have a RF millimeter wave 30 GHz to 3300 GHz communication link to the ultra-high power Gyro TWA amplifier (Mini Boom Box and Boom Box) where its RF signal is received and amplified to 1.5 to 10,000 Watts and retransmitted to be received by at least one of the communication devices as described in aspect 1.

Aspect 25. The 30 GHZ-3330 GHz RF millimeter wave communications network architecture devices of aspect 2 has at least one communications device as described in aspect 1 Nucleus Switch that a have a RF millimeter wave 30 GHz to 3300 GHz communication link to the ultra-high Gyro TWA amplifier (Mini Boom Box and Boom Box) where its RF signal is received and amplified to 1.5 to 10,000 Watts and retransmitted to be received by at least one of the communication devices as described in aspect 1.

Aspect 26. The 30 GHZ-3330 GHz RF millimeter wave communications network architecture devices of aspect 2 has at least one communications device as described in aspect 1 On-Board V-ROVER IWIC chip in a computing server, desktop computer, Laptop computer, computer tablet, Television set, broadcasting TV cameras, communications network device in the Internet of Things (IoT) environment or a communications network equipment or mobile cell phones or mobile communications systems—that a have a RF millimeter wave 30 GHz to 3300 GHZ communication link to the ultra-high power Gyro TWA amplifier (Mini Boom Box and Boom Box) where its RF signal is received and amplified to 1.5 to 10,000 Watts and retransmitted to be received by at least one of the communication devices as described in aspect 1 or a computing server, desktop computer, Laptop computer, computer tablet, Television set, broadcasting TV cameras, communications network device in the Internet of Things (IoT) environment or a communications network equipment or mobile cell phones or mobile communications systems.

Aspect 27. The AAPI interfaces of aspect 3 has two groups of APPS:

1. Native Attobahn APPs
2. Legacy TCP/IP APPS

These two groups of APPs consist of least a:

Port 0. Attobahn Administration Data that is always in the first cell frame between any two ROVERs devices, Protonic Switch, and Nucleus Switch or a Touch Point device that is equipped with Attobahn IWIC chip circuitry, that set up the connection-oriented protocol between applications. This application also controls the management messages for paid services such as Group Pay Per View for New Movies Release; purchased videos; automatic removal of videos after being viewed by users; etc.

Port 1. Attobahn Network Management Protocol application. This port is dedicated to transport all of Attobahn's network management information from V-ROVERs, Nano-ROVERs, Atto-ROVERs, Protonic Switches, Gyro TWA Boom Boxes Ultra-High Power Amplifiers, Gyro TWA Mini Boom Box High Power Amplifiers, Fiber Optics Terminals, Window-Mounted mmW RF Antenna Amplifier Repeaters, and Door/Wall mmW RF Antenna Amplifier Repeaters.

Port 2. Personal Info-Mail

Port 3. Personal Infotainment

Port 4. Personal Cloud

Port 5. Personal Social Media

Port 6. Voice Over Fast Packet (VOFP)

Port 7. 4K/5K/8K Video Fast Packet (VIFP)

Port 8. Musical Instrument Digital Interface (MIDI)

Port 9. Mobile Phone

Port 10. Moving Picture Expert Group (MPEG)

Port 11. 3D Video-Video Fast Packet (3DVIFP)

Port 12. Movie Distribution (New Movie Releases and 4K/5K/8K Movie Download-Video Fast Packet (MV-IFP)

Port 13. Broadcast TV Digital Signal (TVSTD)

Port 14. Semantics WEB-OWL (Web Ontology Language)

Port 15. Semantics WEB-XML (Extensible Markup Language)

Port 16. Semantics WEB-RDF (Resource Descriptive Framework)

Port 17. ATTO-View (Attobahn's user interface to the network services)

Port 18. Internet of Things APPS

Port 19. 19-399 New Applications such as Native Attobahn Applications data.

Attobahn native APPS are applications that are written to interface its APPI routines and proprietary cell frame protocol. These native APPs use the AAPI and cell frames as their communications stack to gain access to the network. The AAPI provides a proprietary application protocol that handles host-to-host communications; host naming; authentication; and data encryption and decryption using private keys. The AAPI application protocol directly sockets into the cell frames without any intermediate session and transport protocols.

The APPI manages the network request-response transactions for the sessions between client/server applications and assigns the logical ports of the associated V-ROVERs, Nano-ROVERs, and Atto-ROVERs cell frame addresses where the sessions are established. Attobahn APPI can accommodate all of the popular operating systems 100B but not limited to this list:

Windows OS
Mac OS
Linux (various)
Unix (various)
Android
Apple IOS
IBM OS
Legacy Applications The Legacy Applications are applications that use the TCP/IP protocol. The AAPI is not involved when this application interfaces Attobahn network. This protocol is sent directly to the cell frame switch via the encryption system.

The logical ports assigned for Legacy Applications are

Logical Application Type
Port
400 to 512 Legacy Applications

The Legacy Applications access the network via Attobahn WiFi connection which is connected to the encryption circuitry and then into the cell frame switching fabric. The cell framing switch does not read the TCP/IP packets but instead chop the TCP/IP packets data stream into discrete 80-bytes data cell frames and transport them across the network to the closest IP Nodal location. The V-ROVERs, Nano-ROVERs, and Atto-ROVERs are designed to take all TCP/IP traffic from the WiFi and WiGi data streams and automatically place these IP packets into cell frames, without affecting the data packets from their original state. The cell frames are switched and transported across Attobahn network at a very high data rate.

Each IP packet stream is automatically assigned the physical port at the nearest Nucleus Switch that is collocated with an ISP, cable company, content provider, local exchange carrier (LEC) or an interexchange carrier (IXC). The Nucleus Switch hands off the IP traffic to the Attobahn Gateway Router (AGR). The AGR reads the IP address, stores a copy of the address in its AGR IP-to-Cell Frame Address system, and then hands off the IP packets to the designated ISP, cable company, content provider, LEO, or IXC network interface (collectively "the Providers"). The AGR IP-to-Cell Frame Address system (IPCFA) keeps track of all IP originating addresses (from the originating TCP/IP devices connected to the ROVERs) that were hand off to the Providers and their correlating ROVERs port addresses (WiFi and WiGi).

Aspect 28. The Attobahn Atto View ADS Level Monitoring System (AAA) has a secured APP and method to allow broadband viewers an alternative way to pay for digital content by simultaneously viewing ads with an advertisement overlay services technology that is embedded in the APPI.

The AAA APP method and system allows broadband viewers to purchase licensed content by simultaneously viewing advertisement that overlay the video content. Customers who access video content that would normally require a license, subscription or other fees in order to view them, can now view these contents without having to pay the fees. Instead, the content is available to the customer because the system has embedded advertisement overlays with pre-negotiated advertisement arrangement that credit the customer based on viewing periods. The number of ADS the customer views is captured and display by the ADS Level Monitor lights/indicators.

Aspect 29. The Attobahn Cell Frame Fast Packet Protocol (ACF2P2) cell frame has at least a 10-byte header and a 60-byte payload. The header consists of: 1. Global Codes Addressing & Global Gateway Nucleus Switches A Global Code addressing arrangement that is used to identify geographical regions in the world where at least one cell frame device is located. At least four Global Codes are used to divide the world in the geographical and economics regions. The four Attobahn regions mimic the four world business regions:

North America (NA)
Europe, Middle East & Africa (EMEA)
Asia Pacific (ASPAC)
Caribbean Central & South America (CCSA)

At least each Global Code in the ACF2P2 cell frame utilizes the first two bits (bit-1 and bit-2) of the 560-bit frame. 2. Area Codes Address & National, City & Data Centers Nucleus Switches The ACF2P2 uses at least 6 bits to represent the 64 Area Codes of the network and the countries that specific Inter/Intra City and Data Center Nucleus Switches are distributed across. Each Global Code has at least 64 Area Codes beneath them and encompasses bit-3 to bit-8 of the 560-bit frame which is an embodiment of this invention.

The National, inter/intra city, and data center Nucleus Switches are the only devices that read and make switching decisions based on the Area Codes six (6) bits and the Global Codes two (2) bits. 3. Connection Oriented Protocol The Attobahn Cell Frame Fast Packet Protocol (ACF2P2) is a connection oriented protocol that has a cell frame with at least a 10-byte overhead that includes the Global Codes, Area Codes, Destination Devices Addresses, Destination Logical port, hardware port number, frame sequence number bits, acknowledgment bits, the check sum bits, and the 480-bit payload.

The protocol is designed to have only the Destination Device Address in the overhead bits of each cell frame and does not carry the origination device address in the overhead bits. This design reduces the amount of information that the V-ROVER, Nano-ROVERs, Atto-ROVERs, Protonic Switches, and Nucleus Switches process. The Origination Device Address is sent once to the destination device throughout the entire host-to-host communications.

The origination address is contained in the cell frame payload first 48 bits. The first cell frame that carries the Local APPs message from the Attobahn Security & Directory Server (ASDS) to the Remote ASDS to request access to communicate with the distant AAPs contains the Origination Device Address, the Logical Port 0 of the APPI that is associated with the Attobahn ADMIN APP, and the Remote Logical Port associated with distant APPs ID information.

Aspect 30. An Atto-ROVER SCREEN PROJECTOR is an embodiment of this invention. It has at least one projector circuitry and at least one high intensity light that projects images from the Atto-ROVER screen onto any clear surface to display the images on its screen. At least one projector circuitry that receives images signals, digitally process them, and feed them to at least one high intensity light that projects the images onto a display surface.

At least a projector that has a brightness of at least 4-8 lumens; aspect ratio of at least 4; 3; a native resolution of at least 320×240 (720p); at least an automatic focus; and at least a display coverage area of 12-48 inches.

A projector light that is positioned on one side of the Atto-ROVER device. A project light with at least a circumference of ¼ inch. A projection light positioned so that the Atto-ROVER can be positioned at the correct angle using the Atto-ROVER adjustable stand.

At least a Atto-ROVER adjustable stand that has a dimension of at least length=5.75 inches; width=4.0 inches; and height=0.5 inch. Aspect 31. Attobahn 30 GHz-3300 GHZ Millimeter Wave (mmW) RF Antennae Repeater Amplifiers which is an embodiment of this invention. These devices take the weaken millimeter wave signals and amplify them to a stronger level, then retransmit them into areas of the house or building that they were unable reach prior to being amplified. These devices consist of at least a:

1. 360-degree Window-Mount mmW RF Antenna Amplifier Repeater.
2. 180-degree Window-Mount mmW RF Antenna Amplifier Repeater.
3. 20-60-Degree Door-Mount mmW RF Antenna Amplifier Repeater.
4. 180-Degree Door-Mount mmW RF Antenna Amplifier Repeater.
5. 180-Degree Wall-Mount mmW RF Antenna Amplifier Repeater.
6. 360-Degree Ceiling-Mount mmW RF Antenna Repeater Amplifier.
7. 180-Degree Ceiling-Mount mmW RF Antenna Repeater Amplifier.

Aspect 32. An Attobahn Instinctively Wise Integrated Circuit called the IWIC chip that is a design application specific integrated circuit (ASIC). An IWIC chip is a major component of the Attobahn network systems for the operations of the V-ROVERs, Nano-ROVERs, Atto-ROVERs, Protonic Switches, Nucleus Switches, and the Attobahn circuitry inside various Touch Point devices (4K/5/K/8K TVS; PCs, TABLETS; CLOUD SERVERS, SMART PHONES; TV & RADIO BROADCAST; VIRTUAL REALTY; HIGH SPEED GAMES; VIDEO/MOVIES DOWNLOADS; NEW MOVIES RELEASES DISTRIBUTION; PERSONAL CLOUD, SOCIAL MEDIA, INFO-MAIL; INFOTAINMENTS; INTEL TRANSPORT MET SERVICES; CORP NETS; AUTONOMOUS VEHICLE NET SERVICES; MOBILE VIDEO CONF; IoT; etc.)

An IWIC chip that operates with a terra bit per second switching fabric and consists of at least four sections. The four sections will consist of at least a:

1. Cell frame switching fabric circuitry.
2. Atto-second multiplexing multiple access circuitry.
3. Millimeter wave 30 GHz-3300 GHz RF amplifier, LNA, and QAM modem circuitry.
4. Local Oscillator and PLL circuitry.
5. CPU circuitry.

An IWIC chip with a physical size of at least:

i. LENGTH: 0.5-3 INCHES
ii. WIDTH: 0.5-2 INCHES
iii. HEIGHT: 0.25 INCH

An operating environment of at least:

i. SUPPL VOLTAGE: −1.0 to −5 VDC
ii. CURRENT: 10 micro amps to 40 milliamps
iii. 30-68-pin connections
iv. OPERATING TEMPERATURE: −55 C to 125 C Aspect 33. An Attobahn Coordinated Timing (ACT) Clocking & Synchronization Architecture consisting of a timing standard that utilizes at least one of the highest available atomic clocking oscillatory system. The architecture has at least eight (8) digital transmission layers that are synchronized to a common clocking source, to achieve a single phase-locked network from the highest-level network systems to end users' Touch Point systems.

A timing and clocking architecture that synchronizes at least a:

1. The Gyro TWA Boom Box Systems oscillatory circuitry which functions in the high millimeter wave RF range between 30 GHz and 3300 GHz.

2. The Gyro TWA Mini Boom Box Systems oscillatory circuitry which functions in the high millimeter wave RF range between 30 GHz and 3300 GHz.
3. The SONET Fiber Optic Terminals and digital multiplexers oscillatory circuitry that operates in the optical frequency and high speed digital range.
4. The Nucleus Switch high speed digital cell switching and millimeter wave RF systems oscillatory circuitry.
5. The Protonic Switches high speed digital cell switching and millimeter wave RF systems oscillatory circuitry.
6. The ROVERs Switches high speed digital cell switching and millimeter wave RF systems oscillatory circuitry.
7. mmW RF Antenna Repeater Amplifiers oscillatory circuitry which functions in the high millimeter wave RF range between 30 GHz and 3300 GHz.
8. The end user Touch Points devices digital circuitry synchronization.

An Attobahn ACT with at least a: cesium beam oscillator; Aspect 34. An Attobahn network management system called ATTOMOM is a customized centralized network management system that collects, analyze, and makes service restoration decisions based on the root-cause problem analysis function of system performance degradation, intermittent outages, outages, and catastrophic outages.

The ATTOMOM at least integrates the following Attobahn network systems:

1. Atto-Services Management System (ASMS)
2. ROVERs Network Management System (RNMS)
3. Protonic Switch Network Management System (PNMS)
4. Nucleus Switch Network Management System (NNMS)
5. Millimeter Wave RF Network Management System (RFNMS)
6. Router & Transmission Network Management System (RTNMS)
7. Clocking & Synchronization Management System
8. Security Management System (SMS)

Each of the aforementioned management systems, ATTOMOM and systems 1-8 consists of at least a customized computing system that at least collects the following information and process them to make display network devices and performance statuses:

1. Hardware component operating status;
2. Signal level performance statuses;
3. Electrical and environmental operating statuses;
4. Software programs operational statuses;
5. Clocking and synchronization system performance and operational statuses;
6. Millimeter Wave (mmW) RF 30 GHz-3300 GHz signal-to-noise ratio levels;
7. Bit error rate of digital signals between Attobahn devices;
8. APPS operational statuses;
9. Cell switching speed and accuracy operational real-time performance statuses;
10. IWIC chip performance data capture;
11. Network changes carried out by authorized personnel;
12. Security management statuses.
13. Unauthorized network changes real-time notifications;
14. Security breaches real-time notification and immediate coordinated and automated and human intervention retaliation actions to immediately shut down access and affected systems;

The Atto-Services Management System (ASMS); ROVERs Network Management System (RNMS); Protonic Switch Network Management System (PNMS); Nucleus Switch Network Management System (NNMS); Millimeter Wave RF Network Management System (RFNMS); Router & Transmission Network Management System (RTNMS); Clocking & Synchronization Management System; Security Management System (SMS) management systems send at least the following information to ATTOMOM:

1. System Alarm status reporting.
2. Network systems configuration changes.
3. System real-time operational performance reporting.
4. Security access, threats, rejections, protective actions, and changes.
5. Access Control Management reports.
6. Network failure recovery actions information
7. Planned Routine Maintenance and Emergency Maintenance Status reports.
8. Disaster Recovery plans and actions implemented reports An ATTOMOM management system along with its subordinate network management systems at least gather and send the aforementioned captured and network controlled information via the APPI logical port 1 ANMP to and between these systems to and from the three Attobahn Global Network Control Centers (GNCCs) in the United States, United Kingdom, and Australia.

An ATTOMOM management system that at least continuously supplied with the aforementioned network management systems information and after data analysis; root-cause problem determination; alarm and performance information is acted upon with pre-programmed actions; and appropriate human intervention. An ATTOMOM management system that at least aids the Global Network Control Centers technicians in expeditiously resolving network problems.

It will be apparent to those skilled in the art that various changes may be made in the disclosure without departing from the spirit and scope thereof, and therefore, the disclosure encompasses embodiments in addition to those specifically disclosed in the specification, but only as indicated in the appended claims.

1. An integrated circuit chip configured to facilitate medical data communication on a high-speed, high-capacity dedicated viral molecular network, comprising: a cell framing protocol configured to encapsulate data into at least one fixed cell frame; an atto-second multiplexer configured to process the at least one fixed cell frame; a data bus configured to deliver the at least one fixed cell frame to an orbital time slot; a modem that modulates and demodulates the data; and a radio frequency (RF) up/down converter, amplifier and receiver configured to transmit and receive millimeter wave RF signals that communicates with a high-power Gyro Traveling Wave Amplifier in the network, wherein the millimeter wave RF signals have a RF frequency between 30 GHz and 3,300 GHz. 2. The integrated circuit chip of claim 1, further comprising an encryption system being configured to encrypt end user application data, the data, the cell frame or a combination thereof.

The invention claimed is:

1. A communication system, comprising:

a plurality of access nodes receiving data flows within a network, each access node comprising an integrated circuit having cell-switching circuitry and a multiplexer, the integrated circuit and the multiplexer configured to segment the data flows into fixed-length cell frames and assign the cell frames to time slots within a time-division frame;

a hierarchical switching structure comprising the plurality of access nodes and at least one upstream switch; and a switching table and the cell-switching circuitry implemented by at least one access node, the switching table and the cell-switching circuitry configured to (i) examine a destination address of each cell frame, (ii) determine, for each cell frame, whether the destination address corresponds to the at least one access node, a neighboring access node, or an upstream switch, and (iii) cause the multiplexer to assign each cell frame into a time slot for transmission according to the determination, wherein the time slots are recurring time intervals each having a 0.25 micro second period into which the fixed-length cell frames are placed by the multiplexer for transmission.

2. The system of claim 1, wherein each time-division frame comprises a plurality of predetermined time slots allocated for discrete cell-frame transmissions.

3. The system of claim 1, wherein the time-division frame comprises ten time slots.

4. The system of claim 1, wherein the integrated circuit performs cell framing via an application programming interface configured to receive packetized data from applications.

5. The system of claim 1, wherein assignment of the time slots is adjusted in response to detected traffic conditions within the network.

6. The system of claim 1, wherein the access nodes perform time-deterministic routing of the cell frames using a protocol where each cell frame has at least 10-byte overhead comprising a global code, an area code, a destination device address, a destination logical port, and a hardware port number.

7. The system of claim 6, wherein the nucleus switch aggregates the time-slotted cell frames and routes the aggregated cell frames through a photonic switching layer.

8. The system of claim 1, wherein distributing time-slot switching operations among the access nodes reduces congestion at intermediate switching layers of the network.

9. The system of claim 1, wherein the time-slot architecture reduces per-frame latency by limiting queue depth within the distributed switching fabric.

10. A method for improving communication efficiency in a network, comprising:

receiving data flows at a plurality of access nodes;

generating fixed-length cell frames from the data flows using an integrated circuit having cell-switching circuitry;

assigning the cell frames to orbital time slots within a time-division frame using a multiplexer;

transmitting the time-slotted cell frames through a hierarchical switching structure comprising at least one upstream switch;

examining, by a switching table and the cell-switching circuitry implemented by at least one access node, a destination address of each cell frame;

determining, for each cell frame, whether the destination address corresponds to the at least one access node, a neighboring access node, or an upstream switch; and causing the multiplexer to assign each cell frame into a time slot for transmission according to the determination, wherein each time slot is a recurring time interval having a 0.25 micro second period into which the fixed-length cell frames are placed by the multiplexer for transmission.

11. The method of claim 10, further comprising adjusting assignment of the time slots based on observed traffic conditions.

12. The method of claim 10, wherein the time-division frame is repeated at a fixed temporal interval to maintain deterministic transmission cycles.

13. The method of claim 10, further comprising routing the cell frames using a protocol where each cell frame has at least 10-byte overhead comprising a global code, an area code, a destination device address, a destination logical port, and a hardware port number.

14. The method of claim 10, wherein transmitting the time-slotted cell frames includes forwarding the cell frames through a photonic switching layer.

15. The method of claim 10, further comprising reducing utilization of higher-level switching resources by performing cell-level switching at the access nodes.

16. A non-transitory computer-readable medium storing instructions that, when executed by one or more processors, cause the processors to:

configure access nodes to segment data flows into fixed-length cell frames and assign the cell frames to time slots within a time-division frame;

generate time-division frame schedules for use by a multiplexer;

route the time-slotted cell frames through a hierarchical switching structure comprising at least one upstream switch;

examine, by at least one access node using the cell-switching circuitry and a switching table, a destination address of each cell frame;

determine, for each cell frame, whether the destination address corresponds to the at least one access node, a neighboring access node, or an upstream switch;

cause the multiplexer to assign each cell frame into a time slot for transmission according to the determination; and transmit the fixed-length cell frames in recurring time intervals each having a 0.25 micro second period into which the fixed-length cell frames are placed by the multiplexer for transmission.

17. The medium of claim 16, wherein the time-division frame comprises ten time slots.

18. The medium of claim 16, wherein reducing congestion includes bypassing higher-level switching operations when the cell frames are switched at the access nodes.

19. The medium of claim 16, wherein routing the time-slotted cell frames includes parsing hierarchical routing identifiers contained in headers of the cell frames to determine switching paths through the hierarchical switching structure.

20. The medium of claim 16, wherein the instructions further cause the processors to perform time-deterministic routing of the cell frames using a protocol where each cell frame has at least 10-byte overhead comprising a global code, an area code, a destination device address, a destination logical port, and a hardware port number.

* * * * *